US011522584B2

(12) United States Patent
Murakami et al.

(10) Patent No.: US 11,522,584 B2
(45) Date of Patent: Dec. 6, 2022

(54) TRANSMISSION METHOD AND TRANSMISSION DEVICE

(71) Applicant: Panasonic Intellectual Property Corporation of America, Torrance, CA (US)

(72) Inventors: Yutaka Murakami, Kanagawa (JP); Tomohiro Kimura, Osaka (JP); Mikihiro Ouchi, Osaka (JP); Hiroyuki Motozuka, Kanagawa (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 16/594,456

(22) Filed: Oct. 7, 2019

(65) Prior Publication Data

US 2020/0036416 A1 Jan. 30, 2020

Related U.S. Application Data

(63) Continuation of application No. 15/747,339, filed as application No. PCT/JP2016/003377 on Jul. 19, 2016, now Pat. No. 10,484,058.

(Continued)

(30) Foreign Application Priority Data

| | | |
|---|---|---|
| Sep. 9, 2015 | (JP) | 2015-177796 |
| Dec. 11, 2015 | (JP) | 2015-242101 |
| Jun. 3, 2016 | (JP) | 2016-112230 |

(51) Int. Cl.
*H04B 7/0456* (2017.01)
*H04L 1/00* (2006.01)

(Continued)

(52) U.S. Cl.
CPC ............ *H04B 7/0456* (2013.01); *H04B 7/04* (2013.01); *H04B 7/0413* (2013.01);

(Continued)

(58) Field of Classification Search
CPC ...... H04B 7/0456; H04B 7/0413; H04B 7/04; H04B 7/0615; H04B 7/0682;

(Continued)

(56) References Cited

U.S. PATENT DOCUMENTS 9,553,641 B2 * 1/2017 Johansson ........... H04B 7/0684
2007/0217485 A1 9/2007 Kawasaki (Continued)

FOREIGN PATENT DOCUMENTS

CN 103004121 3/2013
EP 2 541 914 1/2013

(Continued)

OTHER PUBLICATIONS

International Search Report (ISR) dated Sep. 27, 2016 in International (PCT) Application No. PCT/JP2016/003377.

(Continued)

*Primary Examiner* — Sam K Ahn
*Assistant Examiner* — Amneet Singh
(74) *Attorney, Agent, or Firm* — Wenderoth, Lind & Ponack, L.L.P.

(57) ABSTRACT

A transmission method includes encoding processing that generates an encoded block, modulation processing that generates symbols from the encoded block, phase change processing that changes the phase of the symbols, and transmission processing that arranges the symbols in data carriers and transmits the symbols. The transmission processing configures a frame by arranging symbol groups in order in the frequency direction and transmits the frame. The symbol groups each include a symbol generated from a first (Continued)

encoded block and a symbol generated from a second encoded block. The phase change processing includes changing the phase of symbols the same symbol group using the same phase change value.

2 Claims, 97 Drawing Sheets

Related U.S. Application Data

(60) Provisional application No. 62/198,978, filed on Jul. 30, 2015.

(51) Int. Cl.

| | |
|---|---|
| ***H04H 20/42*** | (2008.01) |
| ***H04B 7/06*** | (2006.01) |
| ***H04B 7/04*** | (2017.01) |
| ***H04B 7/0413*** | (2017.01) |

(52) U.S. Cl.

CPC ......... *H04B 7/0615* (2013.01); *H04B 7/0682* (2013.01); *H04H 20/423* (2013.01); *H04L 1/0041* (2013.01); *H04L 1/0071* (2013.01); *H04L 1/0083* (2013.01); *H04L 1/0003* (2013.01)

(58) Field of Classification Search

CPC ... H04H 20/423; H04L 1/0041; H04L 1/0083; H04L 1/0071; H04L 1/0003

See application file for complete search history.

(56) References Cited

U.S. PATENT DOCUMENTS

| | | | | | |
|---|---|---|---|---|---|
| 2008/0232437 | A1 | 9/2008 | Kim | | |
| 2009/0041150 | A1* | 2/2009 | Tsai | H04B 1/59 | 375/267 |
| 2009/0067522 | A1* | 3/2009 | Kwak | H04L 5/0023 | 375/260 |
| 2012/0106474 | A1* | 5/2012 | Wu | H04B 7/0619 | 370/329 |
| 2013/0121306 | A1 | 5/2013 | Murakami et al. | | |
| 2013/0121307 | A1 | 5/2013 | Murakami | | |
| 2014/0205032 | A1 | 7/2014 | Murakami et al. | | |
| 2015/0003555 | A1 | 1/2015 | Murakami et al. | | |
| 2015/0063491 | A1 | 3/2015 | Kim et al. | | |
| 2015/0155925 | A1 | 6/2015 | Murakami et al. | | |
| 2015/0381251 | A1 | 12/2015 | Murakami et al. | | |
| 2016/0080175 | A1* | 3/2016 | Huang | H04L 25/0204 | 375/267 |
| 2016/0142118 | A1 | 5/2016 | Murakami et al. | | |
| 2016/0380683 | A1 | 12/2016 | Murakami et al. | | |
| 2018/0102820 | A1 | 4/2018 | Murakami et al. | | |
| 2018/0254806 | A1 | 9/2018 | Murakami et al. | | |
| 2019/0229782 | A1 | 7/2019 | Murakami et al. | | |

FOREIGN PATENT DOCUMENTS

| | | |
|---|---|---|
| EP | 2 701 326 | 2/2014 |
| JP | 2008-131558 | 6/2008 |
| JP | 2015-97390 | 5/2015 |

OTHER PUBLICATIONS

David Vargas, et al., “MIMO for DVB-NGH, The Next Generation Mobile TV Broadcasting”, IEEE Communications Magazine, vol. 51, No. 7, pp. 130-137, Jul. 2013.

Extended European Search Report dated Jul. 17, 2018 in corresponding European Application No. 16830033.3.

Office Action and Search Report dated May 21, 2020 in corresponding Chinese Patent Application No. 201680043677.0, with English translation of Search Report.

* cited by examiner

FIG. 48

COMMUNICATIONS STATION #1 | COMMUNICATIONS STATION #2

ST48-1: COMMUNICATIONS STATION #1 "TRANSMITS A SIGNAL FROM #1A ANTENNA UNIT". THEN, COMMUNICATIONS STATION #1 "TRANSMITS A SIGNAL FROM #2A ANTENNA UNIT", "TRANSMITS A SIGNAL FROM #3A ANTENNA UNIT", "TRANSMITS A SIGNAL FROM #1B ANTENNA UNIT", "TRANSMITS A SIGNAL FROM #2B ANTENNA UNIT", AND "TRANSMITS A SIGNAL FROM #3B ANTENNA UNIT".

ST48-2: COMMUNICATIONS STATION #2 "DETERMINES ONE OF #1A ANTENNA UNIT, #2A ANTENNA UNIT, #3A ANTENNA UNIT, #1B ANTENNA UNIT, #2B ANTENNA UNIT, AND #3B ANTENNA UNIT, AS AN ANTENNA TO BE USED BY COMMUNICATIONS STATION #1 FOR MODULATED SIGNAL TRANSMISSION". NOTE THAT THE ANTENNA UNIT DETERMINED TO BE USED FOR MODULATED SIGNAL TRANSMISSION IS NAMED "DETERMINED ANTENNA UNIT α".
COMMUNICATIONS STATION #2 FURTHER RECEIVES THE SIGNAL TRANSMITTED FROM (THE DETERMINED) ANTENNA UNIT α BY COMMUNICATIONS STATION #1, AND DETERMINES ONE OF #1X ANTENNA UNIT, #2X ANTENNA UNIT, #3X ANTENNA UNIT, #1Y ANTENNA UNIT, #2Y ANTENNA UNIT, AND #3Y ANTENNA UNIT TO BE USED FOR RECEPTION. NOTE THAT THE ANTENNA UNIT DETERMINED TO BE USED FOR RECEPTION IS NAMED "DETERMINED ANTENNA UNIT β".

ST48-3: COMMUNICATIONS STATION #2 TRANSMITS, TO COMMUNICATIONS STATION #1, "INFORMATION ON AN ANTENNA (DETERMINED ANTENNA UNIT α) TO BE USED FOR MODULATED SIGNAL TRANSMISSION BY COMMUNICATIONS STATION #1", OR NOTIFIES COMMUNICATIONS STATION #1 OF THE DETERMINATION OF ONE RECEPTION ANTENNA TO BE USED. (COMMUNICATIONS STATION #2 MAY NOTIFY COMMUNICATIONS STATION #1 WITH INFORMATION ON THE RECEPTION ANTENNA TO BE USED).

ST48-4: COMMUNICATIONS STATION #1 TRANSMITS A SIGNAL IN ACCORDANCE WITH THE FOLLOWING RULES.
RULE: IF DETERMINED ANTENNA UNIT α IS #1A ANTENNA UNIT OR #2A ANTENNA UNIT OR #3A ANTENNA UNIT, COMMUNICATIONS STATION #1 "TRANSMITS A SIGNAL FROM DETERMINED ANTENNA UNIT α AND #1B ANTENNA UNIT". THEN, COMMUNICATIONS STATION #1 "TRANSMITS A SIGNAL FROM DETERMINED ANTENNA UNIT α AND #2B ANTENNA UNIT", AND "TRANSMITS A SIGNAL FROM DETERMINED ANTENNA UNIT α AND #3B ANTENNA UNIT". (NOTE THAT COMMUNICATIONS STATION #1 MAY TRANSMIT A SIGNAL FROM DETERMINED ANTENNA UNIT α AND #1B ANTENNA, AND THEN TRANSMIT A SIGNAL FROM #2B ANTENNA, AND TRANSMIT A SIGNAL FROM #3B ANTENNA).
RULE: IF DETERMINED ANTENNA UNIT α IS #1B ANTENNA UNIT OR #2B ANTENNA UNIT OR #3B ANTENNA UNIT, COMMUNICATIONS STATION #1 "TRANSMITS A SIGNAL FROM DETERMINED ANTENNA UNIT α AND #1A ANTENNA UNIT". THEN, COMMUNICATIONS STATION #1 "TRANSMITS A SIGNAL FROM DETERMINED ANTENNA UNIT α AND #2A ANTENNA UNIT", AND "TRANSMITS A SIGNAL FROM DETERMINED ANTENNA UNIT α AND #3A ANTENNA UNIT". (NOTE THAT COMMUNICATIONS STATION #1 MAY TRANSMIT A SIGNAL FROM DETERMINED ANTENNA UNIT α AND #1A ANTENNA, AND THEN TRANSMIT A SIGNAL FROM #2A ANTENNA, AND TRANSMIT A SIGNAL FROM #3A ANTENNA).

ST48-5: COMMUNICATIONS STATION #2 "DETERMINES ONE ANTENNA TO TRANSMIT THE MODULATED SIGNAL, TO BE USED AT THE SAME TIME AS ANTENNA UNIT α BY COMMUNICATIONS STATION #1". NOTE THAT THE ANTENNA UNIT DETERMINED TO BE USED FOR TRANSMISSION IS NAMED "DETERMINED ANTENNA UNIT γ".
COMMUNICATIONS STATION #2 NEWLY DETERMINES ONE RECEPTION ANTENNA UNIT IN ACCORDANCE WITH THE FOLLOWING RULES.
RULE: IF DETERMINED ANTENNA UNIT β IS #1X ANTENNA UNIT OR #2X ANTENNA UNIT OR #3X ANTENNA UNIT, COMMUNICATIONS STATION #2 NEWLY DETERMINES AN ANTENNA UNIT TO BE USED FOR RECEPTION FROM AMONG #1Y ANTENNA UNIT OR #2Y ANTENNA UNIT OR #3Y ANTENNA UNIT.
RULE: IF DETERMINED ANTENNA UNIT β IS #1Y ANTENNA UNIT OR #2Y ANTENNA UNIT OR #3Y ANTENNA UNIT, COMMUNICATIONS STATION #2 NEWLY DETERMINES AN ANTENNA UNIT TO BE USED FOR RECEPTION FROM AMONG #1X ANTENNA UNIT OR #2X ANTENNA UNIT OR #3X ANTENNA UNIT.

ST48-6: COMMUNICATIONS STATION #2 TRANSMITS, TO COMMUNICATIONS STATION #1, "INFORMATION ON AN ANTENNA (DETERMINED ANTENNA UNIT γ) TO BE USED FOR MODULATED SIGNAL TRANSMISSION BY COMMUNICATIONS STATION #1".
COMMUNICATIONS STATION #2 NOTIFIES COMMUNICATIONS STATION #1 THAT ONE ANTENNA UNIT TO BE USED FOR RECEPTION HAS BEEN NEWLY DETERMINED. (COMMUNICATIONS STATION #2 MAY NOTIFY COMMUNICATIONS STATION #1 WITH INFORMATION ON THE DETERMINED RECEPTION ANTENNA UNIT). NOTE THAT THE ANTENNA UNIT DETERMINED TO BE USED FOR RECEPTION IS NAMED "DETERMINED ANTENNA UNIT β".

ST48-7: COMMUNICATIONS STATION #1 BEGINS DATA SYMBOL TRANSMISSION USING ANTENNA UNIT α AND ANTENNA UNIT γ.

FIG. 56

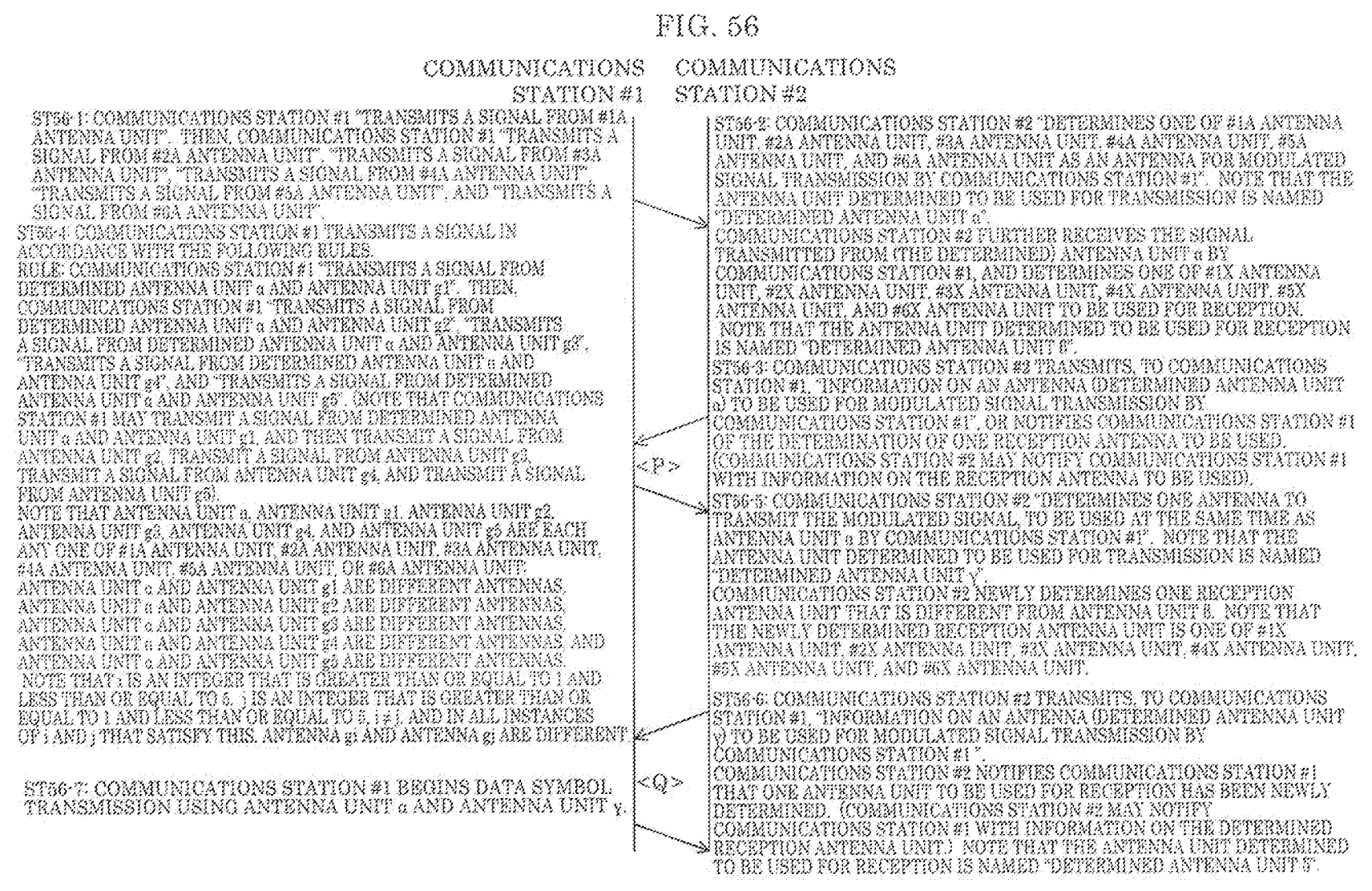

COMMUNICATIONS STATION #1 | COMMUNICATIONS STATION #2

ST56-1: COMMUNICATIONS STATION #1 "TRANSMITS A SIGNAL FROM #1A ANTENNA UNIT". THEN, COMMUNICATIONS STATION #1 "TRANSMITS A SIGNAL FROM #2A ANTENNA UNIT", "TRANSMITS A SIGNAL FROM #3A ANTENNA UNIT", "TRANSMITS A SIGNAL FROM #4A ANTENNA UNIT", "TRANSMITS A SIGNAL FROM #5A ANTENNA UNIT", AND "TRANSMITS A SIGNAL FROM #6A ANTENNA UNIT".

ST56-2: COMMUNICATIONS STATION #2 "DETERMINES ONE OF #1A ANTENNA UNIT, #2A ANTENNA UNIT, #3A ANTENNA UNIT, #4A ANTENNA UNIT, #5A ANTENNA UNIT, AND #6A ANTENNA UNIT AS AN ANTENNA FOR MODULATED SIGNAL TRANSMISSION BY COMMUNICATIONS STATION #1". NOTE THAT THE ANTENNA UNIT DETERMINED TO BE USED FOR TRANSMISSION IS NAMED "DETERMINED ANTENNA UNIT α".
COMMUNICATIONS STATION #2 FURTHER RECEIVES THE SIGNAL TRANSMITTED FROM (THE DETERMINED) ANTENNA UNIT α BY COMMUNICATIONS STATION #1, AND DETERMINES ONE OF #1X ANTENNA UNIT, #2X ANTENNA UNIT, #3X ANTENNA UNIT, #4X ANTENNA UNIT, #5X ANTENNA UNIT, AND #6X ANTENNA UNIT TO BE USED FOR RECEPTION. NOTE THAT THE ANTENNA UNIT DETERMINED TO BE USED FOR RECEPTION IS NAMED "DETERMINED ANTENNA UNIT β".

ST56-3: COMMUNICATIONS STATION #2 TRANSMITS, TO COMMUNICATIONS STATION #1, "INFORMATION ON AN ANTENNA (DETERMINED ANTENNA UNIT α) TO BE USED FOR MODULATED SIGNAL TRANSMISSION BY COMMUNICATIONS STATION #1", OR NOTIFIES COMMUNICATIONS STATION #1 OF THE DETERMINATION OF ONE RECEPTION ANTENNA TO BE USED. (COMMUNICATIONS STATION #2 MAY NOTIFY COMMUNICATIONS STATION #1 WITH INFORMATION ON THE RECEPTION ANTENNA TO BE USED).

<P>

ST56-4: COMMUNICATIONS STATION #1 TRANSMITS A SIGNAL IN ACCORDANCE WITH THE FOLLOWING RULES.
RULE: COMMUNICATIONS STATION #1 "TRANSMITS A SIGNAL FROM DETERMINED ANTENNA UNIT α AND ANTENNA UNIT g1". THEN, COMMUNICATIONS STATION #1 "TRANSMITS A SIGNAL FROM DETERMINED ANTENNA UNIT α AND ANTENNA UNIT g2", "TRANSMITS A SIGNAL FROM DETERMINED ANTENNA UNIT α AND ANTENNA UNIT g3", "TRANSMITS A SIGNAL FROM DETERMINED ANTENNA UNIT α AND ANTENNA UNIT g4", AND "TRANSMITS A SIGNAL FROM DETERMINED ANTENNA UNIT α AND ANTENNA UNIT g5". (NOTE THAT COMMUNICATIONS STATION #1 MAY TRANSMIT A SIGNAL FROM DETERMINED ANTENNA UNIT α AND ANTENNA UNIT g1, AND THEN TRANSMIT A SIGNAL FROM ANTENNA UNIT g2, TRANSMIT A SIGNAL FROM ANTENNA UNIT g3, TRANSMIT A SIGNAL FROM ANTENNA UNIT g4, AND TRANSMIT A SIGNAL FROM ANTENNA UNIT g5).
NOTE THAT ANTENNA UNIT α, ANTENNA UNIT g1, ANTENNA UNIT g2, ANTENNA UNIT g3, ANTENNA UNIT g4, AND ANTENNA UNIT g5 ARE EACH ANY ONE OF #1A ANTENNA UNIT, #2A ANTENNA UNIT, #3A ANTENNA UNIT, #4A ANTENNA UNIT, #5A ANTENNA UNIT, OR #6A ANTENNA UNIT.
ANTENNA UNIT α AND ANTENNA UNIT g1 ARE DIFFERENT ANTENNAS, ANTENNA UNIT α AND ANTENNA UNIT g2 ARE DIFFERENT ANTENNAS, ANTENNA UNIT α AND ANTENNA UNIT g3 ARE DIFFERENT ANTENNAS, ANTENNA UNIT α AND ANTENNA UNIT g4 ARE DIFFERENT ANTENNAS, AND ANTENNA UNIT α AND ANTENNA UNIT g5 ARE DIFFERENT ANTENNAS.
NOTE THAT i IS AN INTEGER THAT IS GREATER THAN OR EQUAL TO 1 AND LESS THAN OR EQUAL TO 5, j IS AN INTEGER THAT IS GREATER THAN OR EQUAL TO 1 AND LESS THAN OR EQUAL TO 5, i ≠ j, AND IN ALL INSTANCES OF i AND j THAT SATISFY THIS, ANTENNA gi AND ANTENNA gj ARE DIFFERENT.

ST56-5: COMMUNICATIONS STATION #2 "DETERMINES ONE ANTENNA TO TRANSMIT THE MODULATED SIGNAL, TO BE USED AT THE SAME TIME AS ANTENNA UNIT α BY COMMUNICATIONS STATION #1". NOTE THAT THE ANTENNA UNIT DETERMINED TO BE USED FOR TRANSMISSION IS NAMED "DETERMINED ANTENNA UNIT γ".
COMMUNICATIONS STATION #2 NEWLY DETERMINES ONE RECEPTION ANTENNA UNIT THAT IS DIFFERENT FROM ANTENNA UNIT β. NOTE THAT THE NEWLY DETERMINED RECEPTION ANTENNA UNIT IS ONE OF #1X ANTENNA UNIT, #2X ANTENNA UNIT, #3X ANTENNA UNIT, #4X ANTENNA UNIT, #5X ANTENNA UNIT, AND #6X ANTENNA UNIT.

ST56-6: COMMUNICATIONS STATION #2 TRANSMITS, TO COMMUNICATIONS STATION #1, "INFORMATION ON AN ANTENNA (DETERMINED ANTENNA UNIT γ) TO BE USED FOR MODULATED SIGNAL TRANSMISSION BY COMMUNICATIONS STATION #1".
COMMUNICATIONS STATION #2 NOTIFIES COMMUNICATIONS STATION #1 THAT ONE ANTENNA UNIT TO BE USED FOR RECEPTION HAS BEEN NEWLY DETERMINED. (COMMUNICATIONS STATION #2 MAY NOTIFY COMMUNICATIONS STATION #1 WITH INFORMATION ON THE DETERMINED RECEPTION ANTENNA UNIT.) NOTE THAT THE ANTENNA UNIT DETERMINED TO BE USED FOR RECEPTION IS NAMED "DETERMINED ANTENNA UNIT δ".

<Q>

ST56-7: COMMUNICATIONS STATION #1 BEGINS DATA SYMBOL TRANSMISSION USING ANTENNA UNIT α AND ANTENNA UNIT γ.

TRANSMISSION METHOD AND TRANSMISSION DEVICE

TECHNICAL FIELD

The present disclosure relates to transmission devices and reception devices, and in particular to transmission devices and reception devices that communicate by using multiple antennas.

BACKGROUND ART

One conventional communications method that uses multiple antennas is, for example, the communications method known as Multiple-Input Multiple-Out (MIMO). In multi-antenna communications, which is typically MIMO, data communication rate can be improved by modulating transmission data of a plurality of sequences and simultaneously transmitting the respective modulated signals from different antennas.

FIG. 73 illustrates one example of a configuration of a transmission device based on the Digital Video Broadcasting—Next Generation Handheld (DVB-NGH) standard, in a case where there are two transmitting antennas and two transmission modulated signals (transmission streams). This example is disclosed in Non Patent Literature (NPTL) 1. In the transmission device, data 003 encoded by encoder 002 is split into data 005A and data 005B by splitter 004. Data 005A is interleaved by interleaver 004A and mapped by mapper 006A. Similarly, data 005B is interleaved by interleaver 004B and mapped by mapper 006B. Weighting synthesizers 008A, 008B receive inputs of mapped signals 007A, 007B, and weighting synthesize these signals to generate weighting synthesized signals 009A, 016B. The phase of weighting synthesized signal 016B is then changed. Then, radio units 010A, 010B perform processing related to orthogonal frequency division multiplexing (OFDM) and processing such as frequency conversion and/or amplification, and transmit transmission signal 011A from antenna 012A and transmission signal 011B from antenna 012B.

Here, a method is conceivable in which, for example, nine phase change values are set in phase changer 017B, and phase change is performed in 9 regular periods.

In the example illustrated in FIG. 73, splitter 004 is configured to split the data, but when a multi-carrier transmission method is used, such as OFDM, when a specific rule is established for the arrangement of the symbols along the frequency axis to improve data reception quality in the reception device, it is possible to improve data reception quality by using a phase change method other than the above-described method.

CITATION LIST

Non Patent Literature

NPTL 1: "MIMO for DVB-NGH, the next generation mobile TV broadcasting," IEEE Commun. Mag., vol. 57, no. 7, pp. 130-137, July 2013.

SUMMARY OF THE INVENTION

Technical Problem

The present disclosure relates to the arrangement of symbols and a phase change method when a multi-carrier transmission method, such as OFDM, is used, and has an object to improve data reception quality in a propagation environment including a line-of-sight (LOS) environment.

Solutions to Problem

A transmission method according to one aspect of the present disclosure includes: encoding processing that generates an encoded block using forward error correction; modulation processing that generates a plurality of first symbols and a plurality of second symbols from the encoded block; phase change processing that changes a phase of at least one of (i) the plurality of first symbols or (ii) the plurality of second symbols; and transmission processing that arranges the plurality of first symbols and the plurality of second symbols in a plurality of data carriers and transmits the plurality of first symbols and the plurality of second symbols. The transmission processing configures a first frame by arranging, in order in a frequency direction, a plurality of first symbol groups each including two or more of the plurality of first symbols and configures a second frame by arranging, in order in the frequency direction, a plurality of second symbol groups each including two or more of the plurality of second symbols. Each of the plurality of first symbol groups includes one of the plurality of first symbols generated from a first encoded block and one of the plurality of first symbols generated from a second encoded block different from the first encoded block. Each of the plurality of second symbol groups includes one of the plurality of second symbols generated from the first encoded block and one of the plurality of second symbols generated from the second encoded block. The phase change processing changes a phase of symbols in a same one of the plurality of first symbol groups or a same one of the plurality of second symbol groups using a same phase change value. The transmission processing simultaneously transmits the first frame and the second frame using a plurality of antennas.

A transmission device according to one aspect of the present disclosure includes: an encoding processor that generates an encoded block using forward error correction; a modulation processor that generates a plurality of first symbols and a plurality of second symbols from the encoded block; a phase change processor that changes a phase of at least one of (i) the plurality of first symbols or (ii) the plurality of second symbols; and a transmission processor that arranges the plurality of first symbols and the plurality of second symbols in a plurality of data carriers and transmits the plurality of first symbols and the plurality of second symbols. The transmission processor configures a first frame by arranging, in order in a frequency direction, a plurality of first symbol groups each including two or more of the plurality of first symbols and configures a second frame by arranging, in order in the frequency direction, a plurality of second symbol groups each including two or more of the plurality of second symbols. Each of the plurality of first symbol groups includes one of the plurality of first symbols generated from a first encoded block and one of the plurality of first symbols generated from a second encoded block different from the first encoded block. Each of the plurality of second symbol groups includes one of the plurality of second symbols generated from the first encoded block and one of the plurality of second symbols generated from the second encoded block. The phase change processor changes a phase of symbols in a same one of the plurality of first symbol groups or a same one of the plurality of second symbol groups using a same phase change value. The transmission processor simultaneously transmits the first frame and the second frame using a plurality of antennas.

Advantageous Effect of Invention

In this way, according to the present disclosure provides a transmission method, reception method, transmission device, and reception device that improve data reception quality degradation, high quality performance can be provided in broadcast, multi-cast communications, and uni-cast communications systems.

BRIEF DESCRIPTION OF DRAWINGS

FIG. 48 illustrates an example of communication between communications station #1 and communications station #2.

FIG. 56 illustrates an example of communication between communications station #1 and communications station #2.

DESCRIPTION OF EXEMPLARY EMBODIMENTS

Hereinafter, embodiments according to the present disclosure will be described in detail with reference to the drawings.

Embodiment 1

A transmission method, transmission device, reception method, and reception device according to this embodiment will be described in detail.

Figure 1:
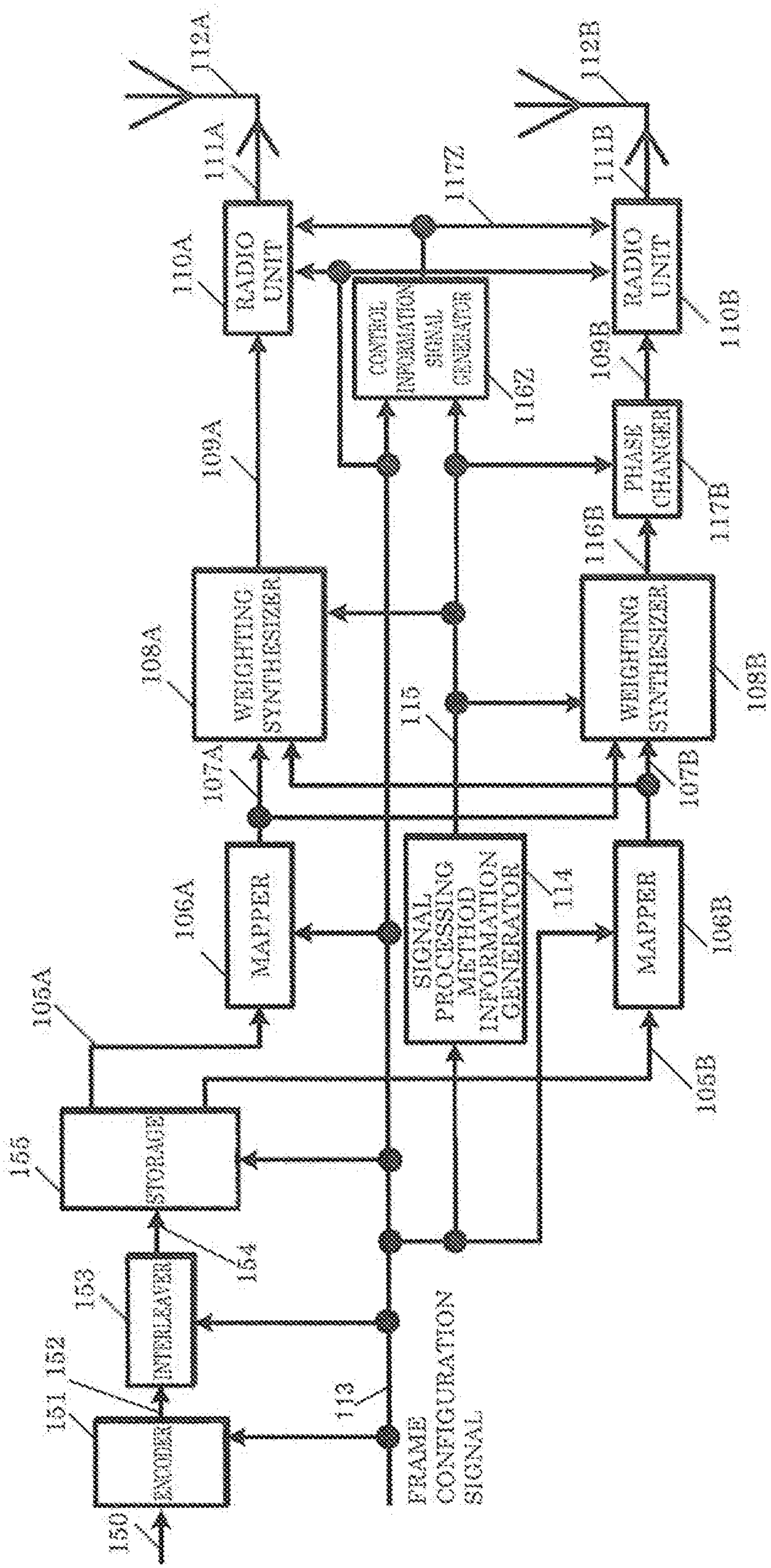
FIG. 1 illustrates an example of a configuration of a transmission device.

FIG. 1 illustrates one example of a configuration of a transmission device according to this embodiment. Encoder 151 receives inputs of data 150 and frame configuration signal 113, performs error correction encoding based on information related to an error correction code included in frame configuration signal 113, and outputs encoded data 152. Note that information related to an error correction code included in frame configuration signal 113 is, for example, information on the error correction code, the code length of the error correction code, and/or the encode rate of the error correction code. Note that code length means block length.

Interleaver 153 receives inputs of encoded data 152 and frame configuration signal 113, rearranges data based on information on an interleaving method included in frame configuration signal 113, and outputs interleaved data 154. Note that the rearranging of data may be omitted.

Storage 155 receives inputs of interleaved data 154 and frame configuration signal 113, stores data based on information related to a frame configuration included in frame configuration signal 113, and outputs data 105A of stream #1 and data 105B of stream #2 in accordance with the frame configuration. Note that operations performed by storage 155 will be described in detail later.

Mapper 106A receives inputs of data 105A of stream #1 and frame configuration signal 113, performs, based on information on a modulation method included in frame configuration signal 113, mapping corresponding to the modulation method, and outputs mapped signal (baseband signal) 107A.

Similarly, mapper 106B receives inputs of data 105B of stream #2 and frame configuration signal 113, performs, based on information on a modulation method included in frame configuration signal 113, mapping corresponding to the modulation method, and outputs mapped signal (baseband signal) 107B.

Signal processing method information generator 114 receives an input of frame configuration signal 113, and selects either the Single-Input Single-Output (SISO) method or the MIMO method. When the MIMO method is selected, a specific MIMO method is determined, and signal 115 on information related to the transmission method is output. A specific MIMO method is, for example, information on the precoding matrix and information on the phase change method, and will be described in detail later.

Weighting synthesizer 108A receives inputs of mapped signal 107A, mapped signal 107B, and signal 115 on information related to the transmission method, and when signal 115 on information related to the transmission method indicates “transmission using MIMO method”, performs weighting synthesis based on a precoding matrix, and outputs weighting synthesized signal 109A. When signal 115 on information related to the transmission method indicates “transmission using SISO method”, weighting synthesizer 108A outputs a modulated signal without performing weighting synthesis.

Similarly, weighting synthesizer 108B receives inputs of mapped signal 107A, mapped signal 107B, and signal 115 on information related to the transmission method, and when signal 115 on information related to the transmission method indicates “transmission using MIMO method”, performs weighting synthesis based on a precoding matrix, and outputs weighting synthesized signal 116B. When signal 115 on information related to the transmission method indicates "transmission using SISO method", weighting synthesizer 108B outputs a modulated signal without performing weighting synthesis.

Phase changer 117B receives inputs of weighting synthesized signal 116B and signal 115 on information related to the transmission method, and when signal 115 on information related to the transmission method indicates "transmission using MIMO method" and "perform a phase change", performs a phase change and outputs phase-changed signal 109B to weighting synthesized signal 116B.

Control information signal generator 116Z receives inputs of frame configuration signal 113 and signal 115 on information related to the transmission method, generates a modulated signal for transmitting control information for transmission to a communication partner, and outputs control information signal 117Z. Control information for transmission to a communication partner is, for example, information on the modulation method used in the modulation, information related to the error correction code, and/or information related to the transmission method.

Radio unit 110A receives inputs of weighting synthesized signal 109, control information signal 117Z and frame configuration signal 113, generates, according to the frame configuration, a modulated signal in accordance with the frame configuration, and when frequency conversion, signal amplification, and/or multi-carrier transmission method is used, performs processing such as multi-carrier conversion, and outputs transmission signal 111A. Transmission signal 111A is output as radio waves from antenna 112A.

Radio unit 110B receives inputs of phase-changed signal 109B, control information signal 117Z and frame configuration signal 113, generates, according to the frame configuration, a modulated signal in accordance with the frame configuration, and when frequency conversion, signal amplification, and/or multi-carrier transmission method is used, performs processing such as multi-carrier conversion, and outputs transmission signal 111B. Transmission signal 111B is output as radio waves from antenna 112B.

Next, a case in which the transmission device illustrated in FIG. 1 performs transmission via a transmission method including performing precoding when using the MIMO method (phase change is not performed), and a case in which the transmission device illustrated in FIG. 1 performs transmission via a transmission method including performing precoding and phase change will be described.

Figure 2:
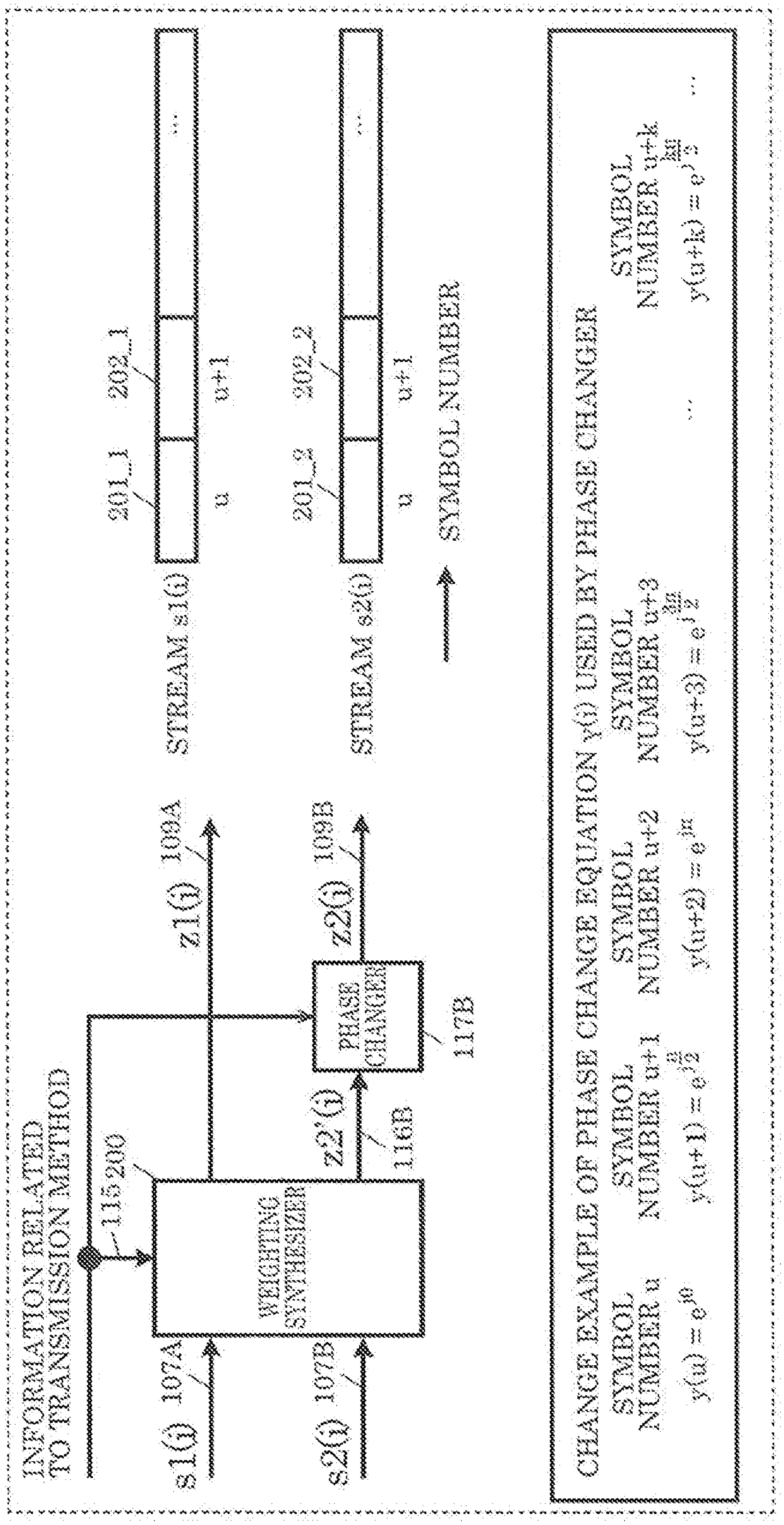
FIG. 2 illustrates an example of a configuration of a signal processor when precoding and phase change are performed.

FIG. 2 illustrates one example of a configuration of a signal processor when precoding and phase change are performed. Note that in FIG. 2, operations that are the same as in FIG. 1 share like reference marks. Moreover, weighting synthesizers 108A and 108B illustrated in FIG. 1 are integrated as weighting synthesizer 200 in FIG. 2.

Transmission Method Including Performing Precoding (No Phase Change):

Mapped signal 107A is expressed as $s1(i)$ and mapped signal 107B is expressed as $s2(i)$. Note that i is a symbol number. $s1(i)$ is defined as a complex number. Accordingly, $s1(i)$ may be a complex number and may be an actual number. $s2(i)$ is defined as a complex number. Accordingly, $s1(i)$ may be a complex number and may be an actual number.

Weighting synthesized signal 109A is expressed as $z1(i)$ and weighting synthesized signal 116B is expressed as $z2'(i)$. Note that $z1(i)$ is defined as a complex number. Accordingly, $z1(i)$ may be a complex number and may be an actual number. $z2'(i)$ is defined as a complex number. Accordingly, $z2'(i)$ may be a complex number and may be an actual number.

When information 115 related to the transmission method indicates application of a transmission method with the condition "MIMO method in which phase change is not performed", weighting synthesizer 200 performs the following calculation.

[MATH. 1]

$$\begin{pmatrix} z1(i) \\ z2'(i) \end{pmatrix} = \begin{pmatrix} a & b \\ c & d \end{pmatrix} \begin{pmatrix} s1(i) \\ s2(i) \end{pmatrix} \quad \text{Equation (1)}$$

In Equation (1), a, b, c, and d can be defined as complex numbers. Accordingly, a, b, c, and d may be complex numbers and may be actual numbers.

Phase changer 117B then outputs signal 109B without performing a phase change. Accordingly, $z2(i)=z2'(i)$ holds true. Note that signal 109B is $z2(i)$. $z1(i)$ and $z2(i)$ are transmitted from the transmission device at the same time and using the same frequency. Note that in the following description, "same frequency" means "same frequency band".

Transmission Method Including Performing Precoding and Phase Change:

The operations performed by weighting synthesizer 200 illustrated in FIG. 2 are the same as described in "transmission method including performing precoding (no phase change)". Accordingly, weighting synthesized signal 109A is expressed as $z1(i)$ and weighting synthesized signal 116B is expressed as $z2'(i)$ by Equation (1).

As illustrated in FIG. 2, stream 1($s1(i)$) of symbol number u is expressed as $s1(u)$201_1, stream 2($s2(i)$) of symbol number u is expressed as $s2(u)$201_2, stream 1($s1(i)$) of symbol number u+1 is expressed as $s1(u+1)$202_1, stream 2($s2(i)$) of symbol number u is expressed as $s2(u+1)$202_2, and so on.

Here, in phase changer 117B, for example, a phase change of y(u) is applied to $z2'(u)$, a phase change of y(u+1) is applied to $z2'(u+1)$, and so on. Accordingly, $z2(i)$ can be expressed as $z2(i)=y(i)\times z2'(i)$. Note that in the example illustrated in FIG. 2, the phase change value is set as follows.

[MATH. 2]

$$y(u+k) = e^{j\frac{k\pi}{2}} \quad \text{Equation (2)}$$

Note that in Equation (2), u+k indicates a symbol number, and k is, for example, an integer.

Accordingly, weighting synthesized signal $z1(i)$109A and phase-changed signal $z2(i)$109B can be expressed with the following equation.

[MATH. 3]

$$\begin{pmatrix} z1(i) \\ z2'(i) \end{pmatrix} = \begin{pmatrix} 1 & 0 \\ 0 & y(i) \end{pmatrix} \begin{pmatrix} a & b \\ c & d \end{pmatrix} \begin{pmatrix} s1(i) \\ s2(i) \end{pmatrix} = \begin{pmatrix} 1 & 0 \\ 0 & e^{j\times\delta(i)} \end{pmatrix} \begin{pmatrix} a & b \\ c & d \end{pmatrix} \begin{pmatrix} s1(i) \\ s2(i) \end{pmatrix} \quad \text{Equation (3)}$$

Note that δ(i) is an actual number. z1(*i*) and z2(*i*) are transmitted from the transmission device at the same time and using the same frequency.

In Equation (3), the phase change value is not limited to the value used in Equation (2); for example, a method in which the phase is changed periodically or regularly is conceivable.

The matrix (precoding matrix) in Equation (1) and Equation (3) is as follows.

[MATH. 4]

$$\begin{pmatrix} a & b \\ c & d \end{pmatrix} = F \quad \text{Equation (4)}$$

For example, using the following matrix for matrix F is conceivable.

[MATH. 5]

$$F = \begin{pmatrix} \beta \times e^{j0} & \beta \times \alpha \times e^{j0} \\ \beta \times \alpha \times e^{j0} & \beta \times e^{j\pi} \end{pmatrix} \quad \text{Equation (5)}$$

Alternatively

[MATH. 6]

$$F = \frac{1}{\sqrt{\alpha^2 + 1}} \begin{pmatrix} e^{j0} & \alpha \times e^{j0} \\ \alpha \times e^{j0} & e^{j\pi} \end{pmatrix} \quad \text{Equation (6)}$$

Alternatively

[MATH. 7]

$$F = \begin{pmatrix} \beta \times e^{j0} & \beta \times \alpha \times e^{j\pi} \\ \beta \times \alpha \times e^{j0} & \beta \times e^{j0} \end{pmatrix} \quad \text{Equation (7)}$$

Alternatively

[MATH. 8]

$$F = \frac{1}{\sqrt{\alpha^2 + 1}} \begin{pmatrix} e^{j0} & \alpha \times e^{j\pi} \\ \alpha \times e^{j0} & e^{j0} \end{pmatrix} \quad \text{Equation (8)}$$

Alternatively

[Math. 9]

$$F = \begin{pmatrix} \beta \times \alpha \times e^{j0} & \beta \times e^{j\pi} \\ \beta \times e^{j0} & \beta \times \alpha \times e^{j0} \end{pmatrix} \quad \text{Equation (9)}$$

Alternatively

[Math. 10]

$$F = \frac{1}{\sqrt{\alpha^2 + 1}} \begin{pmatrix} \alpha \times e^{j0} & e^{j\pi} \\ e^{j0} & \alpha \times e^{j0} \end{pmatrix} \quad \text{Equation (10)}$$

Alternatively

[Math. 11]

$$F = \begin{pmatrix} \beta \times \alpha \times e^{j0} & \beta \times e^{j0} \\ \beta \times e^{j0} & \beta \times \alpha \times e^{j\pi} \end{pmatrix} \quad \text{Equation (11)}$$

Alternatively

[Math. 12]

$$F = \frac{1}{\sqrt{\alpha^2 + 1}} \begin{pmatrix} \alpha \times e^{j0} & e^{j0} \\ e^{j0} & \alpha \times e^{j\pi} \end{pmatrix} \quad \text{Equation (12)}$$

Note that in Equation (5), Equation (6), Equation (7), Equation (8), Equation (9), Equation (10), Equation (11), and Equation (12), α may be an actual number and may be an imaginary number, and β may be an actual number and may be an imaginary number. However, α is not 0 (zero). β is also not 0 (zero).

Alternatively

[Math. 13]

$$F = \begin{pmatrix} \beta \times \cos\theta & \beta \times \sin\theta \\ \beta \times \sin\theta & -\beta \times \cos\theta \end{pmatrix} \quad \text{Equation (13)}$$

Alternatively

[Math. 14]

$$F = \begin{pmatrix} \cos\theta & \sin\theta \\ \sin\theta & -\cos\theta \end{pmatrix} \quad \text{Equation (14)}$$

Alternatively

[Math. 15]

$$F = \begin{pmatrix} \beta \times \cos\theta & -\beta \times \sin\theta \\ \beta \times \sin\theta & \beta \times \cos\theta \end{pmatrix} \quad \text{Equation (15)}$$

Alternatively

[Math. 16]

$$F = \begin{pmatrix} \cos\theta & -\sin\theta \\ \sin\theta & \cos\theta \end{pmatrix} \quad \text{Equation (16)}$$

Alternatively

[Math. 17]

$$F=\begin{pmatrix}\beta\times\sin\theta & -\beta\times\cos\theta\\ \beta\times\cos\theta & \beta\times\sin\theta\end{pmatrix}\quad\text{Equation (17)}$$

Alternatively

[Math. 18]

$$F=\begin{pmatrix}\sin\theta & -\cos\theta\\ \cos\theta & \sin\theta\end{pmatrix}\quad\text{Equation (18)}$$

Alternatively

[Math. 19]

$$F=\begin{pmatrix}\beta\times\sin\theta & \beta\times\cos\theta\\ \beta\times\cos\theta & -\beta\times\sin\theta\end{pmatrix}\quad\text{Equation (19)}$$

Alternatively

[Math. 20]

$$F=\begin{pmatrix}\sin\theta & \cos\theta\\ \cos\theta & -\sin\theta\end{pmatrix}\quad\text{Equation (20)}$$

Note that in Equation (13), Equation (15), Equation (17), and Equation (19), β may be an actual number and may be an imaginary number. However, β is not 0 (zero).

Alternatively

[Math. 21]

$$F(i)=\begin{pmatrix}\beta\times e^{j\theta_{11}(i)} & \beta\times\alpha\times e^{j(\theta_{11}(i)+\lambda)}\\ \beta\times\alpha\times e^{j\theta_{21}(i)} & \beta\times e^{j(\theta_{21}(i)+\lambda+\pi)}\end{pmatrix}\quad\text{Equation (21)}$$

Alternatively

[Math. 22]

$$F(i)=\frac{1}{\sqrt{\alpha^2+1}}\begin{pmatrix}e^{j\theta_{11}(i)} & \alpha\times e^{j(\theta_{11}(i)+\lambda)}\\ \alpha\times e^{j\theta_{21}(i)} & e^{j(\theta_{21}(i)+\lambda+\pi)}\end{pmatrix}\quad\text{Equation (22)}$$

Alternatively

[Math. 23]

$$F(i)=\begin{pmatrix}\beta\times\alpha\times e^{j\theta_{21}(i)} & \beta\times e^{j(\theta_{21}(i)+\lambda+\pi)}\\ \beta\times e^{j\theta_{11}(i)} & \beta\times\alpha\times e^{j(\theta_{11}(i)+\lambda)}\end{pmatrix}\quad\text{Equation (23)}$$

Alternatively

[MATH. 24]

$$F(i)=\frac{1}{\sqrt{\alpha^2+1}}\begin{pmatrix}\alpha\times e^{j\theta_{21}(i)} & e^{j(\theta_{21}(i)+\lambda+\pi)}\\ e^{j\theta_{11}(i)} & \alpha\times e^{j(\theta_{11}(i)+\lambda)}\end{pmatrix}\quad\text{Equation (24)}$$

Alternatively

[MATH. 25]

$$F(i)=\begin{pmatrix}\beta\times e^{j\theta_{11}} & \beta\times\alpha\times e^{j(\theta_{11}+\lambda(i))}\\ \beta\times\alpha\times e^{j\theta_{21}} & \beta\times e^{j(\theta_{21}+\lambda(i)+\pi)}\end{pmatrix}\quad\text{Equation (25)}$$

Alternatively

[MATH. 26]

$$F(i)=\frac{1}{\sqrt{\alpha^2+1}}\begin{pmatrix}e^{j\theta_{11}} & \alpha\times e^{j(\theta_{11}+\lambda(i))}\\ \alpha\times e^{j\theta_{21}} & e^{j(\theta_{21}+\lambda(i)+\pi)}\end{pmatrix}\quad\text{Equation (26)}$$

Alternatively

[MATH. 27]

$$F(i)=\begin{pmatrix}\beta\times\alpha\times e^{j\theta_{21}} & \beta\times e^{j(\theta_{21}+\lambda(i)+\pi)}\\ \beta\times e^{j\theta_{11}} & \beta\times\alpha\times e^{j(\theta_{11}+\lambda(i))}\end{pmatrix}\quad\text{Equation (27)}$$

Alternatively

[MATH. 28]

$$F(i)=\frac{1}{\sqrt{\alpha^2+1}}\begin{pmatrix}\alpha\times e^{j\theta_{21}} & e^{j(\theta_{21}+\lambda(i)+\pi)}\\ e^{j\theta_{11}} & \alpha\times e^{j(\theta_{11}+\lambda(i))}\end{pmatrix}\quad\text{Equation (28)}$$

Alternatively

[MATH. 29]

$$F=\begin{pmatrix}\beta\times e^{j\theta_{11}} & \beta\times\alpha\times e^{j(\theta_{11}+\lambda)}\\ \beta\times\alpha\times e^{j\theta_{21}} & \beta\times e^{j(\theta_{21}+\lambda+\pi)}\end{pmatrix}\quad\text{Equation (29)}$$

Alternatively

[MATH. 30]

$$F=\frac{1}{\sqrt{\alpha^2+1}}\begin{pmatrix}e^{j\theta_{11}} & \alpha\times e^{j(\theta_{11}+\lambda)}\\ \alpha\times e^{j\theta_{21}} & e^{j(\theta_{21}+\lambda+\pi)}\end{pmatrix}\quad\text{Equation (30)}$$

Alternatively

[MATH. 31]

$$F=\begin{pmatrix}\beta\times\alpha\times e^{j\theta_{21}} & \beta\times e^{j(\theta_{21}+\lambda+\pi)}\\ \beta\times e^{j\theta_{11}} & \beta\times\alpha\times e^{j(\theta_{11}+\lambda)}\end{pmatrix}\quad\text{Equation (31)}$$

Alternatively

[MATH. 32]

$$F=\frac{1}{\sqrt{\alpha^2+1}}\begin{pmatrix}\alpha\times e^{j\theta_{21}} & e^{j(\theta_{21}+\lambda+\pi)}\\ e^{j\theta_{11}} & \alpha\times e^{j(\theta_{11}+\lambda)}\end{pmatrix}\quad\text{Equation (32)}$$

However, $\theta_{11}(i)$, $\theta_{21}(i)$, and $\lambda(i)$ are functions of symbol number i, λ is a fixed value, α may be an actual number and may be an imaginary number, and β may be an actual number and may be an imaginary number. However, α is not 0 (zero). β is also not 0 (zero).

Moreover, each exemplary embodiment herein can also be carried out by using a precoding matrix other than these matrices.

Alternatively

[MATH. 33]

$$F(i)=\begin{pmatrix}1 & 0\\ 0 & 1\end{pmatrix}\quad\text{Equation (33)}$$

Alternatively

[MATH. 34]

$$F(i)=\begin{pmatrix}\beta & 0\\ 0 & \beta\end{pmatrix}\quad\text{Equation (34)}$$

Alternatively

[MATH. 35]

$$F(i)=\begin{pmatrix}1 & 0\\ 0 & -1\end{pmatrix}\quad\text{Equation (35)}$$

Alternatively

[MATH. 36]

$$F(i)=\begin{pmatrix}\beta & 0\\ 0 & -\beta\end{pmatrix}\quad\text{Equation (36)}$$

Note that in Equation (34) and Equation (36), β may be an actual number, and may be an imaginary number. However, β is not 0 (zero).

Next, a "transmission method including performing precoding and phase change" and "transmission method including performing precoding (no phase change)" different from the examples described above will be described.

Figure 3:
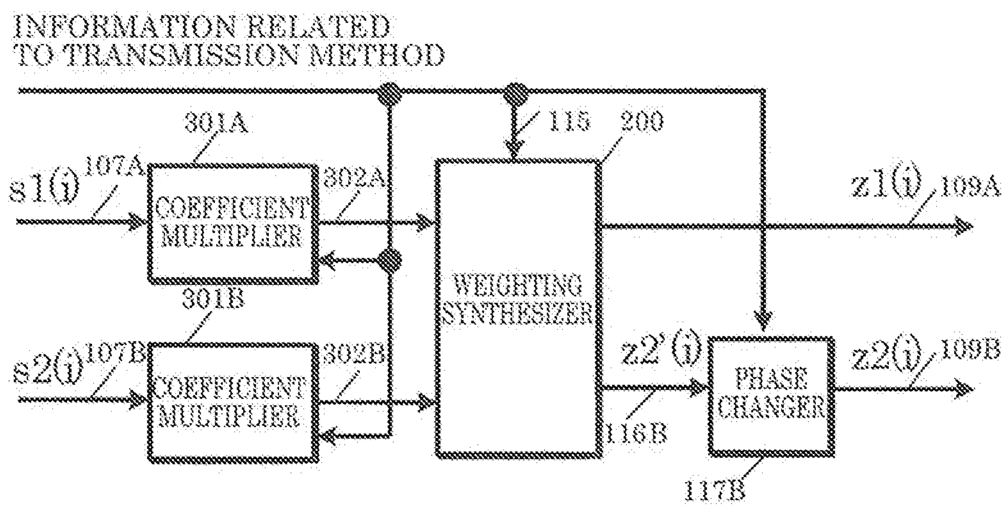
FIG. 3 illustrates an example of a configuration of relevant components including precoding and phase change processing.

Transmission Method Including Performing Precoding and Phase Change:

FIG. 3 illustrates one example of a configuration of relative units pertaining to processes of precoding and phase change. In FIG. 3, operations that are the same as in FIG. 1 and FIG. 2 share like reference marks. FIG. 3 differs from FIG. 2 in that coefficient multiplier 301A and coefficient multiplier 301B are added. Note that descriptions of configurations given above will be omitted.

Coefficient multiplier 301A and coefficient multiplier 301B perform coefficient multiplication on input signals, and output signals. The coefficient to be multiplied is variable in accordance with information 115 related to the transmission method. Here, z1(*i*) and z2(*i*) are expressed with the following equation.

[MATH. 37]

$$\begin{pmatrix}z1(i)\\ z2(i)\end{pmatrix}=\begin{pmatrix}1 & 0\\ 0 & y(i)\end{pmatrix}\begin{pmatrix}a & b\\ c & d\end{pmatrix}\begin{pmatrix}e & 0\\ 0 & f\end{pmatrix}\begin{pmatrix}s1(i)\\ s2(i)\end{pmatrix}=\begin{pmatrix}1 & 0\\ 0 & e^{j\times\delta(i)}\end{pmatrix}\begin{pmatrix}a & b\\ c & d\end{pmatrix}\begin{pmatrix}e & 0\\ 0 & f\end{pmatrix}\begin{pmatrix}s1(i)\\ s2(i)\end{pmatrix}=\begin{pmatrix}1 & 0\\ 0 & e^{j\times\delta(i)}\end{pmatrix}F\begin{pmatrix}e & 0\\ 0 & f\end{pmatrix}\begin{pmatrix}s1(i)\\ s2(i)\end{pmatrix}\quad\text{Equation (37)}$$

Note that e and f can be defined as complex numbers, and may be complex numbers and may be actual numbers. Moreover, "e, f" is variable in accordance with information 115 related to the transmission method. Matrices such as those in Equation (5) and Equation (36) are conceivable for precoding matrix F. However, precoding matrix F is not limited to these examples. Moreover, in Equation (37), the phase change value is not limited to the value used in Equation (2); for example, a method in which the phase is changed periodically or regularly is conceivable. z1(*i*) and z2(*i*) are transmitted from the transmission device at the same time and using the same frequency.

Figure 4:
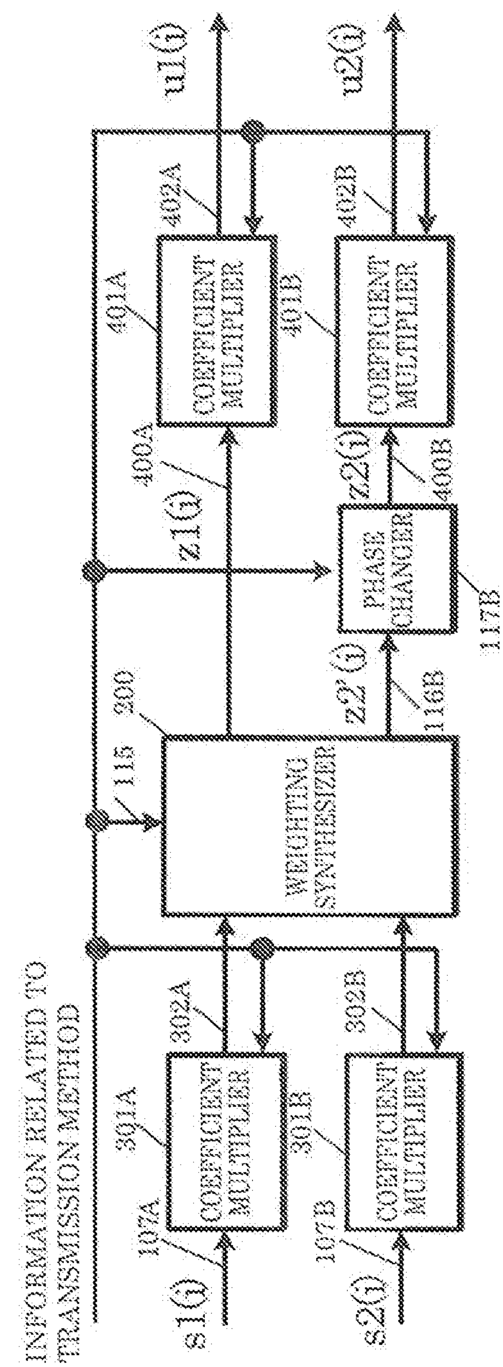
FIG. 4 illustrates an example of a configuration of relevant components including precoding and phase change processing.

FIG. 4 illustrates one example of a configuration of relative units pertaining to processes of precoding and phase change. In FIG. 4, operations that are the same as in FIG. 1, FIG. 2, and FIG. 3 share like reference marks. FIG. 4 differs from FIG. 3 in that coefficient multiplier 401A and coefficient multiplier 401B are added. Note that descriptions of configurations given above will be omitted.

Coefficient multiplier 401A and coefficient multiplier 401B perform coefficient multiplication on input signals, and output signals. The coefficient to be multiplied is variable in accordance with information 115 related to the transmission method. When signal 402A is expressed as u1(*i*) and signal 402B is expressed as u2(*i*), as in FIG. 4, u1(*i*) and u2(*i*) are expressed as shown in the following equation.

[MATH. 38]

$$\begin{pmatrix}u1(i)\\ u2(i)\end{pmatrix}=\begin{pmatrix}g & 0\\ 0 & h\end{pmatrix}\begin{pmatrix}1 & 0\\ 0 & y(i)\end{pmatrix}\begin{pmatrix}a & b\\ c & d\end{pmatrix}\begin{pmatrix}e & 0\\ 0 & f\end{pmatrix}\begin{pmatrix}s1(i)\\ s2(i)\end{pmatrix}=\begin{pmatrix}g & 0\\ 0 & h\end{pmatrix}\begin{pmatrix}1 & 0\\ 0 & e^{j\times\delta(i)}\end{pmatrix}\begin{pmatrix}a & b\\ c & d\end{pmatrix}\begin{pmatrix}e & 0\\ 0 & f\end{pmatrix}\begin{pmatrix}s1(i)\\ s2(i)\end{pmatrix}=\begin{pmatrix}g & 0\\ 0 & h\end{pmatrix}\begin{pmatrix}1 & 0\\ 0 & e^{j\times\delta(i)}\end{pmatrix}F\begin{pmatrix}e & 0\\ 0 & f\end{pmatrix}\begin{pmatrix}s1(i)\\ s2(i)\end{pmatrix}\quad\text{Equation (38)}$$

Note that g and h can be defined as complex numbers, and may be complex numbers and may be actual numbers. Moreover, "g, h" is variable in accordance with information 115 related to the transmission method. Matrices such as those in Equation (5) and Equation (36) are conceivable for precoding matrix F. However, precoding matrix F is not limited to these examples. Moreover, in Equation (38), the phase change value is not limited to the value used in Equation (2); for example, a method in which the phase is changed periodically or regularly is conceivable. u1($i$) and u2($i$) are transmitted from the transmission device at the same time and using the same frequency.

Signal u1($i$)402A is input into radio unit 110A illustrated in FIG. 1, and signal u2($i$)402B is input into radio unit 110B illustrated in FIG. 1, and subsequent processing is performed. Note that in FIG. 4, the order of phase changer 117B and coefficient multiplier 401B may be reversed, whereby coefficient multiplication may be performed first, and phase change may be performed subsequently.

Figure 5:
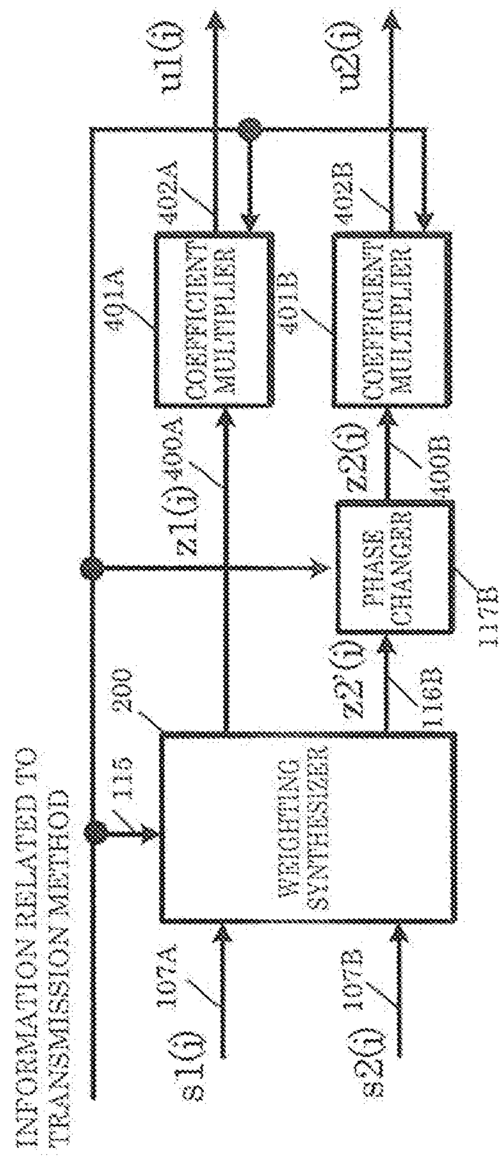
FIG. 5 illustrates an example of a configuration of relevant components including precoding and phase change processing.

FIG. 5 illustrates one example of a configuration of relative units pertaining to processes of precoding and phase change. In FIG. 5, operations that are the same as in FIG. 1, FIG. 2, and FIG. 4 share like reference marks. FIG. 5 differs from FIG. 4 in that coefficient multiplier 301A and coefficient multiplier 301B in FIG. 4 are omitted. Accordingly, signal u1($i$)402A and signal u2($i$)402B in FIG. 5 are expressed with the following equation.

[MATH. 39]

$$\begin{aligned}\begin{pmatrix}u1(i)\\u2(i)\end{pmatrix}&=\begin{pmatrix}g&0\\0&h\end{pmatrix}\begin{pmatrix}1&0\\0&y(i)\end{pmatrix}\begin{pmatrix}a&b\\c&d\end{pmatrix}\begin{pmatrix}s1(i)\\s2(i)\end{pmatrix}\\&=\begin{pmatrix}g&0\\0&h\end{pmatrix}\begin{pmatrix}1&0\\0&e^{j\times\delta(i)}\end{pmatrix}\begin{pmatrix}a&b\\c&d\end{pmatrix}\begin{pmatrix}s1(i)\\s2(i)\end{pmatrix}\\&=\begin{pmatrix}g&0\\0&h\end{pmatrix}\begin{pmatrix}1&0\\0&e^{j\times\delta(i)}\end{pmatrix}F\begin{pmatrix}s1(i)\\s2(i)\end{pmatrix}\end{aligned}\qquad\text{Equation (39)}$$

Note that g and h can be defined as complex numbers, and may be complex numbers and may be actual numbers. Moreover, "g, h" is variable in accordance with information 115 related to the transmission method. Matrices such as those in Equation (5) and Equation (36) are conceivable for precoding matrix F. However, precoding matrix F is not limited to these examples. For example, a method in which the phase is changed periodically or regularly is conceivable. u1($i$) and u2($i$) are transmitted from the transmission device at the same time and using the same frequency.

signal u1($i$)402A is input into radio unit 110A illustrated in FIG. 1, and signal u2($i$)402B is input into radio unit 110B illustrated in FIG. 1, and subsequent processing is performed. Note that in FIG. 4, the order of phase changer 117B and coefficient multiplier 401B may be reversed, whereby coefficient multiplication may be performed first, and phase change may be performed subsequently.

Transmission Method Including Performing Precoding (No Phase Change):

When phase change is not performed in the case of the configuration illustrated in FIG. 3, z1($i$) and z2($i$) are expressed with the following equation.

[MATH. 40]

$$\begin{aligned}\begin{pmatrix}z1(i)\\z2(i)\end{pmatrix}&=\begin{pmatrix}a&b\\c&d\end{pmatrix}\begin{pmatrix}e&0\\0&f\end{pmatrix}\begin{pmatrix}s1(i)\\s2(i)\end{pmatrix}\qquad\text{Equation (40)}\end{aligned}$$

-continued $$=F\begin{pmatrix}e&0\\0&f\end{pmatrix}\begin{pmatrix}s1(i)\\s2(i)\end{pmatrix}$$

Here, z1($i$) and z2($i$) are transmitted from the transmission device at the same time and using the same frequency.

When phase change is not performed in the case of the configuration illustrated in FIG. 4, u1($i$) and u2($i$) are expressed with the following equation.

[MATH. 41]

$$\begin{aligned}\begin{pmatrix}u1(i)\\u2(i)\end{pmatrix}&=\begin{pmatrix}g&0\\0&h\end{pmatrix}\begin{pmatrix}a&b\\c&d\end{pmatrix}\begin{pmatrix}e&0\\0&f\end{pmatrix}\begin{pmatrix}s1(i)\\s2(i)\end{pmatrix}\\&=\begin{pmatrix}g&0\\0&h\end{pmatrix}F\begin{pmatrix}e&0\\0&f\end{pmatrix}\begin{pmatrix}s1(i)\\s2(i)\end{pmatrix}\end{aligned}\qquad\text{Equation (41)}$$

Here, u1($i$) and u2($i$) are transmitted from the transmission device at the same time and using the same frequency.

When phase change is not performed in the case of the configuration illustrated in FIG. 5, u1($i$) and u2($i$) are expressed with the following equation.

[MATH. 42]

$$\begin{aligned}\begin{pmatrix}u1(i)\\u2(i)\end{pmatrix}&=\begin{pmatrix}g&0\\0&h\end{pmatrix}\begin{pmatrix}a&b\\c&d\end{pmatrix}\begin{pmatrix}s1(i)\\s2(i)\end{pmatrix}\\&=\begin{pmatrix}g&0\\0&h\end{pmatrix}F\begin{pmatrix}s1(i)\\s2(i)\end{pmatrix}\end{aligned}\qquad\text{Equation (42)}$$

Here, u1($i$) and u2($i$) are transmitted from the transmission device at the same time and using the same frequency.

Matrices such as those in Equation (5) and Equation (36) are conceivable for precoding matrix F in Equation (40), Equation (41), and Equation (42). However, precoding matrix F is not limited to these examples.

Note that when the MIMO method is used, precoding matrix F may be switched on a frame by frame basis, and alternatively may not be switched. Moreover, when switching the modulation method set for stream 1($s$1($i$)) and stream 2($s$2($i$)), precoding matrix F may be switched, and alternatively may be not be switched. Moreover, switching of precoding matrix F may be performed based on feedback information from a communication partner, and alternatively switching may be not be performed.

Figure 6:
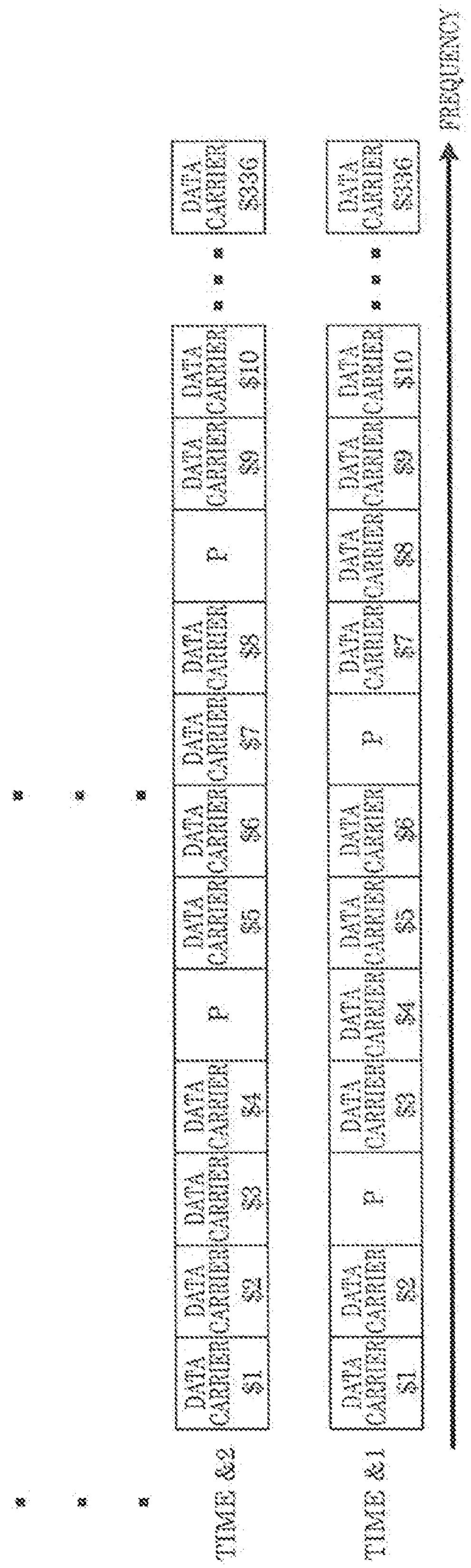
FIG. 6 illustrates an example of a frame configuration of a modulated signal.

Next, for example, one example of a frame configuration of a modulated signal transmitted by the transmission device illustrated in FIG. 1 when a multi-carrier transmission method such as OFDM is used is illustrated in FIG. 6.

FIG. 6 illustrates an example of an arrangement of symbols along the horizontal frequency axis, and illustrates a symbol arrangement for two modulated signals transmitted from an antenna different than shown above. For example, FIG. 6 illustrates a configuration example of data carriers (data symbols) and pilot symbols (reference symbols) (indicated as "P" in FIG. 6). Hereinafter, a pilot symbol has the same definition as a reference symbol.

Note that FIG. 6 is merely one example; other symbols may be present. Here, a data carrier is a symbol for transmitting data to a partner (communication partner) via MIMO transmission, and a pilot symbol is a symbol for a partner (communication partner) to estimate (channel estimation) propagation fluctuation.

In FIG. 6, as one example, the number of data carriers among the 1OFDM symbols (data carriers on the frequency axis) is 336. A pilot symbol may be inserted between two data carriers. Accordingly, at each point in time, data carrier $1 through data carrier $336 are present. Note that in FIG. 6, time &1 and time &2 differ in regard to pilot carrier insertion position along the frequency axis, but this configuration is not limiting.

In FIG. 6, data carriers are arranged along the frequency axis in the following order: "data carrier $1", "data carrier $2", "data carrier $3", "data carrier $4", "data carrier $5", "data carrier $6", "data carrier $7", "data carrier $8", "data carrier $9", "data carrier $10", "data carrier $11", "data carrier $12", "data carrier $13" . . . "data carrier $330", "data carrier $331", "data carrier $332", "data carrier $333", "data carrier $334", "data carrier $335", and "data carrier $336". In other words, data carriers are assigned with numbers in ascending order along the frequency axis.

Figure 7:
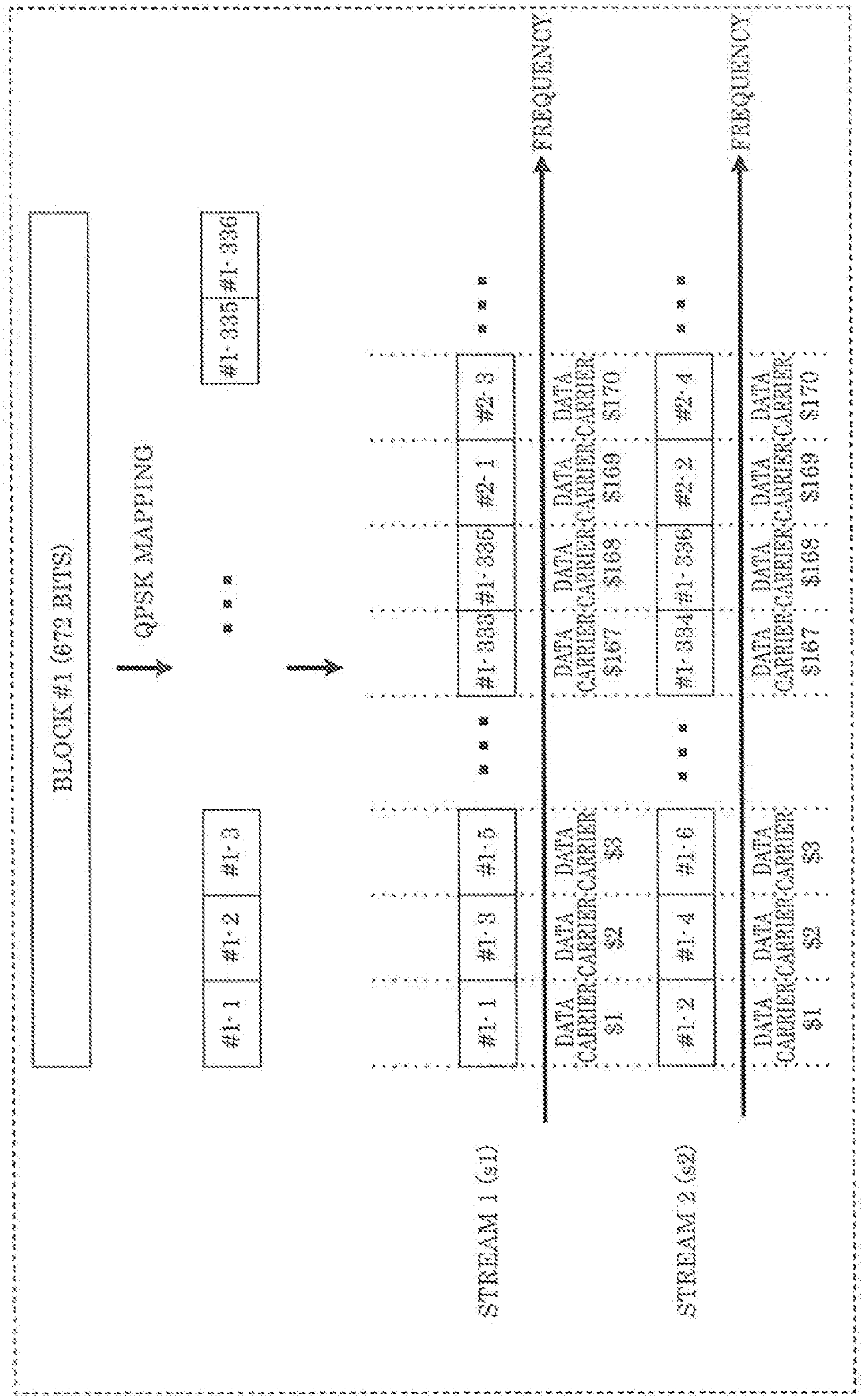
FIG. 7 illustrates an example of an arrangement of symbols in data carriers.

FIG. 7 illustrates an arrangement example of data carriers when the modulation method for stream 1(*s*1(*i*)) is Quadrature Phase Shift Keying (QPSK), which is an example of a modulation method in which there are 4 signal points in an in-phase I-orthogonal Q plane, and when the modulation method for stream 2(*s*2(*i*)) is QPSK. Here, as one example, the block length (code length) in the error correction code is 672 bits. A first block configured of 672 bits that are error correction encoded is referred to as block #1 and denoted as "#1". Accordingly, an N-th (N is an integer greater than or equal to 1) block configured of 672 bits that are error correction encoded is referred to as block #N and denoted as "#N". Note that hereinafter, a modulation method in which there are 4 signal points means a modulation method involving two-bit transmission per symbol.

When QPSK modulation is applied, 336 symbols are generated from block #N. In FIG. 7, the 336 symbols generated from block #1 are indicated as "#1-1", "#1-2", "#1-3", "#1-4" . . . "#1-334", "#1-335", and "#1-336". Accordingly, the 336 symbols generated from block #N are expressed as "#N-1", "#N-2", "#N-3", "#N-4" . . . "#N-334", "#N-335", and "#N-336".

Moreover, in FIG. 7, the data carriers are illustrated arranged along the horizontal frequency axis. In stream 1, data carriers from data carrier $1 to data carrier $336 are present, and similarly, in stream 2(*s*2(*i*)), data carriers from data carrier $1 to data carrier $336 are present.

Data carrier $1 in stream 1 and data carrier $1 in stream 2(*s*2(*i*)) are transmitted from different antennas at the same frequency and at the same time, and data carrier $2 in stream 1 and data carrier $2 in stream 2(*s*2(*i*)) are transmitted from different antennas at the same frequency and at the same time. In other words, data carrier $L in stream 1 and data carrier $L in stream 2(*s*2(*i*)) are transmitted from different antennas at the same frequency and at the same time. L is an integer that is greater than or equal to 1 and less than or equal to 336.

As illustrated in FIG. 7, each data carrier in each stream is assigned with a symbol.

Data carrier $1 in stream 1 is assigned with the symbol "#1-1", data carrier $1 in stream 2 is assigned with the symbol "#1-2", data carrier $2 in stream 1 is assigned with the symbol "#1-3", data carrier $2 in stream 2 is assigned with the symbol "#1-4", data carrier $3 in stream 1 is assigned with the symbol "#1-5", and data carrier $3 in stream 2 is assigned with the symbol "#1-6". The symbols are assigned in accordance with such a rule. Accordingly, the data in block #1 is transmitted from the transmission device using data carrier $1 through $167 in stream 1 and data carrier $1 through $167 in stream 2(*s*2(*i*)).

In accordance with the same rule, the data in block #2 is transmitted from the transmission device using data carrier $169 through $336 in stream 1 and data carrier $169 through $336 in stream 2(*s*2(*i*)).

This is how the symbols are arranged for time &1. Similarly, when the symbols are arranged, at time &2, the symbols are arranged as follows.

The data in block #3 is transmitted from the transmission device using data carrier $1 through $167 in stream 1 and data carrier $1 through $167 in stream 2(*s*2(*i*)).

The data in block #4 is transmitted from the transmission device using data carrier $169 through $336 in stream 1 and data carrier $169 through $336 in stream 2(*s*2(*i*)).

Accordingly, at time &M, the symbols are arranged as follows. M is an integer that is greater than or equal to 1.

The data in block #(2M-1) is transmitted from the transmission device using data carrier $1 through $167 in stream 1(*s*1(*i*)) and data carrier $1 through $167 in stream 2(*s*2(*i*)).

The data in block #(2M) is transmitted from the transmission device using data carrier $169 through $336 in stream 1(*s*1(*i*)) and data carrier $169 through $336 in stream 2(*s*2(*i*)).

Next, consider a case in which the transmission device transmits modulated signals using a frame configuration such as illustrated in FIG. 7. A conceptual illustration of the reception field intensity in a reception device, which is the communication partner of the transmission device illustrated in FIG. 1, is provided in FIG. 8.

Figure 8:
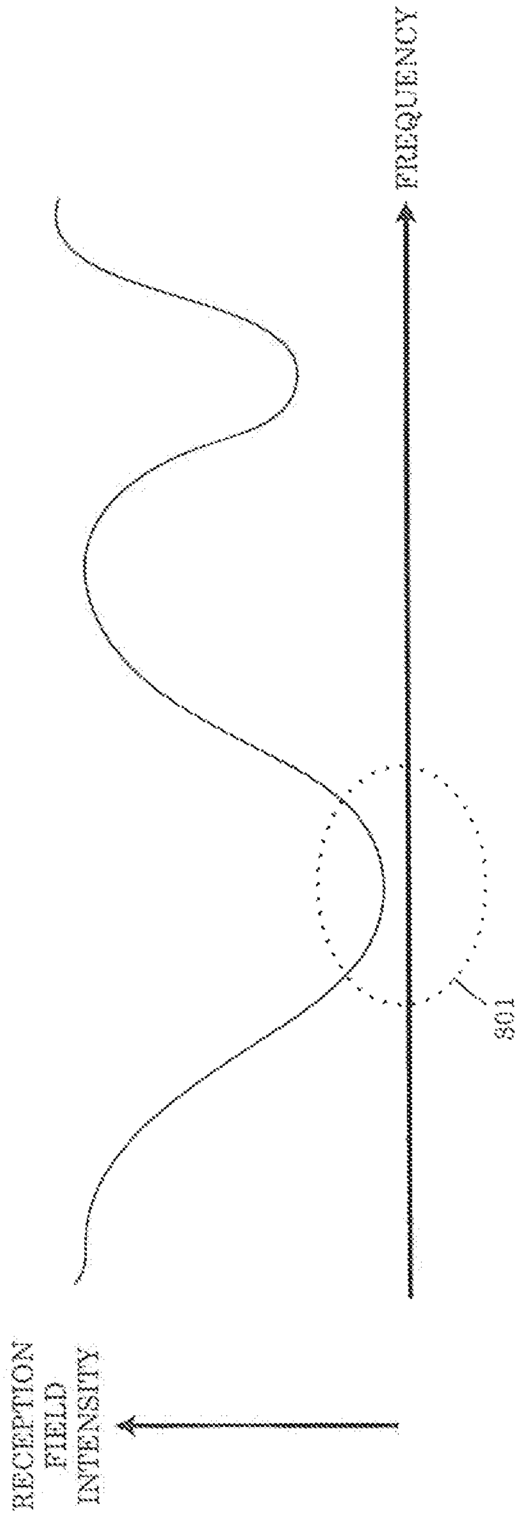
FIG. 8 illustrates a conceptual depiction of a reception field intensity in a reception device.

In FIG. 8, frequency is represented on the horizontal axis and reception field intensity is represented on the vertical axis. Here, as a side effect of multi-path, low portion 801 of the reception field intensity is present. When the transmission device transmits a modulated signal using a frame configuration such as illustrated in FIG. 7, as a side effect of multi-path (low portion 801 of the reception field intensity illustrated in FIG. 8), it is likely that this will cause a phenomenon in which low reception quality symbols are prevalent among the symbols in the same block in the error correction code. This makes it likely that data reception quality will decrease since high error correction performance cannot be achieved.

Figure 9:
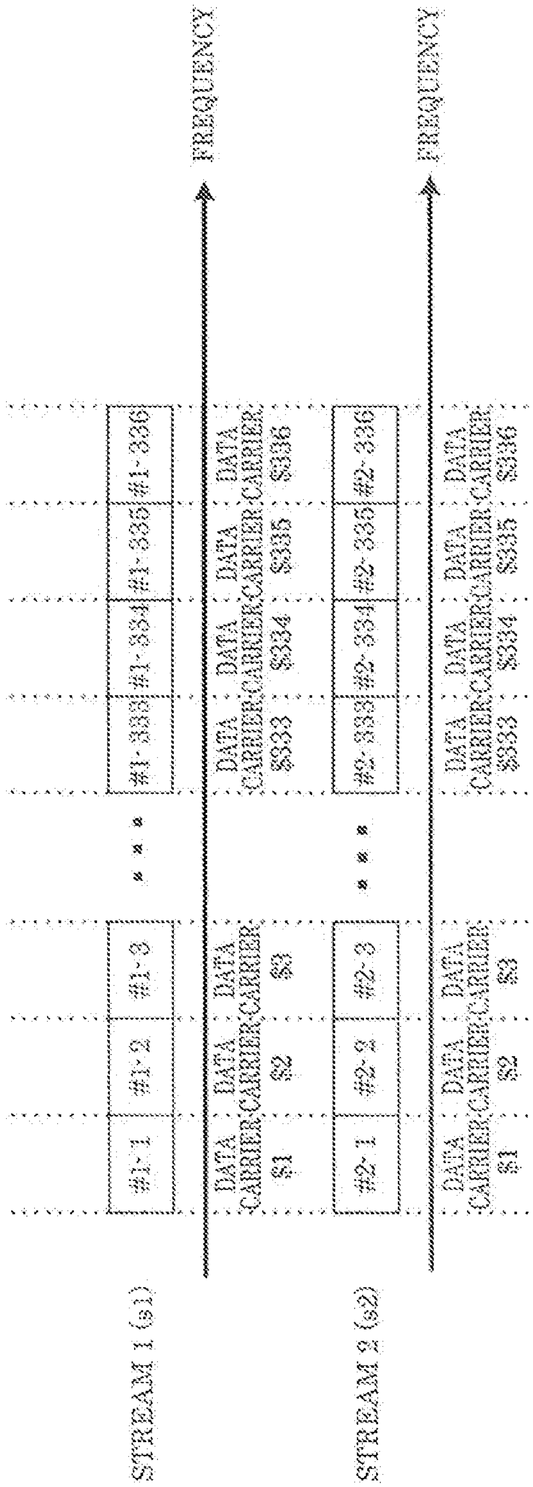
FIG. 9 illustrates an example of a frame configuration.

As another example, consider a frame configuration such as illustrated in FIG. 9. As illustrated in FIG. 9, each data carrier in each stream is assigned with a symbol.

Data carrier $1 in stream 1 is assigned with the symbol "#1-1", data carrier $1 in stream 2 is assigned with the symbol "#2-1", data carrier $2 in stream 1 is assigned with the symbol "#1-2", data carrier $2 in stream 2 is assigned with the symbol "#2-2", data carrier $3 in stream 1 is assigned with the symbol "#1-3", data carrier $3 in stream 2 is assigned with the symbol "#2-3", (recitation for data carrier $4 through data carrier $332 is omitted), data carrier $333 in stream 1 is assigned with the symbol "#1-333", data carrier $333 in stream 2 is assigned with the symbol "#2-333", data carrier $334 in stream 1 is assigned with the symbol "#1-334", data carrier $334 in stream 2 is assigned with the symbol "#2-334", data carrier $335 in stream 1 is assigned with the symbol "#1-335", data carrier $335 in stream 2 is assigned with the symbol "#2-335", data carrier $336 in stream 1 is assigned with the symbol "#1-336", and data carrier $336 in stream 2 is assigned with the symbol "#2-336".

This is how the symbols are arranged for time &1. Accordingly, symbols for odd number data carriers transmit block #1 data, and symbols for even number data carriers transmit block #2 data.

At time &2, the symbols are arranged as follows.

Stream 1 transmits block #3 data and stream 2(s2(i)) transmits block #4 data.

Accordingly, at time &M, the symbols are arranged as follows. M is an integer that is greater than or equal to 1.

Stream 1(s1(i)) transmits block #(2M-1) data and stream 2(s2(i)) transmits block #(2M) data.

In the case of a frame configuration such as illustrated in FIG. 9, there is a low chance of the phenomenon described in regard to FIG. 8 occurring.

Consider a case in which the precoding matrix is expressed as illustrated in Equation (4), [1] "b is zero and c is zero" or [2] "a is zero and d is zero" or [3] "an absolute value of b and an absolute value of c are extremely lower than an absolute value of a and an absolute value of d", [4] "an absolute value of a and an absolute value of d are extremely lower than an absolute value of b and an absolute value of c". In such a case, when the reception field intensity of stream 1(s1(i)) of the communication partner decreases, or when the reception field intensity of stream 2(s2(i)) of the communication partner decreases, for example, it is likely that a phenomenon in which, at time &1, the reception quality of block #1 or the reception quality of block #2 decreases will occur.

Figure 10:
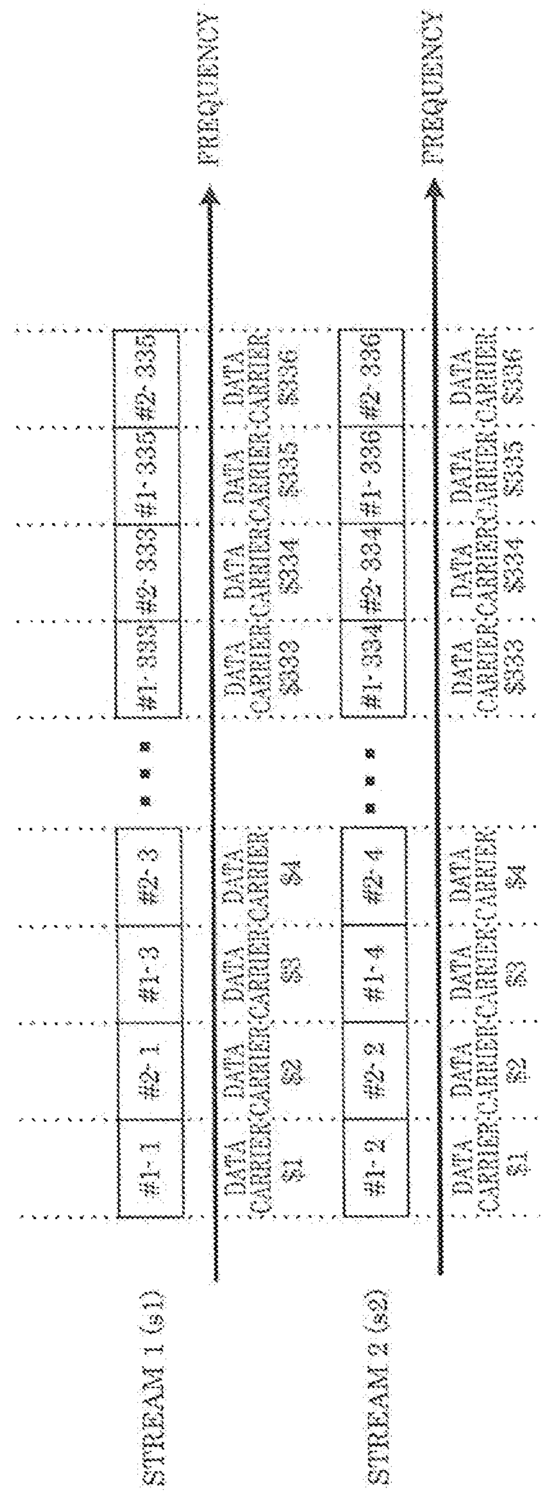
FIG. 10 illustrates an example of a frame configuration.

In order to facilitate understanding of the phenomenon described with reference to FIG. 8 and the phenomenon resulting from a frame configuration such as illustrated in FIG. 9, consider, for example, a frame configuration such as illustrated in FIG. 10. As illustrated in FIG. 10, each data carrier in each stream is assigned with a symbol.

Data carrier $1 in stream 1 is assigned with the symbol "#1-1", data carrier $1 in stream 2 is assigned with the symbol "#1-2", data carrier $2 in stream 1 is assigned with the symbol "#2-1", data carrier $2 in stream 2 is assigned with the symbol "#2-2", data carrier $3 in stream 1 is assigned with the symbol "#1-3", data carrier $3 in stream 2 is assigned with the symbol "#1-4", data carrier $4 in stream 1 is assigned with the symbol "#2-3", data carrier $4 in stream 2 is assigned with the symbol "#2-4", (recitation for data carrier $5 through data carrier $332 is omitted), data carrier $333 in stream 1 is assigned with the symbol "#1-333", data carrier $333 in stream 2 is assigned with the symbol "#1-334", data carrier $334 in stream 1 is assigned with the symbol "#2-333", data carrier $334 in stream 2 is assigned with the symbol "#2-334", data carrier $335 in stream 1 is assigned with the symbol "#1-335", data carrier $335 in stream 2 is assigned with the symbol "#1-336", data carrier $336 in stream 1 is assigned with the symbol "#2-335", and data carrier $336 in stream 2 is assigned with the symbol "#2-336".

This is how the symbols are arranged for time &1. Accordingly, symbols for odd number data carriers transmit block #1 data, and symbols for even number data carriers transmit block #2 data.

At time &2, the symbols are arranged as follows.

Symbols for odd number data carriers transmit block #3 data, and symbols for even number data carriers transmit block #4 data.

Accordingly, at time &M, the symbols are arranged as follows. M is an integer that is greater than or equal to 1.

Symbols for odd number data carriers transmit block #(2M-1) data, and symbols for even number data carriers transmit block #(2M) data.

When the transmission device transmits modulated signals using a frame configuration such as illustrated in FIG. 10, the negative effects caused by low portion 801 of the reception field intensity due to multi-path using FIG. 8 are not likely to be an influence in the case of the frame configuration illustrated in FIG. 7. Moreover, inhibiting a decrease in data reception quality such as described with reference to FIG. 9 is likely. Accordingly, achieving an advantageous effect of an increase in data reception quality is likely.

Figure 11:
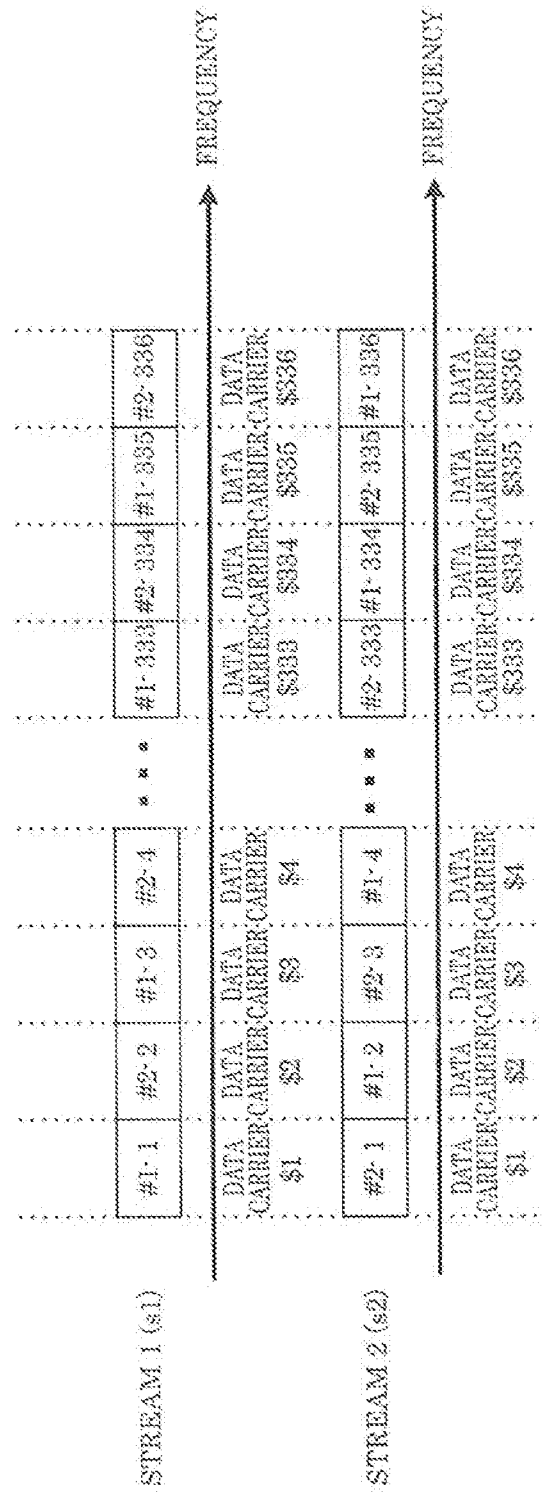
FIG. 11 illustrates an example of a frame configuration.

In order to facilitate understanding of the phenomenon described with reference to FIG. 8 and the phenomenon resulting from a frame configuration such as illustrated in FIG. 9, consider, for example, a frame configuration such as illustrated in FIG. 11.

As illustrated in FIG. 11, each data carrier in each stream is assigned with a symbol.

Data carrier $1 in stream 1 is assigned with the symbol "#1-1", data carrier $1 in stream 2 is assigned with the symbol "#2-1", data carrier $2 in stream 1 is assigned with the symbol "#2-2", data carrier $2 in stream 2 is assigned with the symbol "#1-2", data carrier $3 in stream 1 is assigned with the symbol "#1-3", data carrier $3 in stream 2 is assigned with the symbol "#2-3", data carrier $4 in stream 1 is assigned with the symbol "#2-4", data carrier $4 in stream 2 is assigned with the symbol "#1-4", (recitation for data carrier $5 through data carrier $332 is omitted), data carrier $333 in stream 1 is assigned with the symbol "#1-333", data carrier $333 in stream 2 is assigned with the symbol "#2-333", data carrier $334 in stream 1 is assigned with the symbol "#2-334", data carrier $334 in stream 2 is assigned with the symbol "#1-334", data carrier $335 in stream 1 is assigned with the symbol "#1-335", data carrier $335 in stream 2 is assigned with the symbol "#2-335", data carrier $336 in stream 1 is assigned with the symbol "#2-336", and data carrier $336 in stream 2 is assigned with the symbol "#1-336".

This is how the symbols are arranged for time &1. Accordingly, symbols for odd number data carriers and stream 1 transmit block #1 data.

Symbols for odd number data carriers and stream 2 transmit block #2 data.

Symbols for even number data carriers and stream 1 transmit block #2 data.

Symbols for even number data carriers and stream 2 transmit block #1 data.

At time &2, the symbols are arranged as follows.

Symbols for odd number data carriers and stream 1 transmit block #3 data.

Symbols for odd number data carriers and stream 2 transmit block #4 data.

Symbols for even number data carriers and stream 1 transmit block #4 data.

Symbols for even number data carriers and stream 2 transmit block #3 data.

Accordingly, at time &M, the symbols are arranged as follows. M is an integer that is greater than or equal to 1.

Symbols for odd number data carriers and stream 1 transmit block #(2M-1) data.

Symbols for odd number data carriers and stream 2 transmit block #(2M) data.

Symbols for even number data carriers and stream 1 transmit block #(2M) data.

Symbols for even number data carriers and stream 2 transmit block #(2M-1) data.

When the transmission device transmits modulated signals using a frame configuration such as illustrated in FIG. 11, the negative effects caused by low portion 801 of the reception field intensity due to multi-path using FIG. 8 are not likely to be an influence in the case of the frame configuration illustrated in FIG. 7. Moreover, inhibiting a decrease in data reception quality such as described with reference to FIG. 9 is likely. Accordingly, achieving an advantageous effect of an increase in data reception quality is likely.

Next, a configuration of data carriers when the modulation method for stream 1($s$1($i$)) and stream 2($s$2($i$)) is 16 Quadrature Amplitude Modulation (16QAM), which is an example of a modulation method in which there are 16 signal points in an in-phase I-orthogonal Q plane, will be described. Note that hereinafter, a modulation method in which there are 16 signal points in an in-phase I-orthogonal Q plane means a modulation method involving four-bit transmission per symbol.

Here, similar to FIG. 7, an N-th block configured of 672 bits that are error correction encoded is referred to as block #N and denoted as "#N".

Figure 12:
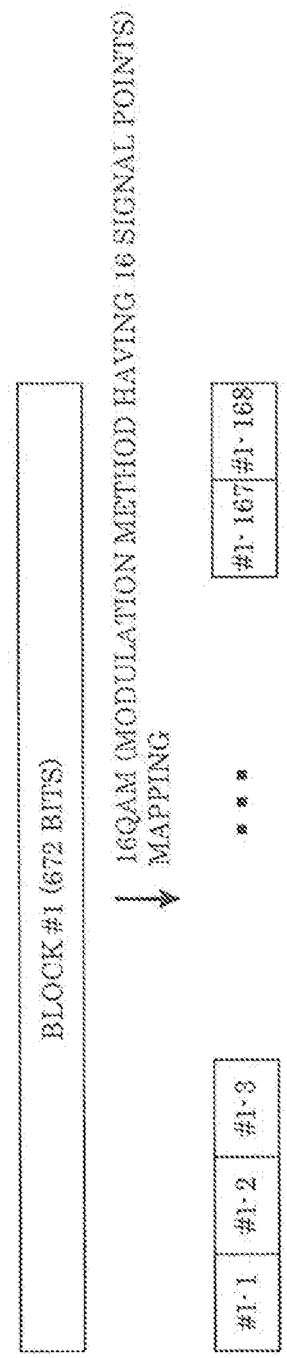
FIG. 12 illustrates an example of symbol generation.

When 16QAM modulation is applied, symbols from block #N through 168 are generated. In FIG. 12, the 168 symbols generated from block #1 are indicated as "#1-1", "#1-2", "#1-3", "#1-4" . . . "#1-166", "#1-167", and "#1-168". Accordingly, the 168 symbols generated from block #N are expressed as "#N-1", "#N-2", "#N-3", "#N-4" . . . "#N-166", "#N-167", and "#N-168".

Moreover, similar to FIG. 7, frequency is represented on the horizontal axis, and when the data carriers are arranged, in stream 1($s$1($i$)), data carrier $1 through data carrier $336 are present, and similarly, in stream 2, data carrier $1 through data carrier $336 are present.

Then, data carrier $1 in stream 1($s$1($i$)) and data carrier $1 in stream 2 are transmitted from different antennas at the same frequency and at the same time, and data carrier $2 in stream 1($s$1($i$)) and data carrier $2 in stream 2 are transmitted from different antennas at the same frequency and at the same time. In other words, data carrier $L in stream 1($s$1($i$)) and data carrier $L in stream 2 are transmitted from different antennas at the same frequency and at the same time. L is an integer that is greater than or equal to 1 and less than or equal to 336.

Figure 13:
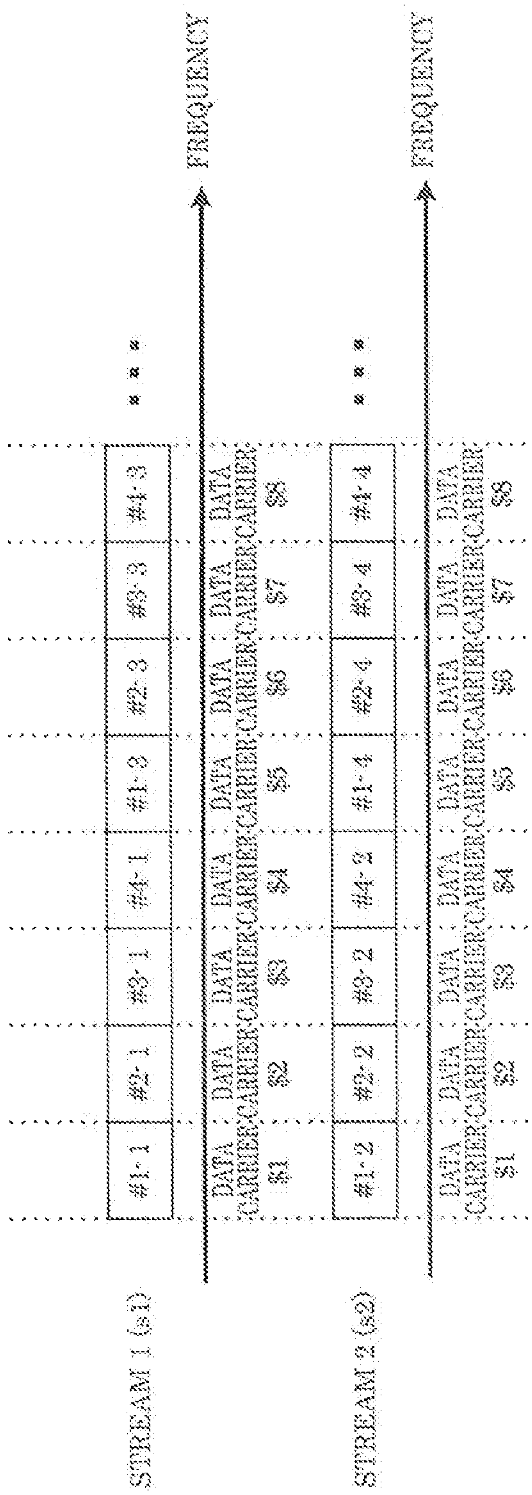
FIG. 13 illustrates an example of a frame configuration.

In order to facilitate understanding of the phenomenon described with reference to FIG. 8 and the phenomenon resulting from a frame configuration such as illustrated in FIG. 9, consider, for example, a frame configuration such as illustrated in FIG. 13.

As illustrated in FIG. 13, each data carrier in each stream is assigned with a symbol.

Data carrier $1 in stream 1 is assigned with the symbol "#1-1", data carrier $1 in stream 2 is assigned with the symbol "#1-2", data carrier $2 in stream 1 is assigned with the symbol "#2-1", data carrier $2 in stream 2 is assigned with the symbol "#2-2", data carrier $3 in stream 1 is assigned with the symbol "#3-1", data carrier $3 in stream 2 is assigned with the symbol "#3-2", data carrier $4 in stream 1 is assigned with the symbol "#4-1", data carrier $4 in stream 2 is assigned with the symbol "#4-2", data carrier $5 in stream 1 is assigned with the symbol "#1-3", data carrier $5 in stream 2 is assigned with the symbol "#1-4", data carrier $6 in stream 1 is assigned with the symbol "#2-3", data carrier $6 in stream 2 is assigned with the symbol "#2-4", data carrier $7 in stream 1 is assigned with the symbol "#3-3", data carrier $7 in stream 2 is assigned with the symbol "#3-4", data carrier $8 in stream 1 is assigned with the symbol "#4-3", data carrier $8 in stream 2 is assigned with the symbol "#4-4", (recitation for data carrier $9 through data carrier $332 is omitted), data carrier $333 in stream 1 is assigned with the symbol "#1-167", data carrier $333 in stream 2 is assigned with the symbol "#1-168", data carrier $334 in stream 1 is assigned with the symbol "#2-167", data carrier $334 in stream 2 is assigned with the symbol "#2-168", data carrier $335 in stream 1 is assigned with the symbol "#3-167", data carrier $335 in stream 2 is assigned with the symbol "#3-168", data carrier $336 in stream 1 is assigned with the symbol "#4-167", and data carrier $336 in stream 2 is assigned with the symbol "#4-168".

This is how the symbols are arranged for time &1. Accordingly, symbols having a remainder of 1 when the data carrier number is divided by 4 transmit block #1 data, symbols having a remainder of 2 when the data carrier number is divided by 4 transmit block #2 data, symbols having a remainder of 3 when the data carrier number is divided by 4 transmit block #3 data, and symbols having a remainder of 0 when the data carrier number is divided by 4 transmit block #4 data.

At time &2, the symbols are arranged as follows.

Symbols having a remainder of 1 when the data carrier number is divided by 4 transmit block #5 data, symbols having a remainder of 2 when the data carrier number is divided by 4 transmit block #6 data, symbols having a remainder of 3 when the data carrier number is divided by 4 transmit block #7 data, and symbols having a remainder of 0 when the data carrier number is divided by 4 transmit block #8 data.

Accordingly, at time &M, the symbols are arranged as follows. M is an integer that is greater than or equal to 1.

Symbols having a remainder of 1 when the data carrier number is divided by 4 transmit block #(4M-3) data, symbols having a remainder of 2 when the data carrier number is divided by 4 transmit block #(4M-2) data, symbols having a remainder of 3 when the data carrier number is divided by 4 transmit block #(4M-1) data, and symbols having a remainder of 0 when the data carrier number is divided by 4 transmit block #(4M) data.

When the transmission device transmits modulated signals using a frame configuration such as illustrated in FIG. 13, the negative effects caused by low portion 801 of the reception field intensity due to multi-path using FIG. 8 are not likely to be an influence. Moreover, inhibiting a decrease in data reception quality such as described with reference to FIG. 9 is likely. Accordingly, achieving an advantageous effect of an increase in data reception quality is likely.

Figure 14:
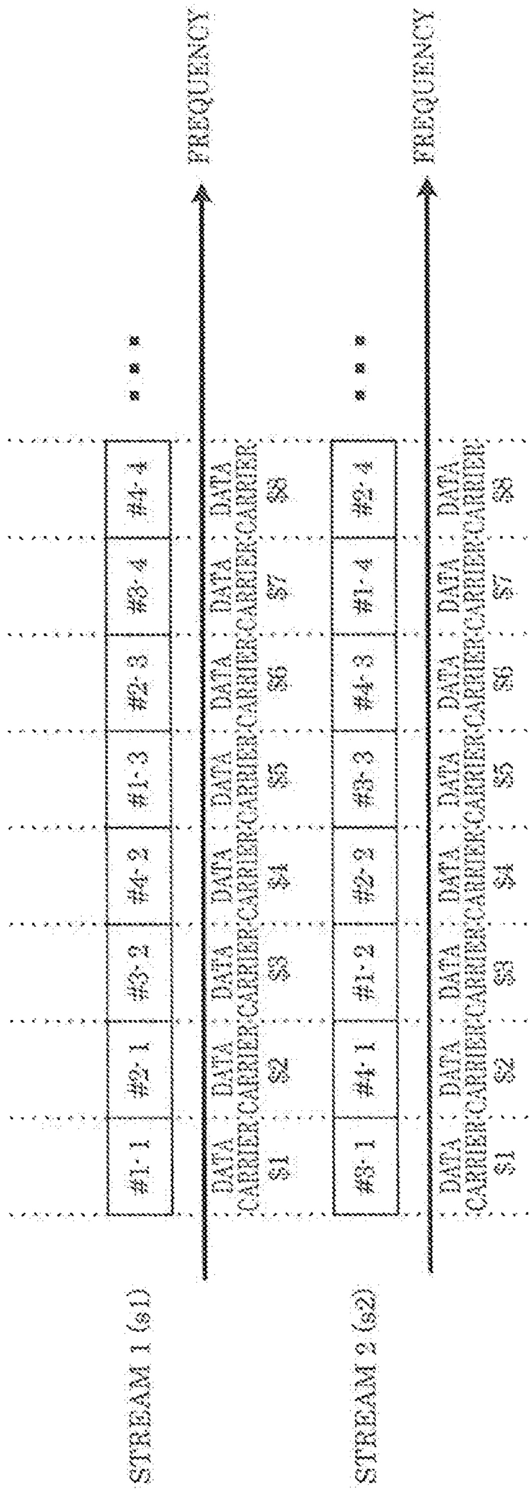
FIG. 14 illustrates an example of a frame configuration.

In order to facilitate understanding of the phenomenon described with reference to FIG. 8 and the phenomenon resulting from a frame configuration such as illustrated in FIG. 9, consider, for example, a frame configuration such as illustrated in FIG. 14.

As illustrated in FIG. 14, each data carrier in each stream is assigned with a symbol.

Data carrier $1 in stream 1 is assigned with the symbol "#1-1", data carrier $1 in stream 2 is assigned with the symbol "#3-1", data carrier $2 in stream 1 is assigned with the symbol "#2-1", data carrier $2 in stream 2 is assigned with the symbol "#4-1", data carrier $3 in stream 1 is assigned with the symbol "#3-2", data carrier $3 in stream 2 is assigned with the symbol "#1-2", data carrier $4 in stream 1 is assigned with the symbol "#4-2", data carrier $4 in stream 2 is assigned with the symbol "#2-2", data carrier $5 in stream 1 is assigned with the symbol "#1-3", data carrier $5 in stream 2 is assigned with the symbol "#3-3", data carrier $6 in stream 1 is assigned with the symbol "#2-3", data carrier $6 in stream 2 is assigned with the symbol "#4-3", data carrier $7 in stream 1 is assigned with the symbol "#3-4", data carrier $7 in stream 2 is assigned with the symbol "#1-4", data carrier $8 in stream 1 is assigned with the symbol "#4-4", data carrier $8 in stream 2 is assigned with the symbol "#2-4", (recitation for data carrier $9 through data carrier $332 is omitted), data carrier $333 in stream 1 is assigned with the symbol "#1-167", data carrier $333 in stream 2 is assigned with the symbol "#3-167", data carrier $334 in stream 1 is assigned with the symbol "#2-167", data carrier $334 in stream 2 is assigned with the symbol "#4-167", and data carrier $335 in stream 1 is assigned with the symbol "#3-168", data carrier $335 in stream 2 is assigned with the symbol "#1-168", data carrier $336 in stream 1 is assigned with the symbol "#4-168", and data carrier $336 in stream 2 is assigned with the symbol "#2-168".

This is how the symbols are arranged for time &1.

Accordingly, symbols in stream 1 having a remainder of 1 when the data carrier number is divided by 4 transmit block #1 data, symbols in stream 1 having a remainder of 2 when the data carrier number is divided by 4 transmit block #2 data, symbols in stream 1 having a remainder of 3 when the data carrier number is divided by 4 transmit block #3 data, and symbols in stream 1 having a remainder of 0 when the data carrier number is divided by 4 transmit block #4 data.

Also, symbols in stream 2 having a remainder of 1 when the data carrier number is divided by 4 transmit block #3 data, symbols in stream 2 having a remainder of 2 when the data carrier number is divided by 4 transmit block #4 data, symbols in stream 2 having a remainder of 3 when the data carrier number is divided by 4 transmit block #1 data, and symbols in stream 2 having a remainder of 0 when the data carrier number is divided by 4 transmit block #2 data.

At time &2, the symbols are arranged as follows.

Symbols in stream 1 having a remainder of 1 when the data carrier number is divided by 4 transmit block #5 data, symbols in stream 1 having a remainder of 2 when the data carrier number is divided by 4 transmit block #6 data, symbols in stream 1 having a remainder of 3 when the data carrier number is divided by 4 transmit block #7 data, and symbols in stream 1 having a remainder of 0 when the data carrier number is divided by 4 transmit block #8 data.

Also, symbols in stream 2 having a remainder of 1 when the data carrier number is divided by 4 transmit block #7 data, symbols in stream 2 having a remainder of 2 when the data carrier number is divided by 4 transmit block #8 data, symbols in stream 2 having a remainder of 3 when the data carrier number is divided by 4 transmit block #5 data, and symbols in stream 2 having a remainder of 0 when the data carrier number is divided by 4 transmit block #6 data.

Accordingly, at time &M, the symbols are arranged as follows. M is an integer that is greater than or equal to 1.

Symbols in stream 1 having a remainder of 1 when the data carrier number is divided by 4 transmit block #(4M-3) data,
symbols in stream 1 having a remainder of 2 when the data carrier number is divided by 4 transmit block #(4M-2) data,
symbols in stream 1 having a remainder of 3 when the data carrier number is divided by 4 transmit block #(4M-1) data, and
symbols in stream 1 having a remainder of 0 when the data carrier number is divided by 4 transmit block #(4M) data.

Also,
symbols in stream 2 having a remainder of 1 when the data carrier number is divided by 4 transmit block #(4M-1) data, and
symbols in stream 2 having a remainder of 2 when the data carrier number is divided by 4 transmit block #(4M) data,
symbols in stream 2 having a remainder of 3 when the data carrier number is divided by 4 transmit block #(4M-3) data, and
symbols in stream 2 having a remainder of 0 when the data carrier number is divided by 4 transmit block #(4M-2) data.

When the transmission device transmits modulated signals using a frame configuration such as illustrated in FIG. 14, the negative effects caused by low portion 801 of the reception field intensity due to multi-path using FIG. 8 are not likely to be an influence. Moreover, inhibiting a decrease in data reception quality such as described with reference to FIG. 9 is likely. Accordingly, achieving an advantageous effect of an increase in data reception quality is likely.

Note that FIG. 13 and FIG. 14 are preferable examples of frames that increase data reception quality; the frame configuration is not limited to these examples. In order to increase data reception quality, it is sufficient if the following conditions are met.

At time &M, when data in block #a of data carrier $i in stream 1(*s*1(*i*)) is transmitted and data in block #b of data carrier $i+1 in stream 1(*s*1(*i*)) is transmitted, in all instances where i is an integer that is greater than or equal to 1 and less than or equal to 335, a≠b holds true. i is an integer that is greater than or equal to 1 and less than or equal to 335, a is an integer that is greater than or equal to 4M-3 and less than or equal to 4M, and b is an integer that is greater than or equal to 4M-3 and less than or equal to 4M.

At time &M, when data in block #c of data carrier $i in stream 2 is transmitted and data in block #d of data carrier $i+1 in stream 2 is transmitted, in all instances where i is an integer that is greater than or equal to 1 and less than or equal to 335, c≠d holds true. i is an integer that is greater than or equal to 1 and less than or equal to 335, c is an integer that is greater than or equal to 4M-3 and less than or equal to 4M, and d is an integer that is greater than or equal to 4M-3 and less than or equal to 4M.

At time &M, j is an integer that is greater than or equal to 1 and less than or equal to 84, and in all instances where j is an integer that meets this condition: "from data carrier $4×j−3 to data carrier $4×j in stream 1(*s*1(*i*)), there is one symbol that transmits block #(4M-3) data, one symbol that transmits block #(4M-2) data, one symbol that transmits block #(4M-1) data, and one symbol that transmits block #(4M) data" is satisfied.

At time &M, j is an integer that is greater than or equal to 1 and less than or equal to 84, and in all instances where j is an integer that meets this condition: "from data carrier $4×j−3 to data carrier $4×j in stream 2(*s*2(*i*)), there is one symbol that transmits block #(4M-3) data, one symbol that transmits block #(4M-2) data, one symbol that transmits block #(4M-1) data, and one symbol that transmits block #(4M) data" is satisfied.

Next, a configuration of data carriers when the modulation method for stream 1(*s*1(*i*)) and stream 2(*s*2(*i*)) is 64QAM, which is an example of a modulation method in which there are 64 signal points in an in-phase I-orthogonal Q plane, will be described. Note that hereinafter, a modulation method in which there are 64 signal points means a modulation method involving six-bit transmission per symbol.

Here, similar to FIG. 7, an N-th block configured of 672 bits that are error correction encoded is referred to as block #N and denoted as "#N".

Figure 15:
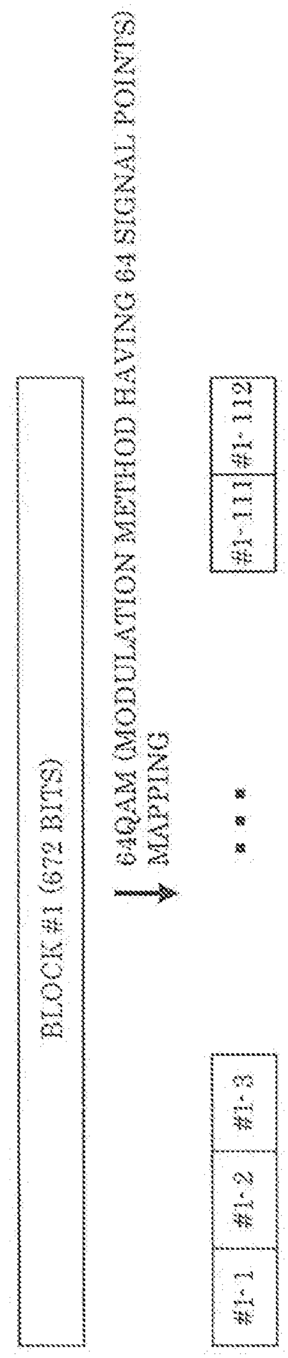
FIG. 15 illustrates an example of symbol generation.

When 64QAM modulation is applied, symbols from block #N through 112 are generated. In FIG. 15, the 112 symbols generated from block #1 are indicated as "#1-1", "#1-2", "#1-3", "#1-4" . . . "#1-110", "#1-111", and "#1-112". Accordingly, the 112 symbols generated from block #N are expressed as "#N-1", "#N-2", "#N-3", "#N-4" . . . "#N-110", "#N-111", and "#N-112".

Moreover, similar to FIG. 7, frequency is represented on the horizontal axis, and when the data carriers are arranged, in stream 1, data carrier $1 through data carrier $336 are present, and similarly, in stream 2, data carrier $1 through data carrier $336 are present.

Then, data carrier $1 in stream 1 and data carrier $1 in stream 2 are transmitted from different antennas at the same frequency and at the same time, and data carrier $2 in stream 1 and data carrier $2 in stream 2 are transmitted from different antennas at the same frequency and at the same time. In other words, data carrier $L in stream 1 and data carrier $L in stream 2 are transmitted from different antennas at the same frequency and at the same time. L is an integer that is greater than or equal to 1 and less than or equal to 336.

Figure 16:
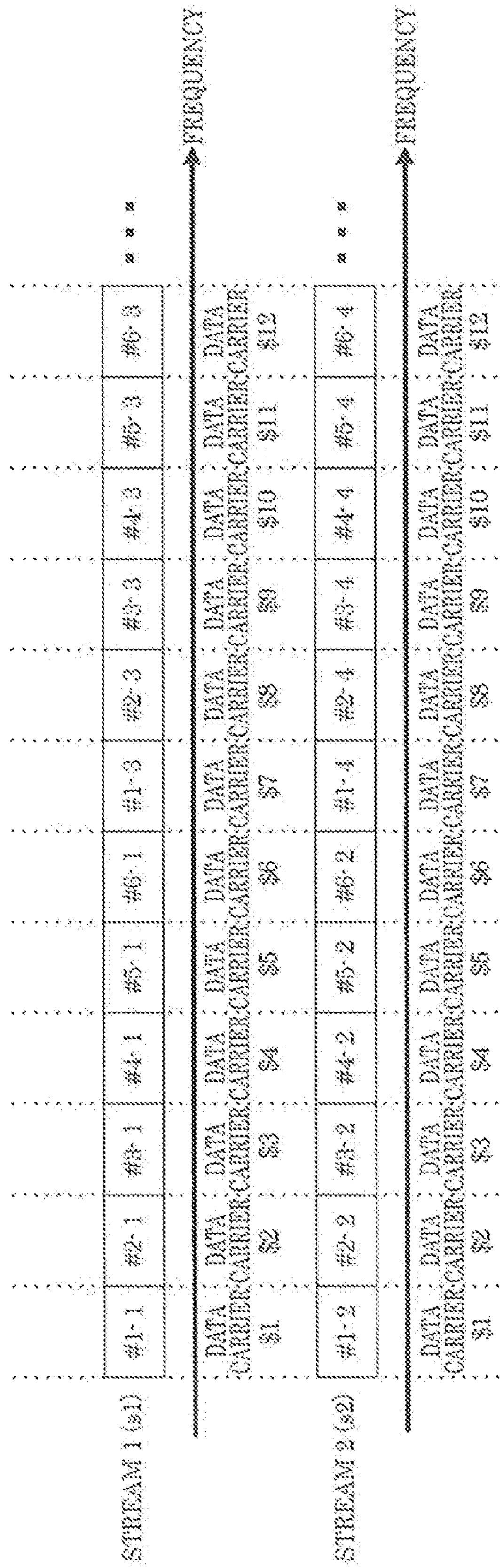
FIG. 16 illustrates an example of a frame configuration.

In order to facilitate understanding of the phenomenon described with reference to FIG. 8 and the phenomenon resulting from a frame configuration such as illustrated in FIG. 9, consider, for example, a frame configuration such as illustrated in FIG. 16.

As illustrated in FIG. 16, each data carrier in each stream is assigned with a symbol.

Data carrier $1 in stream 1 is assigned with the symbol "#1-1",
data carrier $1 in stream 2 is assigned with the symbol "#1-2",
data carrier $2 in stream 1 is assigned with the symbol "#2-1",
data carrier $2 in stream 2 is assigned with the symbol "#2-2",
data carrier $3 in stream 1 is assigned with the symbol "#3-1",
data carrier $3 in stream 2 is assigned with the symbol "#3-2",
data carrier $4 in stream 1 is assigned with the symbol "#4-1",
data carrier $4 in stream 2 is assigned with the symbol "#4-2",
data carrier $5 in stream 1 is assigned with the symbol "#5-1",
data carrier $5 in stream 2 is assigned with the symbol "#5-2",
data carrier $6 in stream 1 is assigned with the symbol "#6-1",
data carrier $6 in stream 2 is assigned with the symbol "#6-2", data carrier $7 in stream 1 is assigned with the symbol "#1-3",
data carrier $7 in stream 2 is assigned with the symbol "#1-4",
data carrier $8 in stream 1 is assigned with the symbol "#2-3",
data carrier $8 in stream 2 is assigned with the symbol "#2-4",
data carrier $9 in stream 1 is assigned with the symbol "#3-3",
data carrier $9 in stream 2 is assigned with the symbol "#3-4",
data carrier $10 in stream 1 is assigned with the symbol "#4-3",
data carrier $10 in stream 2 is assigned with the symbol "#4-4",
data carrier $11 in stream 1 is assigned with the symbol "#5-3",
data carrier $11 in stream 2 is assigned with the symbol "#5-4",
data carrier $12 in stream 1 is assigned with the symbol "#6-3",
data carrier $12 in stream 2 is assigned with the symbol "#6-4",
(recitation for data carrier $13 through data carrier $330 is omitted),
data carrier $331 in stream 1 is assigned with the symbol "#1-111",
data carrier $331 in stream 2 is assigned with the symbol "#1-112",
data carrier $332 in stream 1 is assigned with the symbol "#2-111",
data carrier $332 in stream 2 is assigned with the symbol "#2-112",
data carrier $333 in stream 1 is assigned with the symbol "#3-111",
data carrier $333 in stream 2 is assigned with the symbol "#3-112",
data carrier $334 in stream 1 is assigned with the symbol "#4-111",
data carrier $334 in stream 2 is assigned with the symbol "#4-112",
data carrier $335 in stream 1 is assigned with the symbol "#5-111",
data carrier $335 in stream 2 is assigned with the symbol "#5-112",
data carrier $336 in stream 1 is assigned with the symbol "#6-111", and
data carrier $336 in stream 2 is assigned with the symbol "#6-112".

This is how the symbols are arranged for time &1.

Accordingly,
symbols having a remainder of 1 when the data carrier number is divided by 6 transmit block #1 data,
symbols having a remainder of 2 when the data carrier number is divided by 6 transmit block #2 data,
symbols having a remainder of 3 when the data carrier number is divided by 6 transmit block #3 data,
symbols having a remainder of 4 when the data carrier number is divided by 6 transmit block #4 data,
symbols having a remainder of 5 when the data carrier number is divided by 6 transmit block #5 data, and
symbols having a remainder of 0 when the data carrier number is divided by 6 transmit block #6 data.

At time &2, the symbols are arranged as follows.

Symbols having a remainder of 1 when the data carrier number is divided by 6 transmit block #7 data,
symbols having a remainder of 2 when the data carrier number is divided by 6 transmit block #8 data,
symbols having a remainder of 3 when the data carrier number is divided by 6 transmit block #9 data,
symbols having a remainder of 4 when the data carrier number is divided by 6 transmit block #10 data,
symbols having a remainder of 5 when the data carrier number is divided by 6 transmit block #11 data, and
symbols having a remainder of 0 when the data carrier number is divided by 6 transmit block #12 data.

Accordingly, at time &M, the symbols are arranged as follows. M is an integer that is greater than or equal to 1.

Symbols having a remainder of 1 when the data carrier number is divided by 6 transmit block #(6M-5) data,
symbols having a remainder of 2 when the data carrier number is divided by 6 transmit block #(6M-4) data,
symbols having a remainder of 3 when the data carrier number is divided by 6 transmit block #(6M-3) data,
symbols having a remainder of 4 when the data carrier number is divided by 6 transmit block #(6M-2) data,
symbols having a remainder of 5 when the data carrier number is divided by 6 transmit block #(6M-1) data, and
symbols having a remainder of 0 when the data carrier number is divided by 6 transmit block #(6M) data.

When the transmission device transmits modulated signals using a frame configuration such as illustrated in FIG. 16, the negative effects caused by low portion 801 of the reception field intensity due to multi-path using FIG. 8 are not likely to be an influence. Moreover, inhibiting a decrease in data reception quality such as described with reference to FIG. 9 is likely. Accordingly, achieving an advantageous effect of an increase in data reception quality is likely.

Figure 17:
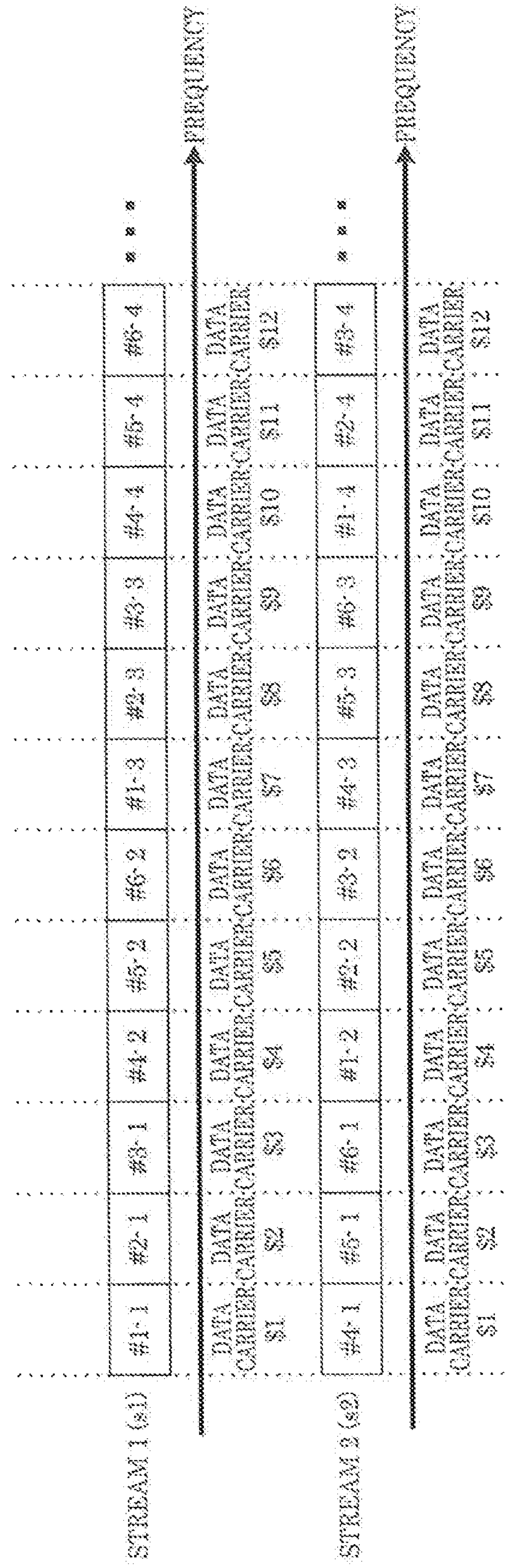
FIG. 17 illustrates an example of a frame configuration.

In order to facilitate understanding of the phenomenon described with reference to FIG. 8 and the phenomenon resulting from a frame configuration such as illustrated in FIG. 9, consider, for example, a frame configuration such as illustrated in FIG. 17.

As illustrated in FIG. 17, each data carrier in each stream is assigned with a symbol.

Data carrier $1 in stream 1 is assigned with the symbol "#1-1",
data carrier $1 in stream 2 is assigned with the symbol "#4-1",
data carrier $2 in stream 1 is assigned with the symbol "#2-1",
data carrier $2 in stream 2 is assigned with the symbol "#5-1",
data carrier $3 in stream 1 is assigned with the symbol "#3-1",
data carrier $3 in stream 2 is assigned with the symbol "#6-1",
data carrier $4 in stream 1 is assigned with the symbol "#4-2",
data carrier $4 in stream 2 is assigned with the symbol "#1-2",
data carrier $5 in stream 1 is assigned with the symbol "#5-2",
data carrier $5 in stream 2 is assigned with the symbol "#2-2",
data carrier $6 in stream 1 is assigned with the symbol "#6-2",
data carrier $6 in stream 2 is assigned with the symbol "#3-2",
data carrier $7 in stream 1 is assigned with the symbol "#1-3",
data carrier $7 in stream 2 is assigned with the symbol "#4-3", data carrier $8 in stream 1 is assigned with the symbol "#2-3",
data carrier $8 in stream 2 is assigned with the symbol "#5-3",
data carrier $9 in stream 1 is assigned with the symbol "#3-3",
data carrier $9 in stream 2 is assigned with the symbol "#6-3",
data carrier $10 in stream 1 is assigned with the symbol "#4-4",
data carrier $10 in stream 2 is assigned with the symbol "#1-4",
data carrier $11 in stream 1 is assigned with the symbol "#5-4",
data carrier $11 in stream 2 is assigned with the symbol "#2-4",
data carrier $12 in stream 1 is assigned with the symbol "#6-4",
data carrier $12 in stream 2 is assigned with the symbol "#3-4",
(recitation for data carrier $13 through data carrier $330 is omitted),
data carrier $331 in stream 1 is assigned with the symbol "#1-111",
data carrier $331 in stream 2 is assigned with the symbol "#4-111",
data carrier $332 in stream 1 is assigned with the symbol "#2-111",
data carrier $332 in stream 2 is assigned with the symbol "#5-111",
data carrier $333 in stream 1 is assigned with the symbol "#3-111",
data carrier $333 in stream 2 is assigned with the symbol "#6-111",
data carrier $334 in stream 1 is assigned with the symbol "#4-112",
data carrier $334 in stream 2 is assigned with the symbol "#1-112",
data carrier $335 in stream 1 is assigned with the symbol "#5-112",
data carrier $335 in stream 2 is assigned with the symbol "#2-112",
data carrier $336 in stream 1 is assigned with the symbol "#6-112", and
data carrier $336 in stream 2 is assigned with the symbol "#3-112".

This is how the symbols are arranged for time &1.

Accordingly,
symbols in stream 1 having a remainder of 1 when the data carrier number is divided by 6 transmit block #1 data,
symbols in stream 1 having a remainder of 2 when the data carrier number is divided by 6 transmit block #2 data,
symbols in stream 1 having a remainder of 3 when the data carrier number is divided by 6 transmit block #3 data,
symbols in stream 1 having a remainder of 4 when the data carrier number is divided by 6 transmit block #4 data,
symbols in stream 1 having a remainder of 5 when the data carrier number is divided by 6 transmit block #5 data, and
symbols in stream 1 having a remainder of 0 when the data carrier number is divided by 6 transmit block #6 data.

Also,
symbols in stream 2 having a remainder of 1 when the data carrier number is divided by 6 transmit block #4 data,
symbols in stream 2 having a remainder of 2 when the data carrier number is divided by 6 transmit block #5 data, and
symbols in stream 2 having a remainder of 3 when the data carrier number is divided by 6 transmit block #6 data,
symbols in stream 2 having a remainder of 4 when the data carrier number is divided by 6 transmit block #1 data,
symbols in stream 2 having a remainder of 5 when the data carrier number is divided by 6 transmit block #2 data, and
symbols in stream 2 having a remainder of 0 when the data carrier number is divided by 6 transmit block #3 data.

At time &2, the symbols are arranged as follows.

Symbols in stream 1 having a remainder of 1 when the data carrier number is divided by 6 transmit block #7 data,
symbols in stream 1 having a remainder of 2 when the data carrier number is divided by 6 transmit block #8 data,
symbols in stream 1 having a remainder of 3 when the data carrier number is divided by 6 transmit block #9 data,
symbols in stream 1 having a remainder of 4 when the data carrier number is divided by 6 transmit block #10 data,
symbols in stream 1 having a remainder of 5 when the data carrier number is divided by 6 transmit block #11 data, and
symbols in stream 1 having a remainder of 0 when the data carrier number is divided by 6 transmit block #12 data.

Also,
symbols in stream 2 having a remainder of 1 when the data carrier number is divided by 6 transmit block #10 data,
symbols in stream 2 having a remainder of 2 when the data carrier number is divided by 6 transmit block #11 data,
symbols in stream 2 having a remainder of 3 when the data carrier number is divided by 6 transmit block #12 data,
symbols in stream 2 having a remainder of 4 when the data carrier number is divided by 6 transmit block #7 data,
symbols in stream 2 having a remainder of 5 when the data carrier number is divided by 6 transmit block #8 data, and
symbols in stream 2 having a remainder of 0 when the data carrier number is divided by 6 transmit block #9 data.

Accordingly, at time &M, the symbols are arranged as follows. M is an integer that is greater than or equal to 1.

Symbols in stream 1 having a remainder of 1 when the data carrier number is divided by 6 transmit block #(6M-5) data,
symbols in stream 1 having a remainder of 2 when the data carrier number is divided by 6 transmit block #(6M-4) data,
symbols in stream 1 having a remainder of 3 when the data carrier number is divided by 6 transmit block #(6M-3) data,
symbols in stream 1 having a remainder of 4 when the data carrier number is divided by 6 transmit block #(6M-2) data,
symbols in stream 1 having a remainder of 5 when the data carrier number is divided by 6 transmit block #(6M-1) data, and
symbols in stream 1 having a remainder of 0 when the data carrier number is divided by 6 transmit block #(6M) data.

Also,
symbols in stream 2 having a remainder of 1 when the data carrier number is divided by 6 transmit block #(6M-2) data,
symbols in stream 2 having a remainder of 2 when the data carrier number is divided by 6 transmit block #(6M-1) data,
symbols in stream 2 having a remainder of 3 when the data carrier number is divided by 6 transmit block #(6M) data,
symbols in stream 2 having a remainder of 4 when the data carrier number is divided by 6 transmit block #(6M-5) data,
symbols in stream 2 having a remainder of 5 when the data carrier number is divided by 6 transmit block #(6M-4) data, and
symbols in stream 2 having a remainder of 0 when the data carrier number is divided by 6 transmit block #(6M-3) data.

When the transmission device transmits modulated signals using a frame configuration such as illustrated in FIG. 17, the negative effects caused by low portion 801 of the reception field intensity due to multi-path using FIG. 8 are not likely to be an influence. Moreover, inhibiting a decrease in data reception quality such as described with reference to FIG. 9 is likely. Accordingly, achieving an advantageous effect of an increase in data reception quality is likely.

Note that FIG. 16 and FIG. 17 are preferable examples of frames that increase data reception quality; the frame configuration is not limited to these examples. In order to increase data reception quality, it is sufficient if the following conditions are met.

At time &M, when data in block #a of data carrier $i in stream 1(*s*1(*i*)) is transmitted and data in block #b of data carrier $i+1 in stream 1(*s*1(*i*)) is transmitted, in all instances where i is an integer that is greater than or equal to 1 and less than or equal to 335, a≠b holds true. i is an integer that is greater than or equal to 1 and less than or equal to 335, a is an integer that is greater than or equal to 6M-5 and less than or equal to 6M, and b is an integer that is greater than or equal to 6M-5 and less than or equal to 6M.

At time &M, when data in block #c of data carrier $i in stream 2 is transmitted and data in block #d of data carrier $i+1 in stream 2 is transmitted, in all instances where i is an integer that is greater than or equal to 1 and less than or equal to 335, c≠d holds true. i is an integer that is greater than or equal to 1 and less than or equal to 335, c is an integer that is greater than or equal to 6M-5 and less than or equal to 6M, and d is an integer that is greater than or equal to 6M-5 and less than or equal to 6M.

At time &M, j is an integer that is greater than or equal to 1 and less than or equal to 56, and in all instances where j is an integer that meets this condition: "from data carrier $6×j−5 to data carrier $6×j in stream 1(*s*1(*i*)), there is one symbol that transmits block #(6M-5) data, one symbol that transmits block #(6M-4) data, one symbol that transmits block #(6M-3) data, one symbol that transmits block #(6M-2) data, one symbol that transmits block #(6M-1) data, and one symbol that transmits block #(6M) data" is satisfied.

At time &M, j is an integer that is greater than or equal to 1 and less than or equal to 56, and in all instances where j is an integer that meets this condition: "from data carrier $6×j−3 to data carrier $6×j in stream 2(*s*2(*i*)), there is one symbol that transmits block #(6M-5) data, one symbol that transmits block #(6M-4) data, one symbol that transmits block #(6M-3) data, one symbol that transmits block #(6M-2) data, one symbol that transmits block #(6M-1) data, and one symbol that transmits block #(6M) data" is satisfied.

Hereinbefore, frame configuration methods when the modulation method for stream 1(*s*1(*i*)) and the modulation method for stream 2(*s*2(*i*)) is either QPSK, 16QAM, or 64QAM have been described. Note that in the preceding description, for QPSK, a modulation method in which 4 signal points are present in an in-phase I-orthogonal Q plane is acceptable; for 16QAM, a modulation method in which 16 signal points are present in an in-phase I-orthogonal Q plane is acceptable; and for 64QAM, a modulation method in which 64 signal points are present in an in-phase I-orthogonal Q plane is acceptable.

When the transmission device illustrated in FIG. 1 switches the modulation method for stream 1(*s*1(*i*)) and the modulation method for stream 2(*s*2(*i*)) to QPSK, 16QAM, or 64QAM, upon each of the modulation methods, when the above-described frame configuration is satisfied, when any one of the modulation methods is selected, it is possible to achieve an advantageous effect in which it is possible for the reception device, which is the communication partner, to achieve good data reception quality. Note that in the transmission device illustrated in FIG. 1, phase change may be implemented and alternatively may not be implemented. Note that in the subsequent description, for QPSK, a modulation method in which 4 signal points are present in an in-phase I-orthogonal Q plane is acceptable; for 16QAM, a modulation method in which 16 signal points are present in an in-phase I-orthogonal Q plane is acceptable; and for 64QAM, a modulation method in which 64 signal points are present in an in-phase I-orthogonal Q plane is acceptable.

Next, a phase change method in the transmission device illustrated in FIG. 1 in which phase change is performed when a plurality of modulated signals are transmitted from a plurality of antennas will be described.

The transmission method including performing precoding and phase change is as shown in Equation (3), Equation (37), Equation (38), and Equation (39), just as described above. Hereinafter, a specific application example of the phase change shown in Equation (3), Equation (37), Equation (38), and Equation (39) will be given. In other words, a method of changing y(i) in Equation (3), Equation (37), Equation (38), and Equation (39) will be described.

FIG. 10 illustrates an arrangement example of data carriers when the modulation method for stream 1(*s*1(*i*)) and stream 2(*s*2(*i*)) is QPSK, which is an example of a modulation method in which there are 4 signal points in an in-phase I-orthogonal Q plane.

Here, similar to FIG. 7, an N-th block configured of 672 bits that are error correction encoded is referred to as block #N and denoted as "#N".

Figure 18:
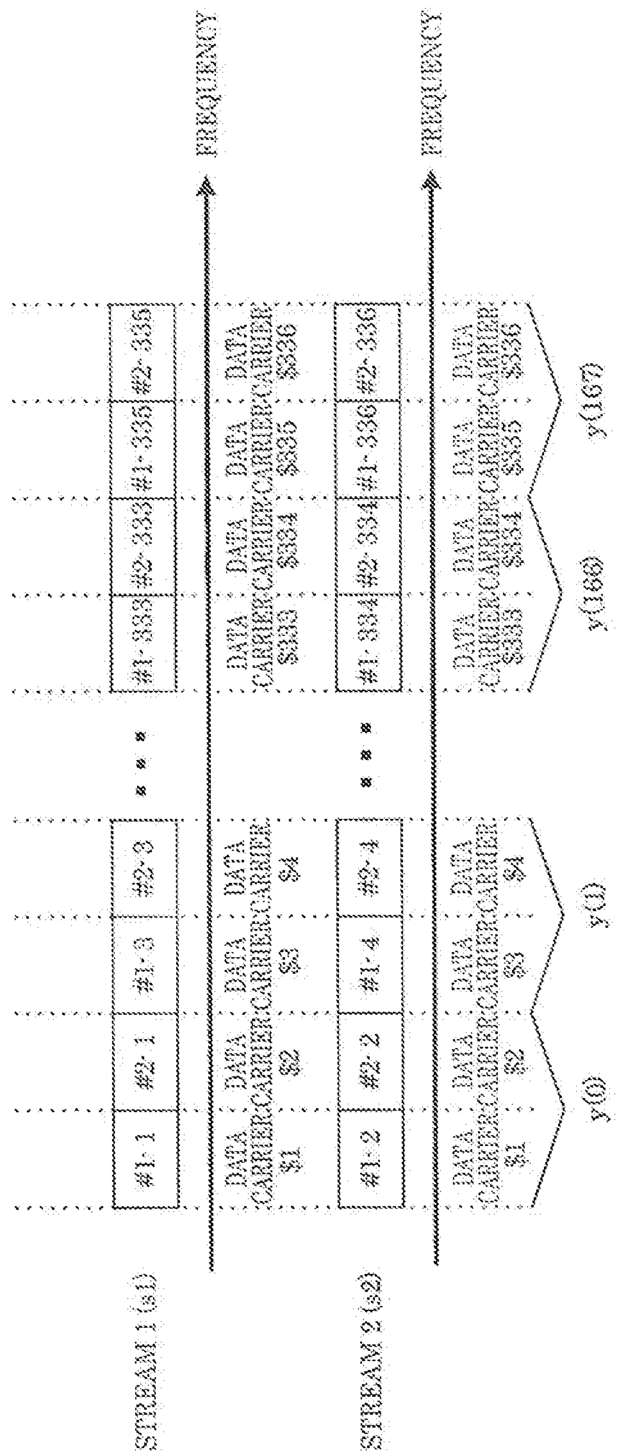
FIG. 18 illustrates an example of phase change value allocation.

FIG. 18 illustrates an example of how phase change value y(i) is assigned when data is arranged in data carriers such as in FIG. 10.

As illustrated in FIG. 18, in data carrier $1, when phase change is performed using y(0), phase change is performed using y(0) for data carrier $2 as well.

Similarly, in data carrier $3, when phase change is performed using y(1), phase change is performed using y(1) for data carrier $4 as well.

Recitation for data carrier $5 through data carrier $332 is omitted.

In data carrier $333, when phase change is performed using y(166), phase change is performed using y(166) for data carrier $334 as well.

In data carrier $335, when phase change is performed using y(167), phase change is performed using y(167) for data carrier $336 as well.

In other words, in data carrier $(2×k+1) and data carrier $(2*k*+2), phase change is performed using the same phase change value (y(k) in FIG. 18). k is an integer that is greater than or equal to 0.

With this, with respect to block #1, phase is changed in an unbiased manner, and with respect to block #2 as well, phase is changed in an unbiased manner. Accordingly, in both block #1 and block #2, since it is possible to achieve a sufficient advantageous effect with the phase change, it is possible to achieve an advantageous effect of increase data quality of the reception device, which is the communication partner.

FIG. 11 illustrates an arrangement example of data carriers when the modulation method for stream 1(*s*1(*i*)) and stream 2(*s*2(*i*)) is QPSK, which is an example of a modulation method in which there are 4 signal points in an in-phase I-orthogonal Q plane, that is different from the example illustrated in FIG. 10.

Here, similar to FIG. 7, an N-th block configured of 672 bits that are error correction encoded is referred to as block #N and denoted as "#N".

Figure 19:
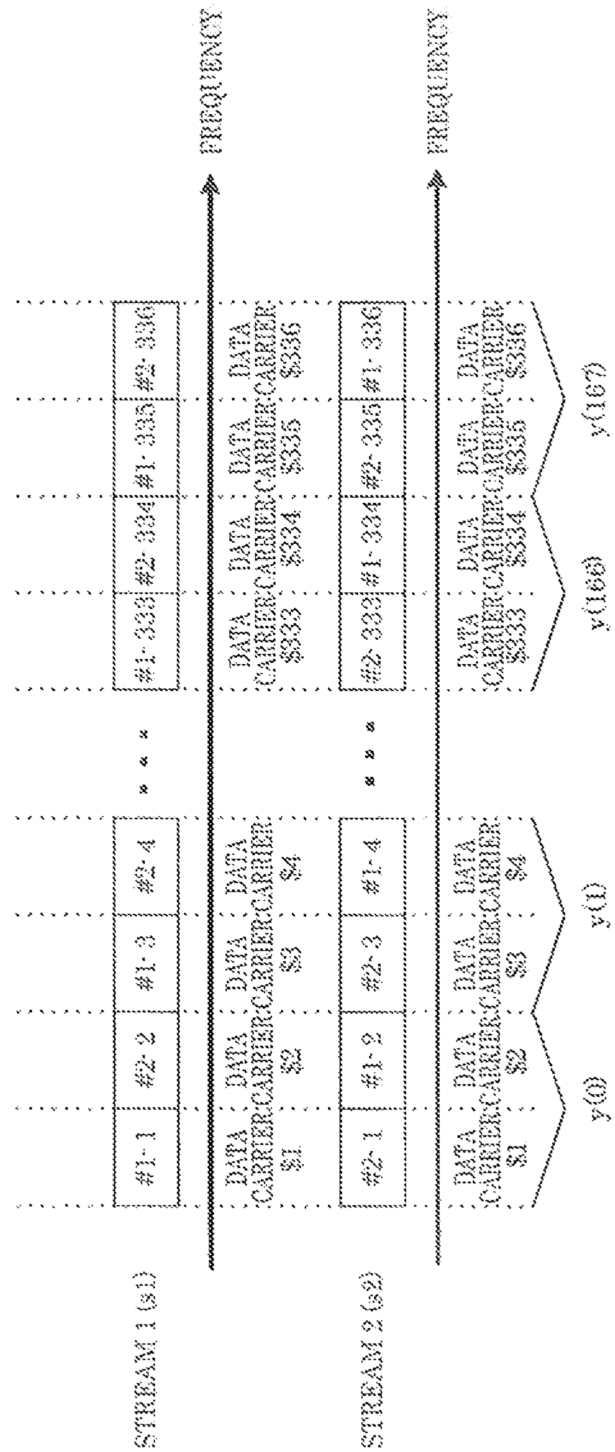
FIG. 19 illustrates an example of phase change value allocation.

FIG. 19 illustrates an example of how phase change value y(i) is assigned when data is arranged in data carriers such as in FIG. 11.

As illustrated in FIG. 19, in data carrier $1, when phase change is performed using y(0), phase change is performed using y(0) for data carrier $2 as well.

Similarly, in data carrier $3, when phase change is performed using y(1), phase change is performed using y(1) for data carrier $4 as well.

Recitation for data carrier $5 through data carrier $332 is omitted.

In data carrier $333, when phase change is performed using y(166), phase change is performed using y(166) for data carrier $334 as well.

In data carrier $335, when phase change is performed using y(167), phase change is performed using y(167) for data carrier $336 as well.

In other words, in data carrier $(2×k+1) and data carrier $(2k+2), phase change is performed using the same phase change value (y(k) in FIG. 18). k is an integer that is greater than or equal to 0.

With this, with respect to block #1, phase is changed in an unbiased manner, and with respect to block #2 as well, phase is changed in an unbiased manner. Accordingly, in both block #1 and block #2, since it is possible to achieve a sufficient advantageous effect with the phase change, it is possible to achieve an advantageous effect of increase data quality of the reception device, which is the communication partner.

Figure 20:
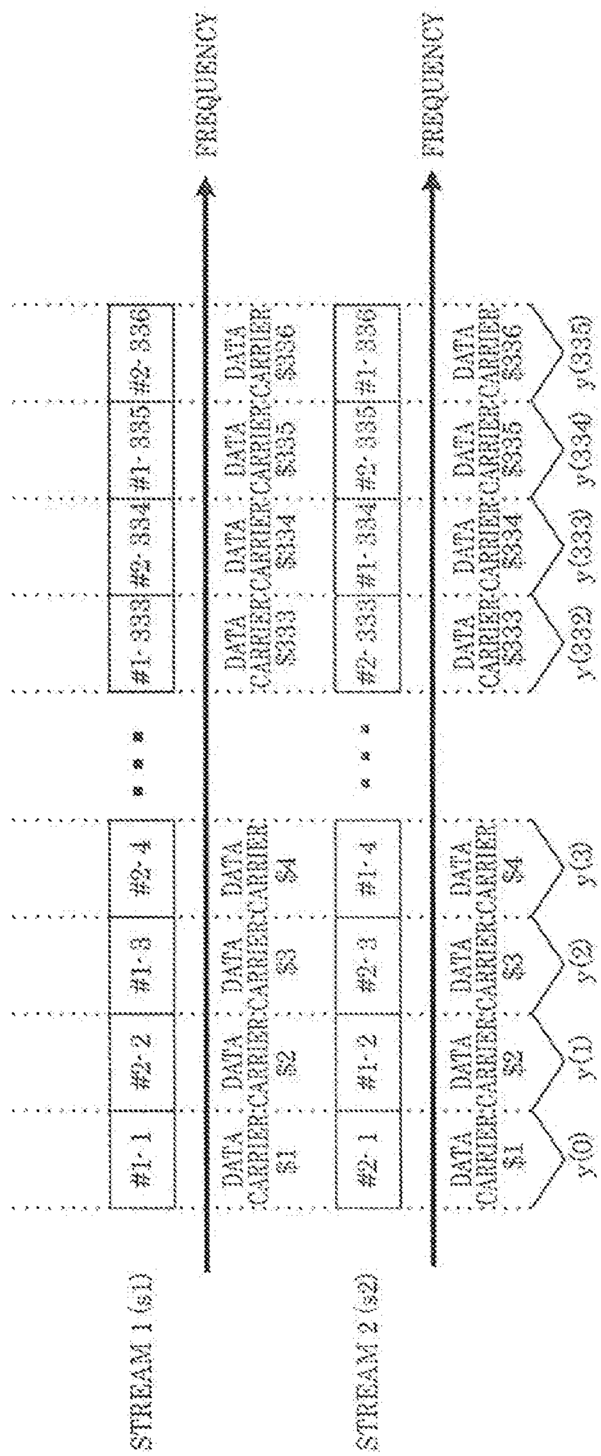
FIG. 20 illustrates an example of phase change value allocation.

FIG. 20 illustrates an example of how phase change value y(i) is assigned "when data is arranged in data carriers such as in FIG. 11". The example illustrated in FIG. 20 is different from the example illustrated in FIG. 19.

As illustrated in FIG. 20, in order to perform a phase change, y(0) is assigned to data carrier $1,
y(1) is assigned to data carrier $2,
y(2) is assigned to data carrier $3,
y(3) is assigned to data carrier $4,
(recitation for data carrier $5 through data carrier $332 is omitted),
y(332) is assigned to data carrier $333,
y(333) is assigned to data carrier $334,
y(334) is assigned to data carrier $335, and
y(335) is assigned to data carrier $336.

In other words, a phase change is performed using phase change value y(k) in data carrier $(k+1), that is to say, phase change is performed in units of data carriers. k is an integer that is greater than or equal to 0.

With this, with respect to block #1, phase is changed in an unbiased manner, and with respect to block #2 as well, phase is changed in an unbiased manner. Accordingly, in both block #1 and block #2, since it is possible to achieve a sufficient advantageous effect with the phase change, it is possible to achieve an advantageous effect of increase data quality of the reception device, which is the communication partner.

FIG. 13 illustrates an arrangement example of data carriers when the modulation method for stream 1(*s*1(*i*)) and stream 2(*s*2(*i*)) is 16QAM, which is an example of a modulation method in which there are 16 signal points in an in-phase I-orthogonal Q plane.

Here, similar to FIG. 7, an N-th block configured of 672 bits that are error correction encoded is referred to as block #N and denoted as "#N".

Figure 21:
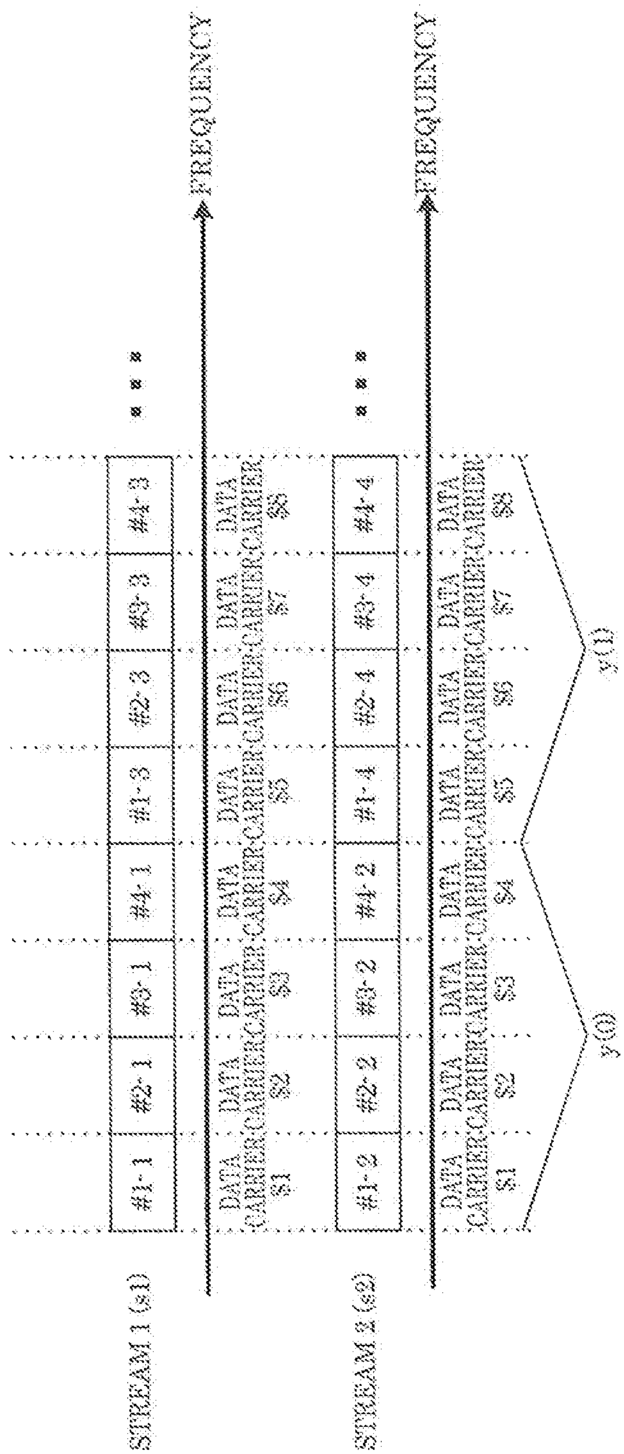
FIG. 21 illustrates an example of phase change value allocation.

FIG. 21 illustrates an example of how phase change value y(i) is assigned when data is arranged in data carriers such as in FIG. 13.

As illustrated in FIG. 21, in data carrier $1, when phase change is performed using y(0), phase change is performed using y(0) for data carrier $2,
data carrier $3, and data carrier $4 as well.

Similarly, in data carrier $5, when phase change is performed using y(1), phase change is performed using y(1) for data carrier $6, data carrier $7, and data carrier $8 as well.

Recitation for data carrier $9 through data carrier $332 is omitted.

In data carrier $333, when phase change is performed using y(83), phase change is performed using y(83) for data carrier $334, data carrier $335, and data carrier $336 as well. Note that this also applies to data carrier $333 not illustrated in FIG. 21.

In other words, for data carrier $(4×k+1), data carrier $(4×k+2), data carrier $(4×k+3), and data carrier $(4×k+4), phase change is performed using the same phase change value (in FIG. 21, y(k)). k is an integer that is greater than or equal to 0.

With this, with respect to block #1, phase is changed in an unbiased manner, and with respect to block #2, block #3, and block #4 as well, phase is changed in an unbiased manner. Accordingly, in block #1, block #2, block #3 and block #4, since it is possible to achieve a sufficient advantageous effect with the phase change, it is possible to achieve an advantageous effect of increase data quality of the reception device, which is the communication partner.

FIG. 14 illustrates an arrangement example of data carriers when the modulation method for stream 1(*s*1(*i*)) and stream 2(*s*2(*i*)) is 16QAM, which is an example of a modulation method in which there are 16 signal points in an in-phase I-orthogonal Q plane, that is different from the example illustrated in FIG. 13.

Here, similar to FIG. 7, an N-th block configured of 672 bits that are error correction encoded is referred to as block #N and denoted as "#N".

Figure 22:
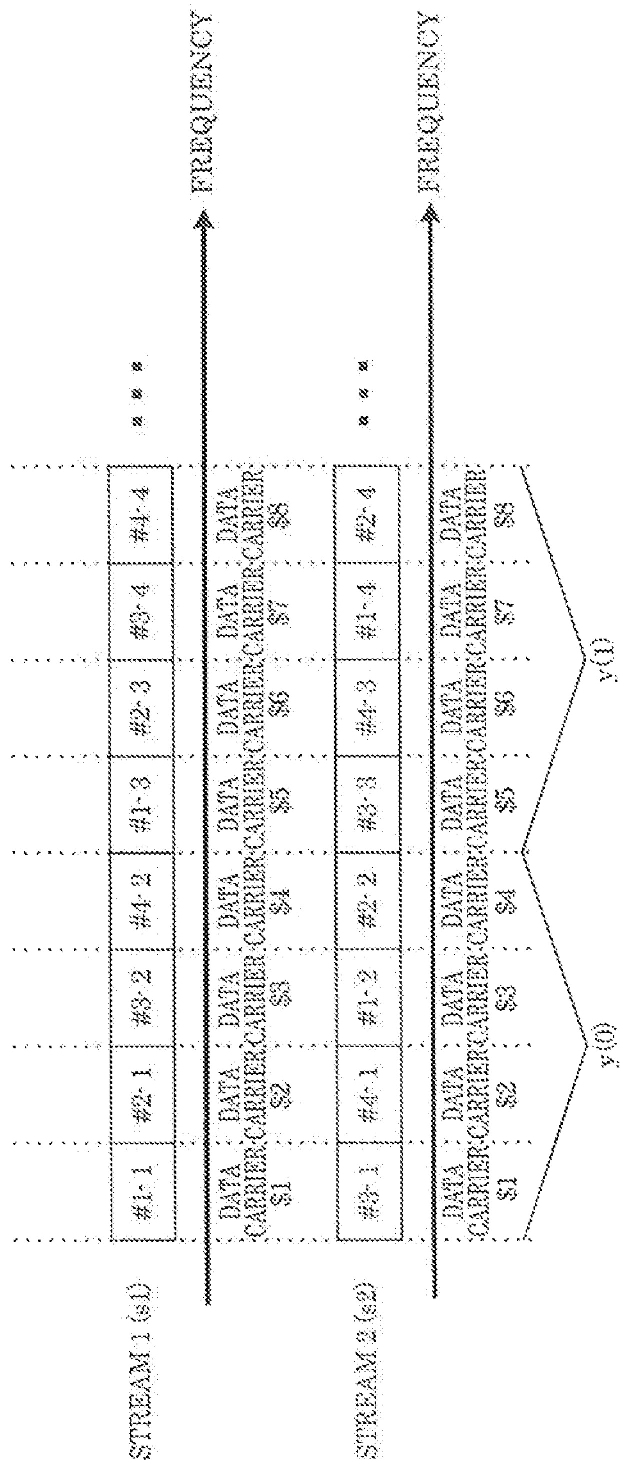
FIG. 22 illustrates an example of phase change value allocation.

FIG. 22 illustrates an example of how phase change value y(i) is assigned when data is arranged in data carriers such as in FIG. 14.

As illustrated in FIG. 22, in data carrier $1, when phase change is performed using y(0), phase change is performed using y(0) for data carrier $2, data carrier $3, and data carrier $4 as well.

Similarly, in data carrier $5, when phase change is performed using y(1), phase change is performed using y(1) for data carrier $6, data carrier $7, and data carrier $8 as well.

Recitation for data carrier $9 through data carrier $332 is omitted.

In data carrier $333, when phase change is performed using y(83), phase change is performed using y(83) for data carrier $334, data carrier $335, and data carrier $336 as well. Note that this also applies to data carrier $333 and subsequent data carriers not illustrated in FIG. 22.

In other words, for data carrier $(4×k+1), data carrier $(4×k+2), data carrier $(4×k+3), and data carrier $(4×k+4), phase change is performed using the same phase change value (in FIG. 22, y(k)). k is an integer that is greater than or equal to 0.

With this, with respect to block #1, phase is changed in an unbiased manner, and with respect to block #2, block #3, and block #4 as well, phase is changed in an unbiased manner. Accordingly, in block #1, block #2, block #3 and block #4, since it is possible to achieve a sufficient advantageous effect with the phase change, it is possible to achieve an advantageous effect of increase data quality of the reception device, which is the communication partner.

Figure 23:
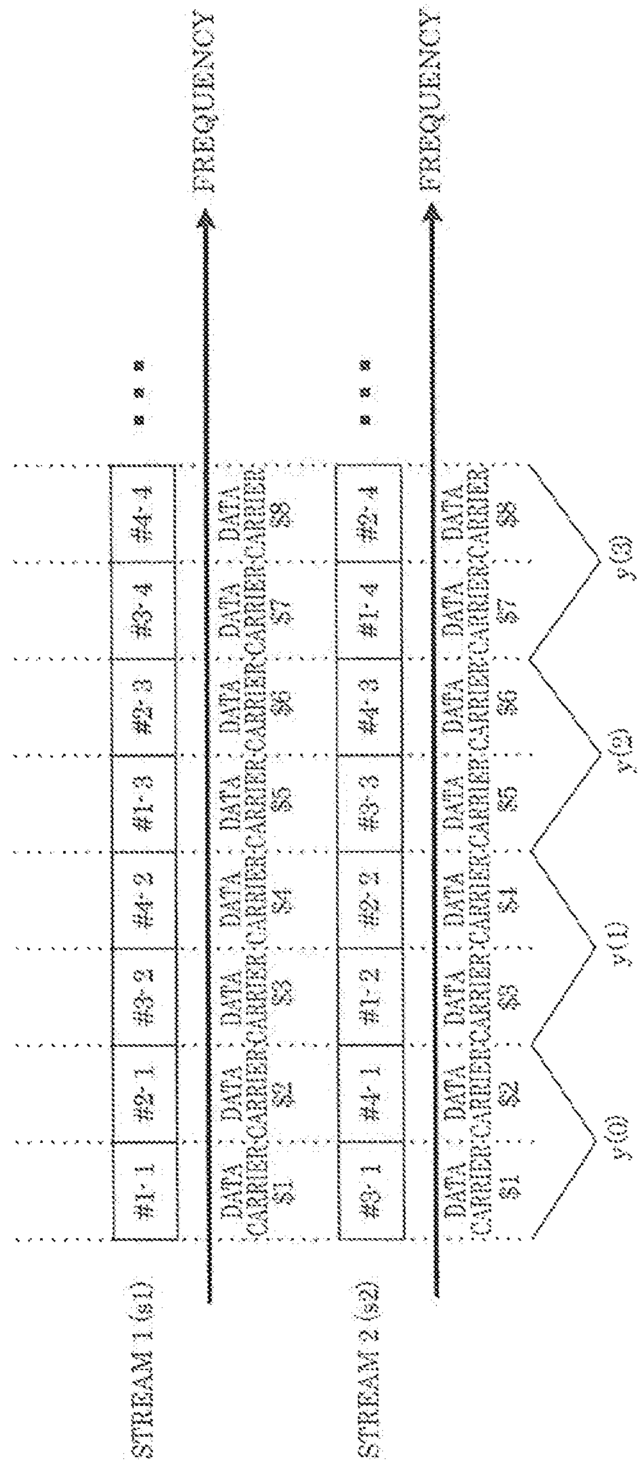
FIG. 23 illustrates an example of phase change value allocation.

FIG. 23 illustrates an example of how phase change value y(i) is assigned "when data is arranged in data carriers such as in FIG. 14". The example illustrated in FIG. 23 is different from the example illustrated in FIG. 22. As illustrated in FIG. 23, in data carrier $1, when phase change is performed using y(0), phase change is performed using y(0) for data carrier $2 as well.

Similarly, in data carrier $3, when phase change is performed using y(1), phase change is performed using y(1) for data carrier $4 as well.

Recitation for data carrier $5 through data carrier $332 is omitted.

In data carrier $333, when phase change is performed using y(166), phase change is performed using y(166) for data carrier $334 as well.

In data carrier $335, when phase change is performed using y(167), phase change is performed using y(167) for data carrier $336 as well. Note that this also applies to data carrier $333 and subsequent data carriers not illustrated in FIG. 23.

In other words, in data carrier $(2×k+1) and data carrier $(2*k*+2), phase change is performed using the same phase change value (y(k) in FIG. 23). k is an integer that is greater than or equal to 0.

With this, with respect to block #1, phase is changed in an unbiased manner, and with respect to block #2, block #3, and block #4 as well, phase is changed in an unbiased manner. Accordingly, in block #1, block #2, block #3 and block #4, since it is possible to achieve a sufficient advantageous effect with the phase change, it is possible to achieve an advantageous effect of increase data quality of the reception device, which is the communication partner.

FIG. 16 illustrates an arrangement example of data carriers when the modulation method for stream 1(*s*1(*i*)) and stream 2(*s*2(*i*)) is 64QAM, which is an example of a modulation method in which there are 64 signal points in an in-phase I-orthogonal Q plane.

Here, similar to FIG. 7, an N-th block configured of 672 bits that are error correction encoded is referred to as block #N and denoted as "#N".

Figure 24:
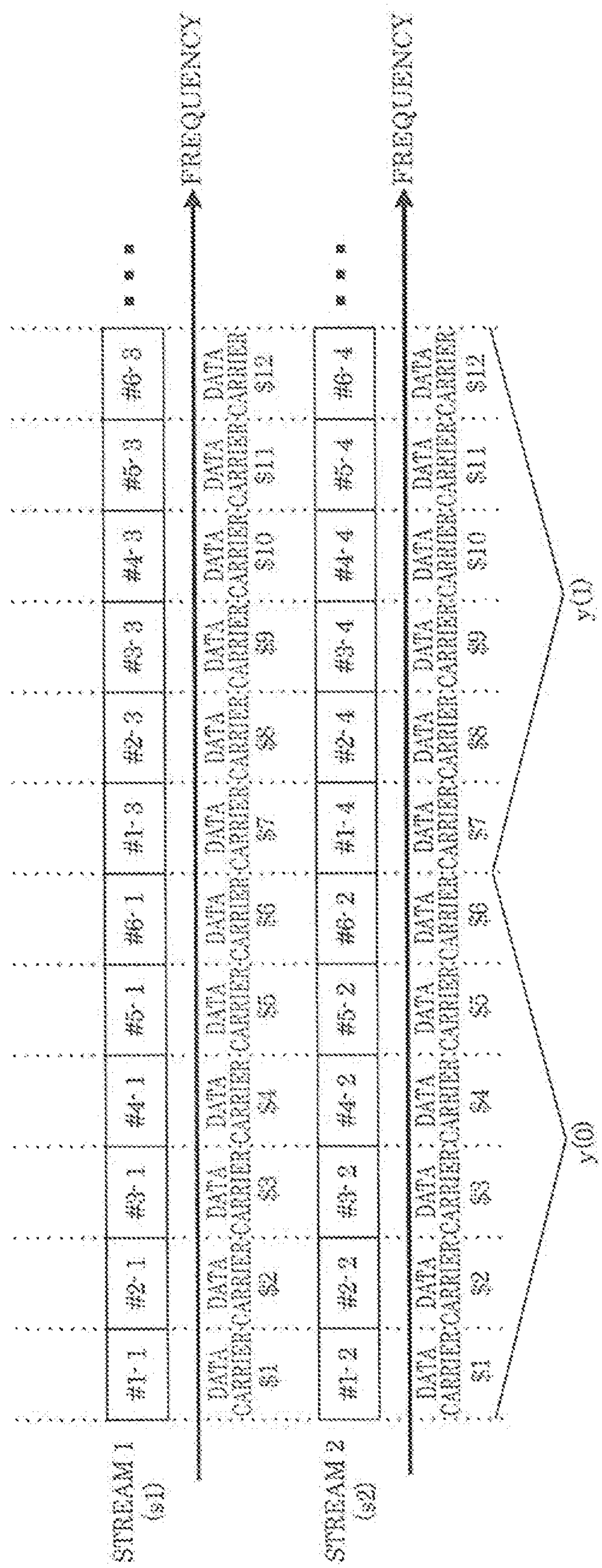
FIG. 24 illustrates an example of phase change value allocation.

FIG. 24 illustrates an example of how phase change value y(i) is assigned when data is arranged in data carriers such as in FIG. 16.

As illustrated in FIG. 24, in data carrier $1, when phase change is performed using y(0), phase change is performed using y(0) for data carrier $2, data carrier $3, data carrier $4, data carrier $5, and data carrier $6 as well.

Similarly, in data carrier $7, when phase change is performed using y(1), phase change is performed using y(1) for data carrier $8, data carrier $9, data carrier $10, data carrier $11, and data carrier $12 as well.

Recitation for data carriers midway is omitted.

In data carrier $331, when phase change is performed using y(55), phase change is performed using y(55) for data carrier $332, data carrier $333, data carrier $334, data carrier $335, and data carrier $336 as well.

In other words, for data carrier $(6×k+1), data carrier $(6×k+2), data carrier $(6×k+3), data carrier $(6×k+4), data carrier $(6×k+5), and data carrier $(6×k+6), phase change is performed using the same phase change value (y(k) in FIG. 24; k is an integer that is greater than or equal to 0).

With this, with respect to block #1, phase is changed in an unbiased manner, and with respect to block #2, block #3, block #4, block #5, and block #6 as well, phase is changed in an unbiased manner. Accordingly, in block #1, block #2, block #3, block #4, block #5, and block #6, since it is possible to achieve a sufficient advantageous effect with the phase change, it is possible to achieve an advantageous effect of increase data quality of the reception device, which is the partner (communication partner).

FIG. 17 illustrates an arrangement example of data carriers when the modulation method for stream 1(*s*1(*i*)) is 64QAM, which is an example of a modulation method in which there are 64 signal points in an in-phase I-orthogonal Q plane, and when the modulation method for stream 2(*s*2(*i*)) is 64QAM, which is an example of a modulation method in which there are 64 signal points in an in-phase I-orthogonal Q plane that is different from the example illustrated in FIG. 16.

Here, similar to FIG. 7, an N-th block configured of 672 bits that are error correction encoded is referred to as block #N and denoted as "#N".

Figure 25:
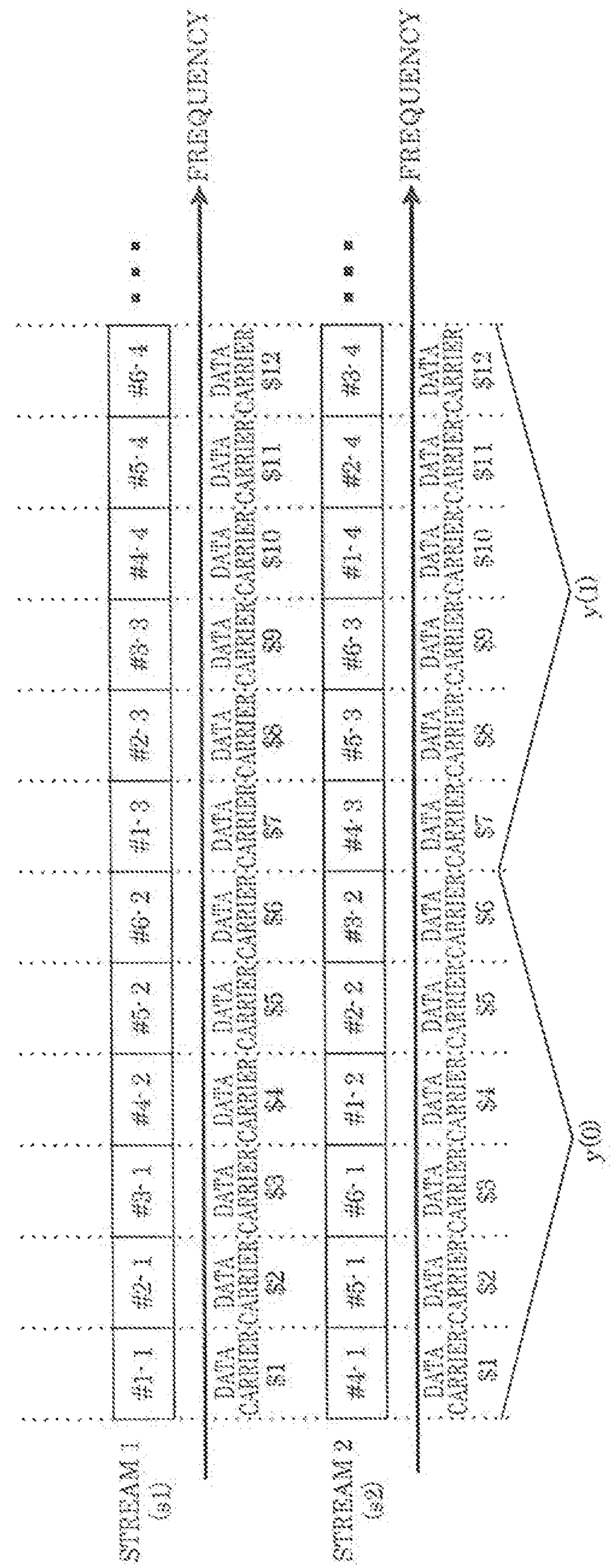
FIG. 25 illustrates an example of phase change value allocation.

FIG. 25 illustrates an example of how phase change value y(i) is assigned when data is arranged in data carriers such as in FIG. 17. As illustrated in FIG. 25, in data carrier $1, when phase change is performed using y(0), phase change is performed using y(0) for data carrier $2, data carrier $3, data carrier $4, data carrier $5, and data carrier $6 as well.

Similarly, in data carrier $7, when phase change is performed using y(1), phase change is performed using y(1) for data carrier $8, data carrier $9, data carrier $10, data carrier $11, and data carrier $12 as well.

Recitation for data carriers midway is omitted.

In data carrier $331, when phase change is performed using y(55), phase change is performed using y(55) for data carrier $332, data carrier $333, data carrier $334, data carrier $335, and data carrier $336 as well.

In other words, for data carrier $(6×k+1), data carrier $(6×k+2), data carrier $(6×k+3), data carrier $(6×k+4), data carrier $(6×k+5), and data carrier $(6×k+6), phase change is performed using the same phase change value (y(k) in FIG. 24). k is an integer that is greater than or equal to 0.

With this, with respect to block #1, phase is changed in an unbiased manner, and with respect to block #2, block #3, block #4, block #5, and block #6 as well, phase is changed in an unbiased manner. Accordingly, in block #1, block #2, block #3, block #4, block #5, and block #6, since it is possible to achieve a sufficient advantageous effect with the phase change, it is possible to achieve an advantageous effect of increase data quality of the reception device, which is the partner (communication partner).

Figure 26:
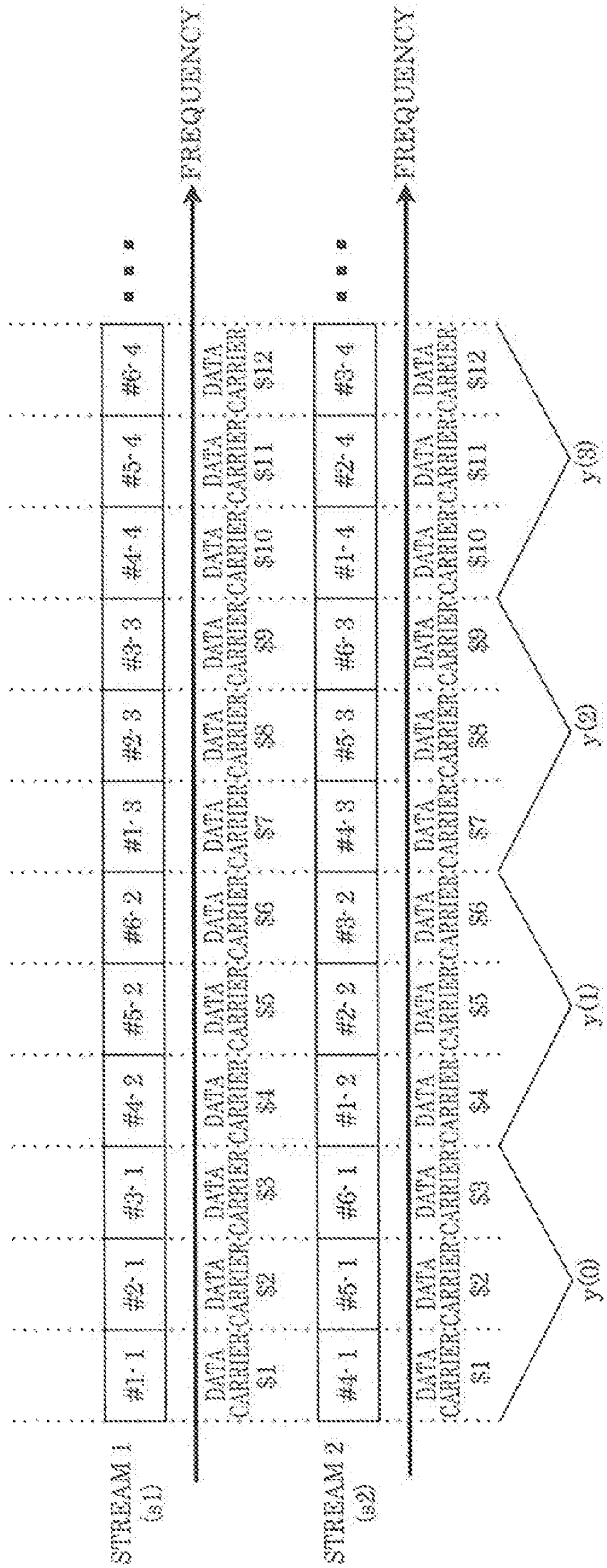
FIG. 26 illustrates an example of phase change value allocation.

FIG. 26 illustrates an example of how phase change value y(i) is assigned "when data is arranged in data carriers such as in FIG. 17". The example illustrated in FIG. 26 is different from the example illustrated in FIG. 25. As illustrated in FIG. 26, in data carrier $1, when phase change is performed using y(0), phase change is performed using y(0) for data carrier $2 and data carrier $3 as well.

Similarly, in data carrier $4, when phase change is performed using y(1), phase change is performed using y(1) for data carrier $5 and data carrier $6 as well.

In data carrier $7, when phase change is performed using y(2), phase change is performed using y(2) for data carrier $8 and data carrier $9 as well.

In data carrier $10, when phase change is performed using y(3), phase change is performed using y(3) for data carrier $11 and data carrier $12 as well.

In other words, for data carrier $(3×k+1), data carrier $(3×k+2), and data carrier $(3×k+3), phase change is performed using the same phase change value (in FIG. 26, y(k)). k is an integer that is greater than or equal to 0.

With this, with respect to block #1, phase is changed in an unbiased manner, and with respect to block #2, block #3, block #4, block #5, and block #6 as well, phase is changed in an unbiased manner. Accordingly, in block #1, block #2, block #3, block #4, block #5, and block #6, since it is possible to achieve a sufficient advantageous effect with the phase change, it is possible to achieve an advantageous effect of increase data quality of the reception device, which is the partner (communication partner).

Next, application of the phase change value y(i) will be described.

Equation (2) illustrates an example of how a phase change is applied. Another method includes, for example, making phase change value y(i) periodic. For example, when the period is expressed as V (V is an integer that is greater than or equal to 2), there is a method whereby the following equation holds true.

[MATH. 43]

$$y(i)=y(i \bmod V) \qquad \text{Equation (43)}$$

Note that in Equation (43), i mod V means the remainder when i is divided by V. Take the following method for example.

[MATH. 44]

$$y(i)=y\left(\frac{i \bmod V}{2\pi\times V}\right) \qquad \text{Equation (44)}$$

Note that the period V method is not limited to the method applied in Equation (44). For example, V phase change values {Y(0), Y(1) . . . Y(V−2), Y(V−1)} may be applied, the V phase change values are different values, and these V phase change values may be switched regularly in period V.

Moreover, V phase change values {Y(0), Y(1) . . . Y(V−2), Y(V−1)} may be applied, and among the V phase change values {Y(0), Y(1) . . . Y(V−2), Y(V−1)}, some are the same values. In this case, these V phase change values may be switched regularly in period V.

A specific example will be given. Assume period V=5 and phase change values {Y(0), Y(1), Y(2), Y(3), Y(4)} are applied as follows.

[MATH. 45]

$$\left\{Y(0)=e^{j0},\ Y(1)=e^{j0},\ Y(2)=e^{j\pi},\ Y(3)=e^{j\pi},\ Y(4)=e^{j\frac{\pi}{2}},\right\} \qquad \text{Equation (45)}$$

And

[MATH. 46]

$$y(i)=Y(i \bmod 5) \qquad \text{Equation (46)}$$

With this, period 5 can be achieved. Note that i mod 5 means the remainder when i is divided by 5.

Note that in Equation (43), Equation (44), and Equation (46), examples are given in which the phase change values are regularly switched, but the switching does not necessarily need to occur regularly.

For example, assume V=5 and {Y(0), Y(1), Y(2), Y(3), Y(4)}. {y(0)=Y(0), y(1)=Y(1), y(2)=Y(2), y(3)=Y(3), y(4)=Y(4), y(5)=Y(1), y(6)=Y(0), y(7)=Y(4), y(8)=Y(3), y(9)=Y(2), y(10)=Y(4), y(11)=Y(3), y(12)=Y(2), y(13)=Y(1), y(14)=Y(0) . . . }

The arrangement may be as shown above. Note that the arrangement is not limited to this example.

Next, operations performed by the reception device, which is the partner (communication partner), will be described. One example of a frame configuration of the transmission device is given in FIG. 27.

Figure 27:
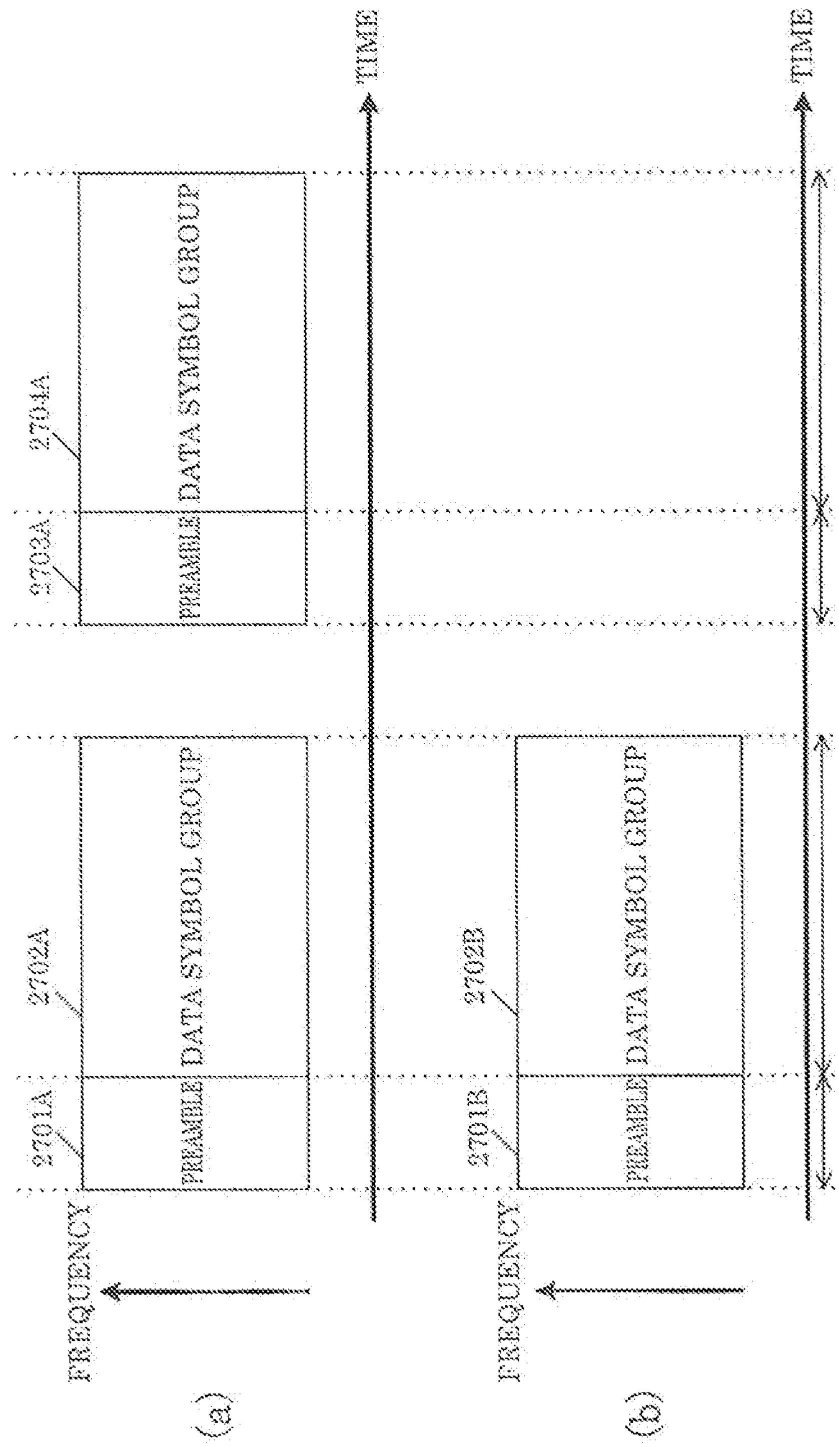
FIG. 27 illustrates an example of a frame configuration of a modulated signal.

In (a) in FIG. 27, a frame configuration of a modulated signal transmitted from antenna 112A illustrated in FIG. 1 is shown, and in (b) in FIG. 27, a frame configuration of a modulated signal transmitted from antenna 112B illustrated in FIG. 1 is shown. In (a) and (b) in FIG. 27, time is represented on the horizontal axis and frequency (carriers) is (are) represented on the vertical axis.

In (a) in FIG. 27, at time $1, preamble 2701A is transmitted. In (b) in FIG. 27, at time $1, preamble 2701B is transmitted. Here, preamble 2701A and preamble 2701B include information such as information on the transmission method, modulation method, and/or error correction code (for example, the encode rate and/or code length) used in the modulated signal transmitted by the transmission device, and the reception device obtains this information, thereby making demodulation and decoding of the data symbol possible. Note that in FIG. 27, the preamble configuration is exemplified by the inclusion of preamble 2701A and preamble 2701B, but a preamble configuration in which only one of preamble 2701A and preamble 2701B is transmitted is acceptable. Moreover, preambles 2701A, 2701B may include a symbol for symbol detection by the reception device, a signal for performing frequency and time synchronization by the reception device, a symbol for performing Automatic Gain Control (AGC) by the reception device, and/or a symbol for the reception device to estimate propagation path fluctuation.

In (a) in FIG. 27, at time $1, data symbol group 2702A is transmitted. In (b) in FIG. 27, at time $2, data symbol group 2702B is transmitted. Note that data symbol group 2702A and data symbol group 2702B may include a symbol other than a data symbol, such as a pilot symbol for performing channel estimation. Moreover, data symbol groups 2702A, 2702B are transmitted at the same time, using the same frequency. Data symbol groups 2702A, 2702B conform to the data symbol arrangement and data arrangement described above. When phase change is to be performed, phase change such as described above may be performed.

In (a) in FIG. 27, at time $3, preamble 2703A is transmitted. At time $4, data symbol group 2704A is transmitted. Note that the configurations of the preamble and data symbol group are as described above. Note that no symbol is arranged at time $3 and time $4 in (b) in FIG. 27, but a symbol corresponding to preamble 2703A may be transmitted from antenna 112B illustrated in FIG. 1, and a symbol corresponding to data symbol group 2704A may be transmitted from antenna 112B illustrated in FIG. 1.

Figure 28:
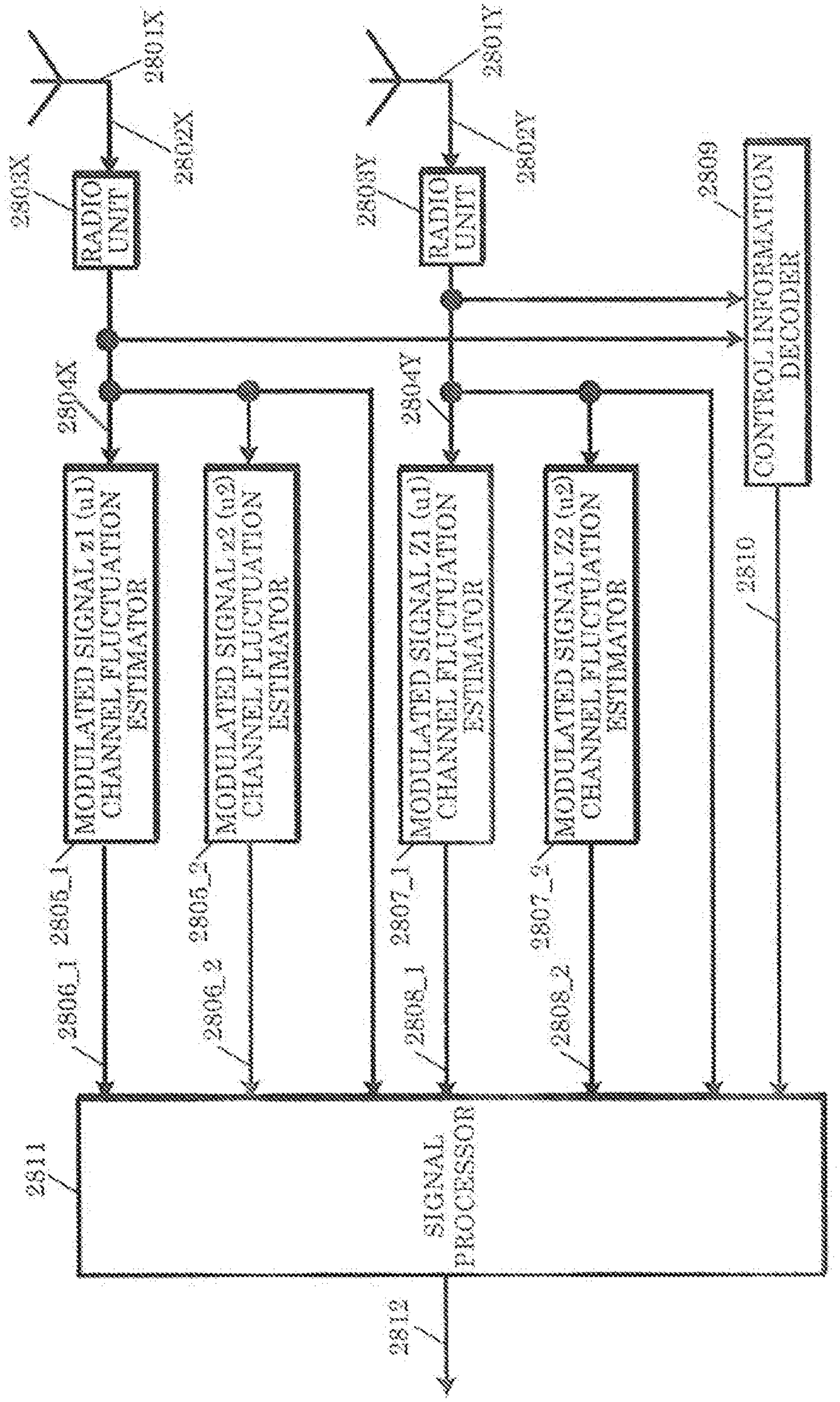
FIG. 28 illustrates an example of a configuration of a reception device.

FIG. 28 is a block diagram illustrating one example of a configuration of a reception device, which is the partner (communication partner).

Radio unit 2803X receives an input of reception signal 2802X received by antenna 2801X, performs processing such as frequency conversion, and outputs reception baseband signal 2804X.

Radio unit 2803Y receives an input of reception signal 2802Y received by antenna 2801Y, performs processing such as frequency conversion, and outputs reception baseband signal 2804Y.

Modulated signal z1, u1 channel fluctuation estimator 2805_1 receives an input of reception baseband signal 2804X, performs channel estimation for modulated signal z1(*i*) or modulated signal u1(*i*) described above by using, for example, the pilot symbol included in reception baseband signal 2804X, and outputs channel estimation signal 2806_1.

Modulated signal z2, u2 channel fluctuation estimator 2805_2 receives an input of reception baseband signal 2804X, performs channel estimation for modulated signal z2(*i*) or modulated signal u2(*i*) described above by using, for example, the pilot symbol included in reception baseband signal 2804X, and outputs channel estimation signal 2806_2.

Modulated signal z1, u1 channel fluctuation estimator 2807_1 receives an input of reception baseband signal 2804Y, performs channel estimation for modulated signal z1(*i*) or modulated signal u1(*i*) described above by using, for example, the pilot symbol included in reception baseband signal 2804X, and outputs channel estimation signal 2808_1.

Modulated signal z2, u2 channel fluctuation estimator 2807_2 receives an input of reception baseband signal 2804Y, performs channel estimation for modulated signal z2(*i*) or modulated signal u2(*i*) described above by using, for example, the pilot symbol included in reception baseband signal 2804X, and outputs channel estimation signal 2808_2.

Control information decoder 2809 receives inputs of reception baseband signal 2804X and reception baseband signal 2804Y, demodulates and decodes a preamble illustrated in FIG. 27, and outputs control information signal 2810.

Signal processor 2811 receives inputs of channel estimation signals 2806_1, 2806_2, 2808_1, and 2808_2; reception baseband signals 2804X and 2804Y; and control information signal 2810, rearranges data (rearranges data symbols) based on the data symbol arrangement described above, in accordance with control information signal 2810, performs demodulation/decoding based on information on transmission parameters included in control information signal 2810, and obtains and outputs data 2812. Transmission parameters indicate, for example, at least one of a transmission method, modulation method, or error correction code.

As described above, by arranging data in the data carriers in accordance with this embodiment, it is possible to achieve an advantageous effect of increasing data reception quality in a reception device, which is the partner (communication partner), and it is possible to achieve an advantageous effect of increasing data reception quality in a reception device, which is the partner (communication partner) by performing phase change as described above.

Embodiment 2

In this embodiment, an example will be given of a method of selecting a plurality of antennas to be used to transmit a plurality of modulated signals by a transmission device in, for example, a MIMO transmission method of transmitting a plurality of modulated signals from a plurality of antennas, including Embodiment 1.

First, an outline of the configuration of the transmission device will be given. In this embodiment, a case will be considered in which communications station #1 illustrated in FIG. 29 and communications station #2 illustrated in FIG. 30 communicate with each other.

Figure 29:
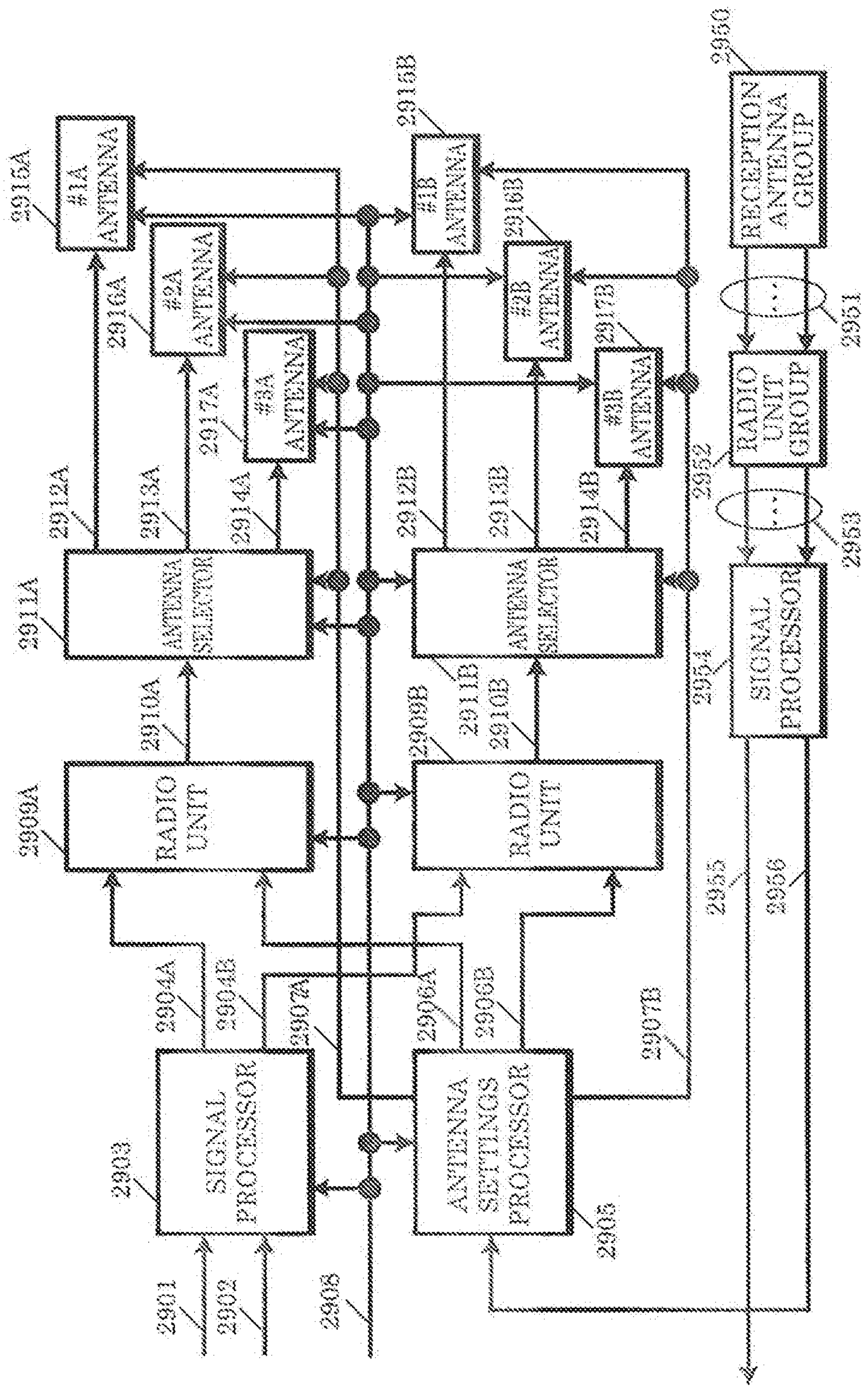
FIG. 29 illustrates an example of a configuration of communications station #1.

FIG. 29 illustrates a configuration of communications station #1.

Radio unit group 2952 receives an input of reception signal group 2951 received by reception antenna group 2950, performs processing such as frequency conversion, and outputs baseband signal group 2953. When radio unit group 2952 uses an OFDM method, radio unit group 2952 may perform signal processing by Fourier transformation.

Signal processor 2954 receives an input of reception baseband signal group 2953, applies processing such as demodulation processing and decoding of the error correction code, and outputs reception data 2955 and/or control information 2956 from the communication partner. Demodulation processing includes processing with respect to the MIMO method, and processing with respect to single modulated signal transmission.

Antenna settings processor 2905 receives inputs of control information 2956 and frame configuration signal 2908 from the communication partner, outputs, based on frame configuration signal 2908, modulated signals 2906A, 2960B to be used for antenna settings, and, outputs antenna control signals 2907A, 2907B including, for example, information such as information on the selected antenna and/or information on weighting pertaining to the antenna, based on, for example, control information 2956 from the communication partner. Note that details regarding the operations will be described later.

Signal processor 2903 receives inputs of transmission data 2901, control information 2902, and frame configuration signal 2908, performs error correction encoding based on information on the error correction method included in control information 2902, and then maps the selected modulation method based on information on the modulation method included in control information 2902, applies signal processing based on the transmission method included in control information 2902, and outputs modulated signals 2904A and 2904B. Note that signal processor 2903 need not necessarily output both modulated signals 2904A and 2904B; signal processor 2903 may output one or the other of modulated signals 2904A and 2904B. Information on the error correction method includes at least one of, for example, type of error correction code, code length of the error correction code, and the encode rate of the error correction code. The transmission method corresponds to, for example, MIMO transmission method or SISO transmission method.

Radio unit 2909A receives inputs of modulated signal 2904A, antenna settings modulated signal 2906A, and frame configuration signal 2908, performs processing such as frequency conversion and/or amplification on either one of modulated signal 2904A or antenna settings modulated signal 2906A in accordance with information on the frame configuration included in frame configuration signal 2908, and outputs transmission signal 2910A.

Similarly, radio unit 2909B receives inputs of modulated signal 2904B, antenna settings modulated signal 2906B, and frame configuration signal 2908, performs processing such as frequency conversion and/or amplification on either one of modulated signal 2904B or antenna settings modulated signal 2906B in accordance with information on the frame configuration included in frame configuration signal 2908, and outputs transmission signal 2910B.

Note that details regarding the frame configurations of transmission signals 2910A, 2910B will be described later.

Antenna selector 2911A receives inputs of transmission signal 2910A, frame configuration signal 2908, and antenna control signal 2907A, selects an antenna in accordance with frame configuration signal 2908 and antenna control signal 2907A, controls the timing of the switching of the antennas, and outputs transmission signal 2910A with respect to any one of 2912A, 2913A, and 2914A. Then signal 2912A is output from #1A antenna unit 2915A as radio waves, signal 2913A is output from #2A antenna unit 2916A as radio waves, and signal 2914A is output from #3A antenna unit 2917A.

Note that #1A antenna unit 2915A, #2A antenna unit 2916A, and #3A antenna unit 2917A each include, for example, a plurality of antennas. #1A antenna unit 2915A receives inputs of frame configuration signal 2908 and antenna control signal 2907A, weights the antennas in accordance with frame configuration signal 2908 and antenna control signal 2907A, or changes the phase parameters at an appropriate time.

Similarly, #2A antenna unit 2916A receives inputs of frame configuration signal 2908 and antenna control signal 2907A, weights the antennas in accordance with frame configuration signal 2908 and antenna control signal 2907A, or changes the phase parameters at an appropriate time.

#3A antenna unit 2917A receives inputs of frame configuration signal 2908 and antenna control signal 2907A, weights the antennas in accordance with frame configuration signal 2908 and antenna control signal 2907A, or changes the phase parameters at an appropriate time.

Antenna selector 2911B receives inputs of transmission signal 2910B, frame configuration signal 2908, and antenna control signal 2907B, selects an antenna in accordance with frame configuration signal 2908 and antenna control signal 2907B, controls the timing of the switching of the antennas, and outputs transmission signal 2910B with respect to any one of 2912B, 2913B, and 2914B. Then signal 2912B is output from #1B antenna unit 2915B as radio waves, signal 2913B is output from #2B antenna unit 2916B as radio waves, and signal 2914B is output from #3B antenna unit 2917B.

Note that #1B antenna unit 2915B, #2B antenna unit 2916B, and #3B antenna unit 2917B each include, for example, a plurality of antennas. #1B antenna unit 2915B receives inputs of frame configuration signal 2908 and antenna control signal 2907B, weights the antennas in accordance with frame configuration signal 2908 and antenna control signal 2907B, or changes the phase parameters at an appropriate time.

#2B antenna unit 2916B receives inputs of frame configuration signal 2908 and antenna control signal 2907B, weights the antennas in accordance with frame configuration signal 2908 and antenna control signal 2907B, or changes the phase parameters at an appropriate time.

#3B antenna unit 2917B receives inputs of frame configuration signal 2908 and antenna control signal 2907B, weights the antennas in accordance with frame configuration signal 2908 and antenna control signal 2907B, or changes the phase parameters at an appropriate time.

Note that in FIG. 29, as one example, six transmitting antenna units are provided, but this is merely one example; the number of transmitting antenna units is not limited to this number.

Figure 30:
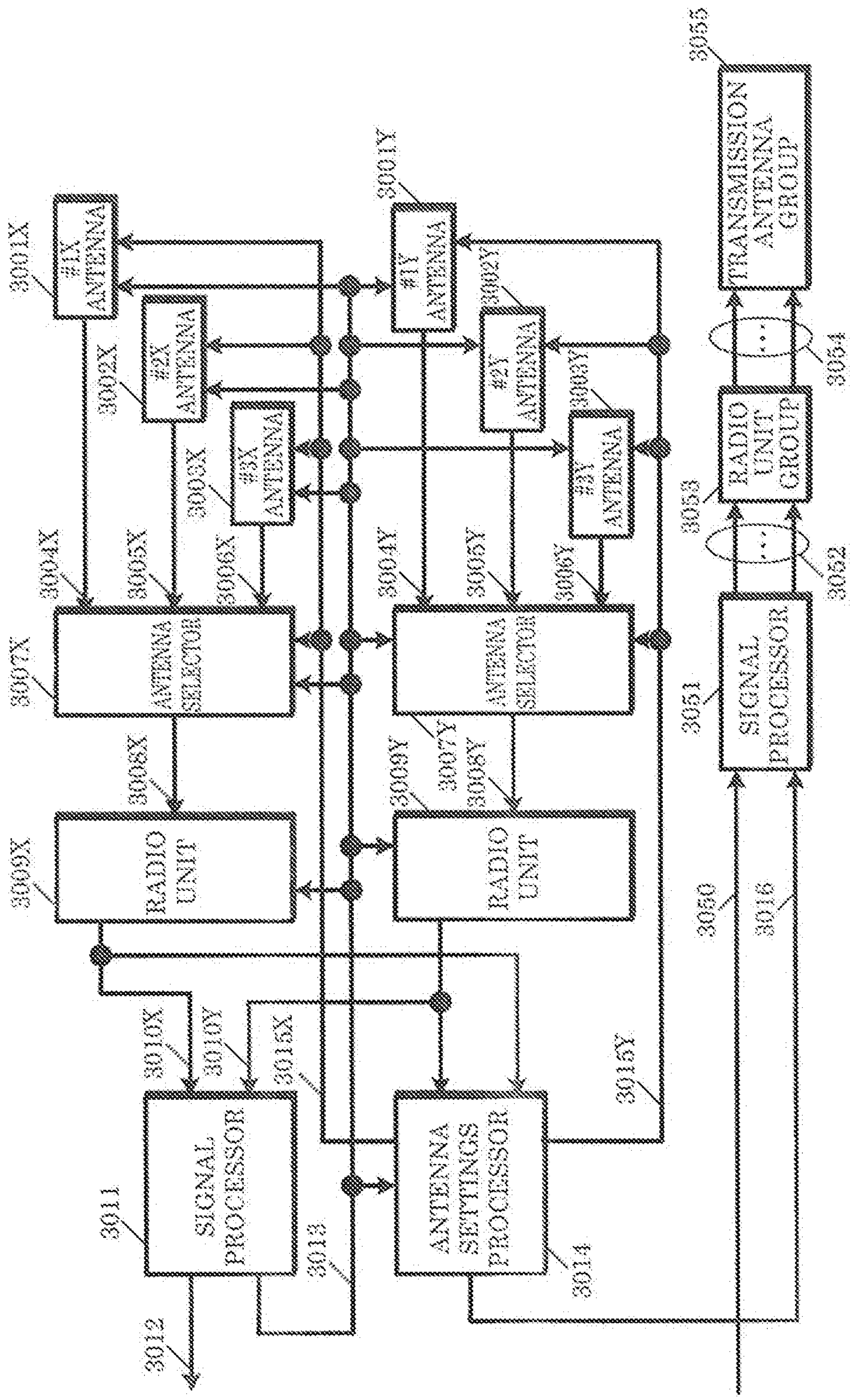
FIG. 30 illustrates an example of a configuration of communications station #2.

FIG. 30 illustrates a configuration of communications station #2.

Antenna selector 3007X receives inputs of reception signal 3004X received by #1X antenna unit 3001X, reception signal 3005X received by #2X antenna unit 3002X, and reception signal 3006X received by #3X antenna unit 3003X, and also receives inputs of control information 3013 and antenna control signal 3015X. Antenna selector 3007X selects an antenna at an appropriate time in accordance with control information 3013 and antenna control signal 3015X, selects any one of reception signals 3004X, 3005X, and 3006X, and outputs it as reception signal 3008X. Note that details regarding the selection of the antenna will be described later.

Similarly, antenna selector 3007Y receives inputs of reception signal 3004Y received by #1Y antenna unit 3001Y, reception signal 3005Y received by #2Y antenna unit 3002Y, and reception signal 3006Y received by #3Y antenna unit 3003Y, and also receives inputs of control information 3013 and antenna control signal 3015Y. Antenna selector 3007Y selects an antenna at an appropriate time in accordance with control information 3013 and antenna control signal 3015Y, selects any one of reception signals 3004Y, 3005Y, and 3006Y, and outputs it as reception signal 3008Y. Note that details regarding the selection of the antenna will be described later.

Note that #1X antenna unit 3001X, #2X antenna unit 3002X, #3X antenna unit 3003X, #1Y antenna unit 3001Y, #2Y antenna unit 3002Y, and #3Y antenna unit 3003Y each include, for example, a plurality of antennas

#1X antenna unit 3001X receives inputs of control information 3013 and antenna control signal 3015X, weights the antennas in accordance with control information 3013 and antenna control signal 3015X, or changes phase parameters as an appropriate time.

Similarly, #2X antenna unit 3002X receives inputs of control information 3013 and antenna control signal 3015X, weights the antennas in accordance with control information 3013 and antenna control signal 3015X, or changes phase parameters as an appropriate time.

#3X antenna unit 3003X receives inputs of control information 3013 and antenna control signal 3015X, weights the antennas in accordance with control information 3013 and antenna control signal 3015X, or changes phase parameters as an appropriate time.

#1Y antenna unit 3001Y receives inputs of control information 3013 and antenna control signal 3015X, weights the antennas in accordance with control information 3013 and antenna control signal 3015X, or changes phase parameters as an appropriate time.

#2Y antenna unit 3002Y receives inputs of control information 3013 and antenna control signal 3015X, weights the antennas in accordance with control information 3013 and antenna control signal 3015X, or changes phase parameters as an appropriate time.

#3Y antenna unit 3003Y receives inputs of control information 3013 and antenna control signal 3015X, weights the antennas in accordance with control information 3013 and antenna control signal 3015X, or changes phase parameters as an appropriate time.

Radio unit 3009X receives inputs of reception signal 3008X and control information 3013, applies processing such as frequency conversion to reception signal 3008X based on information included in the control information such as information on the transmission method and/or information related to the frame configuration, and outputs baseband signal 3010X. When radio unit 3009X uses an OFDM method, radio unit 3009X may apply a Fourier transform, for example.

Similarly, radio unit 3009Y receives inputs of reception signal 3008Y and control information 3013, applies processing such as frequency conversion to reception signal 3008Y based on information included in the control information such as information on the transmission method and/or information related to the frame configuration, and outputs baseband signal 3010Y. When radio unit 3009Y uses an OFDM method, radio unit 3009Y may apply a Fourier transform, for example.

Signal processor 3011 receives inputs of baseband signals 3010X, 3010Y, obtains the transmission method of the modulated signal transmitted by communications station #1, which is the communication partner, from control information included in the baseband signal, and based on this, demodulates and decodes baseband signals 3010X, 3010Y, and outputs reception data and control information 3013. The transmission method of the modulated signal transmitted by communications station #1 indicates, for example, information related to the frame configuration, information related to "transmission of a plurality of modulated signals or transmission of a single modulated signal", and in the case of transmission of a plurality of modulated signals, indicates information related to that transmission method, information related to the modulation method used, and information related to the error correction code used (type of error correction code, code length, encode rate).

Antenna settings processor 3014 receives inputs of baseband signals 3010X, 3010Y and control information 3013, detects a signal required for antenna settings from information related to the frame configuration in control information 3013, and outputs antenna control signals 3015X, 3015Y and antenna-related information 3016. Note that antenna control signals 3015X, 3015Y include information related to weighting pertaining to reception antennas or phase change parameters, and information related to the timing of the switching of the reception antennas, and antenna-related information 3016 includes antenna information for transmission of a modulated signal by communications station #1.

Signal processor 3051 receives inputs of transmission data 3050 and antenna-related information 3016, performs processing such as error correction encoding and/or modulation on these, and outputs modulated signal group 3052.

Radio unit group 3053 receives an input of modulated signal group 3952, performs processing such as frequency conversion and/or amplification, and outputs transmission signal group 3054. Transmission signal group 3054 is output as radio waves from transmitting antenna group 3055.

Note that in FIG. 30, as one example, six reception antenna units are provided, but this is merely one example; the number of reception antenna units is not limited to this number.

Figure 31:
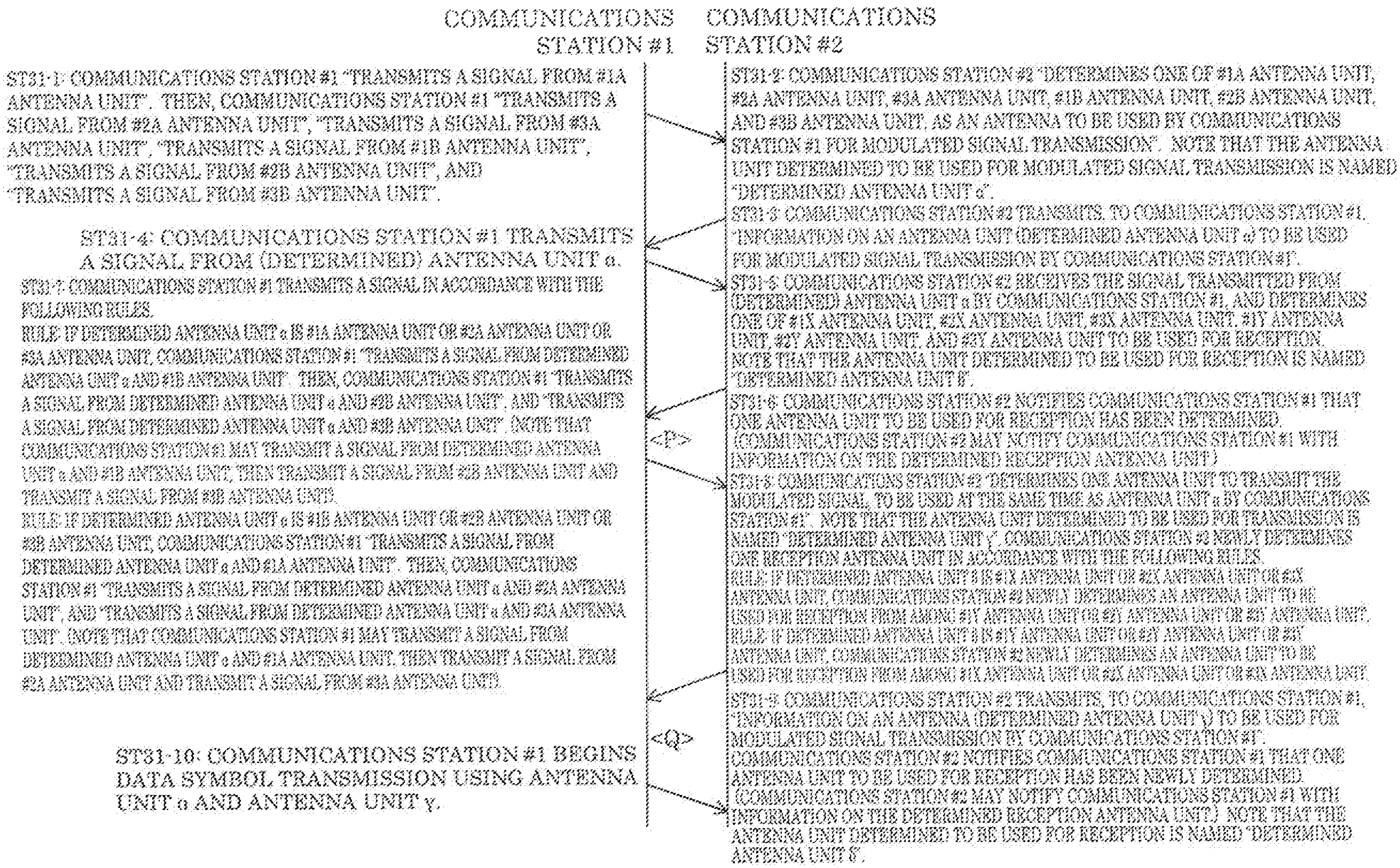
FIG. 31 illustrates an example of communication between communications station #1 and communications station #2.

Next, with reference to FIG. 31, one example of communication between communications station #1 and communications station #2 will be given.

Example 1 of communication between communications station #1 and communications station #2:

Step ST31-1:

Communications station #1 transmits a signal from #1A antenna unit 2915A illustrated in FIG. 29. Then, communications station #1 transmits a signal from #2A antenna unit 2916A, transmits a signal from #3A antenna unit 2917A, transmits a signal from #1B antenna unit 2915B, transmits a signal from #2B antenna unit 2916B, and transmits a signal from #3B antenna unit 2917B.

Step ST31-2:

Communications station #2 receives the modulated signal transmitted in Step ST31-1, and determines "one of #1A antenna unit 2915A, #2A antenna unit 2916A, #3A antenna unit 2917A, #1B antenna unit 2915B, #2B antenna unit 2916B, and #3B antenna unit 2917B as an antenna for modulated signal transmission by communications station #1". Note that, here, the antenna unit determined to be used for the transmission is named "determined antenna unit α".

Step ST31-3:

Communications station #2 transmits, to communications station #1, "information on an antenna for modulated signal transmission by communications station #1 (i.e., information on determined antenna unit α)".

Step ST31-4:

Communications station #1 transmits a signal from determined antenna unit α.

Step ST31-5:

Communications station #2 receives the signal transmitted from determined antenna unit α by communications station #1, and determines one of #1X antenna unit 3001X, #2X antenna unit 3002X, #3X antenna unit 3003X, #1Y antenna unit 3001Y, #2Y antenna unit 3002Y, and #3Y antenna unit 3003Y illustrated in FIG. 30 to be used for reception as a reception antenna unit. Note that, here, the antenna unit determined to be used for reception is named "determined antenna unit β".

Step ST31-6:

Communications station #1 is notified that one reception antenna unit to be used for reception has been determined. Here, communications station #1 may be notified with information on the determined reception antenna.

Step ST31-7:

Communications station #1 transmits a signal in accordance with the following rules.

Rule: if determined antenna unit α is #1A antenna unit 2915A or #2A antenna unit 2916A or #3A antenna unit 2917A, communications station #1 "transmits a signal from determined antenna unit α and #1B antenna unit 2915B". Then, communications station #1 "transmits a signal from determined antenna unit α and #2B antenna unit 2916B", and then "transmits a signal from determined antenna unit α and #3B antenna unit 2917B". Note that communications station #1 may transmit a signal from determined antenna unit α and #1B antenna 2915B, and then transmit a signal from #2B antenna 2916B, and then transmit a signal from #3B antenna 2917B.

Rule: if determined antenna unit α is #1B antenna unit 2915B or #2B antenna unit 2916B or #3B antenna unit 2917B, communications station #1 "transmits a signal from determined antenna unit α and #1A antenna unit 2915A". Then, communications station #1 "transmits a signal from determined antenna unit α and #2A antenna unit 2916A", and then "transmits a signal from determined antenna unit α and #3A antenna unit 2917A". Note that communications station #1 may transmit a signal from determined antenna unit α and #1A antenna 2915A, and then transmit a signal from #2A antenna 2916A, and then transmit a signal from #3A antenna 2917A.

Step ST31-8:

Communications station #2:

"determines one antenna unit to transmit the modulated signal, to be used at the same time as antenna unit α by communications station #1". Note that the antenna unit determined to be used for transmission is named "determined antenna unit γ".

Communications station #2 newly determines a reception antenna unit in accordance with the following rules.

Rule: if determined antenna unit β is #1X antenna unit 3001X or #2X antenna unit 3002X or #3X antenna unit 3003X, communications station #2 determines one of #1Y antenna unit 3001Y, #2Y antenna unit 3002Y, and #3Y antenna unit 3003Y to be the new antenna to be used for reception.

Rule: if determined antenna unit β is #1Y antenna unit 3001Y or #2Y antenna unit 3002Y or #3Y antenna unit 3003Y, communications station #2 determines one of #1X antenna unit 3001X, #2X antenna unit 3002X, and #3X antenna unit 3003X to be the new antenna to be used for reception.

Step ST31-9:

Communications station #2 transmits, to communications station #1, "information on an antenna for modulated signal transmission by communications station #1 (i.e., information on determined antenna unit γ)".

Communications station #2 notifies communications station #1 that one reception antenna unit to be used for reception has been newly determined.

Communications station #2 may notify communications station #1 with information on the determined reception antenna unit. Note that, here, the antenna unit determined to be used for reception is named "antenna unit δ".

Step ST31-10:

Communications station #1 starts data symbol transmission using antenna unit α and antenna unit γ. Communications station #1 starts transmission of two modulated signals using antenna unit α and antenna unit γ.

Figure 32:
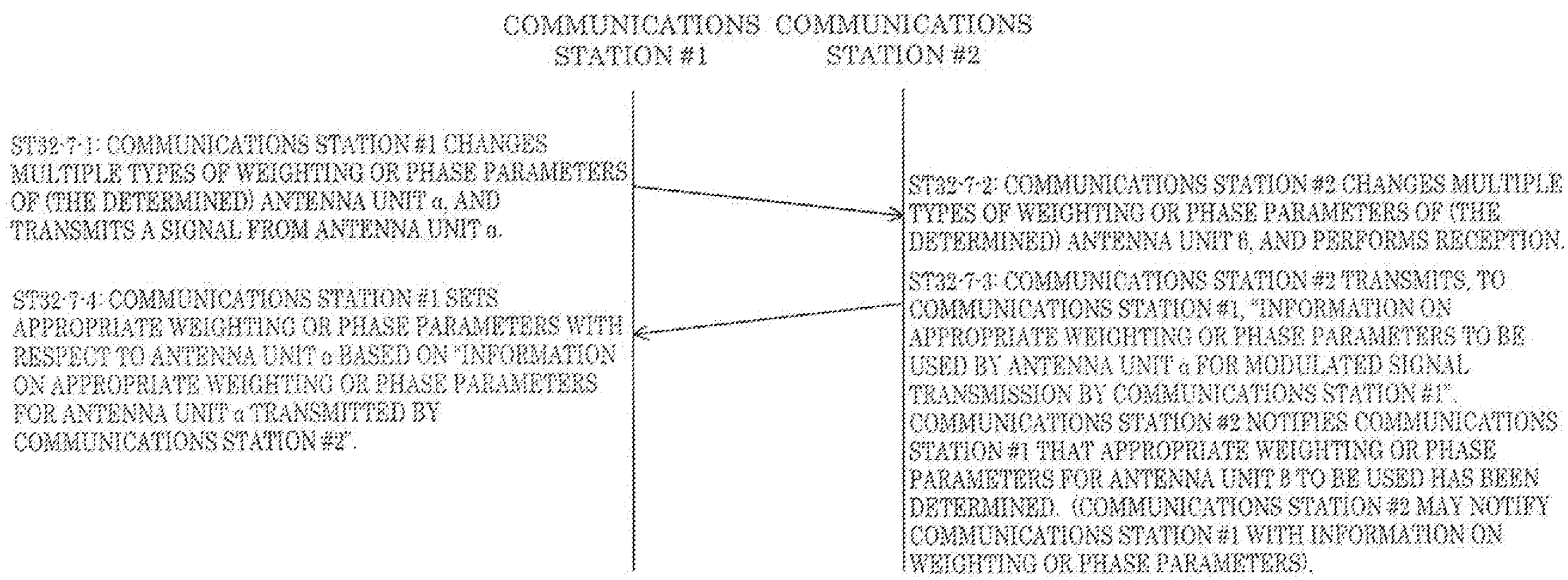
FIG. 32 illustrates an example of communication between communications station #1 and communications station #2.
Figure 33:
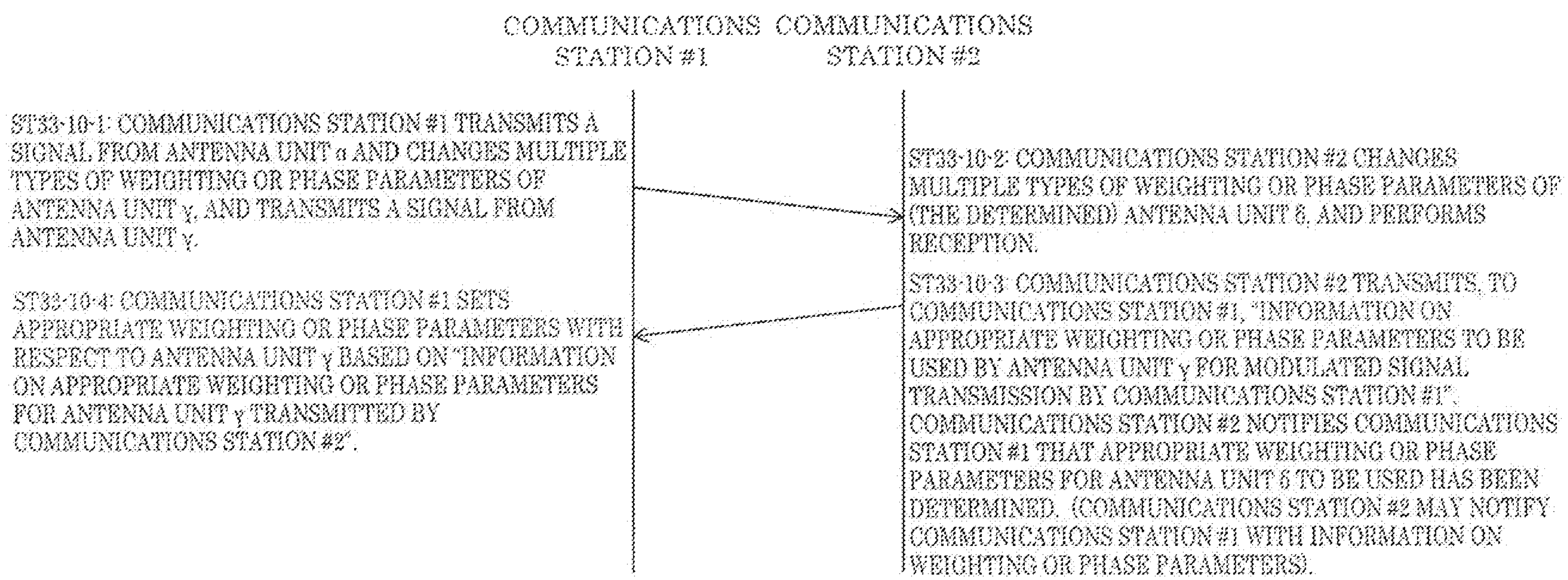
FIG. 33 illustrates an example of communication between communications station #1 and communications station #2.

Example 1 of communication between communications station #1 and communications station #2 has been described with reference to FIG. 31, but the processing in FIG. 32 may be inserted at <P> in FIG. 31, and the processing in FIG. 33 may be inserted at <Q> in FIG. 31. In such a case, communication between communications station #1 and communications station #2 is as follows.

Example 2 of communication between communications station #1 and communications station #2:

Step ST31-1:

Communications station #1 transmits a signal from #1A antenna unit 2915A illustrated in FIG. 29. Then, communications station #1 transmits a signal from #2A antenna unit 2916A, transmits a signal from #3A antenna unit 2917A, transmits a signal from #1B antenna unit 2915B, transmits a signal from #2B antenna unit 2916B, and transmits a signal from #3B antenna unit 2917B.

Step ST31-2:

Communications station #2 receives the modulated signal transmitted in Step ST31-1, and determines "one of #1A antenna unit 2915A, #2A antenna unit 2916A, #3A antenna unit 2917A, #1B antenna unit 2915B, #2B antenna unit 2916B, and #3B antenna unit 2917B as an antenna for modulated signal transmission by communications station #1". Note that, here, the antenna unit determined to be used for the transmission is named "determined antenna unit α".

Step ST31-3:

Communications station #2 transmits, to communications station #1, "information on an antenna for modulated signal transmission by communications station #1 (i.e., information on determined antenna unit α)".

Step ST31-4:

Communications station #1 transmits a signal from determined antenna unit α.

Step ST31-5:

Communications station #2 receives the signal transmitted from determined antenna unit α by communications station #1, and determines one of #1X antenna unit 3001X, #2X antenna unit 3002X, #3X antenna unit 3003X, #1Y antenna unit 3001Y, #2Y antenna unit 3002Y, and #3Y antenna unit 3003Y illustrated in FIG. 30 to be used for reception as a reception antenna unit. Note that, here, the antenna unit determined to be used for reception is named "determined antenna unit β".

Step ST31-6:

Communications station #1 is notified that one reception antenna unit to be used for reception has been determined. Here, communications station #1 may be notified with information on the determined reception antenna.

Step ST32-7-1: (See FIG. 32)

Communications station #1 changes multiple types of weighting or phase parameters of (the determined) antenna unit α, and transmits a signal from antenna unit α.

Step ST32-7-2: (See FIG. 32)

Communications station #2 changes multiple types of weighting or phase parameters of (the determined) antenna unit β, and performs reception.

Step ST32-7-3: (See FIG. 32)

Communications station #2 transmits, to communications station #1, "information on appropriate weighting or phase parameters to be used by antenna unit α for modulated signal transmission by communications station #1". Communications station #2 notifies communications station #1 that appropriate weighting or phase parameters for the antenna unit to be used has been determined. Communications station #1 may be notified with information on weighting or phase parameters.

Step ST32-7-4: (See FIG. 32)

Communications station #1 sets appropriate weighting or phase parameters with respect to antenna unit α based on "information on appropriate weighting or phase parameters for antenna unit α transmitted by communications station #2".

Step ST31-7:

Communications station #1 transmits a signal in accordance with the following rules.

Rule: if determined antenna unit α is #1A antenna unit 2915A or #2A antenna unit 2916A or #3A antenna unit 2917A, communications station #1 "transmits a signal from determined antenna unit α and #1B antenna unit 2915B". Then, communications station #1 "transmits a signal from determined antenna unit α and #2B antenna unit 2916B", and then "transmits a signal from determined antenna unit α and #3B antenna unit 2917B". Note that communications station #1 may transmit a signal from determined antenna unit α and #1B antenna 2915B, and then transmit a signal from #2B antenna 2916B, and then transmit a signal from #3B antenna 2917B.

Rule: if determined antenna unit α is #1B antenna unit 2915B or #2B antenna unit 2916B or #3B antenna unit 2917B, communications station #1 "transmits a signal from determined antenna unit α and #1A antenna unit 2915A". Then, communications station #1 "transmits a signal from determined antenna unit α and #2A antenna unit 2916A", and then "transmits a signal from determined antenna unit α and #3A antenna unit 2917A". Note that communications station #1 may transmit a signal from determined antenna unit α and #1A antenna 2915A, and then transmit a signal from #2A antenna 2916A, and then transmit a signal from #3A antenna 2917A.

Step ST31-8:

Communications station #2:

"determines one antenna unit to transmit the modulated signal, to be used at the same time as antenna unit α by communications station #1". Note that the antenna unit determined to be used for transmission is named "determined antenna unit γ".

Communications station #2 newly determines a reception antenna unit in accordance with the following rules.

Rule: if determined antenna unit β is #1X antenna unit 3001X or #2X antenna unit 3002X or #3X antenna unit 3003X, communications station #2 determines one of #1Y antenna unit 3001Y, #2Y antenna unit 3002Y, and #3Y antenna unit 3003Y to be the new antenna to be used for reception.

Rule: if determined antenna unit β is #1Y antenna unit 3001Y or #2Y antenna unit 3002Y or #3Y antenna unit 3003Y, communications station #2 determines one of #1X antenna unit 3001X, #2X antenna unit 3002X, and #3X antenna unit 3003X to be the new antenna to be used for reception.

Step ST31-9:

Communications station #2 transmits, to communications station #1, "information on an antenna for modulated signal transmission by communications station #1 (i.e., information on determined antenna unit γ)".

Communications station #2 notifies communications station #1 that one reception antenna unit to be used for reception has been newly determined. Communications station #2 may notify communications station #1 with information on the determined reception antenna unit. Note that, here, the antenna unit determined to be used for reception is named "antenna unit δ".

Step ST33-10-1: (See FIG. 33)

Communications station #1 transmits a signal from antenna unit α and changes multiple types of weighting or phase parameters of antenna unit γ, and transmits a signal from antenna unit γ.

Step ST33-10-2: (See FIG. 33)

Communications station #2 changes multiple types of weighting or phase parameters of (the determined) antenna unit δ, and performs reception.

Step ST33-10-3: (See FIG. 33)

Communications station #2 transmits, to communications station #1, "information on appropriate weighting or phase parameters to be used by antenna unit γ for modulated signal transmission by communications station #1".

Step ST33-10-4: (See FIG. 33)

Communications station #1 sets appropriate weighting or phase parameters with respect to antenna unit γ based on "information on appropriate weighting or phase parameters for antenna unit γ transmitted by communications station #2".

Step ST31-10:

Communications station #1 starts data symbol transmission using antenna unit α and antenna unit γ. Communications station #1 starts transmission of two modulated signals using antenna unit α and antenna unit γ.

Next, an example of a transmission frame of communications station #1 and communications station #2 in the time axis will be given with respect to "Example 1 of communication between communications station #1 and communications station #2".

Figure 34:
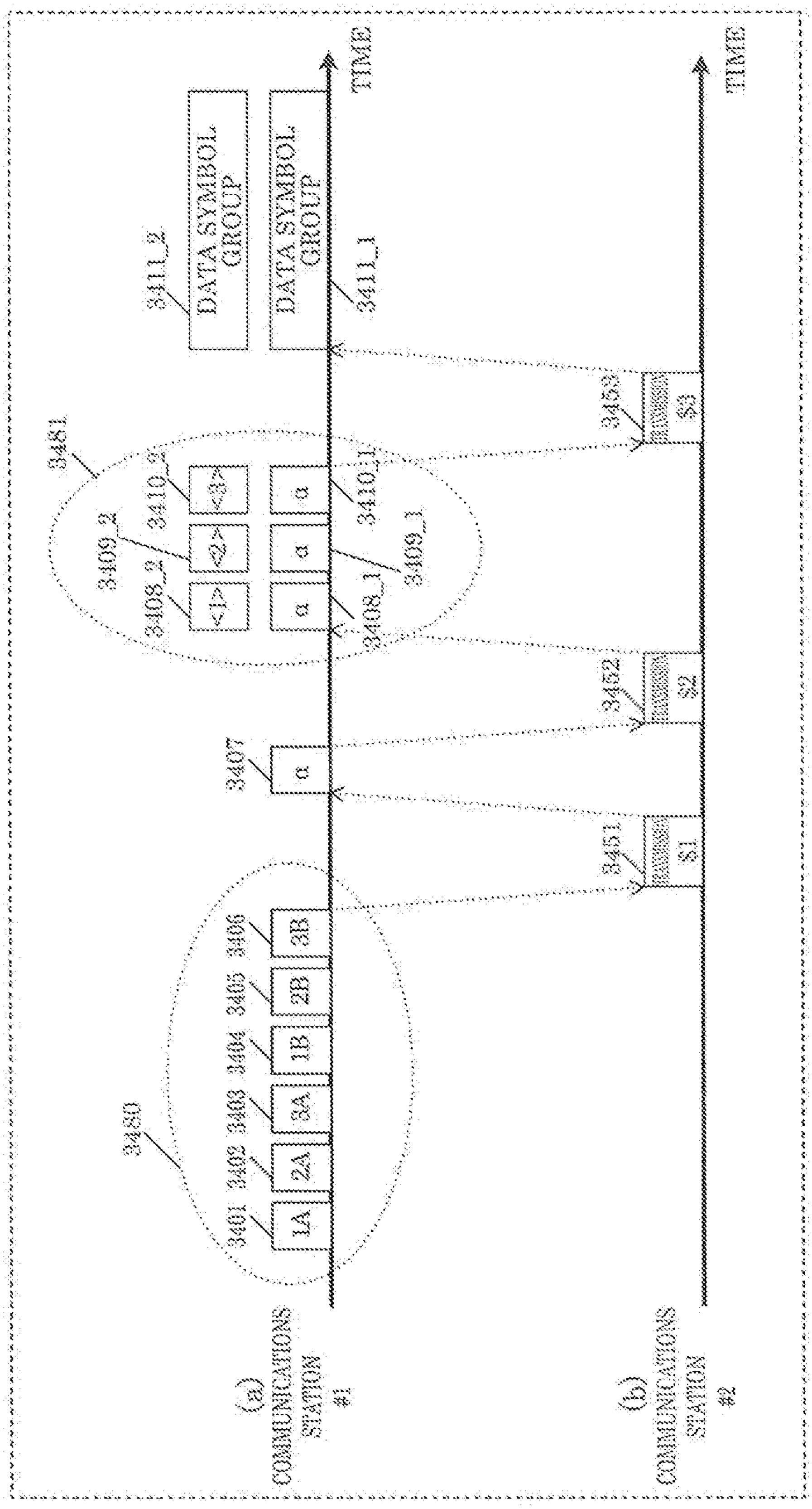
FIG. 34 illustrates an example of transmission frame communication between communications station #1 and communications station #2.

FIG. 34 illustrates an example of a transmission frame of communications station #1 and communications station #2 in the time axis. In (a) in FIG. 34, the transmission frame of communications station #1 in the time axis is shown, and in (b) in FIG. 34, the transmission frame of communications station #2 in the time axis is shown.

Note that in (a) and (b) in FIG. 34, symbols may also be present in the frequency axis.

As illustrated in FIG. 34, first, communications station #1 transmits antenna settings symbol group 3401 from #1A antenna unit 2915A, then transmits antenna settings symbol group 3402 from #2A antenna unit 2916A, antenna settings symbol group 3403 from #3A antenna unit 2917A, antenna settings symbol group 3404 from #1B antenna unit 2915B, antenna settings symbol group 3405 from #2B antenna unit 2916B, and antenna settings symbol group 3406 from #3B antenna unit 2917B. Note that these symbol groups are collectively referred to as antenna settings symbol group 3480.

Communications station #2 receives antenna settings symbol group 3480 transmitted by communications station #1. Then, for example, communications station #2 compares the reception field intensity of antenna settings symbol group 3401 transmitted using #1A antenna unit 2915A, the reception field intensity of antenna settings symbol group 3402 transmitted using #2A antenna unit 2916A, the reception field intensity of antenna settings symbol group 3403 transmitted using #3A antenna unit 2917A, the reception field intensity of antenna settings symbol group 3404 transmitted using #1B antenna unit 2915B, the reception field intensity of antenna settings symbol group 3405 transmitted using #2B antenna unit 2916B, and the reception field intensity of antenna settings symbol group 3406 transmitted using #3B antenna unit 2917B, estimates the antenna unit of communications station #1 whose reception field intensity will increase, and selects an antenna unit that it wants communications station #1 to use to transmit the modulated signal. Then, communications station #2 transmits antenna-related symbol group $1(3451) including information on the selected antenna unit.

Communications station #1 receives antenna-related symbol group $1(3451) transmitted by communications station #2, and based on "information on the selected antenna unit" included in antenna-related symbol group $1(3451) transmitted by communications station #2, determines an antenna unit to be used for modulated signal transmission (i.e., antenna unit α), and transmits antenna settings symbol group 3407 from antenna unit α.

Communications station #2 uses #1X antenna unit 3001X, #2X antenna unit 3002X, #3X antenna unit 3003X, #1Y antenna unit 3001Y, #2Y antenna unit 3002Y, and #3Y antenna unit 3003Y to receive antenna settings symbol group 3407 transmitted by communications station #1, and determines one reception antenna unit to be used for reception. Note that, here, the antenna unit determined to be used for reception is named "determined antenna unit β", as described above. Communications station #2 transmits antenna-related symbol group $2(3452) to notify communications station #1 that one reception antenna unit to be used for reception has been determined. Here, antenna-related symbol group $2(3452) may include information on the determined reception antenna.

Communications station #1 receives antenna-related symbol group $2(3452) transmitted by communications station #2, and is thereby notified of the determination of one antenna unit to be used by communications station #2 for reception. With this, the one antenna unit to be used by communications station #1 for transmission and the one antenna unit to be used by communications station #2 are determined. Accordingly, processing switches to procedures for determining one more antenna unit to be used by communications station #1 for transmission and one more antenna unit to be used by communications station #2 for reception.

In accordance with the following rules, communications station #1 "transmits antenna settings symbol group 3408_1 from antenna unit α, transmits antenna settings symbol group <1>3408_2, transmits antenna settings symbol group 3409_1 from antenna unit α, transmits antenna settings symbol group <2>3409_2, transmits antenna settings symbol group 3410_1 from antenna unit α, and transmits antenna settings symbol group <3>3410_2". These symbol groups are collectively referred to as antenna settings symbol group set 3481. Details regarding the transmission method of antenna settings symbol group set 3481 will be described later.

Rule: if determined antenna unit α is #1A antenna unit 2915A or #2A antenna unit 2916A or #3A antenna unit 2917A, communications station #1 "transmits antenna settings symbol group 3408_1 from determined antenna unit α, and transmits antenna settings symbol group <1>3408_2 from #1B antenna unit 2915B". Then, communications station #1 "transmits antenna settings symbol group 3409_1 from determined antenna unit α and transmits antenna settings symbol group <2>3409_2 from #2B antenna unit 2916B", and "transmits antenna settings symbol group 3410_1 from determined antenna unit α and transmits antenna settings symbol group <3>3410_2 from #3B antenna unit 2917B".

Note that communications station #1 may transmit antenna settings symbol group 3408_1 from determined antenna unit α and transmit antenna settings symbol group <1>3408_2 from #1B antenna 2915B, and then transmit antenna settings symbol group <2>3409_2 from #2B antenna 2916B and transmit antenna settings symbol group <3>3410_2 from #3B antenna 2917B. Here, the symbol transmission order is not limited to these examples.

Rule: if determined antenna unit α is #1B antenna unit 2915B or #2B antenna unit 2916B or #3B antenna unit 2917B, communications station #1 "transmits antenna settings symbol group 3408_1 from determined antenna unit α and transmits antenna settings symbol group <1>3408_2 from #1A antenna unit 2915A". Then, communications station #1 "transmits antenna settings symbol group 3409_1 from determined antenna unit α and transmits antenna settings symbol group <2>3409_2 from #2A antenna unit 2916A" and "transmits antenna settings symbol group 3410_1 from determined antenna unit α and transmits antenna settings symbol group <3>3410_2 from #3A antenna unit 2917A".

Note that communications station #1 may transmit antenna settings symbol group 3408_1 from determined antenna unit α and transmit antenna settings symbol group 3408_1 from #1A antenna 2915A, and then transmit antenna settings symbol group <2>3409_2 from #2A antenna 2916A and transmit antenna settings symbol group <3>3410_2 from #3A antenna 2917A. Here, the symbol transmission order is not limited to these examples.

Communications station #2 receives antenna settings symbol group set 3481 transmitted by communications station #1. Then, communications station #2 "determines one antenna unit for modulated signal transmission, to be used at the same time as antenna unit α by communications station #1".

Note that, here, the antenna unit determined to be used for transmission is named "determined antenna unit γ", as described above.

Communications station #2 newly determines a reception antenna unit in accordance with the following rules.

Rule: if determined antenna unit β is #1X antenna unit 3001X or #2X antenna unit 3002X or #3X antenna unit 3003X, communications station #2 determines one of #1Y antenna unit 3001Y, #2Y antenna unit 3002Y, and #3Y antenna unit 3003Y to be the new antenna to be used for reception.

Rule: if determined antenna unit β is #1Y antenna unit 3001Y or #2Y antenna unit 3002Y or #3Y antenna unit 3003Y, communications station #2 determines one of #1X antenna unit 3001X, #2X antenna unit 3002X, and #3X antenna unit 3003X to be the new antenna to be used for reception. Note that the antenna unit determined to be used for reception is named "antenna unit δ".

Communications station #2 transmits, to communications station #1, antenna-related symbol group $3(3453) including "information on an antenna for modulated signal transmission by communications station #1 (i.e., information on determined antenna unit γ)". Here, antenna-related symbol group $3(3453) may include information on the determined reception antenna.

Communications station #1 receives antenna-related symbol group $3(3453) transmitted by communications station #2, determines that the setting of the antenna is complete, and transmits data symbol group 3411_1 and data symbol group 3411_2. Here, data symbol group 3411_1 and data symbol group 3411_2 are transmitted at the same frequency and at the same time. In other words, they are transmitted using the MIMO transmission method exemplified in Embodiment 1. Then, the antennas to be used for modulated signal transmission by communications station #1 are antenna unit α and antenna unit γ. Note that although not recited in the description of data symbol group 3411_1 and data symbol group 3411_2, data symbol group 3411_1 and data symbol group 3411_2 may include symbols other than data symbols, such as symbols from transmitting control information, preambles, pilot symbols, and reference symbols.

Figure 35:
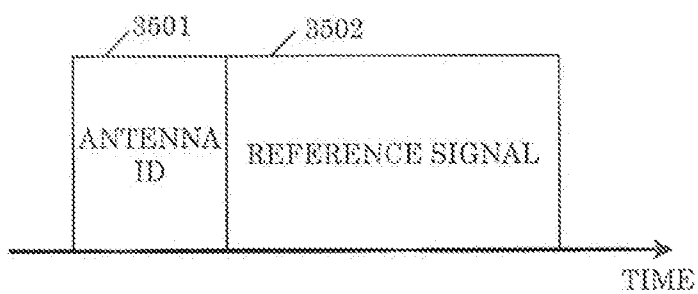
FIG. 35 illustrates an example of a configuration of an antenna settings symbol group.

FIG. 35 is one example of a configuration of antenna settings symbol group 3480. Time is represented on the horizontal axis. Antenna settings symbol group 3401 from #1A antenna unit 2915A, antenna settings symbol group 3402 from #2A antenna unit 2916A, antenna settings symbol group 3403 from #3A antenna unit 2917A, antenna settings symbol group 3404 from #1B antenna unit 2915B, antenna settings symbol group 3405 from #2B antenna unit 2916B, and antenna settings symbol group 3406 from #3B antenna unit 2917B are each, for example, configured as illustrated in FIG. 35.

#1A antenna unit 2915A, #2A antenna unit 2916A, #3A antenna unit 2917A, #1B antenna unit 2915B, #2B antenna unit 2916B, and #3B antenna unit 2917B are each assigned with a unique identification (ID). Accordingly, for example, when antenna settings symbol group 3401 is transmitted from #1A antenna unit 2915A, the antenna ID of #1A antenna unit 2915A is transmitted in antenna ID symbol 3501.

Then, as illustrated in FIG. 35, in addition to antenna ID symbol 3501, reference signal (reference symbol) 3502 is transmitted by communications station #1. Hereinafter, a reference signal has the same definition as a reference symbol. Reference signal 3502 plays the role of a signal (symbol) for realizing estimation of the communication state (reception quality) of communications station #2 (for example, the reception field intensity). Accordingly, for example, it is a known signal/symbol to communications station #2. A known signal is, for example, a known Phase Shift Keying (PSK) symbol.

Accordingly, communications station #1 transmits a symbol group having the configuration illustrated in FIG. 35, as antenna settings symbol group 3401 from #1A antenna unit 2915A illustrated in FIG. 34. Naturally, antenna ID symbol 3501 indicates #1A antenna unit 2915A. Then, communications station #2 receives antenna settings symbol group 3401 from #1A antenna unit 2915A illustrated in FIG. 34, and knows that "the modulated signal is transmitted from communications station #1 via #1A antenna unit 2915A" from antenna ID symbol 3501. Moreover, communications station #2 estimates the communication state from reference signal 3502. Accordingly, communications station #2 estimates "the communication state of the modulated signal transmitted from #1A antenna unit 2915A illustrated in FIG. 34".

Similarly, communications station #1 transmits a symbol group having the configuration illustrated in FIG. 35, as antenna settings symbol group 3402 from #2A antenna unit 2916A illustrated in FIG. 34. Naturally, antenna ID symbol 3501 indicates #2A antenna unit 2916A. Via the same operations as described above, communications station #2 estimates "the communication state of the modulated signal transmitted from #2A antenna unit 2916A illustrated in FIG. 34".

Communications station #1 transmits a symbol group having the configuration illustrated in FIG. 35, as antenna settings symbol group 3403 from #3A antenna unit 2917A illustrated in FIG. 34. Naturally, antenna ID symbol 3501 indicates #3A antenna unit 2917A. Via the same operations as described above, communications station #2 estimates "the communication state of the modulated signal transmitted from #3A antenna unit 2917A illustrated in FIG. 34".

Communications station #1 transmits a symbol group having the configuration illustrated in FIG. 35, as antenna settings symbol group 3404 from #1B antenna unit 2915B illustrated in FIG. 34. Naturally, antenna ID symbol 3501 indicates #1B antenna unit 2915B. Via the same operations as described above, communications station #2 estimates "the communication state of the modulated signal transmitted from #1B antenna unit 2915B illustrated in FIG. 34".

Communications station #1 transmits a symbol group having the configuration illustrated in FIG. 35, as antenna settings symbol group 3405 from #2B antenna unit 2916B illustrated in FIG. 34. Naturally, antenna ID symbol 3501 indicates #2B antenna unit 2916B. Via the same operations as described above, communications station #2 estimates "the communication state of the modulated signal transmitted from #2B antenna unit 2916B illustrated in FIG. 34".

Communications station #1 transmits a symbol group having the configuration illustrated in FIG. 35, as antenna settings symbol group 3406 from #3B antenna unit 2917B illustrated in FIG. 34. Naturally, antenna ID symbol 3501 indicates #3B antenna unit 2917B. Via the same operations as described above, communications station #2 estimates "the communication state of the modulated signal transmitted from #3B antenna unit 2917B illustrated in FIG. 34".

Note that when an ID symbol such as 3501 illustrated in FIG. 35 is present, the transmission order of symbols 3401, 3402, 3403, 3404, 3405, and 3406 in antenna settings symbol group 3480 illustrated in FIG. 34 need not be as shown in FIG. 34; the transmission order of symbols 3401, 3402, 3403, 3404, 3405, and 3406 may be set in any which way, or, for example, the transmission order of symbols 3401, 3402, 3403, 3404, 3405, and 3406 may be changed at the time of transmission. Even with this, since antenna ID symbol 3501 is present as illustrated in FIG. 35, communications station #2 is capable of discerning "from which antenna the modulated signal was transmitted".

Figure 36:
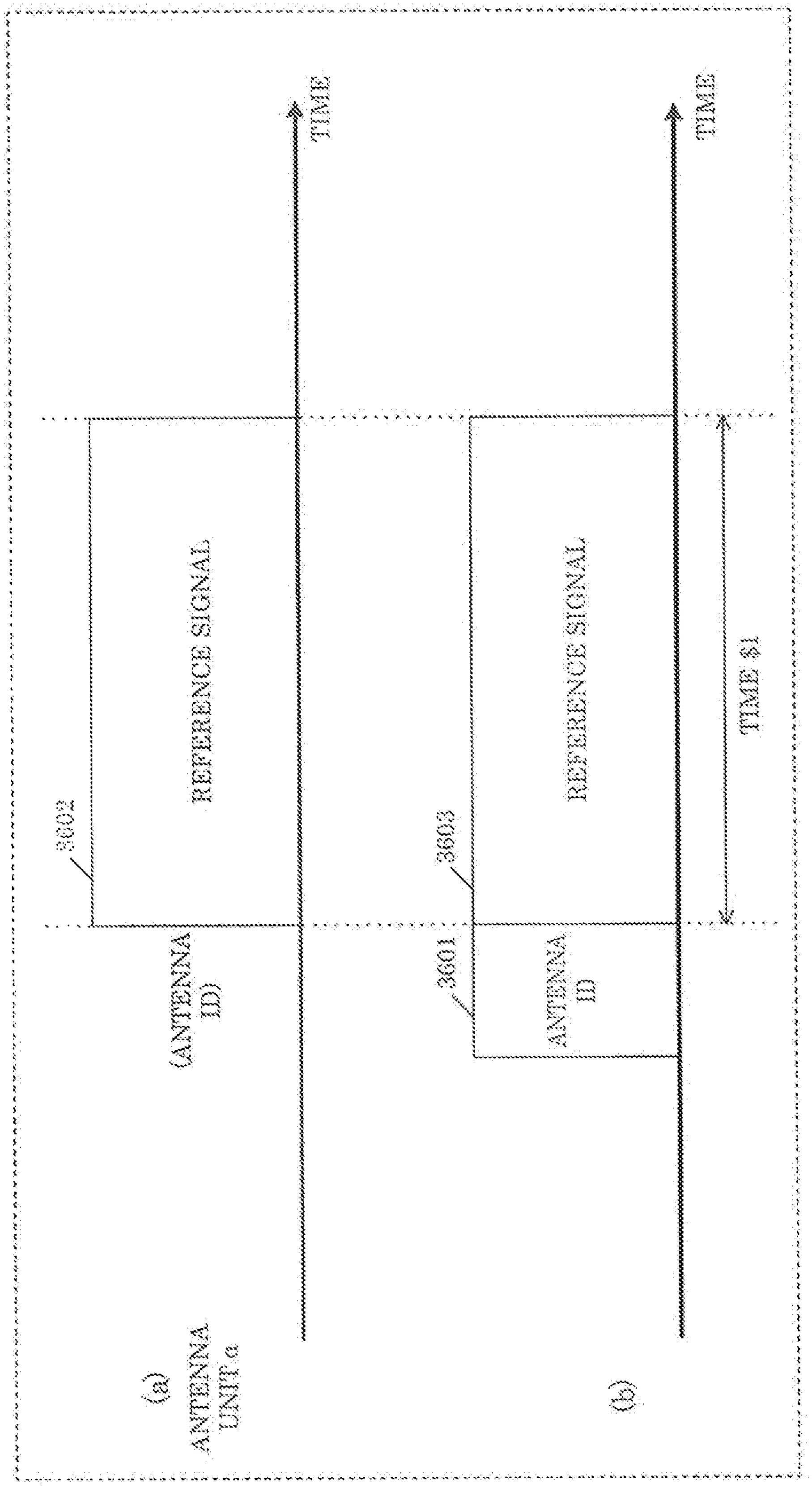
FIG. 36 illustrates an example of a configuration of an antenna settings symbol group.

FIG. 36 is one example of a configuration of antenna settings symbol group set 3481. Time is represented on the horizontal axis. When antenna settings symbol group 3408_1 and antenna settings symbol group <1>3408_2 are transmitted from antenna unit α as illustrated in FIG. 34, (a) in FIG. 36 indicates a configuration of "antenna settings symbol group 3408_1 from antenna unit α" and (b) in FIG. 36 indicates a configuration of "antenna settings symbol group <1>3408_2".

As illustrated in (b) in FIG. 36, "antenna settings symbol group <1>3408_2" includes antenna ID symbol 3601. Just as described above, antenna ID symbol 3601 is a symbol including information on an antenna ID used to transmit "antenna settings symbol group <1>3408_2", and communications station #1 can discern which antenna was used to transmit "antenna settings symbol group <1>3408_2" as a result of communications station #2 receiving antenna ID symbol 3601.

In "antenna settings symbol group 3408_1 from antenna unit α" in (a) in FIG. 36, a symbol indicating the antenna ID for antenna unit α may or may not be transmitted. This is because information relating to antenna unit α is already shared between communications station #1 and communications station #2.

Then, in "antenna settings symbol group 3408_1 from antenna unit α" in (a) in FIG. 36, reference signal 3602 is arranged at time $1, and in "antenna settings symbol group <1>3408_2" in (b) in FIG. 36 as well, reference signal 3603 is arranged at time $1. Here, reference signal 3602 and reference signal 3603 are transmitted using the same frequency. reference signal 3602 and reference signal 3603 are also each comprised of a plurality of symbols.

Here, reference signal 3602 and reference signal 3603 each include N symbols.

The in-phase component of the N symbols in reference signal 3602 is expressed as $I_{\alpha v}$, and the orthogonal component of the N symbols in reference signal 3602 is expressed as $Q_{\alpha v}$.

The in-phase component of the N symbols in reference signal 3603 is expressed as $I_{xv}$, and the orthogonal component of the N symbols in reference signal 3603 is expressed as $Q_{xv}$.

Here, the following relation equation is applied. Note that N is an integer that is greater than or equal to 2, and v is an integer that is greater than or equal to 0 and less than or equal to N−1.

[MATH. 47]

$$\sum_{v=0}^{N-1}(I_{\alpha v}\times I_{xv})=0 \quad \text{Equation (47)}$$

[MATH. 48]

$$\sum_{v=0}^{N-1}(Q_{\alpha v}\times Q_{xv})=0 \quad \text{Equation (48)}$$

At least one of <Condition #1> and <Condition #2> is satisfied.

<Condition #1>

Equation (47) and Equation (48) are satisfied, v is an integer that is greater than or equal to 0 and less than or equal to N−1, and with all instances of v that satisfy this, $I_{\alpha v}\neq 0$ and $I_{xv}\neq 0$ are satisfied.

<Condition #2>

Equation (47) and Equation (48) are satisfied, v is an integer that is greater than or equal to 0 and less than or equal to N−1, and with all instances of v that satisfy this, $Q_{\alpha v}\neq 0$ and $Q_{xv}\neq 0$ are satisfied.

With this, the channel state of the modulated signal transmitted by antenna unit α and the channel state in "antenna settings symbol group <1>3408_2" can be known, and accordingly, favorable antenna selection is possible. Note that in the following description, "channel state" indicates propagation environment.

When antenna settings symbol group 3409_1 and antenna settings symbol group <2>3409_2 are transmitted from antenna unit α as illustrated in FIG. 34, (a) in FIG. 36 indicates a configuration of "antenna settings symbol group 3409_1 from antenna unit α" and (b) in FIG. 36 indicates a configuration of "antenna settings symbol group <2>3409_2". With this, with respect to reference signal 3602 and reference signal 3603 described above, at least one of <Condition #1> and <Condition #2> is satisfied, whereby the channel state of the modulated signal transmitted by antenna unit α and the channel state in "antenna settings symbol group <2>3409_2" can be known, and accordingly, favorable antenna selection is possible.

Moreover, when antenna settings symbol group 3410_1 and antenna settings symbol group <3>3410_2 are transmitted from antenna unit α as illustrated in FIG. 34, (a) in FIG. 36 indicates a configuration of "antenna settings symbol group 3410_1 from antenna unit α" and (b) in FIG. 36 indicates a configuration of "antenna settings symbol group <3>3410_2". With this, with respect to reference signal 3602 and reference signal 3603 described above, at least one of <Condition #1> and <Condition #2> is satisfied, whereby the channel state of the modulated signal transmitted by antenna unit α and the channel state in "antenna settings symbol group <3>3410_2" can be known, and accordingly, favorable antenna selection is possible.

Figure 37:
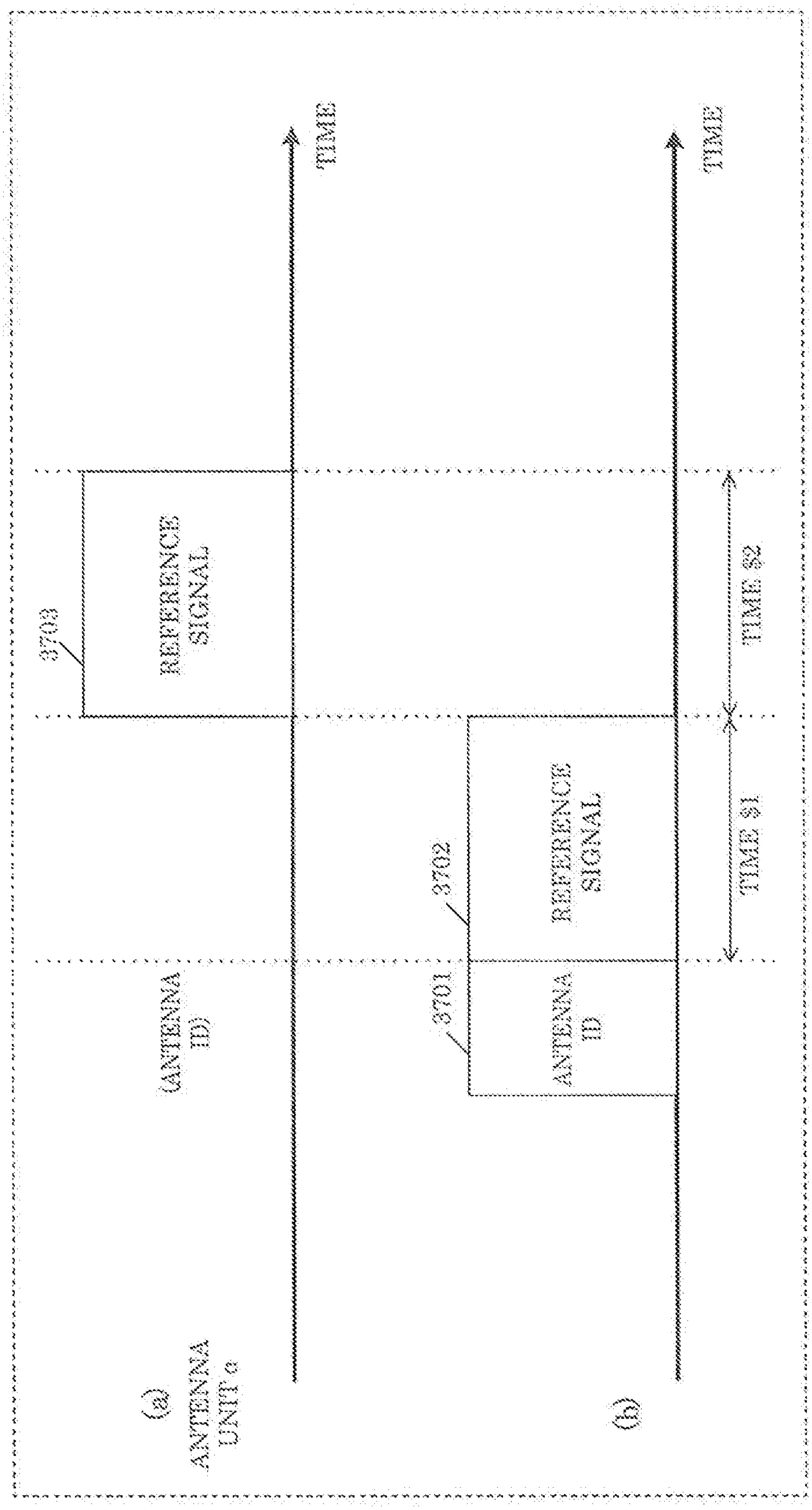
FIG. 37 illustrates an example of a configuration of an antenna settings symbol group.

FIG. 37 is one example of a configuration of antenna settings symbol group set 3481 that is different from the example illustrated in FIG. 36. Time is represented on the horizontal axis. When antenna settings symbol group 3408_1 and antenna settings symbol group <1>3408_2 are transmitted from antenna unit α as illustrated in FIG. 34, (a) in FIG. 37 indicates a configuration of "antenna settings symbol group 3408_1 from antenna unit α" and (b) in FIG. 37 indicates a configuration of "antenna settings symbol group <1>3408_2".

As illustrated in (b) in FIG. 37, "antenna settings symbol group <1>3408_2" includes antenna ID symbol 3701. Just as described above, antenna ID symbol 3701 is a symbol including information on an antenna ID used to transmit "antenna settings symbol group <1>3408_2", and communications station #1 can discern which antenna was used to transmit "antenna settings symbol group <1>3408_2" as a result of communications station #2 receiving antenna ID symbol 3701.

In "antenna settings symbol group 3408_1 from antenna unit α" in (a) in FIG. 37, a symbol indicating the antenna ID for antenna unit α may or may not be transmitted. This is because information relating to antenna unit α is already shared between communications station #1 and communications station #2.

Then, in "antenna settings symbol group 3408_1 from antenna unit α" in (a) in FIG. 37, reference signal 3703 is arranged at time $2, and in "antenna settings symbol group <1>3408_2" in (b) in FIG. 37 as well, reference signal 3702 is arranged at time $1. Here, reference signal 3702 and reference signal 3703 are transmitted using the same frequency.

Here, upon transmitting reference signal 3702, a modulated signal is not transmitted from antenna unit α, and upon transmitting reference signal 3703, a modulated signal is not present in (b) in FIG. 37.

With this, the channel state of the modulated signal transmitted by antenna unit α and the channel state in "antenna settings symbol group <1>3408_2" can be known, and accordingly, favorable antenna selection is possible.

Note that the frame configuration is not limited to this example. As a variation, for example, reference signal 3702 and reference signal 3703 each include N symbols.

The in-phase component of the N symbols in reference signal 3702 is expressed as $I_{\alpha v}$, and the orthogonal component of the N symbols in reference signal 3702 is expressed as $Q_{\alpha v}$.

The in-phase component of the N symbols in reference signal 3703 is expressed as $I_{xv}$, and the orthogonal component of the N symbols in reference signal 3703 is expressed as $Q_{xv}$.

Here, the following relation equation is applied. Note that N is an integer that is greater than or equal to 2, and v is an integer that is greater than or equal to 0 and less than or equal to N−1.

[MATH. 49]

$$\sum_{v=0}^{N-1}(I_{\alpha v}\times I_{xv})=0 \quad \text{Equation (49)}$$

[MATH. 50]

$$\sum_{v=0}^{N-1}(Q_{\alpha v}\times Q_{xv})=0 \quad \text{Equation (50)}$$

At least one of <Condition #3> and <Condition #4> is satisfied.

<Condition #3>

Equation (49) and Equation (50) are satisfied. Also, that v is an integer that is greater than or equal to 0 and less than or equal to N−1, and any v that satisfies $I_{\alpha v}=0$ and $I_{xv}=0$ is present.

Further, v is an integer that is greater than or equal to 0 and less than or equal to N−1, and with all instances of v that satisfy this, $I_{\alpha v}=0$ and $I_{xv}=0$ are not satisfied.

<Condition #4>

Equation (49) and Equation (50) are satisfied. Also, that v is an integer that is greater than or equal to 0 and less than or equal to N−1, and any v that satisfies $Q_{\alpha v}=0$ and $Q_{xv}=0$ is present.

Further, v is an integer that is greater than or equal to 0 and less than or equal to N−1, and with all instances of v that satisfy this, $Q_{\alpha v}=0$ and $Q_{xv}$, =0 is not satisfied.

With this, the channel state of the modulated signal transmitted by antenna unit α and the channel state in "antenna settings symbol group <1>3408_2" can be known, and accordingly, favorable antenna selection is possible.

When antenna settings symbol group 3409_1 and antenna settings symbol group <2>3409_2 are transmitted from antenna unit α as illustrated in FIG. 34, (a) in FIG. 37 indicates a configuration of "antenna settings symbol group 3409_1 from antenna unit α" and (b) in FIG. 37 indicates a configuration of "antenna settings symbol group <2>3409_2". With this, with respect to reference signal 3702 and reference signal 3703 described above, at least one of <Condition #3> and <Condition #4> is satisfied, whereby the channel state of the modulated signal transmitted by antenna unit α and the channel state in "antenna settings symbol group <2>3409_2" can be known, and accordingly, favorable antenna selection is possible.

Moreover, when antenna settings symbol group 3410_1 and antenna settings symbol group <3>3410_2 are transmitted from antenna unit α as illustrated in FIG. 34, (a) in FIG. 37 indicates a configuration of "antenna settings symbol group 3410_1 from antenna unit α" and (b) in FIG. 37 indicates a configuration of "antenna settings symbol group <3>3410_2". With this, with respect to reference signal 3702 and reference signal 3703 described above, at least one of <Condition #3> and <Condition #4> is satisfied, whereby the channel state of the modulated signal transmitted by antenna unit α and the channel state in "antenna settings symbol group <3>3410_2" can be known, and accordingly, favorable antenna selection is possible.

Next, an example of a determination that communications station #2 is in a favorable communication state when communications station #1 transmits antenna settings symbol group set 3481, as illustrated in FIG. 34, will be given.

Figure 38:
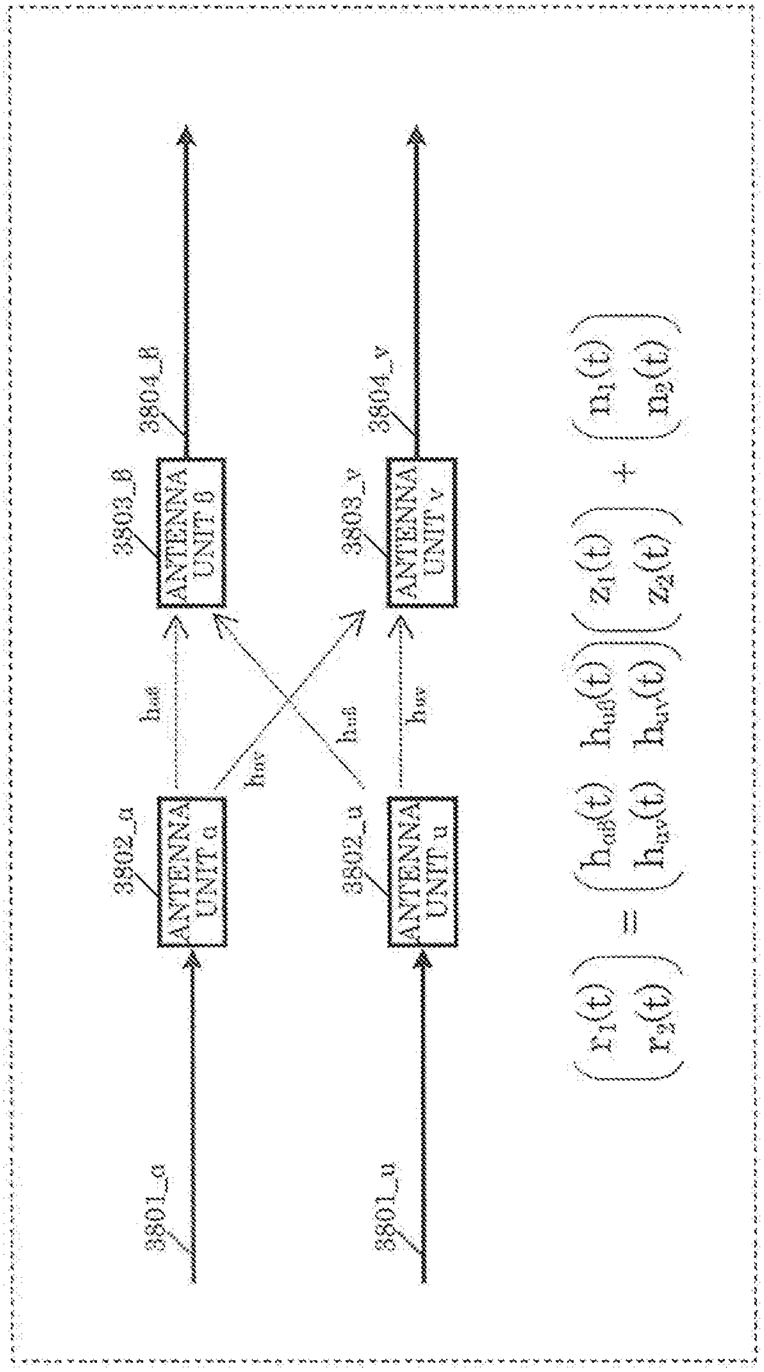
FIG. 38 illustrates an example of a relationship of the states of communications station #1 and communications station #2.

For example, as illustrated in FIG. 34, antenna settings symbol group 3408_1 and antenna settings symbol group <1>3408_2 are transmitted from antenna unit α. In such a case, the relationship of the states of communications station #1 and communications station #2 are as illustrated in FIG. 38. Antenna unit α(3802_α) transmits modulated signal 3801_α. Here, modulated signal 3801_α is expressed as $z_1(t)$. Antenna unit u(3802_*u*) transmits modulated signal 3801_*u*. Here, modulated signal 3801_*u* is expressed as $z_2(t)$. Note that t indicates time. $z_1(t)$ and $z_2(t)$ can be defined as complex numbers.

The propagation environment between antenna unit α(3802_α) and antenna unit β(3803_β) is expressed as $h_{\alpha\beta}(t)$, the propagation environment between antenna unit α(3802_α) and antenna unit v(3803_*v*) is expressed as $h_{\alpha v}(t)$, the propagation environment between antenna unit u(3802_*u*) and antenna unit β(3803_β) is expressed as $h_{u\beta}(t)$, and the propagation environment between antenna unit u(3802_*u*) and antenna unit v(3803_*v*) is expressed as $h_{uv}(t)$, where $h_{\alpha\beta}(t)$, $h_{\alpha v}(t)$, $h_{u\beta}(t)$, and $h_{uv}(t)$ can be defined as complex numbers.

The reception signal received by antenna unit β(3803_β) is reception signal 3804_β, and reception signal 3804_β is expressed as $r_1(t)$. The reception signal received by antenna unit v(3803_*v*) is reception signal 3804_*v*, and reception signal 3804_*v* is expressed as $r_2(t)$. $r_1(t)$ and $r_2(t)$ can be defined as complex numbers.

Here, the following relation equation holds true.

[MATH. 51]

$$\begin{pmatrix} r_1(t) \\ r_2(t) \end{pmatrix} = \begin{pmatrix} h_{\alpha\beta}(t) & h_{u\beta}(t) \\ h_{\alpha v}(t) & h_{uv}(t) \end{pmatrix} \begin{pmatrix} z_1(t) \\ z_2(t) \end{pmatrix} + \begin{pmatrix} n_1(t) \\ n_2(t) \end{pmatrix} \quad \text{Equation (51)}$$

Next, consider the following two cases.

<Case #1> A beam is formed by changing the weighting or phase of antenna unit α, or a beam is formed by changing the weighting or phase in antenna unit u as well.

<Case #2> antenna unit α and antenna unit u differ in polarization.

Regarding <Case #1>, it is preferable that cross polarization discrimination (XPD) increase in the reception antenna for MIMO transmission capable of achieving high reception quality. Accordingly, in order to achieve high reception quality, the following conditions may be satisfied.

<Condition #5>

The amplitude of $h_{\alpha\beta}(t)$ is significantly greater than the amplitude of $h_{u\beta}(t)$, and the amplitude of $h_{uv}(t)$ is significantly greater than the amplitude of $h_{\alpha v}(t)$.

Regarding <Case #2>, it is preferable that XPD increase in the reception antenna for MIMO transmission capable of achieving high reception quality. Accordingly, for example, either one of the following two conditions may be satisfied.

<Condition #6>

The amplitude of $h_{\alpha\beta}(t)$ is significantly greater than the amplitude of $h_{u\beta}(t)$, and the amplitude of $h_{uv}(t)$ is significantly greater than the amplitude of $h_{\alpha v}(t)$.

<Condition #7>

The absolute value of the determinant of the matrix in Equation (51) is a large value.

As illustrated in FIG. 34, if communications station #1 transmits antenna settings symbol group set 3481, communications station #1 transmits antenna settings symbol group 3408_1 and antenna settings symbol group <1>3408_2 from antenna unit α, and using the relationship illustrated in FIG. 38, communications station #2 determines whether this is an antenna set that can achieve high reception quality.

Similarly, communications station #1 transmits antenna settings symbol group 3409_1 and antenna settings symbol group <2>3409_2 from antenna unit α, and using the relationship illustrated in FIG. 38, communications station #2 determines whether this is an antenna set that can achieve high reception quality.

Communications station #1 transmits antenna settings symbol group 3410_1 and antenna settings symbol group <3>3410_2 from antenna unit α, and using the relationship illustrated in FIG. 38, communications station #2 determines whether this is an antenna set that can achieve high reception quality.

With this, communications station #2 determines one antenna unit for modulated signal transmission, to be used at the same time as antenna unit α by communications station #1, and communications station #2 newly determines a reception antenna unit.

Next, another implementation method using FIG. 34 will be described. Note that as description of FIG. 34 has been given above, repetition will be omitted here.

Figure 39:
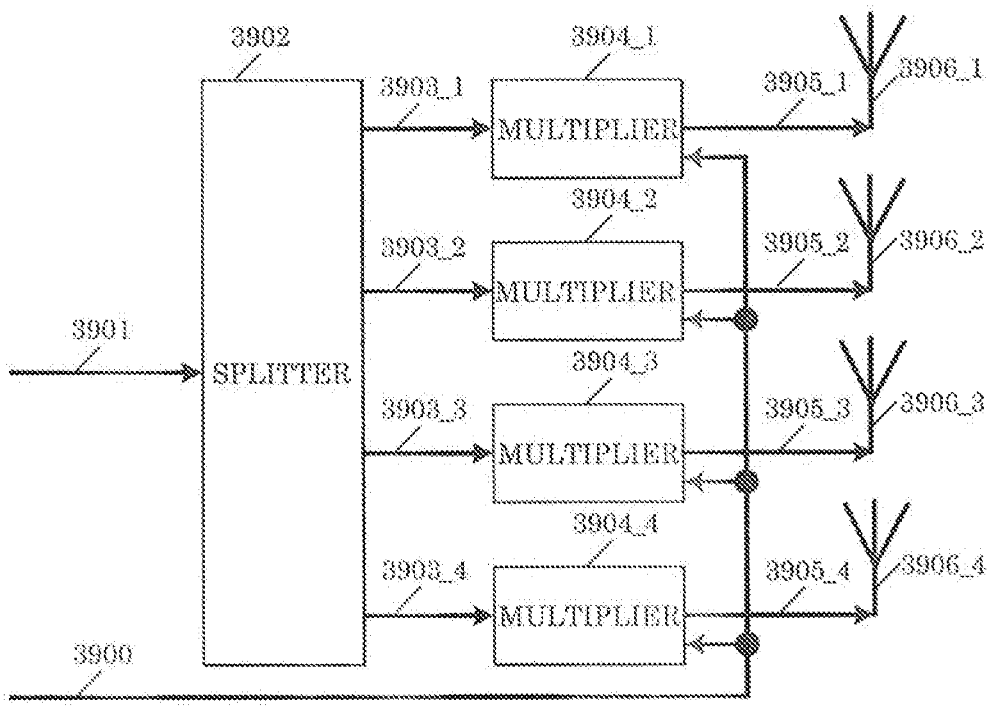
FIG. 39 illustrates an example of a configuration of an antenna unit.

FIG. 39 illustrates one example of a configuration of an antenna unit exemplified by #1A antenna unit 2915A, #2A antenna unit 2916A, #3A antenna unit 2917A, #1B antenna unit 2915B, #2B antenna unit 2916B, and #3B antenna unit 2917B included in communications station #1 illustrated in FIG. 29.

Splitter 3902 receives an input of modulated signal 3901, splits modulated signal 3901, and outputs modulated signals 3903_1, 3903_2, 3903_3, and 3903_4.

Multiplier 3904_1 receives inputs of antenna control signal 3900 and modulated signal 3903_1, and based on the multiplication coefficient in antenna control signal 3900, multiplies, for example, coefficient W1 with modulated signal 3903_1, and outputs coefficient multiplied modulated signal 3905_1. Then, coefficient multiplied modulated signal 3905_1 is output from antenna 3906_1 as radio waves.

Similarly, multiplier 3904_2 receives inputs of antenna control signal 3900 and modulated signal 3903_2, and based on the multiplication coefficient in antenna control signal 3900, multiplies, for example, coefficient W2 with modulated signal 3903_2, and outputs coefficient multiplied modulated signal 3905_2. Then, coefficient multiplied modulated signal 3905_2 is output from antenna 3906_2 as radio waves. W1 and W2 can be defined as complex numbers.

Multiplier 3904_3 receives inputs of antenna control signal 3900 and modulated signal 3903_3, and based on the multiplication coefficient in antenna control signal 3900, multiplies, for example, coefficient W3 with modulated signal 3903_3, and outputs coefficient multiplied modulated signal 3905_3. Then, coefficient multiplied modulated signal 3905_3 is output from antenna 3906_3 as radio waves.

Multiplier 3904_4 receives inputs of antenna control signal 3900 and modulated signal 3903_4, and based on the multiplication coefficient in antenna control signal 3900, multiplies, for example, coefficient W4 with modulated signal 3903_4, and outputs coefficient multiplied modulated signal 3905_4. Then, coefficient multiplied modulated signal 3905_4 is output from antenna 3906_4 as radio waves. W3 and W4 can be defined as complex numbers.

Note that "the absolute value of W1, the absolute value of W2, the absolute value of W3, and the absolute value of W4 are equal" may be true. In this case, this is the equivalent of phase change being performed. It goes without saying that the absolute value of W1, the absolute value of W2, the absolute value of W3, and the absolute value of W4 may be unequal.

Moreover, in FIG. 39, the antenna unit includes four antennas or four antennas and four multipliers, but the number of antennas is not limited to four;

the antenna unit may include two or more antennas. However, the antenna unit may include only a single antenna.

Figure 40:
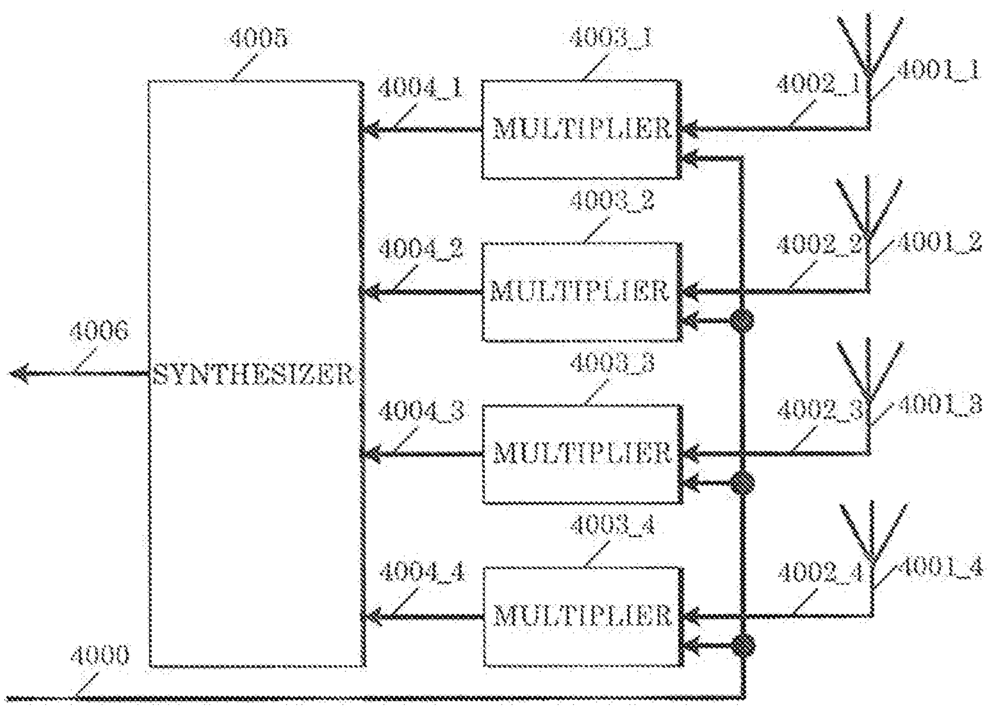
FIG. 40 illustrates an example of a configuration of an antenna unit.

FIG. 40 illustrates one example of a configuration of an antenna unit exemplified by #1X antenna unit 3001X, #2X antenna unit 3002X, #3X antenna unit 3003X, #1Y antenna unit 3001Y, #2Y antenna unit 3002Y and #3Y antenna unit 3003Y included in communications station #2 illustrated in FIG. 30.

Multiplier 4003_1 receives inputs of reception signal 4002_1 and antenna control signal 4000 received by antenna 4001_1, and based on the multiplication coefficient in antenna control signal 4000, multiplies, for example, coefficient V1 with reception signal 4002_1, and outputs coefficient multiplied reception signal 4004_1.

Multiplier 4003_2 receives inputs of reception signal 4002_2 and antenna control signal 4000 received by antenna 4001_2, and based on the multiplication coefficient in antenna control signal 4000, multiplies, for example, coefficient V2 with reception signal 4002_2, and outputs coefficient multiplied reception signal 4004_2.

Multiplier 4003_3 receives inputs of reception signal 4003_3 and antenna control signal 4000 received by antenna 4001_3, and based on the multiplication coefficient in antenna control signal 4000, multiplies, for example, coefficient V3 with reception signal 4002_3, and outputs coefficient multiplied reception signal 4004_3.

Multiplier 4003_4 receives inputs of reception signal 4003_3 and antenna control signal 4000 received by antenna 4001_4, and based on the multiplication coefficient in antenna control signal 4000, multiplies, for example, coefficient V4 with reception signal 4002_4, and outputs coefficient multiplied reception signal 4004_4. Note that V1, V2, V3, and V4 can be defined as complex numbers.

Synthesizer 4005 receives inputs of coefficient multiplied reception signals 4004_1, 4004_2, 4004_3, and 4004_4, synthesizes coefficient multiplied reception signals 4004_1, 4004_2, 4004_3, and 4004_4, and outputs synthesized reception signal 4006.

Note that "the absolute value of V1, the absolute value of V2, the absolute value of V3, and the absolute value of V4 are equal" may be true. In this case, this is the equivalent of phase change being performed. It goes without saying that the absolute value of V1, the absolute value of V2, the absolute value of V3, and the absolute value of V4 may be unequal.

Moreover, in FIG. 40, the antenna unit includes four antennas or four antennas and four multipliers, but the number of antennas is not limited to four; the antenna unit may include two or more antennas. However, the antenna unit may include only a single antenna.

Figure 41:
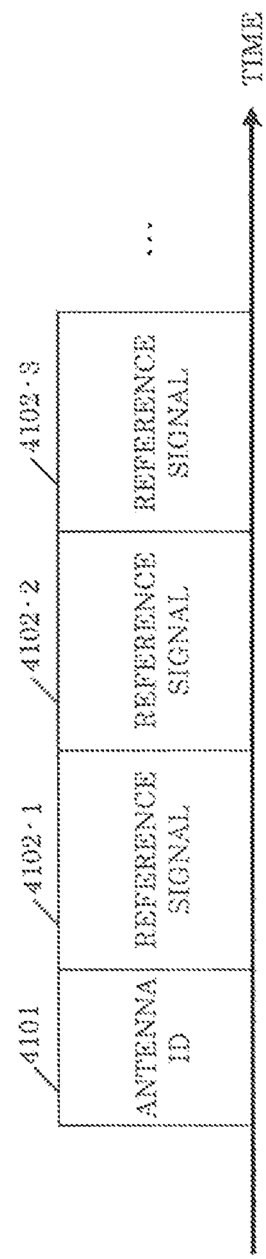
FIG. 41 illustrates an example of a configuration of an antenna settings symbol group.

FIG. 41 is one example of a configuration of antenna settings symbol group 3480, and time is represented on the horizontal axis. Antenna settings symbol group 3401 from #1A antenna unit 2915A, antenna settings symbol group 3402 from #2A antenna unit 2916A, antenna settings symbol group 3403 from #3A antenna unit 2917A, antenna settings symbol group 3404 from #1B antenna unit 2915B, antenna settings symbol group 3405 from #2B antenna unit 2916B, and antenna settings symbol group 3406 from #3B antenna unit 2917B are each, for example, configured as illustrated in FIG. 41.

#1A antenna unit 2915A, #2A antenna unit 2916A, #3A antenna unit 2917A, #1B antenna unit 2915B, #2B antenna unit 2916B, and #3B antenna unit 2917B are each assigned with a unique antenna ID. Accordingly, for example, when antenna settings symbol group 3401 is transmitted from #1A antenna unit 2915A, the antenna ID of #1A antenna unit 2915A is transmitted in antenna ID symbol 4101.

Then, as illustrated in FIG. 41, in addition to antenna ID symbol 4101, reference signals 4102-1, 4102-2, 4202-3 . . . 4102-*i* are transmitted by communications station #1. Reference signals 4102-1, 4102-2, 4202-3 . . . 4102-*i* play the role of signals (symbols) for realizing estimation of the communication state (reception quality) of communications station #2 (for example, the reception field intensity). Accordingly, for example, they are known signals (for example, known PSK symbols) to communications station #2. Note that in FIG. 41, illustration of reference signal 4102-*i* is omitted.

Moreover, upon transmitting reference signal 4102-1, in the description related to FIG. 39, coefficient W1=W11, coefficient W2=W21, coefficient W3=W31, and coefficient W4=W41.

Moreover, upon transmitting reference signal 4102-2, in the description related to FIG. 39, coefficient W1=W12, coefficient W2=W22, coefficient W3=W32, and coefficient W4=W42.

Upon transmitting reference signal 4102-3, in the description related to FIG. 39, coefficient W1=W13, coefficient W2=W23, coefficient W3=W33, and coefficient W4=W43

Note that recitation for midway reference signals is omitted.

Upon transmitting reference signal 4102-*i*, in the description related to FIG. 39, coefficient W1=W1*i*, coefficient W2=W2*i*, coefficient W3=W3*i*, and coefficient W4=W4*i*. Note that the number of required coefficients changes depending on the number of antennas.

Figure 42:
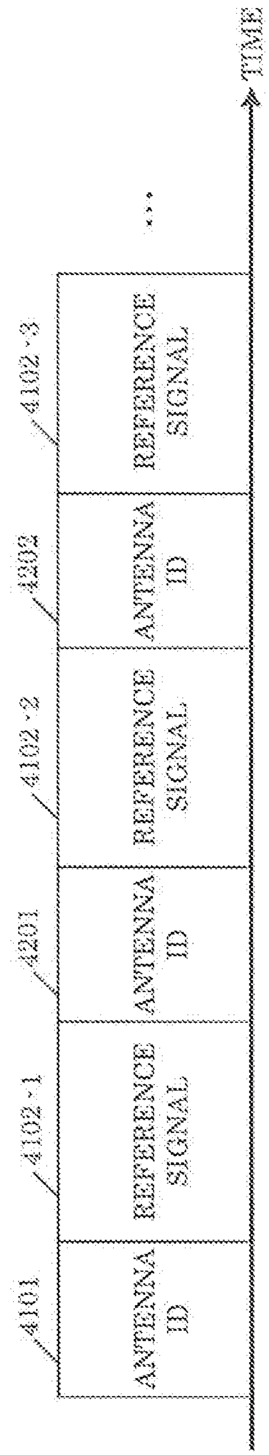
FIG. 42 illustrates an example of a configuration of an antenna settings symbol group.

FIG. 42 illustrates one example of a configuration of antenna settings symbol group 3480 that is different from FIG. 41; operations that are the same as in FIG. 41 are given like reference signs. Time is represented on the horizontal axis. FIG. 42 differs from FIG. 41 in that a reference signal and an antenna ID symbol are always a set and transmitted as a set. Accordingly, antenna ID symbol 4201 and antenna ID symbol 4202 are illustrated in FIG. 42.

In either of the examples illustrated in FIG. 41 and FIG. 42, as described above, reference signals 4102-1, 4102-2, 4102-3 . . . are transmitted. Here, the following condition holds true.

<Condition #8> i is an integer greater than or equal to 1 and less than or equal to N, N is an integer greater than or equal to 2, j is an integer greater than or equal to 1 and less than or equal to N, i≠j, and with all instances of i and j that satisfy these, {W1i≠W1j or W2i≠W2j or W3i≠W3j or W4i≠W14} is satisfied.

Communications station #1 transmits a symbol group having the configuration illustrated in FIG. 41, as antenna settings symbol group 3401 from #1A antenna unit 2915A illustrated in FIG. 34. Naturally, antenna ID symbol 3501 indicates #1A antenna unit 2915A.

Then, communications station #2 receives antenna settings symbol group 3401 from #1A antenna unit 2915A illustrated in FIG. 34, and knows that "the modulated signal is transmitted from communications station #1 via #1A antenna unit 2915A" from antenna ID symbol 4101. Moreover, from each reference signal 4102-1, 4102-2, 4102-3 . . . 4102-*i*, communications station #2 estimates the communication state in each reference signal transmitted from #1A antenna unit 2915A.

Similarly, communications station #1 transmits a symbol group having the configuration illustrated in FIG. 41, as antenna settings symbol group 3402 from #2A antenna unit 2916A illustrated in FIG. 34. Naturally, antenna ID symbol 4101 indicates #2A antenna unit 2916A.

By performing the same operations described above, from each reference signal 4102-1, 4102-2, 4102-3 . . . 4102-*i*, communications station #2 estimates the communication state in each reference signal transmitted from #2A antenna unit 2916A.

Communications station #1 transmits a symbol group having the configuration illustrated in FIG. 41, as antenna settings symbol group 3403 from #3A antenna unit 2917A illustrated in FIG. 34. Naturally, antenna ID symbol 4101 indicates #3A antenna unit 2917A.

By performing the same operations described above, from each reference signal 4102-1, 4102-2, 4102-3 . . . 4102-*i*, communications station #2 estimates the communication state in each reference signal transmitted from #3A antenna unit 2917A.

Communications station #1 transmits a symbol group having the configuration illustrated in FIG. 41, as antenna settings symbol group 3404 from #1B antenna unit 2915B illustrated in FIG. 34. Naturally, antenna ID symbol 4101 indicates #1B antenna unit 2915B.

By performing the same operations described above, from each reference signal 4102-1, 4102-2, 4102-3 . . . 4102-*i*, communications station #2 estimates the communication state in each reference signal transmitted from #1B antenna unit 2915B.

Communications station #1 transmits a symbol group having the configuration illustrated in FIG. 41, as antenna settings symbol group 3405 from #2B antenna unit 2916B illustrated in FIG. 34. Naturally, antenna ID symbol 4101 indicates #2B antenna unit 2916B.

By performing the same operations described above, from each reference signal 4102-1, 4102-2, 4102-3 . . . 4102-*i*, communications station #2 estimates the communication state in each reference signal transmitted from #2B antenna unit 2916B.

Communications station #1 transmits a symbol group having the configuration illustrated in FIG. 41, as antenna settings symbol group 3406 from #3B antenna unit 2917B illustrated in FIG. 34. Naturally, antenna ID symbol 4101 indicates #3B antenna unit 2917B.

By performing the same operations described above, from each reference signal 4102-1, 4102-2, 4102-3 . . . 4102-*i*, communications station #2 estimates the communication state in each reference signal transmitted from #3B antenna unit 2917B.

Then, from the communication states of these reference signals, communications station #2 estimates "the antenna unit and multiplication coefficient for communications station #1" for achieving favorable reception quality. Then, communications station #2 transmits, to communications station #1, information related to "the antenna unit and multiplication coefficient for communications station #1" for achieving favorable reception quality (i.e., transmission $1(3451) in FIG. 34).

Note that when antenna ID symbol 4101 is present such as in FIG. 41 and FIG. 42, the transmission order of symbols 3401, 3402, 3403, 3404, 3405, and 3406 in antenna settings symbol group 3480 illustrated in FIG. 34 need not be as shown in FIG. 34; the transmission order of symbols 3401, 3402, 3403, 3404, 3405, and 3406 may be set in any which way, or, for example, the transmission order of symbols 3401, 3402, 3403, 3404, 3405, and 3406 may be changed at the time of transmission. Even with this, since antenna ID symbol 4101 is present as illustrated in FIG. 41 and FIG. 42, communications station #2 is capable of discerning "from which antenna the modulated signal was transmitted".

Moreover, in FIG. 42, upon transmitting antenna ID symbol 4101, communications station #1 may transmit antenna ID symbol 4101 using the same coefficients W1, W2, W3, and W4 used to transmit reference signal 4102-1; upon transmitting antenna ID symbol 4201, communications station #1 may transmit antenna ID symbol 4201 using the same coefficients W1, W2, W3, and W4 used to transmit reference signal 4102-2; and upon transmitting antenna ID symbol 4202, communications station #1 may transmit antenna ID symbol 4202 using the same coefficients W1, W2, W3, and W4 used to transmit reference signal 4102-3.

As illustrated in FIG. 34, communications station #2 transmits antenna-related symbol group $1(3451), and as a result of communications station #1 receiving this symbol group, communications station #1 determines the antenna unit and multiplication coefficient to use when transmitting the modulated signal. Then, communications station #1 transmits antenna settings symbol group 3407 from antenna unit α using the determined antenna unit and multiplication coefficient.

Then, communications station #2 uses #1X antenna unit 3001X, #2X antenna unit 3002X, #3X antenna unit 3003X, #1Y antenna unit 3001Y, #2Y antenna unit 3002Y, and #3Y antenna unit 3003Y to receive antenna settings symbol group 3407 transmitted by communications station #1.

Here, each reception antenna unit in communications station #2 has the configuration illustrated in FIG. 40, and also estimates a favorable multiplication coefficient. Accordingly, communications station #2 determines one reception antenna unit to be used for reception, and additionally determines a favorable multiplication coefficient.

Note that, here, the antenna unit determined to be used for reception is named "determined antenna unit β", as described above.

Communications station #2 transmits antenna-related symbol group $2(3452) to notify communications station #1 that one reception antenna unit to be used for reception has been determined. Here, antenna-related symbol group $2(3452) may include information on the determined reception antenna.

Communications station #1 receives antenna-related symbol group $2(3452) transmitted by communications station #2, and is thereby notified of the determination of one antenna unit to be used by communications station #2 for reception. With this, the one antenna unit to be used by communications station #1 for transmission and the one antenna unit to be used by communications station #2 are determined.

Moreover, the multiplication coefficient to be used by communications station #1 and the multiplication coefficient to be used by communications station #2 are also determined. Accordingly, processing switches to procedures for determining one more antenna unit and multiplication coefficient to be used by communications station #1 for transmission and one more antenna unit and multiplication coefficient to be used by communications station #2 for reception.

In accordance with the following rules, communications station #1 "transmits antenna settings symbol group 3408_1 from antenna unit α, transmits antenna settings symbol group <1>3408_2, transmits antenna settings symbol group 3409_1 from antenna unit α, transmits antenna settings symbol group <2>3409_2, transmits antenna settings symbol group 3410_1 from antenna unit α, and transmits antenna settings symbol group <3>3410_2". These symbol groups are collectively referred to as antenna settings symbol group set 3481.

Rule: if determined antenna unit α is #1A antenna unit 2915A or #2A antenna unit 2916A or #3A antenna unit 2917A, communications station #1 "transmits antenna settings symbol group 3408_1 from determined antenna unit α, and transmits antenna settings symbol group <1>3408_2 from #1B antenna unit 2915B". Then, communications station #1 "transmits antenna settings symbol group 3409_1 from determined antenna unit α and transmits antenna settings symbol group <2>3409_2 from #2B antenna unit 2916B", and "transmits antenna settings symbol group 3410_1 from determined antenna unit α and transmits antenna settings symbol group <3>3410_2 from #3B antenna unit 2917B". Note that communications station #1 may transmit antenna settings symbol group 3408_1 from determined antenna unit α and transmit antenna settings symbol group <1>3408_2 from #1B antenna 2915B, and then transmit antenna settings symbol group <2>3409_2 from #2B antenna 2916B and transmit antenna settings symbol group <3>3410_2 from #3B antenna 2917B. Here, the symbol transmission order is not limited to these examples.

Rule: if determined antenna unit α is #1B antenna unit 2915B or #2B antenna unit 2916B or #3B antenna unit 2917B, communications station #1 "transmits antenna settings symbol group 3408_1 from determined antenna unit α and transmits antenna settings symbol group <1>3408_2 from #1A antenna unit 2915A". Then, communications station #1 "transmits antenna settings symbol group 3409_1 from determined antenna unit α and transmits antenna settings symbol group <2>3409_2 from #2A antenna unit 2916A" and "transmits antenna settings symbol group 3410_1 from determined antenna unit α and transmits antenna settings symbol group <3>3410_2 from #3A antenna unit 2917A". Note that communications station #1 may transmit antenna settings symbol group 3408_1 from determined antenna unit α and transmit antenna settings symbol group 3408_1 from #1A antenna 2915A, and then transmit antenna settings symbol group <2>3409_2 from #2A antenna 2916A and transmit antenna settings symbol group <3>3410_2 from #3A antenna 2917A. Here, the symbol transmission order is not limited to these examples.

Figure 43:
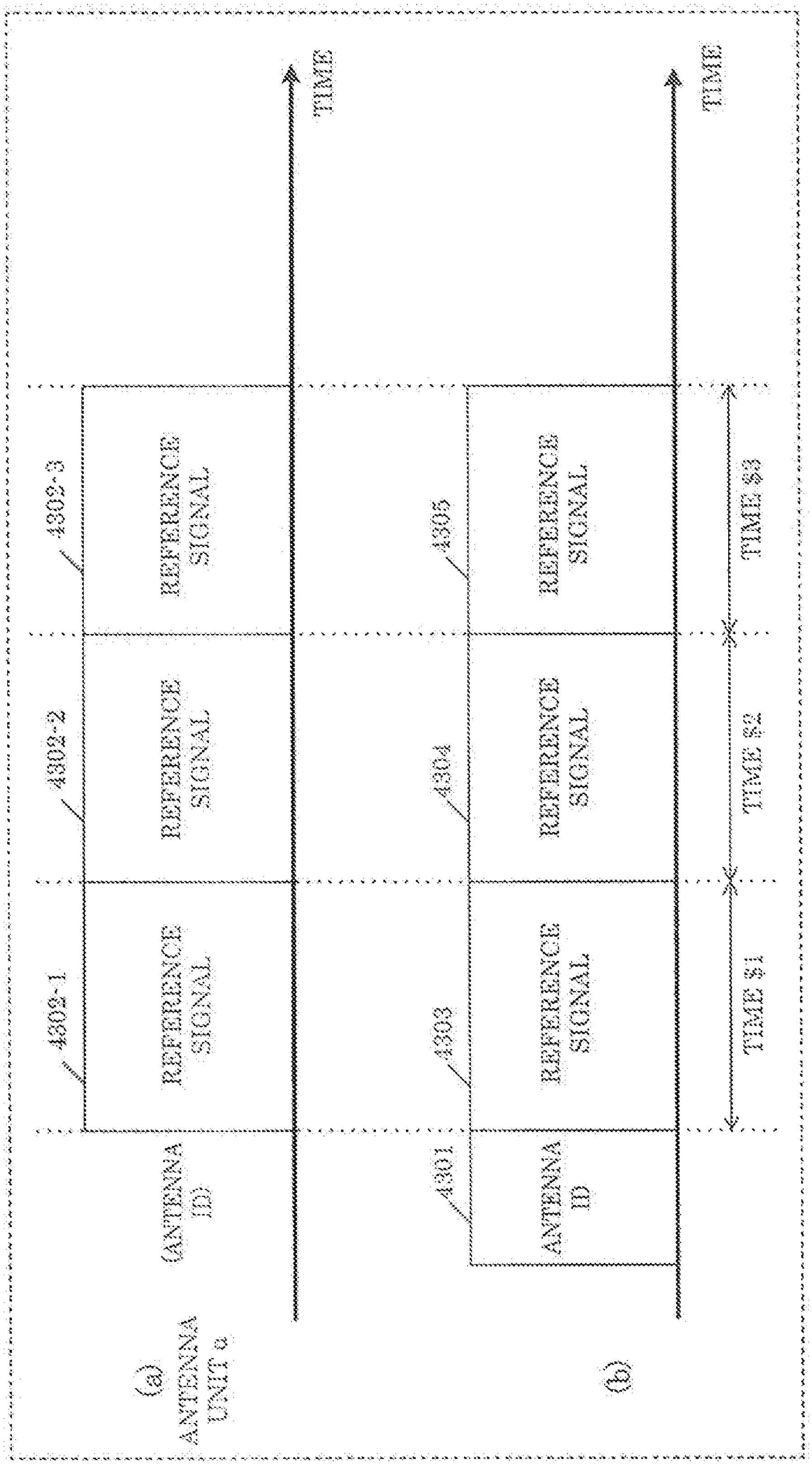
FIG. 43 illustrates an example of a configuration of an antenna settings symbol group.

FIG. 43 is one example of a configuration of antenna settings symbol group set 3481. Time is represented on the horizontal axis. When antenna settings symbol group 3408_1 and antenna settings symbol group <1>3408_2 are transmitted from antenna unit α as illustrated in FIG. 34, (a) in FIG. 43 indicates a configuration of "antenna settings symbol group 3408_1 from antenna unit α" and (b) in FIG. 43 indicates a configuration of "antenna settings symbol group <1>3408_2".

As illustrated in (b) in FIG. 43, "antenna settings symbol group <1>3408_2" includes antenna ID symbol 4301. Just as described above, antenna ID symbol 4301 is a symbol including information on an antenna ID used to transmit "antenna settings symbol group <1>3408_2", and communications station #1 can discern which antenna was used to transmit "antenna settings symbol group <1>3408_2" as a result of communications station #2 receiving antenna ID symbol 4301.

In "antenna settings symbol group 3408_1 from antenna unit α" in (a) in FIG. 43, a symbol indicating the antenna ID for antenna unit α may or may not be transmitted. This is because information relating to antenna unit α is already shared between communications station #1 and communications station #2.

Then, in "antenna settings symbol group 3408_1 from antenna unit α" in (a) in FIG. 43, reference signal 4302-1 is arranged at time $1, and in "antenna settings symbol group <1>3408_2" in (b) in FIG. 43 as well, reference signal 4303 is arranged at time $1. Here, reference signal 4302-1 and reference signal 4303 are transmitted using the same frequency. Reference signal 4302-1 and reference signal 4303 are also each comprised of a plurality of symbols.

Here, reference signal 4302-1 and reference signal 4303 each include N symbols.

The in-phase component of the N symbols in reference signal 4302-1 is expressed as $I_{\alpha v}$, and the orthogonal component of the N symbols in reference signal 4302-1 is expressed as $Q_{\alpha v}$.

The in-phase component of the N symbols in reference signal 4303 is expressed as $I_{xv}$, and the orthogonal component of the N symbols in reference signal 4303 is expressed as $Q_{xv}$.

Here, the following relation equation is applied. Note that N is an integer that is greater than or equal to 2, and v is an integer that is greater than or equal to 0 and less than or equal to N−1.

[MATH. 52]

$$\sum_{v=0}^{N-1}(I_{\alpha v}\times I_{xv})=0 \quad \text{Equation (52)}$$

[MATH. 53]

$$\sum_{v=0}^{N-1}(Q_{\alpha v}\times Q_{xv})=0 \quad \text{Equation (53)}$$

At least one of <Condition #9> and <Condition #10> is satisfied.

<Condition #9>

Equation (52) and Equation (53) are satisfied, v is an integer that is greater than or equal to 0 and less than or equal to N−1, and with all instances of v that satisfy this, $I_{\alpha v}\neq 0$ and $I_{xv}\neq 0$ are satisfied.

<Condition #10>

Equation (52) and Equation (53) are satisfied, v is an integer that is greater than or equal to 0 and less than or equal to N−1, and with all instances of v that satisfy this, $Q_{\alpha v}\neq 0$ and $Q_{xv}\neq 0$ are satisfied.

With this, the channel state of the modulated signal transmitted by antenna unit α and the channel state in “antenna settings symbol group <1>3408_2” can be known, and accordingly, favorable antenna selection is possible.

Note that upon transmitting reference signal 4303, in the description related to FIG. 39, coefficient W1=u11, coefficient W2=u21, coefficient W3=u31, and coefficient W4=u41.

Here, since the coefficient that communications station #1 uses to transmit reference signal 4302-1 is antenna unit α, it is already determined.

In “antenna settings symbol group 3408_1 from antenna unit α” in (a) in FIG. 43, reference signal 4302-2 is arranged at time $2, and in “antenna settings symbol group <1>3408_2” in (b) in FIG. 43 as well, reference signal 4304 is arranged at time $2. Here, reference signal 4302-2 and reference signal 4304 are transmitted using the same frequency. Reference signal 4302-2 and reference signal 4304 are also each comprised of a plurality of symbols.

Here, reference signal 4302-2 and reference signal 4304 each include N symbols.

The in-phase component of the N symbols in reference signal 4302-2 is expressed as $I_{\alpha v}$, and the orthogonal component of the N symbols in reference signal 4302-2 is expressed as $Q_{\alpha v}$.

The in-phase component of the N symbols in reference signal 4304 is expressed as $I_{xv}$, and the orthogonal component of the N symbols in reference signal 4304 is expressed as $Q_{xv}$.

Here, the following relation equation is applied. Note that N is an integer that is greater than or equal to 2, and v is an integer that is greater than or equal to 0 and less than or equal to N−1.

[MATH. 54]

$$\sum_{v=0}^{N-1}(I_{\alpha v}\times I_{xv})=0 \quad \text{Equation (54)}$$

[MATH. 55]

$$\sum_{v=0}^{N-1}(Q_{\alpha v}\times Q_{xv})=0 \quad \text{Equation (55)}$$

At least one of <Condition #11> and <Condition #12> is satisfied.

<Condition #11>

Equation (54) and Equation (55) are satisfied, v is an integer that is greater than or equal to 0 and less than or equal to N−1, and with all instances of v that satisfy this, $I_{\alpha v}\neq 0$ and $I_{xv}\neq 0$ are satisfied.

<Condition #12>

Equation (54) and Equation (55) are satisfied, v is an integer that is greater than or equal to 0 and less than or equal to N−1, and with all instances of v that satisfy this, $Q_{\alpha v}\neq 0$ and $Q_{xv}\neq 0$ are satisfied.

With this, the channel state of the modulated signal transmitted by antenna unit α and the channel state in “antenna settings symbol group <1>3408_2” can be known, and accordingly, favorable antenna selection is possible.

Note that upon transmitting reference signal 4304, in the description related to FIG. 39, coefficient W1=u12, coefficient W2=u22, coefficient W3=u32, and coefficient W4=u42.

Here, since the coefficient that communications station #1 uses to transmit reference signal 4302-2 is antenna unit α, it is already determined.

In “antenna settings symbol group 3408_1 from antenna unit α” in (a) in FIG. 43, reference signal 4302-3 is arranged at time $3, and in “antenna settings symbol group <1>3408_2” in (b) in FIG. 43 as well, reference signal 4305 is arranged at time $3. Here, reference signal 4302-3 and reference signal 4305 are transmitted using the same frequency. Reference signal 4302-3 and reference signal 4305 are also each comprised of a plurality of symbols.

Here, reference signal 4302-3 and reference signal 4305 each include N symbols.

The in-phase component of the N symbols in reference signal 4302-3 is expressed as $I_{\alpha v}$, and the orthogonal component of the N symbols in reference signal 4302-3 is expressed as $Q_{\alpha v}$.

The in-phase component of the N symbols in reference signal 4305 is expressed as $I_{xv}$, and the orthogonal component of the N symbols in reference signal 4305 is expressed as $Q_{xv}$.

Here, the following relation equation is applied. Note that N is an integer that is greater than or equal to 2, and v is an integer that is greater than or equal to 0 and less than or equal to N−1.

[MATH. 56]

$$\sum_{v=0}^{N-1}(I_{\alpha v}\times I_{xv})=0 \quad \text{Equation (56)}$$

[MATH. 57]

$$\sum_{v=0}^{N-1}(Q_{\alpha v}\times Q_{xv})=0 \quad \text{Equation (57)}$$

At least one of <Condition #13> and <Condition #14> is satisfied.

<Condition #13>

Equation (56) and Equation (57) are satisfied, v is an integer that is greater than or equal to 0 and less than or equal to N−1, and with all instances of v that satisfy this, $I_{\alpha v}\neq 0$ and $I_{xv}\neq 0$ are satisfied.

<Condition #14>

Equation (56) and Equation (57) are satisfied, v is an integer that is greater than or equal to 0 and less than or equal to N−1, and with all instances of v that satisfy this, $Q_{\alpha v}\neq 0$ and $Q_{xv}\neq 0$ are satisfied.

With this, the channel state of the modulated signal transmitted by antenna unit α and the channel state in “antenna settings symbol group <1>3408_2” can be known, and accordingly, favorable antenna selection is possible.

Note that upon transmitting reference signal 4305, in the description related to FIG. 39, coefficient W1=u13, coefficient W2=u23, coefficient W3=u33, and coefficient W4=u43.

Here, since the coefficient that communications station #1 uses to transmit reference signal 4302-5 is antenna unit α, it is already determined.

In the above description, the number of sets of reference signals transmitted at the same time is three, but the number of sets is not limited to this example; N sets may be transmitted. In this case, in (b) in FIG. 43, upon transmitting a reference signal, in the description related to FIG. 39, coefficient W1=u1*i*, coefficient W2=u2*i*, coefficient W3=u3*i*, and coefficient W4=u4*i*. Note that N is an integer that is greater than or equal to 2, and i is an integer that is greater than or equal to 1 and less than or equal to N.

Figure 44:
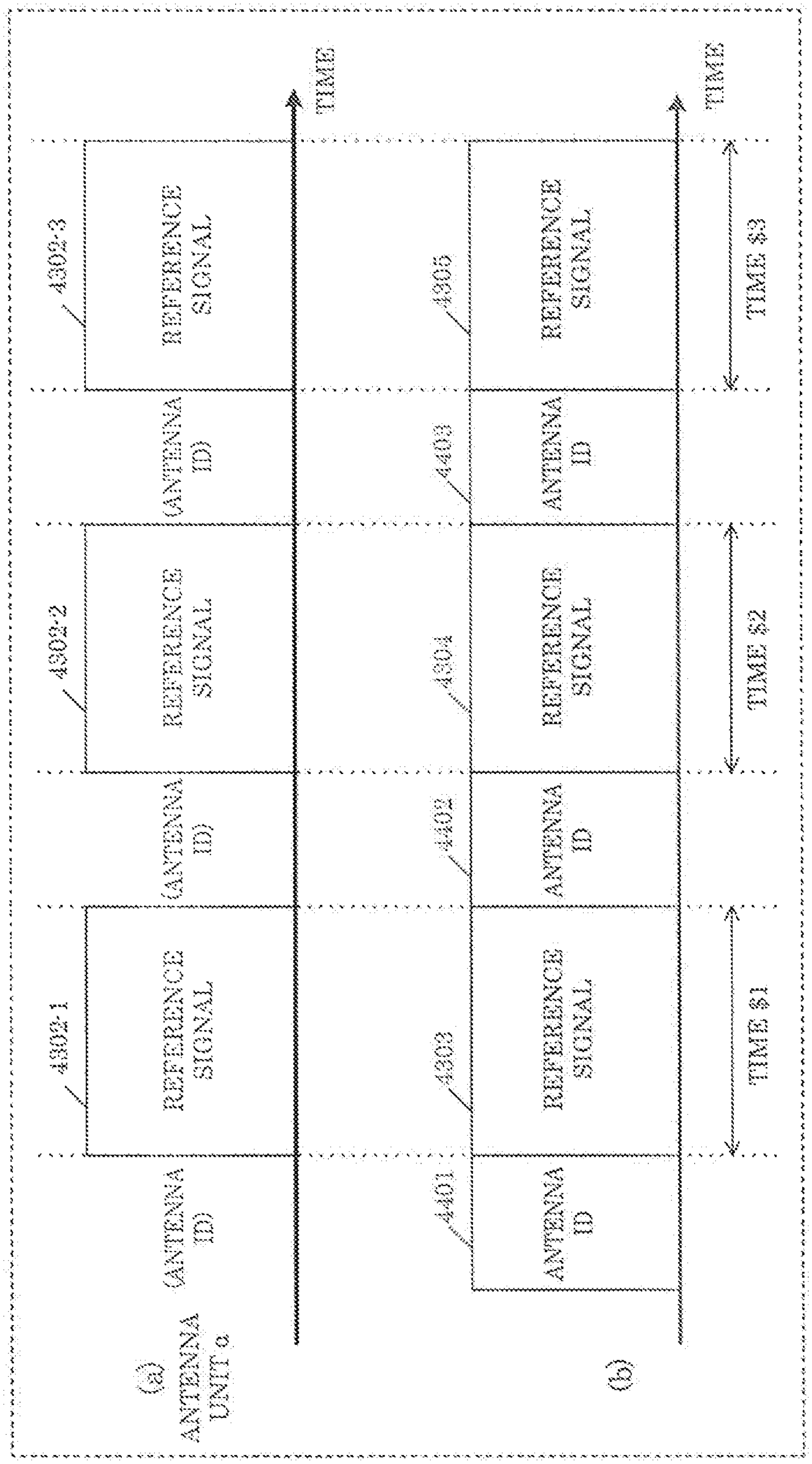
FIG. 44 illustrates an example of a configuration of an antenna settings symbol group.

FIG. 44 is one example of a configuration of antenna settings symbol group set 3481 that is different from the example illustrated in FIG. 43. Time is represented on the horizontal axis. Operations in FIG. 44 that are the same as in FIG. 43 share like reference marks. FIG. 44 differs from FIG. 43 in that a reference signal and an antenna ID symbol are always a set and transmitted as a set. Accordingly, antenna ID symbols 4401, 4402, and 4403 are present. Then, the configuration method of reference signals 4302-1, 4302-2, and 4302-3, and reference signals 4303, 4304, and 4305 in FIG. 44 is as described with reference to FIG. 43.

In either of the examples illustrated in FIG. 43 and FIG. 44, reference signals 4303, 4304, 4305 . . . as described above are transmitted. Here, the following condition holds true.

<Condition #15> i is an integer greater than or equal to 1 and less than or equal to N, j is an integer greater than or equal to 1 and less than or equal to N, i≠j, and with all instances of i and j that satisfy these, {u1*i*≠u1*j* or u2*i*≠u2*j* or u3*i*≠u3*j* or u4*i* u4*j*} is satisfied. Note that N is an integer that is greater than or equal to 2.

When antenna settings symbol group 3409_1 and antenna settings symbol group <2>3409_2 are transmitted from antenna unit α as illustrated in FIG. 34, (a) in FIG. 43 indicates a configuration of "antenna settings symbol group 3409_1 from antenna unit α" and (b) in FIG. 43 indicates a configuration of "antenna settings symbol group <2>3409_2". Alternatively, (a) in FIG. 44 indicates a configuration of "antenna settings symbol group 3409_1 from antenna unit α" and (b) in FIG. 44 indicates a configuration of "antenna settings symbol group <2>3409_2". With this, with regard to reference signals 4302-1, 4302-2, 4302-3 . . . and reference signals 4303, 4304, 4305 . . . described above, these reference signals are configured as described above.

Moreover, when antenna settings symbol group 3410_1 and antenna settings symbol group <3>3410_2 are transmitted from antenna unit α as illustrated in FIG. 34, (a) in FIG. 43 indicates a configuration of "antenna settings symbol group 3409_1 from antenna unit α" and (b) in FIG. 43 indicates a configuration of "antenna settings symbol group <3>3409_2". Alternatively, (a) in FIG. 44 indicates a configuration of "antenna settings symbol group 3409_1 from antenna unit α" and (b) in FIG. 44 indicates a configuration of "antenna settings symbol group <3>3409_2". With this, with regard to reference signals 4302-1, 4302-2, 4302-3 . . . and reference signals 4303, 4304, 4305 . . . described above, these reference signals are configured as described above.

By performing the same operations described above, from each reference signal 4302-1, 4302-2, 4302-3 . . . and reference signal 4303, 4304, 4305 in antenna settings symbol group 3409_1 and antenna settings symbol group <2>3409_2 transmitted using antenna unit α, communications station #2 estimates the communication state in each reference signal.

Then, by performing the same operations described above, from each reference signal 4302-1, 4302-2, 4302-3 . . . and reference signal 4303, 4304, 4305 in antenna settings symbol group 3410_1 and antenna settings symbol group <3>3410_2 transmitted using antenna unit α, communications station #2 estimates the communication state in each reference signal Then, from the communication states of these reference signals, communications station #2 estimates "the antenna unit and multiplication coefficient for communications station #1" for achieving favorable reception quality. Then, communications station #2 transmits, to communications station #1, information related to "the antenna group (that is not antenna unit α) new to communications station #1 and multiplication coefficient (of new antenna unit)" for achieving favorable reception quality (i.e., transmission $3(3453) in FIG. 34).

Figure 45:
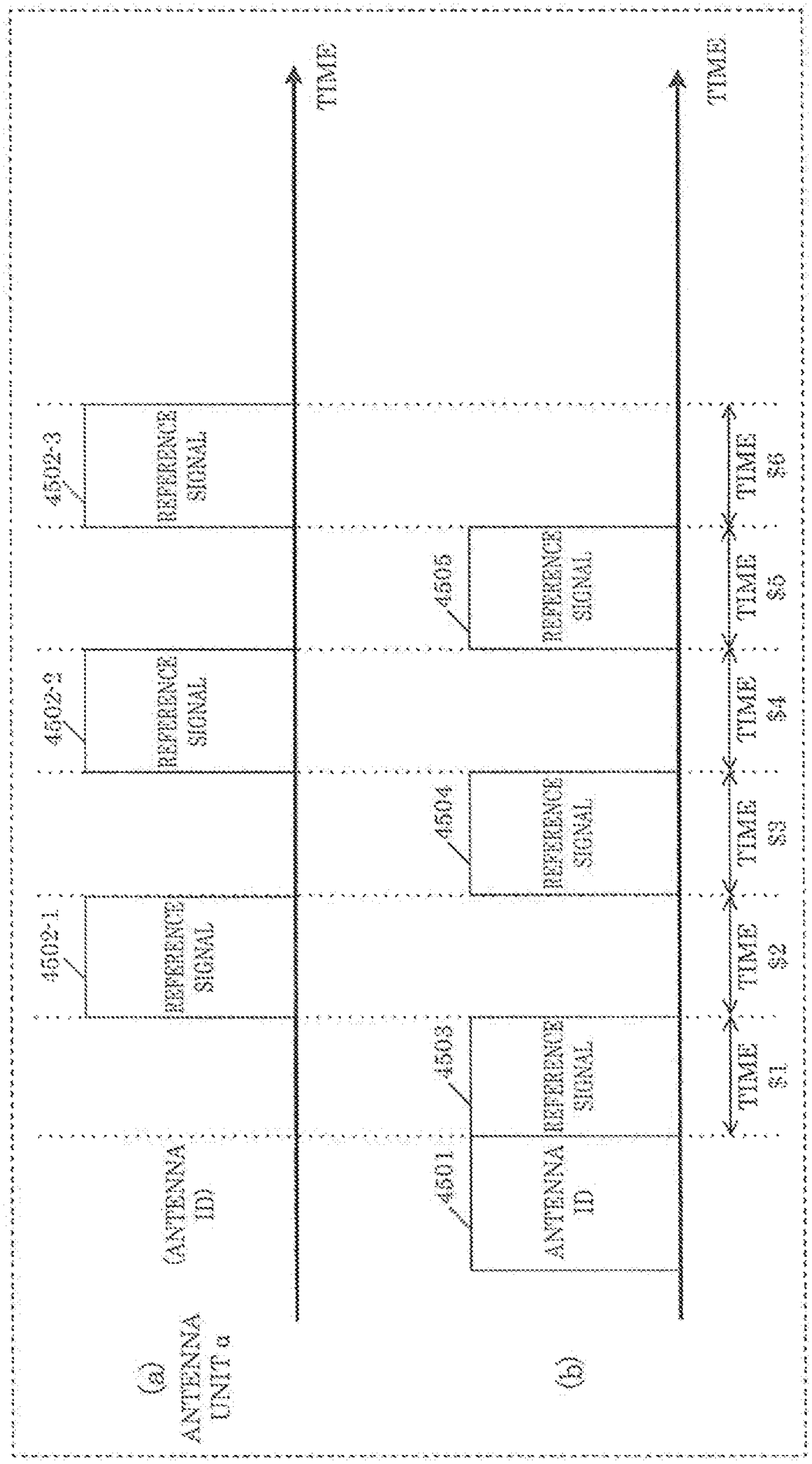
FIG. 45 illustrates an example of a configuration of an antenna settings symbol group.

FIG. 45 is one example of a configuration of antenna settings symbol group set 3481 that is different from the examples illustrated in FIG. 43 and FIG. 44. Time is represented on the horizontal axis. When antenna settings symbol group 3408_1 and antenna settings symbol group <1>3408_2 are transmitted from antenna unit α, (a) in FIG. 45 indicates a configuration of "antenna settings symbol group 3408_1 from antenna unit α" and (b) in FIG. 45 indicates a configuration of "antenna settings symbol group <1>3408_2".

As illustrated in (b) in FIG. 45, "antenna settings symbol group <1>3408_2" includes antenna ID symbol 4501. Just as described above, antenna ID symbol 4501 is a symbol including information on an antenna ID used to transmit "antenna settings symbol group <1>3408_2", and communications station #1 can discern which antenna was used to transmit "antenna settings symbol group <1>3408_2" as a result of communications station #2 receiving antenna ID symbol 4501.

In "antenna settings symbol group 3408_1 from antenna unit α" in (a) in FIG. 45, a symbol indicating the antenna ID for antenna unit α may or may not be transmitted. This is because information relating to antenna unit α is already shared between communications station #1 and communications station #2.

Then, in "antenna settings symbol group 3408_1 from antenna unit α" in (a) in FIG. 45, reference signal 4502-1 is arranged at time $2, and in "antenna settings symbol group <1>3408_2" in (b) in FIG. 45 as well, reference signal 4503 is arranged at time $1. Here, reference signal 4502-1 and reference signal 4503 are transmitted using the same frequency.

Here, upon transmitting reference signal 4503, a modulated signal is not transmitted from antenna unit α, and upon transmitting reference signal 4502-1, a modulated signal is not present in (b) in FIG. 45.

Note that the frame configuration is not limited to this example. As a variation, for example, reference signal 4502-1 and reference signal 4503 each include N symbols.

The in-phase component of the N symbols in reference signal 4502-1 is expressed as $I_{\alpha v}$, and the orthogonal component of the N symbols in reference signal 4502-1 is expressed as $Q_{\alpha v}$.

The in-phase component of the N symbols in reference signal 4503 is expressed as $I_{xv}$, and the orthogonal component of the N symbols in reference signal 4503 is expressed as $Q_{xv}$.

Here, the following relation equation is applied. Note that N is an integer that is greater than or equal to 2, and v is an integer that is greater than or equal to 0 and less than or equal to N−1.

[MATH. 58]

$$\sum_{v=0}^{N-1}(I_{\alpha v}\times I_{xv})=0 \quad \text{Equation (58)}$$

[MATH. 59]

$$\sum_{v=0}^{N-1}(Q_{\alpha v}\times Q_{xv})=0 \quad \text{Equation (59)}$$

At least one of <Condition #16> and <Condition #17> is satisfied.

<Condition #16>

Equation (58) and Equation (59) are satisfied. Also, that v is an integer that is greater than or equal to 0 and less than or equal to N−1, and any v that satisfies $I_{\alpha v}=0$ and $I_{xv}=0$ is present.

Further, v is an integer that is greater than or equal to 0 and less than or equal to N−1, and with all instances of v that satisfy this, $I_{\alpha v}=0$ and $I_{xv}=0$ are not satisfied.

<Condition #17>

Equation (58) and Equation (59) are satisfied. Also, that v is an integer that is greater than or equal to 0 and less than or equal to N−1, and any v that satisfies $Q_{\alpha v}=0$ and $Q_{xv}=0$ is present.

Further, v is an integer that is greater than or equal to 0 and less than or equal to N−1, and with all instances of v that satisfy this, $Q_{\alpha v}=0$ and $Q_{xv}=0$ is not satisfied.

With this, the channel state of the modulated signal transmitted by antenna unit α and the channel state in "antenna settings symbol group <1>3408_2" can be known, and accordingly, favorable antenna selection is possible.

Note that upon transmitting reference signal 4503, in the description related to FIG. 39, coefficient W1=S11, coefficient W2=S21, coefficient W3=S31, and coefficient W4=S41.

Here, since the coefficient that communications station #1 uses to transmit reference signal 4502-1 is antenna unit α, it is already determined.

In "antenna settings symbol group 3408_1 from antenna unit α" in (a) in FIG. 45, reference signal 4502-2 is arranged at time $4, and in "antenna settings symbol group <1>3408_2" in (b) in FIG. 45 as well, reference signal 4504 is arranged at time $3. Here, reference signal 4502-2 and reference signal 4504 are transmitted using the same frequency.

Here, upon transmitting reference signal 4504, a modulated signal is not transmitted from antenna unit α, and upon transmitting reference signal 4502-2, a modulated signal is not present in (b) in FIG. 45.

Note that the frame configuration is not limited to this example. As a variation, for example, reference signal 4502-2 and reference signal 4504 each include N symbols.

The in-phase component of the N symbols in reference signal 4502-2 is expressed as $I_{\alpha v}$, and the orthogonal component of the N symbols in reference signal 4502-2 is expressed as $Q_{\alpha v}$.

The in-phase component of the N symbols in reference signal 4504 is expressed as $I_{xv}$, and the orthogonal component of the N symbols in reference signal 4504 is expressed as $Q_{xv}$.

Here, the following relation equation is applied. Note that N is an integer that is greater than or equal to 2, and v is an integer that is greater than or equal to 0 and less than or equal to N−1.

[MATH. 60]

$$\sum_{v=0}^{N-1}(I_{\alpha v}\times I_{xv})=0 \quad \text{Equation (60)}$$

[MATH. 61]

$$\sum_{v=0}^{N-1}(Q_{\alpha v}\times Q_{xv})=0 \quad \text{Equation (61)}$$

At least one of <Condition #18> and <Condition #19> is satisfied.

<Condition #18>

Equation (60) and Equation (61) are satisfied. Also, that v is an integer that is greater than or equal to 0 and less than or equal to N−1, and any v that satisfies $I_{\alpha v}=0$ and $I_{xv}=0$ is present.

Further, v is an integer that is greater than or equal to 0 and less than or equal to N−1, and with all instances of v that satisfy this, $I_{\alpha v}=0$ and $I_{xv}=0$ are not satisfied.

<Condition #19>

Equation (60) and Equation (61) are satisfied. Also, that v is an integer that is greater than or equal to 0 and less than or equal to N−1, and any v that satisfies $Q_{\alpha v}=0$ and $Q_{xv}=0$ is present.

Further, v is an integer that is greater than or equal to 0 and less than or equal to N−1, and with all instances of v that satisfy this, $Q_{\alpha v}=0$ and $Q_{xv}=0$ is not satisfied.

With this, the channel state of the modulated signal transmitted by antenna unit α and the channel state in "antenna settings symbol group <1>3408_2" can be known, and accordingly, favorable antenna selection is possible.

Note that upon transmitting reference signal 4504, in the description related to FIG. 39, coefficient W1=S12, coefficient W2=S22, coefficient W3=S32, and coefficient W4=S42.

Here, since the coefficient that communications station #1 uses to transmit reference signal 4502-2 is antenna unit α, it is already determined.

In "antenna settings symbol group 3408_1 from antenna unit α" in (a) in FIG. 45, reference signal 4502-3 is arranged at time $6, and in "antenna settings symbol group <1>3408_2" in (b) in FIG. 45 as well, reference signal 4505 is arranged at time $5. Here, reference signal 4502-3 and reference signal 4505 are transmitted using the same frequency.

Here, upon transmitting reference signal 4505, a modulated signal is not transmitted from antenna unit α, and upon transmitting reference signal 4502-3, a modulated signal is not present in (b) in FIG. 45.

Note that the frame configuration is not limited to this example. As a variation, for example, reference signal 4502-3 and reference signal 4505 each include N symbols.

The in-phase component of the N symbols in reference signal 4502-3 is expressed as $I_{\alpha v}$, and the orthogonal component of the N symbols in reference signal 4502-3 is expressed as $Q_{\alpha v}$.

The in-phase component of the N symbols in reference signal 4505 is expressed as $I_{xv}$, and the orthogonal component of the N symbols in reference signal 4505 is expressed as $Q_{xv}$.

Here, the following relation equation is applied. Note that N is an integer that is greater than or equal to 2, and v is an integer that is greater than or equal to 0 and less than or equal to N−1.

[MATH. 62]

$$\sum_{v=0}^{N-1}(I_{\alpha v}\times I_{xv})=0 \quad \text{Equation (62)}$$

[MATH. 63]

$$\sum_{v=0}^{N-1}(Q_{\alpha v}\times Q_{xv})=0 \quad \text{Equation (63)}$$

At least one of <Condition #20> and <Condition #21> is satisfied.

<Condition #20>

Equation (62) and Equation (63) are satisfied. Also, that v is an integer that is greater than or equal to 0 and less than or equal to N−1, and any v that satisfies $I_{\alpha v}=0$ and $I_{xv}=0$ is present.

Further, v is an integer that is greater than or equal to 0 and less than or equal to N−1, and with all instances of v that satisfy this, $I_{\alpha v}=0$ and $I_{xv}=0$ are not satisfied.

<Condition #21>

Equation (62) and Equation (63) are satisfied. Also, that v is an integer that is greater than or equal to 0 and less than or equal to N−1, and any v that satisfies $Q_{\alpha v}=0$ and $Q_{xv}=0$ is present.

Further, v is an integer that is greater than or equal to 0 and less than or equal to N−1, and with all instances of v that satisfy this, $Q_{\alpha v}=0$ and $Q_{xv}=0$ is not satisfied.

With this, the channel state of the modulated signal transmitted by antenna unit α and the channel state in "antenna settings symbol group <1>3408_2" can be known, and accordingly, favorable antenna selection is possible.

Note that upon transmitting reference signal 4505, in the description related to FIG. 39, coefficient W1=S13, coefficient W2=S23, coefficient W3=S33, and coefficient W4=S43.

Here, since the coefficient that communications station #1 uses to transmit reference signal 4502-3 is antenna unit α, it is already determined.

In the above description, the number of sets of reference signals transmitted at the same time is three, but the number of sets is not limited to this example; N sets may be transmitted. Note that N is an integer that is greater than or equal to 2. In this case, in (b) in FIG. 45, upon transmitting a reference signal, in the description related to FIG. 39, coefficient W1=S1*i*, coefficient W2=S2*i*, coefficient W3=S3*i*, and coefficient W4=S4*i*. Note that i is an integer that is greater than or equal to 1 and less than or equal to N.

Figure 46:
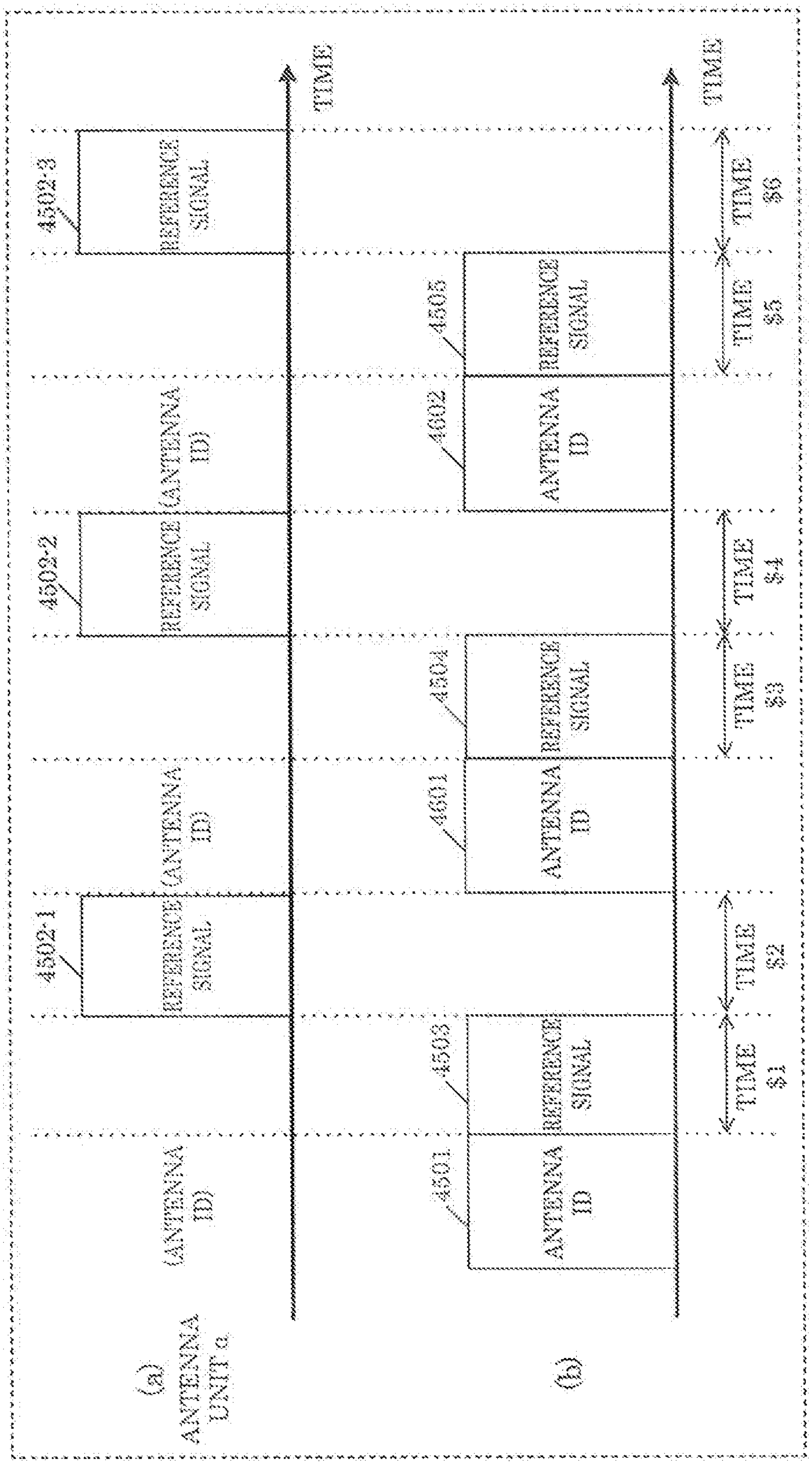
FIG. 46 illustrates an example of a configuration of an antenna settings symbol group.

FIG. 46 is one example of a configuration of antenna settings symbol group set 3481 that is different from the example illustrated in FIG. 45. Time is represented on the horizontal axis. Operations in FIG. 46 that are the same as in FIG. 44 share like reference marks. FIG. 46 differs from FIG. 44 in that a reference signal and an antenna ID symbol are always a set and transmitted as a set. Accordingly, antenna ID symbols 4501, 4601, and 4602 are present. Then, the configuration method of reference signals 4502-1, 4502-2, and 4502-3, and reference signals 4503, 4504, and 4506 in FIG. 46 is as described with reference to FIG. 45.

In either of the examples illustrated in FIG. 45 and FIG. 46, reference signals 4503, 4504, 4505 . . . as described above are transmitted. Here, the following condition holds true.

<Condition #22> i is an integer greater than or equal to 1 and less than or equal to N (N is an integer greater than or equal to 2), j is an integer greater than or equal to 1 and less than or equal to N, i≠j, and with all instances of i and j that satisfy these, {S1*i*≠S1*j* or S2*i*≠S2*j* or S3*i*≠S3*j* or S4*i*≠S4*j*} is satisfied.

When antenna settings symbol group 3409_1 and antenna settings symbol group <2>3409_2 are transmitted from antenna unit α as illustrated in FIG. 34, (a) in FIG. 45 indicates a configuration of "antenna settings symbol group 3409_1 from antenna unit α" and (b) in FIG. 45 indicates a configuration of "antenna settings symbol group <2>3409_2". Alternatively, (a) in FIG. 46 indicates a configuration of "antenna settings symbol group 3409_1 from antenna unit α" and (b) in FIG. 46 indicates a configuration of "antenna settings symbol group <2>3409_2". With this, with regard to reference signals 4502-1, 4502-2, 4502-3 . . . and reference signals 4503, 4504, 4505 . . . described above, these reference signals are configured as described above.

Moreover, when antenna settings symbol group 3410_1 and antenna settings symbol group <3>3410_2 are transmitted from antenna unit α as illustrated in FIG. 34, (a) in FIG. 45 indicates a configuration of "antenna settings symbol group 3409_1 from antenna unit α" and (b) in FIG. 45 indicates a configuration of "antenna settings symbol group <2>3409_2". Alternatively, (a) in FIG. 46 indicates a configuration of "antenna settings symbol group 3409_1 from antenna unit α" and (b) in FIG. 46 indicates a configuration of "antenna settings symbol group <2>3409_2". With this, with regard to reference signals 4502-1, 4502-2, 4502-3 . . . and reference signals 4503, 4504, 4505 . . . described above, these reference signals are configured as described above.

By performing the same operations described above, from each reference signal 4502-1, 4502-2, 4502-3 . . . and reference signal 4503, 4504, 4505 in antenna settings symbol group 3409_1 and antenna settings symbol group <2>3409_2 transmitted using antenna unit α, communications station #2 estimates the communication state in each reference signal.

Then, by performing the same operations described above, from each reference signal 4502-1, 4502-2, 4502-3 . . . and reference signal 4503, 4504, 4505 in antenna settings symbol group 3410_1 and antenna settings symbol group <3>3410_2 transmitted using antenna unit α, communications station #2 estimates the communication state in each reference signal Note that hereinafter, the communication state in a reference signal indicates the communication quality in a reference signal.

Then, from the communication states of these reference signals, communications station #2 estimates "the antenna unit and multiplication coefficient for communications station #1" for achieving favorable reception quality. Then, communications station #2 transmits, to communications station #1, information related to "the antenna group (that is not antenna unit α) new to communications station #1 and multiplication coefficient (of new antenna unit)" for achieving favorable reception quality (i.e., transmission $3(3453) in FIG. 34).

Additionally, during reception of reference signals 4502-1, 4502-2, 4502-3 . . . and reference signals 4503, 4504, and 4505 in antenna settings symbol group 3409_1 and antenna settings symbol group <2>3409_2 from antenna unit α by communications station #2, each reception antenna unit in communications station #2 has the configuration illustrated in FIG. 40, and may also predict a favorable multiplication coefficient. Accordingly, communications station #2 sets a favorable multiplication coefficient to be used by a new antenna unit (antenna unit δ).

Accordingly, communications station #2 transmits antenna-related symbol group $3(3453) in FIG. 34, and as a result of communications station #1 receiving this symbol group, communications station #1 knows of the completion of the setting of the antenna unit in communications station #2 (i.e., the determining of which antenna unit and the determining of the multiplication coefficient to be used).

In this way, first, communications station #1 transmits a reference symbol from each antenna unit in order to determine an antenna unit to be used for transmission, the communication state of each reference symbol is obtained from communications station #2, one antenna unit (antenna unit α) for transmitting the data symbol is determined, and, next, communications station #1 transmits a reference symbol from antenna unit α and each antenna unit, and the communication state of the reference symbol transmitted from antenna unit α and the communication state of the reference symbol transmitted from each antenna unit are obtained from communications station #2, then the data symbol is transmitted, and one more antenna unit (antenna unit γ) is determined, whereby communications station #2 can achieve the advantageous effect of high data reception quality. Note that, here, the multiplication coefficient to be used by the transceiving antenna may also be determined.

Next, an example of a transmission frame of communications station #1 and communications station #2 in the time axis will be given with respect to "Example 2 of communication between communications station #1 and communications station #2".

Figure 47:
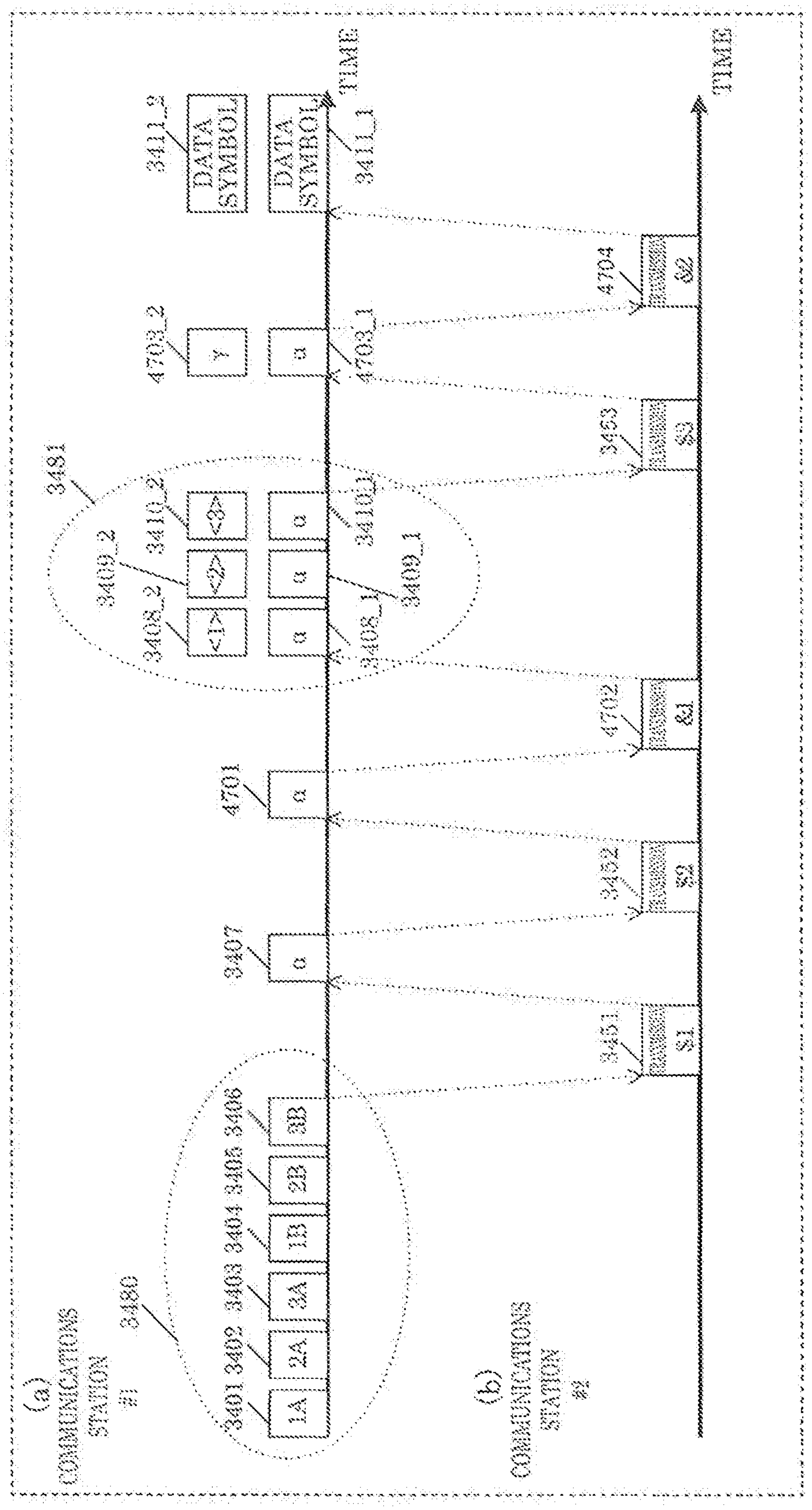
FIG. 47 illustrates an example of transmission frame communication between communications station #1 and communications station #2.

FIG. 47 illustrates an example of a transmission frame of communications station #1 and communications station #2 in the time axis that is different from the example illustrated in FIG. 34. In (a) in FIG. 47, the transmission frame of communications station #1 in the time axis is shown, and in (b) in FIG. 47, the transmission frame of communications station #2 in the time axis is shown. Note that in (a) and (b) in FIG. 47, symbols may also be present in the frequency axis.

Operations in FIG. 47 that are the same as in FIG. 34 share like reference marks.

As illustrated in FIG. 47, first, communications station #1 transmits antenna settings symbol group 3401 from #1A antenna unit 2915A, then transmits antenna settings symbol group 3402 from #2A antenna unit 2916A, antenna settings symbol group 3403 from #3A antenna unit 2917A, antenna settings symbol group 3404 from #1B antenna unit 2915B, antenna settings symbol group 3405 from #2B antenna unit 2916B, and antenna settings symbol group 3406 from #3B antenna unit 2917B. Note that these symbol groups are collectively referred to as antenna settings symbol group 3480.

Communications station #2 receives antenna settings symbol group 3480 transmitted by communications station #1. Then, for example, communications station #2 compares the reception field intensity of antenna settings symbol group 3401 transmitted using #1A antenna unit 2915A, the reception field intensity of antenna settings symbol group 3402 transmitted using #2A antenna unit 2916A, the reception field intensity of antenna settings symbol group 3403 transmitted using #3A antenna unit 2917A, the reception field intensity of antenna settings symbol group 3404 transmitted using #1B antenna unit 2915B, the reception field intensity of antenna settings symbol group 3405 transmitted using #2B antenna unit 2916B, and the reception field intensity of antenna settings symbol group 3406 transmitted using #3B antenna unit 2917B, estimates the antenna unit of communications station #1 whose reception field intensity will increase, and selects an antenna unit that it wants communications station #1 to use to transmit the modulated signal. Then, communications station #2 transmits antenna-related symbol group $1(3451) including information on the selected antenna unit.

Communications station #1 receives antenna-related symbol group $1(3451) transmitted by communications station #2, and based on "information on the selected antenna unit" included in antenna-related symbol group $1(3451) transmitted by communications station #2, determines an antenna unit to be used for modulated signal transmission (i.e., antenna unit α), and transmits antenna settings symbol group 3407 from antenna unit α.

Communications station #2 uses #1X antenna unit 3001X, #2X antenna unit 3002X, #3X antenna unit 3003X, #1Y antenna unit 3001Y, #2Y antenna unit 3002Y, and #3Y antenna unit 3003Y to receive antenna settings symbol group 3407 transmitted by communications station #1, and determines one reception antenna unit to be used for reception. Note that, here, the antenna unit determined to be used for reception is named "determined antenna unit β", as described above. Communications station #2 transmits antenna-related symbol group $2(3452) to notify communications station #1 that one reception antenna unit to be used for reception has been determined. Here, antenna-related symbol group $2(3452) may include information on the determined reception antenna.

Communications station #1 receives antenna-related symbol group $2(3452) transmitted by communications station #2, and is thereby notified of the determination of one antenna unit to be used by communications station #2 for reception. With this, the one antenna unit to be used by communications station #1 for transmission and the one antenna unit to be used by communications station #2 are determined.

As described before, each (transmitting) antenna unit included in communications station #1 is configured as shown in FIG. 39, and each antenna unit (each reception antenna unit) included in communications station #2 is configured as shown in FIG. 40.

Communications station #1 receives, with a frame configuration such as illustrated in FIG. 41 and/or FIG. 42 described above, multiplication coefficient settings symbol group 4701 from antenna unit α. Note that as description of the frame configurations illustrated in FIG. 41 and FIG. 42 has been given above, repetition will be omitted here. Antenna ID symbols 4101, 4201, 4202 . . . in FIG. 41 and FIG. 42 include, for example, information on an ID related to antenna unit α. Then, the multiplication coefficient set to be used by the antenna unit in FIG. 39 is switched, and reference signals 4102-1, 4102-2, 4102-3 . . . are transmitted. Note that details regarding this are as described above.

Then, from the communication states of these reference signals (multiplication coefficient settings symbol group 4701), communications station #2 estimates "the multiplication coefficient for antenna unit α in communications station #1" for achieving favorable reception quality. Then, communications station #2 transmits, to communications station #1, information related to "the multiplication coefficient for antenna unit α in communications station #1" for achieving favorable reception quality (i.e., transmission &1(4702) in FIG. 47).

Additionally, communications station #2 receives multiplication coefficient settings symbol group 4701 and thus estimates a favorable multiplication coefficient to be used in an antenna configuration unit such as in FIG. 40. Then, communications station #2 sets the multiplication coefficient to be used by antenna unit $\beta$.

In accordance with the following rules, communications station #1 "transmits antenna settings symbol group 3408_1 from antenna unit $\alpha$, transmits antenna settings symbol group <1>3408_2, transmits antenna settings symbol group 3409_1 from antenna unit $\alpha$, transmits antenna settings symbol group <2>3409_2, transmits antenna settings symbol group 3410_1 from antenna unit $\alpha$, and transmits antenna settings symbol group <3>3410_2". These symbol groups are collectively referred to as antenna settings symbol group set 3481.

Rule: if determined antenna unit $\alpha$ is #1A antenna unit 2915A or #2A antenna unit 2916A or #3A antenna unit 2917A, communications station #1 "transmits antenna settings symbol group 3408_1 from determined antenna unit $\alpha$, and transmits antenna settings symbol group <1>3408_2 from #1B antenna unit 2915B". Then, communications station #1 "transmits antenna settings symbol group 3409_1 from determined antenna unit $\alpha$ and transmits antenna settings symbol group <2>3409_2 from #2B antenna unit 2916B", and "transmits antenna settings symbol group 3410_1 from determined antenna unit $\alpha$ and transmits antenna settings symbol group <3>3410_2 from #3B antenna unit 2917B".

Note that communications station #1 may transmit antenna settings symbol group 3408_1 from determined antenna unit $\alpha$ and transmit antenna settings symbol group <1>3408_2 from #1B antenna 2915B, and then transmit antenna settings symbol group <2>3409_2 from #2B antenna 2916B and transmit antenna settings symbol group <3>3410_2 from #3B antenna 2917B. Here, the symbol transmission order is not limited to these examples.

Rule: if determined antenna unit $\alpha$ is #1B antenna unit 2915B or #2B antenna unit 2916B or #3B antenna unit 2917B, communications station #1 "transmits antenna settings symbol group 3408_1 from determined antenna unit $\alpha$ and transmits antenna settings symbol group <1>3408_2 from #1A antenna unit 2915A". Then, communications station #1 "transmits antenna settings symbol group 3409_1 from determined antenna unit $\alpha$ and transmits antenna settings symbol group <2>3409_2 from #2A antenna unit 2916A" and "transmits antenna settings symbol group 3410_1 from determined antenna unit $\alpha$ and transmits antenna settings symbol group <3>3410_2 from #3A antenna unit 2917A".

Note that communications station #1 may transmit antenna settings symbol group 3408_1 from determined antenna unit $\alpha$ and transmit antenna settings symbol group 3408_1 from #1A antenna 2915A, and then transmit antenna settings symbol group <2>3409_2 from #2A antenna 2916A and transmit antenna settings symbol group <3>3410_2 from #3A antenna 2917A. Here, the symbol transmission order is not limited to these examples.

Note that the configuration method of antenna settings symbol group set 3481 is as described with reference to FIG. 35 and/or FIG. 36.

Communications station #2 receives antenna settings symbol group set 3481 transmitted by communications station #1. Then, communications station #2 "determines one antenna unit to transmit the modulated signal, to be used at the same time as antenna unit $\alpha$ by communications station #1". Note that the antenna unit determined to be used for transmission is named "determined antenna unit $\gamma$".

Communications station #2 newly determines a reception antenna unit in accordance with the following rules.

Rule: if determined antenna unit $\beta$ is #1X antenna unit 3001X or #2X antenna unit 3002X or #3X antenna unit 3003X, communications station #2 determines one of #1Y antenna unit 3001Y, #2Y antenna unit 3002Y, and #3Y antenna unit 3003Y to be the new antenna to be used for reception.

Rule: if determined antenna unit $\beta$ is #1Y antenna unit 3001Y or #2Y antenna unit 3002Y or #3Y antenna unit 3003Y, communications station #2 determines one of #1X antenna unit 3001X, #2X antenna unit 3002X, and #3X antenna unit 3003X to be the new antenna to be used for reception. Note that, here, the antenna unit determined to be used for reception is named "antenna unit $\delta$", just as described above.

Communications station #2 transmits, to communications station #1, antenna-related symbol group $3(3453) including "information on an antenna for modulated signal transmission by communications station #1 (i.e., information on determined antenna unit $\gamma$)". Here, antenna-related symbol group $3(3453) may include information on the determined reception antenna.

Note that the antenna unit determination method is as described with reference to FIG. 35 and FIG. 36.

Communications station #1 transmits multiplication coefficient settings symbol group 4703_1 from antenna unit $\alpha$ and multiplication coefficient settings symbol group 4703_2 from antenna unit $\gamma$. Here, these symbol groups are configured as illustrated in, for example, FIG. 43, FIG. 44, FIG. 45, and FIG. 46, and details regarding operations pertaining thereto are as described above.

Communications station #2 estimates the communication state from the reference signals illustrated in FIG. 43, FIG. 44, FIG. 45, and FIG. 46, and estimates a favorable "multiplication coefficient for antenna unit $\gamma$ in communications station #1". Then, communications station #2 transmits, to communications station #1, information related to "the multiplication coefficient for antenna unit $\gamma$ in communications station #1" for achieving favorable reception quality (i.e., transmission &2(4704) in FIG. 47).

Additionally, communications station #2 estimates a multiplication coefficient to be used by antenna unit $\delta$ in such an antenna unit as illustrated in FIG. 40, by receiving multiplication coefficient settings symbol group 4703_1 from antenna unit $\alpha$ and multiplication coefficient settings symbol group 4703_2 from antenna unit $\gamma$. Then, communications station #2 sets the multiplication coefficient to be used by antenna unit $\delta$.

Communications station #1 receives transmission &2(4704) transmitted by communications station #2, determines that the setting of the antenna is complete, and transmits data symbol group 3411_1 and data symbol group 3411_2. Here, data symbol group 3411_1 and data symbol group 3411_2 are transmitted at the same frequency and at the same time. In other words, they are transmitted using the MIMO transmission method exemplified in Embodiment 1. Then, the antennas to be used for modulated signal transmission by communications station #1 are antenna unit $\alpha$ and antenna unit $\gamma$. Note that although not recited in the description of data symbol group 3411_1 and data symbol group 3411_2, data symbol group 3411_1 and data symbol group 3411_2 may include symbols other than data symbols, such as symbols from transmitting control information, preambles, pilot symbols, and reference symbols.

Next, "Example 3 of communication between communications station #1 and communications station #2" illustrated in FIG. 48 will be described.

Example 3 of communication between communications station #1 and communications station #2:

Step ST48-1:

Communications station #1 transmits a signal from #1A antenna unit 2915A illustrated in FIG. 29. Then, communications station #1 transmits a signal from #2A antenna unit 2916A, transmits a signal from #3A antenna unit 2917A, transmits a signal from #1B antenna unit 2915B, transmits a signal from #2B antenna unit 2916B, and transmits a signal from #3B antenna unit 2917B.

Step ST48-2:

Communications station #2 receives the modulated signal transmitted in Step ST48-1, and determines "one of #1A antenna unit 2915A, #2A antenna unit 2916A, #3A antenna unit 2917A, #1B antenna unit 2915B, #2B antenna unit 2916B, and #3B antenna unit 2917B as an antenna for modulated signal transmission by communications station #1". Note that, here, the antenna unit determined to be used for the transmission is named "determined antenna unit α".

Further, communications station #2 receives the signal transmitted from antenna unit α by communications station #1, and determines one of #1X antenna unit 3001X, #2X antenna unit 3002X, #3X antenna unit 3003X, #1Y antenna unit 3001Y, #2Y antenna unit 3002Y, and #3Y antenna unit 3003Y illustrated in FIG. 30 to be used for reception as a reception antenna unit. Note that, here, the antenna unit determined to be used for reception is named "determined antenna unit β".

Step ST48-3:

Communications station #1 is notified that one reception antenna unit to be used for reception has been determined. Here, communications station #1 may be notified with information on the determined reception antenna.

Step ST48-4:

Communications station #1 transmits a signal in accordance with the following rules.

Rule: if determined antenna unit α is #1A antenna unit 2915A or #2A antenna unit 2916A or #3A antenna unit 2917A, communications station #1 "transmits a signal from determined antenna unit α and #1B antenna unit 2915B". Then, communications station #1 "transmits a signal from determined antenna unit α and #2B antenna unit 2916B", and then "transmits a signal from determined antenna unit α and #3B antenna unit 2917B". Note that communications station #1 may transmit a signal from determined antenna unit α and #1B antenna 2915B, and then transmit a signal from #2B antenna 2916B, and then transmit a signal from #3B antenna 2917B.

Rule: if determined antenna unit α is #1B antenna unit 2915B or #2B antenna unit 2916B or #3B antenna unit 2917B, communications station #1 "transmits a signal from determined antenna unit α and #1A antenna unit 2915A". Then, communications station #1 "transmits a signal from determined antenna unit α and #2A antenna unit 2916A", and then "transmits a signal from determined antenna unit α and #3A antenna unit 2917A". Note that communications station #1 may transmit a signal from determined antenna unit α and #1A antenna 2915A, and then transmit a signal from #2A antenna 2916A, and then transmit a signal from #3A antenna 2917A.

Step ST48-5:

Communications station #2:

"determines one antenna unit to transmit the modulated signal, to be used at the same time as antenna unit α by communications station #1". Note that the antenna unit determined to be used for transmission is named "determined antenna unit γ".

Communications station #2 newly determines a reception antenna unit in accordance with the following rules.

Rule: if determined antenna unit β is #1X antenna unit 3001X or #2X antenna unit 3002X or #3X antenna unit 3003X, communications station #2 determines one of #1Y antenna unit 3001Y, #2Y antenna unit 3002Y, and #3Y antenna unit 3003Y to be the new antenna to be used for reception.

Rule: if determined antenna unit β is #1Y antenna unit 3001Y or #2Y antenna unit 3002Y or #3Y antenna unit 3003Y, communications station #2 determines one of #1X antenna unit 3001X, #2X antenna unit 3002X, and #3X antenna unit 3003X to be the new antenna to be used for reception.

Step ST48-6:

Communications station #2 transmits, to communications station #1, "information on an antenna for modulated signal transmission by communications station #1 (i.e., information on determined antenna unit γ)".

Communications station #2 notifies communications station #1 that one reception antenna unit to be used for reception has been newly determined. Communications station #2 may notify communications station #1 with information on the determined reception antenna unit. Note that, here, the antenna unit determined to be used for reception is named "antenna unit δ".

Step ST48-7:

Communications station #1 starts data symbol transmission using antenna unit α and antenna unit γ. Communications station #1 starts transmission of two modulated signals using antenna unit α and antenna unit γ.

Example 3 of communication between communications station #1 and communications station #2 has been described with reference to FIG. 48, but the processing in FIG. 32 may be inserted at <P> in FIG. 48, and the processing in FIG. 33 may be inserted at <Q> in FIG. 48. In such a case, communication between communications station #1 and communications station #2 is as described above.

Figure 49:
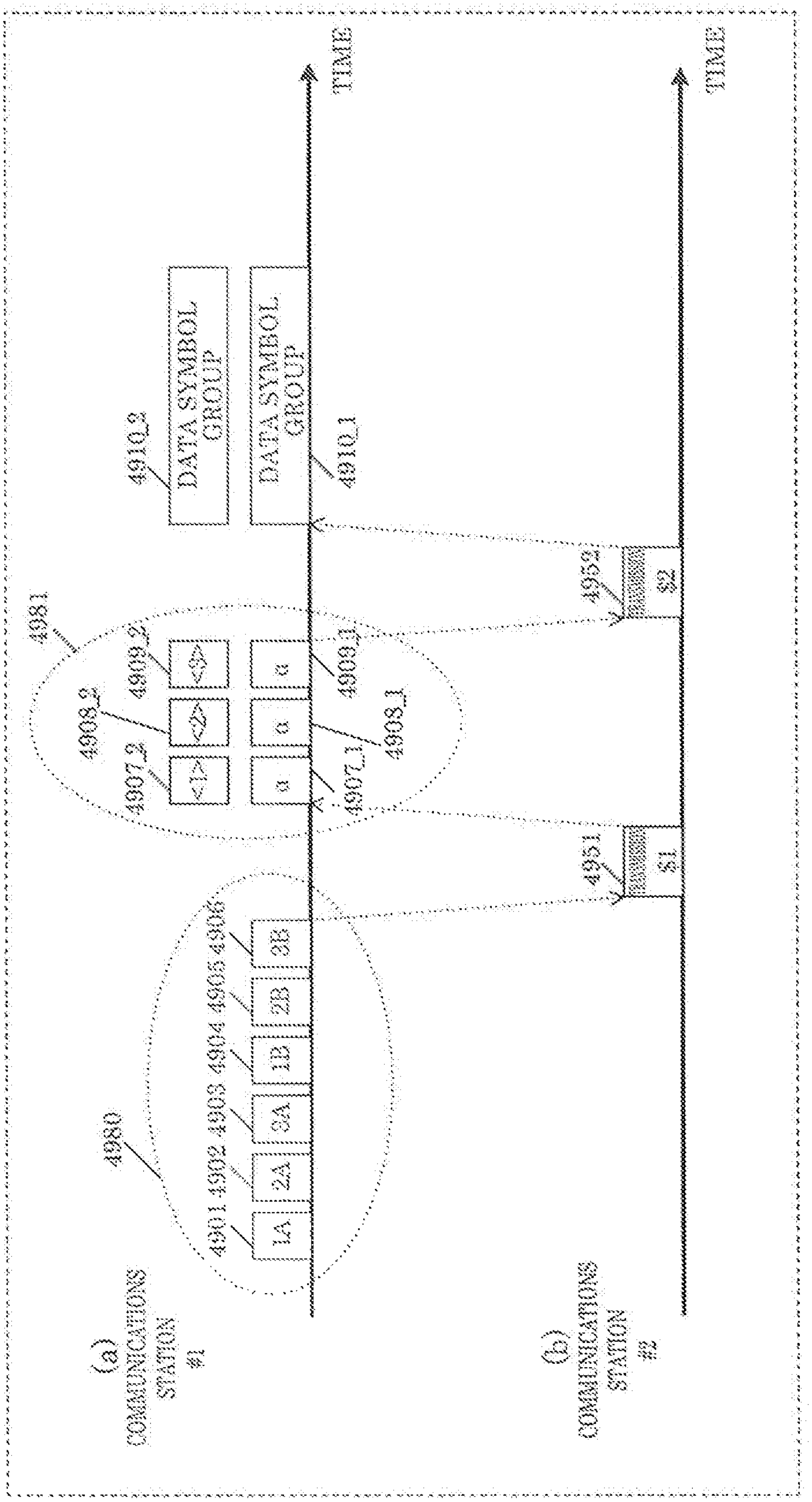
FIG. 49 illustrates an example of transmission frame communication between communications station #1 and communications station #2.

FIG. 49 illustrates an example of a transmission frame of communications station #1 and communications station #2 in the time axis, based on FIG. 48. In (a) in FIG. 49, the transmission frame of communications station #1 in the time axis is shown, and in (b) in FIG. 49, the transmission frame of communications station #2 in the time axis is shown. Note that in (a) and (b) in FIG. 49, symbols may also be present in the frequency axis.

As illustrated in FIG. 49, first, communications station #1 transmits antenna settings symbol group 4901 from #1A antenna unit 2915A, then transmits antenna settings symbol group 4902 from #2A antenna unit 2916A, antenna settings symbol group 4903 from #3A antenna unit 2917A, antenna settings symbol group 4904 from #1B antenna unit 2915B, antenna settings symbol group 4905 from #2B antenna unit 2916B, and antenna settings symbol group 4906 from #3B antenna unit 2917B. Note that these symbol groups are collectively referred to as antenna settings symbol group 4980.

Communications station #2 receives antenna settings symbol group 4980 transmitted by communications station #1. Then, for example, communications station #2 compares the reception field intensity in antenna settings symbol group 4901 transmitted using #1A antenna unit 2915A, the reception field intensity in antenna settings symbol group 4902 transmitted using #2A antenna unit 2916A, the reception field intensity in antenna settings symbol group 4903 transmitted using #3A antenna unit 2917A, the reception field intensity in antenna settings symbol group 4904 transmitted using #1B antenna unit 2915B, the reception field intensity in antenna settings symbol group 4905 transmitted using #2B antenna unit 2916B, and the reception field intensity in antenna settings symbol group 4906 transmitted using #3B antenna unit 2917B, estimates the antenna unit of communications station #1 whose reception field intensity will increase, and selects an antenna unit that it wants communications station #1 to use to transmit the modulated signal. Then, communications station #2 transmits antenna-related symbol group $1(4951) including information on the selected antenna unit.

Then, communications station #2 uses #1X antenna unit 3001X, #2X antenna unit 3002X, #3X antenna unit 3003X, #1Y antenna unit 3001Y, #2Y antenna unit 3002Y, and #3Y antenna unit 3003Y to receive antenna settings symbol group 4980 transmitted by communications station #1. Communications station #2 then determines an antenna unit to be used for reception. Note that the determined antenna unit is referred to as antenna unit @.

Communications station #1 receives antenna-related symbol group $1(4951) transmitted by communications station #2, and based on “information on the selected antenna unit” included in antenna-related symbol group $1(4951) transmitted by communications station #2, determines an antenna unit to be used for modulated signal transmission (i.e., antenna unit $\alpha$).

With this, the one antenna unit to be used by communications station #1 for transmission and the one antenna unit to be used by communications station #2 are determined.

In accordance with the following rules, communications station #1 “transmits antenna settings symbol group 4907_1 from antenna unit $\alpha$, transmits antenna settings symbol group <1>4907_2, transmits antenna settings symbol group 4908_1 from antenna unit $\alpha$, transmits antenna settings symbol group <2>4908_2, transmits antenna settings symbol group 4909_1 from antenna unit $\alpha$, and transmits antenna settings symbol group <3>4909_2”. Note that these symbol groups are collectively referred to as antenna settings symbol group set 4981.

Rule: if determined antenna unit $\alpha$ is #1A antenna unit 2915A or #2A antenna unit 2916A or #3A antenna unit 2917A, communications station #1 “transmits antenna settings symbol group 4907_1 from determined antenna unit $\alpha$, and transmits antenna settings symbol group <1>4907_2 from #1B antenna unit 2915B”. Then, communications station #1 “transmits antenna settings symbol group 4908_1 from determined antenna unit $\alpha$ and transmits antenna settings symbol group <2>4908_2 from #2B antenna unit 2916B”, and “transmits antenna settings symbol group 4909_1 from determined antenna unit $\alpha$ and transmits antenna settings symbol group <3>4909_2 from #3B antenna unit 2917B”.

Note that communications station #1 may transmit antenna settings symbol group 4907_1 from determined antenna unit $\alpha$ and transmit antenna settings symbol group <1>4907_2 from #1B antenna 2915B, and then transmit antenna settings symbol group <2>4908_2 from #2B antenna 2916B and transmit antenna settings symbol group <3>4909_2 from #3B antenna 2917B. Here, the symbol transmission order is not limited to these examples.

Rule: if determined antenna unit $\alpha$ is #1B antenna unit 2915B or #2B antenna unit 2916B or #3B antenna unit 2917B, communications station #1 “transmits antenna settings symbol group 4907_1 from determined antenna unit $\alpha$ and transmits antenna settings symbol group <1>4907_2 from #1A antenna unit 2915A”. Then, communications station #1 “transmits antenna settings symbol group 4908_1 from determined antenna unit $\alpha$ and transmits antenna settings symbol group <2>4908_2 from #2A antenna unit 2916A” and “transmits antenna settings symbol group 4909_1 from determined antenna unit $\alpha$ and transmits antenna settings symbol group <3>4909_2 from #3A antenna unit 2917A”.

Note that communications station #1 may transmit antenna settings symbol group 4907_1 from determined antenna unit $\alpha$ and transmit antenna settings symbol group 4907_1 from #1A antenna 2915A, and then transmit antenna settings symbol group <2>4908_2 from #2A antenna 2916A and transmit antenna settings symbol group <3>4909_2 from #3A antenna 2917A. Here, the symbol transmission order is not limited to these examples.

Moreover, communications station #1 transmits antenna settings symbol group 4907_1 from antenna unit $\alpha$ and transmits antenna settings symbol group <1>4907_2. Similarly, communications station #1 transmits antenna settings symbol group 4908_1 from antenna unit $\alpha$ and transmits antenna settings symbol group <2>4908_2. Similarly, communications station #1 transmits antenna settings symbol group 4909_1 from antenna unit $\alpha$ and transmits antenna settings symbol group <3>4909_2. Here, these symbol groups are configured as illustrated in, for example, FIG. 36 and FIG. 37, and details regarding operations pertaining thereto are as described above.

Communications station #2 estimates the communication state from the reference signals illustrated in FIG. 36 and FIG. 37, and estimates a favorable “antenna unit $\gamma$ in communications station #1”. Then, communications station #2 transmits, to communications station #1, information related to “antenna unit $\gamma$ in communications station #1” for achieving favorable reception quality (i.e., transmission $2(4952) in FIG. 49).

Moreover, communications station #2 receives antenna settings symbol group set 4981 transmitted by communications station #1. Communications station #2 then determines a new antenna unit to be used for reception. Note that the determined antenna unit is referred to as antenna unit $\delta$.

Communications station #1 receives “transmission $2(4952)” transmitted by communications station #2, and obtains information on transmitting antenna unit $\gamma$ to be used by communications station #1. Additionally, communications station #1 determines that the setting of the antenna is complete, and transmits data symbol group 4910_1 and data symbol group 4910_2. Here, data symbol group 4910_1 and data symbol group 4910_2 are transmitted at the same frequency and at the same time. In other words, they are transmitted using the MIMO transmission method exemplified in Embodiment 1. Then, the antennas to be used for modulated signal transmission by communications station #1 are antenna unit $\alpha$ and antenna unit $\gamma$. Note that although not recited in the description of data symbol group 4910_1 and data symbol group 4910_2, data symbol group 4910_1 and data symbol group 4910_2 may include symbols other than data symbols, such as symbols from transmitting control information, preambles, pilot symbols, and reference symbols.

Next, operations in FIG. 49 different from those described above will be described.

As illustrated in FIG. 49, first, communications station #1 transmits antenna settings symbol group 4901 from #1A antenna unit 2915A, then transmits antenna settings symbol group 4902 from #2A antenna unit 2916A, antenna settings symbol group 4903 from #3A antenna unit 2917A, antenna settings symbol group 4904 from #1B antenna unit 2915B, antenna settings symbol group 4905 from #2B antenna unit 2916B, and antenna settings symbol group 4906 from #3B antenna unit 2917B. Note that these symbol groups are collectively referred to as antenna settings symbol group 4980.

As described before, each antenna unit (transmitting antenna unit) included in communications station #1 is configured as shown in FIG. 39, and each antenna unit (each reception antenna unit) included in communications station #2 is configured as shown in FIG. 40.

Communications station #1 transmits antenna settings symbol group 4901, antenna settings symbol group 4902, antenna settings symbol group 4903, antenna settings symbol group 4904, antenna settings symbol group 4905, and antenna settings symbol group 4906 having a frame configuration such as illustrated in FIG. 41 and FIG. 42 and described above. Note that as description of the frame configurations illustrated in FIG. 41 and FIG. 42 has been given above, repetition will be omitted here. The transmission method of antenna ID symbols 4101, 4201, 4202 . . . and the transmission method of reference signals 4102-1, 4102-2, 4102-3 . . . illustrated in FIG. 41 and FIG. 42 are as described above, and each antenna settings symbol group includes an antenna ID symbol and a reference symbol.

Communications station #2 receives antenna settings symbol group 4980 transmitted by communications station #1. Then, for example, communications station #2 compares the reception field intensity per multiplication coefficient application in antenna settings symbol group 4901 transmitted using #1A antenna unit 2915A, the reception field intensity per multiplication coefficient application in antenna settings symbol group 4902 transmitted using #2A antenna unit 2916A, the reception field intensity per multiplication coefficient application in antenna settings symbol group 4903 transmitted using #3A antenna unit 2917A, the reception field intensity per multiplication coefficient application in antenna settings symbol group 4904 transmitted using #1B antenna unit 2915B, the reception field intensity per multiplication coefficient application in antenna settings symbol group 4905 transmitted using #2B antenna unit 2916B, and the reception field intensity per multiplication coefficient application in antenna settings symbol group 4906 transmitted using #3B antenna unit 2917B, estimates a multiplication coefficient set and the antenna unit of communications station #1 whose reception field intensity will increase, and selects an antenna unit and a multiplication coefficient set that it wants communications station #1 to use to transmit the modulated signal. Then, communications station #2 transmits antenna-related symbol group $1(4951) including information on the selected antenna unit and information on the selected multiplication coefficient set. Note that "reception field intensity" indicates estimation of a reception field intensity per multiplication coefficient set, such as estimating the reception field intensity when multiplication coefficient set #A is applied and estimating the reception field intensity when multiplication coefficient set #B is applied.

Then, communications station #2 uses #1X antenna unit 3001X, #2X antenna unit 3002X, #3X antenna unit 3003X, #1Y antenna unit 3001Y, #2Y antenna unit 3002Y, and #3Y antenna unit 3003Y to receive antenna settings symbol group 4980 transmitted by communications station #1. Here, since communications station #2 includes the antenna units illustrated in FIG. 40, the antenna settings symbol groups are received while changing the coefficients for each antenna unit. Communications station #2 then determines an antenna unit to be used for reception, and determines a coefficient to be used by the determined antenna unit. Note that the determined antenna unit is referred to as antenna unit β.

Communications station #1 receives antenna-related symbol group $1(4951) transmitted by communications station #2, and based on "information on the selected antenna unit and information on the selected multiplication coefficient set" included in antenna-related symbol group $1(4951) transmitted by communications station #2, determines an antenna unit to be used for modulated signal transmission (i.e., antenna unit α), and additionally determines a multiplication coefficient.

With this, the one antenna unit to be used by communications station #1 for transmission and the multiplication coefficient therefore, as well as the one antenna unit to be used by communications station #2 and the multiplication coefficient therefore are determined.

In accordance with the following rules, communications station #1 "transmits antenna settings symbol group 4907_1 from antenna unit α, transmits antenna settings symbol group <1>4907_2, transmits antenna settings symbol group 4908_1 from antenna unit α, transmits antenna settings symbol group <2>4908_2, transmits antenna settings symbol group 4909_1 from antenna unit α, and transmits antenna settings symbol group <3>4909_2". Note that these symbol groups are collectively referred to as antenna settings symbol group set 4981.

Rule: if determined antenna unit α is #1A antenna unit 2915A or #2A antenna unit 2916A or #3A antenna unit 2917A, communications station #1 "transmits antenna settings symbol group 4907_1 from determined antenna unit α, and transmits antenna settings symbol group <1>4907_2 from #1B antenna unit 2915B". Then, communications station #1 "transmits antenna settings symbol group 4908_1 from determined antenna unit α and transmits antenna settings symbol group <2>4908_2 from #2B antenna unit 2916B", and "transmits antenna settings symbol group 4909_1 from determined antenna unit α and transmits antenna settings symbol group <3>4909_2 from #3B antenna unit 2917B".

Note that communications station #1 may transmit antenna settings symbol group 4907_1 from determined antenna unit α and transmit antenna settings symbol group <1>4907_2 from #1B antenna 2915B, and then transmit antenna settings symbol group <2>4908_2 from #2B antenna 2916B and transmit antenna settings symbol group <3>4909_2 from #3B antenna 2917B. Here, the symbol transmission order is not limited to these examples.

Rule 2: if determined antenna unit α is #1B antenna unit 2915B or #2B antenna unit 2916B or #3B antenna unit 2917B, communications station #1 "transmits antenna settings symbol group 4907_1 from determined antenna unit α and transmits antenna settings symbol group <1>4907_2 from #1A antenna unit 2915A". Then, communications station #1 "transmits antenna settings symbol group 4908_1 from determined antenna unit α and transmits antenna settings symbol group <2>4908_2 from #2A antenna unit 2916A" and "transmits antenna settings symbol group 4909_1 from determined antenna unit α and transmits antenna settings symbol group <3>4909_2 from #3A antenna unit 2917A".

Note that communications station #1 may transmit antenna settings symbol group 4907_1 from determined antenna unit α and transmit antenna settings symbol group 4907_1 from #1A antenna 2915A, and then transmit antenna settings symbol group <2>4908_2 from #2A antenna 2916A and transmit antenna settings symbol group <3>4909_2 from #3A antenna 2917A. Here, the symbol transmission order is not limited to these examples.

Moreover, communications station #1 transmits antenna settings symbol group 4907_1 from antenna unit α and transmits antenna settings symbol group <1>4907_2. Similarly, communications station #1 transmits antenna settings symbol group 4908_1 from antenna unit α and transmits antenna settings symbol group <2>4908_2. Similarly, communications station #1 transmits antenna settings symbol group 4909_1 from antenna unit α and transmits antenna settings symbol group <3>4909_2. Here, these symbol groups are configured as illustrated in, for example, FIG. 43, FIG. 44, FIG. 45, and FIG. 46, and details regarding operations pertaining thereto are as described above.

Communications station #2 estimates the communication state from the reference signals illustrated in FIG. 43, FIG. 44, FIG. 45, and FIG. 46, and estimates a favorable "multiplication coefficient for antenna unit γ in communications station #1". Then, communications station #2 transmits, to communications station #1, information related to "multiplication coefficient for antenna unit γ in communications station #1" for achieving favorable reception quality (i.e., transmission $2(4952) in FIG. 49).

Moreover, communications station #2 receives antenna settings symbol group set 4981 transmitted by communications station #1. Here, since communications station #2 includes the antenna units illustrated in FIG. 40, antenna settings symbol group set 4981 is received while changing the coefficients for each antenna unit. Communications station #2 then determines a new antenna unit to be used for reception, and determines a coefficient to be used by the determined antenna unit. Note that the determined antenna unit is referred to as antenna unit δ.

Communications station #1 receives "transmission $2(4952)" transmitted by communications station #2, and obtains information on transmitting antenna unit γ to be used by communications station #1. Additionally, communications station #1 determines that the setting of the antenna is complete, and transmits data symbol group 4910_1 and data symbol group 4910_2. Here, data symbol group 4910_1 and data symbol group 4910_2 are transmitted at the same frequency and at the same time. In other words, they are transmitted using the MIMO transmission method exemplified in Embodiment 1. Then, the antennas to be used for modulated signal transmission by communications station #1 are antenna unit α and antenna unit γ. Note that although not recited in the description of data symbol group 4910_1 and data symbol group 4910_2, data symbol group 4910_1 and data symbol group 4910_2 may include symbols other than data symbols, such as symbols from transmitting control information, preambles, pilot symbols, and reference symbols.

Figure 50:
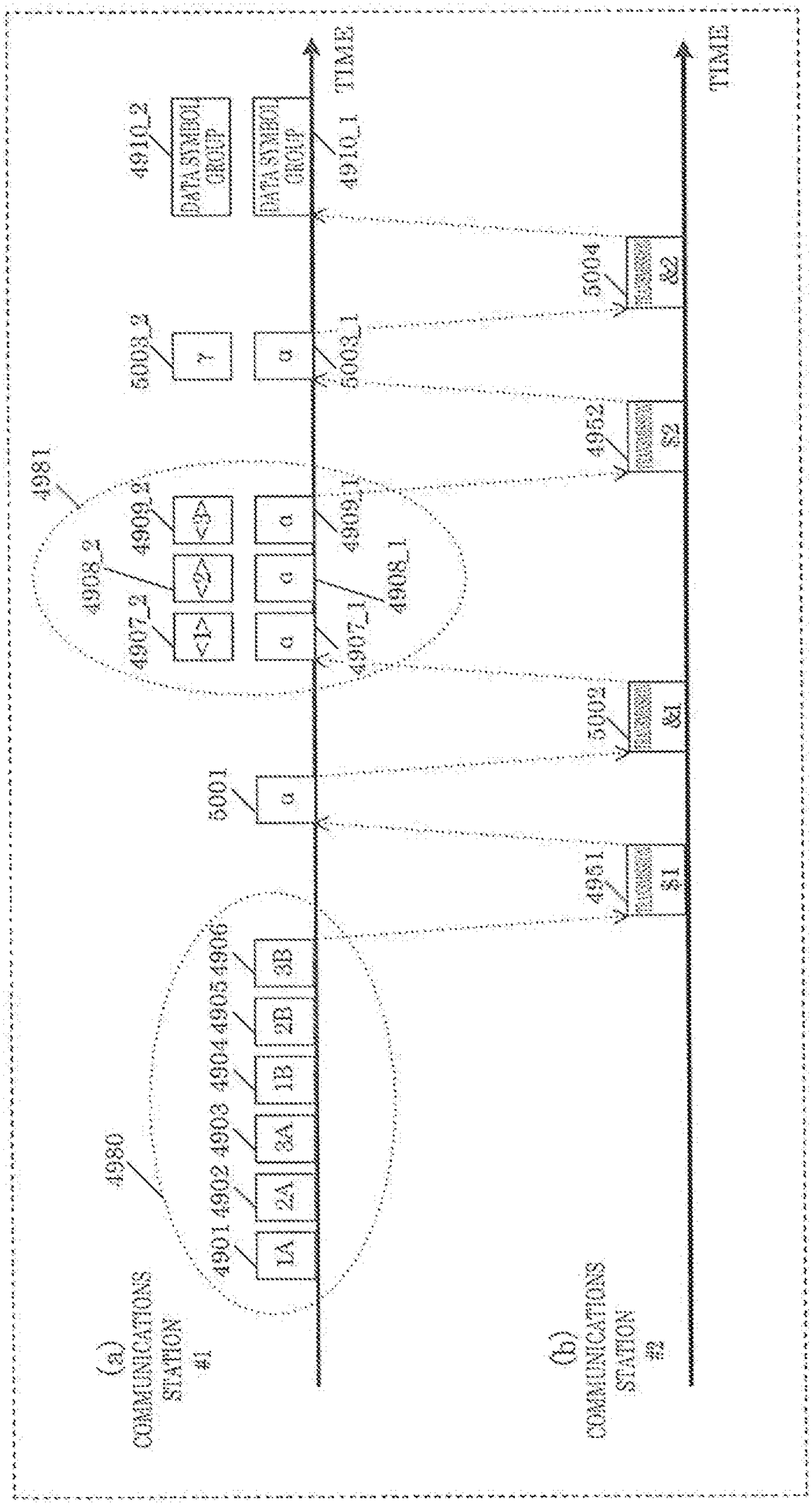
FIG. 50 illustrates an example of transmission frame communication between communications station #1 and communications station #2.

FIG. 50 illustrates an example of a transmission frame of communications station #1 and communications station #2 in the time axis. In (a) in FIG. 50, the transmission frame of communications station #1 in the time axis is shown, and in (b) in FIG. 50, the transmission frame of communications station #2 in the time axis is shown. Note that in (a) and (b) in FIG. 50, symbols may also be present in the frequency axis.

Operations in FIG. 50 that are the same as in FIG. 49 share like reference marks.

As illustrated in FIG. 49, first, communications station #1 transmits antenna settings symbol group 4901 from #1A antenna unit 2915A, then transmits antenna settings symbol group 4902 from #2A antenna unit 2916A, antenna settings symbol group 4903 from #3A antenna unit 2917A, antenna settings symbol group 4904 from #1B antenna unit 2915B, antenna settings symbol group 4905 from #2B antenna unit 2916B, and antenna settings symbol group 4906 from #3B antenna unit 2917B. Note that these symbol groups are collectively referred to as antenna settings symbol group 4980.

Communications station #2 receives antenna settings symbol group 4980 transmitted by communications station #1. Then, for example, communications station #2 compares the reception field intensity in antenna settings symbol group 4901 transmitted using #1A antenna unit 2915A, the reception field intensity in antenna settings symbol group 4902 transmitted using #2A antenna unit 2916A, the reception field intensity in antenna settings symbol group 4903 transmitted using #3A antenna unit 2917A, the reception field intensity in antenna settings symbol group 4904 transmitted using #1B antenna unit 2915B, the reception field intensity in antenna settings symbol group 4905 transmitted using #2B antenna unit 2916B, and the reception field intensity in antenna settings symbol group 4906 transmitted using #3B antenna unit 2917B, estimates the antenna unit of communications station #1 whose reception field intensity will increase, and selects an antenna unit that it wants communications station #1 to use to transmit the modulated signal. Then, communications station #2 transmits antenna-related symbol group $1(4951) including information on the selected antenna unit.

Then, communications station #2 uses #1X antenna unit 3001X, #2X antenna unit 3002X, #3X antenna unit 3003X, #1Y antenna unit 3001Y, #2Y antenna unit 3002Y, and #3Y antenna unit 3003Y to receive antenna settings symbol group 4980 transmitted by communications station #1. Communications station #2 then determines an antenna unit to be used for reception. Note that the determined antenna unit is referred to as antenna unit @.

Communications station #1 receives antenna-related symbol group $1(4951) transmitted by communications station #2, and is thereby notified of the determination of one antenna unit to be used by communications station #2 for reception. With this, the one antenna unit to be used by communications station #1 for transmission and the one antenna unit to be used by communications station #2 are determined.

As described before, each antenna unit (transmitting antenna unit) included in communications station #1 is configured as shown in FIG. 39, and each antenna unit (each reception antenna unit) included in communications station #2 is configured as shown in FIG. 40.

Communications station #1 receives multiplication coefficient settings symbol group 5001 having a frame configuration such as illustrated in FIG. 41, FIG. 42 described above from antenna unit α. Note that as description of the frame configurations illustrated in FIG. 41 and FIG. 42 has been given above, repetition will be omitted here. Antenna ID symbols 4101, 4201, 4202 . . . in FIG. 41 and FIG. 42 include, for example, information on an ID related to antenna unit α. Then, the multiplication coefficient set to be used by the antenna unit in FIG. 39 is switched, and reference signals 4102-1, 4102-2, 4102-3 . . . are transmitted. Note that details regarding this are as described above.

Then, from the communication states of these reference signals (multiplication coefficient settings symbol group 5001), communications station #2 estimates "the multiplication coefficient for antenna unit α in communications station #1" for achieving favorable reception quality. Then, communications station #2 transmits, to communications station #1, information related to "the multiplication coefficient for antenna unit α in communications station #1" for achieving favorable reception quality (i.e., transmission &1(5002) in FIG. 50).

Additionally, communications station #2 receives multiplication coefficient settings symbol group 5001 and thus estimates a favorable multiplication coefficient to be used in an antenna configuration unit such as in FIG. 40. Then, communications station #2 sets the multiplication coefficient to be used by antenna unit β.

In accordance with the following rules, communications station #1 "transmits antenna settings symbol group 4907_1 from antenna unit α, transmits antenna settings symbol group <1>4907_2, transmits antenna settings symbol group 4908_1 from antenna unit α, transmits antenna settings symbol group <2>4908_2, transmits antenna settings symbol group 4909_1 from antenna unit α, and transmits antenna settings symbol group <3>4909_2". Note that these symbol groups are collectively referred to as antenna settings symbol group set 4981.

Rule: if determined antenna unit α is #1A antenna unit 2915A or #2A antenna unit 2916A or #3A antenna unit 2917A, communications station #1 "transmits antenna settings symbol group 4907_1 from determined antenna unit α, and transmits antenna settings symbol group <1>4907_2 from #1B antenna unit 2915B". Then, communications station #1 "transmits antenna settings symbol group 4908_1 from determined antenna unit α and transmits antenna settings symbol group <2>4908_2 from #2B antenna unit 2916B", and "transmits antenna settings symbol group 4909_1 from determined antenna unit α and transmits antenna settings symbol group <3>4909_2 from #3B antenna unit 2917B".

Note that communications station #1 may transmit antenna settings symbol group 4907_1 from determined antenna unit α and transmit antenna settings symbol group <1>4907_2 from #1B antenna 2915B, and then transmit antenna settings symbol group <2>4908_2 from #2B antenna 2916B and transmit antenna settings symbol group <3>4909_2 from #3B antenna 2917B. Here, the symbol transmission order is not limited to these examples.

Rule: if determined antenna unit α is #1B antenna unit 2915B or #2B antenna unit 2916B or #3B antenna unit 2917B, communications station #1 "transmits antenna settings symbol group 4907_1 from determined antenna unit α and transmits antenna settings symbol group <1>4907_2 from #1A antenna unit 2915A". Then, communications station #1 "transmits antenna settings symbol group 4908_1 from determined antenna unit α and transmits antenna settings symbol group <2>4908_2 from #2A antenna unit 2916A" and "transmits antenna settings symbol group 4909_1 from determined antenna unit α and transmits antenna settings symbol group <3>4909_2 from #3A antenna unit 2917A".

Note that communications station #1 may transmit antenna settings symbol group 4907_1 from determined antenna unit α and transmit antenna settings symbol group 4907_1 from #1A antenna 2915A, and then transmit antenna settings symbol group <2>4908_2 from #2A antenna 2916A and transmit antenna settings symbol group <3>4909_2 from #3A antenna 2917A. Here, the symbol transmission order is not limited to these examples.

Moreover, communications station #1 transmits antenna settings symbol group 4907_1 from antenna unit α and transmits antenna settings symbol group <1>4907_2. Similarly, communications station #1 transmits antenna settings symbol group 4908_1 from antenna unit α and transmits antenna settings symbol group <2>4908_2. Similarly, communications station #1 transmits antenna settings symbol group 4909_1 from antenna unit α and transmits antenna settings symbol group <3>4909_2. Here, these symbol groups are configured as illustrated in, for example, FIG. 36 and FIG. 37, and details regarding operations pertaining thereto are as described above.

Communications station #2 estimates the communication state from the reference signals illustrated in FIG. 36 and FIG. 37, and estimates a favorable "antenna unit γ in communications station #1". Then, communications station #2 transmits, to communications station #1, information related to "antenna unit γ in communications station #1" for achieving favorable reception quality (i.e., transmission $2(4952) in FIG. 49).

Communications station #1 transmits multiplication coefficient settings symbol group 5003_1 from antenna unit α and multiplication coefficient settings symbol group 5003_2 from antenna unit γ. Here, these symbol groups are configured as illustrated in, for example, FIG. 43, FIG. 44, FIG. 45, and FIG. 46, and details regarding operations pertaining thereto are as described above.

Communications station #2 estimates the communication state from the reference signals illustrated in FIG. 43, FIG. 44, FIG. 45, and FIG. 46, and estimates a favorable "multiplication coefficient for antenna unit γ in communications station #1". Then, communications station #2 transmits, to communications station #1, information related to "the multiplication coefficient for antenna unit γ in communications station #1" for achieving favorable reception quality (i.e., transmission &2(5004) in FIG. 50).

Additionally, communications station #2 estimates a multiplication coefficient to be used by antenna unit δ in such an antenna unit as illustrated in FIG. 40, by receiving multiplication coefficient settings symbol group 5003_1 from antenna unit α and multiplication coefficient settings symbol group 5003_2 from antenna unit γ. Then, communications station #2 sets the multiplication coefficient to be used by antenna unit δ.

Communications station #1 receives "transmission &2(5004)" transmitted by communications station #2, and obtains information on transmitting antenna unit γ to be used by communications station #1. Additionally, communications station #1 determines that the setting of the antenna is complete, and transmits data symbol group 4910_1 and data symbol group 4910_2. Here, data symbol group 4910_1 and data symbol group 4910_2 are transmitted at the same frequency and at the same time. In other words, they are transmitted using the MIMO transmission method exemplified in Embodiment 1. Then, the antennas to be used for modulated signal transmission by communications station #1 are antenna unit α and antenna unit γ. Note that although not recited in the description of data symbol group 4910_1 and data symbol group 4910_2, data symbol group 4910_1 and data symbol group 4910_2 may include symbols other than data symbols, such as symbols from transmitting control information, preambles, pilot symbols, and reference symbols.

In this way, first, communications station #1 transmits a reference symbol from each antenna unit in order to determine an antenna unit to be used for transmission, the communication state of each reference symbol is obtained from communications station #2, one antenna unit (antenna unit α) for transmitting the data symbol is determined, and, next, communications station #1 transmits a reference symbol from antenna unit α and each antenna unit, and the communication state of the reference symbol transmitted from antenna unit α and the communication state of the reference symbol transmitted from each antenna unit are obtained from communications station #2, then the data symbol is transmitted, and one more antenna unit (antenna unit γ) is determined, whereby communications station #2 can achieve the advantageous effect of high data reception quality. Note that, here, the multiplication coefficient to be used by the transceiving antenna may also be determined. Moreover, one point of the present disclosure is "performing a plurality of transmissions after a single transmission, and selecting an antenna". In this embodiment, although a number of frame configurations are described, in these frame configurations, symbols may be present on the frequency axis as well.

Note that in data symbol groups 3411_1 and 3411_2 in FIG. 34 and FIG. 47, and in data symbol groups 4910_1 and 4910_2 in FIG. 49 and FIG. 50, communications station #1 may also transmit (ID) information on antenna unit α to be used for transmission, (ID) information on antenna γ to be used for transmission, information related to the coefficient used for antenna unit α, and information related to the coefficient used for antenna unit γ.

Moreover, as illustrated in FIG. 41, FIG. 42, FIG. 43, FIG. 44, FIG. 45, and FIG. 46, when transmission station #1 changes the multiplication coefficient of a transmitting antenna unit and transmits the reference signal, the antenna ID symbols illustrated in FIG. 41 through FIG. 46 may include information related to the multiplication coefficient in addition to information related to the antenna ID. In this case, the information related to the multiplication coefficient may be the multiplied coefficient data itself, and, alternatively, may be information on the ID related to the multiplication coefficient.

For example, "#1" is assigned to a first multiplication coefficient set as an ID related to a multiplication coefficient, "#2" is assigned to a second multiplication coefficient set as an ID related to a multiplication coefficient, and so on.

Then, for example, when the first multiplication coefficient set is used upon generating the reference signal, information corresponding to the ID "#1" is included in the antenna ID symbol, and communications station #1 transmits this antenna ID symbol.

Here, communications station #2 determines the antenna and multiplication coefficient to be used for transmission by communications station #1, that is to say, communications station #2 discerns the antenna and multiplication coefficient based on, for example, information on the antenna ID and (ID) information on the multiplication coefficient transmitted by communications station #1, whereby communications station #2 transmits, to communications station #1, "information on the antenna to be used by communications station #1" as well as "information on the multiplication coefficient ID".

Embodiment 2—Supplemental Information

In the configuration of communications station #1 illustrated in FIG. 29 and described in Embodiment 2, #1A antenna unit 2915A, #2A antenna unit 2916A, #3A antenna unit 2917A, #1B antenna unit 2915B, #2B antenna unit 2916B, and #3B antenna unit 2917B may have antenna characteristics with different properties. Note that, for example, "antenna characteristics with different properties" may refer to a relationship in which an antenna having a first polarization characteristic and an antenna having a second polarization characteristic (the first polarization characteristic and the second polarization characteristic are different (as one example, the first polarization characteristic is horizontal polarization and the second polarization characteristic is vertical polarization)).

Another, different method includes "#1A antenna unit 2915A and #2A antenna unit 2916A and #3A antenna unit 2917A" having the first antenna characteristic, and "#1B antenna unit 2915B and #2B antenna unit 2916B and #3B antenna unit 2917B" having the second antenna characteristic, and the first antenna characteristic and the second antenna characteristic are different. With this, an antenna unit having the first antenna characteristic and an antenna unit having the second antenna characteristic are both used when communications station #1 transmits a modulated signal, so depending on the use case, communications station #2 may be able to achieve favorable data reception quality.

A DMG antenna is defined as follows:

Directional multi-gigabit (DMG) antenna: A DMG antenna is a phased array, a single element antenna, or a set of switch beam antennas covered by a quasi-omni antenna pattern.

In the configuration of communications station #1 illustrated in FIG. 29 and described in Embodiment 2, #1A antenna unit 2915A, #2A antenna unit 2916A, #3A antenna unit 2917A, #1B antenna unit 2915B, #2B antenna unit 2916B, and #3B antenna unit 2917B may be DMG antennas having different properties.

Another, different method includes "#1A antenna unit 2915A and #2A antenna unit 2916A and #3A antenna unit 2917A" being first DMG antennas, and "#1B antenna unit 2915B and #2B antenna unit 2916B and #3B antenna unit 2917B" being second DMG antennas. In other words, a first DMG antenna and a second DMG antenna have different properties. With this, first and second DMG antennas are both used when communications station #1 transmits a modulated signal, so depending on the use case, communications station #2 may be able to achieve favorable data reception quality.

Note that the application method of the antenna characteristic (type of antenna, etc.) of #1A antenna unit 2915A, #2A antenna unit 2916A, #3A antenna unit 2917A, #1B antenna unit 2915B, #2B antenna unit 2916B, #3B antenna unit 2917B is not limited to the above example. For example, #1A antenna unit 2915A, #2A antenna unit 2916A, #3A antenna unit 2917A, #1B antenna unit 2915B, #2B antenna unit 2916B, and #3B antenna unit 2917B may be antennas having an antenna characteristic having the same properties.

In the configuration of communications station #2 illustrated in FIG. 30 and described in Embodiment 2, #1X antenna unit 3001X, #2X antenna unit 3002X, #3X antenna unit 3003X, #1Y antenna unit 3001Y, #2Y antenna unit 3002Y, and #3Y antenna unit 3003Y may have antenna characteristics with different properties. Note that, for example, "antenna characteristics with different properties" may refer to a relationship in which an antenna having a first polarization characteristic and an antenna having a second polarization characteristic (the first polarization characteristic and the second polarization characteristic are different (as one example, the first polarization characteristic is horizontal polarization and the second polarization characteristic is vertical polarization)).

Another, different method includes "#1X antenna unit 3001X and #2X antenna unit 3002X and #3X antenna unit 3003X" having the first antenna characteristic, and "#1Y antenna unit 3001Y and #2Y antenna unit 3002Y and #3Y antenna unit 3003Y" having the second antenna characteristic, and the first antenna characteristic and the second antenna characteristic are different. With this, an antenna unit having the first antenna characteristic and an antenna unit having the second antenna characteristic are both used when communications station #2 receives a modulated signal, so depending on the use case, communications station #2 may be able to achieve favorable data reception quality.

In the configuration of communications station #2 illustrated in FIG. 30 and described in Embodiment 2, #1X antenna unit 3001X, #2X antenna unit 3002X, #3X antenna unit 3003X, #1Y antenna unit 3001Y, #2Y antenna unit 3002Y, and #3Y antenna unit 3003Y may be DMG antennas with different properties.

Another, different method includes "#1X antenna unit 3001X and #2X antenna unit 3002X and #3X antenna unit 3003X" being first DMG antennas, and "#1Y antenna unit 3001Y and #2Y antenna unit 3002Y and #3Y antenna unit 3003Y" being second DMG antennas. In other words, a first DMG antenna and a second DMG antenna have different properties. With this, first and second DMG antennas are both used when communications station #2 receives a modulated signal, so depending on the use case, communications station #2 may be able to achieve favorable data reception quality.

Note that application method of the antenna characteristic (type of antenna, etc.) of #1X antenna unit 3001X, #2X antenna unit 3002X, #3X antenna unit 3003X, #1Y antenna unit 3001Y, #2Y antenna unit 3002Y, and #3Y antenna unit 3003Y is not limited to the above example. For example, #1X antenna unit 3001X, #2X antenna unit 3002X, #3X antenna unit 3003X, #1Y antenna unit 3001Y, #2Y antenna unit 3002Y, and #3Y antenna unit 3003Y may be antennas having an antenna characteristic having the same properties.

Embodiment 3

In this embodiment, an example that differs from the example in Embodiment 2 will be given of a method of selecting a plurality of antennas to be used to transmit a plurality of modulated signals by a transmission device in, for example, a MIMO transmission method of transmitting a plurality of modulated signals from a plurality of antennas, including Embodiment 1.

First, an outline of the configuration of the transmission device will be given. In this embodiment, a case will be considered in which communications station #1 illustrated in FIG. 51 and communications station #2 illustrated in FIG. 52 communicate with each other.

Figure 51:
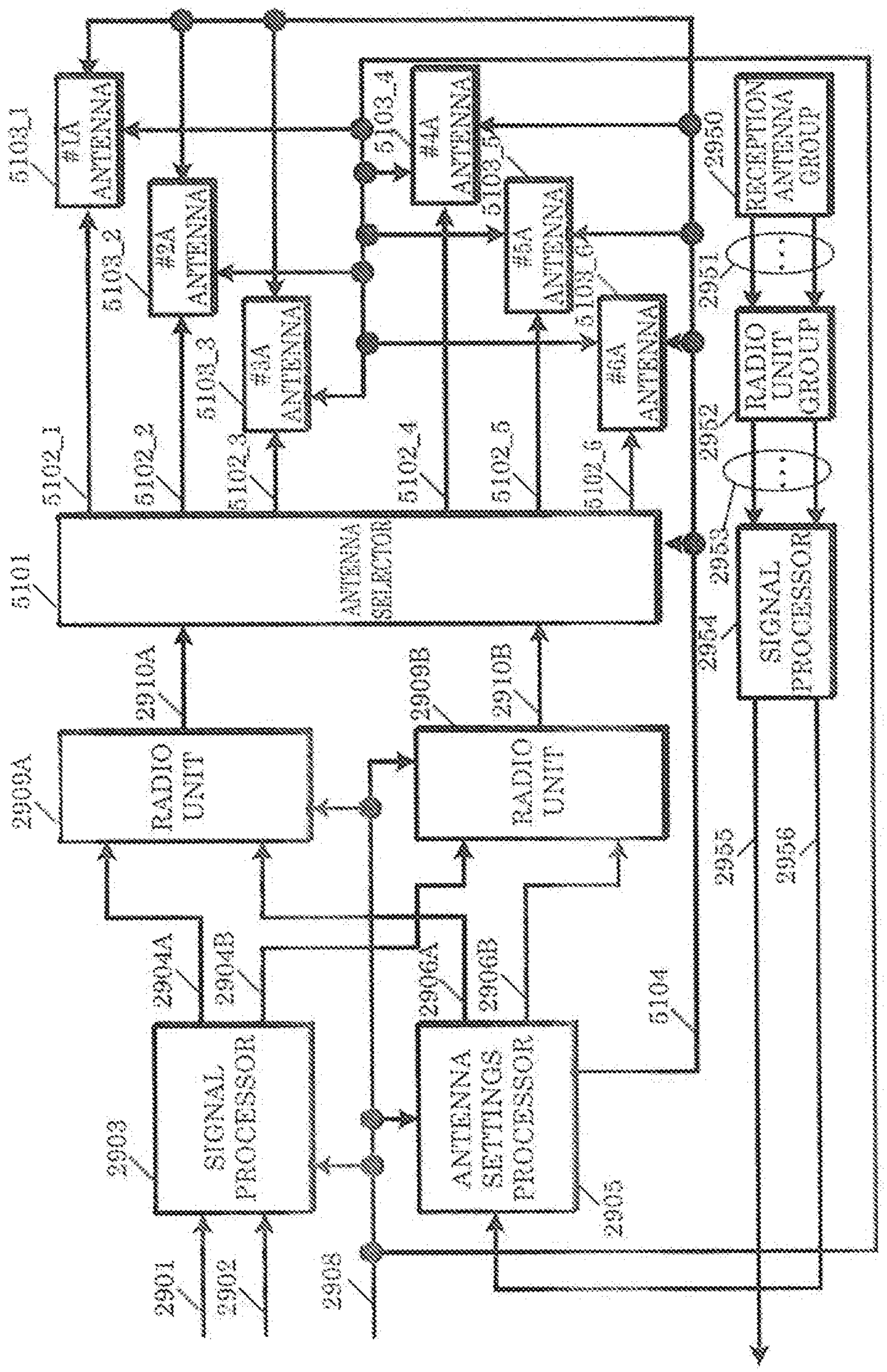
FIG. 51 illustrates an example of a configuration of communications station #1.

FIG. 51 illustrates a configuration of communications station #1. Note that operations that are the same as in FIG. 29 share like reference signs and are described in Embodiment 2, and as such, overlapping description will be omitted.

Antenna settings processor 2905 receives inputs of control information 2956 and frame configuration signal 2908 from the communication partner, outputs, based on frame configuration signal 2908, modulated signals 2906A, 2960B to be used for antenna settings, and, outputs antenna control signal 5104 including, for example, information such as information on the selected antenna and/or information on weighting pertaining to the antenna, based on, for example, control information 2956 from the communication partner. Note that details regarding the operations will be described later.

Antenna selector 5101 receives inputs of transmission signal 2910A, transmission signal 2910B, frame configuration signal 2908, and antenna control signal 5104, performs antenna selection in accordance with frame configuration signal 2908 and antenna control signal 5104, controls the timing of the switching of antennas, outputs transmission signal 2910A with respect to any one of 5102_1, 5102_2, 5102_3, 5102_4, 5102_5, or 5102_6, and outputs transmission signal 2910B with respect to any one of 5102_1, 5102_2, 5102_3, 5102_4, 5102_5, or 5102_6. Accordingly, transmission signal 2910A is output as radio waves from any one of #1A antenna unit 5103_1, #2A antenna unit 5103_2, #3A antenna unit 5103_3, #4A antenna unit 5103_4, #5A antenna unit 5103_5, or #6A antenna unit 5103_6. Moreover, transmission signal 2910B is output as radio waves from any one of #1A antenna unit 5103_1, #2A antenna unit 5103_2, #3A antenna unit 5103_3, #4A antenna unit 5103_4, #5A antenna unit 5103_5, or #6A antenna unit 5103_6. However, transmission signal 2910A and transmission signal 2910B are transmitted from different antenna units.

Note that #1A antenna unit 5103_1, #2A antenna unit 5103_2, #3A antenna unit 5103_3, #4A antenna unit 5103_4, #5A antenna unit 5103_5, and #6A antenna unit 5103_6 each, for example, include a plurality of antennas.

#1A antenna unit 5103_1, #2A antenna unit 5103_2, #3A antenna unit 5103_3, #4A antenna unit 5103_4, #5A antenna unit 5103_5, and #6A antenna unit 5103_6 each receive inputs of frame configuration signal 2908 and antenna control signal 5104, and change the weighting of the plurality of antennas or the phase parameters at an appropriate time in accordance with frame configuration signal 2908 and antenna control signal 5104.

Note that in FIG. 51, as one example, six transmitting antenna units are provided, but this is merely one example; the number of transmitting antenna units is not limited to this number.

Figure 52:
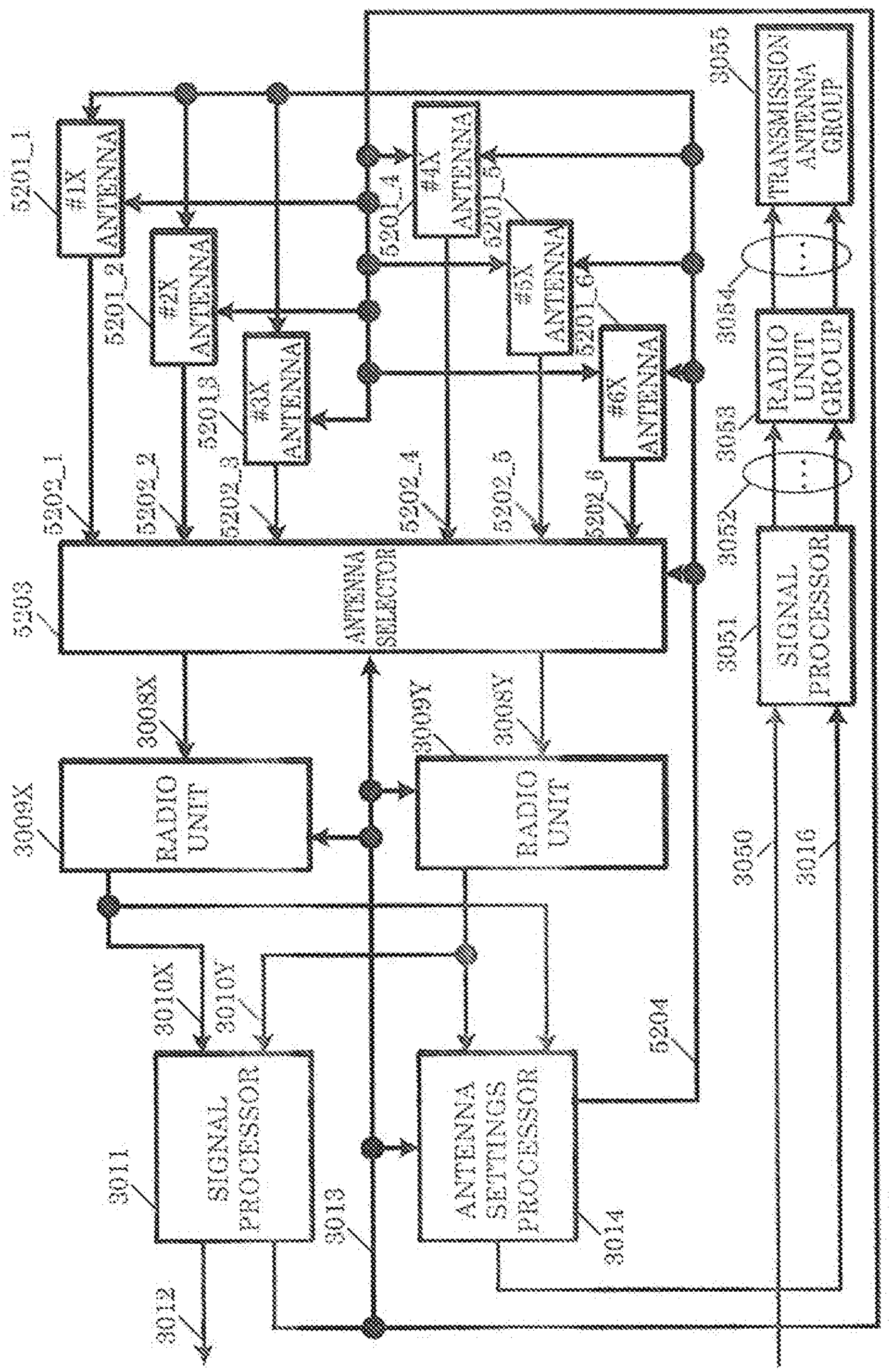
FIG. 52 illustrates an example of a configuration of communications station #2.

FIG. 52 illustrates a configuration of communications station #2. Note that operations that are the same as in FIG. 30 share like reference signs and are described in Embodiment 2, and as such, overlapping description will be omitted.

Antenna selector 5203 receives inputs of reception signal 5202_1 received by #1X antenna unit 5201_1, reception signal 5202_2 received by #2X antenna unit 5201_2, reception signal 5202_3 received by #3X antenna unit 5201_3, reception signal 5202_4 received by #4X antenna unit 5201_4, reception signal 5202_5 received by #5X antenna unit 5201_5, reception signal 5202_6 received by #6X antenna unit 5201_6, and also receives inputs of control information 3013 and antenna control signal 5204. Antenna selector 5203 then selects an antenna at an appropriate time in accordance with control information 3013 and antenna control signal 3015X, selects any two of reception signals 5202_1, 5202_2, 5202_3, 5202_4, and 5201_5, and outputs them as reception signals 3008X and 8008Y. Note that details regarding the selection of the antenna will be described later.

#1X antenna unit 5201_1, #2X antenna unit 5201_2, #3X antenna unit 5201_3, #4X antenna unit 5201_4, #5X antenna unit 5201_5, and #6X antenna unit 5201_6 each, for example, include a plurality of antennas.

#1X antenna unit 5201_1, #2X antenna unit 5201_2, #3X antenna unit 5201_3, #4X antenna unit 5201_4, #5X antenna unit 5201_5, and #6X antenna unit 5201_6 each receive inputs of control information 3013 and antenna control signal 5204, and change the weighting of the plurality of antennas or the phase parameters at an appropriate time in accordance with control information 3013 and antenna control signal 5204.

Antenna settings processor 3014 receives inputs of baseband signals 3010X, 3010Y and control information 3013, detects a signal required for antenna settings from information related to the frame configuration in control information 3013, and outputs antenna control signal 5204 and antenna-related information 3016. Note that antenna control signal 5204 includes information related to weighting pertaining to reception antennas or phase change parameters, and information related to the timing of the switching of the reception antennas, and antenna-related information 3016 includes antenna information for transmission of a modulated signal by communications station #1.

Note that in FIG. 52, as one example, six reception antenna units are provided, but this is merely one example; the number of reception antenna units is not limited to this number.

Figure 53:
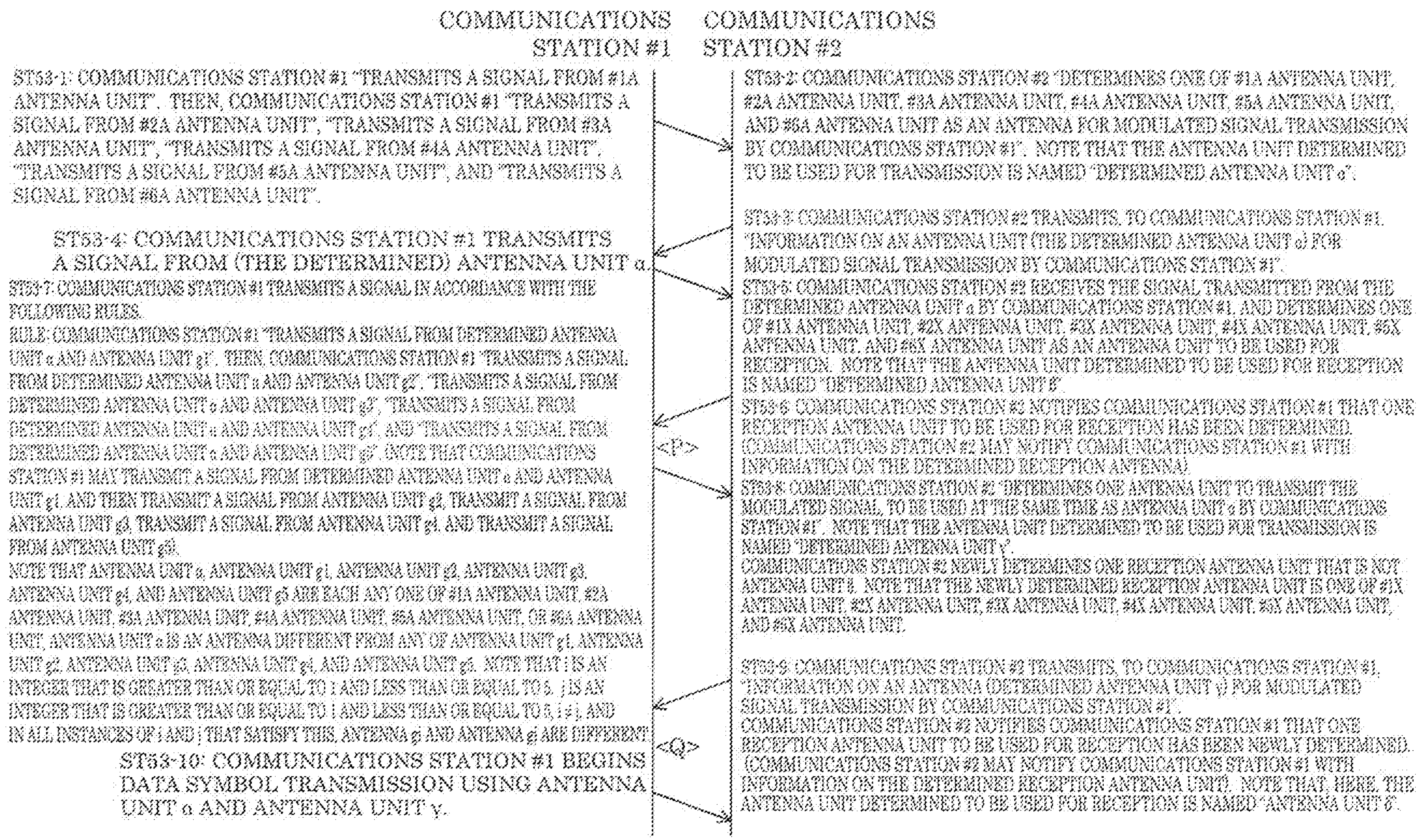
FIG. 53 illustrates an example of communication between communications station #1 and communications station #2.

Next, with reference to FIG. 53, one example of communication between communications station #1 and communications station #2 will be given.

Example 1 of Communication Between Communications Station #1 and Communications Station #2

Step ST53-1:

Communications station #1 transmits a signal from #1A antenna unit 5103_1 illustrated in FIG. 51. Then, communications station #1 transmits a signal from #2A antenna unit 5103_2, transmits a signal from #3A antenna unit 5103_3, transmits a signal from #4A antenna unit 5103_4, transmits a signal from #5A antenna unit 5103_5, and transmits a signal from #6A antenna unit 5103_6.

Step ST53-2:

Communications station #2 receives the modulated signals transmitted in Step ST53-1, and determines "one of #1A antenna unit 5103_1, #2A antenna unit 5103_2, #3A antenna unit 5103_3, #4A antenna unit 5103_4, #5A antenna unit 5103_5, and #6A antenna unit 5103_6 as an antenna for modulated signal transmission by communications station #1". Note that, here, the antenna unit determined to be used for the transmission is named "determined antenna unit α".

Step ST53-3:

Communications station #2 transmits, to communications station #1, "information on an antenna for modulated signal transmission by communications station #1 (i.e., information on determined antenna unit α)".

Step ST53-4:

Communications station #1 transmits a signal from determined antenna unit α.

Step ST53-5:

communications station #2 receives the signal transmitted from (the determined) antenna unit α by communications station #1, and determines one of #1X antenna unit 5201_1, #2X antenna unit 5201_2, #3X antenna unit 5201_3, #4X antenna unit 5201_4, #5X antenna unit 5201_5, and #6X antenna unit 5201_6 illustrated in FIG. 52 as a reception antenna unit to be used for reception. Note that, here, the antenna unit determined to be used for reception is named "determined antenna unit β".

Step ST53-6:

Communications station #1 is notified that one reception antenna unit to be used for reception has been determined. Here, communications station #1 may be notified with information on the determined reception antenna.

Step ST53-7:

Communications station #1 transmits a signal in accordance with the following rules.

Rule: communications station #1 "transmits a signal from determined antenna unit α and antenna unit g1". Then, communications station #1 "transmits a signal from determined antenna unit α and antenna unit g2", "transmits a signal from determined antenna unit α and antenna unit g3", "transmits a signal from determined antenna unit α and antenna unit g4", and "transmits a signal from determined antenna unit α and antenna unit g5".

Note that communications station #1 may transmit a signal from determined antenna unit α and antenna unit g1, and then transmit a signal from antenna unit g2, transmit a signal from antenna unit g3, transmit a signal from antenna unit g4, and transmit a signal from antenna unit g5.

Note that antenna unit α, antenna unit g1, antenna unit g2, antenna unit g3, antenna unit g4, and antenna unit g5 are each any one of #1A antenna unit 5103_1, #2A antenna unit 5103_2, #3A antenna unit 5103_3, #4A antenna unit 5103_4, #5A antenna unit 5103_5, or #6A antenna unit 5103_6, and antenna unit α is an antenna different from any of antenna unit g1, antenna unit g2, antenna unit g3, antenna unit g4, and antenna unit g5. Note that i is an integer that is greater than or equal to 1 and less than or equal to 5. j is an integer that is greater than or equal to 1 and less than or equal to 5, i≠j, and in all instances of i and j that satisfy this, antenna gi and antenna gj are different.

Step ST53-8:

Communications station #2:

"determines one antenna unit to transmit the modulated signal, to be used at the same time as antenna unit α by communications station #1". Note that the antenna unit determined to be used for transmission is named "determined antenna unit γ".

Communications station #2 newly determines one reception antenna unit that is not antenna unit β.

Note that the newly determined reception antenna unit is one of #1X antenna unit 5201_1, #2X antenna unit 5201_2, #3X antenna unit 5201_3, #4X antenna unit 5201_4, #5X antenna unit 5201_5, and #6X antenna unit 5201_6.

Step ST53-9:

Communications station #2 transmits, to communications station #1, "information on an antenna for modulated signal transmission by communications station #1 (i.e., information on determined antenna unit γ)".

Communications station #2 notifies communications station #1 that one reception antenna unit to be used for reception has been newly determined. Communications station #2 may notify communications station #1 with information on the determined reception antenna unit. Note that, here, the antenna unit determined to be used for reception is named "antenna unit δ".

Step ST53-10:

Communications station #1 starts data symbol transmission using antenna unit α and antenna unit γ. Communications station #1 starts transmission of two modulated signals using antenna unit α and antenna unit γ.

Example 1 of communication between communications station #1 and communications station #2 has been described with reference to FIG. 53, but the processing in FIG. 32 may be inserted at <P> in FIG. 53, and the processing in FIG. 33 may be inserted at <Q> in FIG. 53. In such a case, communication between communications station #1 and communications station #2 is as follows.

Example 2 of Communication Between Communications Station #1 and Communications Station #2

Step ST53-1: (See FIG. 53)

Communications station #1 transmits a signal from #1A antenna unit 5103_1 illustrated in FIG. 51. Then, communinications station #1 transmits a signal from #2A antenna unit 5103_2, transmits a signal from #3A antenna unit 5103_3, transmits a signal from #4A antenna unit 5103_4, transmits a signal from #5A antenna unit 5103_5, and transmits a signal from #6A antenna unit 5103_6.

Step ST53-2: (See FIG. 53)

Communications station #2 receives the modulated signals transmitted in Step ST53-1, and determines "one of #1A antenna unit 5103_1, #2A antenna unit 5103_2, #3A antenna unit 5103_3, #4A antenna unit 5103_4, #5A antenna unit 5103_5, and #6A antenna unit 5103_6 as an antenna for modulated signal transmission by communications station #1". Note that, here, the antenna unit determined to be used for the transmission is named "determined antenna unit α".

Step ST53-3: (See FIG. 53)

Communications station #2 transmits, to communications station #1, "information on an antenna for modulated signal transmission by communications station #1 (i.e., information on determined antenna unit α)".

Step ST53-4: (See FIG. 53)

Communications station #1 transmits a signal from determined antenna unit α.

Step ST53-5: (See FIG. 53)

Communications station #2 receives the signal transmitted from the determined antenna unit α by communications station #1, and determines one of #1X antenna unit 5201_1, #2X antenna unit 5201_2, #3X antenna unit 5201_3, #4X antenna unit 5201_4, #5X antenna unit 5201_5, and #6X antenna unit 5201_6 illustrated in FIG. 52 as a reception antenna unit to be used for reception. Note that, here, the antenna unit determined to be used for reception is named "determined antenna unit β".

Step ST53-6: (See FIG. 53)

Communications station #1 is notified that one reception antenna unit to be used for reception has been determined. Here, communications station #1 may be notified with information on the determined reception antenna.

Step ST32-7-1: (See FIG. 32)

Communications station #1 changes multiple types of weighting or phase parameters of the determined antenna unit α, and transmits a signal from antenna unit α.

Step ST32-7-2: (See FIG. 32)

Communications station #2 changes multiple types of weighting or phase parameters of (the determined) antenna unit β, and performs reception.

Step ST32-7-3: (See FIG. 32)

Communications station #2 transmits, to communications station #1, "information on appropriate weighting or phase parameters to be used by antenna unit α for modulated signal transmission by communications station #1".

Communications station #2 notifies communications station #1 that appropriate weighting or phase parameters for the antenna unit to be used has been determined. Communications station #1 may be notified with information on weighting or phase parameters.

Step ST32-7-4: (See FIG. 32)

Communications station #1 sets appropriate weighting or phase parameters with respect to antenna unit α based on "information on appropriate weighting or phase parameters for antenna unit α transmitted by communications station #2".

Step ST53-7: (See FIG. 53)

Communications station #1 transmits a signal in accordance with the following rules.

Rule: communications station #1 "transmits a signal from determined antenna unit α and antenna unit g1". Then, communications station #1 "transmits a signal from determined antenna unit α and antenna unit g2", "transmits a signal from determined antenna unit α and antenna unit g3", "transmits a signal from determined antenna unit α and antenna unit g4", and "transmits a signal from determined antenna unit α and antenna unit g5".

Note that communications station #1 may transmit a signal from determined antenna unit α and antenna unit g1, and then transmit a signal from antenna unit g2, transmit a signal from antenna unit g3, transmit a signal from antenna unit g4, and transmit a signal from antenna unit g5.

Note that antenna unit α, antenna unit g1, antenna unit g2, antenna unit g3, antenna unit g4, and antenna unit g5 are each any one of #1A antenna unit 5103_1, #2A antenna unit 5103_2, #3A antenna unit 5103_3, #4A antenna unit 5103_4, #5A antenna unit 5103_5, or #6A antenna unit 5103_6, and antenna unit α is an antenna different from any of antenna unit g1, antenna unit g2, antenna unit g3, antenna unit g4, and antenna unit g5. Note that i is an integer that is greater than or equal to 1 and less than or equal to 5. j is an integer that is greater than or equal to 1 and less than or equal to 5, i≠j, and in all instances of i and j that satisfy this, antenna gi and antenna gj are different.

Step ST53-8: (See FIG. 53)

Communications station #2:

"determines one antenna unit to transmit the modulated signal, to be used at the same time as antenna unit α by communications station #1". Note that the antenna unit determined to be used for transmission is named "determined antenna unit γ".

Communications station #2 newly determines one reception antenna unit that is not antenna unit β.

Note that the newly determined reception antenna unit is one of #1X antenna unit 5201_1, #2X antenna unit 5201_2, #3X antenna unit 5201_3, #4X antenna unit 5201_4, #5X antenna unit 5201_5, and #6X antenna unit 5201_6.

Step ST53-9: (See FIG. 53)

Communications station #2 transmits, to communications station #1, "information on an antenna for modulated signal transmission by communications station #1 (i.e., information on determined antenna unit γ)".

Communications station #2 notifies communications station #1 that one reception antenna unit to be used for reception has been newly determined. Communications station #2 may notify communications station #1 with information on the determined reception antenna unit. Note that, here, the antenna unit determined to be used for reception is named "antenna unit δ".

Step ST33-10-1: (See FIG. 33)

Communications station #1 transmits a signal from antenna unit α and changes multiple types of weighting or phase parameters of antenna unit γ, and transmits a signal from antenna unit γ.

Step ST33-10-2: (See FIG. 33)

Communications station #2 changes multiple types of weighting or phase parameters of (the determined) antenna unit δ, and performs reception.

Step ST33-10-3: (See FIG. 33)

Communications station #2 transmits, to communications station #1, "information on appropriate weighting or phase parameters to be used by antenna unit γ for modulated signal transmission by communications station #1".

Step ST33-10-4: (See FIG. 33)

Communications station #1 sets appropriate weighting or phase parameters with respect to antenna unit γ based on "information on appropriate weighting or phase parameters for antenna unit γ transmitted by communications station #2".

Step ST53-10: (See FIG. 53)

Communications station #1 starts data symbol transmission using antenna unit α and antenna unit γ. Communications station #1 starts transmission of two modulated signals using antenna unit α and antenna unit γ.

Next, an example of a transmission frame of communications station #1 and communications station #2 in the time axis will be given with respect to "Example 1 of communication between communications station #1 and communications station #2".

Figure 54:
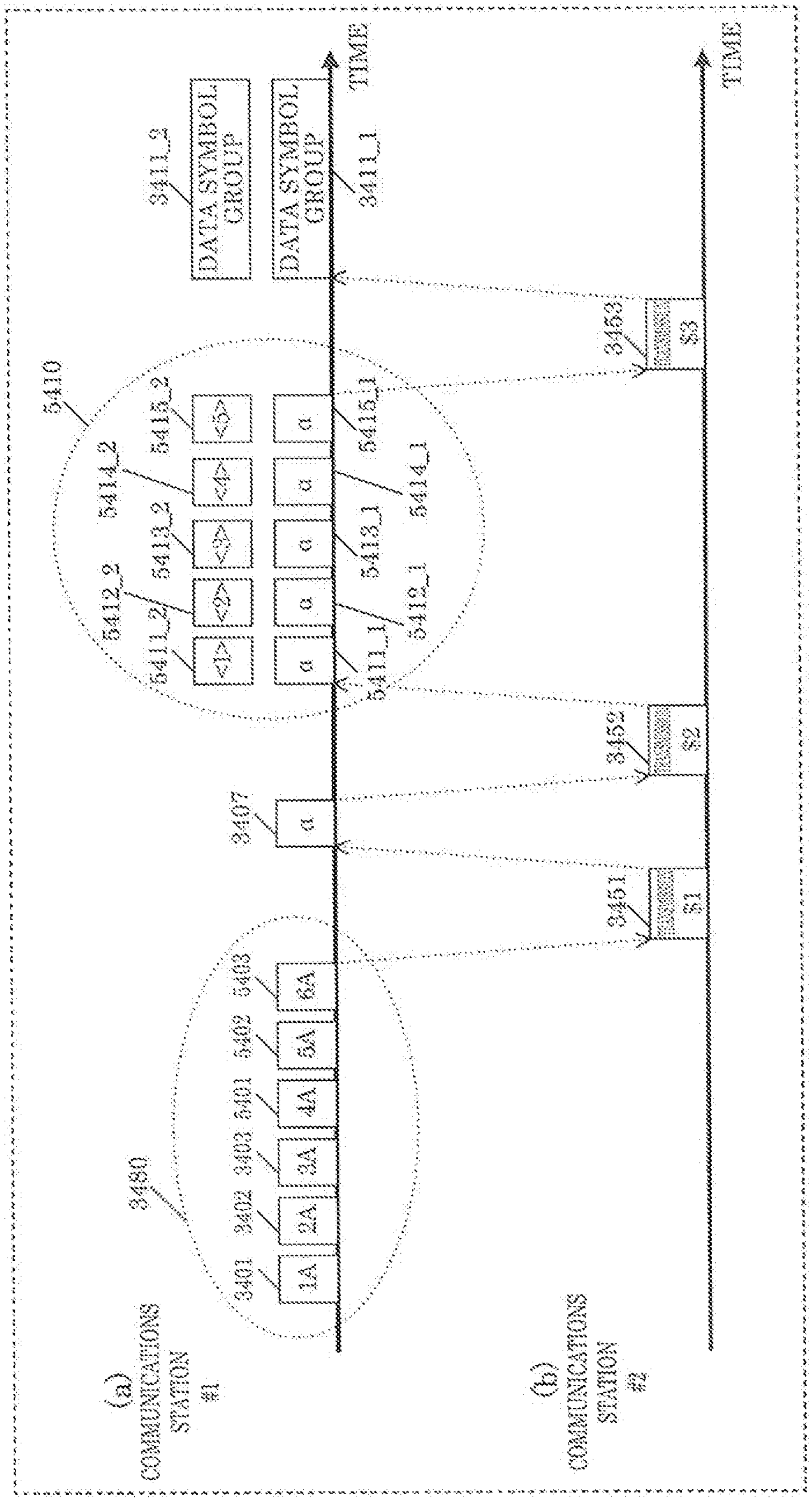
FIG. 54 illustrates an example of transmission frame communication between communications station #1 and communications station #2.

FIG. 54 illustrates an example of a transmission frame of communications station #1 and communications station #2 in the time axis. In (a) in FIG. 54, the transmission frame of communications station #1 in the time axis is shown, and in (b) in FIG. 54, the transmission frame of communications station #2 in the time axis is shown. Note that in (a) and (b) in FIG. 54, symbols may also be present in the frequency axis.

As illustrated in FIG. 54, first, communications station #1 transmits antenna settings symbol group 3401 from #1A antenna unit 5103_1, and then transmits antenna settings symbol group 3402 from #2A antenna unit 5103_2, antenna settings symbol group 3403 from #3A antenna unit 5103_3, antenna settings symbol group 5401 from #4A antenna unit 5103_4, antenna settings symbol group 5402 from #5A antenna unit 5103_5, and antenna settings symbol group 5403 from #6A antenna unit 5103_6. Note that these symbol groups are collectively referred to as antenna settings symbol group 3480.

Communications station #2 receives antenna settings symbol group 3480 transmitted by communications station #1. Then, for example, communications station #2 compares the reception field intensity in antenna settings symbol group 3401 transmitted using #1A antenna unit 5103_1, the reception field intensity in antenna settings symbol group 3402 transmitted using #2A antenna unit 5103_2, the reception field intensity in antenna settings symbol group 3403 transmitted using #3A antenna unit 5103_3, the reception field intensity in antenna settings symbol group 5401 transmitted using #4A antenna unit 5103_4, the reception field intensity in antenna settings symbol group 5402 transmitted using #5A antenna unit 5103_5, and the reception field intensity in antenna settings symbol group 5403 transmitted using #6A antenna unit 5103_6, estimates the antenna unit of communications station #1 whose reception field intensity will increase, and selects an antenna unit that it wants communications station #1 to use to transmit the modulated signal. Then, communications station #2 transmits antenna-related symbol group $1(3451) including information on the selected antenna unit.

Communications station #1 receives antenna-related symbol group $1(3451) transmitted by communications station #2, and based on "information on the selected antenna unit" included in antenna-related symbol group $1(3451) transmitted by communications station #2, determines an antenna unit to be used for modulated signal transmission (i.e., antenna unit α), and transmits antenna settings symbol group 3407 from antenna unit α.

Using #1X antenna unit 5201_1, #2X antenna unit 5201_2, #3X antenna unit 5201_3, #4X antenna unit 5201_4, #5X antenna unit 5201_5, and #6X antenna unit 5201_6, communications station #2 receives antenna settings symbol group 3407 transmitted by communications station #1, and determines one reception antenna unit to be used for reception. Note that, here, the antenna unit determined to be used for reception is named "determined antenna unit β", as described above. Communications station #2 transmits antenna-related symbol group $2(3452) to notify communications station #1 that one reception antenna unit to be used for reception has been determined. Here, antenna-related symbol group $2(3452) may include information on the determined reception antenna.

Communications station #1 receives antenna-related symbol group $2(3452) transmitted by communications station #2, and is thereby notified of the determination of one antenna unit to be used by communications station #2 for reception. With this, the one antenna unit to be used by communications station #1 for transmission and the one antenna unit to be used by communications station #2 are determined. Accordingly, processing switches to procedures for determining one more antenna unit to be used by communications station #1 for transmission and one more antenna unit to be used by communications station #2 for reception.

In accordance with the following rules, communications station #1 "transmits antenna settings symbol group 5411_1 from antenna unit α, transmits antenna settings symbol group <1>5411_2, transmits antenna settings symbol group 5412_1 from antenna unit α, transmits antenna settings symbol group <2>5412_2, transmits antenna settings symbol group 5413_1 from antenna unit α, transmits antenna settings symbol group <3>5413_2, transmits antenna settings symbol group 5414_1 from antenna unit α, transmits antenna settings symbol group <4>5414_2, transmits antenna settings symbol group 5415_1 from antenna unit α, and transmits antenna settings symbol group <5>5415_2". Note that these symbol groups are collectively referred to as antenna settings symbol group set 5410. Details regarding the transmission method of antenna settings symbol group set 5410 will be described later.

Rule: communications station #1 "transmits antenna settings symbol group 5411_1 from determined antenna unit α and transmits antenna settings symbol group <1>5411_2 from antenna unit g1". Then, communications station #1 "transmits antenna settings symbol group 5412_1 from determined antenna unit α and transmits antenna settings symbol group <2>5412_2 from antenna unit g2", "transmits antenna settings symbol group 5413_1 from determined antenna unit α and transmits antenna settings symbol group <3>5413_2 from antenna unit g3", "transmits antenna settings symbol group 5414_1 from determined antenna unit α and transmits antenna settings symbol group <4>5414_2 from antenna unit g4", and "transmits antenna settings symbol group 5415_1 from determined antenna unit α and transmits antenna settings symbol group <5>5415_2 from antenna unit g5".

Note that antenna settings symbol group 5411_1 may be transmitted from determined antenna unit α and antenna settings symbol group <1>5411_2 may be transmitted from antenna unit g1, and then antenna settings symbol group <2>5412_2 may be transmitted from antenna unit g2, antenna settings symbol group <3>5413_2 may be transmitted from antenna unit g3, antenna settings symbol group <4>5414_2 may be transmitted from antenna unit g4, and antenna settings symbol group <5>5415_2 may be transmitted from antenna unit g5.

Note that antenna unit α, antenna unit g1, antenna unit g2, antenna unit g3, antenna unit g4, and antenna unit g5 are each any one of #1A antenna unit 5103_1, #2A antenna unit 5103_2, #3A antenna unit 5103_3, #4A antenna unit 5103_4, #5A antenna unit 5103_5, or #6A antenna unit 5103_6, and antenna unit α is an antenna different from any of antenna unit g1, antenna unit g2, antenna unit g3, antenna unit g4, and antenna unit g5. Note that i is an integer that is greater than or equal to 1 and less than or equal to 5. j is an integer that is greater than or equal to 1 and less than or equal to 5, i≠j, and in all instances of i and j that satisfy this, antenna gi and antenna gj are different.

Communications station #2 receives antenna settings symbol group set 5410 transmitted by communications station #1. Then, communications station #2 "determines one antenna unit to transmit the modulated signal, to be used at the same time as antenna unit α by communications station #1". Note that the antenna unit determined to be used for transmission is named "determined antenna unit γ".

Communications station #2 newly determines one reception antenna unit to be used. Note that, here, the antenna unit determined to be used for reception is named "antenna unit δ", just as described above.

Communications station #2 transmits, to communications station #1, antenna-related symbol group $3(3453) including "information on an antenna for modulated signal transmission by communications station #1 (i.e., information on determined antenna unit γ)". Here, antenna-related symbol group $3(3453) may include information on the determined reception antenna.

Communications station #1 receives antenna-related symbol group $3(3453) transmitted by communications station #2, determines that the setting of the antenna is complete, and transmits data symbol group 3411_1 and data symbol group 3411_2.

Here, data symbol group 3411_1 and data symbol group 3411_2 are transmitted at the same frequency and at the same time. In other words, they are transmitted using the MIMO transmission method exemplified in Embodiment 1.

Then, the antennas to be used for modulated signal transmission by communications station #1 are antenna unit α and antenna unit γ.

Note that although not recited in the description of data symbol group 3411_1 and data symbol group 3411_2, data symbol group 3411_1 and data symbol group 3411_2 may include symbols other than data symbols, such as symbols from transmitting control information, preambles, pilot symbols, and reference symbols.

FIG. 35 is one example of a configuration of antenna settings symbol group 3480. Time is represented on the horizontal axis. Each of antenna settings symbol group 3401 from #1A antenna unit 5103_1, antenna settings symbol group 3402 from #2A antenna unit 5103_2, antenna settings symbol group 3403 from #3A antenna unit 5103_3, antenna settings symbol group 5401 from #4A antenna unit 5103_4, antenna settings symbol group 5402 from #5A antenna unit 5103_5, and antenna settings symbol group 5403 from #6A antenna unit 5103_6 is, for example, configured as illustrated in FIG. 35.

#1A antenna unit 5103_1, #2A antenna unit 5103_2, #3A antenna unit 5103_3, #4A antenna unit 5103_4, #5A antenna unit 5103_5, and #6A antenna unit 5103_6 are each assigned with a unique antenna ID. Accordingly, for example, when antenna settings symbol group 3401 is transmitted from #1A antenna unit 5103_1, the antenna ID of #1A antenna unit 5103_1 is transmitted in antenna ID symbol 3501.

Then, as illustrated in FIG. 35, in addition to antenna ID symbol 3501, reference signal 3502 is transmitted by communications station #1. Reference signal 3502 plays the role of a signal (symbol) for realizing estimation of the communication state (reception quality) of communications station #2 (for example, the reception field intensity). Accordingly, for example, they are known signals (for example, known PSK symbols) to communications station #2.

Accordingly, communications station #1 transmits a symbol group having the configuration illustrated in FIG. 35, as antenna settings symbol group 3401 from #1A antenna unit 5103_1 illustrated in FIG. 54. Naturally, antenna ID symbol 3501 indicates #1A antenna unit 5103_1.

Then, communications station #2 receives antenna settings symbol group 3401 from #1A antenna unit 5103_1 illustrated in FIG. 54, and knows that "the modulated signal is transmitted from communications station #1 via #1A antenna unit 5103_1" from antenna ID symbol 3501. Moreover, communications station #2 estimates the communication state from reference signal 3502. Accordingly, communications station #2 estimates "the communication state of the modulated signal transmitted from #1A antenna unit 5103_1 illustrated in FIG. 54".

Similarly, communications station #1 transmits a symbol group having the configuration illustrated in FIG. 35, as antenna settings symbol group 3402 from #2A antenna unit 5103_2 illustrated in FIG. 54. Naturally, antenna ID symbol 3501 indicates #2A antenna unit 5103_2.

Via the same operations as described above, communications station #2 estimates "the communication state of the modulated signal transmitted from #2A antenna unit 5103_2 illustrated in FIG. 54".

Communications station #1 transmits a symbol group having the configuration illustrated in FIG. 35, as antenna settings symbol group 3403 from #3A antenna unit 5103_3 illustrated in FIG. 54. Naturally, antenna ID symbol 3501 indicates #3A antenna unit 5103_3.

Via the same operations as described above, communications station #2 estimates "the communication state of the modulated signal transmitted from #3A antenna unit 5103_3 illustrated in FIG. 54".

Communications station #1 transmits a symbol group having the configuration illustrated in FIG. 35, as antenna settings symbol group 5401 from #4A antenna unit 5103_4 illustrated in FIG. 54. Naturally, antenna ID symbol 3501 indicates #4A antenna unit 5103_4.

Via the same operations as described above, communications station #2 estimates "the communication state of the modulated signal transmitted from #4A antenna unit 5103_4 illustrated in FIG. 54".

Communications station #1 transmits a symbol group having the configuration illustrated in FIG. 35, as antenna settings symbol group 5402 from #5A antenna unit 5103_5 illustrated in FIG. 54. Naturally, antenna ID symbol 3501 indicates #5A antenna unit 5103_5.

Via the same operations as described above, communications station #2 estimates "the communication state of the modulated signal transmitted from #5A antenna unit 5103_5 illustrated in FIG. 54".

Communications station #1 transmits a symbol group having the configuration illustrated in FIG. 35, as antenna settings symbol group 5403 from #6A antenna unit 5103_6 illustrated in FIG. 54. Naturally, antenna ID symbol 3501 indicates #6A antenna unit 5103_6.

Via the same operations as described above, communications station #2 estimates "the communication state of the modulated signal transmitted from #6A antenna unit 5103_6 illustrated in FIG. 54".

Note that when an ID symbol such as 3501 illustrated in FIG. 35 is present, the transmission order of symbols 3401, 3402, 3403, 3404, 5401, 5402, and 5403 in antenna settings symbol group 3480 illustrated in FIG. 54 need not be as shown in FIG. 54; the transmission order of symbols 3401, 3402, 3403, 3404, 5401, 5402, and 5403 may be set in any which way, or, for example, the transmission order of symbols 3401, 3402, 3403, 3404, 5401, 5402, and 5403 may be changed at the time of transmission. Even with this, since antenna ID symbol 3501 is present as illustrated in FIG. 35, communications station #2 is capable of discerning "from which antenna the modulated signal was transmitted".

FIG. 36 is one example of a configuration of antenna settings symbol group set 5410 (time is represented on the horizontal axis). When antenna settings symbol group 5411_1 and antenna settings symbol group <1>5411_2 are transmitted from antenna unit α as illustrated in FIG. 54, (a) in FIG. 36 indicates a configuration of "antenna settings symbol group 5411_1 from antenna unit α" and (b) in FIG. 36 indicates a configuration of "antenna settings symbol group <1>5411_2".

As illustrated in (b) in FIG. 36, "antenna settings symbol group <1>5411_2" includes antenna ID symbol 3601. Just as described above, antenna ID symbol 3601 is a symbol including information on an antenna ID used to transmit "antenna settings symbol group <1>5411_2", and communications station #1 can discern which antenna was used to transmit "antenna settings symbol group <1>5411_2" as a result of communications station #2 receiving antenna ID symbol 3601.

In "antenna settings symbol group 5411_1 from antenna unit α" in (a) in FIG. 36, a symbol indicating the antenna ID for antenna unit α may or may not be transmitted. This is because information relating to antenna unit α is already shared between communications station #1 and communications station #2.

Then, in "antenna settings symbol group 5411_1 from antenna unit α" in (a) in FIG. 36, reference signal 3602 is arranged at time $1, and in "antenna settings symbol group <1>5411_2" in (b) in FIG. 36 as well, reference signal 3603 is arranged at time $1. Here, reference signal 3602 and reference signal 3603 are transmitted using the same frequency. Reference signal 3602 and reference signal 3603 are also each comprised of a plurality of symbols.

Here, reference signal 3602 and reference signal 3603 each include N symbols.

The in-phase component of the N symbols in reference signal 3602 is expressed as $I_{\alpha v}$, and the orthogonal component of the N symbols in reference signal 3602 is expressed as $Q_{\alpha v}$.

The in-phase component of the N symbols in reference signal 3603 is expressed as $I_{xv}$, and the orthogonal component of the N symbols in reference signal 3603 is expressed as $Q_{xv}$.

At least one of <Condition #23> and <Condition #24> is satisfied. Note that N is an integer that is greater than or equal to 2, and v is an integer that is greater than or equal to 0 and less than or equal to N−1.

<Condition #23>

Equation (47) and Equation (48) are satisfied, v is an integer that is greater than or equal to 0 and less than or equal to N−1, and with all instances of v that satisfy this, $I_{\alpha v} \neq 0$ and $I_{xv} \neq 0$ are satisfied.

<Condition #24>

Equation (47) and Equation (48) are satisfied, v is an integer that is greater than or equal to 0 and less than or equal to N−1, and with all instances of v that satisfy this, $Q_{\alpha v} \neq 0$ and $Q_{xv} \neq 0$ are satisfied.

With this, the channel state of the modulated signal transmitted by antenna unit α and the channel state in "antenna settings symbol group <1>5411_2" can be known, and accordingly, favorable antenna selection is possible.

When antenna settings symbol group 5412_1 and antenna settings symbol group <2>5412_2 are transmitted from antenna unit α as illustrated in FIG. 54, (a) in FIG. 36 indicates a configuration of "antenna settings symbol group 5412_1 from antenna unit α" and (b) in FIG. 36 indicates a configuration of "antenna settings symbol group <2>5412_2". With this, with respect to reference signal 3602 and reference signal 3603 described above, at least one of <Condition #23> and <Condition #25> is satisfied, whereby the channel state of the modulated signal transmitted by antenna unit α and the channel state in "antenna settings symbol group <2>5412_2" can be known, and accordingly, favorable antenna selection is possible.

Moreover, when antenna settings symbol group 5413_1 and antenna settings symbol group <3>5413_2 are transmitted from antenna unit α as illustrated in FIG. 54, (a) in FIG. 36 indicates a configuration of "antenna settings symbol group 5413_1 from antenna unit α" and (b) in FIG. 36 indicates a configuration of "antenna settings symbol group <3>5413_2". With this, with respect to reference signal 3602 and reference signal 3603 described above, at least one of <Condition #23> and <Condition #24> is satisfied, whereby the channel state of the modulated signal transmitted by antenna unit α and the channel state in "antenna settings symbol group <3>5413_2" can be known, and accordingly, favorable antenna selection is possible.

FIG. 37 is one example of a configuration of antenna settings symbol group set 5410 that is different from the example illustrated in FIG. 36. Time is represented on the horizontal axis. When antenna settings symbol group 5411_1 and antenna settings symbol group <1>5411_2 are transmitted from antenna unit α as illustrated in FIG. 54, (a) in FIG. 37 indicates a configuration of "antenna settings symbol group 5411_1 from antenna unit α" and (b) in FIG. 37 indicates a configuration of "antenna settings symbol group <1>5411_2".

As illustrated in (b) in FIG. 37, "antenna settings symbol group <1>5411_2" includes antenna ID symbol 3701. Just as described above, antenna ID symbol 3701 is a symbol including information on an antenna ID used to transmit "antenna settings symbol group <1>5411_2", and communications station #1 can discern which antenna was used to transmit "antenna settings symbol group <1>5411_2" as a result of communications station #2 receiving antenna ID symbol 3701.

In "antenna settings symbol group 5411_1 from antenna unit α" in (a) in FIG. 37, a symbol indicating the antenna ID for antenna unit α may or may not be transmitted. This is because information relating to antenna unit α is already shared between communications station #1 and communications station #2.

Then, in "antenna settings symbol group 5411_1 from antenna unit α" in (a) in FIG. 37, reference signal 3703 is arranged at time $2, and in "antenna settings symbol group <1>5411_2" in (b) in FIG. 37 as well, reference signal 3702 is arranged at time $1. Here, reference signal 3702 and reference signal 3703 are transmitted using the same frequency.

Here, upon transmitting reference signal 3702, a modulated signal is not transmitted from antenna unit α, and upon transmitting reference signal 3703, a modulated signal is not present in (b) in FIG. 37.

With this, the channel state of the modulated signal transmitted by antenna unit α and the channel state in "antenna settings symbol group <1>5411_2" can be known, and accordingly, favorable antenna selection is possible.

Note that the frame configuration is not limited to this example. As a variation, for example, reference signal 3702 and reference signal 3703 each include N symbols.

The in-phase component of the N symbols in reference signal 3702 is expressed as $I_{\alpha v}$, and the orthogonal component of the N symbols in reference signal 3702 is expressed as $Q_{\alpha v}$.

The in-phase component of the N symbols in reference signal 3703 is expressed as $I_{xv}$, and the orthogonal component of the N symbols in reference signal 3703 is expressed as $Q_{xv}$.

At least one of <Condition #25> and <Condition #26> is satisfied. Note that N is an integer that is greater than or equal to 2, and v is an integer that is greater than or equal to 0 and less than or equal to N−1.

<Condition #25>

Equation (49) and Equation (50) are satisfied. Also, that v is an integer that is greater than or equal to 0 and less than or equal to N−1, and any v that satisfies $I_{\alpha v}=0$ and $I_{xv}=0$ is present.

Further, v is an integer that is greater than or equal to 0 and less than or equal to N−1, and with all instances of v that satisfy this, $I_{\alpha v}=0$ and $I_{\alpha v}=0$ are not satisfied.

<Condition #26>

Equation (49) and Equation (50) are satisfied. Also, that v is an integer that is greater than or equal to 0 and less than or equal to N−1, and any v that satisfies $Q_{\alpha v}=0$ and $Q_{xv}=0$ is present.

Further, v is an integer that is greater than or equal to 0 and less than or equal to N−1, and with all instances of v that satisfy this, $Q_{\alpha v}=0$ and $Q_{xv}=0$ is not satisfied.

With this, the channel state of the modulated signal transmitted by antenna unit α and the channel state in "antenna settings symbol group <1>5411_2" can be known, and accordingly, favorable antenna selection is possible.

When antenna settings symbol group 5412_1 and antenna settings symbol group <2>5412_2 are transmitted from antenna unit α as illustrated in FIG. 54, (a) in FIG. 37 indicates a configuration of "antenna settings symbol group 5412_1 from antenna unit α" and (b) in FIG. 37 indicates a configuration of "antenna settings symbol group <2>5412_2". With this, with respect to reference signal 3702 and reference signal 3703 described above, at least one of <Condition #25> and <Condition #26> is satisfied, whereby the channel state of the modulated signal transmitted by antenna unit α and the channel state in "antenna settings symbol group <2>5412_2" can be known, and accordingly, favorable antenna selection is possible.

Moreover, when antenna settings symbol group 5413_1 and antenna settings symbol group <3>5413_2 are transmitted from antenna unit α as illustrated in FIG. 54, (a) in FIG. 37 indicates a configuration of "antenna settings symbol group 5413_1 from antenna unit α" and (b) in FIG. 37 indicates a configuration of "antenna settings symbol group <3>5413_2". With this, with respect to reference signal 3702 and reference signal 3703 described above, at least one of <Condition #25> and <Condition #26> is satisfied, whereby the channel state of the modulated signal transmitted by antenna unit α and the channel state in "antenna settings symbol group <3>5413_2" can be known, and accordingly, favorable antenna selection is possible.

When antenna settings symbol group 5414_1 and antenna settings symbol group <4>5414_2 are transmitted from antenna unit α as illustrated in FIG. 54, (a) in FIG. 37 indicates a configuration of "antenna settings symbol group 5414_1 from antenna unit α" and (b) in FIG. 37 indicates a configuration of "antenna settings symbol group <4>5414_2". With this, with respect to reference signal 3702 and reference signal 3703 described above, at least one of <Condition #25> and <Condition #26> is satisfied, whereby the channel state of the modulated signal transmitted by antenna unit α and the channel state in "antenna settings symbol group <4>5414_2" can be known, and accordingly, favorable antenna selection is possible.

When antenna settings symbol group 5415_1 and antenna settings symbol group <5>5415_2 are transmitted from antenna unit α as illustrated in FIG. 54, (a) in FIG. 37 indicates a configuration of "antenna settings symbol group 5415_1 from antenna unit α" and (b) in FIG. 37 indicates a configuration of "antenna settings symbol group <5>5415_2". With this, with respect to reference signal 3702 and reference signal 3703 described above, at least one of <Condition #25> and <Condition #26> is satisfied, whereby the channel state of the modulated signal transmitted by antenna unit α and the channel state in "antenna settings symbol group <5>5415_2" can be known, and accordingly, favorable antenna selection is possible.

Next, an example of a determination that communications station #2 is in a favorable communication state when communications station #1 transmits antenna settings symbol group set 5410, as illustrated in FIG. 34, will be given.

For example, as illustrated in FIG. 34, antenna settings symbol group 5411_1 and antenna settings symbol group <1>5411_2 are transmitted from antenna unit α. In such a case, the relationship of the states of communications station #1 and communications station #2 are as illustrated in FIG. 38. Antenna unit α(3802_α) transmits modulated signal 3801_α. Here, modulated signal 3801_α is expressed as $z_1(t)$ (t: time; $z_1(t)$ can be defined as a complex number). Antenna unit u(3802_*u*) transmits modulated signal 3801_*u*. Here, modulated signal 3801_*u* is expressed as $z_2(t)$ ($z_2(t)$ can be defined as a complex number).

The propagation environment between antenna unit α(3802_α) and antenna unit β(3803_β) is expressed as $h_{\alpha\beta}(t)$, the propagation environment between antenna unit α(3802_α) and antenna unit v(3803_*v*) is expressed as $h_{\alpha v}(t)$, the propagation environment between antenna unit u(3802_*u*) and antenna unit β(3803_β) is expressed as $h_{u\beta}(t)$, and the propagation environment between antenna unit u(3802_*u*) and antenna unit v(3803_*v*) is expressed as $h_{uv}(t)$. Note that $h_{\alpha\beta}(t)$, $h_{\alpha v}(t)$, $h_{u\beta}(t)$, and $h_{uv}(t)$ can be defined as complex numbers.

The reception signal received by antenna unit β(3803_β) is reception signal 3804_β, and reception signal 3804_β is expressed as $r_1(t)$. The reception signal received by antenna unit v(3803_*v*) is reception signal 3804_*v*, and reception signal 3804_*v* is expressed as $r_2(t)$. $r_1(t)$ and $r_2(t)$ can be defined as complex numbers.

Here, Equation (51) holds true.

Next, consider the following two cases.

<Case #3> A beam is formed by changing the weighting or phase of antenna unit α, or a beam is formed by changing the weighting or phase in antenna unit u as well.

<Case #4> antenna unit α and antenna unit u differ in polarization.

Regarding <Case #3>, it is preferable that XPD increase in the reception antenna for MIMO transmission capable of achieving high reception quality. Accordingly, in order to achieve high reception quality, the following conditions may be satisfied.

<Condition #27>

The amplitude of $h_{\alpha\beta}(t)$ is significantly greater than the amplitude of $h_{u\beta}(t)$, and the amplitude of $h_{uv}(t)$ is significantly greater than the amplitude of $h_{\alpha v}(t)$.

Regarding <Case #4>, it is preferable that XPD increase in the reception antenna for MIMO transmission capable of achieving high reception quality. Accordingly, for example, either one of the following two conditions may be satisfied.

<Condition #28>

The amplitude of $h_{\alpha\beta}(t)$ is significantly greater than the amplitude of $h_{u\beta}(t)$, and the amplitude of $h_{uv}(t)$ is significantly greater than the amplitude of $h_{\alpha v}(t)$.

<Condition #29>

The absolute value of the determinant of the matrix in Equation (51) is a large value.

As illustrated in FIG. 54, if communications station #1 transmits antenna settings symbol group set 5410, communications station #1 transmits antenna settings symbol group 5411_1 and antenna settings symbol group <1>5411_2 from antenna unit α, and using the relationship illustrated in FIG. 38, communications station #2 determines whether this is an antenna set that can achieve high reception quality.

Similarly, communications station #1 transmits antenna settings symbol group 5412_1 and antenna settings symbol group <2>5412_2 from antenna unit α, and using the relationship illustrated in FIG. 38, communications station #2 determines whether this is an antenna set that can achieve high reception quality.

Communications station #1 transmits antenna settings symbol group 5413_1 and antenna settings symbol group <3>5413_2 from antenna unit α, and using the relationship illustrated in FIG. 38, communications station #2 determines whether this is an antenna set that can achieve high reception quality.

Communications station #1 transmits antenna settings symbol group 5414_1 and antenna settings symbol group <4>5414_2 from antenna unit α, and using the relationship illustrated in FIG. 38, communications station #2 determines whether this is an antenna set that can achieve high reception quality.

Communications station #1 transmits antenna settings symbol group 5415_1 and antenna settings symbol group <5>5415_2 from antenna unit α, and using the relationship illustrated in FIG. 38, communications station #2 determines whether this is an antenna set that can achieve high reception quality.

With this, communications station #2 determines one antenna unit for modulated signal transmission, to be used at the same time as antenna unit α by communications station #1, and communications station #2 newly determines a reception antenna unit.

Next, another implementation method using FIG. 34 will be described. Note that as description of FIG. 34 has been given above, repetition will be omitted here.

FIG. 39 illustrates one example of a configuration of an antenna unit exemplified by #1A antenna unit 5103_1, #2A antenna unit 5103_2, #3A antenna unit 5103_3, #4A antenna unit 5103_4, #5A antenna unit 5103_5, and #6A antenna unit 5103_6 included in communications station #1 illustrated in FIG. 51.

Splitter 3902 receives an input of modulated signal 3901, splits modulated signal 3901, and outputs modulated signals 3903_1, 3903_2, 3903_3, and 3903_4.

Multiplier 3904_1 receives inputs of antenna control signal 3900 and modulated signal 3903_1, and based on the multiplication coefficient in antenna control signal 3900, multiplies, for example, coefficient W1 with modulated signal 3903_1, and outputs coefficient multiplied modulated signal 3905_1. Then, coefficient multiplied modulated signal 3905_1 is output from antenna 3906_1 as radio waves.

Similarly, multiplier 3904_2 receives inputs of antenna control signal 3900 and modulated signal 3903_2, and based on the multiplication coefficient in antenna control signal 3900, multiplies, for example, coefficient W2 with modulated signal 3903_2, and outputs coefficient multiplied modulated signal 3905_2. Then, coefficient multiplied modulated signal 3905_2 is output from antenna 3906_2 as radio waves.

Multiplier 3904_3 receives inputs of antenna control signal 3900 and modulated signal 3903_3, and based on the multiplication coefficient in antenna control signal 3900, multiplies, for example, coefficient W3 with modulated signal 3903_3, and outputs coefficient multiplied modulated signal 3905_3. Then, coefficient multiplied modulated signal 3905_3 is output from antenna 3906_3 as radio waves.

Multiplier 3904_4 receives inputs of antenna control signal 3900 and modulated signal 3903_4, and based on the multiplication coefficient in antenna control signal 3900, multiplies, for example, coefficient W4 with modulated signal 3903_4, and outputs coefficient multiplied modulated signal 3905_4. Then, coefficient multiplied modulated signal 3905_4 is output from antenna 3906_4 as radio waves.

Note that W1, W2, W3, and W4 can be defined as complex numbers.

Note that "the absolute value of W1, the absolute value of W2, the absolute value of W3, and the absolute value of W4 are equal" may be true. In this case, this is the equivalent of phase change being performed. It goes without saying that the absolute value of W1, the absolute value of W2, the absolute value of W3, and the absolute value of W4 may be unequal.

Moreover, in FIG. 39, the antenna unit includes four antennas or four antennas and four multipliers, but the number of antennas is not limited to four; the antenna unit may include two or more antennas. However, the antenna unit may include only a single antenna.

FIG. 40 illustrates one example of a configuration of an antenna unit exemplified by #1X antenna unit 5201_1, #2X antenna unit 5201_2, #3X antenna unit 5201_3, #4X antenna unit 5201_4, #5X antenna unit 5201_5, and #6X antenna unit 5201_6 included in communications station #2 illustrated in FIG. 52.

Multiplier 4003_1 receives inputs of reception signal 4002_1 and antenna control signal 4000 received by antenna 4001_1, and based on the multiplication coefficient in antenna control signal 4000, multiplies, for example, coefficient V1 with reception signal 4002_1, and outputs coefficient multiplied reception signal 4004_1.

Multiplier 4003_2 receives inputs of reception signal 4002_2 and antenna control signal 4000 received by antenna 4001_2, and based on the multiplication coefficient in antenna control signal 4000, multiplies, for example, coefficient V2 with reception signal 4002_2, and outputs coefficient multiplied reception signal 4004_2.

Multiplier 4003_3 receives inputs of reception signal 4003_3 and antenna control signal 4000 received by antenna 4001_3, and based on the multiplication coefficient in antenna control signal 4000, multiplies, for example, coefficient V3 with reception signal 4002_3, and outputs coefficient multiplied reception signal 4004_3.

Multiplier 4003_4 receives inputs of reception signal 4003_3 and antenna control signal 4000 received by antenna 4001_4, and based on the multiplication coefficient in antenna control signal 4000, multiplies, for example, coefficient V4 with reception signal 4002_4, and outputs coefficient multiplied reception signal 4004_4.

Note that V1, V2, V3, and V4 can be defined as complex numbers.

Synthesizer 4005 receives inputs of coefficient multiplied reception signals 4004_1, 4004_2, 4004_3, and 4004_4, synthesizes coefficient multiplied reception signals 4004_1, 4004_2, 4004_3, and 4004_4, and outputs synthesized reception signal 4006.

Note that "the absolute value of V1, the absolute value of V2, the absolute value of V3, and the absolute value of V4 are equal" may be true. In this case, this is the equivalent of phase change being performed. It goes without saying that the absolute value of V1, the absolute value of V2, the absolute value of V3, and the absolute value of V4 may be unequal.

Moreover, in FIG. 40, the antenna unit includes four antennas or four antennas and four multipliers, but the number of antennas is not limited to four; the antenna unit may include two or more antennas. However, the antenna unit may include only a single antenna.

FIG. 41 is one example of a configuration of antenna settings symbol group 3480, and time is represented on the horizontal axis. Each of antenna settings symbol group 3401 from #1A antenna unit 5103_1, antenna settings symbol group 3402 from #2A antenna unit 5103_2, antenna settings symbol group 3403 from #3A antenna unit 5103_3, antenna settings symbol group 5401 from #4A antenna unit 5103_4, antenna settings symbol group 5402 from #5A antenna unit 5103_5, and antenna settings symbol group 5403 from #6A antenna unit 5103_6 is, for example, configured as illustrated in FIG. 41.

#1A antenna unit 5103_1, #2A antenna unit 5103_2, #3A antenna unit 5103_3, #4A antenna unit 5103_4, #5A antenna unit 5103_5, and #6A antenna unit 5103_6 are each assigned with a unique antenna ID. Accordingly, for example, when antenna settings symbol group 3401 is transmitted from #1A antenna unit 5103_1, the antenna ID of #1A antenna unit 5103_1 is transmitted in antenna ID symbol 4101.

Then, as illustrated in FIG. 41, in addition to antenna ID symbol 4101, reference signals 4102-1, 4102-2, 4202-3 . . . are transmitted by communications station #1. Reference signals 4102-1, 4102-2, 4202-3 . . . play the role of signals (symbols) for realizing estimation of the communication state (reception quality) of communications station #2 (for example, the reception field intensity). Accordingly, for example, they are known signals (for example, known PSK symbols) to communications station #2.

Moreover, upon transmitting reference signal 4102-1, in the description related to FIG. 39, coefficient W1=W11, coefficient W2=W21, coefficient W3=W31, and coefficient W4=W41.

Moreover, upon transmitting reference signal 4102-2, in the description related to FIG. 39, coefficient W1=W12, coefficient W2=W22, coefficient W3=W32, and coefficient W4=W42.

Upon transmitting reference signal 4102-3, in the description related to FIG. 39, coefficient W1=W13, coefficient W2=W23, coefficient W3=W33, and coefficient W4=W43

Note that description for reference signal 4102-4 through reference signal 4102-($i$−1) is omitted.

Upon transmitting reference signal 4102-$i$, in the description related to FIG. 39, coefficient W1=W1$i$, coefficient W2=W2$i$, coefficient W3=W3$i$, and coefficient W4=W4$i$. Note that the number of required coefficients changes depending on the number of antennas.

FIG. 42 illustrates one example of a configuration of antenna settings symbol group 3480 that is different from FIG. 41; operations that are the same as in FIG. 41 are given like reference signs. Time is represented on the horizontal axis. FIG. 42 differs from FIG. 41 in that a reference signal and an antenna ID symbol are always a set and transmitted as a set. Accordingly, antenna ID symbol 4201 and antenna ID symbol 4202 are illustrated in FIG. 42.

In either of the examples illustrated in FIG. 41 and FIG. 42, as described above, reference signals 4102-1, 4102-2, 4102-3 . . . are transmitted. Here, the following condition holds true.

<Condition #30> i is an integer greater than or equal to 1 and less than or equal to N (N is an integer greater than or equal to 2), j is an integer greater than or equal to 1 and less than or equal to N, i≠j, and with all instances of i and j that satisfy these, {W1$i$≠W1$j$ or W2$i$≠W2$j$ or W3$i$≠W3$j$ or W4$i$≠W14} is satisfied.

Communications station #1 transmits a symbol group having the configuration illustrated in FIG. 41, as antenna settings symbol group 3401 from #1A antenna unit 5103_1 illustrated in FIG. 54. Naturally, antenna ID symbol 3501 indicates #1A antenna unit 5103_1.

Then, communications station #2 receives antenna settings symbol group 3401 transmitted using #1A antenna unit 5103_1 illustrated in FIG. 54, and knows that "the modulated signal is transmitted from communications station #1 via #1A antenna unit 5103_1" from antenna ID symbol 4101. Moreover, from each reference signal 4102-1, 4102-2, 4102-3 . . . , communications station #2 estimates the communication state in each reference signal transmitted from #1A antenna unit 5103_1.

Similarly, communications station #1 transmits a symbol group having the configuration illustrated in FIG. 41, as antenna settings symbol group 3402 from #2A antenna unit 5103_2 illustrated in FIG. 54. Naturally, antenna ID symbol 4101 indicates #2A antenna unit 5103_2.

By performing the same operations described above, from each reference signal 4102-1, 4102-2, 4102-3 . . . , communications station #2 estimates the communication state in each reference signal transmitted from #2A antenna unit 5103_2.

Communications station #1 transmits a symbol group having the configuration illustrated in FIG. 41, as antenna settings symbol group 3403 from #3A antenna unit 5103_3 illustrated in FIG. 54. Naturally, antenna ID symbol 4101 indicates #3A antenna unit 5103_3.

By performing the same operations described above, from each reference signal 4102-1, 4102-2, 4102-3 . . . , communications station #2 estimates the communication state in each reference signal transmitted from #3A antenna unit 5103_3.

Communications station #1 transmits a symbol group having the configuration illustrated in FIG. 41, as antenna settings symbol group 5401 from #4A antenna unit 5103_4 illustrated in FIG. 54. Naturally, antenna ID symbol 4101 indicates #4A antenna unit 5103_4.

By performing the same operations described above, from each reference signal 4102-1, 4102-2, 4102-3 . . . , communications station #2 estimates the communication state in each reference signal transmitted from #4A antenna unit 5103_4.

Communications station #1 transmits a symbol group having the configuration illustrated in FIG. 41, as antenna settings symbol group 5402 from #5A antenna unit 5103_5 illustrated in FIG. 54. Naturally, antenna ID symbol 4101 indicates #5A antenna unit 5103_5.

By performing the same operations described above, from each reference signal 4102-1, 4102-2, 4102-3 . . . , communications station #2 estimates the communication state in each reference signal transmitted from #5A antenna unit 5103_5.

Communications station #1 transmits a symbol group having the configuration illustrated in FIG. 41, as antenna settings symbol group 5403 from #6A antenna unit 5103_6 illustrated in FIG. 54. Naturally, antenna ID symbol 4101 indicates #6A antenna unit 5103_6.

By performing the same operations described above, from each reference signal 4102-1, 4102-2, 4102-3 . . . , communications station #2 estimates the communication state in each reference signal transmitted from #6A antenna unit 5103_6.

Then, from the communication states of these reference signals, communications station #2 estimates "the antenna unit and multiplication coefficient for communications station #1" for achieving favorable reception quality. Then, communications station #2 transmits, to communications station #1, information related to "the antenna unit and multiplication coefficient for communications station #1" for achieving favorable reception quality (i.e., transmission $1(3451) in FIG. 54).

Note that when an ID symbol such as 4101 illustrated in FIG. 41, FIG. 42 is present, the transmission order of symbols 3401, 3402, 3403, 3404, 5401, 5402, and 5403 in antenna settings symbol group 3480 illustrated in FIG. 54 need not be as shown in FIG. 54; the transmission order of symbols 3401, 3402, 3403, 3404, 5401, 5402, and 5403 may be set in any which way, or, for example, the transmission order of symbols 3401, 3402, 3403, 3404, 5401, 5402, and 5403 may be changed at the time of transmission. Even with this, since antenna ID symbol 4101 is present as illustrated in FIG. 41 and FIG. 42, communications station #2 is capable of discerning "from which antenna the modulated signal was transmitted".

Moreover, in FIG. 42, upon transmitting antenna ID symbol 4101, communications station #1 may transmit antenna ID symbol 4101 using the same coefficients W1, W2, W3, and W4 used to transmit reference signal 4102-1; upon transmitting antenna ID symbol 4201, communications station #1 may transmit antenna ID symbol 4201 using the same coefficients W1, W2, W3, and W4 used to transmit reference signal 4102-2; and upon transmitting antenna ID symbol 4202, communications station #1 may transmit antenna ID symbol 4202 using the same coefficients W1, W2, W3, and W4 used to transmit reference signal 4102-3.

As illustrated in FIG. 54, communications station #2 transmits antenna-related symbol group $1(3451), and as a result of communications station #1 receiving this symbol group, communications station #1 determines the antenna unit and multiplication coefficient to use when transmitting the modulated signal. Then, communications station #1 transmits antenna settings symbol group 3407 from antenna unit α using the determined antenna unit and multiplication coefficient.

Using #1X antenna unit 5201_1, #2X antenna unit 5201_2, #3X antenna unit 5201_3, #4X antenna unit 5201_4, #5X antenna unit 5201_5, and #6X antenna unit 5201_6, communications station #2 receives antenna settings symbol group 3407 transmitted by communications station #1. Here, each reception antenna unit in communications station #2 has the configuration illustrated in FIG. 40, and also estimates a favorable multiplication coefficient. Accordingly, communications station #2 determines one reception antenna unit to be used for reception, and additionally determines a favorable multiplication coefficient. Note that, here, the antenna unit determined to be used for reception is named "determined antenna unit β", as described above.

Communications station #2 transmits antenna-related symbol group $2(3452) to notify communications station #1 that one reception antenna unit to be used for reception has been determined. Here, antenna-related symbol group $2(3452) may include information on the determined reception antenna.

Communications station #1 receives antenna-related symbol group $2(3452) transmitted by communications station #2, and is thereby notified of the determination of one antenna unit to be used by communications station #2 for reception. With this, the one antenna unit to be used by communications station #1 for transmission and the one antenna unit to be used by communications station #2 are determined. Moreover, the multiplication coefficient to be used by communications station #1 and the multiplication coefficient to be used by communications station #2 are also determined.

Accordingly, processing switches to procedures for determining one more antenna unit and multiplication coefficient to be used by communications station #1 for transmission and one more antenna unit and multiplication coefficient to be used by communications station #2 for reception.

In accordance with the following rules, communications station #1 "transmits antenna settings symbol group 5411_1 from antenna unit α, transmits antenna settings symbol group <1>5411_2, transmits antenna settings symbol group 5412_1 from antenna unit α, transmits antenna settings symbol group <2>5412_2, transmits antenna settings symbol group 5413_1 from antenna unit α, transmits antenna settings symbol group <3>5413_2, transmits antenna settings symbol group 5414_1 from antenna unit α, transmits antenna settings symbol group <4>5414_2, transmits antenna settings symbol group 5415_1 from antenna unit α, and transmits antenna settings symbol group <5>5415_2". Note that these symbol groups are collectively referred to as antenna settings symbol group set 5410.

Rule: communications station #1 "transmits antenna settings symbol group 5411_1 from determined antenna unit α and transmits antenna settings symbol group <1>5411_2 from antenna unit g1". Then, communications station #1 "transmits antenna settings symbol group 5412_1 from determined antenna unit α and transmits antenna settings symbol group <2>5412_2 from antenna unit g2", "transmits antenna settings symbol group 5413_1 from determined antenna unit α and transmits antenna settings symbol group <3>5413_2 from antenna unit g3", "transmits antenna settings symbol group 5414_1 from determined antenna unit α and transmits antenna settings symbol group <4>5414_2 from antenna unit g4", and "transmits antenna settings symbol group 5415_1 from determined antenna unit α and transmits antenna settings symbol group <5>5415_2 from antenna unit g5".

Note that antenna settings symbol group 5411_1 may be transmitted from determined antenna unit α and antenna settings symbol group <1>5411_2 may be transmitted from antenna unit g1, and then antenna settings symbol group <2>5412_2 may be transmitted from antenna unit g2, antenna settings symbol group <3>5413_2 may be transmitted from antenna unit g3, antenna settings symbol group <4>5414_2 may be transmitted from antenna unit g4, and antenna settings symbol group <5>5415_2 may be transmitted from antenna unit g5. Here, the symbol transmission order is not limited to these examples.

Note that antenna unit α, antenna unit g1, antenna unit g2, antenna unit g3, antenna unit g4, and antenna unit g5 are each any one of #1A antenna unit 5103_1, #2A antenna unit 5103_2, #3A antenna unit 5103_3, #4A antenna unit 5103_4, #5A antenna unit 5103_5, or #6A antenna unit 5103_6, and antenna unit α is an antenna different from any of antenna unit g1, antenna unit g2, antenna unit g3, antenna unit g4, and antenna unit g5. Note that i is an integer that is greater than or equal to 1 and less than or equal to 5. j is an integer that is greater than or equal to 1 and less than or equal to 5, i≠j, and in all instances of i and j that satisfy this, antenna gi and antenna gj are different.

FIG. 43 is one example of a configuration of antenna settings symbol group set 5410. Time is represented on the horizontal axis. When antenna settings symbol group 5411_1 and antenna settings symbol group <1>5411_2 are transmitted from antenna unit α as illustrated in FIG. 54, (a) in FIG. 43 indicates a configuration of "antenna settings symbol group 5411_1 from antenna unit α" and (b) in FIG. 43 indicates a configuration of "antenna settings symbol group <1>5411_2".

As illustrated in (b) in FIG. 43, "antenna settings symbol group <1>5411_2" includes antenna ID symbol 4301. Just as described above, antenna ID symbol 4301 is a symbol including information on an antenna ID used to transmit "antenna settings symbol group <1>5411_2", and communications station #1 can discern which antenna was used to transmit "antenna settings symbol group <1>5411_2" as a result of communications station #2 receiving antenna ID symbol 4301.

In "antenna settings symbol group 5411_1 from antenna unit α" in (a) in FIG. 43, a symbol indicating the antenna ID for antenna unit α may or may not be transmitted. This is because information relating to antenna unit α is already shared between communications station #1 and communications station #2.

Then, in "antenna settings symbol group 5411_1 from antenna unit α" in (a) in FIG. 43, reference signal 4302-1 is arranged at time $1, and in "antenna settings symbol group <1>5411_2" in (b) in FIG. 43 as well, reference signal 4303 is arranged at time $1. Here, reference signal 4302-1 and reference signal 4303 are transmitted using the same frequency. Reference signal 4302-1 and reference signal 4303 are also each comprised of a plurality of symbols.

Here, reference signal 4302-1 and reference signal 4303 each include N symbols.

The in-phase component of the N symbols in reference signal 4302-1 is expressed as $I_{\alpha v}$, and the orthogonal component of the N symbols in reference signal 4302-1 is expressed as $Q_{\alpha v}$.

The in-phase component of the N symbols in reference signal 4303 is expressed as $I_{xv}$, and the orthogonal component of the N symbols in reference signal 4303 is expressed as $Q_{xv}$.

At least one of <Condition #31> and <Condition #32> below is satisfied. Note that N is an integer that is greater than or equal to 2, and v is an integer that is greater than or equal to 0 and less than or equal to N−1.

<Condition #31>

Equation (52) and Equation (53) are satisfied, v is an integer that is greater than or equal to 0 and less than or equal to N−1, and with all instances of v that satisfy this, $I_{\alpha v} \neq 0$ and $I_{xv} \neq 0$ are satisfied.

<Condition #32>

Equation (52) and Equation (53) are satisfied, v is an integer that is greater than or equal to 0 and less than or equal to N−1, and with all instances of v that satisfy this, $Q_{\alpha v} \neq 0$ and $Q_{xv}=0$ are satisfied.

With this, the channel state of the modulated signal transmitted by antenna unit α and the channel state in "antenna settings symbol group <1>5411_2" can be known, and accordingly, favorable antenna selection is possible.

Note that upon transmitting reference signal 4303, in the description related to FIG. 39, coefficient W1=u11, coefficient W2=u21, coefficient W3=u31, and coefficient W4=u41. Here, since the coefficient that communications station #1 uses to transmit reference signal 4302-1 is antenna unit α, it is already determined.

In "antenna settings symbol group 5411_1 from antenna unit α" in (a) in FIG. 43, reference signal 4302-2 is arranged at time $2, and in "antenna settings symbol group <1>5411_2" in (b) in FIG. 43 as well, reference signal 4304 is arranged at time $2. Here, reference signal 4302-2 and reference signal 4304 are transmitted using the same frequency. Reference signal 4302-2 and reference signal 4304 are also each comprised of a plurality of symbols.

Here, reference signal 4302-2 and reference signal 4304 each include N symbols.

The in-phase component of the N symbols in reference signal 4302-2 is expressed as $I_{\alpha v}$, and the orthogonal component of the N symbols in reference signal 4302-2 is expressed as $Q_{\alpha v}$.

The in-phase component of the N symbols in reference signal 4304 is expressed as $I_{xv}$, and the orthogonal component of the N symbols in reference signal 4304 is expressed as $Q_{xv}$.

Here, the following relation equation is applied.

At least one of <Condition #33> and <Condition #34> below is satisfied. Note that N is an integer that is greater than or equal to 2, and v is an integer that is greater than or equal to 0 and less than or equal to N−1.

<Condition #33>

Equation (54) and Equation (55) are satisfied, v is an integer that is greater than or equal to 0 and less than or equal to N−1, and with all instances of v that satisfy this, $I_{\alpha v} \neq 0$ and $I_{xv} \neq 0$ are satisfied.

<Condition #34>

Equation (54) and Equation (55) are satisfied, v is an integer that is greater than or equal to 0 and less than or equal to N−1, and with all instances of v that satisfy this, $Q_{\alpha v} \neq 0$ and $Q_{xv} \neq 0$ are satisfied.

With this, the channel state of the modulated signal transmitted by antenna unit α and the channel state in "antenna settings symbol group <1>5411_2" can be known, and accordingly, favorable antenna selection is possible.

Note that upon transmitting reference signal 4304, in the description related to FIG. 39, coefficient W1=u12, coefficient W2=u22, coefficient W3=u32, and coefficient W4=u42. Here, since the coefficient that communications station #1 uses to transmit reference signal 4302-2 is antenna unit α, it is already determined.

In "antenna settings symbol group 5411_1 from antenna unit α" in (a) in FIG. 43, reference signal 4302-3 is arranged at time $3, and in "antenna settings symbol group <1>5411_2" in (b) in FIG. 43 as well, reference signal 4305 is arranged at time $3. Here, reference signal 4302-3 and reference signal 4305 are transmitted using the same frequency. Reference signal 4302-3 and reference signal 4305 are also each comprised of a plurality of symbols.

Here, reference signal 4302-3 and reference signal 4305 each include N symbols.

The in-phase component of the N symbols in reference signal 4302-3 is expressed as $I_{\alpha v}$, and the orthogonal component of the N symbols in reference signal 4302-3 is expressed as $Q_{\alpha v}$.

The in-phase component of the N symbols in reference signal 4305 is expressed as $I_{xv}$, and the orthogonal component of the N symbols in reference signal 4305 is expressed as $Q_{xv}$.

At least one of <Condition #35> and <Condition #36> below is satisfied. Note that N is an integer that is greater than or equal to 2, and v is an integer that is greater than or equal to 0 and less than or equal to N−1.

<Condition #35>

Equation (56) and Equation (57) are satisfied, v is an integer that is greater than or equal to 0 and less than or equal to N−1, and with all instances of v that satisfy this, $I_{\alpha v}\neq 0$ and $I_{xv}\neq 0$ are satisfied.

<Condition #36>

Equation (56) and Equation (57) are satisfied, v is an integer that is greater than or equal to 0 and less than or equal to N−1, and with all instances of v that satisfy this, $Q_{\alpha v}\neq 0$ and $Q_{xv}\neq 0$ are satisfied.

With this, the channel state of the modulated signal transmitted by antenna unit α and the channel state in "antenna settings symbol group <1>5411_2" can be known, and accordingly, favorable antenna selection is possible.

Note that upon transmitting reference signal 4305, in the description related to FIG. 39, coefficient W1=u13, coefficient W2=u23, coefficient W3=u33, and coefficient W4=u43. Here, since the coefficient that communications station #1 uses to transmit reference signal 4302-5 is antenna unit α, it is already determined.

In the above description, the number of sets of reference signals transmitted at the same time is three, but the number of sets is not limited to this example; N sets may be transmitted (N is an integer greater than or equal to 2). In this case, in (b) in FIG. 43, upon transmitting a reference signal, in the description related to FIG. 39, coefficient W1=u1*i*, coefficient W2=u2*i*, coefficient W3=u3*i*, and coefficient W4=u4*i*. Note that i is an integer that is greater than or equal to 1 and less than or equal to N.

FIG. 44 is one example of a configuration of antenna settings symbol group set 5410 that is different from the example illustrated in FIG. 43. Time is represented on the horizontal axis. Operations in FIG. 44 that are the same as in FIG. 43 share like reference marks. FIG. 44 differs from FIG. 43 in that a reference signal and an antenna ID symbol are always a set and transmitted as a set. Accordingly, antenna ID symbols 4401, 4402, and 4403 are present. Then, the configuration method of reference signals 4302-1, 4302-2, and 4302-3, and reference signals 4303, 4304, and 4305 in FIG. 44 is as described with reference to FIG. 43.

In either of the examples illustrated in FIG. 43 and FIG. 44, reference signals 4303, 4304, 4305 . . . as described above are transmitted. Here, the following condition holds true.

<Condition #37> i is an integer greater than or equal to 1 and less than or equal to N, j is an integer greater than or equal to 1 and less than or equal to N, i≠j, and with all instances of i and j that satisfy these, {u1*i*≠u1*j* or u2*i*≠u2*j* or u3*i*≠u3*j* or u4*i* u4*j*} is satisfied. Note that N is an integer that is greater than or equal to 2.

When antenna settings symbol group 5412_1 and antenna settings symbol group <2>5412_2 are transmitted from antenna unit α as illustrated in FIG. 54, (a) in FIG. 43 indicates a configuration of "antenna settings symbol group 5412_1 from antenna unit α" and (b) in FIG. 43 indicates a configuration of "antenna settings symbol group <2>5412_2". Alternatively, (a) in FIG. 44 indicates a configuration of "antenna settings symbol group 5412_1 from antenna unit α" and (b) in FIG. 44 indicates a configuration of "antenna settings symbol group <2>5412_2". With this, with regard to reference signals 4302-1, 4302-2, 4302-3 . . . and reference signals 4303, 4304, 4305 . . . described above, these reference signals are configured as described above.

Moreover, when antenna settings symbol group 5413_1 and antenna settings symbol group <3>5413_2 are transmitted from antenna unit α as illustrated in FIG. 54, (a) in FIG. 43 indicates a configuration of "antenna settings symbol group 5413_1 from antenna unit α" and (b) in FIG. 43 indicates a configuration of "antenna settings symbol group <3>5413_2". Alternatively, (a) in FIG. 44 indicates a configuration of "antenna settings symbol group 5413_1 from antenna unit α" and (b) in FIG. 44 indicates a configuration of "antenna settings symbol group <3>5413_2".

With this, with regard to reference signals 4302-1, 4302-2, 4302-3 . . . and reference signals 4303, 4304, 4305 . . . described above, these reference signals are configured as described above.

When antenna settings symbol group 5414_1 and antenna settings symbol group <4>5414_2 are transmitted from antenna unit α as illustrated in FIG. 54, (a) in FIG. 43 indicates a configuration of "antenna settings symbol group 5414_1 from antenna unit α" and (b) in FIG. 43 indicates a configuration of "antenna settings symbol group <4>5414_2". Alternatively, (a) in FIG. 44 indicates a configuration of "antenna settings symbol group 5414_1 from antenna unit α" and (b) in FIG. 44 indicates a configuration of "antenna settings symbol group <4>5414_2". With this, with regard to reference signals 4302-1, 4302-2, 4302-3 . . . and reference signals 4303, 4304, 4305 . . . described above, these reference signals are configured as described above.

With this, with regard to reference signals 4302-1, 4302-2, 4302-3 . . . and reference signals 4303, 4304, 4305 . . . described above, these reference signals are configured as described above.

When antenna settings symbol group 5415_1 and antenna settings symbol group <5>5415_2 are transmitted from antenna unit α as illustrated in FIG. 54, (a) in FIG. 43 indicates a configuration of "antenna settings symbol group 5415_1 from antenna unit α" and (b) in FIG. 43 indicates a configuration of "antenna settings symbol group <5>5415_2". Alternatively, (a) in FIG. 44 indicates a configuration of "antenna settings symbol group 5415_1 from antenna unit α" and (b) in FIG. 44 indicates a configuration of "antenna settings symbol group <5>5415_2". With this, with regard to reference signals 4302-1, 4302-2, 4302-3 . . . and reference signals 4303, 4304, 4305 . . . described above, these reference signals are configured as described above.

With this, with regard to reference signals 4302-1, 4302-2, 4302-3 . . . and reference signals 4303, 4304, 4305 . . . described above, these reference signals are configured as described above.

By performing the same operations described above, from each reference signal 4302-1, 4302-2, 4302-3 . . . and reference signal 4303, 4304, 4305 in antenna settings symbol group 5412_1 and antenna settings symbol group <2>5412_2 transmitted using antenna unit α, communications station #2 estimates the communication state in each reference signal.

Then, by performing the same operations described above, from each reference signal 4302-1, 4302-2, 4302-3 . . . and reference signal 4303, 4304, 4305 in antenna settings symbol group 5413_1 and antenna settings symbol group <3>5413_2 transmitted using antenna unit α, communications station #2 estimates the communication state in each reference signal By performing the same operations described above, from each reference signal 4302-1, 4302-2, 4302-3 . . . and reference signal 4303, 4304, 4305 in antenna settings symbol group 5413_1 and antenna settings symbol group <4>5414_2 transmitted using antenna unit α, communications station #2 estimates the communication state in each reference signal.

By performing the same operations described above, from each reference signal 4302-1, 4302-2, 4302-3 . . . and reference signal 4303, 4304, 4305 in antenna settings symbol group 5413_1 and antenna settings symbol group <5>5415_2 transmitted using antenna unit α, communications station #2 estimates the communication state in each reference signal.

Then, from the communication states of these reference signals, communications station #2 estimates "the antenna unit and multiplication coefficient for communications station #1" for achieving favorable reception quality. Then, communications station #2 transmits, to communications station #1, information related to "the antenna group (that is not antenna unit α) new to communications station #1 and multiplication coefficient (of new antenna unit)" for achieving favorable reception quality (i.e., transmission $3(3453) in FIG. 34).

FIG. 45 is one example of a configuration of antenna settings symbol group set 5410 that is different from the examples illustrated in FIG. 43, FIG. 44. Time is represented on the horizontal axis. When antenna settings symbol group 5411_1 and antenna settings symbol group <1>5411_2 are transmitted from antenna unit α, (a) in FIG. 45 indicates a configuration of "antenna settings symbol group 5411_1 from antenna unit α" and (b) in FIG. 45 indicates a configuration of "antenna settings symbol group <1>5411_2".

As illustrated in (b) in FIG. 45, "antenna settings symbol group <1>5411_2" includes antenna ID symbol 4501. Just as described above, antenna ID symbol 4501 is a symbol including information on an antenna ID used to transmit "antenna settings symbol group <1>5411_2", and communications station #1 can discern which antenna was used to transmit "antenna settings symbol group <1>5411_2" as a result of communications station #2 receiving antenna ID symbol 4501.

In "antenna settings symbol group 5411_1 from antenna unit α" in (a) in FIG. 45, a symbol indicating the antenna ID for antenna unit α may or may not be transmitted. This is because information relating to antenna unit α is already shared between communications station #1 and communications station #2.

Then, in "antenna settings symbol group 5411_1 from antenna unit α" in (a) in FIG. 45, reference signal 4502-1 is arranged at time $2, and in "antenna settings symbol group <1>5411_2" in (b) in FIG. 45 as well, reference signal 4503 is arranged at time $1. Here, reference signal 4502-1 and reference signal 4503 are transmitted using the same frequency.

Here, upon transmitting reference signal 4503, a modulated signal is not transmitted from antenna unit α, and upon transmitting reference signal 4502-1, a modulated signal is not present in (b) in FIG. 45.

Note that the frame configuration is not limited to this example. As a variation, for example, reference signal 4502-1 and reference signal 4503 each include N symbols.

The in-phase component of the N symbols in reference signal 4502-1 is expressed as $I_{\alpha v}$, and the orthogonal component of the N symbols in reference signal 4502-1 is expressed as $Q_{\alpha v}$.

The in-phase component of the N symbols in reference signal 4503 is expressed as $I_{xv}$, and the orthogonal component of the N symbols in reference signal 4503 is expressed as $Q_{\alpha v}$.

At least one of <Condition #38> and <Condition #39> below is satisfied. Note that N is an integer that is greater than or equal to 2, and v is an integer that is greater than or equal to 0 and less than or equal to N−1.

<Condition #38>

Equation (58) and Equation (59) are satisfied. Also, that v is an integer that is greater than or equal to 0 and less than or equal to N−1, and any v that satisfies $I_{\alpha v}=0$ and $I_{xv}=0$ is present.

Further, v is an integer that is greater than or equal to 0 and less than or equal to N−1, and with all instances of v that satisfy this, $I_{\alpha v}=0$ and $I_{xv}=0$ are not satisfied.

<Condition #39>

Equation (58) and Equation (59) are satisfied. Also, that v is an integer that is greater than or equal to 0 and less than or equal to N−1, and any v that satisfies $Q_{\alpha v}=0$ and $Q_{xv}=0$ is present.

Further, v is an integer that is greater than or equal to 0 and less than or equal to N−1, and with all instances of v that satisfy this, $Q_{\alpha v}=0$ and $Q_{xv}=0$ is not satisfied.

With this, the channel state of the modulated signal transmitted by antenna unit α and the channel state in "antenna settings symbol group <1>5411_2" can be known, and accordingly, favorable antenna selection is possible.

Note that upon transmitting reference signal 4503, in the description related to FIG. 39, coefficient W1=S11, coefficient W2=S21, coefficient W3=S31, and coefficient W4=S41. Here, since the coefficient that communications station #1 uses to transmit reference signal 4502-1 is antenna unit α, it is already determined.

In "antenna settings symbol group 5411_1 from antenna unit α" in (a) in FIG. 45, reference signal 4502-2 is arranged at time $4, and in "antenna settings symbol group <1>5411_2" in (b) in FIG. 45 as well, reference signal 4504 is arranged at time $3. Here, reference signal 4502-2 and reference signal 4504 are transmitted using the same frequency.

Here, upon transmitting reference signal 4504, a modulated signal is not transmitted from antenna unit α, and upon transmitting reference signal 4502-2, a modulated signal is not present in (b) in FIG. 45.

Note that the frame configuration is not limited to this example. As a variation, for example, reference signal 4502-2 and reference signal 4504 each include N symbols.

The in-phase component of the N symbols in reference signal 4502-2 is expressed as $I_{\alpha v}$, and the orthogonal component of the N symbols in reference signal 4502-2 is expressed as $Q_{\alpha v}$.

The in-phase component of the N symbols in reference signal 4504 is expressed as $I_{xv}$, and the orthogonal component of the N symbols in reference signal 4504 is expressed as $Q_{xv}$.

At least one of <Condition #40> and <Condition #41> below is satisfied. Note that N is an integer that is greater than or equal to 2, and v is an integer that is greater than or equal to 0 and less than or equal to N−1.

<Condition #40>

Equation (60) and Equation (61) are satisfied. Also, that v is an integer that is greater than or equal to 0 and less than or equal to N−1, and any v that satisfies $I_{\alpha v}=0$ and $I_{xv}=0$ is present.

Further, v is an integer that is greater than or equal to 0 and less than or equal to N−1, and with all instances of v that satisfy this, $I_{\alpha v}=0$ and $I_{xv}=0$ are not satisfied.

<Condition #41>

Equation (60) and Equation (61) are satisfied. Also, that v is an integer that is greater than or equal to 0 and less than or equal to N−1, and any v that satisfies $Q_{\alpha v}=0$ and $Q_{xv}=0$ is present.

Further, v is an integer that is greater than or equal to 0 and less than or equal to N−1, and with all instances of v that satisfy this, $Q_{\alpha v}=0$ and $Q_{xv}=0$ is not satisfied.

With this, the channel state of the modulated signal transmitted by antenna unit α and the channel state in "antenna settings symbol group <1>5411_2" can be known, and accordingly, favorable antenna selection is possible.

Note that upon transmitting reference signal 4504, in the description related to FIG. 39, coefficient W1=S12, coefficient W2=S22, coefficient W3=S32, and coefficient W4=S42. Here, since the coefficient that communications station #1 uses to transmit reference signal 4502-2 is antenna unit α, it is already determined.

In "antenna settings symbol group 5411_1 from antenna unit α" in (a) in FIG. 45, reference signal 4502-3 is arranged at time $6, and in "antenna settings symbol group <1>5411_2" in (b) in FIG. 45 as well, reference signal 4505 is arranged at time $5. Here, reference signal 4502-3 and reference signal 4505 are transmitted using the same frequency.

Here, upon transmitting reference signal 4505, a modulated signal is not transmitted from antenna unit α, and upon transmitting reference signal 4502-3, a modulated signal is not present in (b) in FIG. 45.

Note that the frame configuration is not limited to this example. As a variation, for example, reference signal 4502-3 and reference signal 4505 each include N symbols.

The in-phase component of the N symbols in reference signal 4502-3 is expressed as $I_{\alpha v}$, and the orthogonal component of the N symbols in reference signal 4502-3 is expressed as $Q_{\alpha v}$.

The in-phase component of the N symbols in reference signal 4505 is expressed as $I_{xv}$, and the orthogonal component of the N symbols in reference signal 4505 is expressed as $Q_{xv}$.

At least one of <Condition #42> and <Condition #43> below is satisfied. Note that N is an integer that is greater than or equal to 2, and v is an integer that is greater than or equal to 0 and less than or equal to N−1.

<Condition #42>

Equation (62) and Equation (63) are satisfied. Also, that v is an integer that is greater than or equal to 0 and less than or equal to N−1, and any v that satisfies $I_{\alpha v}=0$ and $I_{xv}=0$ is present. Further, v is an integer that is greater than or equal to 0 and less than or equal to N−1, and with all instances of v that satisfy this, $I_{\alpha v}=0$ and $I_{xv}=0$ are not satisfied.

<Condition #43>

Equation (62) and Equation (63) are satisfied. Also, that v is an integer that is greater than or equal to 0 and less than or equal to N−1, and any v that satisfies $Q_{\alpha v}=0$ and $Q_{xv}=0$ is present. Further, v is an integer that is greater than or equal to 0 and less than or equal to N−1, and with all instances of v that satisfy this, $Q_{\alpha v}=0$ and $Q_{xv}=0$ are not satisfied.

With this, the channel state of the modulated signal transmitted by antenna unit α and the channel state in "antenna settings symbol group <1>5411_2" can be known, and accordingly, favorable antenna selection is possible.

Note that upon transmitting reference signal 4505, in the description related to FIG. 39, coefficient W1=S13, coefficient W2=S23, coefficient W3=S33, and coefficient W4=S43. Here, since the coefficient that communications station #1 uses to transmit reference signal 4502-3 is antenna unit α, it is already determined.

In the above description, the number of sets of reference signals transmitted at the same time is three, but the number of sets is not limited to this example; N sets may be transmitted. In this case, in (b) in FIG. 45, upon transmitting a reference signal, in the description related to FIG. 39, coefficient W1=S1*i*, coefficient W2=S2*i*, coefficient W3=S3*i*, and coefficient W4=S4*i*. Note that N is an integer that is greater than or equal to 2, and i is an integer that is greater than or equal to 1 and less than or equal to N.

FIG. 46 is one example of a configuration of antenna settings symbol group set 5410 that is different from the example illustrated in FIG. 45. Time is represented on the horizontal axis. Operations in FIG. 46 that are the same as in FIG. 44 share like reference marks. FIG. 46 differs from FIG. 44 in that a reference signal and an antenna ID symbol are always a set and transmitted as a set. Accordingly, antenna ID symbols 4501, 4601, and 4602 are present. Then, the configuration method of reference signals 4502-1, 4502-2, and 4502-3, and reference signals 4503, 4504, and 4506 in FIG. 46 is as described with reference to FIG. 45.

In either of the examples illustrated in FIG. 45 and FIG. 46, reference signals 4503, 4504, 4505 . . . as described above are transmitted. Here, the following condition holds true.

<Condition #44> i is an integer greater than or equal to 1 and less than or equal to N, j is an integer greater than or equal to 1 and less than or equal to N, i≠j, and with all instances of i and j that satisfy these, {S1*i*≠S1*j* or S2*i*≠S2*j* or S3*i*≠S3*j* or S4*i* S4*j*} is satisfied. Note that N is an integer that is greater than or equal to 2.

When antenna settings symbol group 5412_1 and antenna settings symbol group <2>5412_2 are transmitted from antenna unit α as illustrated in FIG. 54, (a) in FIG. 45 indicates a configuration of "antenna settings symbol group 5412_1 from antenna unit α" and (b) in FIG. 45 indicates a configuration of "antenna settings symbol group <2>5412_2". Alternatively, (a) in FIG. 46 indicates a configuration of "antenna settings symbol group 5412_1 from antenna unit α" and (b) in FIG. 46 indicates a configuration of "antenna settings symbol group <2>5412_2". With this, with regard to reference signals 4502-1, 4502-2, 4502-3 . . . and reference signals 4503, 4504, 4505 . . . described above, these reference signals are configured as described above.

Moreover, when antenna settings symbol group 5413_1 and antenna settings symbol group <3>5413_2 are transmitted from antenna unit α as illustrated in FIG. 54, (a) in FIG. 45 indicates a configuration of "antenna settings symbol group 5413_1 from antenna unit α" and (b) in FIG. 45 indicates a configuration of "antenna settings symbol group <3>5413_2". Alternatively, (a) in FIG. 46 indicates a configuration of "antenna settings symbol group 5413_1 from antenna unit α" and (b) in FIG. 46 indicates a configuration of "antenna settings symbol group <3>5413_2". With this, with regard to reference signals 4502-1, 4502-2,

4502-3 . . . and reference signals 4503, 4504, 4505 . . . described above, these reference signals are configured as described above.

When antenna settings symbol group 5414_1 and antenna settings symbol group <4>5414_2 are transmitted from antenna unit α as illustrated in FIG. 54, (a) in FIG. 45 indicates a configuration of "antenna settings symbol group 5414_1 from antenna unit α" and (b) in FIG. 45 indicates a configuration of "antenna settings symbol group <4>5414_2". Alternatively, (a) in FIG. 46 indicates a configuration of "antenna settings symbol group 5414_1 from antenna unit α" and (b) in FIG. 46 indicates a configuration of "antenna settings symbol group <4>5414_2". With this, with regard to reference signals 4502-1, 4502-2, 4502-3 . . . and reference signals 4503, 4504, 4505 . . . described above, these reference signals are configured as described above.

When antenna settings symbol group 5415_1 and antenna settings symbol group <5>5415_2 are transmitted from antenna unit α as illustrated in FIG. 54, (a) in FIG. 45 indicates a configuration of "antenna settings symbol group 5415_1 from antenna unit α" and (b) in FIG. 45 indicates a configuration of "antenna settings symbol group <5>5415_2". Alternatively, (a) in FIG. 46 indicates a configuration of "antenna settings symbol group 5415_1 from antenna unit α" and (b) in FIG. 46 indicates a configuration of "antenna settings symbol group <5>5415_2". With this, with regard to reference signals 4502-1, 4502-2, 4502-3 . . . and reference signals 4503, 4504, 4505 . . . described above, these reference signals are configured as described above.

By performing the same operations described above, from each reference signal 4502-1, 4502-2, 4502-3 . . . and reference signal 4503, 4504, 4505 in antenna settings symbol group 5412_1 and antenna settings symbol group <2>5412_2 transmitted using antenna unit α, communications station #2 estimates the communication state in each reference signal.

Then, by performing the same operations described above, from each reference signal 4502-1, 4502-2, 4502-3 . . . and reference signal 4503, 4504, 4505 in antenna settings symbol group 5413_1 and antenna settings symbol group <3>5413_2 transmitted using antenna unit α, communications station #2 estimates the communication state in each reference signal By performing the same operations described above, from each reference signal 4502-1, 4502-2, 4502-3 . . . and reference signal 4503, 4504, 4505 in antenna settings symbol group 5414_1 and antenna settings symbol group <4>5414_2 transmitted using antenna unit α, communications station #2 estimates the communication state in each reference signal.

By performing the same operations described above, from each reference signal 4502-1, 4502-2, 4502-3 . . . and reference signal 4503, 4504, 4505 in antenna settings symbol group 5415_1 and antenna settings symbol group <5>5415_2 transmitted using antenna unit α, communications station #2 estimates the communication state in each reference signal.

Then, from the communication states of these reference signals, communications station #2 estimates "the antenna unit and multiplication coefficient for communications station #1" for achieving favorable reception quality. Then, communications station #2 transmits, to communications station #1, information related to "the antenna group (that is not antenna unit α) new to communications station #1 and multiplication coefficient (of new antenna unit)" for achieving favorable reception quality (i.e., transmission $3(3453) in FIG. 34).

Additionally, during reception of reference signals 4502-1, 4502-2, 4502-3 . . . and reference signals 4503, 4504, and 4505 in antenna settings symbol group 5412_1 and antenna settings symbol group <2>5412_2 from antenna unit α by communications station #2, each reception antenna unit in communications station #2 has the configuration illustrated in FIG. 40, and may also predict a favorable multiplication coefficient. Accordingly, communications station #2 sets a favorable multiplication coefficient to be used by a new antenna unit (antenna unit δ).

Accordingly, communications station #2 transmits antenna-related symbol group $3(3453) in FIG. 54, and as a result of communications station #1 receiving this symbol group, communications station #1 knows of the completion of the setting of the antenna unit in communications station #2 (i.e., the determining of which antenna unit and the determining of the multiplication coefficient to be used).

In this way, first, communications station #1 transmits a reference symbol from each antenna unit in order to determine an antenna unit to be used for transmission, the communication state of each reference symbol is obtained from communications station #2, one antenna unit (antenna unit α) for transmitting the data symbol is determined, and, next, communications station #1 transmits a reference symbol from antenna unit α and each antenna unit, and the communication state of the reference symbol transmitted from antenna unit α and the communication state of the reference symbol transmitted from each antenna unit are obtained from communications station #2, then the data symbol is transmitted, and one more antenna unit (antenna unit γ) is determined, whereby communications station #2 can achieve the advantageous effect of high data reception quality. Note that, here, the multiplication coefficient to be used by the transceiving antenna may also be determined.

Next, an example of a transmission frame of communications station #1 and communications station #2 in the time axis will be given with respect to "Example 2 of communication between communications station #1 and communications station #2".

Figure 55:
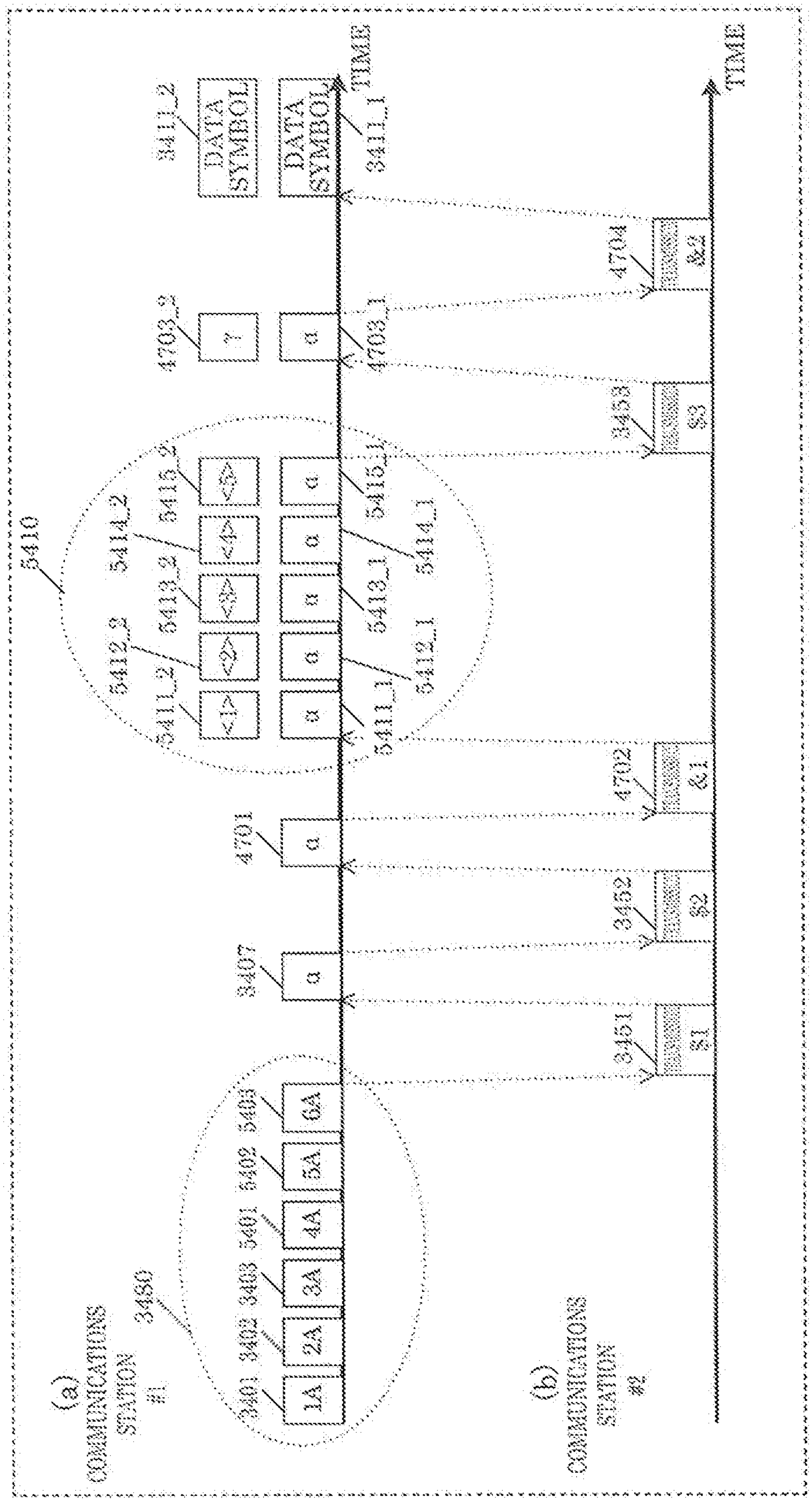
FIG. 55 illustrates an example of transmission frame communication between communications station #1 and communications station #2.

FIG. 55 illustrates an example of a transmission frame of communications station #1 and communications station #2 in the time axis that is different from the example illustrated in FIG. 34. In (a) in FIG. 55, the transmission frame of communications station #1 in the time axis is shown, and in (b) in FIG. 55, the transmission frame of communications station #2 in the time axis is shown. Note that in (a) and (b) in FIG. 55, symbols may also be present in the frequency axis.

Operations in FIG. 55 that are the same as in FIG. 34, FIG. 47, and FIG. 54 share like reference marks.

As illustrated in FIG. 55, first, communications station #1 transmits antenna settings symbol group 3401 from #1A antenna unit 5103_1, and then transmits antenna settings symbol group 3402 from #2A antenna unit 5103_2, antenna settings symbol group 3403 from #3A antenna unit 5103_3, antenna settings symbol group 5401 from #4A antenna unit 5103_4, antenna settings symbol group 5402 from #5A antenna unit 5103_5, and antenna settings symbol group 5403 from #6A antenna unit 5103_6. Note that these symbol groups are collectively referred to as antenna settings symbol group 3480.

Communications station #2 receives antenna settings symbol group 3480 transmitted by communications station #1. Then, for example, communications station #2 compares the reception field intensity in antenna settings symbol group 3401 transmitted using #1A antenna unit 5103_1, the reception field intensity in antenna settings symbol group 3402 transmitted using #2A antenna unit 5103_2, the reception field intensity in antenna settings symbol group 3403 transmitted using #3A antenna unit 5103_3, the reception field intensity in antenna settings symbol group 5401 transmitted using #4A antenna unit 5103_4, the reception field intensity in antenna settings symbol group 5402 transmitted using #5A antenna unit 5103_5, and the reception field intensity in antenna settings symbol group 5403 transmitted using #6A antenna unit 5103_6, estimates the antenna unit of communications station #1 whose reception field intensity will increase, and selects an antenna unit that it wants communications station #1 to use to transmit the modulated signal. Then, communications station #2 transmits antenna-related symbol group $1(3451) including information on the selected antenna unit.

Communications station #1 receives antenna-related symbol group $1(3451) transmitted by communications station #2, and based on "information on the selected antenna unit" included in antenna-related symbol group $1(3451) transmitted by communications station #2, determines an antenna unit to be used for modulated signal transmission (i.e., antenna unit α), and transmits antenna settings symbol group 3407 from antenna unit α.

Using #1X antenna unit 5201_1, #2X antenna unit 5201_2, #3X antenna unit 5201_3, #4X antenna unit 5201_4, #5X antenna unit 5201_5, and #6X antenna unit 5201_6, communications station #2 receives antenna settings symbol group 3407 transmitted by communications station #1, and determines one reception antenna unit to be used for reception. Note that, here, the antenna unit determined to be used for reception is named "determined antenna unit β", as described above.

Communications station #2 transmits antenna-related symbol group $2(3452) to notify communications station #1 that one reception antenna unit to be used for reception has been determined. Here, antenna-related symbol group $2(3452) may include information on the determined reception antenna.

Communications station #1 receives antenna-related symbol group $2(3452) transmitted by communications station #2, and is thereby notified of the determination of one antenna unit to be used by communications station #2 for reception. With this, the one antenna unit to be used by communications station #1 for transmission and the one antenna unit to be used by communications station #2 are determined.

As described before, each antenna unit (transmitting antenna unit) included in communications station #1 is configured as shown in FIG. 39, and each antenna unit (each reception antenna unit) included in communications station #2 is configured as shown in FIG. 40.

Communications station #1 receives, with a frame configuration such as illustrated in FIG. 41 and/or FIG. 42 described above, multiplication coefficient settings symbol group 4701 from antenna unit α. Note that as description of the frame configurations illustrated in FIG. 41 and FIG. 42 has been given above, repetition will be omitted here. Antenna ID symbols 4101, 4201, 4202 . . . in FIG. 41 and FIG. 42 include, for example, information on an ID related to antenna unit α. Then, the multiplication coefficient set to be used by the antenna unit in FIG. 39 is switched, and reference signals 4102-1, 4102-2, 4102-3 . . . are transmitted. Note that details regarding this are as described above.

Then, from the communication states of these reference signals (multiplication coefficient settings symbol group 4701), communications station #2 estimates "the multiplication coefficient for antenna unit α in communications station #1" for achieving favorable reception quality. Then, communications station #2 transmits, to communications station #1, information related to "the multiplication coefficient for antenna unit α in communications station #1" for achieving favorable reception quality (i.e., transmission &1(4702) in FIG. 47).

Additionally, communications station #2 receives multiplication coefficient settings symbol group 4701 and thus estimates a favorable multiplication coefficient to be used in an antenna configuration unit such as in FIG. 40. Then, communications station #2 sets the multiplication coefficient to be used by antenna unit β.

In accordance with the following rules, communications station #1 "transmits antenna settings symbol group 5411_1 from antenna unit α, transmits antenna settings symbol group <1>5411_2, transmits antenna settings symbol group 5412_1 from antenna unit α, transmits antenna settings symbol group <2>5412_2, transmits antenna settings symbol group 5413_1 from antenna unit α, transmits antenna settings symbol group <3>5413_2, transmits antenna settings symbol group 5414_1 from antenna unit α, transmits antenna settings symbol group <4>5414_2, transmits antenna settings symbol group 5415_1 from antenna unit α, and transmits antenna settings symbol group <5>5415_2". Note that these symbol groups are collectively referred to as antenna settings symbol group set 5410.

Rule: communications station #1 "transmits antenna settings symbol group 5411_1 from determined antenna unit α and transmits antenna settings symbol group <1>5411_2 from antenna unit g1". Then, communications station #1 "transmits antenna settings symbol group 5412_1 from determined antenna unit α and transmits antenna settings symbol group <2>5412_2 from antenna unit g2", "transmits antenna settings symbol group 5413_1 from determined antenna unit α and transmits antenna settings symbol group <3>5413_2 from antenna unit g3", "transmits antenna settings symbol group 5414_1 from determined antenna unit α and transmits antenna settings symbol group <4>5414_2 from antenna unit g4", and "transmits antenna settings symbol group 5415_1 from determined antenna unit α and transmits antenna settings symbol group <5>5415_2 from antenna unit g5".

Note that antenna settings symbol group 5411_1 may be transmitted from determined antenna unit α and antenna settings symbol group <1>5411_2 may be transmitted from antenna unit g1, and then antenna settings symbol group <2>5412_2 may be transmitted from antenna unit g2, antenna settings symbol group <3>5413_2 may be transmitted from antenna unit g3, antenna settings symbol group <4>5414_2 may be transmitted from antenna unit g4, and antenna settings symbol group <5>5415_2 may be transmitted from antenna unit g5. Here, the symbol transmission order is not limited to these examples.

Note that antenna unit α, antenna unit g1, antenna unit g2, antenna unit g3, antenna unit g4, and antenna unit g5 are each any one of #1A antenna unit 5103_1, #2A antenna unit 5103_2, #3A antenna unit 5103_3, #4A antenna unit 5103_4, #5A antenna unit 5103_5, or #6A antenna unit 5103_6, and antenna unit α is an antenna different from any of antenna unit g1, antenna unit g2, antenna unit g3, antenna unit g4, and antenna unit g5. Note that i is an integer that is greater than or equal to 1 and less than or equal to 5. j is an integer that is greater than or equal to 1 and less than or equal to 5, i≠j, and in all instances of i and j that satisfy this, antenna gi and antenna gj are different.

Note that the configuration method of antenna settings symbol group set 5410 is as described above with reference to FIG. 35 and FIG. 36.

Communications station #2 receives antenna settings symbol group set 5410 transmitted by communications station #1. Then, communications station #2 "determines one antenna unit to transmit the modulated signal, to be used at the same time as antenna unit α by communications station #1". Note that the antenna unit determined to be used for transmission is named "determined antenna unit γ".

Communications station #2 newly determines one reception antenna unit to be used. Note that, here, the antenna unit determined to be used for reception is named "antenna unit δ", just as described above.

Communications station #2 transmits, to communications station #1, antenna-related symbol group $3(3453) including "information on an antenna for modulated signal transmission by communications station #1 (i.e., information on determined antenna unit γ)". Here, antenna-related symbol group $3(3453) may include information on the determined reception antenna.

Note that the antenna unit determination method is as described with reference to FIG. 35 and FIG. 36.

Communications station #1 transmits multiplication coefficient settings symbol group 4703_1 from antenna unit α and multiplication coefficient settings symbol group 4703_2 from antenna unit γ. Here, these symbol groups are configured as illustrated in, for example, FIG. 43, FIG. 44, FIG. 45, and FIG. 46, and details regarding operations pertaining thereto are as described above.

Communications station #2 estimates the communication state from the reference signals illustrated in FIG. 43, FIG. 44, FIG. 45, and FIG. 46, and estimates a favorable "multiplication coefficient for antenna unit γ in communications station #1". Then, communications station #2 transmits, to communications station #1, information related to "the multiplication coefficient for antenna unit γ in communications station #1" for achieving favorable reception quality (i.e., transmission &2(4704) in FIG. 47).

Additionally, communications station #2 estimates a multiplication coefficient to be used by antenna unit δ in such an antenna unit as illustrated in FIG. 40, by receiving multiplication coefficient settings symbol group 4703_1 from antenna unit α and multiplication coefficient settings symbol group 4703_2 from antenna unit γ. Then, communications station #2 sets the multiplication coefficient to be used by antenna unit δ.

Communications station #1 receives transmission &2(4704) transmitted by communications station #2, determines that the setting of the antenna is complete, and transmits data symbol group 3411_1 and data symbol group 3411_2. Here, data symbol group 3411_1 and data symbol group 3411_2 are transmitted at the same frequency and at the same time. In other words, they are transmitted using the MIMO transmission method exemplified in Embodiment 1. Then, the antennas to be used for modulated signal transmission by communications station #1 are antenna unit α and antenna unit γ. Note that although not recited in the description of data symbol group 3411_1 and data symbol group 3411_2, data symbol group 3411_1 and data symbol group 3411_2 may include symbols other than data symbols, such as symbols from transmitting control information, preambles, pilot symbols, and reference symbols.

Next, "Example 3 of communication between communications station #1 and communications station #2" will be described.

Example 3 of Communication Between Communications Station #1 and Communications Station #2

Step ST56-1: (See FIG. 56)

Communications station #1 transmits a signal from #1A antenna unit 5103_1 illustrated in FIG. 51. Then, communications station #1 transmits a signal from #2A antenna unit 5103_2, transmits a signal from #3A antenna unit 5103_3, transmits a signal from #4A antenna unit 5103_4, transmits a signal from #5A antenna unit 5103_5, and transmits a signal from #6A antenna unit 5103_6.

Step ST56-2: (See FIG. 56)

Communications station #2 receives the modulated signals transmitted in Step ST56-1, and determines "one of #1A antenna unit 5103_1, #2A antenna unit 5103_2, #3A antenna unit 5103_3, #4A antenna unit 5103_4, #5A antenna unit 5103_5, and #6A antenna unit 5103_6 as an antenna for modulated signal transmission by communications station #1". Note that, here, the antenna unit determined to be used for the transmission is named "determined antenna unit α".

Communications station #2 receives the signal transmitted from antenna unit α by communications station #1, and determines one of #1X antenna unit 5201_1, #2X antenna unit 5201_2, #3X antenna unit 5201_3, #4X antenna unit 5201_4, #5X antenna unit 5201_5, and #6X antenna unit 5201_6 illustrated in FIG. 52 as a reception antenna unit to be used for reception. Note that, here, the antenna unit determined to be used for reception is named "determined antenna unit β".

Step ST56-3: (See FIG. 56)

Communications station #1 is notified that one reception antenna unit to be used for reception has been determined. Here, communications station #1 may be notified with information on the determined reception antenna.

Step ST56-4: (See FIG. 56)

Communications station #1 transmits a signal in accordance with the following rules.

Rule: communications station #1 "transmits a signal from determined antenna unit α and antenna unit g1". Then, communications station #1 "transmits a signal from determined antenna unit α and antenna unit g2", "transmits a signal from determined antenna unit α and antenna unit g3", "transmits a signal from determined antenna unit α and antenna unit g4", and "transmits a signal from determined antenna unit α and antenna unit g5".

Note that communications station #1 may transmit a signal from determined antenna unit α and antenna unit g1, and then transmit a signal from antenna unit g2, transmit a signal from antenna unit g3, transmit a signal from antenna unit g4, and transmit a signal from antenna unit g5.

Note that antenna unit α, antenna unit g1, antenna unit g2, antenna unit g3, antenna unit g4, and antenna unit g5 are each any one of #1A antenna unit 5103_1, #2A antenna unit 5103_2, #3A antenna unit 5103_3, #4A antenna unit 5103_4, #5A antenna unit 5103_5, or #6A antenna unit 5103_6, and antenna unit α is an antenna different from any of antenna unit g1, antenna unit g2, antenna unit g3, antenna unit g4, and antenna unit g5. Note that i is an integer that is greater than or equal to 1 and less than or equal to 5. j is an integer that is greater than or equal to 1 and less than or equal to 5, i≠j, and in all instances of i and j that satisfy this, antenna gi and antenna gj are different.

Step ST56-5: (See FIG. 56)

Communications station #2:

"determines one antenna unit to transmit the modulated signal, to be used at the same time as antenna unit $\alpha$ by communications station #1". Note that the antenna unit determined to be used for transmission is named "determined antenna unit $\gamma$".

Communications station #2 newly determines one reception antenna unit that is not antenna unit $\beta$.

Note that the newly determined reception antenna unit is one of #1X antenna unit 5201_1, #2X antenna unit 5201_2, #3X antenna unit 5201_3, #4X antenna unit 5201_4, #5X antenna unit 5201_5, and #6X antenna unit 5201_6.

Step ST56-6: (See FIG. 56)

Communications station #2 transmits, to communications station #1, "information on an antenna for modulated signal transmission by communications station #1 (i.e., information on determined antenna unit $\gamma$)".

Communications station #2 notifies communications station #1 that one reception antenna unit to be used for reception has been newly determined. Communications station #2 may notify communications station #1 with information on the determined reception antenna unit. Note that, here, the antenna unit determined to be used for reception is named "antenna unit $\delta$".

Step ST56-7: (See FIG. 56)

Communications station #1 starts data symbol transmission using antenna unit $\alpha$ and antenna unit $\gamma$. Communications station #1 starts transmission of two modulated signals using antenna unit $\alpha$ and antenna unit $\gamma$.

Example 3 of communication between communications station #1 and communications station #2 has been described with reference to FIG. 56, but the processing in FIG. 32 may be inserted at <P> in FIG. 56, and the processing in FIG. 33 may be inserted at <Q> in FIG. 56. In such a case, communication between communications station #1 and communications station #2 is as described above.

Figure 57:
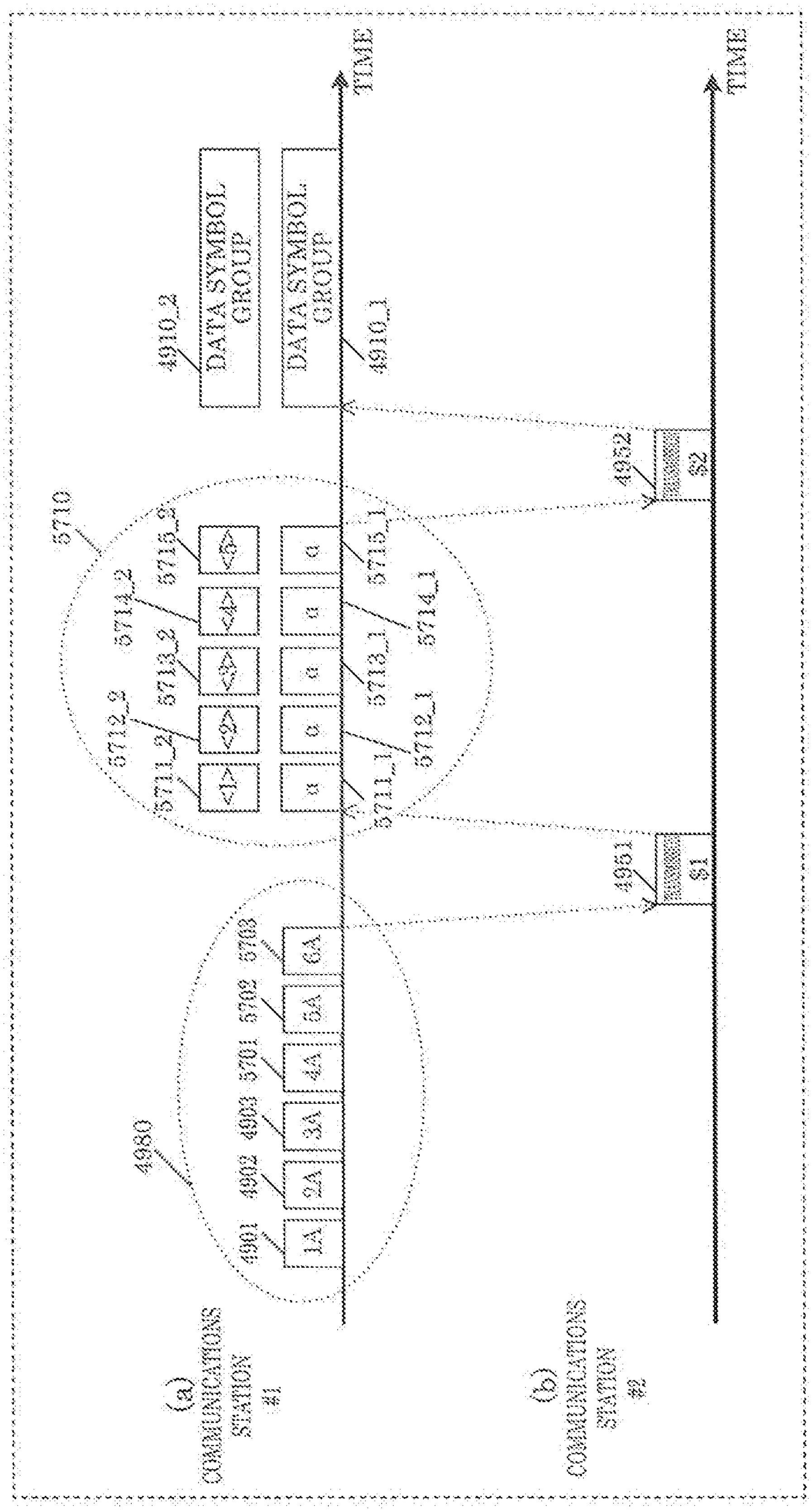
FIG. 57 illustrates an example of transmission frame communication between communications station #1 and communications station #2.

FIG. 57 illustrates an example of a transmission frame of communications station #1 and communications station #2 in the time axis based on FIG. 56. In (a) in FIG. 57, the transmission frame of communications station #1 in the time axis is shown, and in (b) in FIG. 57, the transmission frame of communications station #2 in the time axis is shown. Note that in (a) and (b) in FIG. 57, symbols may also be present in the frequency axis.

As illustrated in FIG. 57, first, communications station #1 transmits antenna settings symbol group 4901 from #1A antenna unit 5103_1, and then transmits antenna settings symbol group 4902 from #2A antenna unit 5103_2, antenna settings symbol group 4903 from #3A antenna unit 5103_3, antenna settings symbol group 5701 from #4A antenna unit 5103_4, antenna settings symbol group 5702 from #5A antenna unit 5103_5, and antenna settings symbol group 5703 from #6A antenna unit 5103_6. Note that these symbol groups are collectively referred to as antenna settings symbol group 4980.

Communications station #2 receives antenna settings symbol group 4980 transmitted by communications station #1. Then, for example, communications station #2 compares the reception field intensity in antenna settings symbol group 4901 transmitted using #1A antenna unit 5103_1, the reception field intensity in antenna settings symbol group 4902 transmitted using #2A antenna unit 5103_2, the reception field intensity in antenna settings symbol group 4903 transmitted using #3A antenna unit 5103_3, the reception field intensity in antenna settings symbol group 4904 transmitted using #4A antenna unit 5103_4, the reception field intensity in antenna settings symbol group 5701 transmitted using #5A antenna unit 5103_5, and the reception field intensity in antenna settings symbol group 5703 transmitted using #6A antenna unit 5103_6, estimates the antenna unit of communications station #1 whose reception field intensity will increase, and selects an antenna unit that it wants communications station #1 to use to transmit the modulated signal. Then, communications station #2 transmits antenna-related symbol group $1(4951) including information on the selected antenna unit.

Using #1X antenna unit 5201_1, #2X antenna unit 5201_2, #3X antenna unit 5201_3, #4X antenna unit 5201_4, #5X antenna unit 5201_5, and #6X antenna unit 5201_6, communications station #2 receives antenna settings symbol group 4980 transmitted by communications station #1. Communications station #2 then determines an antenna unit to be used for reception. Note that the determined antenna unit is referred to as antenna unit @.

Communications station #1 receives antenna-related symbol group $1(4951) transmitted by communications station #2, and based on "information on the selected antenna unit" included in antenna-related symbol group $1(4951) transmitted by communications station #2, determines an antenna unit to be used for modulated signal transmission (i.e., antenna unit $\alpha$).

With this, the one antenna unit to be used by communications station #1 for transmission and the one antenna unit to be used by communications station #2 are determined.

In accordance with the following rules, communications station #1 "transmits antenna settings symbol group 5411_1 from antenna unit $\alpha$, transmits antenna settings symbol group <1>5411_2, transmits antenna settings symbol group 5412_1 from antenna unit $\alpha$, transmits antenna settings symbol group <2>5412_2, transmits antenna settings symbol group 5413_1 from antenna unit $\alpha$, transmits antenna settings symbol group <3>5413_2, transmits antenna settings symbol group 5414_1 from antenna unit $\alpha$, transmits antenna settings symbol group <4>5414_2, transmits antenna settings symbol group 5415_1 from antenna unit $\alpha$, and transmits antenna settings symbol group <5>5415_2". Note that these symbol groups are collectively referred to as antenna settings symbol group set 5710.

Rule: communications station #1 "transmits antenna settings symbol group 5411_1 from determined antenna unit $\alpha$ and transmits antenna settings symbol group <1>5411_2 from antenna unit g1". Then, communications station #1 "transmits antenna settings symbol group 5412_1 from determined antenna unit $\alpha$ and transmits antenna settings symbol group <2>5412_2 from antenna unit g2", "transmits antenna settings symbol group 5413_1 from determined antenna unit $\alpha$ and transmits antenna settings symbol group <3>5413_2 from antenna unit g3", "transmits antenna settings symbol group 5414_1 from determined antenna unit $\alpha$ and transmits antenna settings symbol group <4>5414_2 from antenna unit g4", and "transmits antenna settings symbol group 5415_1 from determined antenna unit $\alpha$ and transmits antenna settings symbol group <5>5415_2 from antenna unit g5".

Note that antenna settings symbol group 5411_1 may be transmitted from determined antenna unit $\alpha$ and antenna settings symbol group <1>5411_2 may be transmitted from antenna unit g1, and then antenna settings symbol group <2>5412_2 may be transmitted from antenna unit g2, antenna settings symbol group <3>5413_2 may be transmitted from antenna unit g3, antenna settings symbol group <4>5414_2 may be transmitted from antenna unit g4, and antenna settings symbol group <5>5415_2 may be transmitted from antenna unit g5.

Note that antenna unit α, antenna unit g1, antenna unit g2, antenna unit g3, antenna unit g4, and antenna unit g5 are each any one of #1A antenna unit 5103_1, #2A antenna unit 5103_2, #3A antenna unit 5103_3, #4A antenna unit 5103_4, #5A antenna unit 5103_5, or #6A antenna unit 5103_6, and antenna unit α is an antenna different from any of antenna unit g1, antenna unit g2 and antenna unit α, antenna unit g3, antenna unit g4, and antenna unit g5. Note that i is an integer that is greater than or equal to 1 and less than or equal to 5. j is an integer that is greater than or equal to 1 and less than or equal to 5, i≠j, and in all instances of i and j that satisfy this, antenna gi and antenna gj are different.

Here, the symbol transmission order is not limited to these examples.

Moreover, communications station #1 transmits antenna settings symbol group 5711_1 from antenna unit α and transmits antenna settings symbol group <1>5711_2. Communications station #1 transmits antenna settings symbol group 5712_1 from antenna unit α and transmits antenna settings symbol group <2>5712_2. Communications station #1 transmits antenna settings symbol group 5713_1 from antenna unit α and transmits antenna settings symbol group <3>5713_2. Communications station #1 transmits antenna settings symbol group 5714_1 from antenna unit α and transmits antenna settings symbol group <4>5714_2. Communications station #1 transmits antenna settings symbol group 5715_1 from antenna unit α and transmits antenna settings symbol group <5>5715_2. Here, these symbol groups are configured as illustrated in, for example, FIG. 36 and FIG. 37, and details regarding operations pertaining thereto are as described above.

Communications station #2 estimates the communication state from the reference signals illustrated in FIG. 36 and FIG. 37, and estimates a favorable "antenna unit γ in communications station #1". Then, communications station #2 transmits, to communications station #1, information related to "antenna unit γ in communications station #1" for achieving favorable reception quality (i.e., "transmission $2(4952)" in FIG. 57).

Moreover, communications station #2 receives antenna settings symbol group set 5710 transmitted by communications station #1. Communications station #2 then determines a new antenna unit to be used for reception. Note that the determined antenna unit is referred to as antenna unit δ.

Communications station #1 receives "transmission $2(4952)" transmitted by communications station #2, and obtains information on transmitting antenna unit γ to be used by communications station #1. Additionally, communications station #1 determines that the setting of the antenna is complete, and transmits data symbol group 4910_1 and data symbol group 4910_2. Here, data symbol group 4910_1 and data symbol group 4910_2 are transmitted at the same frequency and at the same time. In other words, they are transmitted using the MIMO transmission method exemplified in Embodiment 1. Then, the antennas to be used for modulated signal transmission by communications station #1 are antenna unit α and antenna unit γ. Note that although not recited in the description of data symbol group 4910_1 and data symbol group 4910_2, data symbol group 4910_1 and data symbol group 4910_2 may include symbols other than data symbols, such as symbols from transmitting control information, preambles, pilot symbols, and reference symbols.

Next, operations in FIG. 57 different from those described above will be described.

As illustrated in FIG. 57, first, communications station #1 transmits antenna settings symbol group 4901 from #1A antenna unit 5103_1, and then transmits antenna settings symbol group 4902 from #2A antenna unit 5103_2, antenna settings symbol group 4903 from #3A antenna unit 5103_3, antenna settings symbol group 5701 from #4A antenna unit 5103_4, antenna settings symbol group 5702 from #5A antenna unit 5103_5, and antenna settings symbol group 5703 from #6A antenna unit 5103_6. Note that these symbol groups are collectively referred to as antenna settings symbol group 4980.

As described before, each antenna unit (transmitting antenna unit) included in communications station #1 is configured as shown in FIG. 39, and each antenna unit (each reception antenna unit) included in communications station #2 is configured as shown in FIG. 40.

Communications station #1 transmits antenna settings symbol group 4901, antenna settings symbol group 4902, antenna settings symbol group 4903, antenna settings symbol group 5701, antenna settings symbol group 5702, and antenna settings symbol group 5703 having a frame configuration such as illustrated in FIG. 41 and FIG. 42 and described above. Note that as description of the frame configurations illustrated in FIG. 41 and FIG. 42 has been given above, repetition will be omitted here. The transmission method of antenna ID symbols 4101, 4201, 4202 . . . and the transmission method of reference signals 4102-1, 4102-2, 4102-3 . . . illustrated in FIG. 41 and FIG. 42 are as described above, and each antenna settings symbol group includes an antenna ID symbol and a reference symbol.

Communications station #2 receives antenna settings symbol group 4980 transmitted by communications station #1. Then, for example, communications station #2 compares the reception field intensity per multiplication coefficient application in antenna settings symbol group 4901 transmitted using #1A antenna unit 5103_1, the reception field intensity per multiplication coefficient application in antenna settings symbol group 4902 transmitted using #2A antenna unit 5103_2, the reception field intensity per multiplication coefficient application in antenna settings symbol group 4903 transmitted using #3A antenna unit 5103_3, the reception field intensity per multiplication coefficient application in antenna settings symbol group 5701 transmitted using #4X antenna unit 5103_4, the reception field intensity per multiplication coefficient application in antenna settings symbol group 5702 transmitted using #5X antenna unit 5103_5, and the reception field intensity per multiplication coefficient application in antenna settings symbol group 5703 transmitted using #6X antenna unit 5103_6, estimates a multiplication coefficient set and the antenna unit of communications station #1 whose reception field intensity will increase, and selects an antenna unit and a multiplication coefficient set that it wants communications station #1 to use to transmit the modulated signal. Then, communications station #2 transmits antenna-related symbol group $1(4951) including information on the selected antenna unit and information on the selected multiplication coefficient set.

Using #1X antenna unit 5201_1, #2X antenna unit 5201_2, #3X antenna unit 5201_3, #4X antenna unit 5201_4, #5X antenna unit 5201_5, and #6X antenna unit 5201_6, communications station #2 receives antenna settings symbol group 4980 transmitted by communications station #1. Here, since communications station #2 includes the antenna units illustrated in FIG. 40, the antenna settings symbol groups are received while changing the coefficients for each antenna unit. Communications station #2 then determines an antenna unit to be used for reception, and determines a coefficient to be used by the determined antenna unit. Note that the determined antenna unit is referred to as antenna unit $\beta$.

Communications station #1 receives antenna-related symbol group $1(4951) transmitted by communications station #2, and based on "information on the selected antenna unit and information on the selected multiplication coefficient set" included in antenna-related symbol group $1(4951) transmitted by communications station #2, determines an antenna unit to be used for modulated signal transmission (i.e., antenna unit $\alpha$), and additionally determines a multiplication coefficient.

With this, the one antenna unit to be used by communications station #1 for transmission and the multiplication coefficient therefore, as well as the one antenna unit to be used by communications station #2 and the multiplication coefficient therefore are determined.

In accordance with the following rules, communications station #1 "transmits antenna settings symbol group 5711_1 from antenna unit $\alpha$, transmits antenna settings symbol group <1>5711_2, transmits antenna settings symbol group 5712_1 from antenna unit $\alpha$, transmits antenna settings symbol group <2>5712_2, transmits antenna settings symbol group 5713_1 from antenna unit $\alpha$, transmits antenna settings symbol group <3>5713_2, transmits antenna settings symbol group 5714_1 from antenna unit $\alpha$, transmits antenna settings symbol group <4>5714_2, transmits antenna settings symbol group 5715_1 from antenna unit $\alpha$, and transmits antenna settings symbol group <5>5715_2". Note that these symbol groups are collectively referred to as antenna settings symbol group set 5710.

Rule: communications station #1 "transmits antenna settings symbol group 5711_1 from determined antenna unit $\alpha$ and transmits antenna settings symbol group <1>5711_2 from antenna unit g1". Then, communications station #1 "transmits antenna settings symbol group 5712_1 from determined antenna unit $\alpha$ and transmits antenna settings symbol group <2>5712_2 from antenna unit g2", "transmits antenna settings symbol group 5713_1 from determined antenna unit $\alpha$ and transmits antenna settings symbol group <3>5713_2 from antenna unit g3", "transmits antenna settings symbol group 5714_1 from determined antenna unit $\alpha$ and transmits antenna settings symbol group <4>5714_2 from antenna unit g4", and "transmits antenna settings symbol group 5715_1 from determined antenna unit $\alpha$ and transmits antenna settings symbol group <5>5715_2 from antenna unit g5".

Note that antenna settings symbol group 5711_1 may be transmitted from determined antenna unit $\alpha$ and antenna settings symbol group <1>5711_2 transmitted from antenna unit g1, and then antenna settings symbol group <2>5712_2 may be transmitted from antenna unit g2, antenna settings symbol group <3>5713_2 may be transmitted from antenna unit g3, antenna settings symbol group <4>5714_2 may be transmitted from antenna unit g4, and antenna settings symbol group <5>5715_2 may be transmitted from antenna unit g5.

Note that antenna unit $\alpha$, antenna unit g1, antenna unit g2, antenna unit g3, antenna unit g4, and antenna unit g5 are each any one of #1A antenna unit 5103_1, #2A antenna unit 5103_2, #3A antenna unit 5103_3, #4A antenna unit 5103_4, #5A antenna unit 5103_5, or #6A antenna unit 5103_6, and antenna unit $\alpha$ is an antenna different from any of antenna unit g1, antenna unit g2, antenna unit g3, antenna unit g4, and antenna unit g5. Note that i is an integer that is greater than or equal to 1 and less than or equal to 5. j is an integer that is greater than or equal to 1 and less than or equal to 5, $i \neq j$, and in all instances of i and j that satisfy this, antenna gi and antenna gj are different.

Here, the symbol transmission order is not limited to these examples.

Moreover, communications station #1 transmits antenna settings symbol group 5711_1 from antenna unit $\alpha$ and transmits antenna settings symbol group <1>5711_2. Communications station #1 transmits antenna settings symbol group 5712_1 from antenna unit $\alpha$ and transmits antenna settings symbol group <2>5712_2. Communications station #1 transmits antenna settings symbol group 5713_1 from antenna unit $\alpha$ and transmits antenna settings symbol group <3>5713_2. Communications station #1 transmits antenna settings symbol group 5714_1 from antenna unit $\alpha$ and transmits antenna settings symbol group <4>5714_2. Communications station #1 transmits antenna settings symbol group 5715_1 from antenna unit $\alpha$ and transmits antenna settings symbol group <5>5715_2. Here, these symbol groups are configured as illustrated in, for example, FIG. 43, FIG. 44, FIG. 45, and FIG. 46, and details regarding operations pertaining thereto are as described above.

Communications station #2 estimates the communication state from the reference signals illustrated in FIG. 43, FIG. 44, FIG. 45, and FIG. 46, and estimates a favorable "multiplication coefficient for antenna unit $\gamma$ in communications station #1". Then, communications station #2 transmits, to communications station #1, information related to "multiplication coefficient for antenna unit $\gamma$ in communications station #1" for achieving favorable reception quality (i.e., transmission $2(4952) in FIG. 57).

Moreover, communications station #2 receives antenna settings symbol group set 5710 transmitted by communications station #1. Here, since communications station #2 includes the antenna units illustrated in FIG. 40, antenna settings symbol group set 5710 is received while changing the coefficients for each antenna unit. Communications station #2 then determines a new antenna unit to be used for reception, and determines a coefficient to be used by the determined antenna unit. Note that the determined antenna unit is referred to as antenna unit $\delta$.

Communications station #1 receives "transmission $2(4952)" transmitted by communications station #2, and obtains information on transmitting antenna unit $\gamma$ to be used by communications station #1. Additionally, communications station #1 determines that the setting of the antenna is complete, and transmits data symbol group 4910_1 and data symbol group 4910_2. Here, data symbol group 4910_1 and data symbol group 4910_2 are transmitted at the same frequency and at the same time. In other words, they are transmitted using the MIMO transmission method exemplified in Embodiment 1. Then, the antennas to be used for modulated signal transmission by communications station #1 are antenna unit $\alpha$ and antenna unit $\gamma$. Note that although not recited in the description of data symbol group 4910_1 and data symbol group 4910_2, data symbol group 4910_1 and data symbol group 4910_2 may include symbols other than data symbols, such as symbols from transmitting control information, preambles, pilot symbols, and reference symbols.

Figure 58:
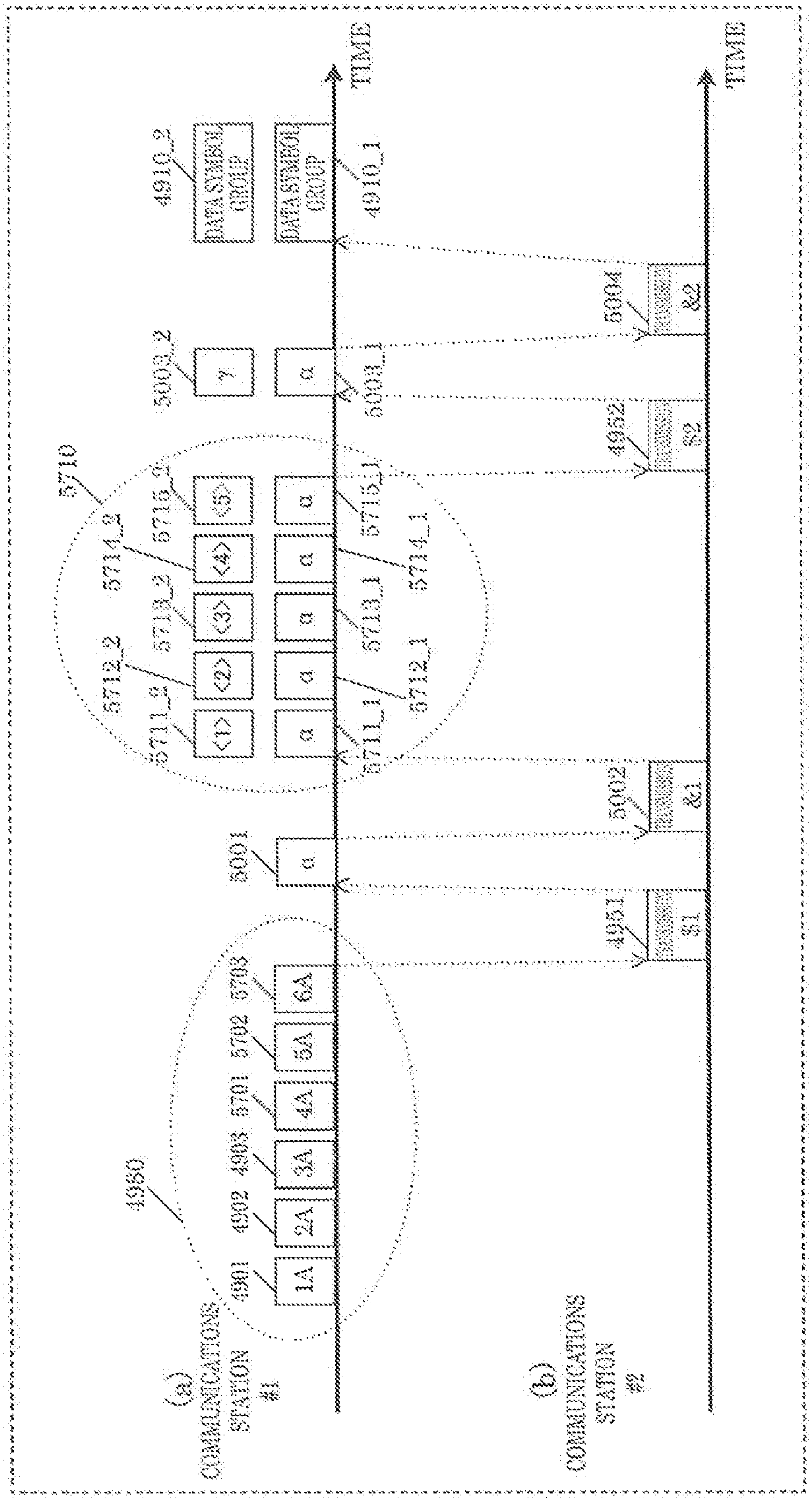
FIG. 58 illustrates an example of transmission frame communication between communications station #1 and communications station #2.

FIG. 58 illustrates an example of a transmission frame of communications station #1 and communications station #2 in the time axis. In (a) in FIG. 58, the transmission frame of communications station #1 in the time axis is shown, and in (b) in FIG. 58, the transmission frame of communications station #2 in the time axis is shown. Note that in (a) and (b) in FIG. 58, symbols may also be present in the frequency axis.

Operations in FIG. 58 that are the same as in FIG. 49, FIG. 50, and FIG. 57 share like reference marks.

As illustrated in FIG. 58, first, communications station #1 transmits antenna settings symbol group 4901 from #1A antenna unit 5103_1, and then transmits antenna settings symbol group 4902 from #2A antenna unit 5103_2, antenna settings symbol group 4903 from #3A antenna unit 5103_3, antenna settings symbol group 5701 from #4A antenna unit 5103_4, antenna settings symbol group 5702 from #5A antenna unit 5103_5, and antenna settings symbol group 5703 from #6A antenna unit 5103_6. Note that these symbol groups are collectively referred to as antenna settings symbol group 4980.

Communications station #2 receives antenna settings symbol group 4980 transmitted by communications station #1. Then, for example, communications station #2 compares the reception field intensity in antenna settings symbol group 4901 transmitted using #1A antenna unit 5103_1, the reception field intensity in antenna settings symbol group 4902 transmitted using #2A antenna unit 5103_2, the reception field intensity in antenna settings symbol group 4903 transmitted using #3A antenna unit 5103_3, the reception field intensity in antenna settings symbol group 4904 transmitted using #4A antenna unit 5103_4, the reception field intensity in antenna settings symbol group 5701 transmitted using #5A antenna unit 5103_5, and the reception field intensity in antenna settings symbol group 5703 transmitted using #6A antenna unit 5103_6, estimates the antenna unit of communications station #1 whose reception field intensity will increase, and selects an antenna unit that it wants communications station #1 to use to transmit the modulated signal. Then, communications station #2 transmits antenna-related symbol group $1(4951) including information on the selected antenna unit.

Using #1X antenna unit 5201_1, #2X antenna unit 5201_2, #3X antenna unit 5201_3, #4X antenna unit 5201_4, #5X antenna unit 5201_5, and #6X antenna unit 5201_6, communications station #2 receives antenna settings symbol group 4980 transmitted by communications station #1. Communications station #2 then determines an antenna unit to be used for reception. Note that the determined antenna unit is referred to as antenna unit @.

Communications station #1 receives antenna-related symbol group $1(4951) transmitted by communications station #2, and is thereby notified of the determination of one antenna unit to be used by communications station #2 for reception. With this, the one antenna unit to be used by communications station #1 for transmission and the one antenna unit to be used by communications station #2 are determined.

As described before, each antenna unit (transmitting antenna unit) included in communications station #1 is configured as shown in FIG. 39, and each antenna unit (each reception antenna unit) included in communications station #2 is configured as shown in FIG. 40.

Communications station #1 receives multiplication coefficient settings symbol group 5001 having a frame configuration such as illustrated in FIG. 41, FIG. 42 described above from antenna unit α. Note that as description of the frame configurations illustrated in FIG. 41 and FIG. 42 has been given above, repetition will be omitted here. Antenna ID symbols 4101, 4201, 4202 . . . in FIG. 41 and FIG. 42 include, for example, information on an ID related to antenna unit α. Then, the multiplication coefficient set to be used by the antenna unit in FIG. 39 is switched, and reference signals 4102-1, 4102-2, 4102-3 . . . are transmitted. Note that details regarding this are as described above.

Then, from the communication states of these reference signals (multiplication coefficient settings symbol group 5001), communications station #2 estimates "the multiplication coefficient for antenna unit α in communications station #1" for achieving favorable reception quality. Then, communications station #2 transmits, to communications station #1, information related to "the multiplication coefficient for antenna unit α in communications station #1" for achieving favorable reception quality (i.e., transmission &1(5002) in FIG. 50).

Additionally, communications station #2 receives multiplication coefficient settings symbol group 5001 and thus estimates a favorable multiplication coefficient to be used in an antenna configuration unit such as in FIG. 40. Then, communications station #2 sets the multiplication coefficient to be used by antenna unit β.

In accordance with the following rules, communications station #1 "transmits antenna settings symbol group 5711_1 from antenna unit α, transmits antenna settings symbol group <1>5711_2, transmits antenna settings symbol group 5712_1 from antenna unit α, transmits antenna settings symbol group <2>5712_2, transmits antenna settings symbol group 5713_1 from antenna unit α, transmits antenna settings symbol group <3>5713_2, transmits antenna settings symbol group 5714_1 from antenna unit α, transmits antenna settings symbol group <4>5714_2, transmits antenna settings symbol group 5715_1 from antenna unit α, and transmits antenna settings symbol group <5>5715_2". Note that these symbol groups are collectively referred to as antenna settings symbol group set 5710.

Rule: communications station #1 "transmits antenna settings symbol group 5711_1 from determined antenna unit α and transmits antenna settings symbol group <1>5711_2 from antenna unit g1". Then, communications station #1 "transmits antenna settings symbol group 5712_1 from determined antenna unit α and transmits antenna settings symbol group <2>5712_2 from antenna unit g2", "transmits antenna settings symbol group 5713_1 from determined antenna unit α and transmits antenna settings symbol group <3>5713_2 from antenna unit g3", "transmits antenna settings symbol group 5714_1 from determined antenna unit α and transmits antenna settings symbol group <4>5714_2 from antenna unit g4", and "transmits antenna settings symbol group 5715_1 from determined antenna unit α and transmits antenna settings symbol group <5>5715_2 from antenna unit g5".

Note that antenna settings symbol group 5711_1 may be transmitted from determined antenna unit α and antenna settings symbol group <1>5711_2 transmitted from antenna unit g1, and then antenna settings symbol group <2>5712_2 may be transmitted from antenna unit g2, antenna settings symbol group <3>5713_2 may be transmitted from antenna unit g3, antenna settings symbol group <4>5714_2 may be transmitted from antenna unit g4, and antenna settings symbol group <5>5715_2 may be transmitted from antenna unit g5.

Note that antenna unit α, antenna unit g1, antenna unit g2, antenna unit g3, antenna unit g4, and antenna unit g5 are each any one of #1A antenna unit 5103_1, #2A antenna unit 5103_2, #3A antenna unit 5103_3, #4A antenna unit 5103_4, #5A antenna unit 5103_5, or #6A antenna unit 5103_6, and antenna unit α is an antenna different from any of antenna unit g1, antenna unit g2, antenna unit g3, antenna unit g4, and antenna unit g5. Note that i is an integer that is greater than or equal to 1 and less than or equal to 5. j is an integer that is greater than or equal to 1 and less than or equal to 5, i≠j, and in all instances of i and j that satisfy this, antenna gi and antenna gj are different.

Here, the symbol transmission order is not limited to these examples.

Moreover, communications station #1 transmits antenna settings symbol group 5711_1 from antenna unit α and transmits antenna settings symbol group <1>5711_2. Communications station #1 transmits antenna settings symbol group 5712_1 from antenna unit α and transmits antenna settings symbol group <2>5712_2. Communications station #1 transmits antenna settings symbol group 5713_1 from antenna unit α and transmits antenna settings symbol group <3>5713_2. Communications station #1 transmits antenna settings symbol group 5714_1 from antenna unit α and transmits antenna settings symbol group <4>5714_2. Communications station #1 transmits antenna settings symbol group 5715_1 from antenna unit α and transmits antenna settings symbol group <5>5715_2. Here, these symbol groups are configured as illustrated in, for example, FIG. 36 and FIG. 37, and details regarding operations pertaining thereto are as described above.

Communications station #2 estimates the communication state from the reference signals illustrated in FIG. 36 and FIG. 37, and estimates a favorable "antenna unit γ in communications station #1". Then, communications station #2 transmits, to communications station #1, information related to "antenna unit γ in communications station #1" for achieving favorable reception quality (i.e., "transmission $2(4952)" in FIG. 57).

Communications station #1 transmits multiplication coefficient settings symbol group 5003_1 from antenna unit α and multiplication coefficient settings symbol group 5003_2 from antenna unit γ. Here, these symbol groups are configured as illustrated in, for example, FIG. 43, FIG. 44, FIG. 45, and FIG. 46, and details regarding operations pertaining thereto are as described above.

Communications station #2 estimates the communication state from the reference signals illustrated in FIG. 43, FIG. 44, FIG. 45, and FIG. 46, and estimates a favorable "multiplication coefficient for antenna unit γ in communications station #1". Then, communications station #2 transmits, to communications station #1, information related to "the multiplication coefficient for antenna unit γ in communications station #1" for achieving favorable reception quality (i.e., transmission &2(5004) in FIG. 50).

Additionally, communications station #2 estimates a multiplication coefficient to be used by antenna unit δ in such an antenna unit as illustrated in FIG. 40, by receiving multiplication coefficient settings symbol group 5003_1 from antenna unit α and multiplication coefficient settings symbol group 5003_2 from antenna unit γ. Then, communications station #2 sets the multiplication coefficient to be used by antenna unit δ.

Communications station #1 receives "transmission &2(5004)" transmitted by communications station #2, and obtains information on transmitting antenna unit γ to be used by communications station #1. Additionally, communications station #1 determines that the setting of the antenna is complete, and transmits data symbol group 4910_1 and data symbol group 4910_2. Here, data symbol group 4910_1 and data symbol group 4910_2 are transmitted at the same frequency and at the same time. In other words, they are transmitted using the MIMO transmission method exemplified in Embodiment 1. Then, the antennas to be used for modulated signal transmission by communications station #1 are antenna unit α and antenna unit γ. Note that although not recited in the description of data symbol group 4910_1 and data symbol group 4910_2, data symbol group 4910_1 and data symbol group 4910_2 may include symbols other than data symbols, such as symbols from transmitting control information, preambles, pilot symbols, and reference symbols.

In this way, first, communications station #1 transmits a reference symbol from each antenna unit in order to determine an antenna unit to be used for transmission, the communication state of each reference symbol is obtained from communications station #2, one antenna unit (antenna unit α) for transmitting the data symbol is determined, and, next, communications station #1 transmits a reference symbol from antenna unit α and each antenna unit, and the communication state of the reference symbol transmitted from antenna unit α and the communication state of the reference symbol transmitted from each antenna unit are obtained from communications station #2, then the data symbol is transmitted, and one more antenna unit (antenna unit γ) is determined, whereby communications station #2 can achieve the advantageous effect of high data reception quality. Note that, here, the multiplication coefficient to be used by the transceiving antenna may also be determined. Moreover, one point of the present disclosure is "performing a plurality of transmissions after a single transmission, and selecting an antenna". In this embodiment, although a number of frame configurations are described, in these frame configurations, symbols may be present on the frequency axis as well.

Note that in data symbol groups 3411_1 and 3411_2 in FIG. 54 and FIG. 55, and in data symbol groups 4910_1 and 4910_2 in FIG. 57 and FIG. 58, communications station #1 may also transmit (ID) information on antenna unit α to be used for transmission, (ID) information on antenna γ to be used for transmission, information related to the coefficient used for antenna unit α, and information related to the coefficient used for antenna unit γ.

Moreover, as illustrated in FIG. 41, FIG. 42, FIG. 43, FIG. 44, FIG. 45, and FIG. 46, when transmission station #1 changes the multiplication coefficient of a transmitting antenna unit and transmits the reference signal, the antenna ID symbols illustrated in FIG. 41 through FIG. 46 may include information related to the multiplication coefficient in addition to information related to the antenna ID. In this case, the information related to the multiplication coefficient may be the multiplied coefficient data itself, and, alternatively, may be information on the ID related to the multiplication coefficient.

For example, "#1" is assigned to a first multiplication coefficient set as an ID related to a multiplication coefficient, "#2" is assigned to a second multiplication coefficient set as an ID related to a multiplication coefficient, and so on.

Then, for example, when the first multiplication coefficient set is used upon generating the reference signal, information corresponding to the ID "#1" is included in the antenna ID symbol, and communications station #1 transmits this antenna ID symbol.

Here, communications station #2 determines the antenna and multiplication coefficient to be used for transmission by communications station #1, that is to say, communications station #2 discerns the antenna and multiplication coefficient based on, for example, information on the antenna ID and (ID) information on the multiplication coefficient transmitted by communications station #1, whereby communications station #2 transmits, to communications station #1, "information on the antenna to be used by communications station #1" as well as "information on the multiplication coefficient ID".

Embodiment 4

In this embodiment, in addition to the code length of the error correction code in Embodiment 1, an implementation method in which it is possible to use an error correction code having a longer code length than the error correction code in Embodiment 1 will be described. Note that, as described above, code length means block length.

In this embodiment, as one example, an implementation method in which an error correction code having a code length of 672 bits and an error correction code having a code length of 1344 (=672×2) bits are used will be described.

The implementation method using the 672 bit code length error correction code is as described in Embodiment 1 with reference to FIG. 1 through FIG. 28, and since this has been described in detail in Embodiment 1, repeated description will be omitted. Hereinafter, information not described in Embodiment 1 will be described.

FIG. 1 illustrates a configuration of a transmission device according to this embodiment. Note that basic operations in FIG. 1 are as described in Embodiment 1. Encoder 151 illustrated in FIG. 1 receives inputs of data 150 and frame configuration signal 113. Here, frame configuration signal 113 includes information on the error correction code to be used, and in particular includes information on the code length (in this embodiment, a block length of 672 bits or a code length of 1344 bits) of the error correction code to be used.

Accordingly, based on frame configuration 113, encoder 151 selects an error correction code including the code length of the error correction code to be used, and, for example, sets the encode rate of the error correction code, error correction encodes data 150, and outputs encoded data 152.

Moreover, the transmission device illustrated in FIG. 1 selects a MIMO transmission method. The implementation method used upon transmitting the modulated signal is as described in Embodiment 1, and therefore description here will be omitted.

Next, just as in Embodiment 1, for example, one example of a frame configuration of a modulated signal transmitted by the transmission device illustrated in FIG. 1 when a multi-carrier transmission method such as OFDM is used is illustrated in FIG. 6.

FIG. 6 illustrates an example of an arrangement of symbols along the horizontal frequency axis, and illustrates a symbol arrangement for two modulated signals transmitted from an antenna different than shown above. For example, FIG. 6 illustrates a configuration example of data carriers (data symbols) and pilot symbols (reference symbols) (indicated as "P" in FIG. 6). Note that FIG. 6 is merely one example; other symbols may be present. Here, a data carrier is a symbol for transmitting data to a partner (communication partner) via MIMO transmission, and a pilot symbol is a symbol for a partner (communication partner) to estimate (channel estimation) propagation fluctuation.

In FIG. 6, as one example, the number of data carriers among the 1OFDM symbols (data carriers on the frequency axis) is 336. Accordingly, at each point in time, data carrier $1 through data carrier $336 are present. A pilot symbol may be inserted between two data carriers. Note that in FIG. 6, time &1 and time &2 differ in regard to pilot carrier insertion position along the frequency axis, but this configuration is not limiting.

In FIG. 6, data carriers are arranged along the frequency axis in the following order: "data carrier $1", "data carrier $2", "data carrier $3", "data carrier $4", "data carrier $5", "data carrier $6", "data carrier $7", "data carrier $8", "data carrier $9", "data carrier $10", "data carrier $11", "data carrier $12", "data carrier $13" . . . "data carrier $330", "data carrier $331", "data carrier $332", "data carrier $333", "data carrier $334", "data carrier $335", and "data carrier $336". In other words, data carriers are assigned with numbers in ascending order along the frequency axis.

Figure 59:
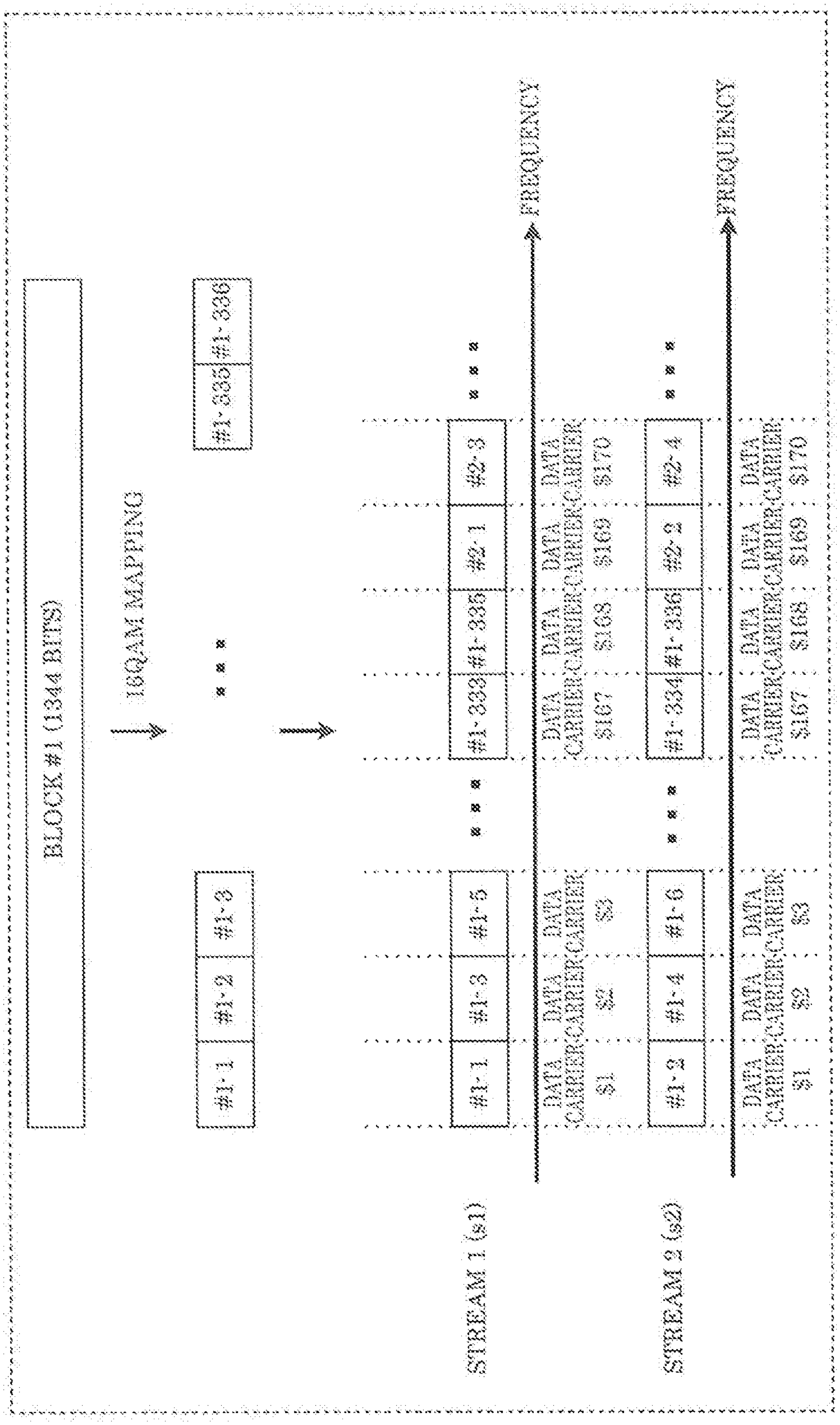
FIG. 59 illustrates an example of an arrangement of symbols in data carriers.

FIG. 59 illustrates an arrangement example of data carriers when the modulation method for stream 1(*s*1(*i*)) and stream 2(*s*2(*i*)) is 16QAM, which is an example of a modulation method in which there are 16 signal points in an in-phase I-orthogonal Q plane. Here, similar to FIG. 7, an N-th block configured of 1344 bits that are error correction encoded is referred to as block #N and denoted as "#N".

When 16QAM is applied, 336 symbols are generated from block #N. In FIG. 59, the 336 symbols generated from block #1 are indicated as "#1-1", "#1-2", "#1-3", "#1-4" . . . "#1-334", "#1-335", and "#1-336". Accordingly, the 336 symbols generated from block #N are expressed as "#N−1", "#N−2", "#N−3", "#N−4" . . . "#N−334", "#N−335", and "#N−336".

Moreover, in FIG. 59, the data carriers are illustrated arranged along the horizontal frequency axis. In stream 1, data carriers from data carrier $1 to data carrier $336 are present, and similarly, in stream 2, data carriers from data carrier $1 to data carrier $336 are present.

Then, data carrier $1 in stream 1 and data carrier $1 in stream 2 are transmitted (from different antennas) at the same frequency and at the same time, and data carrier $2 in stream 1 and data carrier $2 in stream 2 are transmitted (from different antennas) at the same frequency and at the same time. In other words, data carrier $L in stream 1 and data carrier $L in stream 2 are transmitted (from different antennas) at the same frequency and at the same time. L is an integer that is greater than or equal to 1 and less than or equal to 336.

As illustrated in FIG. 59, data carrier $1 in stream 1 is assigned with the symbol "#1-1", data carrier $1 in stream 2 is assigned with the symbol "#1-2", data carrier $2 in stream 1 is assigned with the symbol "#1-3", data carrier $2 in stream 2 is assigned with the symbol "#1-4", data carrier $3 in stream 1 is assigned with the symbol "#1-5", and data carrier $3 in stream 2 is assigned with the symbol "#1-6". The symbols are assigned in accordance with such a rule. Accordingly, the data in block #1 is transmitted from the transmission device using data carrier $1 through $167 in stream 1 and data carrier $1 through $167 in stream 2.

In accordance with the same rule, the data in block #2 is transmitted from the transmission device using data carrier $169 through $336 in stream 1 and data carrier $169 through $336 in stream 2.

This is how the symbols are arranged for time &1. Similarly, when the symbols are arranged, at time &2, the symbols are arranged as follows.

The data in block #3 is transmitted from the transmission device using data carrier $1 through $167 in stream 1 and data carrier $1 through $167 in stream 2.

The data in block #4 is transmitted from the transmission device using data carrier $169 through $336 in stream 1 and data carrier $169 through $336 in stream 2.

Accordingly, at time &M (M is an integer that is greater than or equal to 1), the symbols are arranged as follows.

The data in block #(2M-1) is transmitted from the transmission device using data carrier $1 through $167 in stream 1(*s*1(*i*)) and data carrier $1 through $167 in stream 2.

The data in block #(2M) is transmitted from the transmission device using data carrier $169 through $336 in stream 1(*s*1(*i*)) and data carrier $169 through $336 in stream 2.

Next, consider a case in which the transmission device transmits modulated signals using a frame configuration such as illustrated in FIG. 59. A conceptual illustration of the reception field intensity in a reception device, which is the partner (communication partner) of the transmission device illustrated in FIG. 1, is provided in FIG. 8.

In FIG. 8, as a side effect of multi-path, low portion 801 of the reception field intensity is present. When the transmission device transmits a modulated signal using a frame configuration such as illustrated in FIG. 7, as a side effect of multi-path (low portion 801 of the reception field intensity illustrated in FIG. 8), it is likely that this will cause a phenomenon in which low reception quality symbols are prevalent among the symbols in the same block in the error correction code. This makes it likely that data reception quality will decrease since high error correction performance cannot be achieved.

As another example, consider a frame configuration such as illustrated in FIG. 9. As illustrated in FIG. 9, each data carrier in each stream is assigned with a symbol.

Data carrier $1 in stream 1 is assigned with the symbol "#1-1", data carrier $1 in stream 2 is assigned with the symbol "#2-1", data carrier $2 in stream 1 is assigned with the symbol "#1-2", data carrier $2 in stream 2 is assigned with the symbol "#2-2", data carrier $3 in stream 1 is assigned with the symbol "#1-3", data carrier $3 in stream 2 is assigned with the symbol "#2-3", (recitation for data carrier $4 through data carrier $332 is omitted), data carrier $333 in stream 1 is assigned with the symbol "#1-333", data carrier $333 in stream 2 is assigned with the symbol "#2-333", data carrier $334 in stream 1 is assigned with the symbol "#1-334", data carrier $334 in stream 2 is assigned with the symbol "#2-334", data carrier $335 in stream 1 is assigned with the symbol "#1-335", data carrier $335 in stream 2 is assigned with the symbol "#2-335", data carrier $336 in stream 1 is assigned with the symbol "#1-336", and data carrier $336 in stream 2 is assigned with the symbol "#2-336".

This is how the symbols are arranged for time &1. Accordingly, symbols for odd number data carriers transmit block #1 data, and symbols for even number data carriers transmit block #2 data.

At time &2, the symbols are arranged as follows.

Stream 1 transmits block #3 data and stream 2 transmits block #4 data.

Accordingly, at time &M, the symbols are arranged as follows. M is an integer that is greater than or equal to 1.

Stream 1 transmits block #(2M-1) data and stream 2(*s*2(*i*)) transmits block #(2M) data.

In the case of a frame configuration such as illustrated in FIG. 9, there is a low chance of the phenomenon described in regard to FIG. 8 occurring.

Consider a case in which the precoding matrix is expressed as illustrated in Equation (4), [1] "b is zero and c is zero" or [2] "a is zero and d is zero" or [3] "an absolute value of b and an absolute value of c are extremely lower than an absolute value of a and an absolute value of d", [4] "an absolute value of a and an absolute value of d are extremely lower than an absolute value of b and an absolute value of c". In such a case, when the reception field intensity of stream 1(*s*1(*i*)) of the partner (communication partner) decreases, or when the reception field intensity of stream 2(*s*2(*i*)) of the partner (communication partner) decreases, for example, it is likely that a phenomenon in which, at time &1, the reception quality of block #1 or the reception quality of block #2 decreases will occur.

In order to facilitate understanding of the phenomenon described with reference to FIG. 8 and the phenomenon resulting from a frame configuration such as illustrated in FIG. 9, consider, for example, a frame configuration such as illustrated in FIG. 10. As illustrated in FIG. 10, each data carrier in each stream is assigned with a symbol.

Data carrier $1 in stream 1 is assigned with the symbol "#1-1", data carrier $1 in stream 2 is assigned with the symbol "#1-2", data carrier $2 in stream 1 is assigned with the symbol "#2-1", data carrier $2 in stream 2 is assigned with the symbol "#2-2", data carrier $3 in stream 1 is assigned with the symbol "#1-3", data carrier $3 in stream 2 is assigned with the symbol "#1-4", data carrier $4 in stream 1 is assigned with the symbol "#2-3", data carrier $4 in stream 2 is assigned with the symbol "#2-4", (recitation for data carrier $5 through data carrier $332 is omitted), data carrier $333 in stream 1 is assigned with the symbol "#1-333", data carrier $333 in stream 2 is assigned with the symbol "#1-334", data carrier $334 in stream 1 is assigned with the symbol "#2-333", data carrier $334 in stream 2 is assigned with the symbol "#2-334", data carrier $335 in stream 1 is assigned with the symbol "#1-335", data carrier $335 in stream 2 is assigned with the symbol "#1-336", data carrier $336 in stream 1 is assigned with the symbol "#2-335", and data carrier $336 in stream 2 is assigned with the symbol "#2-336".

This is how the symbols are arranged for time &1. Accordingly, symbols for odd number data carriers transmit block #1 data, and symbols for even number data carriers transmit block #2 data.

At time &2, the symbols are arranged as follows.

Symbols for odd number data carriers transmit block #3 data, and symbols for even number data carriers transmit block #4 data.

Accordingly, at time &M, the symbols are arranged as follows. M is an integer that is greater than or equal to 1.

Symbols for odd number data carriers transmit block #(2M-1) data, and symbols for even number data carriers transmit block #(2M) data.

When the transmission device transmits modulated signals using a frame configuration such as illustrated in FIG. 10, the negative effects caused by low portion 801 of the reception field intensity due to multi-path using FIG. 8 are not likely to be an influence in the case of the frame configuration illustrated in FIG. 59. Moreover, inhibiting a decrease in data reception quality such as described with reference to FIG. 9 is likely. Accordingly, achieving an advantageous effect of an increase in data reception quality is likely.

In order to facilitate understanding of the phenomenon described with reference to FIG. 8 and the phenomenon resulting from a frame configuration such as illustrated in FIG. 9, consider, for example, a frame configuration such as illustrated in FIG. 11.

As illustrated in FIG. 11, each data carrier in each stream is assigned with a symbol.

Data carrier $1 in stream 1 is assigned with the symbol "#1-1",
data carrier $1 in stream 2 is assigned with the symbol "#2-1",
data carrier $2 in stream 1 is assigned with the symbol "#2-2",
data carrier $2 in stream 2 is assigned with the symbol "#1-2",
data carrier $3 in stream 1 is assigned with the symbol "#1-3",
data carrier $3 in stream 2 is assigned with the symbol "#2-3",
data carrier $4 in stream 1 is assigned with the symbol "#2-4",
data carrier $4 in stream 2 is assigned with the symbol "#1-4",
(recitation for data carrier $5 through data carrier $332 is omitted),
data carrier $333 in stream 1 is assigned with the symbol "#1-333",
data carrier $333 in stream 2 is assigned with the symbol "#2-333",
data carrier $334 in stream 1 is assigned with the symbol "#2-334",
data carrier $334 in stream 2 is assigned with the symbol "#1-334",
data carrier $335 in stream 1 is assigned with the symbol "#1-335",
data carrier $335 in stream 2 is assigned with the symbol "#2-335",
data carrier $336 in stream 1 is assigned with the symbol "#2-336", and
data carrier $336 in stream 2 is assigned with the symbol "#1-336".

This is how the symbols are arranged for time &1. Accordingly, symbols for odd number data carriers and stream 1 transmit block #1 data. Symbols for odd number data carriers and stream 2(*s*2(*i*)) transmit block #2 data. Symbols for even number data carriers and stream 1 transmit block #2 data. Symbols for even number data carriers and stream 2 transmit block #1 data.

At time &2, the symbols are arranged as follows.

Symbols for odd number data carriers and stream 1 transmit block #3 data.
Symbols for odd number data carriers and stream 2 transmit block #4 data.
Symbols for even number data carriers and stream 1 transmit block #4 data.
Symbols for even number data carriers and stream 2 transmit block #3 data.

Accordingly, at time &M (M is an integer that is greater than or equal to 1), the symbols are arranged as follows.

Symbols for odd number data carriers and stream 1 transmit block #(2M-1) data.
Symbols for odd number data carriers and stream 2 transmit block #(2M) data.
Symbols for even number data carriers and stream 1 transmit block #(2M) data.
Symbols for even number data carriers and stream 2 transmit block #(2M-1) data.

When the transmission device transmits modulated signals using a frame configuration such as illustrated in FIG. 11, the negative effects caused by low portion 801 of the reception field intensity due to multi-path using FIG. 8 are not likely to be an influence in the case of the frame configuration illustrated in FIG. 59. Moreover, inhibiting a decrease in data reception quality such as described with reference to FIG. 9 is likely. Accordingly, achieving an advantageous effect of an increase in data reception quality is likely.

Next, a configuration of data carriers when the modulation method for stream 1(*s*1(*i*)) and stream 2(*s*2(*i*)) is 64QAM, which is an example of a modulation method in which there are 64 signal points in an in-phase I-orthogonal Q plane, will be described.

Here, similar to FIG. 7, an N-th block configured of 1344 bits that are error correction encoded is referred to as block #N and denoted as "#N".

Figure 60:
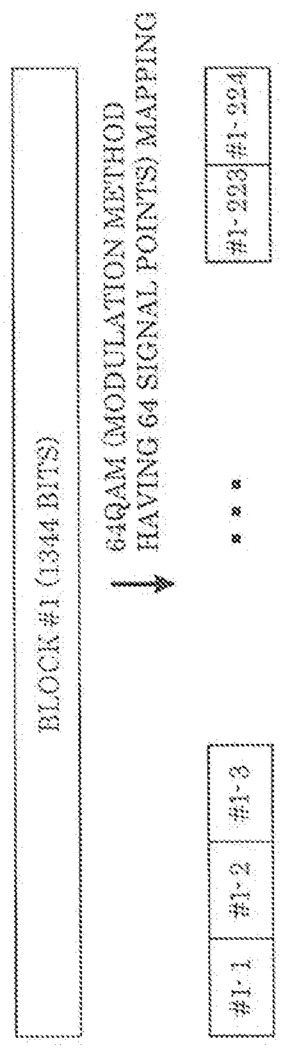
FIG. 60 illustrates an example of symbol generation.

When 64QAM modulation is applied, symbols from block #N through 224 are generated. In FIG. 60, the 224 symbols generated from block #1 are indicated as "#1-1", "#1-2", "#1-3", "#1-4" . . . "#1-222", "#1-223", and "#1-224". Accordingly, the 168 symbols generated from block #N are expressed as "#N-1", "#N-2", "#N-3", "#N-4" . . . "#N-222", "#N-223", and "#N-224".

Moreover, similar to FIG. 59, frequency is represented on the horizontal axis, and when the data carriers are arranged, in stream 1, data carrier $1 through data carrier $336 are present, and similarly, in stream 2, data carrier $1 through data carrier $336 are present.

Then, data carrier $1 in stream 1 and data carrier $1 in stream 2 are transmitted from different antennas at the same frequency and at the same time, and data carrier $2 in stream 1 and data carrier $2 in stream 2 are transmitted from different antennas at the same frequency and at the same time. In other words, data carrier $L in stream 1 and data carrier $L in stream 2 are transmitted from different antennas at the same frequency and at the same time. L is an integer that is greater than or equal to 1 and less than or equal to 336.

Figure 61:
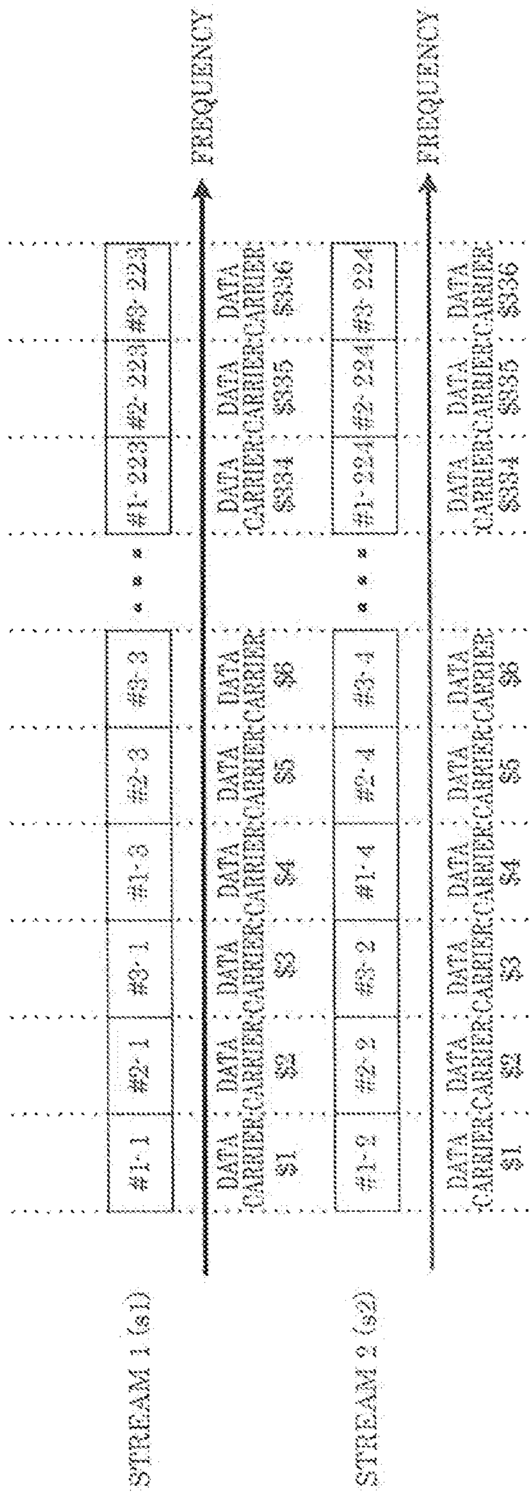
FIG. 61 illustrates an example of a frame configuration.

In order to facilitate understanding of the phenomenon described with reference to FIG. 8 and the phenomenon resulting from a frame configuration such as illustrated in FIG. 9, consider, for example, a frame configuration such as illustrated in FIG. 61.

As illustrated in FIG. 61, each data carrier in each stream is assigned with a symbol.

Data carrier $1 in stream 1 is assigned with the symbol "#1-1",
data carrier $1 in stream 2 is assigned with the symbol "#1-2",
data carrier $2 in stream 1 is assigned with the symbol "#2-1", data carrier $2 in stream 2 is assigned with the symbol "#2-2", data carrier $3 in stream 1 is assigned with the symbol "#3-1", data carrier $3 in stream 2 is assigned with the symbol "#3-2", data carrier $4 in stream 1 is assigned with the symbol "#1-3", data carrier $4 in stream 2 is assigned with the symbol "#1-4", data carrier $5 in stream 1 is assigned with the symbol "#2-3", data carrier $5 in stream 2 is assigned with the symbol "#2-4", data carrier $6 in stream 1 is assigned with the symbol "#3-3", data carrier $6 in stream 2 is assigned with the symbol "#3-4", (recitation for data carrier $5 through data carrier $333 is omitted), data carrier $334 in stream 1 is assigned with the symbol "#1-223", data carrier $334 in stream 2 is assigned with the symbol "#1-224", data carrier $335 in stream 1 is assigned with the symbol "#2-223", data carrier $335 in stream 2 is assigned with the symbol "#2-224", data carrier $336 in stream 1 is assigned with the symbol "#3-223", and data carrier $336 in stream 2 is assigned with the symbol "#3-224".

This is how the symbols are arranged for time &1. Accordingly, symbols having a remainder of 1 when the data carrier number is divided by 3 transmit block #1 data, symbols having a remainder of 2 when the data carrier number is divided by 3 transmit block #2 data, and symbols having a remainder of 0 when the data carrier number is divided by 3 transmit block #3 data.

At time &2, the symbols are arranged as follows.

Symbols having a remainder of 1 when the data carrier number is divided by 3 transmit block #4 data, symbols having a remainder of 2 when the data carrier number is divided by 3 transmit block #5 data, and symbols having a remainder of 0 when the data carrier number is divided by 3 transmit block #6 data.

Accordingly, at time &M, the symbols are arranged as follows. M is an integer that is greater than or equal to 1.

Symbols having a remainder of 1 when the data carrier number is divided by 3 transmit block #(3M-2) data, symbols having a remainder of 2 when the data carrier number is divided by 3 transmit block #(3M-1) data, and symbols having a remainder of 0 when the data carrier number is divided by 3 transmit block #(3M) data.

When the transmission device transmits modulated signals using a frame configuration such as illustrated in FIG. 61, the negative effects caused by low portion 801 of the reception field intensity due to multi-path using FIG. 8 are not likely to be an influence. Moreover, inhibiting a decrease in data reception quality such as described with reference to FIG. 9 is likely. Accordingly, achieving an advantageous effect of an increase in data reception quality is likely.

Figure 62:
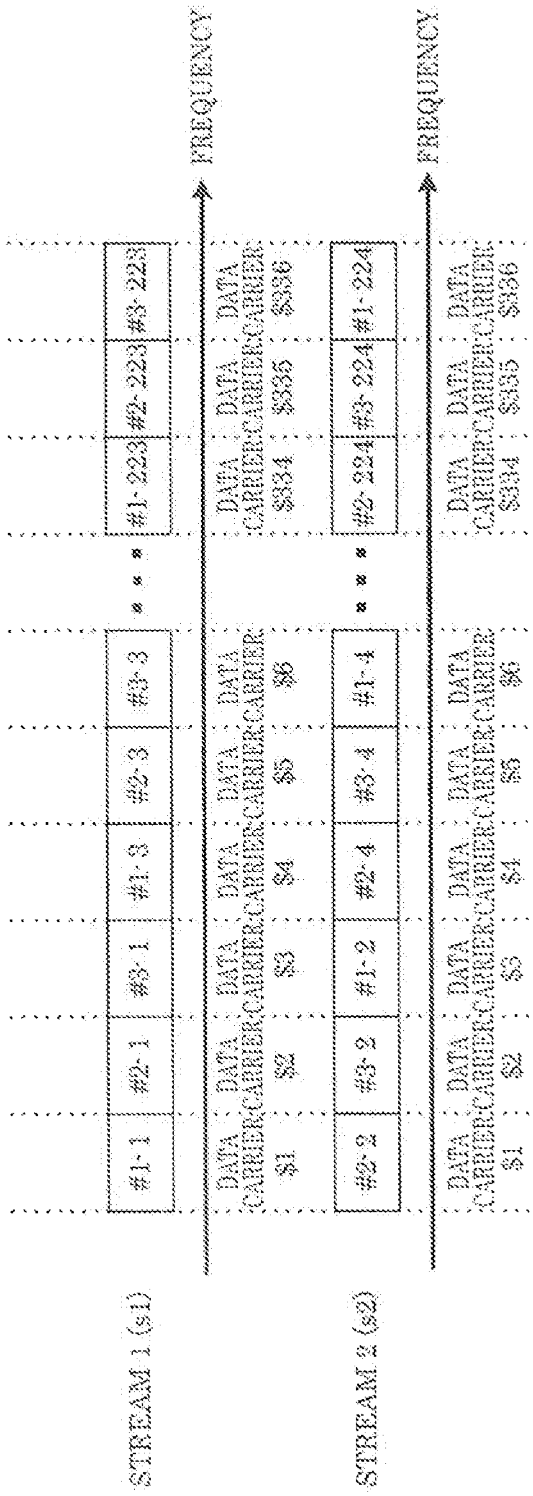
FIG. 62 illustrates an example of a frame configuration.

In order to facilitate understanding of the phenomenon described with reference to FIG. 8 and the phenomenon resulting from a frame configuration such as illustrated in FIG. 9, consider, for example, a frame configuration such as illustrated in FIG. 62.

As illustrated in FIG. 62, each data carrier in each stream is assigned with a symbol.

Data carrier $1 in stream 1 is assigned with the symbol "#1-1", data carrier $1 in stream 2 is assigned with the symbol "#2-2", data carrier $2 in stream 1 is assigned with the symbol "#2-1", data carrier $2 in stream 2 is assigned with the symbol "#3-2", data carrier $3 in stream 1 is assigned with the symbol "#3-1", data carrier $3 in stream 2 is assigned with the symbol "#1-2", data carrier $4 in stream 1 is assigned with the symbol "#1-3", data carrier $4 in stream 2 is assigned with the symbol "#2-4", data carrier $5 in stream 1 is assigned with the symbol "#2-3", data carrier $5 in stream 2 is assigned with the symbol "#3-4", data carrier $6 in stream 1 is assigned with the symbol "#3-3", data carrier $6 in stream 2 is assigned with the symbol "#1-4", (recitation for data carrier $7 through data carrier $333 is omitted), data carrier $334 in stream 1 is assigned with the symbol "#1-223", data carrier $334 in stream 2 is assigned with the symbol "#2-224", data carrier $335 in stream 1 is assigned with the symbol "#2-223", data carrier $335 in stream 2 is assigned with the symbol "#3-224", data carrier $336 in stream 1 is assigned with the symbol "#3-223", and data carrier $336 in stream 2 is assigned with the symbol "#1-224".

This is how the symbols are arranged for time &1. Accordingly, symbols in stream 1 having a remainder of 1 when the data carrier number is divided by 3 transmit block #1 data, symbols in stream 1 having a remainder of 2 when the data carrier number is divided by 3 transmit block #2 data, and symbols in stream 1 having a remainder of 0 when the data carrier number is divided by 3 transmit block #3 data.

Then, symbols in stream 2 having a remainder of 1 when the data carrier number is divided by 3 transmit block #2 data, symbols in stream 2 having a remainder of 2 when the data carrier number is divided by 3 transmit block #3 data, and symbols in stream 2 having a remainder of 0 when the data carrier number is divided by 3 transmit block #1 data.

At time &2, the symbols are arranged as follows.

Symbols in stream 1 having a remainder of 1 when the data carrier number is divided by 3 transmit block #4 data, symbols in stream 1 having a remainder of 2 when the data carrier number is divided by 3 transmit block #5 data, and symbols in stream 1 having a remainder of 0 when the data carrier number is divided by 3 transmit block #6 data.

Then, symbols in stream 2 having a remainder of 1 when the data carrier number is divided by 3 transmit block #5 data, symbols in stream 2 having a remainder of 2 when the data carrier number is divided by 3 transmit block #6 data, and symbols in stream 2 having a remainder of 0 when the data carrier number is divided by 3 transmit block #4 data.

Accordingly, at time &M, the symbols are arranged as follows. M is an integer that is greater than or equal to 1.

Symbols in stream 1 having a remainder of 1 when the data carrier number is divided by 3 transmit block #(3M-2) data, symbols in stream 1 having a remainder of 2 when the data carrier number is divided by 3 transmit block #(3M-1) data, and symbols in stream 1 having a remainder of 0 when the data carrier number is divided by 3 transmit block #(3M) data.

Then, symbols in stream 2 having a remainder of 1 when the data carrier number is divided by 3 transmit block #(3M-1) data, symbols in stream 2 having a remainder of 2 when the data carrier number is divided by 3 transmit block #(3M) data, and symbols in stream 2 having a remainder of 0 when the data carrier number is divided by 3 transmit block #(3M-2) data.

Figure 63:
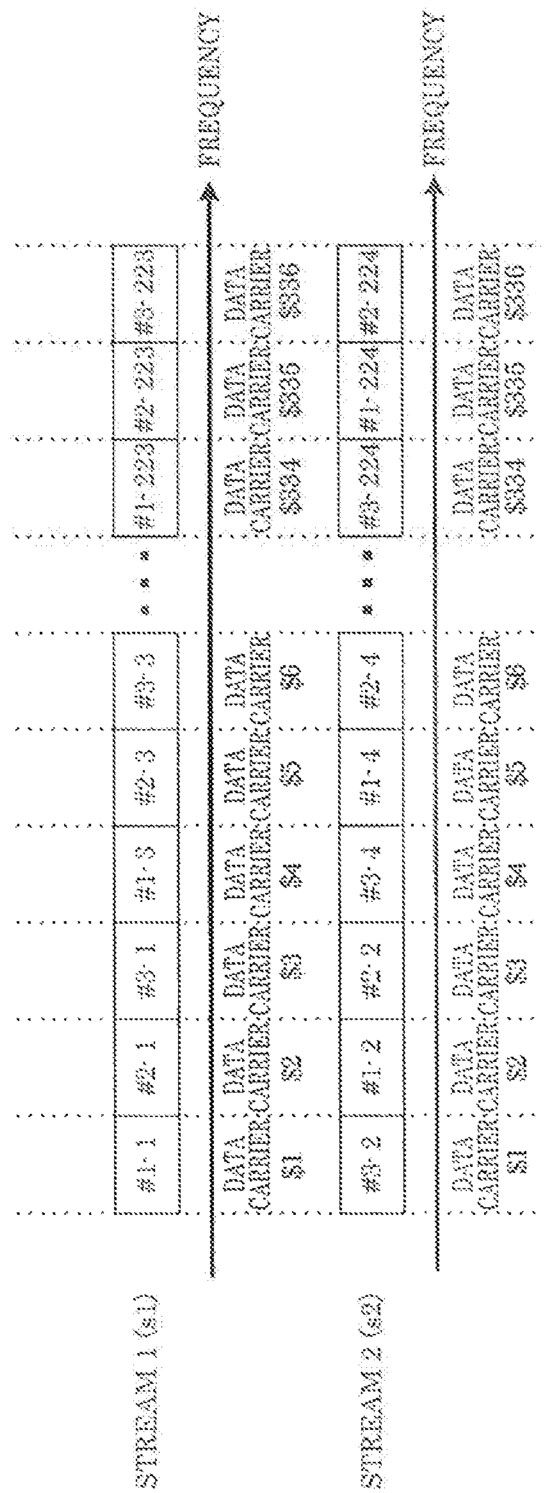
FIG. 63 illustrates an example of a frame configuration.

In order to facilitate understanding of the phenomenon described with reference to FIG. 8 and the phenomenon resulting from a frame configuration such as illustrated in FIG. 9, consider, for example, a frame configuration such as illustrated in FIG. 63.

As illustrated in FIG. 63, each data carrier in each stream is assigned with a symbol.

Data carrier $1 in stream 1 is assigned with the symbol "#1-1", data carrier $1 in stream 2 is assigned with the symbol "#3-2", data carrier $2 in stream 1 is assigned with the symbol "#2-1", data carrier $2 in stream 2 is assigned with the symbol "#1-2", data carrier $3 in stream 1 is assigned with the symbol "#3-1", data carrier $3 in stream 2 is assigned with the symbol "#2-2", data carrier $4 in stream 1 is assigned with the symbol "#1-3", data carrier $4 in stream 2 is assigned with the symbol "#3-4", data carrier $5 in stream 1 is assigned with the symbol "#2-3", data carrier $5 in stream 2 is assigned with the symbol "#1-4", data carrier $6 in stream 1 is assigned with the symbol "#3-3", data carrier $6 in stream 2 is assigned with the symbol "#2-4", (recitation for data carrier $7 through data carrier $333 is omitted), data carrier $334 in stream 1 is assigned with the symbol "#1-223", data carrier $334 in stream 2 is assigned with the symbol "#3-224", data carrier $335 in stream 1 is assigned with the symbol "#2-223", data carrier $335 in stream 2 is assigned with the symbol "#1-224", data carrier $336 in stream 1 is assigned with the symbol "#3-223", and data carrier $336 in stream 2 is assigned with the symbol "#2-224".

This is how the symbols are arranged for time &1. Accordingly, symbols in stream 1 having a remainder of 1 when the data carrier number is divided by 3 transmit block #1 data, symbols in stream 1 having a remainder of 2 when the data carrier number is divided by 3 transmit block #2 data, and symbols in stream 1 having a remainder of 0 when the data carrier number is divided by 3 transmit block #3 data.

Then, symbols in stream 2 having a remainder of 1 when the data carrier number is divided by 3 transmit block #3 data, symbols in stream 2 having a remainder of 2 when the data carrier number is divided by 3 transmit block #1 data, and symbols in stream 2 having a remainder of 0 when the data carrier number is divided by 3 transmit block #2 data.

At time &2, the symbols are arranged as follows.

Symbols in stream 1 having a remainder of 1 when the data carrier number is divided by 3 transmit block #4 data, symbols in stream 1 having a remainder of 2 when the data carrier number is divided by 3 transmit block #5 data, and symbols in stream 1 having a remainder of 0 when the data carrier number is divided by 3 transmit block #6 data.

Then, symbols in stream 2 having a remainder of 1 when the data carrier number is divided by 3 transmit block #6 data, symbols in stream 2 having a remainder of 2 when the data carrier number is divided by 3 transmit block #4 data, and symbols in stream 2 having a remainder of 0 when the data carrier number is divided by 3 transmit block #5 data.

Accordingly, at time &M, the symbols are arranged as follows. M is an integer that is greater than or equal to 1.

Symbols in stream 1 having a remainder of 1 when the data carrier number is divided by 3 transmit block #(3M-2) data, symbols in stream 1 having a remainder of 2 when the data carrier number is divided by 3 transmit block #(3M-1) data, and symbols in stream 1 having a remainder of 0 when the data carrier number is divided by 3 transmit block #(3M) data.

Then, symbols in stream 2 having a remainder of 1 when the data carrier number is divided by 3 transmit block #(3M) data, symbols in stream 2 having a remainder of 2 when the data carrier number is divided by 3 transmit block #(3M-2) data, and symbols in stream 2 having a remainder of 0 when the data carrier number is divided by 3 transmit block #(3M-1) data.

Hereinbefore, a frame configuration method when the modulation method for stream 1($s1(i)$) and the modulation method for stream 2($s2(i)$) is 16QAM or 64QAM and the code length of the error correction code is 1344 bits has been described. When the transmission device illustrated in FIG. 1 switches the modulation method for stream 1($s1(i)$) and the modulation method for stream 2($s2(i)$) between 16QAM and 64QAM, upon each of the modulation methods, when the above-described frame configuration is satisfied, when any one of the modulation methods is selected, it is possible to achieve an advantageous effect in which it is possible for the reception device, which is the communication partner, to achieve good data reception quality. Note that in the transmission device illustrated in FIG. 1, phase change may be implemented and alternatively may not be implemented.

Note that the element that implements the frame configuration such as described above can be radio units 110A and 110B illustrated in FIG. 1 (same applies to Embodiment 1). Examples of configurations of radio units 110A and 110B are illustrated in FIG. 64.

Figure 64:
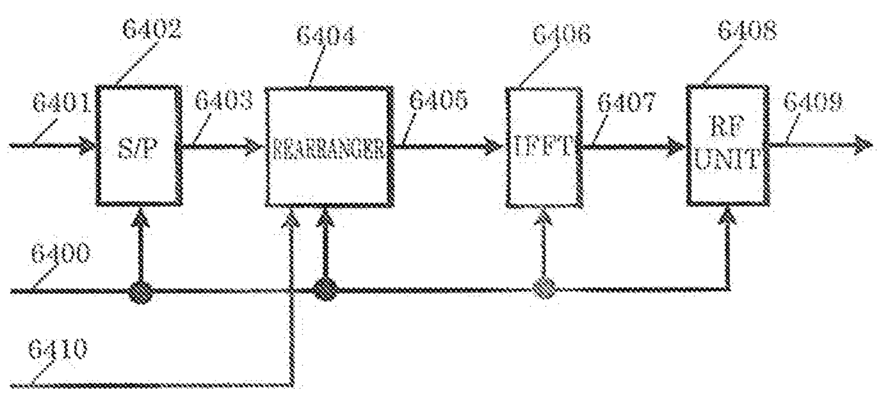
FIG. 64 illustrates an example of a radio unit.

In FIG. 64, modulated signal 6401 corresponds to 109A or 109B illustrated in FIG. 1. Frame configuration signal 6400 corresponds to frame configuration 113 illustrated in FIG. 1, control information signal 6410 corresponds to control information signal 117Z illustrated in FIG. 1, and transmission signal 6409 corresponds to transmission signal 111A or 111B illustrated in FIG. 1.

Serial-parallel converter 6402 receives inputs of modulated signal 6401 and frame configuration signal 6400, and based on frame configuration signal 6400, applies a serial-parallel conversion to modulated signal 6401, and outputs serial-parallel converted signal 6403.

Rearranger 6404 receives inputs of serial-parallel converted signal 6403, control information signal 6410, and frame configuration signal 6400, and based on frame configuration signal 6400, rearranges serial-parallel converted signal 6403 and control information signal 6410, and outputs rearranged signal 6405. Here, in particular, based on information on the code length of the error correction code, information on the modulation method, and information on the transmission method included in frame configuration signal 6400, rearranger 6404 switches the rerarranging method for serial-parallel converted signal 6403 (data symbols) based on the method described above.

Characteristic points are "when MIMO transmission method is applied, the modulation method for s1(*i*) is specified as 16QAM, and the modulation method for s2(*i*) is specified as 16QAM, the rearranged method is different for when the code length of the error correction code is specified as 672 bits and for when the code length is specified as 1344 bits" and "when MIMO transmission method is applied, the modulation method for s1(*i*) is specified as 64QAM, and the modulation method for s2(*i*) is specified as 64QAM, the rearranged method is different for when the code length of the error correction code is specified as 672 bits and for when the code length is specified as 1344 bits".

Inverse fast Fourier transform (IFFT) unit 6406 receives inputs of rearranged signal 6405 and frame configuration signal 6400, applies an IFFT to rearranged signal 6405, and outputs an IFFT signal 6407. Note that IFFT unit δ406 may be an inverse Fourier transform (IFT) unit.

RF unit 6408 receives inputs of IFFT signal 6407 and a frame configuration signal, applies processing such as orthogonal modulation, frequency conversion, bandlimiting, and/or signal amplification, and outputs transmission signal 6409.

One different method for realizing such a frame configuration as described above is a method realized by interleaver 153 illustrated in FIG. 1.

For example, when MIMO transmission method is applied and the code length of the error correction code is set to 672 bits, the required size of the interleaver memory varies depending on whether "the modulation method for s1(*i*) is set to QPSK and the modulation method for s2(*i*) is set to QPSK", "the modulation method for s1(*i*) is set to 16QAM and the modulation method for s2(*i*) is set to 16QAM", or "the modulation method for s1(*i*) is set to 64QAM and the modulation method for s2(*i*) is set to 64QAM".

When MIMO transmission method is applied and "the modulation method for s1(*i*) is set to QPSK and the modulation method for s2(*i*) is set to QPSK", the required memory size is two encoded blocks worth of 1344 bits. However, when "the modulation method for s1(*i*) is set to 16QAM and the modulation method for s2(*i*) is set to 16QAM" is specified, the required memory size is four encoded blocks worth of 2688 bits. Moreover, when "the modulation method for s1(*i*) is set to 64QAM and the modulation method for s2(*i*) is set to 64QAM" is specified, the required memory size is six encoded blocks worth of 4032 bits.

When MIMO transmission method is applied and the code length of the error correction code is set to 1344 bits, the required size of the interleaver memory varies depending on whether "the modulation method for s1(*i*) is set to QPSK and the modulation method for s2(*i*) is set to QPSK", "the modulation method for s1(*i*) is set to 16QAM and the modulation method for s2(*i*) is set to 16QAM", or "the modulation method for s1(*i*) is set to 64QAM and the modulation method for s2(*i*) is set to 64QAM".

When MIMO transmission method is applied and "the modulation method for s1(*i*) is set to QPSK and the modulation method for s2(*i*) is set to QPSK", the required memory size is one encoded block worth of 1344 bits. However, when "the modulation method for s1(*i*) is set to 16QAM and the modulation method for s2(*i*) is set to 16QAM" is specified, the required memory size is two encoded blocks worth of 2688 bits. Moreover, when "the modulation method for s1(*i*) is set to 64QAM and the modulation method for s2(*i*) is set to 64QAM" is specified, the required memory size is three encoded blocks worth of 4032 bits.

This point is a characteristic point. Note that, here, rearranger 6404 is not necessarily required.

Next, a phase change method in the transmission device illustrated in FIG. 1 in which phase change is performed when a plurality of modulated signals are transmitted from a plurality of antennas will be described.

The transmission method including performing precoding and phase change is as shown in Equation (3), Equation (37), Equation (38), and Equation (39), just as described above. Hereinafter, a specific application example of the phase change shown in Equation (3), Equation (37), Equation (38), and Equation (39) will be given. In other words, a method of changing y(i) in Equation (3), Equation (37), Equation (38), and Equation (39) will be described.

FIG. 10 illustrates an arrangement example of data carriers when the modulation method for stream 1(*s*1(*i*)) is 16QAM, which is an example of a modulation method in which there are 16 signal points in an in-phase I-orthogonal Q plane, and the modulation method for stream 2(*s*2(*i*)) is 16QAM, which is an example of a modulation method in which there are 16 signal points in an in-phase I-orthogonal Q plane. Here, as one example, the block length (code length) in the error correction code is 1344 bits. A first block configured of 1344 bits that are error correction encoded is referred to as block #1 and denoted as "#1". Accordingly, an N-th (N is an integer greater than or equal to 1) block configured of 1344 bits that are error correction encoded is referred to as block #N and denoted as "#N".

FIG. 18 illustrates an example of how phase change value y(i) is assigned when data is arranged in data carriers such as in FIG. 10. As illustrated in FIG. 18, in data carrier $1, when phase change is performed using y(0), phase change is performed using y(0) for data carrier $2 as well.

Similarly, in data carrier $3, when phase change is performed using y(1), phase change is performed using y(1) for data carrier $4 as well.

Recitation for data carrier $5 through data carrier $332 is omitted.

In data carrier $333, when phase change is performed using y(166), phase change is performed using y(166) for data carrier $334 as well.

In data carrier $335, when phase change is performed using y(167), phase change is performed using y(167) for data carrier $336 as well.

In other words, in data carrier $(2×k+1) and data carrier $(2*k*+2), phase change is performed using the same phase change value (y(k) in FIG. 18) (k is an integer that is greater than or equal to 0).

With this, with respect to block #1, phase is changed in an unbiased manner, and with respect to block #2 as well, phase is changed in an unbiased manner. Accordingly, in both block #1 and block #2, since it is possible to achieve a sufficient advantageous effect with the phase change, it is possible to achieve an advantageous effect of increase data quality of the reception device, which is the partner (communication partner).

FIG. 11 illustrates an arrangement example of data carriers when the modulation method for stream 1(*s*1(*i*)) is 16QAM, which is an example of a modulation method in which there are 16 signal points in an in-phase I-orthogonal Q plane, and when the modulation method for stream 2(*s*2(*i*)) is 16QAM, which is an example of a modulation method in which there are 16 signal points in an in-phase I-orthogonal Q plane that is different from the example illustrated in FIG. 10. Here, as one example, the block length (code length) in the error correction code is 1344 bits. A first block configured of 1344 bits that are error correction encoded is referred to as block #1 and denoted as "#1". Accordingly, an N-th (N is an integer greater than or equal to 1) block configured of 1344 bits that are error correction encoded is referred to as block #N and denoted as "#N".

FIG. 19 illustrates an example of how phase change value y(i) is assigned when data is arranged in data carriers such as in FIG. 11. As illustrated in FIG. 19, in data carrier $1, when phase change is performed using y(0), phase change is performed using y(0) for data carrier $2 as well.

Similarly, in data carrier $3, when phase change is performed using y(1), phase change is performed using y(1) for data carrier $4 as well.

Recitation for data carrier $4 through data carrier $332 is omitted.

In data carrier $333, when phase change is performed using y(166), phase change is performed using y(166) for data carrier $334 as well.

In data carrier $335, when phase change is performed using y(167), phase change is performed using y(167) for data carrier $336 as well.

In other words, in data carrier $(2×k+1) and data carrier $(2*k*+2), phase change is performed using the same phase change value (y(k) in FIG. 18) (k is an integer that is greater than or equal to 0).

With this, with respect to block #1, phase is changed in an unbiased manner, and with respect to block #2 as well, phase is changed in an unbiased manner. Accordingly, in both block #1 and block #2, since it is possible to achieve a sufficient advantageous effect with the phase change, it is possible to achieve an advantageous effect of increase data quality of the reception device, which is the partner (communication partner).

FIG. 20 illustrates an example of how phase change value y(i) is assigned "when data is arranged in data carriers such as in FIG. 11". The example illustrated in FIG. 20 is different from the example illustrated in FIG. 19. As illustrated in FIG. 20, each phase change value y(i) in each data carrier is used to perform phase change.

y(0) is used in data carrier $1, y(1) is used in data carrier $2, y(2) is used in data carrier $3, y(3) is used in data carrier $4, (recitation for data carrier $4 through data carrier $332 is omitted), y(332) is used in data carrier $333, y(333) is used in data carrier $334, y(334) is used in data carrier $335, and y(335) is used in data carrier $336 to perform phase change.

In other words, a phase change is performed using phase change value y(k) in data carrier $(k+1), that is to say, phase change is performed in units of data carriers (k is an integer that is greater than or equal to 0).

With this, with respect to block #1, phase is changed in an unbiased manner, and with respect to block #2 as well, phase is changed in an unbiased manner. Accordingly, in both block #1 and block #2, since it is possible to achieve a sufficient advantageous effect with the phase change, it is possible to achieve an advantageous effect of increase data quality of the reception device, which is the partner (communication partner).

FIG. 62 illustrates an arrangement example of data carriers when the modulation method for stream 1(*s*1(*i*)) is 64QAM, which is an example of a modulation method in which there are 64 signal points in an in-phase I-orthogonal Q plane, and the modulation method for stream 2(*s*2(*i*)) is 64QAM, which is an example of a modulation method in which there are 64 signal points in an in-phase I-orthogonal Q plane.

Here, as one example, the block length (code length) in the error correction code is 1344 bits. A first block configured of 1344 bits that are error correction encoded is referred to as block #1 and denoted as "#1". Accordingly, an N-th (N is an integer greater than or equal to 1) block configured of 1344 bits that are error correction encoded is referred to as block #N and denoted as "#N".

Figure 65:
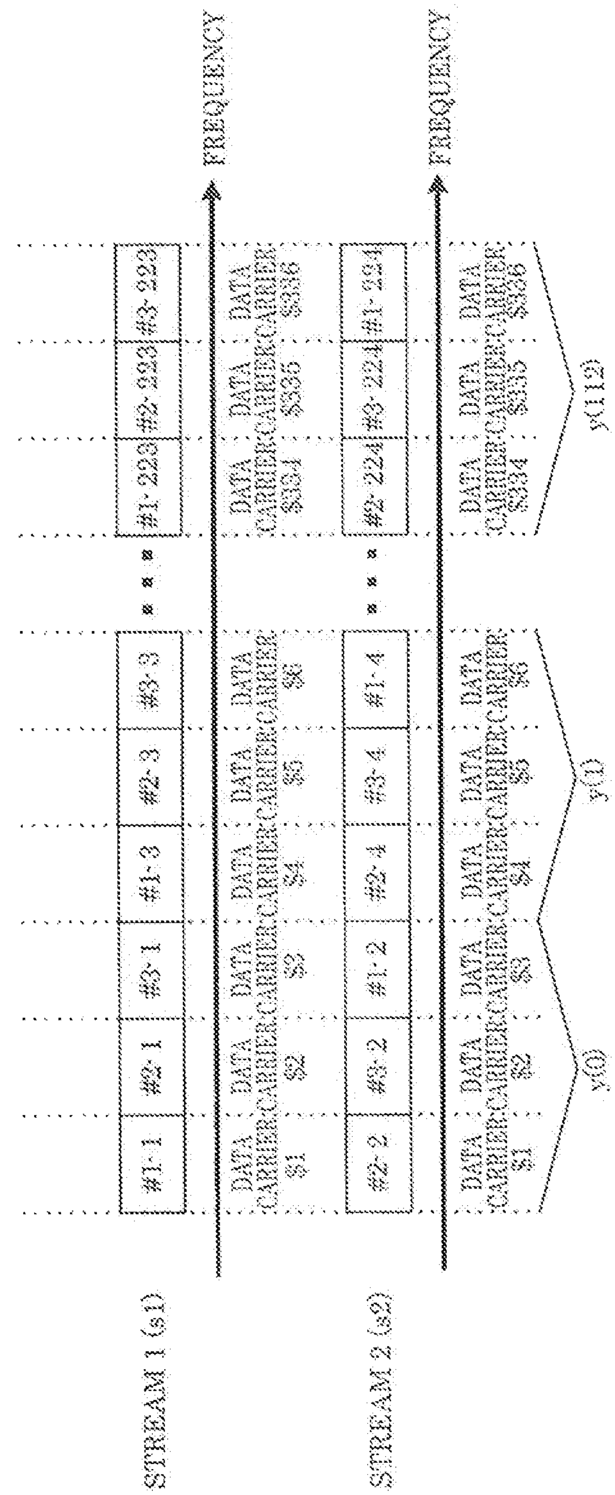
FIG. 65 illustrates an example of phase change value allocation.

FIG. 65 illustrates an example of how phase change value y(i) is assigned when data is arranged in data carriers such as in FIG. 62. As illustrated in FIG. 65, in data carrier $1, when phase change is performed using y(0), phase change is performed using y(0) for data carrier $2 and data carrier $3 as well.

Similarly, in data carrier $4, when phase change is performed using y(1), phase change is performed using y(1) for data carrier $5 and data carrier $6 as well.

Recitation for data carrier $7 through data carrier $333 is omitted.

Phase change is performed using y(112) in data carrier $334, data carrier $335, and data carrier $336.

In other words, for data carrier $(3×k+1), data carrier $(3×k+2), and data carrier $(3×k+3), phase change is performed using the same phase change value (in FIG. 65, y(k); k is an integer that is greater than or equal to 0).

With this, with respect to block #1, phase is changed in an unbiased manner, and with respect to block #2, block #3, and block #4 as well, phase is changed in an unbiased manner. Accordingly, in block #1, block #2, block #3 and block #4, since it is possible to achieve a sufficient advantageous effect with the phase change, it is possible to achieve an advantageous effect of increase data quality of the reception device, which is the partner (communication partner).

Figure 66:
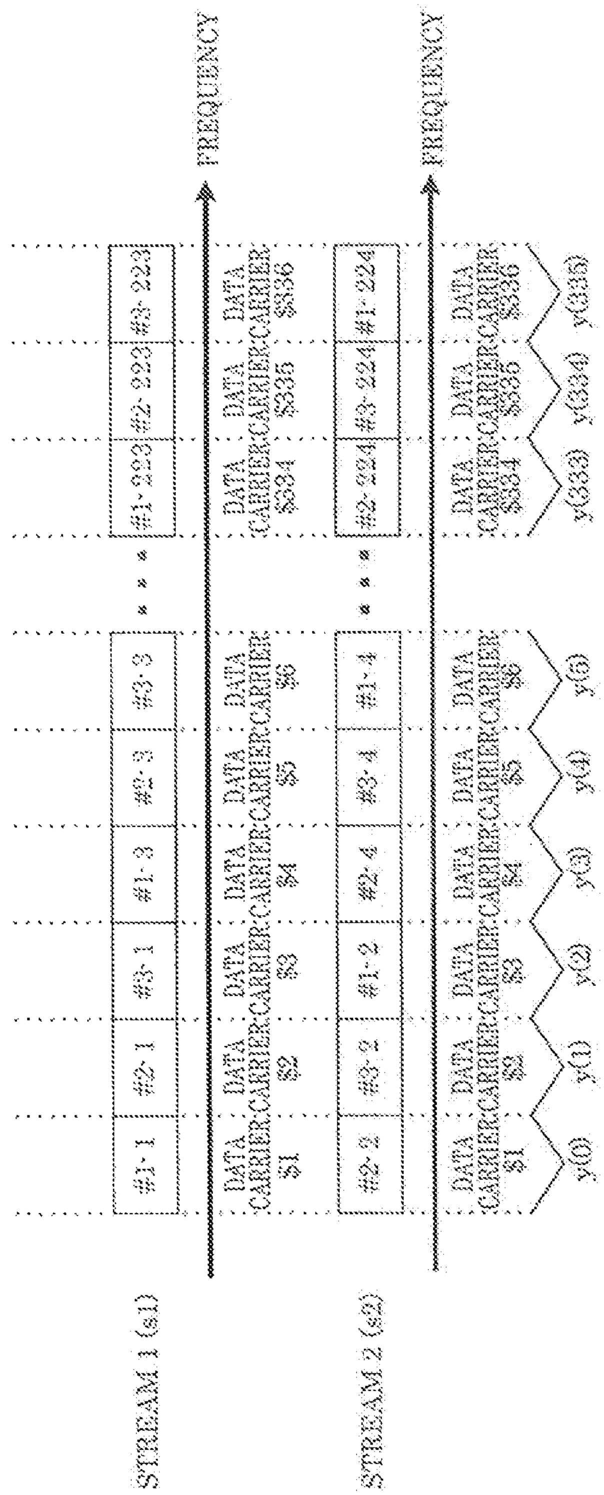
FIG. 66 illustrates an example of phase change value allocation.

FIG. 66 illustrates an example of how phase change value y(i) is assigned "when data is arranged in data carriers such as in FIG. 62". The example illustrated in FIG. 66 is different from the example illustrated in FIG. 65. As illustrated in FIG. 66, y(0) is used in data carrier $1, y(1) is used in data carrier $2, y(2) is used in data carrier $3, y(3) is used in data carrier $4, (recitation for data carrier $5 through data carrier $332 is omitted), y(332) is used in data carrier $333, y(333) is used in data carrier $334, y(334) is used in data carrier $335, and y(335) is used in data carrier $336 to perform phase change.

In other words, a phase change is performed using phase change value y(k) in data carrier $(k+1), that is to say, phase change is performed in units of data carriers. k is an integer that is greater than or equal to 0.

With this, with respect to block #1, phase is changed in an unbiased manner, and with respect to block #2 as well, phase is changed in an unbiased manner. Accordingly, in both block #1 and block #2, since it is possible to achieve a sufficient advantageous effect with the phase change, it is possible to achieve an advantageous effect of increase data quality of the reception device, which is the partner (communication partner).

FIG. 63 illustrates an arrangement example of data carriers when the modulation method for stream 1(*s*1(*i*)) is 64QAM, which is an example of a modulation method in which there are 64 signal points in an in-phase I-orthogonal Q plane, and the modulation method for stream 2(*s*2(*i*)) is 64QAM, which is an example of a modulation method in which there are 64 signal points in an in-phase I-orthogonal Q plane.

Here, as one example, the block length (code length) in the error correction code is 1344 bits. A first block configured of 1344 bits that are error correction encoded is referred to as block #1 and denoted as "#1". Accordingly, an N-th (N is an integer greater than or equal to 1) block configured of 1344 bits that are error correction encoded is referred to as block #N and denoted as "#N".

Figure 67:
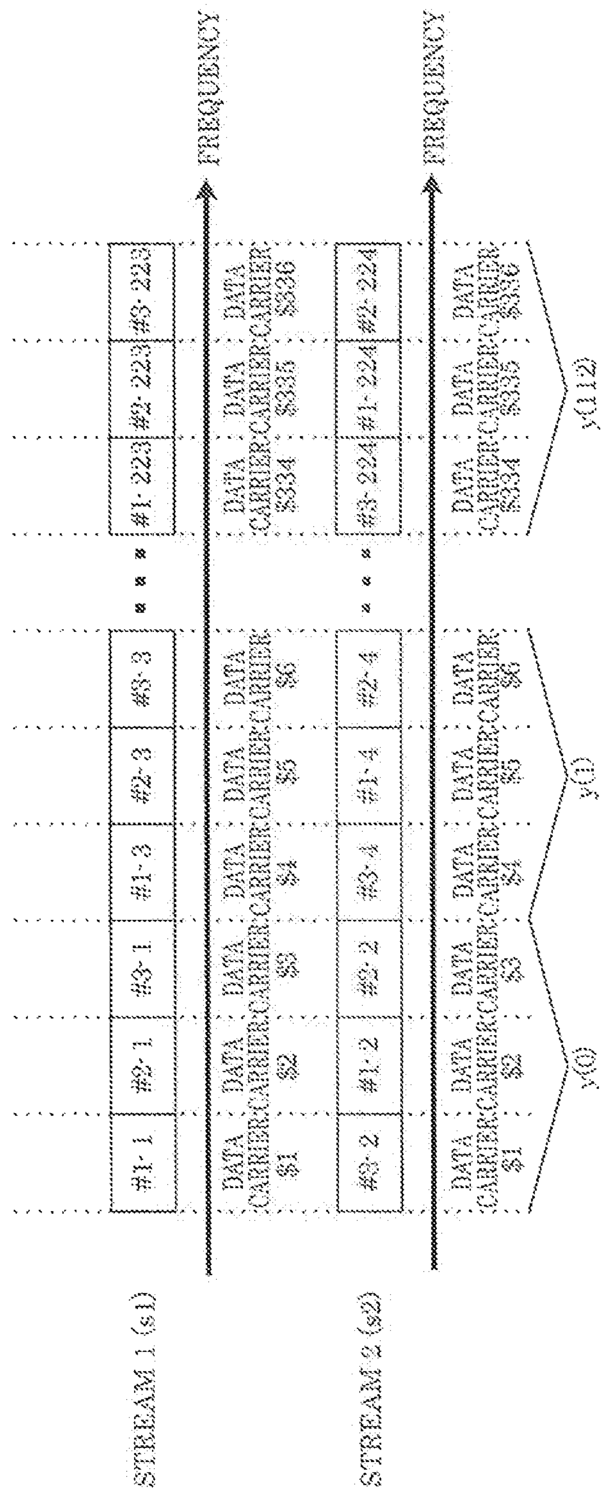
FIG. 67 illustrates an example of phase change value allocation.

FIG. 67 illustrates an example of how phase change value y(i) is assigned when data is arranged in data carriers such as in FIG. 63. As illustrated in FIG. 67, in data carrier $1, when phase change is performed using y(0), phase change is performed using y(0) for data carrier $2 and data carrier $3 as well.

Similarly, in data carrier $4, when phase change is performed using y(1), phase change is performed using y(1) for data carrier $5 and data carrier $6 as well.

Recitation for data carrier $5 through data carrier $333 is omitted.

Phase change is performed using y(112) in data carrier $334, data carrier $335, and data carrier $336.

In other words, for data carrier $(3×k+1), data carrier $(3×k+2), and data carrier $(3×k+3), phase change is performed using the same phase change value (in FIG. 65, y(k); k is an integer that is greater than or equal to 0).

With this, with respect to block #1, phase is changed in an unbiased manner, and with respect to block #2, block #3, and block #4 as well, phase is changed in an unbiased manner. Accordingly, in block #1, block #2, block #3 and block #4, since it is possible to achieve a sufficient advantageous effect with the phase change, it is possible to achieve an advantageous effect of increase data quality of the reception device, which is the partner (communication partner).

Figure 68:
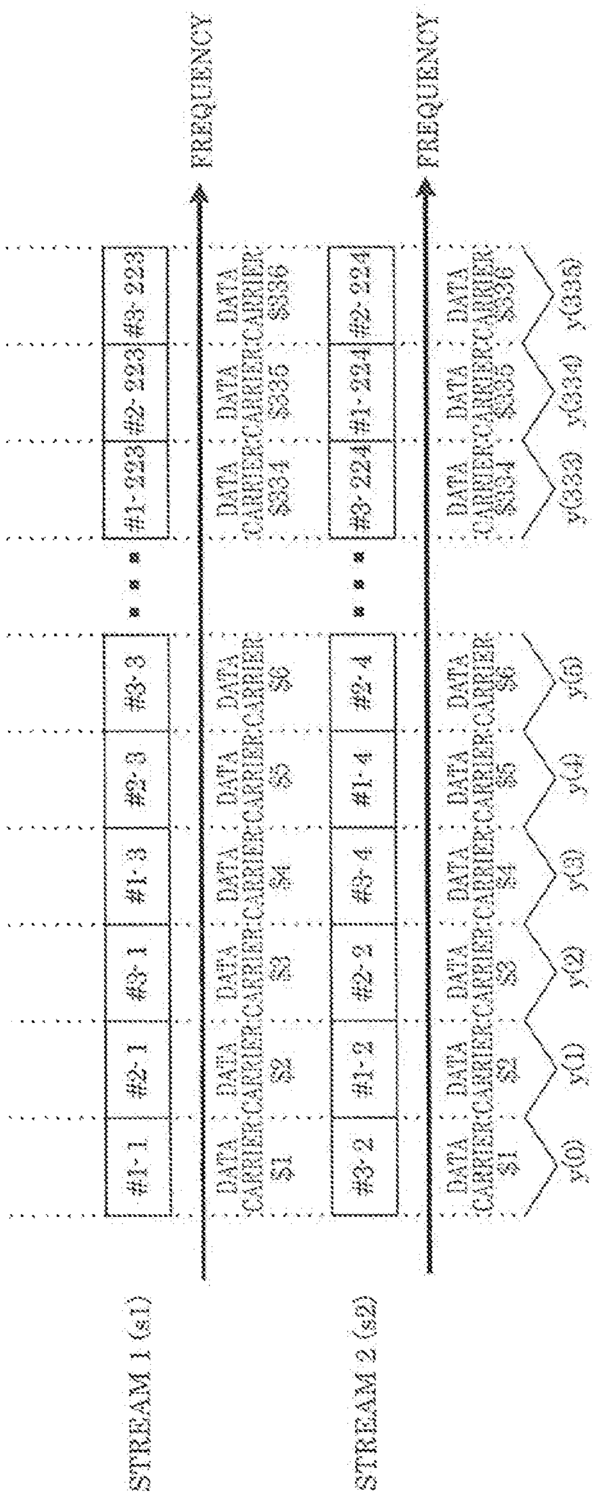
FIG. 68 illustrates an example of phase change value allocation.

FIG. 68 illustrates an example of how phase change value y(i) is assigned "when data is arranged in data carriers such as in FIG. 63". The example illustrated in FIG. 68 is different from the example illustrated in FIG. 67. As illustrated in FIG. 68, y(0) is used in data carrier $1, y(1) is used in data carrier $2, y(2) is used in data carrier $3, y(3) is used in data carrier $4, (recitation for data carrier $5 through data carrier $332 is omitted), y(332) is used in data carrier $333, y(333) is used in data carrier $334, y(334) is used in data carrier $335, and y(335) is used in data carrier $336 to perform phase change.

In other words, a phase change is performed using phase change value y(k) in data carrier $(k+1), that is to say, phase change is performed in units of data carriers (k is an integer that is greater than or equal to 0).

With this, with respect to block #1, phase is changed in an unbiased manner, and with respect to block #2 as well, phase is changed in an unbiased manner. Accordingly, in both block #1 and block #2, since it is possible to achieve a sufficient advantageous effect with the phase change, it is possible to achieve an advantageous effect of increase data quality of the reception device, which is the partner (communication partner).

Note that the application method for phase change value y(i) is as described in Embodiment 1.

Next, as an example different from above, a case in which a single stream is transmitted will be described.

A case will be described in which a single stream is transmitted using the transmission device illustrated in FIG. 1, for example, a modulated signal generated by mapper 106A is transmitted from antenna 112A; that is to say, a case in which mapper 106B does not operate and a modulated signal is not transmitted from antenna 112B. Note that when transmitting a single stream, for example, a modulated signal generated by mapper 106A may be transmitted from a plurality of antennas.

Figure 69:
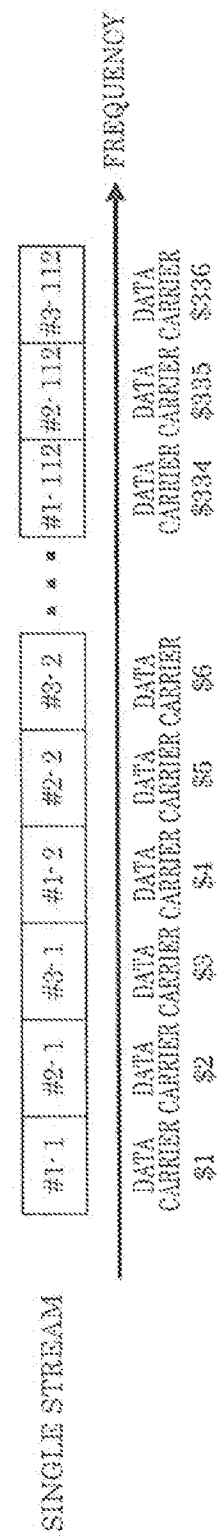
FIG. 69 illustrates an example of an arrangement of symbols in data carriers.

FIG. 69 illustrates an arrangement example of data carriers when the modulation method for a single stream is 64QAM, which is an example of a modulation method in which there are 64 signal points in an in-phase I-orthogonal Q plane. Here, as one example, the block length (code length) in the error correction code is 672 bits. A first block configured of 672 bits that are error correction encoded is referred to as block #1 and denoted as "#1". Accordingly, an N-th (N is an integer greater than or equal to 1) block configured of 672 bits that are error correction encoded is referred to as block #N and denoted as "#N".

When 64QAM is applied, 112 symbols are generated from block #N. Accordingly, the 112 symbols generated from block #1 are indicated as "#1-1", "#1-2", "#1-3", "#1-4" . . . "#1-110", "#1-111", and "#1-112". Accordingly, the 112 symbols generated from block #N are expressed as "#N-1", "#N-2", "#N-3", "#N-4" . . . "#N-110", "#N-111", and "#N-112".

In FIG. 69, the data carriers are illustrated arranged along the horizontal frequency axis. Here, just as described above, data carriers from data carrier $1 to data carrier $336 are present.

As illustrated in FIG. 69, data carrier $1 is assigned with the symbol "#1-1",
data carrier $2 is assigned with the symbol "#2-1",
data carrier $3 is assigned with the symbol "#3-1",
data carrier $4 is assigned with the symbol "#1-2",
data carrier $5 is assigned with the symbol "#2-2",
data carrier $6 is assigned with the symbol "#3-2",
(recitation for data carrier $5 through data carrier $333 is omitted),
data carrier $334 is assigned with the symbol "#1-112",
data carrier $335 is assigned with the symbol "#2-112", and
data carrier $336 is assigned with the symbol "#3-112".

This is how the symbols are arranged for time &1. Accordingly, symbols having a remainder of 1 when the data carrier number is divided by 3 transmit block #1 data,
symbols having a remainder of 2 when the data carrier number is divided by 3 transmit block #2 data, and
symbols having a remainder of 0 when the data carrier number is divided by 3 transmit block #3 data.

At time &2, the symbols are arranged as follows.

Symbols having a remainder of 1 when the data carrier number is divided by 3 transmit block #4 data,
symbols having a remainder of 2 when the data carrier number is divided by 3 transmit block #5 data, and symbols having a remainder of 0 when the data carrier number is divided by 3 transmit block #6 data.

Accordingly, at time &M, the symbols are arranged as follows. M is an integer that is greater than or equal to 1.

Symbols having a remainder of 1 when the data carrier number is divided by 3 transmit block #(3M-2) data,
symbols having a remainder of 2 when the data carrier number is divided by 3 transmit block #(3M-1) data, and
symbols having a remainder of 0 when the data carrier number is divided by 3 transmit block #(3M) data.

When the transmission device transmits modulated signals using a frame configuration such as illustrated in FIG. 69, the negative effects caused by low portion 801 of the reception field intensity due to multi-path using FIG. 8 are not likely to be an influence. Accordingly, achieving an advantageous effect of an increase in data reception quality is likely.

Figure 70:
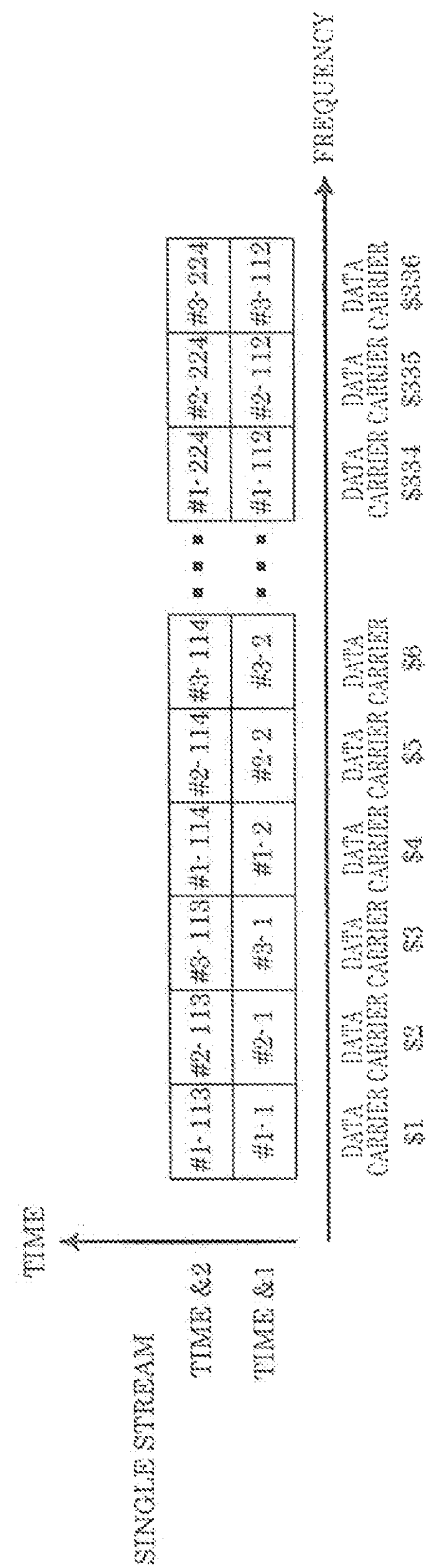
FIG. 70 illustrates an example of an arrangement of symbols in data carriers.

FIG. 70 illustrates an arrangement example of data carriers when the modulation method for a single stream is 64QAM, which is an example of a modulation method in which there are 64 signal points in an in-phase I-orthogonal Q plane. Here, as one example, the block length (code length) in the error correction code is 1344 bits. A first block configured of 1344 bits that are error correction encoded is referred to as block #1 and denoted as "#1". Accordingly, an N-th (N is an integer greater than or equal to 1) block configured of 1344 bits that are error correction encoded is referred to as block #N and denoted as "#N".

When 64QAM is applied, 224 symbols are generated from block #N. Accordingly, the 224 symbols generated from block #1 are indicated as "#1-1", "#1-2", "#1-3", "#1-4" . . . "#1-222", "#1-223", and "#1-224". Accordingly, the 224 symbols generated from block #N are expressed as "#N-1", "#N-2", "#N-3", "#N-4" . . . "#N-222", "#N-223", and "#N-224".

In FIG. 70, the data carriers are illustrated arranged along the horizontal frequency axis and vertical time axis. Here, just as described above, data carriers from data carrier $1 to data carrier $336 are present.

As illustrated in FIG. 70, at time &1,
data carrier $1 is assigned with the symbol "#1-1",
data carrier $2 is assigned with the symbol "#2-1",
data carrier $3 is assigned with the symbol "#3-1",
data carrier $4 is assigned with the symbol "#1-2",
data carrier $5 is assigned with the symbol "#2-2",
data carrier $6 is assigned with the symbol "#3-2",
(recitation for data carrier $7 through data carrier $333 is omitted),
data carrier $334 is assigned with the symbol "#1-112",
data carrier $335 is assigned with the symbol "#2-112", and
data carrier $336 is assigned with the symbol "#3-112".

Then, at time &2,
data carrier $1 is assigned with the symbol "#1-113",
data carrier $2 is assigned with the symbol "#2-113",
data carrier $3 is assigned with the symbol "#3-113",
data carrier $4 is assigned with the symbol "#1-114",
data carrier $5 is assigned with the symbol "#2-114",
data carrier $6 is assigned with the symbol "#3-114",
(recitation for data carrier $7 through data carrier $333 is omitted),
data carrier $334 is assigned with the symbol "#1-114",
data carrier $335 is assigned with the symbol "#2-114", and
data carrier $336 is assigned with the symbol "#3-114".

Accordingly, at time &1 and time &2, symbols having a remainder of 1 when the data carrier number is divided by 3 transmit block #1 data,
symbols having a remainder of 2 when the data carrier number is divided by 3 transmit block #2 data, and
symbols having a remainder of 0 when the data carrier number is divided by 3 transmit block #3 data.

At time &3 and time &4, the symbols are arranged as follows.

Symbols having a remainder of 1 when the data carrier number is divided by 3 transmit block #4 data,
symbols having a remainder of 2 when the data carrier number is divided by 3 transmit block #5 data, and
symbols having a remainder of 0 when the data carrier number is divided by 3 transmit block #6 data.

Accordingly, at time &(2M-1) and time &2M (M is an integer that is greater than or equal to 1), the symbols are arranged as follows.

Symbols having a remainder of 1 when the data carrier number is divided by 3 transmit block #(3M-2) data,
symbols having a remainder of 2 when the data carrier number is divided by 3 transmit block #(3M-1) data, and
symbols having a remainder of 0 when the data carrier number is divided by 3 transmit block #(3M) data.

When the transmission device transmits modulated signals using a frame configuration such as illustrated in FIG. 70, the negative effects caused by low portion 801 of the reception field intensity due to multi-path using FIG. 8 are not likely to be an influence. Accordingly, achieving an advantageous effect of an increase in data reception quality is likely.

Figure 71:
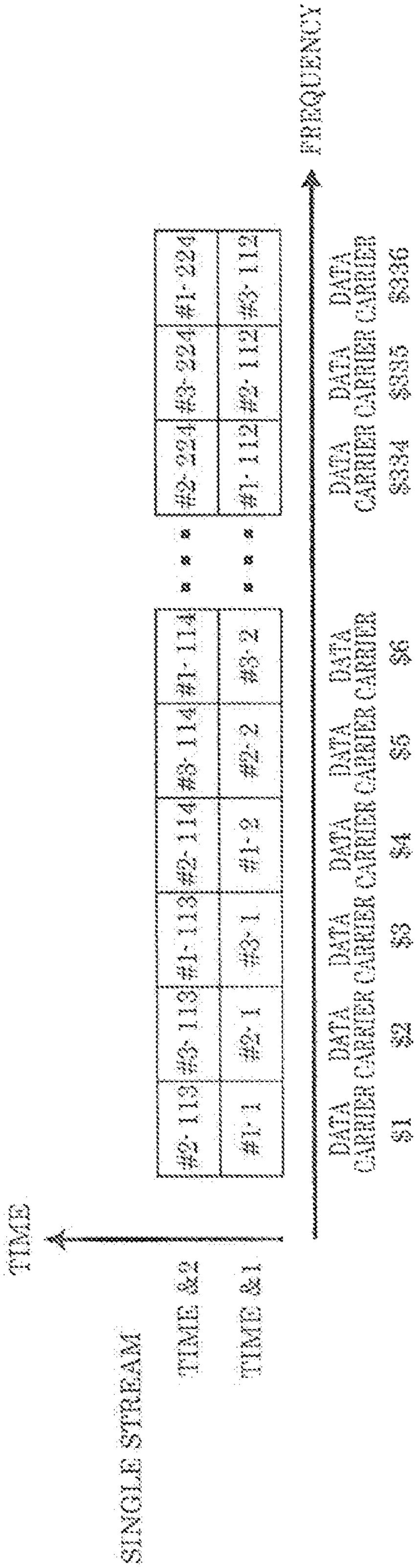
FIG. 71 illustrates an example of an arrangement of symbols in data carriers.

FIG. 71 illustrates an arrangement example of data carriers when the modulation method for a single stream is 64QAM, which is an example of a modulation method in which there are 64 signal points in an in-phase I-orthogonal Q plane. The example illustrated in FIG. 71 is different from the example illustrated in FIG. 70. Here, as one example, the block length (code length) in the error correction code is 1344 bits. A first block configured of 1344 bits that are error correction encoded is referred to as block #1 and denoted as "#1". Accordingly, an N-th (N is an integer greater than or equal to 1) block configured of 1344 bits that are error correction encoded is referred to as block #N and denoted as "#N".

When 64QAM is applied, 224 symbols are generated from block #N. Accordingly, the 224 symbols generated from block #1 are indicated as "#1-1", "#1-2", "#1-3", "#1-4" . . . "#1-222", "#1-223", and "#1-224". Accordingly, the 224 symbols generated from block #N are expressed as "#N-1", "#N-2", "#N-3", "#N-4" . . . "#N-222", "#N-223", and "#N-224".

In FIG. 71, the data carriers are illustrated arranged along the horizontal frequency axis and vertical time axis. Here, just as described above, data carriers from data carrier $1 to data carrier $336 are present.

As illustrated in FIG. 71, at time &1,
data carrier $1 is assigned with the symbol "#1-1",
data carrier $2 is assigned with the symbol "#2-1",
data carrier $3 is assigned with the symbol "#3-1",
data carrier $4 is assigned with the symbol "#1-2",
data carrier $5 is assigned with the symbol "#2-2",
data carrier $6 is assigned with the symbol "#3-2",
(recitation for data carrier $7 through data carrier $333 is omitted),
data carrier $334 is assigned with the symbol "#1-112",
data carrier $335 is assigned with the symbol "#2-112", and
data carrier $336 is assigned with the symbol "#3-112".

Then, at time &2,
data carrier $1 is assigned with the symbol "#2-113",
data carrier $2 is assigned with the symbol "#3-113", data carrier $3 is assigned with the symbol "#1-113",
data carrier $4 is assigned with the symbol "#2-114",
data carrier $5 is assigned with the symbol "#3-114",
data carrier $6 is assigned with the symbol "#1-114",
(recitation for data carrier $7 through data carrier $333 is omitted),
data carrier $334 is assigned with the symbol "#2-114",
data carrier $335 is assigned with the symbol "#3-114", and
data carrier $336 is assigned with the symbol "#1-114".

Accordingly, at time &1, symbols having a remainder of 1 when the data carrier number is divided by 3 transmit block #1 data,
symbols having a remainder of 2 when the data carrier number is divided by 3 transmit block #2 data, and
symbols having a remainder of 0 when the data carrier number is divided by 3 transmit block #3 data.

At time &2, symbols having a remainder of 1 when the data carrier number is divided by 3 transmit block #2 data,
symbols having a remainder of 2 when the data carrier number is divided by 3 transmit block #3 data, and
symbols having a remainder of 0 when the data carrier number is divided by 3 transmit block #1 data.

At time &3, the symbols are arranged as follows.
Symbols having a remainder of 1 when the data carrier number is divided by 3 transmit block #4 data,
symbols having a remainder of 2 when the data carrier number is divided by 3 transmit block #5 data, and
symbols having a remainder of 0 when the data carrier number is divided by 3 transmit block #6 data.

At time &4, the symbols are arranged as follows.
symbols having a remainder of 1 when the data carrier number is divided by 3 transmit block #5 data, and
symbols having a remainder of 2 when the data carrier number is divided by 3 transmit block #6 data,
symbols having a remainder of 0 when the data carrier number is divided by 3 transmit block #4 data.

Accordingly, at time &(2M-1), the symbols are arranged as follows. M is an integer that is greater than or equal to 1.
Symbols having a remainder of 1 when the data carrier number is divided by 3 transmit block #(3M-2) data,
symbols having a remainder of 2 when the data carrier number is divided by 3 transmit block #(3M-1) data, and
symbols having a remainder of 0 when the data carrier number is divided by 3 transmit block #(3M) data.

Accordingly, at time &(2M) (M is an integer that is greater than or equal to 1), the symbols are arranged as follows.
Symbols having a remainder of 1 when the data carrier number is divided by 3 transmit block #(3M-1) data,
symbols having a remainder of 2 when the data carrier number is divided by 3 transmit block #(3M) data, and
symbols having a remainder of 0 when the data carrier number is divided by 3 transmit block #(3M-2) data.

When the transmission device transmits modulated signals using a frame configuration such as illustrated in FIG. 71, the negative effects caused by low portion 801 of the reception field intensity due to multi-path using FIG. 8 are not likely to be an influence. Accordingly, achieving an advantageous effect of an increase in data reception quality is likely.

Figure 72:
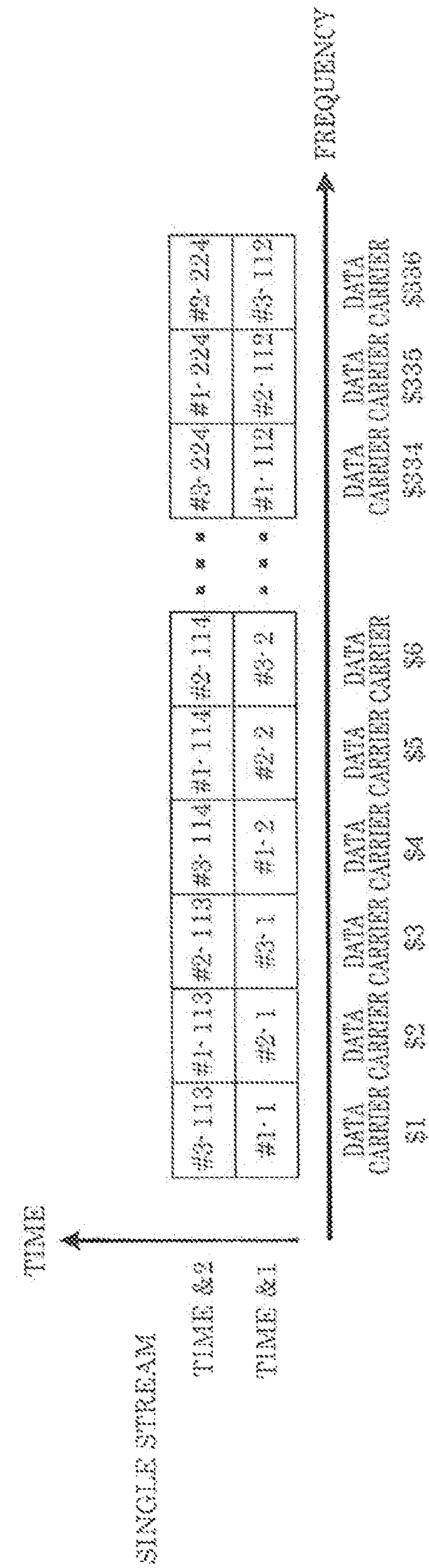
FIG. 72 illustrates an example of an arrangement of symbols in data carriers.
Figure 73:
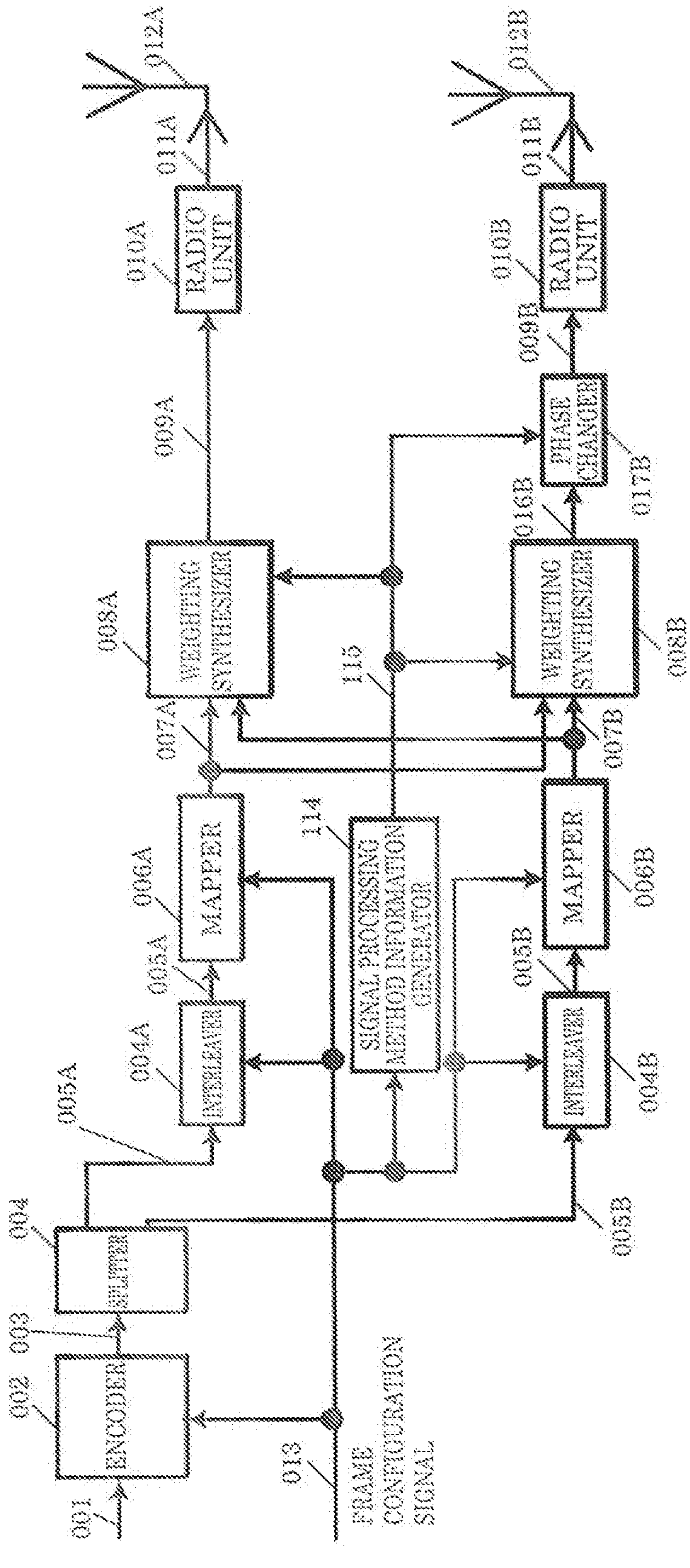
FIG. 73 illustrates an example of a conventional configuration of a transmission device.

FIG. 72 illustrates an arrangement example of data carriers when the modulation method for a single stream is 64QAM, which is an example of a modulation method in which there are 64 signal points in an in-phase I-orthogonal Q plane. The example illustrated in FIG. 72 is different from the examples illustrated in FIG. 70 and FIG. 71. Here, as one example, the block length (code length) in the error correction code is 1344 bits. A first block configured of 1344 bits that are error correction encoded is referred to as block #1 and denoted as "#1". Accordingly, an N-th (N is an integer greater than or equal to 1) block configured of 1344 bits that are error correction encoded is referred to as block #N and denoted as "#N".

When 64QAM is applied, 224 symbols are generated from block #N. Accordingly, the 224 symbols generated from block #1 are indicated as "#1-1", "#1-2", "#1-3", "#1-4" . . . "#1-222", "#1-223", and "#1-224". Accordingly, the 224 symbols generated from block #N are expressed as "#N-1", "#N-2", "#N-3", "#N-4" . . . "#N-222", "#N-223", and "#N-224".

In FIG. 72, the data carriers are illustrated arranged along the horizontal frequency axis and vertical time axis. Here, just as described above, data carriers from data carrier $1 to data carrier $336 are present.

As illustrated in FIG. 72, at time &1,
data carrier $1 is assigned with the symbol "#1-1",
data carrier $2 is assigned with the symbol "#2-1",
data carrier $3 is assigned with the symbol "#3-1",
data carrier $4 is assigned with the symbol "#1-2",
data carrier $5 is assigned with the symbol "#2-2",
data carrier $6 is assigned with the symbol "#3-2",
(recitation for data carrier $7 through data carrier $333 is omitted),
data carrier $334 is assigned with the symbol "#1-112",
data carrier $335 is assigned with the symbol "#2-112", and
data carrier $336 is assigned with the symbol "#3-112".

Then, at time &2,
data carrier $1 is assigned with the symbol "#3-113",
data carrier $2 is assigned with the symbol "#1-113",
data carrier $3 is assigned with the symbol "#2-113",
data carrier $4 is assigned with the symbol "#3-114",
data carrier $5 is assigned with the symbol "#1-114",
data carrier $6 is assigned with the symbol "#2-114",
(recitation for data carrier $7 through data carrier $333 is omitted),
data carrier $334 is assigned with the symbol "#3-114",
data carrier $335 is assigned with the symbol "#1-114", and
data carrier $336 is assigned with the symbol "#2-114".

Accordingly, at time &1, symbols having a remainder of 1 when the data carrier number is divided by 3 transmit block #1 data,
symbols having a remainder of 2 when the data carrier number is divided by 3 transmit block #2 data, and
symbols having a remainder of 0 when the data carrier number is divided by 3 transmit block #3 data.

At time &2, symbols having a remainder of 1 when the data carrier number is divided by 3 transmit block #3 data,
symbols having a remainder of 2 when the data carrier number is divided by 3 transmit block #1 data, and
symbols having a remainder of 0 when the data carrier number is divided by 3 transmit block #2 data.

At time &3, the symbols are arranged as follows.
Symbols having a remainder of 1 when the data carrier number is divided by 3 transmit block #4 data,
symbols having a remainder of 2 when the data carrier number is divided by 3 transmit block #5 data, and
symbols having a remainder of 0 when the data carrier number is divided by 3 transmit block #6 data.

At time &4, the symbols are arranged as follows.
symbols having a remainder of 1 when the data carrier number is divided by 3 transmit block #6 data,
Symbols having a remainder of 2 when the data carrier number is divided by 3 transmit block #4 data, and symbols having a remainder of 0 when the data carrier number is divided by 3 transmit block #5 data.

Accordingly, at time &(2M-1) (M is an integer that is greater than or equal to 1), the symbols are arranged as follows.

Symbols having a remainder of 1 when the data carrier number is divided by 3 transmit block #(3M-2) data,
symbols having a remainder of 2 when the data carrier number is divided by 3 transmit block #(3M-1) data, and
symbols having a remainder of 0 when the data carrier number is divided by 3 transmit block #(3M) data.

Accordingly, at time &(2M) (M is an integer that is greater than or equal to 1), the symbols are arranged as follows.

Symbols having a remainder of 1 when the data carrier number is divided by 3 transmit block #(3M) data,
symbols having a remainder of 2 when the data carrier number is divided by 3 transmit block #(3M-2) data, and
symbols having a remainder of 0 when the data carrier number is divided by 3 transmit block #(3M-1) data.

When the transmission device transmits modulated signals using a frame configuration such as illustrated in FIG. 72, the negative effects caused by low portion 801 of the reception field intensity due to multi-path using FIG. 8 are not likely to be an influence. Accordingly, achieving an advantageous effect of an increase in data reception quality is likely.

In the transmission device illustrated in FIG. 1, when transmitting a modulated signal of one stream, 64QAM, which is an example of a modulation method in which there are 64 signal points in an in-phase I-orthogonal Q plane, can be set as the modulation method, and 672 bits or 1344 bits can be chosen as the code length of the error correction code.

Here, the characteristic point is "for example, the rearranging method used in rearranger 6404 illustrated in FIG. 64 differs when the code length of the error correction code is set to 672 bits and when the code length of the error correction code is set to 1344 bits". Note that operations performed by rearranger 6404 illustrated in FIG. 64 are as previously described. Then, when 672 bits is specified as the code length of the error correction code, rearranging is performed so as to achieve, for example, the configuration illustrated in FIG. 69, and when 1344 bits is specified as the code length of the error correction code, rearranging is performed so as to achieve, for example, any one of the configurations illustrated in FIG. 70, FIG. 71, and FIG. 72.

One different method for realizing such a frame configuration as described above is a method realized by interleaver 153 illustrated in FIG. 1.

For example, upon transmitting the modulated signal of one stream, when "the modulation method for s1($i$) is 64QAM and the modulation method for s2($i$) is 64QAM", the required size of the interleaver memory varies depending on whether "the code length of the error correction code" is set to "672 bits" or "the code length of the error correction code" is set to "1344 bits".

Upon transmitting a modulated signal of one stream, the required size of the interleaver memory when "the code length of the error correction code" is set to "672 bits" is 2016 bits. On the other hand, when transmitting a modulated signal of one stream, the required size of the interleaver memory when "the code length of the error correction code" is set to "1344 bits" is 4032 bits.

This point is a characteristic point. Note that, here, rearranger 6404 is not necessarily required.

Next, operations performed by the reception device, which is the partner (communication partner), will be described. One example of a frame configuration of the transmission device is given in FIG. 27.

In (a) in FIG. 27, a frame configuration of a modulated signal transmitted from antenna 112A illustrated in FIG. 1 is shown, and in (b) in FIG. 27, a frame configuration of a modulated signal transmitted from antenna 112B illustrated in FIG. 1 is shown. In (a) and (b) in FIG. 27, time is represented on the horizontal axis and frequency (carriers) is (are) represented on the vertical axis.

In (a) in FIG. 27, at time $1, preamble 2701A is transmitted. In (b) in FIG. 27, at time $1, preamble 2701B is transmitted. Here, preamble 2701A and preamble 2701B include information such as information on the transmission method, modulation method, and/or error correction code used in the modulated signal transmitted by the transmission device (for example, the encode rate and code length), and the reception device obtains this information, thereby making demodulation and decoding of the data symbol possible. Note that in FIG. 27, the preamble configuration is exemplified by the inclusion of preamble 2701A and preamble 2701B, but a preamble configuration in which only one of preamble 2701A and preamble 2701B is transmitted is acceptable. Moreover, preambles 2701A, 2701B may include a symbol for symbol detection by the reception device, a signal for performing frequency and time synchronization by the reception device, a symbol for performing AGC by the reception device, and/or a symbol for the reception device to estimate propagation path fluctuation.

In (a) in FIG. 27, at time $1, data symbol group 2702A is transmitted. In (b) in FIG. 27, at time $2, data symbol group 2702B is transmitted. Note that data symbol group 2702A and data symbol group 2702B may include a symbol other than a data symbol, such as a pilot symbol (for performing channel estimation). Moreover, data symbol groups 2702A, 2702B are transmitted at the same time, using the same frequency. Data symbol groups 2702A, 2702B conform to the data symbol arrangement and data arrangement described above. When phase change is to be performed, phase change such as described above may be performed.

In (a) in FIG. 27, at time $3, preamble 2703A is transmitted. At time $4, data symbol group 2704A is transmitted. Note that the configurations of the preamble and data symbol group are as described above. Note that no symbol is arranged at time $3 and time $4 in (b) in FIG. 27, but a symbol corresponding to preamble 2703A may be transmitted from antenna 112B illustrated in FIG. 1, and a symbol corresponding to data symbol group 2704A may be transmitted from antenna 112B illustrated in FIG. 1.

FIG. 28 is a block diagram illustrating one example of a configuration of a reception device, which is the partner (communication partner).

Radio unit 2803X receives an input of reception signal 2802X received by antenna 2801X, performs processing such as frequency conversion, and outputs reception baseband signal 2804X.

Radio unit 2803Y receives an input of reception signal 2802Y received by antenna 2801Y, performs processing such as frequency conversion, and outputs reception baseband signal 2804Y.

Modulated signal z1, u1 channel fluctuation estimator 2805_1 receives an input of reception baseband signal 2804X, performs channel estimation for modulated signal z1($i$) or modulated signal u1($i$) described above by using, for example, the pilot symbol included in reception baseband signal 2804X, and outputs channel estimation signal 2806_1.

Modulated signal z2, u2 channel fluctuation estimator 2805_2 receives an input of reception baseband signal 2804X, performs channel estimation for modulated signal z2(*i*) or modulated signal u2(*i*) described above by using, for example, the pilot symbol included in reception baseband signal 2804X, and outputs channel estimation signal 2806_2.

Modulated signal z1, u1 channel fluctuation estimator 2807_1 receives an input of reception baseband signal 2804Y, performs channel estimation for modulated signal z1(*i*) or modulated signal u1(*i*) described above by using, for example, the pilot symbol included in reception baseband signal 2804X, and outputs channel estimation signal 2808_1.

Modulated signal z2, u2 channel fluctuation estimator 2807_2 receives an input of reception baseband signal 2804Y, performs channel estimation for modulated signal z2(*i*) or modulated signal u2(*i*) described above by using, for example, the pilot symbol included in reception baseband signal 2804X, and outputs channel estimation signal 2808_2.

Control information decoder 2809 receives inputs of reception baseband signal 2804X and reception baseband signal 2804Y, demodulates and decodes a preamble illustrated in FIG. 27, and outputs control information signal 2810.

Signal processor 2811 receives inputs of channel estimation signals 2806_1, 2806_2, 2808_1, and 2808_2; reception baseband signals 2804X and 2804Y; and control information signal 2810, rearranges data based on the data symbol arrangement described above, in accordance with control information signal 2810, performs demodulation/decoding based on information on transmission parameters (transmission method, modulation method, error correction code method, etc.) included in control information signal 2810, and obtains and outputs data 2812.

Note that the memory size of the interleaver included in signal processor 2811 is switched based on information on transmission parameters (transmission method, modulation method, error correction code method, etc.) included in control information signal 2810.

As described above, by arranging data in the data carriers in accordance with this embodiment, it is possible to achieve an advantageous effect of increasing data reception quality in a reception device, which is the partner (communication partner), and it is possible to achieve an advantageous effect of increasing data reception quality in a reception device, which is the partner (communication partner) by performing phase change as described above.

(Supplemental Information 1)

As a matter of course, the present disclosure may be carried out by combining a plurality of the exemplary embodiments and other contents described herein.

Moreover, each exemplary embodiment and the other contents are mere examples. For example, while a "modulation method, an error correction encoding method (for example, error correction code, code length, encode rate used), control information, etc." are exemplified, it is possible to carry out the present disclosure with the same configuration even when other types of a "modulation method, an error correction coding method (for example, error correction code, code length, encode rate used), control information, etc." are applied.

Regarding the modulation method, even when a modulation method other than the modulation methods described herein is used, it is possible to carry out the embodiments and the other subject matter described herein. For example, Amplitude Phase Shift Keying (APSK) (such as 16APSK, 64APSK, 128APSK, 256APSK, 1024APSK and 4096APSK), Pulse Amplitude Modulation (PAM) (such as 4PAM, 8PAM, 16PAM, 64PAM, 128PAM, 256PAM, 1024PAM and 4096PAM), PSK (such as BPSK, QPSK, 8PSK, 16PSK, 64PSK, 128PSK, 256PSK, 1024PSK and 4096PSK), and QAM (such as 4QAM, 8QAM, 16QAM, 64QAM, 128QAM, 256QAM, 1024QAM and 4096QAM) may be applied, or in each modulation method, uniform mapping or non-uniform mapping may be performed.

Moreover, a method for arranging 2, 4, 8, 16, 64, 128, 256, 1024, etc., signal points on an I-Q plane (a modulation method having 2, 4, 8, 16, 64, 128, 256, 1024, etc., signal points) is not limited to a signal point arrangement method of the modulation methods described herein.

Hence, a function of outputting an in-phase component and an orthogonal component based on a plurality of bits is a function in a mapper. Then, subsequently, precoding and phase change may be applied.

In the present disclosure, when "∀" and/or "∃" is present, "∀" represents a universal quantifier, and "∃" represents an existential quantifier.

Moreover, in the present disclosure, when there is a complex plane, the phase unit such as an argument is "radian".

When the complex plane is used, display in a polar form can be made as display by polar coordinates of a complex number. When point (a, b) on the complex plane is associated with complex number z=a+jb (a and b are both actual numbers, and j is a unit of an imaginary number), and when this point is expressed by [r, θ] in polar coordinates, a=r×cos θ and b=r×sin θ, $$r=\sqrt{a^2+b^2} \quad \text{[MATH. 64]}$$

holds true, r is an absolute value of z (r=|z|), and θ is an argument. Then, z=a+jb is expressed by r×ejθ.

The present disclosure mainly describes time axis precoding weight changes and phase changes, but is applicable to a multi-carrier transmission method such as the OFDM method. Moreover, precoding weight change and phase change may be performed with respect to the frequency axis, and may be performed with respect to both the time and frequency axes.

In the present disclosure, the reception device in the terminal and the antennas may be configured as separate devices. For example, the reception device includes an interface that receives an input, via a cable, of a signal received by an antenna or a signal generated by applying a signal received by an antenna with a frequency conversion, and the reception device performs subsequent processing.

Moreover, data/information obtained by the reception device is subsequently converted into a video or a sound, and a display (monitor) displays the video or a speaker outputs the sound. Further, the data/information obtained by the reception device may be subjected to signal processing related to a video or a sound (signal processing may not be performed), and may be output from an RCA terminal (a video terminal or an audio terminal), a Universal Serial Bus (USB), or a High-Definition Multimedia Interface (registered trademark) (HDMI) of the reception device.

Herein, it can be considered that communications and broadcast apparatuses such as a broadcast station, a base station, an access point, a terminal and a mobile phone includes the transmission device. In these cases, it can be considered that a communication apparatus such as a television, a radio, a terminal, a personal computer, a mobile phone, an access point and a base station includes the reception device. Moreover, it can also be considered that the transmission device and reception device according to the present disclosure are each a device having communication functions and is formed so as to be connectable via some interface to an apparatus for executing an application in, for example, a television, a radio, a personal computer or a mobile phone.

Moreover, in this embodiment, symbols other than data symbols, such as pilot symbols (preamble, unique word, post-amble, reference symbol, etc.) or symbols for control information, may be arranged in any way in a frame. Here, the terms "pilot symbol" and "control information" are used, but the naming of such symbols is not important; the functions that they perform are.

A pilot symbol may be a known symbol that is modulated using PSK modulation in a transceiver, and the receiver detects, for example, frequency synchronization, time synchronization, and a channel estimation (Channel State Information (CSI)) symbol (of each modulated signal) by using the symbol. Note that a known symbol transmitted by a transmitter that is modulated using PSK modulation can be known by a receiver by the receiver being periodic.

Moreover, the symbol for control information is a symbol for transmitting information required to be transmitted to a communication partner in order to establish communication pertaining to anything other than data (such as application data) (this information is, for example, the modulation method, error correction encoding method, or encode rate of the error correction encoding method used in the communication, or settings information in an upper layer).

Note that the present disclosure is not limited to each exemplary embodiment, and can be carried out with various modifications. For example, in each embodiment, the present disclosure is described as being performed as a communications device. However, the present disclosure is not limited to this case, and this communications method can also be used as software.

Moreover, in the above description, precoding switching methods in a method for transmitting two modulated signals from two antennas are described, but these examples are not limiting. A precoding switching method in which precoding weight (matrix) is changed similarly in a method in which precoding is performed on four mapped signals to generate four modulated signals and transmitted from four antennas, that is to say, a method in which precoding is performed on N mapped signals to generate N modulated signals and transmitted from N antennas, can also be applied.

The terms "precoding" and "precoding weight" are used in the written description. The terms used to refer to such signal processing are not important per-se; the signal processing itself is what is important to the present disclosure.

Streams $s1(t)$ and $s2(t)$ may transmit different data, and may transmit the same data.

The transmitting antenna in the transmission device, the reception antenna in the reception device, and each signal antenna illustrated in the drawings may be configured of a plurality of antennas.

The transmission device and reception device may also be notified of the transmission method (MIMO, SISO, temporal-spatial block code, interleaving method), modulation method, and/or error correction encoding method. This configuration may be omitted depending on the embodiment.

A symbol that transmits such information is included in the frame that the transmission device transmits. The reception device changes its operation by obtaining such a symbol.

Note that a program for executing the above-described communications method may be stored in Read Only Memory (ROM) in advance to cause a Central Processing Unit (CPU) to operate this program.

Moreover, the program for executing the communications method may be stored in a computer-readable storage medium, the program stored in the recording medium may be recorded in Random Access Memory (RAM) in a computer, and the computer may be caused to operate according to this program.

Each configuration of each of the above-described embodiments, etc., may be realized as a Large Scale Integration (LSI) circuit, which is typically an integrated circuit. These integrated circuits may be formed as separate chips, or may be formed as one chip so as to include the entire configuration or part of the configuration of each embodiment.

LSI is described here, but the integrated circuit may also be referred to as an Integrated Circuit (IC), a system LSI circuit, a super LSI circuit or an ultra LSI circuit depending on the degree of integration. Moreover, the circuit integration technique is not limited to LSI, and may be realized by a dedicated circuit or a general purpose processor. After manufacturing of the LSI circuit, a programmable Field Programmable Gate Array (FPGA) or a reconfigurable processor which is reconfigurable in connection or settings of circuit cells inside the LSI circuit may be used.

Further, when development of a semiconductor technology or another derived technology provides a circuit integration technology which replaces LSI, as a matter of course, functional blocks may be integrated by using this technology. Adaption of biotechnology, for example, is a possibility.

The present disclosure can be widely applied to radio systems that transmit different modulated signals from different antennas. Moreover, the present disclosure can also be applied when MIMO transmission is used in a wired communications system including a plurality of transmission points (for example, a power line communication (PLC) system, an optical transmission system, a digital subscriber line (DSL) system).

Embodiment 5

In this embodiment, an implementation method will be described that is different from the implementation method described in Embodiment 4 in which 64QAM is selected as the modulation method by the transmission device. Note that description of operations that overlap with Embodiment 4 will be omitted.

Similar to Embodiment 4, in this embodiment as well, in addition to the code length of the error correction code in Embodiment 1, an implementation method in which it is possible to use an error correction code having a longer code length than the error correction code in Embodiment 1 will be described.

Similar to Embodiment 4, in this embodiment as well, as one example, an implementation method in which an error correction code having a code length of 672 bits and an error correction code having a code length of 1344 (=672×2) bits are used will be described.

The implementation method using the 672 bit code length error correction code is as described in Embodiment 1 with reference to FIG. 1 through FIG. 28, and since this has been described in detail in Embodiment 1, repeated description will be omitted. Hereinafter, information not described in Embodiment 1 will be described.

FIG. 1 illustrates a configuration of a transmission device according to this embodiment. Note that basic operations in FIG. 1 are as described in Embodiment 1. Encoder 151 illustrated in FIG. 1 receives inputs of data 150 and frame configuration signal 113. Here, frame configuration signal 113 includes information on the error correction code to be used, and in particular includes information on the code length (in this embodiment, a block length of 672 bits or a code length of 1344 bits) of the error correction code to be used.

Accordingly, based on frame configuration 113, encoder 151 selects an error correction code including the code length of the error correction code to be used, and, for example, sets the encode rate of the error correction code, error correction encodes data 150, and outputs encoded data 152.

Moreover, the transmission device illustrated in FIG. 1 selects a MIMO transmission method. The implementation method used upon transmitting the modulated signal is as described in Embodiment 1, and therefore description here will be omitted.

Next, just as in Embodiment 1, for example, one example of a frame configuration of a modulated signal transmitted by the transmission device illustrated in FIG. 1 when a multi-carrier transmission method such as OFDM is used is illustrated in FIG. 6.

FIG. 6 illustrates an example of an arrangement of symbols along the horizontal frequency axis, and illustrates a symbol arrangement for two modulated signals transmitted from an antenna different than shown above. For example, FIG. 6 illustrates a configuration example of data carriers (data symbols) and pilot symbols (reference symbols) (indicated as "P" in FIG. 6). Note that FIG. 6 is merely one example; other symbols may be present. Here, a data carrier is a symbol for transmitting data to a partner (communication partner) via MIMO transmission, and a pilot symbol is a symbol for a partner (communication partner) to estimate (channel estimation) propagation fluctuation.

In FIG. 6, as one example, the number of data carriers among the 1OFDM symbols (data carriers on the frequency axis) is 336 (accordingly, at each point in time, data carrier $1 through data carrier $336 are present), and a pilot symbol may be inserted between two data carriers. Note that in FIG. 6, time &1 and time &2 differ in regard to pilot carrier insertion position along the frequency axis, but this configuration is not limiting.

In FIG. 6, data carriers are arranged along the frequency axis in the following order: "data carrier $1", "data carrier $2", "data carrier $3", "data carrier $4", "data carrier $5", "data carrier $6", "data carrier $7", "data carrier $8", "data carrier $9", "data carrier $10", "data carrier $11", "data carrier $12", "data carrier $13" . . . "data carrier $330", "data carrier $331", "data carrier $332", "data carrier $333", "data carrier $334", "data carrier $335", and "data carrier $336". In other words, data carriers are assigned with numbers in ascending order along the frequency axis.

Figure 74:
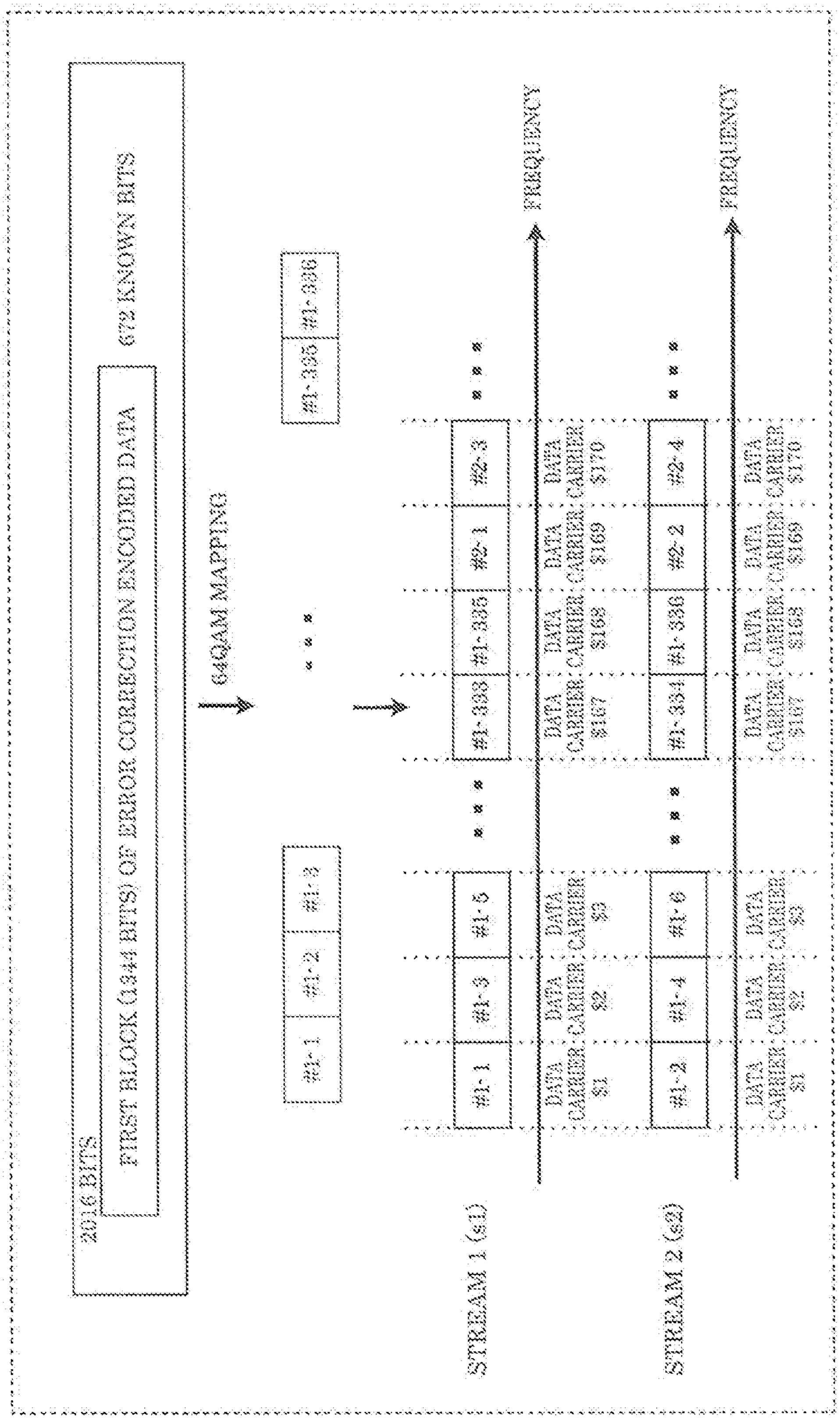
FIG. 74 illustrates an example of an arrangement of symbols in data carriers.

FIG. 74 illustrates an arrangement example of data carriers when the modulation method for stream 1($s$1($i$)) is 64QAM, which is an example of a modulation method in which there are 64 signal points in an in-phase I-orthogonal Q plane, and the modulation method for stream 2($s$2($i$)) is 64QAM, which is an example of a modulation method in which there are 64 signal points in an in-phase I-orthogonal Q plane. Here, as one example, the block length (code length) in the error correction code is 1344 bits.

As illustrated in FIG. 74, first, transmission device adds 672 known bits (bits that are known to the transmission device and the reception device, which is the communication partner to the transmission device) (for example, all 672 bits are "zero") to the first block configured of 1344 error correction encoded bits, to thereby create 2016 bit data. Note that the configuration method of the known bits is not limited to this example.

The 2016-bit data created by adding 672 known bits to the first block configured of 1344 error correction encoded bits is referred to as block #1 and denoted as "#1". Accordingly, an N-th (N is an integer greater than or equal to 1) block configured of 2016 bits is referred to as block #N and denoted as "#N".

In FIG. 74, the 336 symbols generated from block #1 are indicated as "#1-1", "#1-2", "#1-3", "#1-4" . . . "#1-334", "#1-335", and "#1-336". Accordingly, the 336 symbols generated from block #N are expressed as "#N-1", "#N-2", "#N-3", "#N-4" . . . "#N-334", "#N-335", and "#N-336".

Moreover, in FIG. 74, the data carriers are illustrated arranged along the horizontal frequency axis. In stream 1, data carriers from data carrier $1 to data carrier $336 are present, and similarly, in stream 2, data carriers from data carrier $1 to data carrier $336 are present.

Then, data carrier $1 in stream 1 and data carrier $1 in stream 2 are transmitted (from different antennas) at the same frequency and at the same time, and data carrier $2 in stream 1 and data carrier $2 in stream 2 are transmitted (from different antennas) at the same frequency and at the same time. In other words, data carrier $L in stream 1 and data carrier $L in stream 2 are transmitted (from different antennas) at the same frequency and at the same time. L is an integer that is greater than or equal to 1 and less than or equal to 336.

As illustrated in FIG. 74, each data carrier in each stream is assigned with a symbol.

Data carrier $1 in stream 1 is assigned with the symbol "#1-1", data carrier $1 in stream 2 is assigned with the symbol "#1-2", data carrier $2 in stream 1 is assigned with the symbol "#1-3", data carrier $2 in stream 2 is assigned with the symbol "#1-4", data carrier $3 in stream 1 is assigned with the symbol "#1-5", and data carrier $3 in stream 2 is assigned with the symbol "#1-6". The symbols are assigned in accordance with such a rule. Accordingly, the data in block #1 is transmitted from the transmission device using data carrier $1 through $167 in stream 1 and data carrier $1 through $167 in stream 2.

In accordance with the same rule, the data in block #2 is transmitted from the transmission device using data carrier $169 through $336 in stream 1 and data carrier $169 through $336 in stream 2.

This is how the symbols are arranged for time &1. Similarly, when the symbols are arranged, at time &2, the symbols are arranged as follows.

The data in block #3 is transmitted from the transmission device using data carrier $1 through $167 in stream 1 and data carrier $1 through $167 in stream 2.

The data in block #4 is transmitted from the transmission device using data carrier $169 through $336 in stream 1 and data carrier $169 through $336 in stream 2.

Accordingly, at time &M (M is an integer that is greater than or equal to 1), the symbols are arranged as follows.

The data in block #(2M-1) is transmitted from the transmission device using data carrier $1 through $167 in stream 1 and data carrier $1 through $167 in stream 2($s$2($i$)).

The data in block #(2M) is transmitted from the transmission device using data carrier $169 through $336 in stream 1 and data carrier $169 through $336 in stream 2($s2(i)$).

Hereinbefore an example of inserting known bits is given, but the 336 symbols in block #k (k is an integer that is greater than or equal to 1) may be generated using a different method. For example, the 1344 bits of error correction encoded data (error correction encoded code language) for generating block #k may be generated by performing 64QAM mapping, generating 224 symbols, and further generating 336-224=112 null symbols (in-phase component I=0 (zero) and orthogonal component Q=0 (zero)) to achieve a total of 336 symbols. Note that the 112 symbols need not be null symbols; in-phase component I and orthogonal component Q may be any values that are identical.

Next, consider a case in which the transmission device transmits modulated signals using a frame configuration such as illustrated in FIG. 74. A conceptual illustration of the reception field intensity in a reception device, which is the partner (communication partner) of the transmission device illustrated in FIG. 1, is provided in FIG. 8.

In FIG. 8, as a side effect of multi-path, low portion 801 of the reception field intensity is present. When the transmission device transmits a modulated signal using a frame configuration such as illustrated in FIG. 7, as a side effect of multi-path (low portion 801 of the reception field intensity illustrated in FIG. 8), it is likely that this will cause a phenomenon in which low reception quality symbols are prevalent among the symbols in the same block in the error correction code. This makes it likely that data reception quality will decrease since high error correction performance cannot be achieved.

As another example, consider a frame configuration such as illustrated in FIG. 9. As illustrated in FIG. 9, each data carrier in each stream is assigned with a symbol.

Data carrier $1 in stream 1 is assigned with the symbol "#1-1",
data carrier $1 in stream 2 is assigned with the symbol "#2-1",
data carrier $2 in stream 1 is assigned with the symbol "#1-2",
data carrier $2 in stream 2 is assigned with the symbol "#2-2",
data carrier $3 in stream 1 is assigned with the symbol "#1-3",
data carrier $3 in stream 2 is assigned with the symbol "#2-3",
(recitation for data carrier $4 through data carrier $332 is omitted),
data carrier $333 in stream 1 is assigned with the symbol "#1-333",
data carrier $333 in stream 2 is assigned with the symbol "#2-333",
data carrier $334 in stream 1 is assigned with the symbol "#1-334",
data carrier $334 in stream 2 is assigned with the symbol "#2-334",
data carrier $335 in stream 1 is assigned with the symbol "#1-335",
data carrier $335 in stream 2 is assigned with the symbol "#2-335",
data carrier $336 in stream 1 is assigned with the symbol "#1-336", and
data carrier $336 in stream 2 is assigned with the symbol "#2-336".

This is how the symbols are arranged for time &1. Accordingly, symbols for odd number data carriers transmit block #1 data, and symbols for even number data carriers transmit block #2 data.

At time &2, the symbols are arranged as follows.

Stream 1 transmits block #3 data and stream 2 transmits block #4 data.

Accordingly, at time &M, the symbols are arranged as follows. M is an integer that is greater than or equal to 1.

Stream 1 transmits block #(2M-1) data and stream 2($s2(i)$) transmits block #(2M) data.

In the case of a frame configuration such as illustrated in FIG. 9, there is a low chance of the phenomenon described in regard to FIG. 8 occurring.

Consider a case in which the precoding matrix is expressed as illustrated in Equation (4), [1] "b is zero and c is zero" or [2] "a is zero and d is zero" or [3] "an absolute value of b and an absolute value of c are extremely lower than an absolute value of a and an absolute value of d", [4] "an absolute value of a and an absolute value of d are extremely lower than an absolute value of b and an absolute value of c". In such a case, when the reception field intensity of stream 1 of the partner (communication partner) decreases, or when the reception field intensity of stream 2($s2(i)$) of the partner (communication partner) decreases, for example, it is likely that a phenomenon in which, at time &1, the reception quality of block #1 or the reception quality of block #2 decreases will occur.

In order to facilitate understanding of the phenomenon described with reference to FIG. 8 and the phenomenon resulting from a frame configuration such as illustrated in FIG. 9, consider, for example, a frame configuration such as illustrated in FIG. 10.

As illustrated in FIG. 10, each data carrier in each stream is assigned with a symbol.

Data carrier $1 in stream 1 is assigned with the symbol "#1-1",
data carrier $1 in stream 2 is assigned with the symbol "#1-2",
data carrier $2 in stream 1 is assigned with the symbol "#2-1",
data carrier $2 in stream 2 is assigned with the symbol "#2-2",
data carrier $3 in stream 1 is assigned with the symbol "#1-3",
data carrier $3 in stream 2 is assigned with the symbol "#1-4",
data carrier $4 in stream 1 is assigned with the symbol "#2-3",
data carrier $4 in stream 2 is assigned with the symbol "#2-4",
(recitation for data carrier $5 through data carrier $332 is omitted),
data carrier $333 in stream 1 is assigned with the symbol "#1-333", data carrier $333 in stream 2 is assigned with the symbol "#1-334", data carrier $334 in stream 1 is assigned with the symbol "#2-333", data carrier $334 in stream 2 is assigned with the symbol "#2-334", data carrier $335 in stream 1 is assigned with the symbol "#1-335", data carrier $335 in stream 2 is assigned with the symbol "#1-336", data carrier $336 in stream 1 is assigned with the symbol "#2-335", and
data carrier $336 in stream 2 is assigned with the symbol "#2-336".

This is how the symbols are arranged for time &1. Accordingly, symbols for odd number data carriers transmit block #1 data, and symbols for even number data carriers transmit block #2 data.

At time &2, the symbols are arranged as follows.

Symbols for odd number data carriers transmit block #3 data, and symbols for even number data carriers transmit block #4 data.

Accordingly, at time &M, the symbols are arranged as follows. M is an integer that is greater than or equal to 1.

Symbols for odd number data carriers transmit block #(2M-1) data, and symbols for even number data carriers transmit block #(2M) data.

When the transmission device transmits modulated signals using a frame configuration such as illustrated in FIG. 10, the negative effects caused by low portion 801 of the reception field intensity due to multi-path using FIG. 8 are not likely to be an influence in the case of the frame configuration illustrated in FIG. 59. Moreover, inhibiting a decrease in data reception quality such as described with reference to FIG. 9 is likely. Accordingly, achieving an advantageous effect of an increase in data reception quality is likely.

In order to facilitate understanding of the phenomenon described with reference to FIG. 8 and the phenomenon resulting from a frame configuration such as illustrated in FIG. 9, consider, for example, a frame configuration such as illustrated in FIG. 11.

As illustrated in FIG. 11, each data carrier in each stream is assigned with a symbol.

Data carrier $1 in stream 1 is assigned with the symbol "#1-1", data carrier $1 in stream 2 is assigned with the symbol "#2-1", data carrier $2 in stream 1 is assigned with the symbol "#2-2", data carrier $2 in stream 2 is assigned with the symbol "#1-2", data carrier $3 in stream 1 is assigned with the symbol "#1-3", data carrier $3 in stream 2 is assigned with the symbol "#2-3", data carrier $4 in stream 1 is assigned with the symbol "#2-4", data carrier $4 in stream 2 is assigned with the symbol "#1-4", (recitation for data carrier $5 through data carrier $332 is omitted), data carrier $333 in stream 1 is assigned with the symbol "#1-333", data carrier $333 in stream 2 is assigned with the symbol "#2-333", data carrier $334 in stream 1 is assigned with the symbol "#2-334", data carrier $334 in stream 2 is assigned with the symbol "#1-334", data carrier $335 in stream 1 is assigned with the symbol "#1-335", data carrier $335 in stream 2 is assigned with the symbol "#2-335", data carrier $336 in stream 1 is assigned with the symbol "#2-336", and data carrier $336 in stream 2 is assigned with the symbol "#1-336".

This is how the symbols are arranged for time &1. Accordingly, symbols for odd number data carriers and stream 1 transmit block #1 data.

Symbols for odd number data carriers and stream 2 transmit block #2 data.

Symbols for even number data carriers and stream 1 transmit block #2 data.

Symbols for even number data carriers and stream 2 transmit block #1 data.

At time &2, the symbols are arranged as follows.

Symbols for odd number data carriers and stream 1 transmit block #3 data.

Symbols for odd number data carriers and stream 2 transmit block #4 data.

Symbols for even number data carriers and stream 1 transmit block #4 data.

Symbols for even number data carriers and stream 2 transmit block #3 data.

Accordingly, at time &M (M is an integer that is greater than or equal to 1), the symbols are arranged as follows.

Symbols for odd number data carriers and stream 1 transmit block #(2M-1) data.

Symbols for odd number data carriers and stream 2 transmit block #(2M) data.

Symbols for even number data carriers and stream 1 transmit block #(2M) data.

Symbols for even number data carriers and stream 2 transmit block #(2M-1) data.

When the transmission device transmits modulated signals using a frame configuration such as illustrated in FIG. 11, the negative effects caused by low portion 801 of the reception field intensity due to multi-path using FIG. 8 are not likely to be an influence in the case of the frame configuration illustrated in FIG. 74. Moreover, inhibiting a decrease in data reception quality such as described with reference to FIG. 9 is likely. Accordingly, achieving an advantageous effect of an increase in data reception quality is likely.

Note that the element that implements the frame configuration such as described above can be radio units 110A and 110B illustrated in FIG. 1 (same applies to Embodiment 1). Examples of configurations of radio units 110A and 110B are illustrated in FIG. 64.

In FIG. 64, modulated signal 6401 corresponds to 109A or 109B illustrated in FIG. 1. Frame configuration signal 6400 corresponds to frame configuration 113 illustrated in FIG. 1, control information signal 6410 corresponds to control information signal 117Z illustrated in FIG. 1, and transmission signal 6409 corresponds to transmission signal 111A or 111B illustrated in FIG. 1.

Serial-parallel converter 6402 receives inputs of modulated signal 6401 and frame configuration signal 6400, and based on frame configuration signal 6400, applies a serial-parallel conversion to modulated signal 6401, and outputs serial-parallel converted signal 6403.

Rearranger 6404 receives inputs of serial-parallel converted signal 6403, control information signal 6410, and frame configuration signal 6400, and based on frame configuration signal 6400, rearranges serial-parallel converted signal 6403 and control information signal 6410, and outputs rearranged signal 6405. Here, in particular, based on information on the code length of the error correction code, information on the modulation method, and information on the transmission method included in frame configuration signal 6400, rearranger 6404 switches the rerarranging method for serial-parallel converted signal 6403 (data symbols) based on the method described above.

Characteristic points are "when MIMO transmission method is applied, the modulation method for s1($i$) is specified as 16QAM, and the modulation method for s2($i$) is specified as 16QAM, the rearranged method is different for when the code length of the error correction code is specified as 672 bits and for when the code length is specified as 1344 bits" and "when MIMO transmission method is applied, the modulation method for s1($i$) is specified as 64QAM, and the modulation method for s2($i$) is specified as 64QAM, the rearranged method is different for when the code length of the error correction code is specified as 672 bits and for when the code length is specified as 1344 bits".

The rearranging operations when the modulation method is 16QAM and the code length of the error correction code is specified as 672 bits are as described in Embodiment 1. The rearranging operations when the modulation method is 16QAM and the code length of the error correction code is specified as 1344 bits are as described in Embodiment 4. The rearranging operations when the modulation method is 64QAM and the code length of the error correction code is specified as 672 bits are as described in Embodiment 1. The rearranging operations when the modulation method is 64QAM and the code length of the error correction code is specified as 1344 bits are as described in this embodiment.

IFFT unit 6406 receives inputs of rearranged signal 6405 and frame configuration signal 6400, applies an IFFT to rearranged signal 6405, and outputs an IFFT signal 6407.

RF unit 6408 receives inputs of IFFT signal 6407 and a frame configuration signal, applies processing such as orthogonal modulation, frequency conversion, bandlimiting, and/or signal amplification, and outputs transmission signal 6409.

One different method for realizing such a frame configuration as described above is a method realized by interleaver 153 illustrated in FIG. 1.

For example, when MIMO transmission method is applied and the code length of the error correction code is set to 672 bits, the required size of the interleaver memory varies depending on whether "the modulation method for s1($i$) is set to QPSK and the modulation method for s2($i$) is set to QPSK", "the modulation method for s1($i$) is set to 16QAM and the modulation method for s2($i$) is set to 16QAM", or "the modulation method for s1($i$) is set to 64QAM and the modulation method for s2($i$) is set to 64QAM".

When MIMO transmission method is applied and "the modulation method for s1($i$) is set to QPSK and the modulation method for s2($i$) is set to QPSK", the required memory size is two encoded blocks worth of 1344 bits. However, when "the modulation method for s1($i$) is set to 16QAM and the modulation method for s2($i$) is set to 16QAM" is specified, the required memory size is four encoded blocks worth of 2688 bits. Moreover, when "the modulation method for s1($i$) is set to 64QAM and the modulation method for s2($i$) is set to 64QAM" is specified, the required memory size is six encoded blocks worth of 4032 bits.

When MIMO transmission method is applied and the code length of the error correction code is set to 1344 bits, the required size of the interleaver memory varies depending on whether "the modulation method for s1($i$) is set to QPSK and the modulation method for s2($i$) is set to QPSK", "the modulation method for s1($i$) is set to 16QAM and the modulation method for s2($i$) is set to 16QAM", or "the modulation method for s1($i$) is set to 64QAM and the modulation method for s2($i$) is set to 64QAM".

When MIMO transmission method is applied and "the modulation method for s1($i$) is set to QPSK and the modulation method for s2($i$) is set to QPSK", the required memory size is one encoded block worth of 1344 bits. However, when "the modulation method for s1($i$) is set to 16QAM and the modulation method for s2($i$) is set to 16QAM" is specified, the required memory size is two encoded blocks worth of 2688 bits. Moreover, when "the modulation method for s1($i$) is set to 64QAM and the modulation method for s2($i$) is set to 64QAM" is specified, the required memory size is two encoded blocks worth of 2688 bits.

This point is a characteristic point. Note that, here, rearranger 6404 is not necessarily required.

Figure 75:
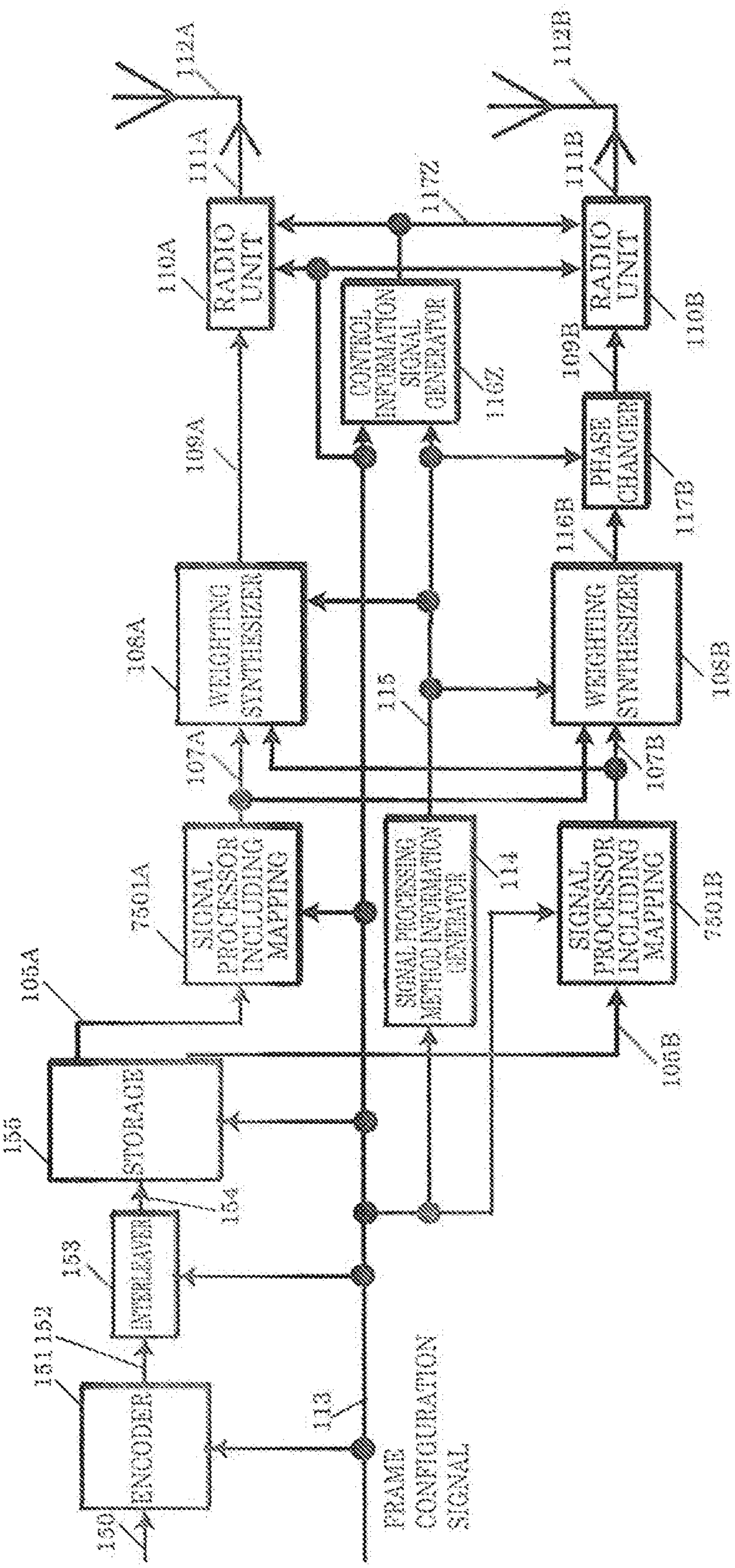
FIG. 75 illustrates an example of a configuration of a transmission device.

As described above, FIG. 75 illustrates one example of a transmission device configuration for inserting known bits or null bits, for example. Note that in FIG. 75, operations that are the same as in FIG. 1 share like reference marks, and duplicate description thereof is omitted. Note that the following is not limited to null symbol insertion.

Signal processor including mapping 7501A receives inputs of data 105A in stream #1 and frame configuration signal 113, and based on "information on modulation method", "information related to error correction code (including information on code length)" included in frame configuration signal 113, for example, determines whether insertion of the above-described known bits or null bits is necessary.

When signal processor including mapping 7501A determines that insertion of known bits or null bits is required, signal processor including mapping 7501A inserts known bits or null bits, maps data 105A in stream #1, and outputs mapped baseband signal 107A. When signal processor including mapping 7501A determines that insertion of known bits or null bits is not required, signal processor including mapping 7501A maps data 105A in stream #1, and outputs mapped baseband signal 107A.

Similarly, signal processor including mapping 7501B receives inputs of data 105B in stream #2 and frame configuration signal 113, and based on "information on modulation method", "information related to error correction code (including information on code length)" included in frame configuration signal 113, for example, determines whether insertion of the above-described known bits or null bits is necessary.

When signal processor including mapping 7501B determines that insertion of known bits or null bits is required, signal processor including mapping 7501B inserts known bits or null bits, maps data 105B in stream #2, and outputs mapped baseband signal 107B. When signal processor including mapping 7501B determines that insertion of known bits or null bits is not required, signal processor including mapping 7501B maps data 105B in stream #2, and outputs mapped baseband signal 107B.

Next, a phase change method in the transmission device illustrated in FIG. 1 in which phase change is performed when a plurality of modulated signals are transmitted from a plurality of antennas will be described.

The transmission method including performing precoding and phase change is as shown in Equation (3), Equation (37), Equation (38), and Equation (39), just as described above. Hereinafter, a specific application example of the phase change shown in Equation (3), Equation (37), Equation (38), and Equation (39) will be given. In other words, a method of changing y(i) in Equation (3), Equation (37), Equation (38), and Equation (39) will be described.

FIG. 10 illustrates an arrangement example of data carriers when the modulation method for stream 1($s$1($i$)) is 64QAM, which is an example of a modulation method in which there are 64 signal points in an in-phase I-orthogonal Q plane, and the modulation method for stream 2($s$2($i$)) is 64QAM, which is an example of a modulation method in which there are 64 signal points in an in-phase I-orthogonal Q plane, and, for example, when insertion of the above-described known bits or null bits is performed. Here, as one example, the block length (code length) in the error correction code is 1344 bits, and as described above, known data or null symbols are inserted to generate 336 symbols in a block.

FIG. 18 illustrates an example of how phase change value y(i) is assigned when data is arranged in data carriers such as in FIG. 10. As illustrated in FIG. 18, in data carrier $1, when phase change is performed using y(0), phase change is performed using y(0) for data carrier $2 as well.

Similarly, in data carrier $3, when phase change is performed using y(1), phase change is performed using y(1) for data carrier $4 as well.

Note that recitation for data carrier $5 through data carrier $332 is omitted.

In data carrier $333, when phase change is performed using y(166), phase change is performed using y(166) for data carrier $334 as well.

In data carrier $335, when phase change is performed using y(167), phase change is performed using y(167) for data carrier $336 as well.

In other words, in data carrier $(2×k+1) and data carrier $(2*k*+2), phase change is performed using the same phase change value (y(k) in FIG. 18) (k is an integer that is greater than or equal to 0).

With this, with respect to block #1, phase is changed in an unbiased manner, and with respect to block #2 as well, phase is changed in an unbiased manner. Accordingly, in both block #1 and block #2, since it is possible to achieve a sufficient advantageous effect with the phase change, it is possible to achieve an advantageous effect of increase data quality of the reception device, which is the partner (communication partner).

FIG. 11 illustrates an arrangement example of data carriers when the modulation method for stream 1(*s*1(*i*)) is 64QAM, which is an example of a modulation method in which there are 64 signal points in an in-phase I-orthogonal Q plane, and when the modulation method for stream 2(*s*2(*i*)) is 64QAM, which is an example of a modulation method in which there are 64 signal points in an in-phase I-orthogonal Q plane, and, for example, when insertion of the above-described known bits or null bits is performed. The example illustrated in FIG. 11 is different from the example illustrated in FIG. 10. Here, as one example, the block length (code length) in the error correction code is 1344 bits, and as described above, known data or null symbols are inserted to generate 336 symbols in a block.

FIG. 19 illustrates an example of how phase change value y(i) is assigned when data is arranged in data carriers such as in FIG. 11. As illustrated in FIG. 19, in data carrier $1, when phase change is performed using y(0), phase change is performed using y(0) for data carrier $2 as well.

Similarly, in data carrier $3, when phase change is performed using y(1), phase change is performed using y(1) for data carrier $4 as well.

Note that recitation for data carrier $5 through data carrier $332 is omitted.

In data carrier $333, when phase change is performed using y(166), phase change is performed using y(166) for data carrier $334 as well.

In data carrier $335, when phase change is performed using y(167), phase change is performed using y(167) for data carrier $336 as well.

In other words, in data carrier $(2×k+1) and data carrier $(2*k*+2), phase change is performed using the same phase change value (y(k) in FIG. 18). k is an integer that is greater than or equal to 0.

With this, with respect to block #1, phase is changed in an unbiased manner, and with respect to block #2 as well, phase is changed in an unbiased manner. Accordingly, in both block #1 and block #2, since it is possible to achieve a sufficient advantageous effect with the phase change, it is possible to achieve an advantageous effect of increase data quality of the reception device, which is the partner (communication partner).

FIG. 20 illustrates an example of how phase change value y(i) is assigned "when data is arranged in data carriers such as in FIG. 11". The example illustrated in FIG. 20 is different from the example illustrated in FIG. 19. As illustrated in FIG. 20, y(0) is used in data carrier $1, y(1) is used in data carrier $2, y(2) is used in data carrier $3, y(3) is used in data carrier $4, (recitation for data carrier $5 through data carrier $332 is omitted), y(332) is used in data carrier $333, y(333) is used in data carrier $334, y(334) is used in data carrier $335, and y(335) is used in data carrier $336 to perform phase change.

In other words, a phase change is performed using phase change value y(k) in data carrier $(k+1), that is to say, phase change is performed in units of data carriers (k is an integer that is greater than or equal to 0).

With this, with respect to block #1, phase is changed in an unbiased manner, and with respect to block #2 as well, phase is changed in an unbiased manner. Accordingly, in both block #1 and block #2, since it is possible to achieve a sufficient advantageous effect with the phase change, it is possible to achieve an advantageous effect of increase data quality of the reception device, which is the partner (communication partner).

When the modulation method for stream 1(*s*1(*i*)) is 16QAM, which is an example of a modulation method in which there are 16 signal points in an in-phase I-orthogonal Q plane, the modulation method for stream 2(*s*2(*i*)) is 16QAM, which is an example of a modulation method in which there are 16 signal points in an in-phase I-orthogonal Q plane, and the block length (code length) of the error correction code is 1344 bits, the method used to arrange the data carriers and the allocation of phase change value y(i) is as described in Embodiment 4 and illustrated in FIG. 59 and FIG. 8 through FIG. 11, and as such, duplicate description will be omitted.

Next, as an example different from above, a case in which a single stream is transmitted will be described.

A case will be described in which a single stream is transmitted using the transmission device illustrated in FIG. 1, for example, a modulated signal generated by mapper 106A is transmitted from antenna 112A; that is to say, a case in which mapper 106B does not operate and a modulated signal is not transmitted from antenna 112B. Note that when transmitting a single stream, for example, a modulated signal generated by mapper 106A may be transmitted from a plurality of antennas.

FIG. 69 illustrates an arrangement example of data carriers when the modulation method for a single stream is 64QAM, which is an example of a modulation method in which there are 64 signal points in an in-phase I-orthogonal Q plane. Here, as one example, the block length (code length) in the error correction code is 672 bits. A first block configured of 672 bits that are error correction encoded is referred to as block #1 and denoted as "#1". Accordingly, an N-th (N is an integer greater than or equal to 1) block configured of 672 bits that are error correction encoded is referred to as block #N and denoted as "#N".

Note that the method used to arrange the symbols is as described in Embodiment 4, and as such, duplicate description will be omitted here.

When the transmission device transmits modulated signals using a frame configuration such as illustrated in FIG. 69, the negative effects caused by low portion 801 of the reception field intensity due to multi-path using FIG. 8 are not likely to be an influence. Accordingly, achieving an advantageous effect of an increase in data reception quality is likely.

Figure 76:
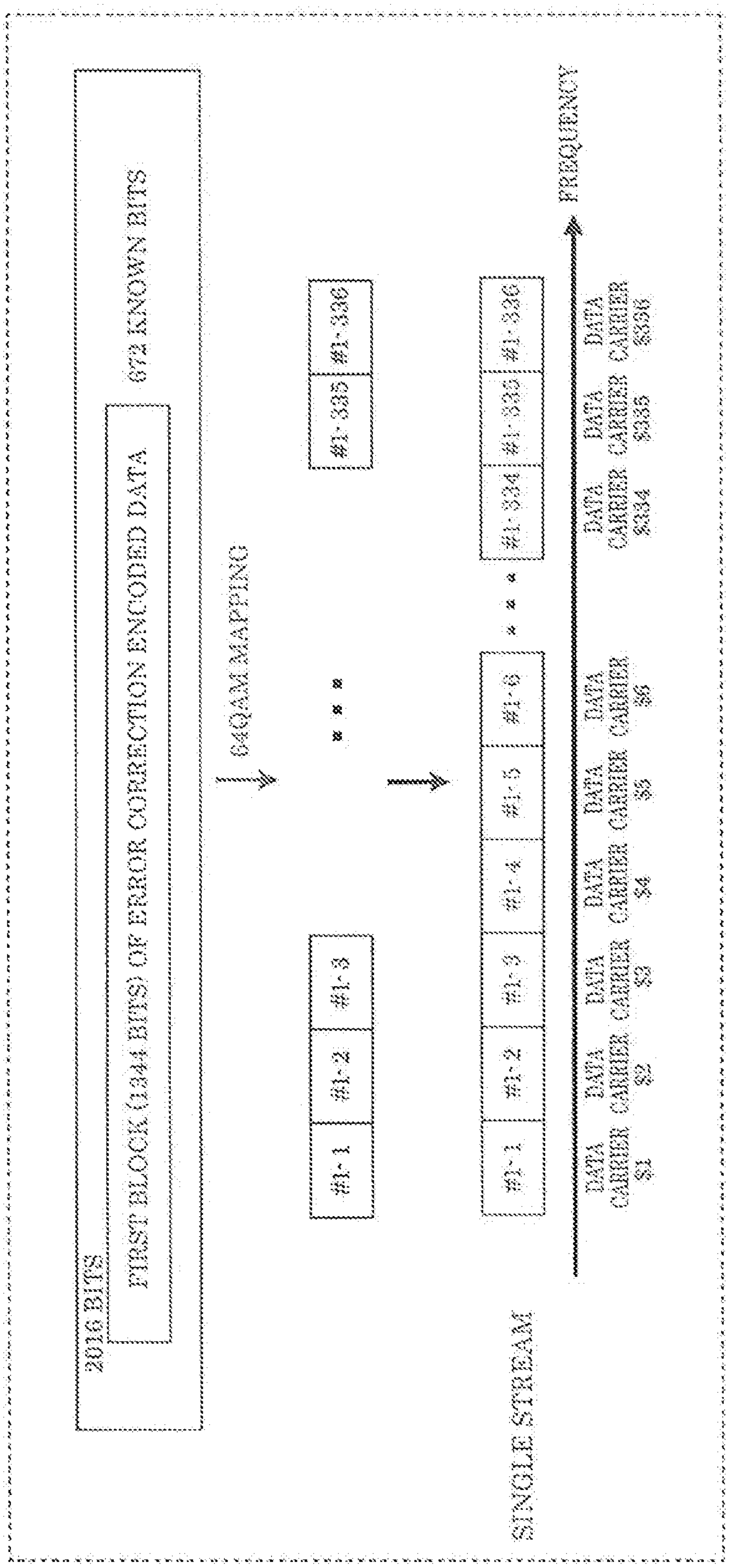
FIG. 76 illustrates an example of an arrangement of symbols in data carriers.

FIG. 76 illustrates an arrangement example of data carriers when the modulation method for a single stream is 64QAM, which is an example of a modulation method in which there are 64 signal points in an in-phase I-orthogonal Q plane. Here, as one example, the block length (code length) in the error correction code is 1344 bits.

As illustrated in FIG. 76, first, the transmission device adds 672 known bits (for example, all 672 bits are "zero") to the first block configured of 1344 error correction encoded bits, to thereby create 2016 bit data. Note that the configuration method of the known bits is not limited to this example. Note that a known bit is a bit that is known to the transmission device and the reception device, which is the communication partner to the transmission device.

The 2016-bit data created by adding 672 known bits to the first block configured of 1344 error correction encoded bits is referred to as block #1 and denoted as "#1". Accordingly, an N-th (N is an integer greater than or equal to 1) block configured of 2016 bits is referred to as block #N and denoted as "#N".

When 64QAM is applied, 336 symbols are generated from block #N. Accordingly, the 336 symbols generated from block #1 are indicated as "#1-1", "#1-2", "#1-3", "#1-4" . . . "#1-334", "#1-335", and "#1-336". Accordingly, the 336 symbols generated from block #N are expressed as "#N-1", "#N-2", "#N-3", "#N-4" . . . "#N-334", "#N-335", and "#N-336".

In FIG. 76, the data carriers are illustrated arranged along the horizontal frequency axis and vertical time axis. Here, just as described above, data carriers from data carrier $1 to data carrier $336 are present.

As illustrated in FIG. 76, at time &1,
Data carrier $1 is assigned with the symbol "#1-1",
data carrier $2 is assigned with the symbol "#1-2",
data carrier $3 is assigned with the symbol "#1-3",
data carrier $4 is assigned with the symbol "#1-4",
data carrier $5 is assigned with the symbol "#1-5",
data carrier $6 is assigned with the symbol "#1-6",
(recitation for data carrier $7 through data carrier $333 is omitted),
data carrier $334 is assigned with the symbol "#1-334",
data carrier $335 is assigned with the symbol "#1-335", and
data carrier $336 is assigned with the symbol "#1-336".

Then, at time &2,
data carrier $1 is assigned with the symbol "#2-1",
data carrier $2 is assigned with the symbol "#2-2",
data carrier $3 is assigned with the symbol "#2-3",
data carrier $4 is assigned with the symbol "#2-4",
data carrier $5 is assigned with the symbol "#2-5",
data carrier $6 is assigned with the symbol "#2-6",
(recitation for data carrier $7 through data carrier $333 is omitted),
data carrier $334 is assigned with the symbol "#2-334",
data carrier $335 is assigned with the symbol "#2-335", and
data carrier $336 is assigned with the symbol "#2-336".

Accordingly, at time &M, data in block #M is transmitted. M is an integer that is greater than or equal to 1.

In the transmission device illustrated in FIG. 1, when transmitting a modulated signal of one stream, 64QAM, which is an example of a modulation method in which there are 64 signal points in an in-phase I-orthogonal Q plane, can be set as the modulation method, and 672 bits or 1344 bits can be chosen as the code length of the error correction code.

Here, the characteristic point is "for example, the rearranging method used in rearranger 6404 illustrated in FIG. 64 differs when the code length of the error correction code is set to 672 bits and when the code length of the error correction code is set to 1344 bits". Note that operations performed by rearranger 6404 illustrated in FIG. 64 are as previously described. Then, when 672 bits is specified as the code length of the error correction code, rearranging is performed so as to achieve, for example, the configuration illustrated in FIG. 69, and when 1344 bits is specified as the code length of the error correction code, rearranging is performed so as to achieve, for example, the configuration illustrated in FIG. 76.

One different method for realizing such a frame configuration as described above is a method realized by interleaver 153 illustrated in FIG. 1.

For example, upon transmitting the modulated signal of one stream, when "the modulation method for s1($i$) is 64QAM and the modulation method for s2($i$) is 64QAM", the required size of the interleaver memory varies depending on whether "the code length of the error correction code" is set to "672 bits" or "the code length of the error correction code" is set to "1344 bits".

Upon transmitting a modulated signal of one stream, the required size of the interleaver memory when "the code length of the error correction code" is set to "672 bits" is 2016 bits. On the other hand, the required size of the interleaver memory when "the code length of the error correction code" is set to "1344 bits" is 1344 bits or 2016 bits.

This point is a characteristic point. Note that, here, rearranger 6404 is not necessarily required.

Next, operations performed by the reception device, which is the partner (communication partner), will be described. One example of a frame configuration of the transmission device is given in FIG. 27.

In (a) in FIG. 27, a frame configuration of a modulated signal transmitted from antenna 112A illustrated in FIG. 1 is shown, and in (b) in FIG. 27, a frame configuration of a modulated signal transmitted from antenna 112B illustrated in FIG. 1 is shown. In (a) and (b) in FIG. 27, time is represented on the horizontal axis and frequency (carriers) is (are) represented on the vertical axis.

In (a) in FIG. 27, at time $1, preamble 2701A is transmitted. In (b) in FIG. 27, at time $1, preamble 2701B is transmitted. Here, preamble 2701A and preamble 2701B include information such as information on the transmission method, modulation method, and/or error correction code (for example, the encode rate and/or code length) used in the modulated signal transmitted by the transmission device, and the reception device obtains this information, thereby making demodulation and decoding of the data symbol possible. Note that in FIG. 27, the preamble configuration is exemplified by the inclusion of preamble 2701A and preamble 2701B, but a preamble configuration in which only one of preamble 2701A and preamble 2701B is transmitted is acceptable. Moreover, preambles 2701A, 2701B may include a symbol for symbol detection by the reception device, a signal for performing frequency and time synchronization by the reception device, a symbol for performing AGC by the reception device, and/or a symbol for the reception device to estimate propagation path fluctuation.

In (a) in FIG. 27, at time $1, data symbol group 2702A is transmitted. In (b) in FIG. 27, at time $2, data symbol group 2702B is transmitted. Note that data symbol group 2702A and data symbol group 2702B may include a symbol other than a data symbol, such as a pilot symbol (a pilot symbol for performing channel estimation). Moreover, data symbol groups 2702A, 2702B are transmitted at the same time, using the same frequency. Data symbol groups 2702A, 2702B conform to the data symbol arrangement and data arrangement described above. When phase change is to be performed, phase change such as described above may be performed.

In (a) in FIG. 27, at time $3, preamble 2703A is transmitted. At time $4, data symbol group 2704A is transmitted. Note that the configurations of the preamble and data symbol group are as described above. Note that no symbol is arranged at time $3 and time $4 in (b) in FIG. 27, but a symbol corresponding to preamble 2703A may be transmitted from antenna 112B illustrated in FIG. 1, and a symbol corresponding to data symbol group 2704A may be transmitted from antenna 112B illustrated in FIG. 1.

FIG. 28 is a block diagram illustrating one example of a configuration of a reception device, which is the partner (communication partner).

Radio unit 2803X receives an input of reception signal 2802X received by antenna 2801X, performs processing such as frequency conversion, and outputs reception baseband signal 2804X.

Radio unit 2803Y receives an input of reception signal 2802Y received by antenna 2801Y, performs processing such as frequency conversion, and outputs reception baseband signal 2804Y.

Modulated signal z1, u1 channel fluctuation estimator 2805_1 receives an input of reception baseband signal 2804X, performs channel estimation for modulated signal z1(*i*) or modulated signal u1(*i*) described above by using, for example, the pilot symbol included in reception baseband signal 2804X, and outputs channel estimation signal 2806_1.

Modulated signal z2, u2 channel fluctuation estimator 2805_2 receives an input of reception baseband signal 2804X, performs channel estimation for modulated signal z2(*i*) or modulated signal u2(*i*) described above by using, for example, the pilot symbol included in reception baseband signal 2804X, and outputs channel estimation signal 2806_2.

Modulated signal z1, u1 channel fluctuation estimator 2807_1 receives an input of reception baseband signal 2804Y, performs channel estimation for modulated signal z1(*i*) or modulated signal u1(*i*) described above by using, for example, the pilot symbol included in reception baseband signal 2804X, and outputs channel estimation signal 2808_1.

Modulated signal z2, u2 channel fluctuation estimator 2807_2 receives an input of reception baseband signal 2804Y, performs channel estimation for modulated signal z2(*i*) or modulated signal u2(*i*) described above by using, for example, the pilot symbol included in reception baseband signal 2804X, and outputs channel estimation signal 2808_2.

Control information decoder 2809 receives inputs of reception baseband signal 2804X and reception baseband signal 2804Y, demodulates and decodes a preamble illustrated in FIG. 27, and outputs control information signal 2810.

Signal processor 2811 receives inputs of channel estimation signals 2806_1, 2806_2, 2808_1, and 2808_2; reception baseband signals 2804X and 2804Y; and control information signal 2810, rearranges data based on the data symbol arrangement described above, in accordance with control information signal 2810, performs demodulation/decoding based on information on transmission parameters (transmission method, modulation method, error correction code method, etc.) included in control information signal 2810, and obtains and outputs data 2812.

Note that the memory size of the interleaver included in signal processor 2811 is switched based on information on transmission parameters included in control information signal 2810.

As described above, by arranging data in the data carriers in accordance with this embodiment, it is possible to achieve an advantageous effect of increasing data reception quality in a reception device, which is the partner (communication partner), and it is possible to achieve an advantageous effect of increasing data reception quality in a reception device, which is the partner (communication partner) by performing phase change as described above.

Note that in Embodiment 1, Embodiment 4, and this embodiment, the information described when 16QAM is applied can be implemented similarly even when a modulation method other than 16QAM is used, such as 16APSK or a modulation method including 16 signal points in an in-phase I-orthogonal Q plane.

Similarly, in Embodiment 1, Embodiment 4, and this embodiment, the information described when 64QAM is applied can be implemented similarly even when a modulation method other than 64QAM is used, such as 64APSK or a modulation method including 64 signal points in an in-phase I-orthogonal Q plane.

Embodiment 6

In this embodiment, information not described in Embodiment 1, Embodiment 4, or Embodiment 5 will be described. Namely, the following methods will be described.

A symbol arrangement method used when the modulation method is QPSK, the code length of the error correction code is 672 bits, and a single stream is used for transmission.

A symbol arrangement method used when the modulation method is 16QAM, the code length of the error correction code is 672 bits, and a single stream is used for transmission.

A symbol arrangement method used when the modulation method is QPSK, the code length of the error correction code is 1344 bits, and a single stream is used for transmission.

A symbol arrangement method used when the modulation method is 16QAM, the code length of the error correction code is 1344 bits, and a single stream is used for transmission.

A symbol arrangement method used when the modulation method is QPSK, the code length of the error correction code is 1344 bits, and a MIMO transmission is used.

<Symbol Arrangement Method Used when the Modulation Method is QPSK, the Code Length of the Error Correction Code is 672 Bits, and a Single Stream is Used for Transmission>

Figure 77:
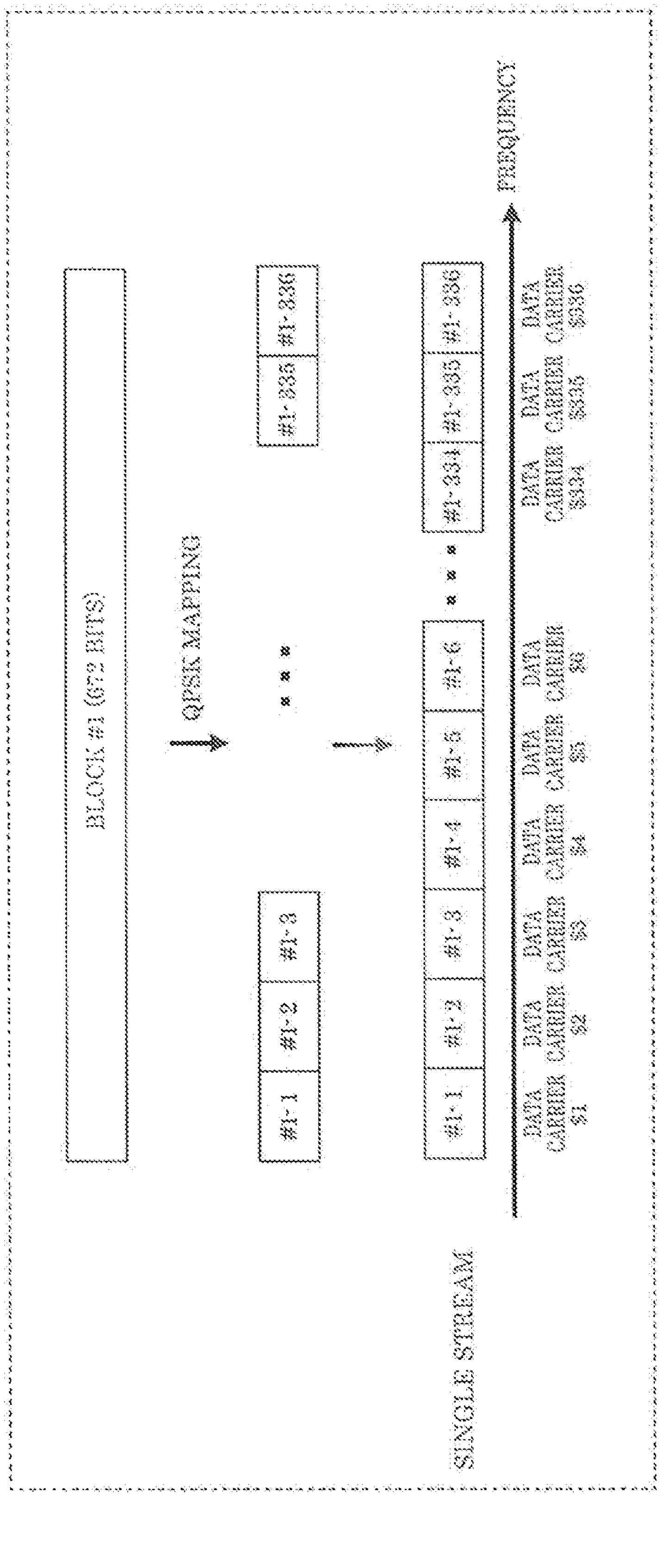
FIG. 77 illustrates an example of an arrangement of symbols in data carriers.

FIG. 77 illustrates an arrangement example of data carriers when the modulation method for a single stream is QPSK, which is an example of a modulation method in which there are 4 signal points in an in-phase I-orthogonal Q plane. Here, as one example, the block length (code length) in the error correction code is 672 bits. A first block configured of 672 bits that are error correction encoded is referred to as block #1 and denoted as "#1". Accordingly, an N-th (N is an integer greater than or equal to 1) block configured of 672 bits that are error correction encoded is referred to as block #N and denoted as "#N".

When QPSK is applied, 336 symbols are generated from block #N. Accordingly, the 336 symbols generated from block #1 are indicated as "#1-1", "#1-2", "#1-3", "#1-4" . . . "#1-334", "#1-335", and "#1-336". Accordingly, the 336 symbols generated from block #N are expressed as "#N-1", "#N-2", "#N-3", "#N-4" . . . "#N-334", "#N-335", and "#N-336".

In FIG. 77, the data carriers are illustrated arranged along the horizontal frequency axis and vertical time axis. Here, just as described above, data carriers from data carrier $1 to data carrier $336 are present.

As illustrated in FIG. 76, at time &1,
data carrier $1 is assigned with the symbol "#1-1",
data carrier $2 is assigned with the symbol "#1-2",
data carrier $3 is assigned with the symbol "#1-3",
data carrier $4 is assigned with the symbol "#1-4",
data carrier $5 is assigned with the symbol "#1-5",
data carrier $6 is assigned with the symbol "#1-6",
(recitation for data carrier $7 through data carrier $333 is omitted),
data carrier $334 is assigned with the symbol "#1-334",
data carrier $335 is assigned with the symbol "#2-335", and
data carrier $336 is assigned with the symbol "#3-336".

Then, at time &2,
data carrier $1 is assigned with the symbol "#2-1",
data carrier $2 is assigned with the symbol "#2-2",
data carrier $3 is assigned with the symbol "#2-3",
data carrier $4 is assigned with the symbol "#2-4",
data carrier $5 is assigned with the symbol "#2-5",
data carrier $6 is assigned with the symbol "#2-6",
(recitation for data carrier $7 through data carrier $333 is omitted),
data carrier $334 is assigned with the symbol "#2-334",
data carrier $335 is assigned with the symbol "#2-335", and
data carrier $336 is assigned with the symbol "#2-336".

Accordingly, at time &M, data in block #M is transmitted. M is an integer that is greater than or equal to 1.

<Symbol Arrangement Method Used when the Modulation Method is 16QAM, the Code Length of the Error Correction Code is 672 Bits, and a Single Stream is Used for Transmission>

Figure 78:
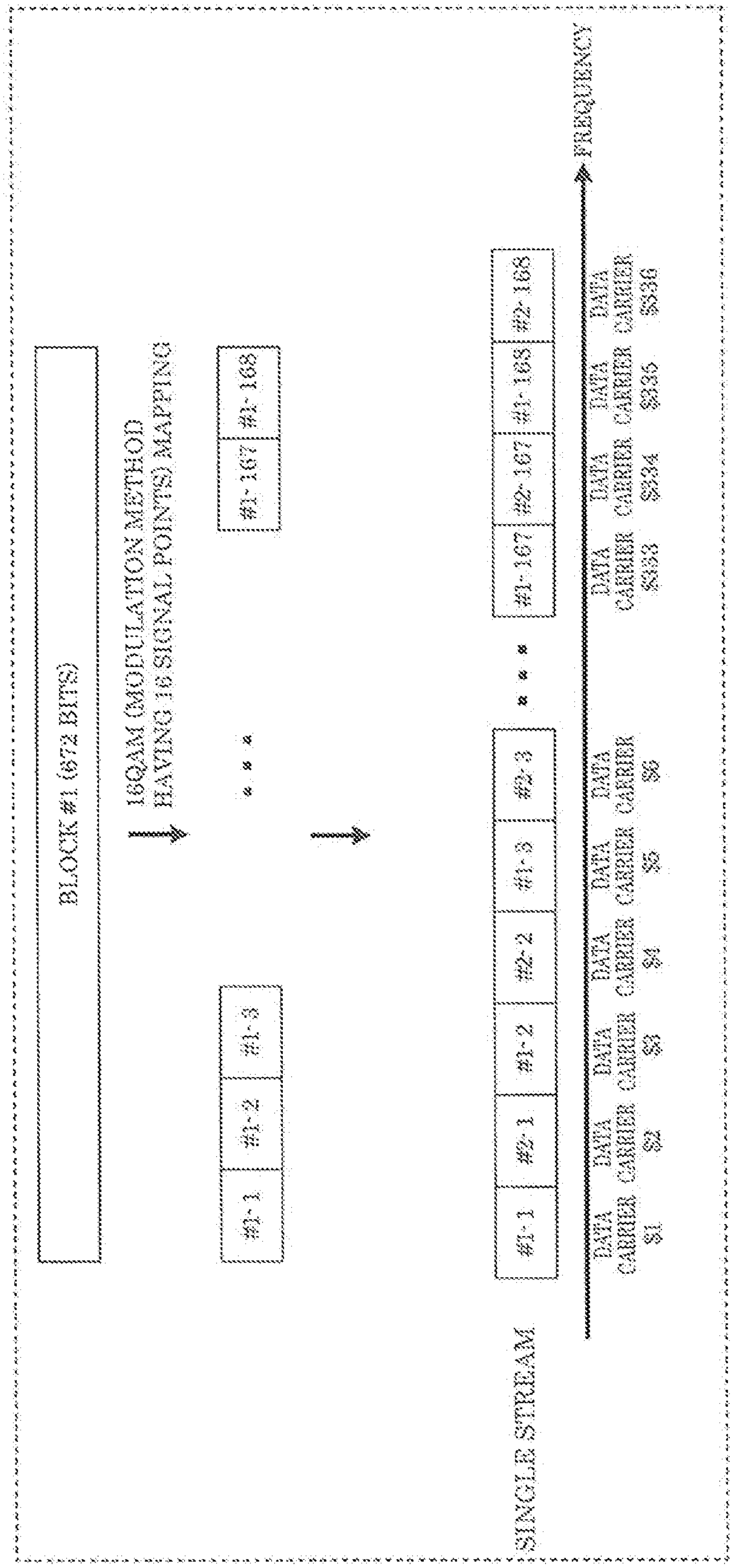
FIG. 78 illustrates an example of an arrangement of symbols in data carriers.

FIG. 78 illustrates an arrangement example of data carriers when the modulation method for a single stream is 16QAM, which is an example of a modulation method in which there are 16 signal points in an in-phase I-orthogonal Q plane. Here, as one example, the block length (code length) in the error correction code is 672 bits. A first block configured of 672 bits that are error correction encoded is referred to as block #1 and denoted as "#1". Accordingly, an N-th (N is an integer greater than or equal to 1) block configured of 672 bits that are error correction encoded is referred to as block #N and denoted as "#N".

When 16QAM is applied, 168 symbols are generated from block #N. Accordingly, the 168 symbols generated from block #1 are indicated as "#1-1", "#1-2", "#1-3", "#1-4" . . . "#1-166", "#1-167", and "#1-168". Accordingly, the 168 symbols generated from block #N are expressed as "#N-1", "#N-2", "#N-3", "#N-4" . . . "#N-166", "#N-167", and "#N-168".

In FIG. 78, the data carriers are illustrated arranged along the horizontal frequency axis. Here, just as described above, data carriers from data carrier $1 to data carrier $336 are present.

As illustrated in FIG. 78,
data carrier $1 is assigned with the symbol "#1-1",
data carrier $2 is assigned with the symbol "#2-1",
data carrier $3 is assigned with the symbol "#1-2",
data carrier $4 is assigned with the symbol "#2-2",
data carrier $5 is assigned with the symbol "#1-3",
data carrier $6 is assigned with the symbol "#2-3",
(recitation for data carrier $7 through data carrier $332 is omitted),
data carrier $333 is assigned with the symbol "#1-167",
data carrier $334 is assigned with the symbol "#2-167",
data carrier $335 is assigned with the symbol "#1-168", and
data carrier $336 is assigned with the symbol "#2-168".

This is how the symbols are arranged for time &1. Accordingly, symbols having a remainder of 1 when the data carrier number is divided by 2 transmit block #1 data, and symbols having a remainder of 0 when the data carrier number is divided by 2 transmit block #2 data.

At time &2, the symbols are arranged as follows.
Symbols having a remainder of 1 when the data carrier number is divided by 2 transmit block #3 data, and
symbols having a remainder of 0 when the data carrier number is divided by 2 transmit block #4 data.

Accordingly, at time &M, the symbols are arranged as follows. M is an integer that is greater than or equal to 1.

Symbols having a remainder of 1 when the data carrier number is divided by 2 transmit block #(2M-1) data, and
symbols having a remainder of 0 when the data carrier number is divided by 2 transmit block #(2M) data.

When the transmission device transmits modulated signals using a frame configuration such as illustrated in FIG. 78, the negative effects caused by low portion 801 of the reception field intensity due to multi-path using FIG. 8 are not likely to be an influence. Accordingly, achieving an advantageous effect of an increase in data reception quality is likely.

<Symbol Arrangement Method Used when the Modulation Method is QPSK, the Code Length of the Error Correction Code is 1344 Bits, and a Single Stream is Used for Transmission>

Figure 79:
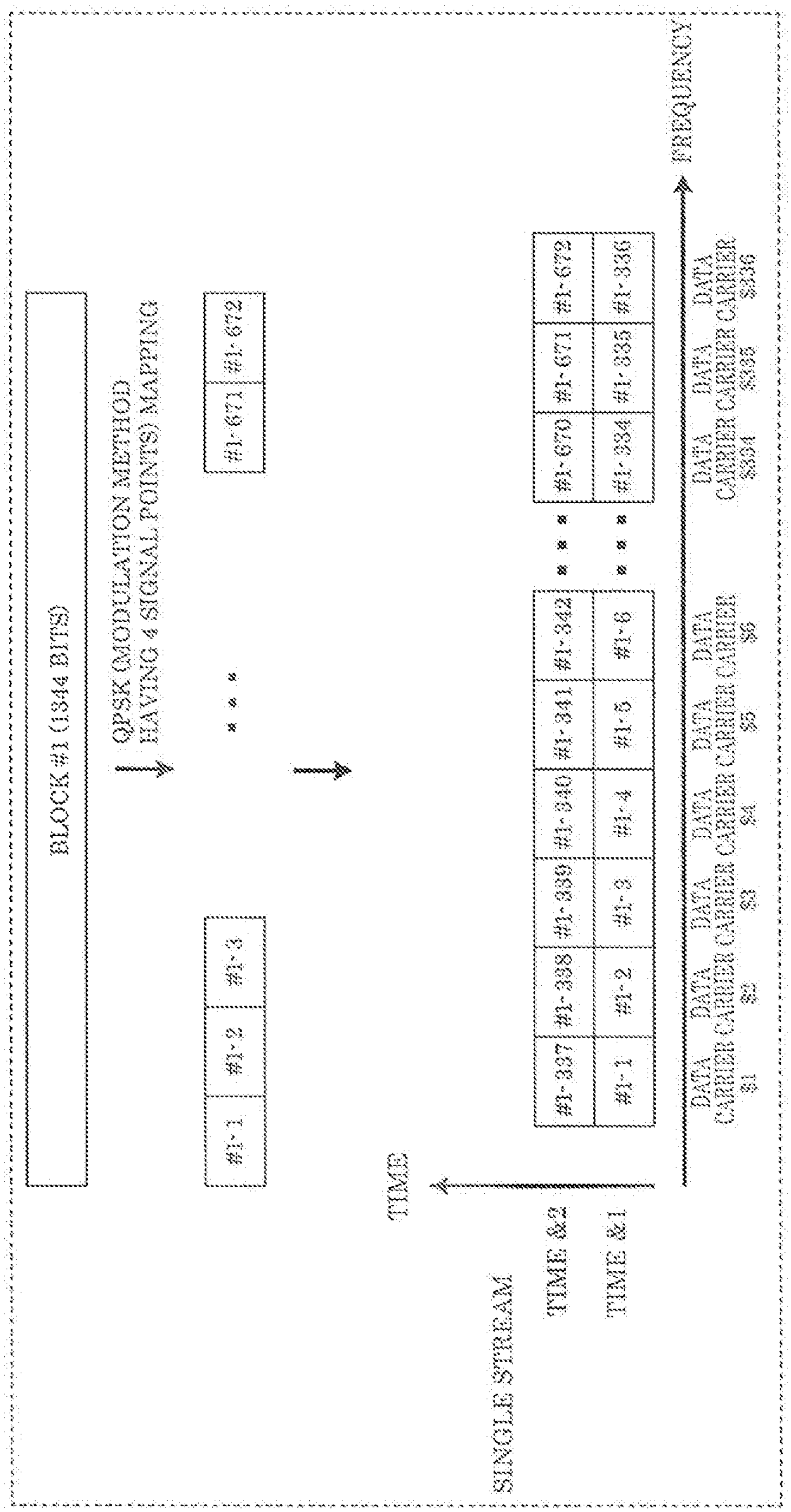
FIG. 79 illustrates an example of an arrangement of symbols in data carriers.

FIG. 79 illustrates an arrangement example of data carriers when the modulation method for a single stream is QPSK, which is an example of a modulation method in which there are 4 signal points in an in-phase I-orthogonal Q plane. Here, as one example, the block length (code length) in the error correction code is 1344 bits. A first block configured of 1344 bits that are error correction encoded is referred to as block #1 and denoted as "#1". Accordingly, an N-th (N is an integer greater than or equal to 1) block configured of 1344 bits that are error correction encoded is referred to as block #N and denoted as "#N".

When QPSK is applied, 672 symbols are generated from block #N. Accordingly, the 672 symbols generated from block #1 are indicated as "#1-1", "#1-2", "#1-3", "#1-4" . . . "#1-670", "#1-671", and "#1-672". Accordingly, the 672 symbols generated from block #N are expressed as "#N-1", "#N-2", "#N-3", "#N-4" . . . "#N-670", "#N-671", and "#N-672".

In FIG. 79, the data carriers are illustrated arranged along the horizontal frequency axis and vertical time axis. Here, just as described above, data carriers from data carrier $1 to data carrier $336 are present.

As illustrated in FIG. 79, at time &1, data carrier $1 is assigned with the symbol "#1-1",
data carrier $2 is assigned with the symbol "#1-2",
data carrier $3 is assigned with the symbol "#1-3",
data carrier $4 is assigned with the symbol "#1-4",
data carrier $5 is assigned with the symbol "#1-5",
data carrier $6 is assigned with the symbol "#1-6",
(recitation for data carrier $7 through data carrier $333 is omitted),
data carrier $334 is assigned with the symbol "#1-334",
data carrier $335 is assigned with the symbol "#1-335", and
data carrier $336 is assigned with the symbol "#1-336".

Then, at time &2, data carrier $1 is assigned with the symbol "#1-337",
data carrier $2 is assigned with the symbol "#1-338",
data carrier $3 is assigned with the symbol "#1-339",
data carrier $4 is assigned with the symbol "#1-340",
data carrier $5 is assigned with the symbol "#1-341",
data carrier $6 is assigned with the symbol "#1-342",
(recitation for data carrier $7 through data carrier $333 is omitted),
data carrier $334 is assigned with the symbol "#1-670",
data carrier $335 is assigned with the symbol "#1-671", and
data carrier $336 is assigned with the symbol "#1-672".

Accordingly, at time &1 and time &2, data in block #1 is transmitted.

Accordingly, at time &(2M-1) and time &2M (M is an integer that is greater than or equal to 1), data in block #M is transmitted.

<Symbol Arrangement Method Used when the Modulation Method is 16QAM, the Code Length of the Error Correction Code is 1344 Bits, and a Single Stream is Used for Transmission>

Figure 80:
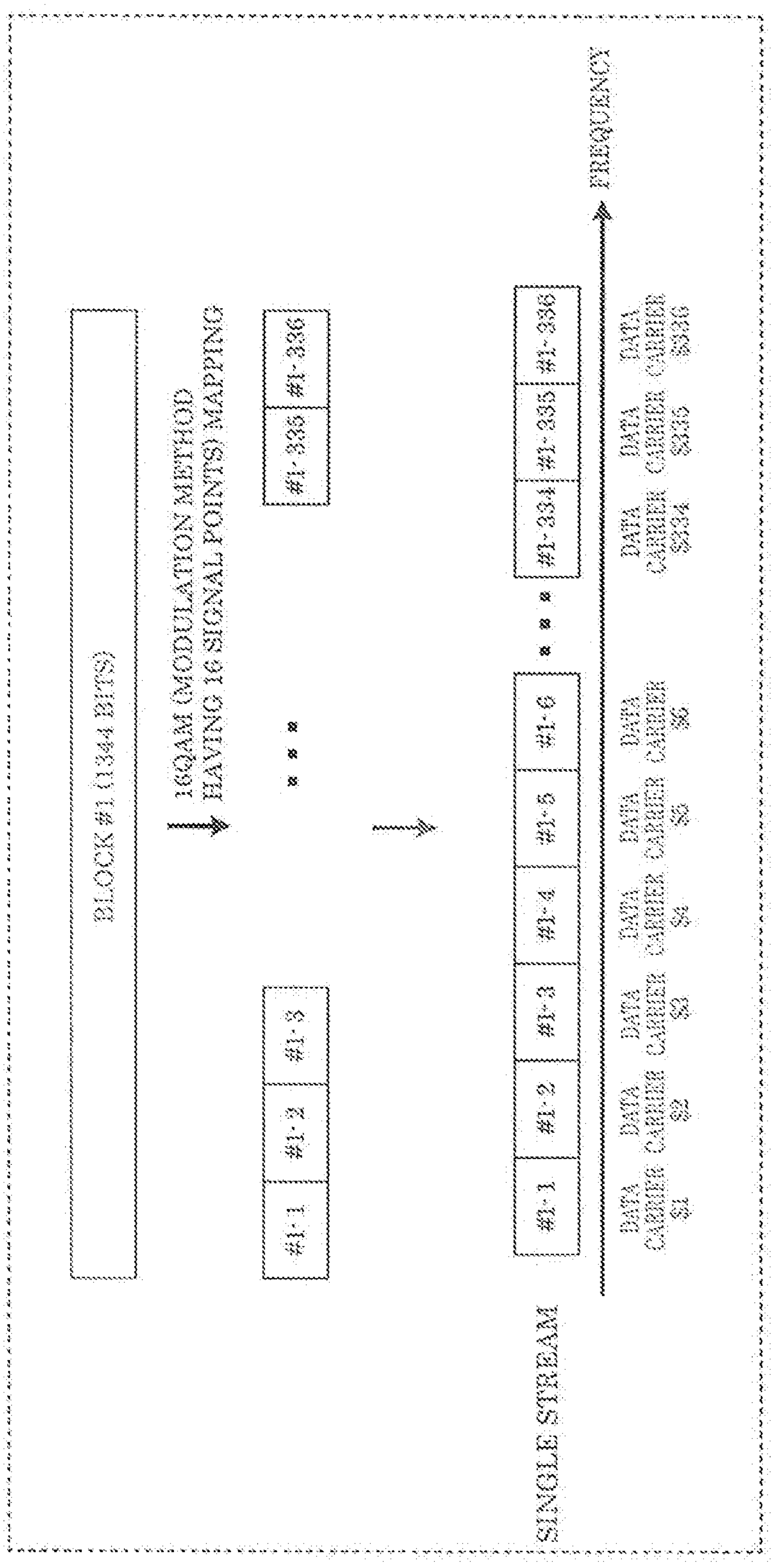
FIG. 80 illustrates an example of an arrangement of symbols in data carriers.

FIG. 80 illustrates an arrangement example of data carriers when the modulation method for a single stream is 16QAM, which is an example of a modulation method in which there are 16 signal points in an in-phase I-orthogonal Q plane. Here, as one example, the block length (code length) in the error correction code is 1344 bits. A first block configured of 1344 bits that are error correction encoded is referred to as block #1 and denoted as "#1". Accordingly, an N-th (N is an integer greater than or equal to 1) block configured of 1344 bits that are error correction encoded is referred to as block #N and denoted as "#N".

When 16QAM is applied, 336 symbols are generated from block #N. Accordingly, the 336 symbols generated from block #1 are indicated as "#1-1", "#1-2", "#1-3", "#1-4" . . . "#1-334", "#1-335", and "#1-336". Accordingly, the 336 symbols generated from block #N are expressed as "#N-1", "#N-2", "#N-3", "#N-4" . . . "#N-334", "#N-335", and "#N-336".

In FIG. 80, the data carriers are illustrated arranged along the horizontal frequency axis and vertical time axis. Here, just as described above, data carriers from data carrier $1 to data carrier $336 are present.

As illustrated in FIG. 80, at time &1, data carrier $1 is assigned with the symbol "#1-1",
data carrier $2 is assigned with the symbol "#1-2",
data carrier $3 is assigned with the symbol "#1-3",
data carrier $4 is assigned with the symbol "#1-4",
data carrier $5 is assigned with the symbol "#1-5",
data carrier $6 is assigned with the symbol "#1-6",
(recitation for data carrier $7 through data carrier $333 is omitted),
data carrier $334 is assigned with the symbol "#1-334",
data carrier $335 is assigned with the symbol "#2-335", and
data carrier $336 is assigned with the symbol "#3-336".

Then, at time &2, data carrier $1 is assigned with the symbol "#2-1",
data carrier $2 is assigned with the symbol "#2-2",
data carrier $3 is assigned with the symbol "#2-3",
data carrier $4 is assigned with the symbol "#2-4",
data carrier $5 is assigned with the symbol "#2-5",
data carrier $6 is assigned with the symbol "#2-6",
(recitation for data carrier $7 through data carrier $333 is omitted),
data carrier $334 is assigned with the symbol "#2-334",
data carrier $335 is assigned with the symbol "#2-335", and
data carrier $336 is assigned with the symbol "#2-336".

Accordingly, at time &M (M is an integer that is greater than or equal to 1), data in block #M is transmitted.

<Symbol Arrangement Method Used when the Modulation Method is QPSK, the Code Length of the Error Correction Code is 1344 Bits, and a MIMO Transmission is Used>

Figure 81:
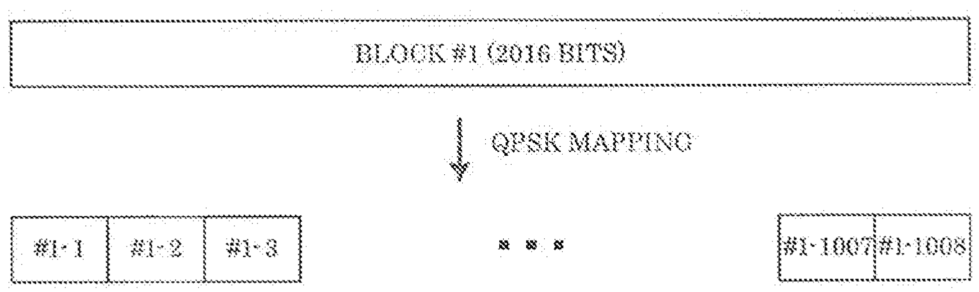
FIG. 81 illustrates an example of symbol generation.

FIG. 81 illustrates an arrangement example of data carriers when the modulation method for stream 1($s$1($i$)) is QPSK, which is an example of a modulation method in which there are 4 signal points in an in-phase I-orthogonal Q plane and when the modulation method for stream 2($s$2($i$)) is QPSK, which is an example of a modulation method in which there are 4 signal points in an in-phase I-orthogonal Q plane. Here, as one example, the block length (code length) in the error correction code is 1344 bits. A first block configured of 1344 bits that are error correction encoded is referred to as block #1 and denoted as "#1". Accordingly, an N-th (N is an integer greater than or equal to 1) block configured of 1344 bits that are error correction encoded is referred to as block #N and denoted as "#N".

When QPSK is applied, 672 symbols are generated from block #N. In FIG. 81, the 672 symbols generated from block #1 are indicated as "#1-1", "#1-2", "#1-3", "#1-4" . . . "#1-670", "#1-671", and "#1-672". Accordingly, the 336 symbols generated from block #N are expressed as "#N-1", "#N-2", "#N-3", "#N-4" . . . "#N-670", "#N-671", and "#N-672".

Moreover, in FIG. 81, the data carriers are illustrated arranged along the horizontal frequency axis. In stream 1, data carriers from data carrier $1 to data carrier $336 are present, and similarly, in stream 2, data carriers from data carrier $1 to data carrier $336 are present.

Then, data carrier $1 in stream 1 and data carrier $1 in stream 2 are transmitted (from different antennas) at the same frequency and at the same time, and data carrier $2 in stream 1 and data carrier $2 in stream 2 are transmitted at the same frequency and at the same time, or from different antennas. In other words, data carrier $L in stream 1 and data carrier $L in stream 2 are transmitted at the same frequency and at the same time, or from different antennas. L is an integer that is greater than or equal to 1 and less than or equal to 336.

As illustrated in FIG. 81, each data carrier in each stream is assigned with a symbol.

Data carrier $1 in stream 1 is assigned with the symbol "#1-1",
data carrier $1 in stream 2 is assigned with the symbol "#1-2",
data carrier $2 in stream 1 is assigned with the symbol "#1-3",
data carrier $2 in stream 2 is assigned with the symbol "#1-4",
data carrier $3 in stream 1 is assigned with the symbol "#1-5", and data carrier $3 in stream 2 is assigned with the symbol "#1-6". The symbols are assigned in accordance with such a rule. Accordingly, the data in block #1 is transmitted from the transmission device using data carrier $1 through $336 in stream 1 and data carrier $1 through $336 in stream 2.

This is how the symbols are arranged for time &1. Similarly, when the symbols are arranged, at time &2, the symbols are arranged as follows.

The data in block #2 is transmitted from the transmission device using data carrier $1 through $336 in stream 1 and data carrier $1 through $336 in stream 2.

Accordingly, at time &M, the symbols are arranged as follows. M is an integer that is greater than or equal to 1.

The data in block #M is transmitted from the transmission device using data carrier $1 through $336 in stream 1 and data carrier $1 through $336 in stream 2.

Next, a specific operational example of a system will be given when the transmission device transmits illustrated in FIG. 1 a modulated signal having the frame configuration illustrated FIG. 27 and the reception device illustrated in FIG. 28, which is the communication partner to the transmission device illustrated in FIG. 1, receives the transmitted modulated signal.

<Transmission Method 1>

The transmission device illustrated in FIG. 1 selects one of the following modes, which are also described in Embodiment 1, Embodiment 4, and this embodiment, and transmits a modulated signal.

Mode #1:

Single stream transmission using a multi-carrier method such as OFDM, the QPSK modulation method, and 672 code length error correction code.

Mode #2:

Single stream transmission using a multi-carrier method such as OFDM, the 16QAM modulation method, and 672 code length error correction code.

Mode #3:

Single stream transmission using a multi-carrier method such as OFDM, the 64QAM modulation method, and 672 code length error correction code.

Mode #4:

Single stream transmission using a multi-carrier method such as OFDM, the QPSK modulation method, and 1344 code length error correction code.

Mode #5:

Single stream transmission using a multi-carrier method such as OFDM, the 16QAM modulation method, and 1344 code length error correction code.

Mode #6:

Single stream transmission using a multi-carrier method such as OFDM, the 64QAM modulation method, and 1344 code length error correction code.

Mode #7:

MIMO transmission using a multi-carrier method such as OFDM, the QPSK modulation method, and 672 code length error correction code.

Mode #8:

MIMO transmission using a multi-carrier method such as OFDM, the 16QAM modulation method, and 672 code length error correction code.

Mode #9:

MIMO transmission using a multi-carrier method such as OFDM, the 64QAM modulation method, and 672 code length error correction code.

Mode #10:

MIMO transmission using a multi-carrier method such as OFDM, the QPSK modulation method, and 1344 code length error correction code.

Mode #11:

MIMO transmission using a multi-carrier method such as OFDM, the 16QAM modulation method, and 1344 code length error correction code.

Mode #12:

MIMO transmission using a multi-carrier method such as OFDM, the 64QAM modulation method, and 1344 code length error correction code.

However, when a single stream is transmitted using the transmission device illustrated in FIG. 1, for example, a modulated signal generated by mapper 106A is transmitted from antenna 112A. Mapper 106B does not operate and a modulated signal is not transmitted from antenna 112B. Note that when transmitting a single stream, for example, a modulated signal generated by mapper 106A may be transmitted from a plurality of antennas. In other words, antenna 112B may be used.

As described above, FIG. 27 illustrates one example of a frame configuration of a modulated signal transmitted by the transmission device illustrated in FIG. 1. Here, preambles 2701A, 2701B, and 2703A include a control information symbol for transmission to the reception device illustrated in FIG. 28, which is the communication partner.

The control information symbol included in preambles 2701A, 2701B, and 2703A includes, as control information, the following symbols.

Symbol Related to Modulation Method:

Symbol for transmitting information on the modulated signal used to generate the data symbol group in FIG. 27.

Symbol Related to Error Correction Code:

Symbol for transmitting information related to the error correction code used to generate the data symbol group in FIG. 27. For example, this include information on the error correction code to be used, information on the encode rate to be used, and/or information on the block length (code length) to be used.

Symbol Related to Transmission Method:

Symbol for transmitting information related to the transmission method used to generate the data symbol group in FIG. 27. For example, this includes "information on whether single stream transmission or MIMO transmission was used", "information related to the number of streams to be transmitted".

Control information signal generator 116Z illustrated in FIG. 1 receives inputs of frame configuration signal 113 and signal 115 on information related to the transmission method, generates, for example, "symbol related to modulation method", "symbol related to error correction code", "symbol related to transmission method", and outputs control information signal 117Z. Note that control information signal 117Z is a symbol corresponding to the control information symbol described above.

Control information decoder 2809 in the reception device, which is the communication partner illustrated in FIG. 28, receives inputs of reception baseband signals 2804X and 2804Y, demodulates and decodes the control information symbol included in a preamble (for example, 2701A, 2701B, 2703A) in FIG. 27, and, for example, obtains "symbol related to modulation method", "symbol related to error correction code", "symbol related to transmission method".

Then, from "symbol related to modulation method", "symbol related to error correction code", "symbol related to transmission method", control information decoder 2809 estimates whether a data symbol group illustrated in FIG. 27 (for example, 2702A, 2702B, 2704A) is a data symbol group according to any one of the above-described modes "Mode #1 through Mode #12".

As a result of control information decoder 2809 estimating the mode, control information decoder 2809 knows the arrangement along the frequency and time axes of the data symbols in the data symbol group, and outputs control information signal 2810 including information on the symbol arrangement. Note that symbol arrangement along the frequency and time axes is as described in Embodiment 1 and Embodiment 4. Moreover, control information signal 2810 includes information included in "symbol related to modulation method", information included in "symbol related to error correction code", and information included in "symbol related to transmission method".

Signal processor 2811 illustrated in FIG. 28 receives an input of control information signal 2810, and based on information included in control information signal 2810, demodulates and decodes data symbols, and outputs data 2812.

Moreover, the transmission device illustrated in FIG. 1 not only transmits OFDM modulated signals, but is also capable of transmitting single-carrier modulated signals, and is capable of switching between "OFDM modulated signal transmission" and "single-carrier modulated signal transmission". Radio units 110A, 110B deal with operations for OFDM transmission and operations for single-carrier transmission.

Then, in FIG. 27, for example, a control information symbol formed by the single-carrier method is arranged before or temporally before preambles 2701A, 2701B, and this control information symbol includes "control information indicating whether the data symbol groups 2701A, 2701B and data symbol groups 2702A, 2702B are single-carrier symbols or OFDM symbols".

A control information symbol formed by the single-carrier method is arranged before or temporally before preamble 2703A, and this control information symbol includes "control information indicating whether preamble 2703A and data symbol group 2704A are single-carrier symbols or OFDM symbols".

Note that when the data symbol group includes OFDM symbols, the symbols are in accordance with any one of Mode #1 through Mode #12, and the implementation method in such cases is as described in Embodiment 1, Embodiment 4, and this embodiment.

Here, control information decoder 2809 in the reception device illustrated in FIG. 28, which is the communication partner, obtains and outputs "control information indicating single-carrier symbols or OFDM symbols" via demodulation and decoding. Accordingly, control information signal 2810 includes "control information indicating single-carrier symbols or OFDM symbols".

Then, signal processor 2811 demodulates and decodes the data symbols based on the "control information indicating single-carrier symbols or OFDM symbols" included in control information signal 2810. Note that when "control information indicating single-carrier symbols or OFDM symbols" indicates "OFDM", operations are as described above.

As described above, by the transmission device illustrated in FIG. 1 transmitting a modulated signal using any one of Mode #1 through Mode #12, in each mode, both the transmission and reception devices have the advantageous effect that memory capacity can be reduced, and in each mode, there is an advantageous effect that high data reception quality can be achieved. Note that in each mode, the relationship between encoded block and carrier is not limited to the examples in Embodiment 1, Embodiment 4, and this embodiment; the assignment may be performed in some other way. However, regarding an encoded block present at a certain time (for example, time &1 in FIG. 70), the relationship is the same as described above. In other words, carrier assignment in an encoded block may differ from Embodiment 1, Embodiment 4, and this embodiment.

Moreover, the same advantageous effects are achievable even when the transmission device illustrated in FIG. 1 is capable of selecting two or more modulation methods from among modulation methods selectable from among Mode #1 through Mode #12.

<Transmission Method 2>

The transmission device illustrated in FIG. 1 selects one of the following modes, which are also described in Embodiment 1, Embodiment 5, and this embodiment, and transmits a modulated signal.

Mode $1:

Single stream transmission using a multi-carrier method such as OFDM, the QPSK modulation method, and 672 code length error correction code.

Mode $2:

Single stream transmission using a multi-carrier method such as OFDM, the 16QAM modulation method, and 672 code length error correction code.

Mode $3:

Single stream transmission using a multi-carrier method such as OFDM, the 64QAM modulation method, and 672 code length error correction code.

Mode $4:

Single stream transmission using a multi-carrier method such as OFDM, the QPSK modulation method, and 1344 code length error correction code.

Mode $5:

Single stream transmission using a multi-carrier method such as OFDM, the 16QAM modulation method, and 1344 code length error correction code.

Mode $6:

Single stream transmission using a multi-carrier method such as OFDM, the 64QAM modulation method, and 1344 code length error correction code.

Mode $7:

MIMO transmission using a multi-carrier method such as OFDM, the QPSK modulation method, and 672 code length error correction code.

Mode $8:

MIMO transmission using a multi-carrier method such as OFDM, the 16QAM modulation method, and 672 code length error correction code.

Mode $9:

MIMO transmission using a multi-carrier method such as OFDM, the 64QAM modulation method, and 672 code length error correction code.

Mode $10:

MIMO transmission using a multi-carrier method such as OFDM, the QPSK modulation method, and 1344 code length error correction code.

Mode $11:

MIMO transmission using a multi-carrier method such as OFDM, the 16QAM modulation method, and 1344 code length error correction code.

Mode $12:

MIMO transmission using a multi-carrier method such as OFDM, the 64QAM modulation method, and 1344 code length error correction code.

However, when a single stream is transmitted using the transmission device illustrated in FIG. 1, for example, a modulated signal generated by mapper 106A is transmitted from antenna 112A. Mapper 106B does not operate and a modulated signal is not transmitted from antenna 112B. Note that when transmitting a single stream, for example, a modulated signal generated by mapper 106A may be transmitted from a plurality of antennas. In other words, antenna 112B may be used.

As described above, FIG. 27 illustrates one example of a frame configuration of a modulated signal transmitted by the transmission device illustrated in FIG. 1. Here, preambles 2701A, 2701B, and 2703A include a control information symbol for transmission to the reception device illustrated in FIG. 28, which is the communication partner.

The control information symbol included in preambles 2701A, 2701B, and 2703A includes, as control information, the following symbols.

Symbol Related to Modulation Method:

Symbol for transmitting information on the modulated signal used to generate the data symbol group in FIG. 27.

Symbol Related to Error Correction Code:

Symbol for transmitting information related to the error correction code used to generate the data symbol group in FIG. 27. For example, this include information on the error correction code to be used, information on the encode rate to be used, and/or information on the block length (code length) to be used.

Symbol Related to Transmission Method:

Symbol for transmitting information related to the transmission method used to generate the data symbol group in FIG. 27. For example, this includes "information on whether single stream transmission or MIMO transmission was used", "information related to the number of streams to be transmitted".

Control information signal generator 116Z illustrated in FIG. 1 receives inputs of frame configuration signal 113 and signal 115 on information related to the transmission method, generates, for example, "symbol related to modulation method", "symbol related to error correction code", "symbol related to transmission method", and outputs control information signal 117Z. Note that control information signal 117Z is a symbol corresponding to the control information symbol described above.

Control information decoder 2809 in the reception device, which is the communication partner illustrated in FIG. 28, receives inputs of reception baseband signals 2804X and 2804Y, demodulates and decodes the control information symbol included in preamble 2701A, 2701B, 2703A in FIG. 27, and, for example, obtains "symbol related to modulation method", "symbol related to error correction code", "symbol related to transmission method".

Then, from "symbol related to modulation method", "symbol related to error correction code", "symbol related to transmission method", control information decoder 2809 estimates whether data symbol groups 2702A, 2702B, 2704A illustrated in FIG. 27 are data symbol groups according to any one of the above-described modes "Mode $1 through Mode $12".

As a result of control information decoder 2809 estimating the mode, control information decoder 2809 knows the arrangement along the frequency and time axes of the data symbols in the data symbol groups, and knows whether known data or null symbols were inserted, and outputs control information signal 2810 including information on the symbol arrangement, information on known data insertion, or information on null symbol insertion. Note that symbol arrangement along the frequency and time axes, information on known data insertion, and information on null symbol insertion are as described in Embodiment 1, Embodiment 5, and this embodiment. Moreover, control information signal 2810 includes information included in "symbol related to modulation method", information included in "symbol related to error correction code", and information included in "symbol related to transmission method".

Signal processor 2811 illustrated in FIG. 28 receives an input of control information signal 2810, and based on information included in control information signal 2810, demodulates and decodes data symbols, and outputs data 2812.

Moreover, the transmission device illustrated in FIG. 1 not only transmits OFDM modulated signals, but is also capable of transmitting single-carrier modulated signals, and is capable of switching between "OFDM modulated signal transmission" and "single-carrier modulated signal transmission". Radio units 110A, 110B deal with operations for OFDM transmission and operations for single-carrier transmission.

Then, in FIG. 27, for example, a control information symbol formed by the single-carrier method is arranged before or temporally before preambles 2701A, 2701B, and this control information symbol includes "control information indicating whether the data symbol groups 2701A, 2701B and data symbol groups 2702A, 2702B are single-carrier symbols or OFDM symbols".

A control information symbol formed by the single-carrier method is arranged before or temporally before preamble 2703A, and this control information symbol includes "control information indicating whether preamble 2703A and data symbol group 2704A are single-carrier symbols or OFDM symbols".

Note that when the data symbol groups include OFDM symbols, the symbols are in accordance with any one of Mode $1 through Mode $12, and the implementation method in such cases is as described in Embodiment 1, Embodiment 5, and this embodiment.

Here, control information decoder 2809 in the reception device illustrated in FIG. 28, which is the communication partner, obtains and outputs "control information indicating single-carrier symbols or OFDM symbols" via demodulation and decoding. Accordingly, control information signal 2810 includes "control information indicating single-carrier symbols or OFDM symbols".

Then, signal processor 2811 demodulates and decodes the data symbols based on the "control information indicating single-carrier symbols or OFDM symbols" included in control information signal 2810. Note that when "control information indicating single-carrier symbols or OFDM symbols" indicates "OFDM", operations are as described above.

As described above, by the transmission device illustrated in FIG. 1 transmitting a modulated signal using any one of Mode $1 through Mode $12, in each mode, both the transmission and reception devices have the advantageous effect that memory capacity can be reduced, and in each mode, there is an advantageous effect that high data reception quality can be achieved. Note that in each mode, the relationship between encoded block and carrier is not limited to the examples in Embodiment 1, Embodiment 5, and this embodiment; the assignment may be performed in some other way. However, regarding an encoded block present at a certain time (for example, time &1 in FIG. 70), the relationship is the same as described above. In other words, carrier assignment in an encoded block may differ from Embodiment 1, Embodiment 5, and this embodiment.

Moreover, the same advantageous effects are achievable even when the transmission device illustrated in FIG. 1 is capable of selecting two or more modulation methods from among modulation methods selectable from among Mode $1 through Mode $12.

Note that in Embodiment 1, Embodiment 4, Embodiment 5, and this embodiment, the information described when 16QAM is applied can be implemented similarly even when a modulation method other than 16QAM is used, such as 16APSK or a modulation method including 16 signal points in an in-phase I-orthogonal Q plane.

Similarly, in Embodiment 1, Embodiment 4, Embodiment 5, and this embodiment, the information described when 64QAM is applied can be implemented similarly even when a modulation method other than 64QAM is used, such as 64APSK or a modulation method including 64 signal points in an in-phase I-orthogonal Q plane.

In Embodiment 1, Embodiment 4, Embodiment 5, and this embodiment, the information described when QPSK is applied can be implemented similarly even when a modulation method other than QPSK including 4 signal points in an in-phase I-orthogonal Q plane is used.

Embodiment 7

In this embodiment, in addition to the code length of the error correction code in Embodiment 1 (may also be in addition to the code length of the error correction code in Embodiment 4), an implementation method in which it is possible to use an error correction code having a longer code length than the error correction code in Embodiment 1 will be described.

In this embodiment, as one example, an implementation method in which an error correction code having a code length of 672 bits and an error correction code having a code length of 2016 (=672×3) bits are used will be described.

The implementation method using the 672 bit code length error correction code is as described in Embodiment 1 with reference to FIG. 1 through FIG. 28, and since this has been described in detail in Embodiment 1, repeated description will be omitted. Hereinafter, information not described in Embodiment 1 will be described.

FIG. 1 illustrates a configuration of a transmission device according to this embodiment. Note that basic operations in FIG. 1 are as described in Embodiment 1. Encoder 151 illustrated in FIG. 1 receives inputs of data 150 and frame configuration signal 113. Here, frame configuration signal 113 includes information on the error correction code to be used, and in particular includes information on the code length (in this embodiment, a block length of 672 bits or a code length of 1344 bits) of the error correction code to be used.

Accordingly, based on frame configuration 113, encoder 151 selects an error correction code including the code length of the error correction code to be used, and, for example, sets the encode rate of the error correction code, error correction encodes data 150, and outputs encoded data 152.

Moreover, the transmission device illustrated in FIG. 1 selects a MIMO transmission method. The implementation method used upon transmitting the modulated signal is as described in Embodiment 1, and therefore description here will be omitted.

Next, just as in Embodiment 1, for example, one example of a frame configuration of a modulated signal transmitted by the transmission device illustrated in FIG. 1 when a multi-carrier transmission method such as OFDM is used is illustrated in FIG. 6.

FIG. 6 illustrates an example of an arrangement of symbols along the horizontal frequency axis, and illustrates a symbol arrangement for two modulated signals transmitted from an antenna different than shown above. For example, FIG. 6 illustrates a configuration example of data carriers (data symbols) and pilot symbols (reference symbols) (indicated as "P" in FIG. 6). Note that FIG. 6 is merely one example; other symbols may be present. Here, a data carrier is a symbol for transmitting data to a partner (communication partner) via MIMO transmission, and a pilot symbol is a symbol for a partner (communication partner) to estimate (channel estimation) propagation fluctuation.

In FIG. 6, as one example, the number of data carriers among the 1OFDM symbols (data carriers on the frequency axis) is 336. Accordingly, at each point in time, data carrier $1 through data carrier $336 are present. A pilot symbol may be inserted between two data carriers. Note that in FIG. 6, time &1 and time &2 differ in regard to pilot carrier insertion position along the frequency axis, but this configuration is not limiting.

In FIG. 6, data carriers are arranged along the frequency axis in the following order: "data carrier $1", "data carrier $2", "data carrier $3", "data carrier $4", "data carrier $5", "data carrier $6", "data carrier $7", "data carrier $8", "data carrier $9", "data carrier $10", "data carrier $11", "data carrier $12", "data carrier $13" . . . "data carrier $330", "data carrier $331", "data carrier $332", "data carrier $333", "data carrier $334", "data carrier $335", and "data carrier $336". In other words, data carriers are assigned with numbers in ascending order along the frequency axis.

FIG. 81 illustrates a symbol configuration of when mapping is performed on the 2016 bits of the block length (code length) of the error correction code using a modulation method that has 4 signal points in an in-phase I-orthogonal Q plane, and a first block configured of 2016 error correction encoded bits is named block #1 and indicated as "#1". Accordingly, an N-th (N is an integer greater than or equal to 1) block configured of 2016 bits that are error correction encoded is referred to as block #N and denoted as "#N".

When QPSK is applied, 1008 symbols are generated from block #N. In FIG. 81, the 1008 symbols generated from block #1 are indicated as "#1-1", "#1-2", "#1-3", "#1-4" . . . "#1-1006", "#1-1007", and "#1-1008". Accordingly, the 1008 symbols generated from block #N are expressed as "#N-1", "#N-2", "#N-3", "#N-4" . . . "#N-1006", "#N-1007", and "#N-1008".

Figure 82:
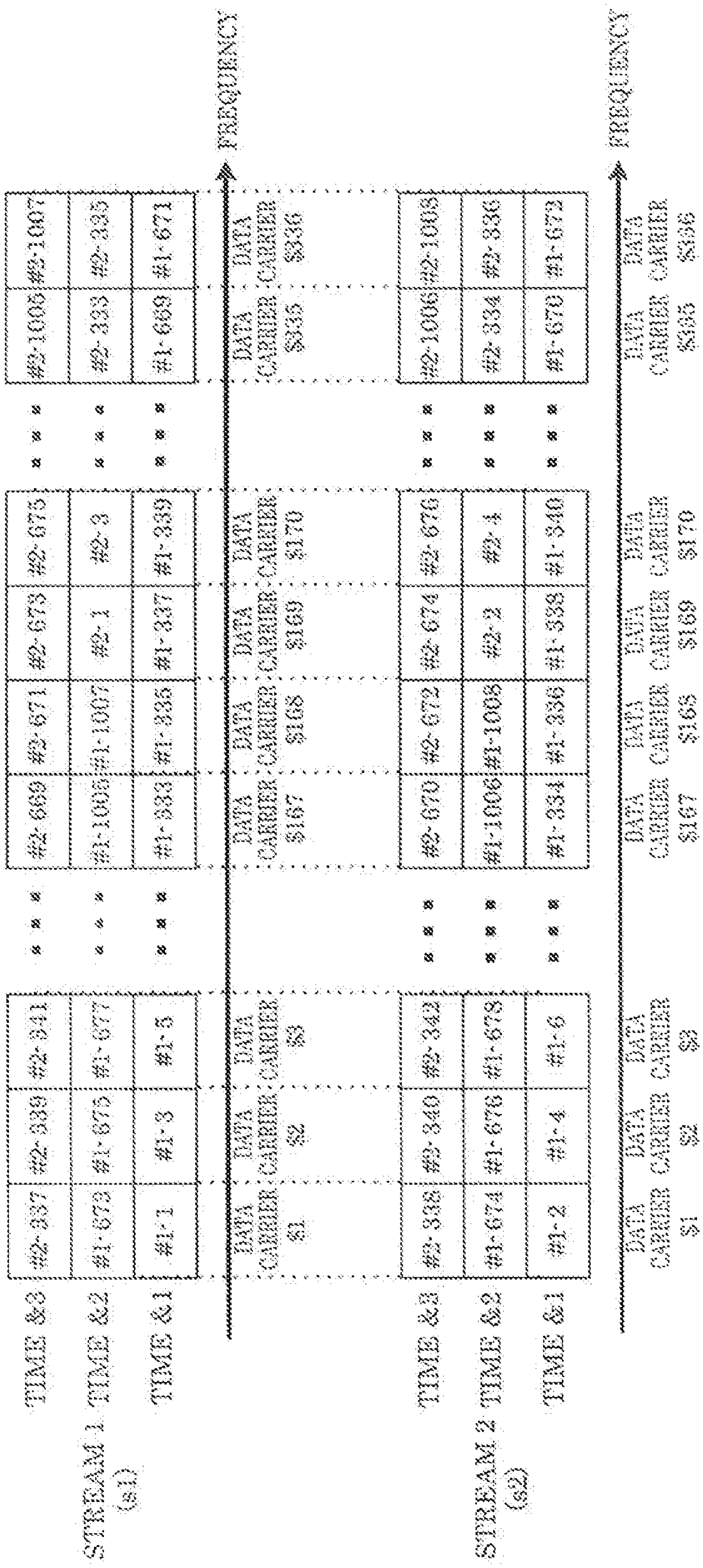
FIG. 82 illustrates an example of a frame configuration.

Moreover, in FIG. 82, the data carriers are illustrated arranged along the horizontal frequency axis. In stream 1, data carriers from data carrier $1 to data carrier $336 are present, and similarly, in stream 2, data carriers from data carrier $1 to data carrier $336 are present.

Then, data carrier $1 in stream 1 and data carrier $1 in stream 2 are transmitted (from different antennas) at the same frequency and at the same time, and data carrier $2 in stream 1 and data carrier $2 in stream 2 are transmitted (from different antennas) at the same frequency and at the same time. In other words, data carrier $L in stream 1 and data carrier $L in stream 2 are transmitted at the same frequency and at the same time, or from different antennas. L is an integer that is greater than or equal to 1 and less than or equal to 336.

As illustrated in FIG. 82, each data carrier in each stream is assigned with a symbol.

Data carrier $1 in stream 1 is assigned with the symbol "#1-1" at time &1, data carrier $1 in stream 2 is assigned with the symbol "#1-2" at time &1, data carrier $2 in stream 1 is assigned with the symbol "#1-3" at time &1, data carrier $2 in stream 2 is assigned with the symbol "#1-4" at time &1, data carrier $3 in stream 1 is assigned with the symbol "#1-5" at time &1, and data carrier $3 in stream 2 is assigned with the symbol "#1-6" at time &1. The symbols are assigned in accordance with such a rule.

Accordingly, the data in block #1 is transmitted by the transmission device using data carrier $1 through $336 in stream 1 at time &1, data carrier $1 through $336 in stream 2 at time &1, data carrier $1 through $168 in stream 1 at time &2, and data carrier $1 through $168 in stream 2 at time &2.

The data in block #2 is transmitted by the transmission device using data carrier $169 through $336 in stream 1 at time &2, data carrier $169 through $336 in stream 2 at time &2, data carrier $1 through $336 in stream 1 at time &3, and data carrier $1 through $336 in stream 2 at time &3.

Accordingly, at time &(3M-2), time &(3M-1), and time &(3M), the symbols are arranged as follows. M is an integer that is greater than or equal to 1.

The data in block #(2M-1) is transmitted by the transmission device using data carrier $1 through $336 in stream 1 at time &(3M-2), data carrier $1 through $336 in stream 2($s$2($i$)) at time &(3M-2), data carrier $1 through $168 in stream 1 at time &(3M-1), and data carrier $1 through $168 in stream 2($s$2($i$)) at time &(3M-1).

The data in block #(2M) is transmitted by the transmission device using data carrier $169 through $336 in stream 1 at time &(3M-1), data carrier $169 through $336 in stream 2($s$2($i$)) at time &(3M-1), data carrier $1 through $336 in stream 1 at time &(3M), and data carrier $1 through $336 in stream 2($s$2($i$)) at time &(3M).

Next, consider a case in which the transmission device transmits modulated signals using a frame configuration such as illustrated in FIG. 82. A conceptual illustration of the reception field intensity in a reception device, which is the partner (communication partner) of the transmission device illustrated in FIG. 1, is provided in FIG. 8.

In FIG. 8, as a side effect of multi-path, low portion 801 of the reception field intensity is present. When the transmission device transmits a modulated signal using a frame configuration such as illustrated in FIG. 82, as a side effect of multi-path (low portion 801 of the reception field intensity illustrated in FIG. 8), it is likely that this will cause a phenomenon in which low reception quality symbols are prevalent among the symbols in the same block in the error correction code. This makes it possible that data reception quality will decrease since high error correction performance cannot be achieved. However, with a frame configuration such as illustrated in FIG. 82, there is a possibility that reception quality will not decrease.

Figure 83:
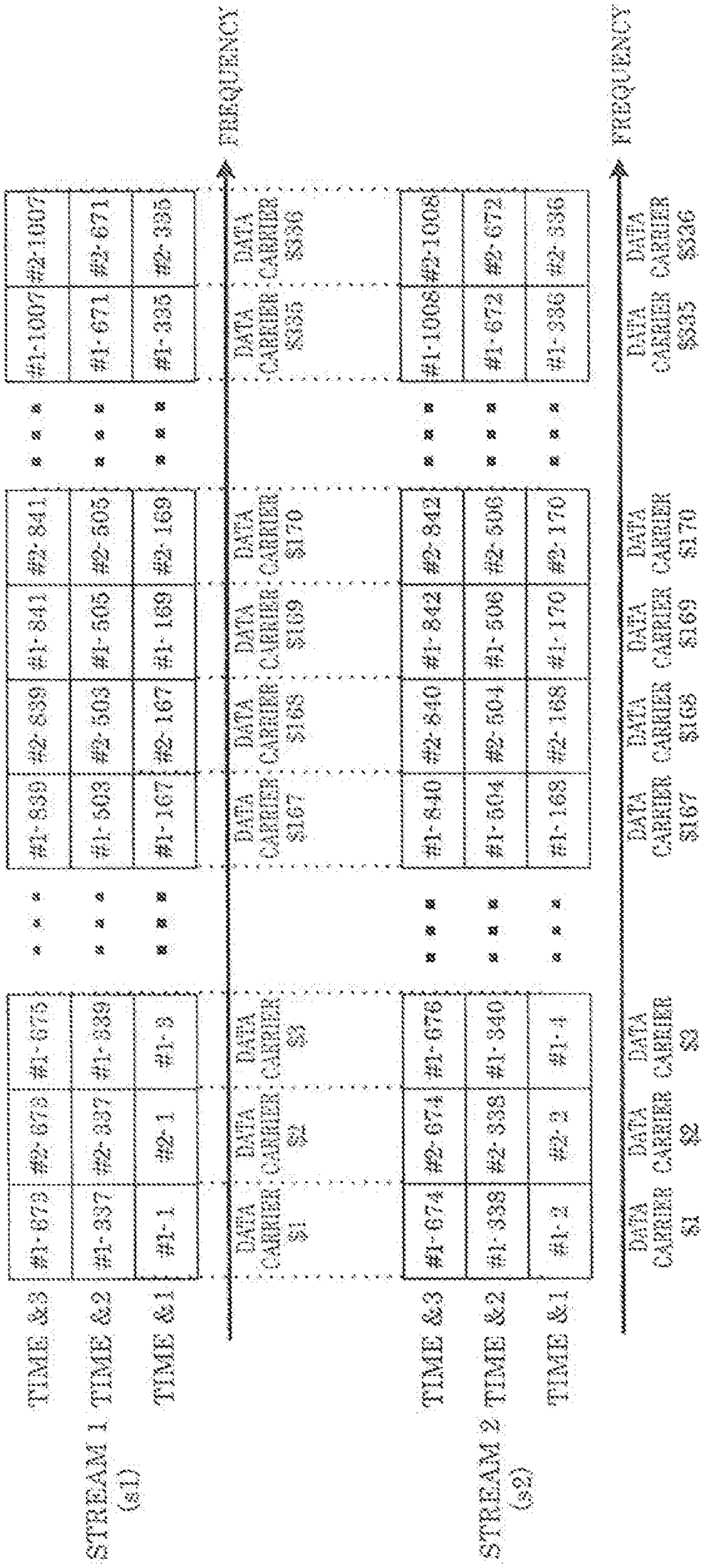
FIG. 83 illustrates an example of a frame configuration.

As another example, consider a frame configuration such as illustrated in FIG. 83. As illustrated in FIG. 83, at time &1, each data carrier in each stream is assigned with a symbol.

Data carrier $1 in stream 1 is assigned with the symbol "#1-1", data carrier $1 in stream 2 is assigned with the symbol "#1-2", data carrier $2 in stream 1 is assigned with the symbol "#2-1", data carrier $2 in stream 2 is assigned with the symbol "#2-2", data carrier $3 in stream 1 is assigned with the symbol "#1-3", data carrier $3 in stream 2 is assigned with the symbol "#1-4", (recitation for data carrier $4 through data carrier $332 is omitted), data carrier $333 in stream 1 is assigned with the symbol "#1-333", data carrier $333 in stream 2 is assigned with the symbol "#1-334", data carrier $334 in stream 1 is assigned with the symbol "#2-333", data carrier $334 in stream 2 is assigned with the symbol "#2-334", data carrier $335 in stream 1 is assigned with the symbol "#1-335", data carrier $335 in stream 2 is assigned with the symbol "#1-336", data carrier $336 in stream 1 is assigned with the symbol "#2-335", and data carrier $336 in stream 2 is assigned with the symbol "#2-336".

At time &2, each data carrier in each stream is assigned with a symbol.

Data carrier $1 in stream 1 is assigned with the symbol "#1-337", data carrier $1 in stream 2 is assigned with the symbol "#1-338", data carrier $2 in stream 1 is assigned with the symbol "#2-337", data carrier $2 in stream 2 is assigned with the symbol "#2-338", data carrier $3 in stream 1 is assigned with the symbol "#1-339", data carrier $3 in stream 2 is assigned with the symbol "#1-340", (recitation for data carrier $4 through data carrier $332 is omitted), data carrier $333 in stream 1 is assigned with the symbol "#1-669", data carrier $333 in stream 2 is assigned with the symbol "#1-670", data carrier $334 in stream 1 is assigned with the symbol "#2-669", data carrier $334 in stream 2 is assigned with the symbol "#2-670", data carrier $335 in stream 1 is assigned with the symbol "#1-671", data carrier $335 in stream 2 is assigned with the symbol "#1-672", data carrier $336 in stream 1 is assigned with the symbol "#2-671", and data carrier $336 in stream 2 is assigned with the symbol "#2-672".

At time &3, each data carrier in each stream is assigned with a symbol.

Data carrier $1 in stream 1 is assigned with the symbol "#1-337", data carrier $1 in stream 2 is assigned with the symbol "#1-338", data carrier $2 in stream 1 is assigned with the symbol "#2-337", data carrier $2 in stream 2 is assigned with the symbol "#2-338", data carrier $3 in stream 1 is assigned with the symbol "#1-339", data carrier $3 in stream 2 is assigned with the symbol "#1-340", (recitation for data carrier $4 through data carrier $332 is omitted), data carrier $333 in stream 1 is assigned with the symbol "#1-1005", data carrier $333 in stream 2 is assigned with the symbol "#1-1006", data carrier $334 in stream 1 is assigned with the symbol "#2-1005", data carrier $334 in stream 2 is assigned with the symbol "#2-1006", data carrier $335 in stream 1 is assigned with the symbol "#1-1007", data carrier $335 in stream 2 is assigned with the symbol "#1-1008", data carrier $336 in stream 1 is assigned with the symbol "#2-1007", and data carrier $336 in stream 2 is assigned with the symbol "#2-1008".

Accordingly, at time &(3M-2), time &(3M-1), and time &(3M), the symbols are arranged as follows. M is an integer that is greater than or equal to 1. K is an odd number. L is an even number.

The data in block #(2M-1) is transmitted by the transmission device using data carrier $K in stream 1 at time &(3M-2), time &(3M-1), and time &(3M), and data carrier $K in stream 2($s$2($i$)) at time &(3M-2), time &(3M-1), and time &(3M).

The data in block #(2M) is transmitted by the transmission device using data carrier $L in stream 1 at time &(3M-2), time &(3M-1), and time &(3M), and data carrier $L in stream 2($s$2($i$)) at time &(3M-2), time &(3M-1), and time &(3M).

In the case of a frame configuration such as illustrated in FIG. 83, there is a low chance of the phenomenon described in regard to FIG. 8 occurring.

Figure 84:
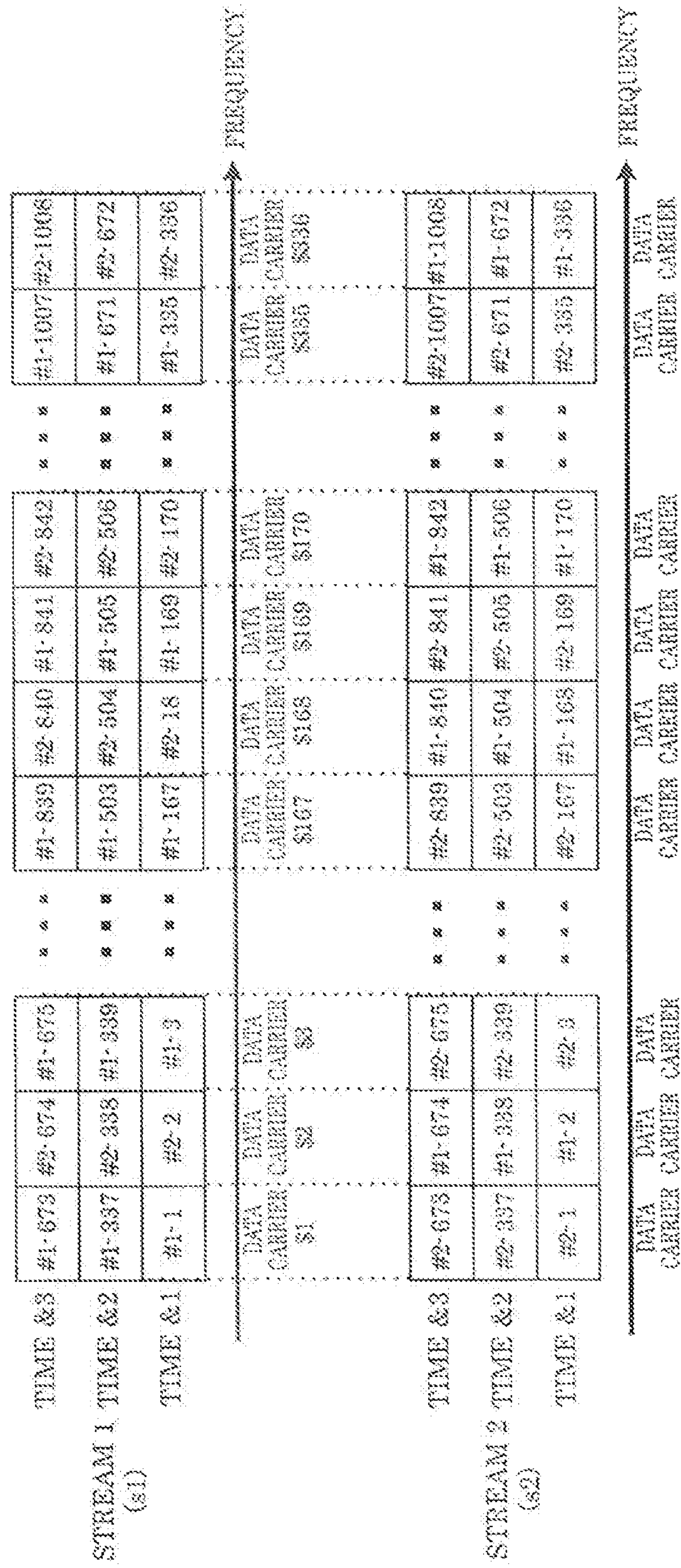
FIG. 84 illustrates an example of a frame configuration.

As another example for overcoming the phenomenon described with reference to FIG. 8, consider a frame configuration such as illustrated in FIG. 84.

As illustrated in FIG. 84,

At time &1, each data carrier in each stream is assigned with a symbol.

Data carrier $1 in stream 1 is assigned with the symbol "#1-1", data carrier $1 in stream 2 is assigned with the symbol "#2-1", data carrier $2 in stream 1 is assigned with the symbol "#2-2", data carrier $2 in stream 2 is assigned with the symbol "#1-2", data carrier $3 in stream 1 is assigned with the symbol "#1-3", data carrier $3 in stream 2 is assigned with the symbol "#2-3", data carrier $4 in stream 1 is assigned with the symbol "#2-4", data carrier $4 in stream 2 is assigned with the symbol "#1-4", (recitation for data carrier $5 through data carrier $334 is omitted), data carrier $333 in stream 1 is assigned with the symbol "#1-333", data carrier $333 in stream 2 is assigned with the symbol "#2-333", data carrier $334 in stream 1 is assigned with the symbol "#2-334", data carrier $334 in stream 2 is assigned with the symbol "#1-334", data carrier $335 in stream 1 is assigned with the symbol "#1-335", data carrier $335 in stream 2 is assigned with the symbol "#2-335", data carrier $336 in stream 1 is assigned with the symbol "#2-336", and data carrier $336 in stream 2 is assigned with the symbol "#1-336".

At time &2, each data carrier in each stream is assigned with a symbol.

Data carrier $1 in stream 1 is assigned with the symbol "#1-337", data carrier $1 in stream 2 is assigned with the symbol "#2-337", data carrier $2 in stream 1 is assigned with the symbol "#2-338", data carrier $2 in stream 2 is assigned with the symbol "#1-338", data carrier $3 in stream 1 is assigned with the symbol "#1-339", data carrier $3 in stream 2 is assigned with the symbol "#2-339", data carrier $4 in stream 1 is assigned with the symbol "#2-340", data carrier $4 in stream 2 is assigned with the symbol "#1-340", (recitation for data carrier $5 through data carrier $334 is omitted), data carrier $333 in stream 1 is assigned with the symbol "#1-669", data carrier $333 in stream 2 is assigned with the symbol "#2-669", data carrier $334 in stream 1 is assigned with the symbol "#2-670", data carrier $334 in stream 2 is assigned with the symbol "#1-670", data carrier $335 in stream 1 is assigned with the symbol "#1-671", data carrier $335 in stream 2 is assigned with the symbol "#2-671", data carrier $336 in stream 1 is assigned with the symbol "#2-672", and data carrier $336 in stream 2 is assigned with the symbol "#1-672".

At time &3, each data carrier in each stream is assigned with a symbol.

Data carrier $1 in stream 1 is assigned with the symbol "#1-673", data carrier $1 in stream 2 is assigned with the symbol "#2-673", data carrier $2 in stream 1 is assigned with the symbol "#2-674", data carrier $2 in stream 2 is assigned with the symbol "#1-674", data carrier $3 in stream 1 is assigned with the symbol "#1-675", data carrier $3 in stream 2 is assigned with the symbol "#2-675", data carrier $4 in stream 1 is assigned with the symbol "#2-676", data carrier $4 in stream 2 is assigned with the symbol "#1-676", (recitation for data carrier $5 through data carrier $334 is omitted), data carrier $333 in stream 1 is assigned with the symbol "#1-1005", data carrier $333 in stream 2 is assigned with the symbol "#2-1005", data carrier $334 in stream 1 is assigned with the symbol "#2-1006", data carrier $334 in stream 2 is assigned with the symbol "#1-1006", data carrier $335 in stream 1 is assigned with the symbol "#1-1007", data carrier $335 in stream 2 is assigned with the symbol "#2-1007", data carrier $336 in stream 1 is assigned with the symbol "#2-1008", and data carrier $336 in stream 2 is assigned with the symbol "#1-1008".

Accordingly, at time &(3M-2), time &(3M-1), and time &(3M), the symbols are arranged as follows. M is an integer that is greater than or equal to 1, K is an odd number, and L is an even number.

The data in block #(2M-1) is transmitted by the transmission device using data carrier $K in stream 1(*s*1(*i*)) at time &(3M-2), time &(3M-1), and time &(3M), and data carrier $L in stream 2(*s*2(*i*)) at time &(3M-2), time &(3M-1), and time &(3M).

The data in block #(2M) is transmitted by the transmission device using data carrier $L in stream 1(*s*1(*i*)) at time &(3M-2), time &(3M-1), and time &(3M), and data carrier $K in stream 2(*s*2(*i*)) at time &(3M-2), time &(3M-1), and time &(3M).

In the case of a frame configuration such as illustrated in FIG. 84, there is a low chance of the phenomenon described in regard to FIG. 8 occurring.

Figure 85:
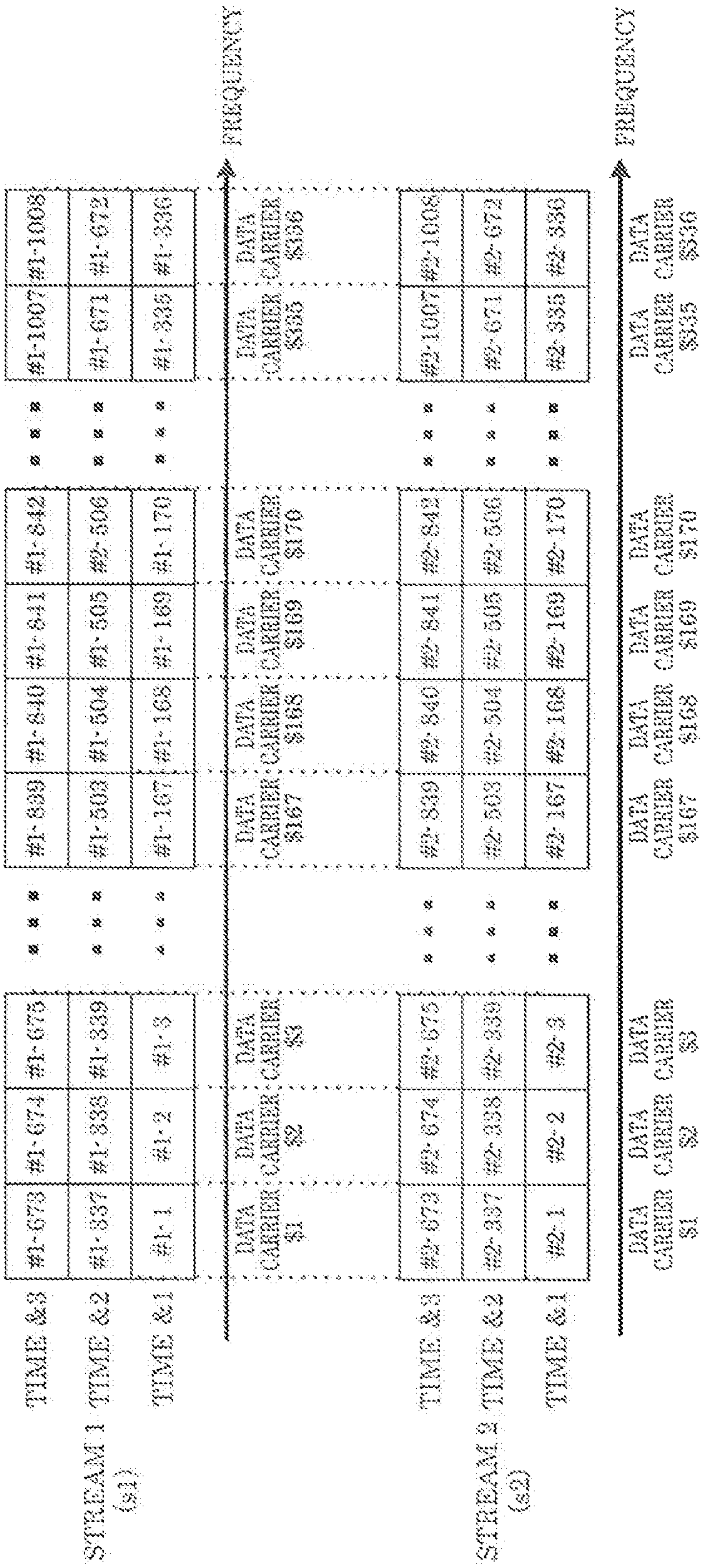
FIG. 85 illustrates an example of a frame configuration.

As another example for overcoming the phenomenon described with reference to FIG. 8, consider a frame configuration such as illustrated in FIG. 85.

As illustrated in FIG. 85,

At time &1, each data carrier in each stream is assigned with a symbol.

Data carrier $1 in stream 1 is assigned with the symbol "#1-1", data carrier $1 in stream 2(*s*2(*i*)) is assigned with the symbol "#2-1", data carrier $2 in stream 1 is assigned with the symbol "#1-2", data carrier $2 in stream 2(*s*2(*i*)) is assigned with the symbol "#2-2", data carrier $3 in stream 1 is assigned with the symbol "#1-3", data carrier $3 in stream 2(*s*2(*i*)) is assigned with the symbol "#2-3", data carrier $4 in stream 1 is assigned with the symbol "#1-4", data carrier $4 in stream 2(*s*2(*i*)) is assigned with the symbol "#2-4", (recitation for data carrier $5 through data carrier $334 is omitted), data carrier $333 in stream 1 is assigned with the symbol "#1-333", data carrier $333 in stream 2(*s*2(*i*)) is assigned with the symbol "#2-333", data carrier $334 in stream 1 is assigned with the symbol "#1-334", data carrier $334 in stream 2(*s*2(*i*)) is assigned with the symbol "#2-334", data carrier $335 in stream 1 is assigned with the symbol "#1-335", data carrier $335 in stream 2(*s*2(*i*)) is assigned with the symbol "#2-335", data carrier $336 in stream 1 is assigned with the symbol "#1-336", and data carrier $336 in stream 2(*s*2(*i*)) is assigned with the symbol "#2-336".

At time &2, each data carrier in each stream is assigned with a symbol.

Data carrier $1 in stream 1 is assigned with the symbol "#1-337", data carrier $1 in stream 2(*s*2(*i*)) is assigned with the symbol "#2-337", data carrier $2 in stream 1 is assigned with the symbol "#1-338", data carrier $2 in stream 2(*s*2(*i*)) is assigned with the symbol "#2-338", data carrier $3 in stream 1 is assigned with the symbol "#1-339", data carrier $3 in stream 2(*s*2(*i*)) is assigned with the symbol "#2-339", data carrier $4 in stream 1 is assigned with the symbol "#1-340", data carrier $4 in stream 2(*s*2(*i*)) is assigned with the symbol "#2-340", (recitation for data carrier $5 through data carrier $334 is omitted), data carrier $333 in stream 1 is assigned with the symbol "#1-669", data carrier $333 in stream 2(*s*2(*i*)) is assigned with the symbol "#2-669", data carrier $334 in stream 1 is assigned with the symbol "#1-670", data carrier $334 in stream 2(*s*2(*i*)) is assigned with the symbol "#2-670", data carrier $335 in stream 1 is assigned with the symbol "#1-671", data carrier $335 in stream 2(*s*2(*i*)) is assigned with the symbol "#2-671", data carrier $336 in stream 1 is assigned with the symbol "#1-672", and data carrier $336 in stream 2(*s*2(*i*)) is assigned with the symbol "#2-672".

At time &3, each data carrier in each stream is assigned with a symbol.

Data carrier $1 in stream 1 is assigned with the symbol "#1-673", data carrier $1 in stream 2(*s*2(*i*)) is assigned with the symbol "#2-673", data carrier $2 in stream 1 is assigned with the symbol "#1-674", data carrier $2 in stream 2(*s*2(*i*)) is assigned with the symbol "#2-674", data carrier $3 in stream 1 is assigned with the symbol "#1-675", data carrier $3 in stream 2(*s*2(*i*)) is assigned with the symbol "#2-675", data carrier $4 in stream 1 is assigned with the symbol "#1-676", data carrier $4 in stream 2(*s*2(*i*)) is assigned with the symbol "#2-676", (recitation for data carrier $5 through data carrier $334 is omitted), data carrier $333 in stream 1 is assigned with the symbol "#1-1005", data carrier $333 in stream 2(*s*2(*i*)) is assigned with the symbol "#2-1005", data carrier $334 in stream 1 is assigned with the symbol "#1-1006", data carrier $334 in stream 2(*s*2(*i*)) is assigned with the symbol "#2-1006",
data carrier $335 in stream 1 is assigned with the symbol "#1-1007",
data carrier $335 in stream 2(*s*2(*i*)) is assigned with the symbol "#2-1007",
data carrier $336 in stream 1 is assigned with the symbol "#1-1008", and
data carrier $336 in stream 2(*s*2(*i*)) is assigned with the symbol "#2-1008".

Accordingly, at time &(3M-2), time &(3M-1), and time &(3M), the symbols are arranged as follows. M is an integer that is greater than or equal to 1.

The data in block #(2M-1) is transmitted by the transmission device using a data carrier in stream 1(*s*1(*i*)) at time &(3M-2), time &(3M-1), and time &(3M).

The data in block #(2M) is transmitted by the transmission device using a data carrier in stream 2(*s*2(*i*)) at time &(3M-2), time &(3M-1), and time &(3M).

In the case of a frame configuration such as illustrated in FIG. 85, there is a low chance of the phenomenon described in regard to FIG. 8 occurring.

Figure 86:
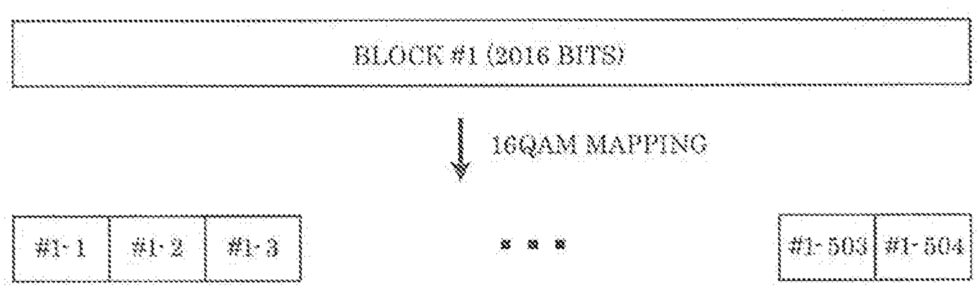
FIG. 86 illustrates an example of symbol generation.

FIG. 86 illustrates a symbol configuration of when mapping is performed on the 2016 bits of the block length (code length) of the error correction code using a modulation method that has 16 signal points in an in-phase I-orthogonal Q plane, and a first block configured of 2016 error correction encoded bits is named block #1 and indicated as "#1". Accordingly, an N-th (N is an integer greater than or equal to 1) block configured of 2016 bits that are error correction encoded is referred to as block #N and denoted as "#N".

When 16QAM is applied, 504 symbols are generated from block #N. In FIG. 86, the 504 symbols generated from block #1 are indicated as "#1-1", "#1-2", "#1-3", "#1-4" . . . "#1-502", "#1-503", and "#1-504". Accordingly, the 504 symbols generated from block #N are expressed as "#N-1", "#N-2", "#N-3", "#N-4" . . . "#N-502", "#N-503", and "#N-504".

Figure 87A:
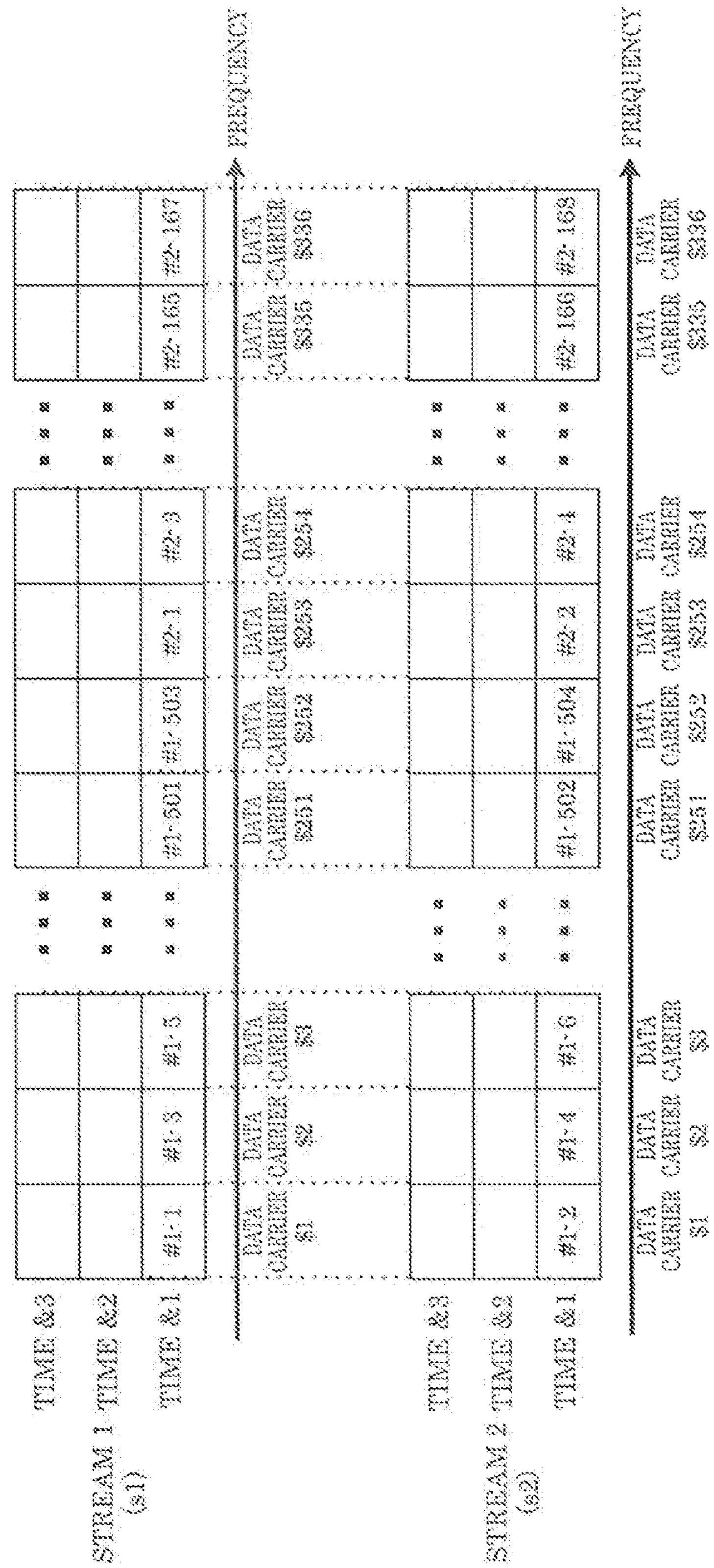
FIG. 87A illustrates an example of a frame configuration.
Figure 87B:
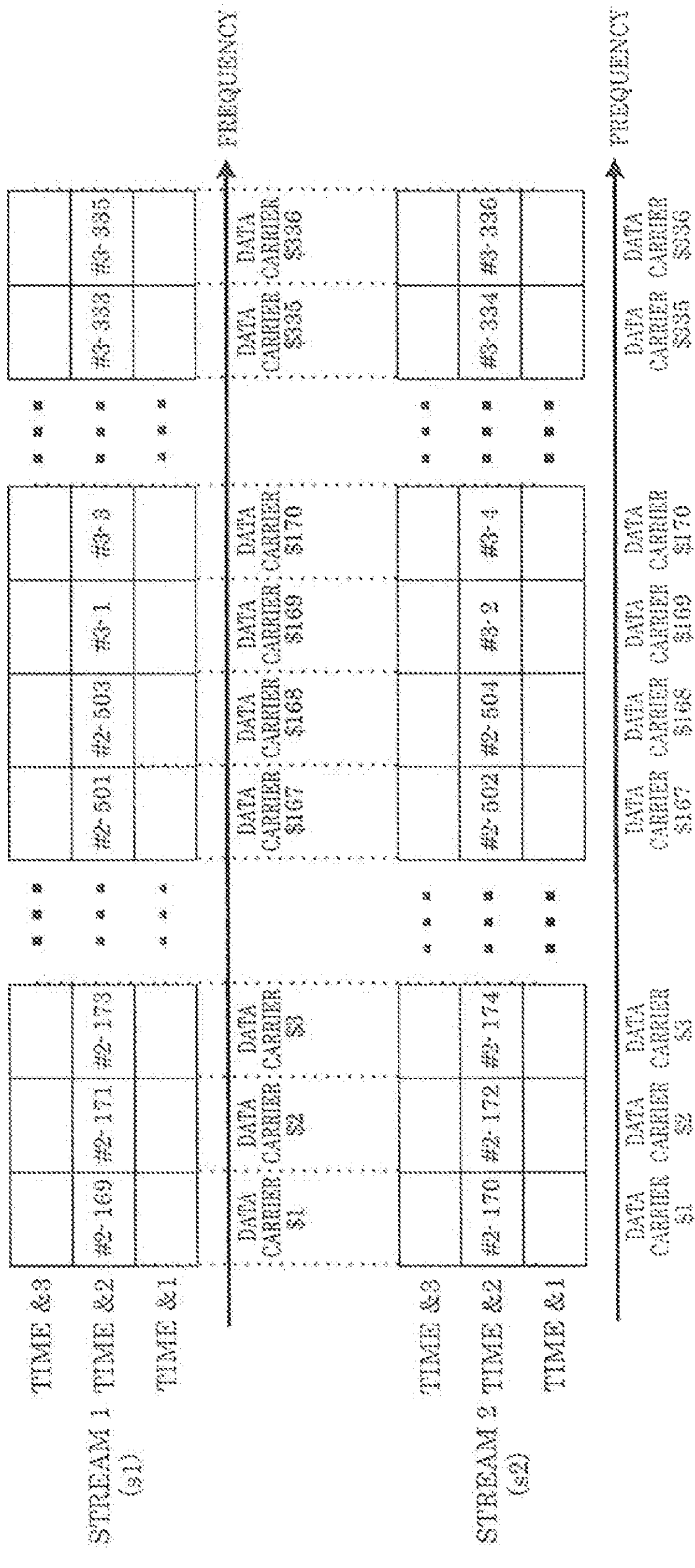
FIG. 87B illustrates an example of a frame configuration.
Figure 87C:
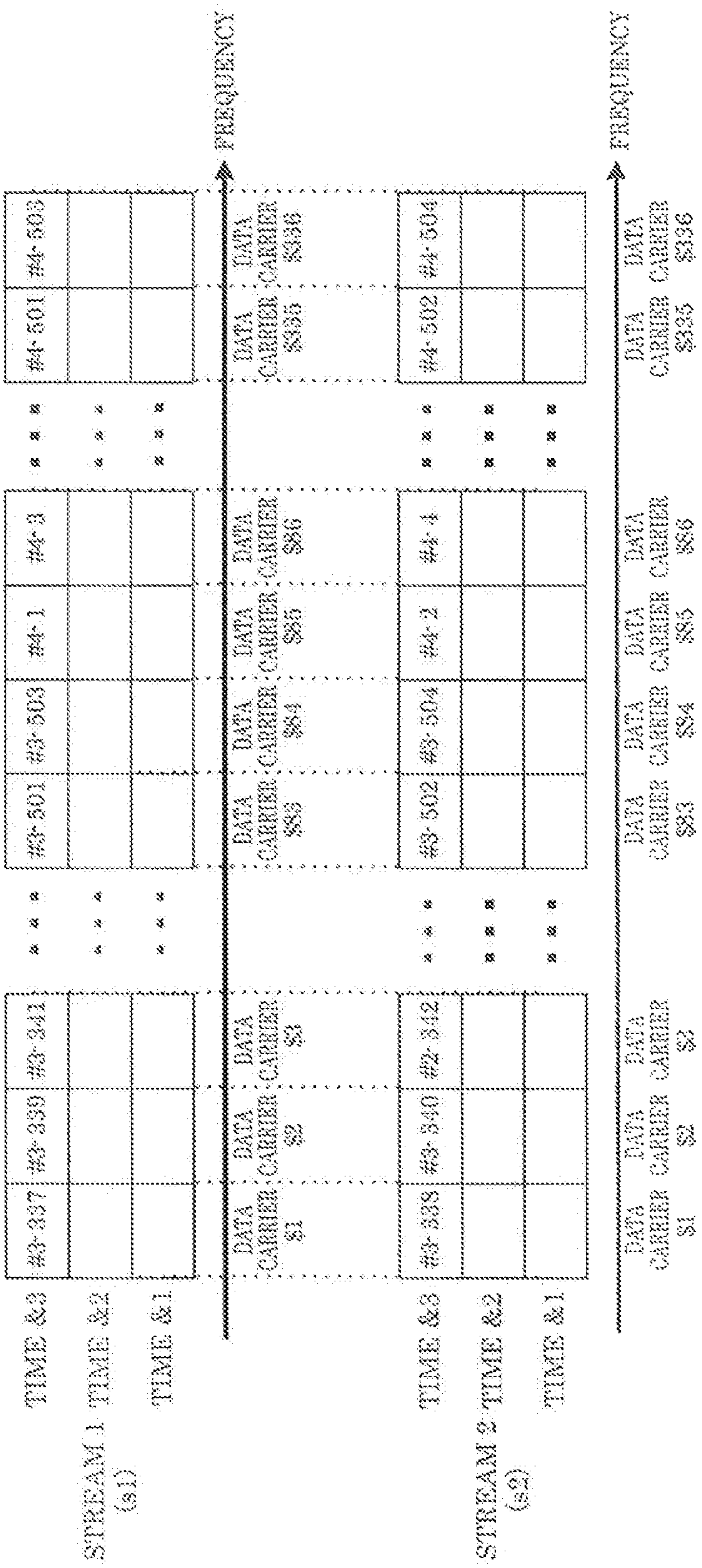
FIG. 87C illustrates an example of a frame configuration.

Moreover, in FIG. 87A, FIG. 87B, and FIG. 87C, frequency is represented on the horizontal axis, and data carrier are aligned along the horizontal frequency axis. FIG. 87A illustrates a state of time &1 in detail, FIG. 87B illustrates a state of time &2 in detail, and FIG. 87C illustrates a state of time &3 in detail. Note that in stream 1, data carriers from data carrier $1 to data carrier $336 are present, and similarly, in stream 2(*s*2(*i*)), data carriers from data carrier $1 to data carrier $336 are present.

Data carrier $1 in stream 1 and data carrier $1 in stream 2(*s*2(*i*)) are transmitted (from different antennas) at the same frequency and at the same time, and data carrier $2 in stream 1 and data carrier $2 in stream 2(*s*2(*i*)) are transmitted (from different antennas) at the same frequency and at the same time. In other words, data carrier $L in stream 1 and data carrier $L in stream 2(*s*2(*i*)) are transmitted at the same frequency and at the same time, or from different antennas at the same frequency and at the same time. L is an integer that is greater than or equal to 1 and less than or equal to 336.

As illustrated in FIG. 87A, each data carrier in each stream is assigned with a symbol.

Data carrier $1 in stream 1 is assigned with the symbol "#1-1" at time &1, data carrier $1 in stream 2(*s*2(*i*)) is assigned with the symbol "#1-2" at time &1, data carrier $2 in stream 1 is assigned with the symbol "#1-3" at time &1, data carrier $2 in stream 2(*s*2(*i*)) is assigned with the symbol "#1-4" at time &1, data carrier $3 in stream 1 is assigned with the symbol "#1-5" at time &1, and data carrier $3 in stream 2(*s*2(*i*)) is assigned with the symbol "#1-6" at time &1. The symbols are assigned in accordance with such a rule.

Accordingly, the data in block #1 is transmitted from the transmission device using data carrier $1 through $252 in stream 1 at time &1, and data carrier $1 through $252 in stream 2(*s*2(*i*)) at time &1.

Moreover, as illustrated in FIG. 87A, the data in block #2 is transmitted from the transmission device using data carrier $253 through $336 in stream 1 at time &1, and data carrier $253 through $336 in stream 2(*s*2(*i*)) at time &1 Moreover, as illustrated in FIG. 87B, the data in block #2 is transmitted from the transmission device using data carrier $1 through $256 in stream 1 at time &2, and data carrier $1 through $256 in stream 2(*s*2(*i*)) at time &2.

Moreover, as illustrated in FIG. 87B, the data in block #3 is transmitted from the transmission device using data carrier $169 through $336 in stream 1 at time &2, and data carrier $169 through $336 in stream 2(*s*2(*i*)) at time &2. Moreover, as illustrated in FIG. 87C, the data in block #3 is transmitted from the transmission device using data carrier $1 through $336 in stream 1 at time &3, and data carrier $1 through $336 in stream 2(*s*2(*i*)) at time &3.

Accordingly, at time &(3M-2), time &(3M-1), and time &(3M), the symbols are arranged as follows. M is an integer that is greater than or equal to 1.

The data in block #(4M-3) is transmitted from the transmission device using data carrier $1 through $252 in stream 1 at time &(3M-2), and data carrier $1 through $252 in stream 2(*s*2(*i*)) at time &(3M-2).

The data in block #(4M-2) is transmitted by the transmission device using data carrier $253 through $336 in stream 1 at time &(3M-2), data carrier $253 through $336 in stream 2(*s*2(*i*)) at time &(3M-2), data carrier $1 through $168 in stream 1 at time &(3M-1), and data carrier $1 through $168 in stream 2(*s*2(*i*)) at time &(3M-1).

The data in block #(4M-1) is transmitted by the transmission device using data carrier $169 through $336 in stream 1 at time &(3M-1), data carrier $169 through $336 in stream 2(*s*2(*i*)) at time &(3M-2), data carrier $1 through $84 in stream 1 at time &(3M), and data carrier $1 through $84 in stream 2(*s*2(*i*)) at time &(3M).

The data in block #(4M) is transmitted by the transmission device using data carrier $85 through $336 in stream 1 at time &(3M), and data carrier $85 through $336 in stream 2(*s*2(*i*)) at time &(3M).

In FIG. 8, as a side effect of multi-path, low portion 801 of the reception field intensity is present. When the transmission device transmits a modulated signal using a frame configuration such as illustrated in FIG. 87A, FIG. 87B, and FIG. 87C, as a side effect of multi-path (low portion 801 of the reception field intensity illustrated in FIG. 8), it is likely that this will cause a phenomenon in which low reception quality symbols are prevalent among the symbols in the same block in the error correction code. This makes it possible that data reception quality will decrease since high error correction performance cannot be achieved. However, with a frame configuration such as illustrated in FIG. 87A, FIG. 87B, and FIG. 87C, there is a possibility that reception quality will not decrease.

Figure 88:
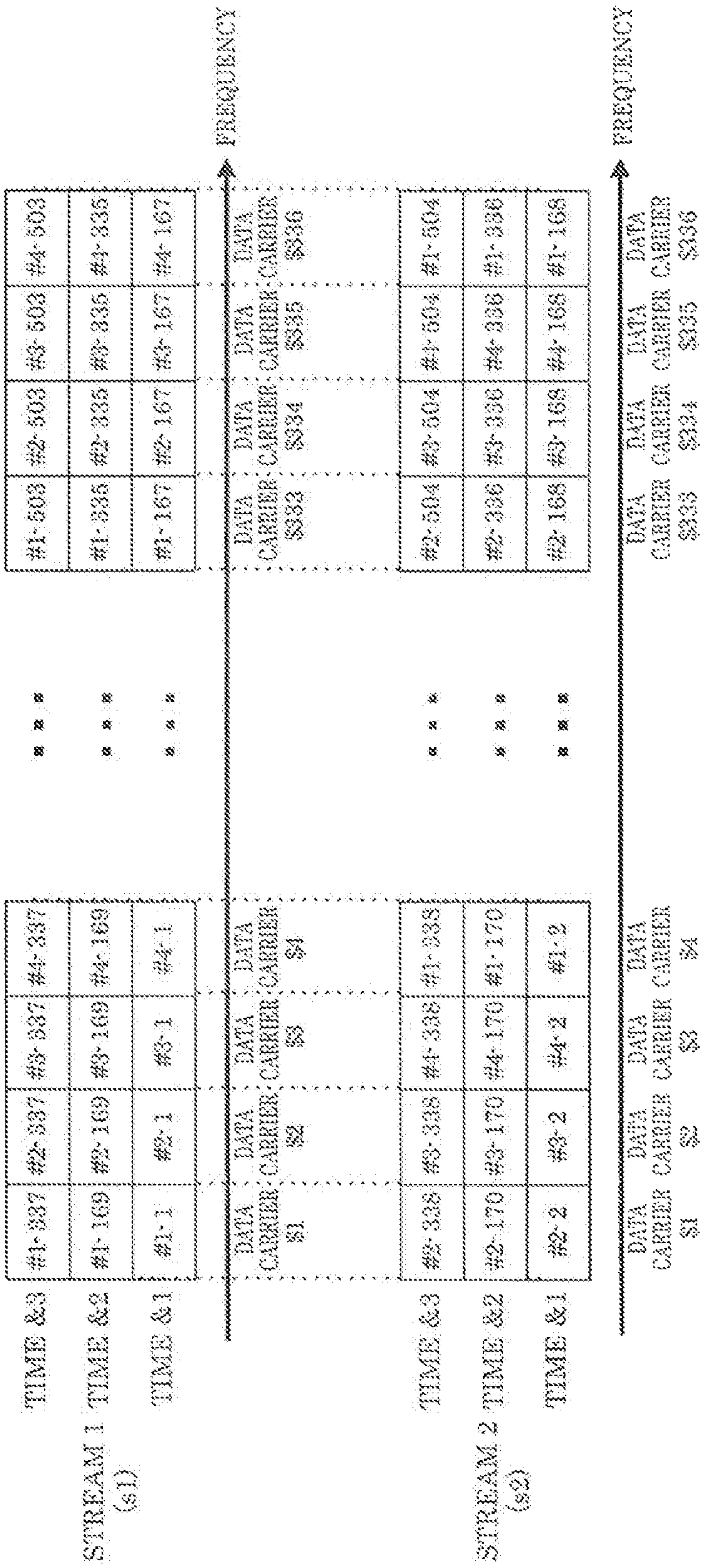
FIG. 88 illustrates an example of a frame configuration.

As another example for overcoming the phenomenon described with reference to FIG. 8, consider a frame configuration such as illustrated in FIG. 88.

As illustrated in FIG. 88,

At time &1, each data carrier in each stream is assigned with a symbol.

Data carrier $1 in stream 1 is assigned with the symbol "#1-1",
data carrier $1 in stream 2(s2(i)) is assigned with the symbol "#2-2",
data carrier $2 in stream 1 is assigned with the symbol "#2-1",
data carrier $2 in stream 2(s2(i)) is assigned with the symbol "#3-2",
data carrier $3 in stream 1 is assigned with the symbol "#3-1",
data carrier $3 in stream 2(s2(i)) is assigned with the symbol "#4-2",
data carrier $4 in stream 1 is assigned with the symbol "#4-1",
data carrier $4 in stream 2(s2(i)) is assigned with the symbol "#1-2",
(recitation for data carrier $5 through data carrier $332 is omitted),
data carrier $333 in stream 1 is assigned with the symbol "#1-167",
data carrier $333 in stream 2(s2(i)) is assigned with the symbol "#2-168",
data carrier $334 in stream 1 is assigned with the symbol "#2-167",
data carrier $334 in stream 2(s2(i)) is assigned with the symbol "#3-168",
data carrier $335 in stream 1 is assigned with the symbol "#3-167",
data carrier $335 in stream 2(s2(i)) is assigned with the symbol "#4-168",
data carrier $336 in stream 1 is assigned with the symbol "#4-167", and
data carrier $336 in stream 2(s2(i)) is assigned with the symbol "#1-168".

At time &2, each data carrier in each stream is assigned with a symbol.

Data carrier $1 in stream 1 is assigned with the symbol "#1-169",
data carrier $1 in stream 2(s2(i)) is assigned with the symbol "#2-170",
data carrier $2 in stream 1 is assigned with the symbol "#2-169",
data carrier $2 in stream 2(s2(i)) is assigned with the symbol "#3-170",
data carrier $3 in stream 1 is assigned with the symbol "#3-169",
data carrier $3 in stream 2(s2(i)) is assigned with the symbol "#4-170",
data carrier $4 in stream 1 is assigned with the symbol "#4-169",
data carrier $4 in stream 2(s2(i)) is assigned with the symbol "#1-170",
(recitation for data carrier $5 through data carrier $332 is omitted),
data carrier $333 in stream 1 is assigned with the symbol "#1-335",
data carrier $333 in stream 2(s2(i)) is assigned with the symbol "#2-336",
data carrier $334 in stream 1 is assigned with the symbol "#2-335",
data carrier $334 in stream 2(s2(i)) is assigned with the symbol "#3-336",
data carrier $335 in stream 1 is assigned with the symbol "#3-335",
data carrier $335 in stream 2(s2(i)) is assigned with the symbol "#4-336",
data carrier $336 in stream 1 is assigned with the symbol "#4-335", and
data carrier $336 in stream 2(s2(i)) is assigned with the symbol "#1-336".

At time &3, each data carrier in each stream is assigned with a symbol.

Data carrier $1 in stream 1 is assigned with the symbol "#1-337",
data carrier $1 in stream 2(s2(i)) is assigned with the symbol "#2-338",
data carrier $2 in stream 1 is assigned with the symbol "#2-337",
data carrier $2 in stream 2(s2(i)) is assigned with the symbol "#3-338",
data carrier $3 in stream 1 is assigned with the symbol "#3-337",
data carrier $3 in stream 2(s2(i)) is assigned with the symbol "#4-338",
data carrier $4 in stream 1 is assigned with the symbol "#4-337",
data carrier $4 in stream 2(s2(i)) is assigned with the symbol "#1-338",
(recitation for data carrier $5 through data carrier $334 is omitted),
data carrier $333 in stream 1 is assigned with the symbol "#1-503",
data carrier $333 in stream 2(s2(i)) is assigned with the symbol "#2-504",
data carrier $334 in stream 1 is assigned with the symbol "#2-503",
data carrier $334 in stream 2(s2(i)) is assigned with the symbol "#3-504",
data carrier $335 in stream 1 is assigned with the symbol "#3-503",
data carrier $335 in stream 2(s2(i)) is assigned with the symbol "#4-504",
data carrier $336 in stream 1 is assigned with the symbol "#4-503", and
data carrier $336 in stream 2(s2(i)) is assigned with the symbol "#1-504".

Accordingly, at time &(3M-2), time &(3M-1), and time &(3M), the symbols are arranged as follows. M is an integer that is greater than or equal to 1. K is an integer that is greater than or equal to 1 and less than or equal to 84, and L is an integer that is greater than or equal to 1 and less than or equal to 84.

The data in block #(4M-3) is transmitted by the transmission device using data carrier $(4K-3) in stream 1(s1(i)) at time &(3M-2), time &(3M-1), and time &(3M), and data carrier $(4L) in stream 2(s2(i)) at time &(3M-2), time &(3M-1), and time &(3M).

The data in block #(4M-2) is transmitted by the transmission device using data carrier $(4K-2) in stream 1(s1(i)) at time &(3M-2), time &(3M-1), and time &(3M), and data carrier $(4L-3) in stream 2(s2(i)) at time &(3M-2), time &(3M-1), and time &(3M).

The data in block #(4M-1) is transmitted by the transmission device using data carrier $(4K-1) in stream 1(s1(i)) at time &(3M-2), time &(3M-1), and time &(3M), and data carrier $(4L-2) in stream 2(s2(i)) at time &(3M-2), time &(3M-1), and time &(3M).

The data in block #(4M) is transmitted by the transmission device using data carrier $(4K) in stream 1(s1(i)) at time &(3M-2), time &(3M-1), and time &(3M), and data carrier $(4L-1) in stream 2(s2(i)) at time &(3M-2), time &(3M-1), and time &(3M).

In the case of a frame configuration such as illustrated in FIG. 88, there is a low chance of the phenomenon described in regard to FIG. 8 occurring.

Figure 89:
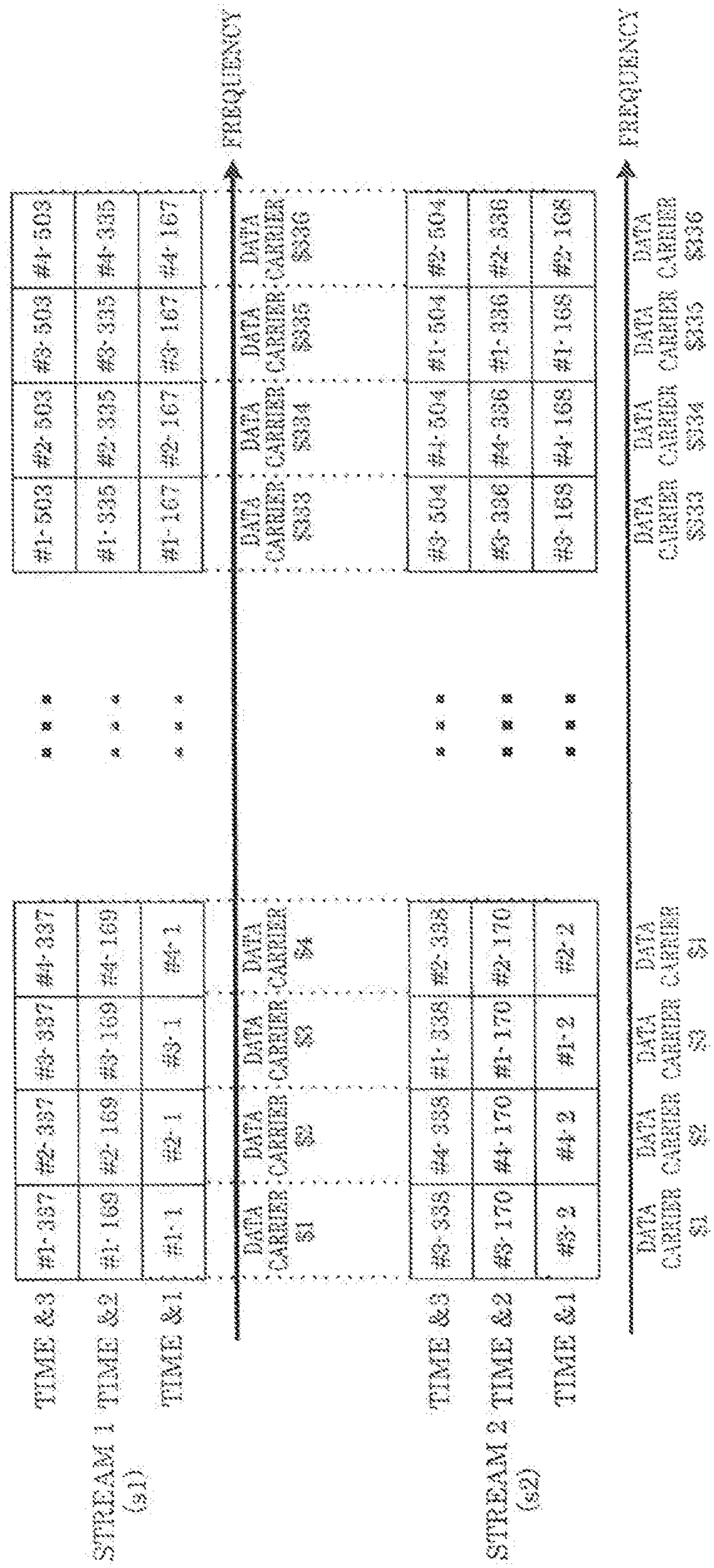
FIG. 89 illustrates an example of a frame configuration.

As another example for overcoming the phenomenon described with reference to FIG. 8, consider a frame configuration such as illustrated in FIG. 89.

As illustrated in FIG. 89,

At time &1, each data carrier in each stream is assigned with a symbol.

Data carrier $1 in stream 1 is assigned with the symbol "#1-1", data carrier $1 in stream 2(*s*2(*i*)) is assigned with the symbol "#3-2", data carrier $2 in stream 1 is assigned with the symbol "#2-1", data carrier $2 in stream 2(*s*2(*i*)) is assigned with the symbol "#4-2", data carrier $3 in stream 1 is assigned with the symbol "#3-1", data carrier $3 in stream 2(*s*2(*i*)) is assigned with the symbol "#1-2", data carrier $4 in stream 1 is assigned with the symbol "#4-1", data carrier $4 in stream 2(*s*2(*i*)) is assigned with the symbol "#2-2", (recitation for data carrier $5 through data carrier $332 is omitted), data carrier $333 in stream 1 is assigned with the symbol "#1-167", data carrier $333 in stream 2(*s*2(*i*)) is assigned with the symbol "#3-168", data carrier $334 in stream 1 is assigned with the symbol "#2-167", data carrier $334 in stream 2(*s*2(*i*)) is assigned with the symbol "#4-168", data carrier $335 in stream 1 is assigned with the symbol "#3-167", data carrier $335 in stream 2(*s*2(*i*)) is assigned with the symbol "#1-168", data carrier $336 in stream 1 is assigned with the symbol "#4-167", and data carrier $336 in stream 2(*s*2(*i*)) is assigned with the symbol "#2-168".

At time &2, each data carrier in each stream is assigned with a symbol.

Data carrier $1 in stream 1 is assigned with the symbol "#1-169", data carrier $1 in stream 2(*s*2(*i*)) is assigned with the symbol "#3-170", data carrier $2 in stream 1 is assigned with the symbol "#2-169", data carrier $2 in stream 2(*s*2(*i*)) is assigned with the symbol "#4-170", data carrier $3 in stream 1 is assigned with the symbol "#3-169", data carrier $3 in stream 2(*s*2(*i*)) is assigned with the symbol "#1-170", data carrier $4 in stream 1 is assigned with the symbol "#4-169", data carrier $4 in stream 2(*s*2(*i*)) is assigned with the symbol "#2-170", (recitation for data carrier $5 through data carrier $332 is omitted), data carrier $333 in stream 1 is assigned with the symbol "#1-335", data carrier $333 in stream 2(*s*2(*i*)) is assigned with the symbol "#3-336", data carrier $334 in stream 1 is assigned with the symbol "#2-335", data carrier $334 in stream 2(*s*2(*i*)) is assigned with the symbol "#4-336", data carrier $335 in stream 1 is assigned with the symbol "#3-335", data carrier $335 in stream 2(*s*2(*i*)) is assigned with the symbol "#1-336", data carrier $336 in stream 1 is assigned with the symbol "#4-335", and data carrier $336 in stream 2(*s*2(*i*)) is assigned with the symbol "#2-336".

At time &3, each data carrier in each stream is assigned with a symbol.

Data carrier $1 in stream 1 is assigned with the symbol "#1-337", data carrier $1 in stream 2(*s*2(*i*)) is assigned with the symbol "#3-338", data carrier $2 in stream 1 is assigned with the symbol "#2-337", data carrier $2 in stream 2(*s*2(*i*)) is assigned with the symbol "#4-338", data carrier $3 in stream 1 is assigned with the symbol "#3-337", data carrier $3 in stream 2(*s*2(*i*)) is assigned with the symbol "#1-338", data carrier $4 in stream 1 is assigned with the symbol "#4-337", data carrier $4 in stream 2(*s*2(*i*)) is assigned with the symbol "#2-338", (recitation for data carrier $5 through data carrier $332 is omitted), data carrier $333 in stream 1 is assigned with the symbol "#1-503", data carrier $333 in stream 2(*s*2(*i*)) is assigned with the symbol "#3-504", data carrier $334 in stream 1 is assigned with the symbol "#2-503", data carrier $334 in stream 2(*s*2(*i*)) is assigned with the symbol "#4-504", data carrier $335 in stream 1 is assigned with the symbol "#3-503", data carrier $335 in stream 2(*s*2(*i*)) is assigned with the symbol "#1-504", data carrier $336 in stream 1 is assigned with the symbol "#4-503", and data carrier $336 in stream 2(*s*2(*i*)) is assigned with the symbol "#2-503".

Accordingly, at time &(3M-2), time &(3M-1), and time &(3M), the symbols are arranged as follows. M is an integer that is greater than or equal to 1, K is an integer that is greater than or equal to 1 and less than or equal to 84, and L is an integer that is greater than or equal to 1 and less than or equal to 84.

The data in block #(4M-3) is transmitted by the transmission device using data carrier $(4K-3) in stream 1(*s*1(*i*)) at time &(3M-2), time &(3M-1), and time &(3M), and data carrier $(4L-1) in stream 2(*s*2(*i*)) at time &(3M-2), time &(3M-1), and time &(3M).

The data in block #(4M-2) is transmitted by the transmission device using data carrier $(4K-2) in stream 1(*s*1(*i*)) at time &(3M-2), time &(3M-1), and time &(3M), and data carrier $(4L) in stream 2(*s*2(*i*)) at time &(3M-2), time &(3M-1), and time &(3M).

The data in block #(4M-1) is transmitted by the transmission device using data carrier $(4K-1) in stream 1(*s*1(*i*)) at time &(3M-2), time &(3M-1), and time &(3M), and data carrier $(4L-3) in stream 2(*s*2(*i*)) at time &(3M-2), time &(3M-1), and time &(3M).

The data in block #(4M) is transmitted by the transmission device using data carrier $(4K) in stream 1(*s*1(*i*)) at time &(3M-2), time &(3M-1), and time &(3M), and data carrier $(4L-2) in stream 2(*s*2(*i*)) at time &(3M-2), time &(3M-1), and time &(3M).

Figure 90:
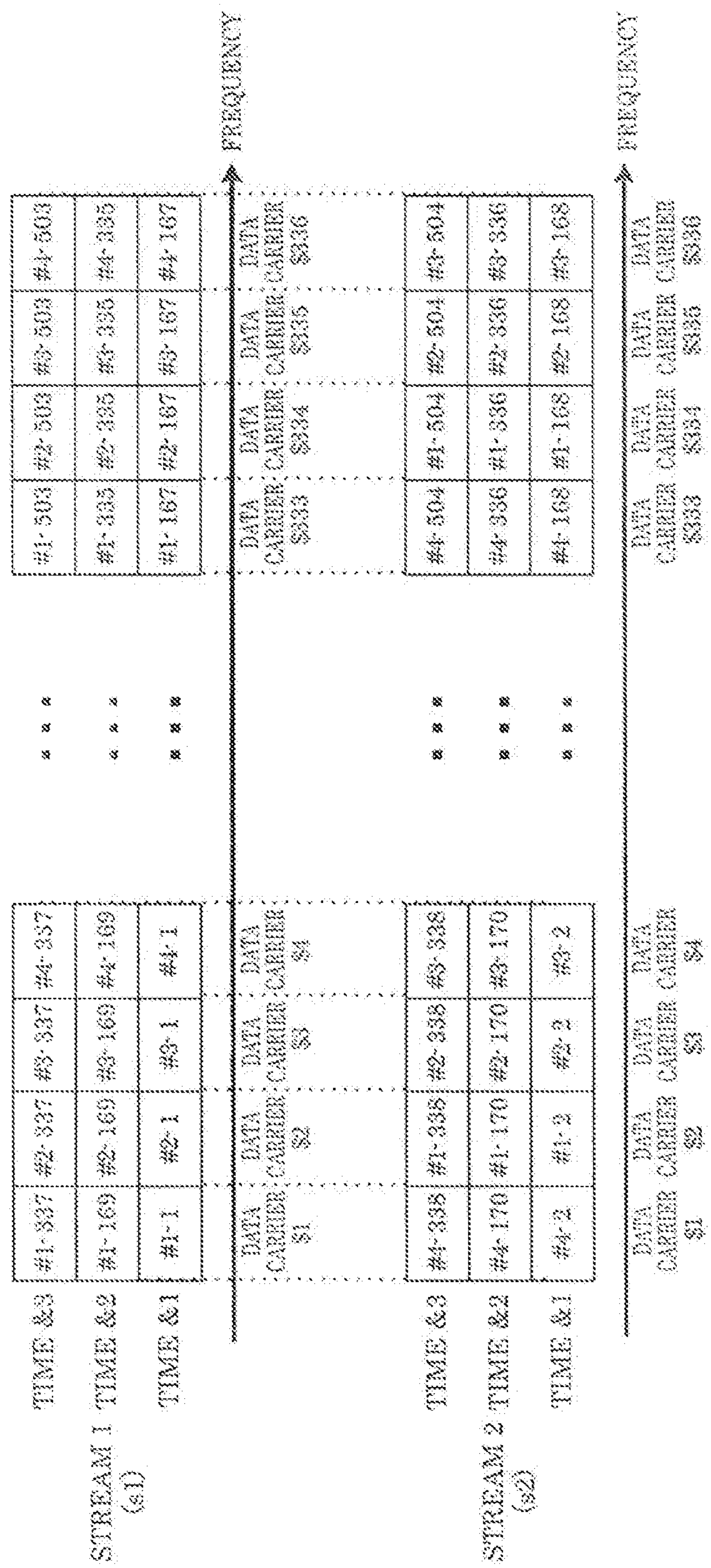
FIG. 90 illustrates an example of a frame configuration.

As another example for overcoming the phenomenon described with reference to FIG. 8, consider a frame configuration such as illustrated in FIG. 90.

As illustrated in FIG. 90,

At time &1, each data carrier in each stream is assigned with a symbol.

Data carrier $1 in stream 1 is assigned with the symbol "#1-1", data carrier $1 in stream 2(*s*2(*i*)) is assigned with the symbol "#4-2", data carrier $2 in stream 1 is assigned with the symbol "#2-1", data carrier $2 in stream 2(*s*2(*i*)) is assigned with the symbol "#1-2", data carrier $3 in stream 1 is assigned with the symbol "#3-1", data carrier $3 in stream 2(*s*2(*i*)) is assigned with the symbol "#2-2", data carrier $4 in stream 1 is assigned with the symbol "#4-1", data carrier $4 in stream 2(*s*2(*i*)) is assigned with the symbol "#3-2", (recitation for data carrier $5 through data carrier $332 is omitted), data carrier $333 in stream 1 is assigned with the symbol "#1-167", data carrier $333 in stream 2(*s*2(*i*)) is assigned with the symbol "#4-168", data carrier $334 in stream 1 is assigned with the symbol "#2-167", data carrier $334 in stream 2(*s*2(*i*)) is assigned with the symbol "#1-168", data carrier $335 in stream 1 is assigned with the symbol "#3-167", data carrier $335 in stream 2(*s*2(*i*)) is assigned with the symbol "#2-168", data carrier $336 in stream 1 is assigned with the symbol "#4-167", and data carrier $336 in stream 2(*s*2(*i*)) is assigned with the symbol "#3-168".

At time &2, each data carrier in each stream is assigned with a symbol.

Data carrier $1 in stream 1 is assigned with the symbol "#1-169", data carrier $1 in stream 2(*s*2(*i*)) is assigned with the symbol "#4-170", data carrier $2 in stream 1 is assigned with the symbol "#2-169", data carrier $2 in stream 2(*s*2(*i*)) is assigned with the symbol "#1-170", data carrier $3 in stream 1 is assigned with the symbol "#3-169", data carrier $3 in stream 2(*s*2(*i*)) is assigned with the symbol "#2-170", data carrier $4 in stream 1 is assigned with the symbol "#4-169", data carrier $4 in stream 2(*s*2(*i*)) is assigned with the symbol "#3-170", (recitation for data carrier $5 through data carrier $332 is omitted), data carrier $333 in stream 1 is assigned with the symbol "#1-335", data carrier $333 in stream 2(*s*2(*i*)) is assigned with the symbol "#4-336", data carrier $334 in stream 1 is assigned with the symbol "#2-335", data carrier $334 in stream 2(*s*2(*i*)) is assigned with the symbol "#1-336", data carrier $335 in stream 1 is assigned with the symbol "#3-335", data carrier $335 in stream 2(*s*2(*i*)) is assigned with the symbol "#2-336", data carrier $336 in stream 1 is assigned with the symbol "#4-335", and data carrier $336 in stream 2(*s*2(*i*)) is assigned with the symbol "#3-336".

At time &3, each data carrier in each stream is assigned with a symbol.

Data carrier $1 in stream 1 is assigned with the symbol "#1-337", data carrier $1 in stream 2(*s*2(*i*)) is assigned with the symbol "#4-338", data carrier $2 in stream 1 is assigned with the symbol "#2-337", data carrier $2 in stream 2(*s*2(*i*)) is assigned with the symbol "#1-338", data carrier $3 in stream 1 is assigned with the symbol "#3-337", data carrier $3 in stream 2(*s*2(*i*)) is assigned with the symbol "#2-338", data carrier $4 in stream 1 is assigned with the symbol "#4-337", data carrier $4 in stream 2(*s*2(*i*)) is assigned with the symbol "#3-338", (recitation for data carrier $5 through data carrier $332 is omitted), data carrier $333 in stream 1 is assigned with the symbol "#1-503", data carrier $333 in stream 2(*s*2(*i*)) is assigned with the symbol "#4-504", data carrier $334 in stream 1 is assigned with the symbol "#2-503", data carrier $334 in stream 2(*s*2(*i*)) is assigned with the symbol "#1-504", data carrier $335 in stream 1 is assigned with the symbol "#3-503", data carrier $335 in stream 2(*s*2(*i*)) is assigned with the symbol "#2-504", data carrier $336 in stream 1 is assigned with the symbol "#4-503", and data carrier $336 in stream 2(*s*2(*i*)) is assigned with the symbol "#3-504".

Accordingly, at time &(3M-2), time &(3M-1), and time &(3M), the symbols are arranged as follows. M is an integer that is greater than or equal to 1, K is an integer that is greater than or equal to 1 and less than or equal to 84, and L is an integer that is greater than or equal to 1 and less than or equal to 84.

The data in block #(4M-3) is transmitted by the transmission device using data carrier $(4K-3) in stream 1(*s*1(*i*)) at time &(3M-2), time &(3M-1), and time &(3M), and data carrier $(4L-2) in stream 2(*s*2(*i*)) at time &(3M-2), time &(3M-1), and time &(3M).

The data in block #(4M-2) is transmitted by the transmission device using data carrier $(4K-2) in stream 1(*s*1(*i*)) at time &(3M-2), time &(3M-1), and time &(3M), and data carrier $(4L-1) in stream 2(*s*2(*i*)) at time &(3M-2), time &(3M-1), and time &(3M).

The data in block #(4M-1) is transmitted by the transmission device using data carrier $(4K-1) in stream 1(*s*1(*i*)) at time &(3M-2), time &(3M-1), and time &(3M), and data carrier $(4L) (L is an integer that is greater or equal to 1 and less than or equal to 84) in stream 2(*s*2(*i*)) at time &(3M-2), time &(3M-1), and time &(3M).

The data in block #(4M) is transmitted by the transmission device using data carrier $(4K) in stream 1(*s*1(*i*)) at time &(3M-2), time &(3M-1), and time &(3M), and data carrier $(4L-3) (L is an integer that is greater or equal to 1 and less than or equal to 84) in stream 2(*s*2(*i*)) at time &(3M-2), time &(3M-1), and time &(3M).

Figure 91:
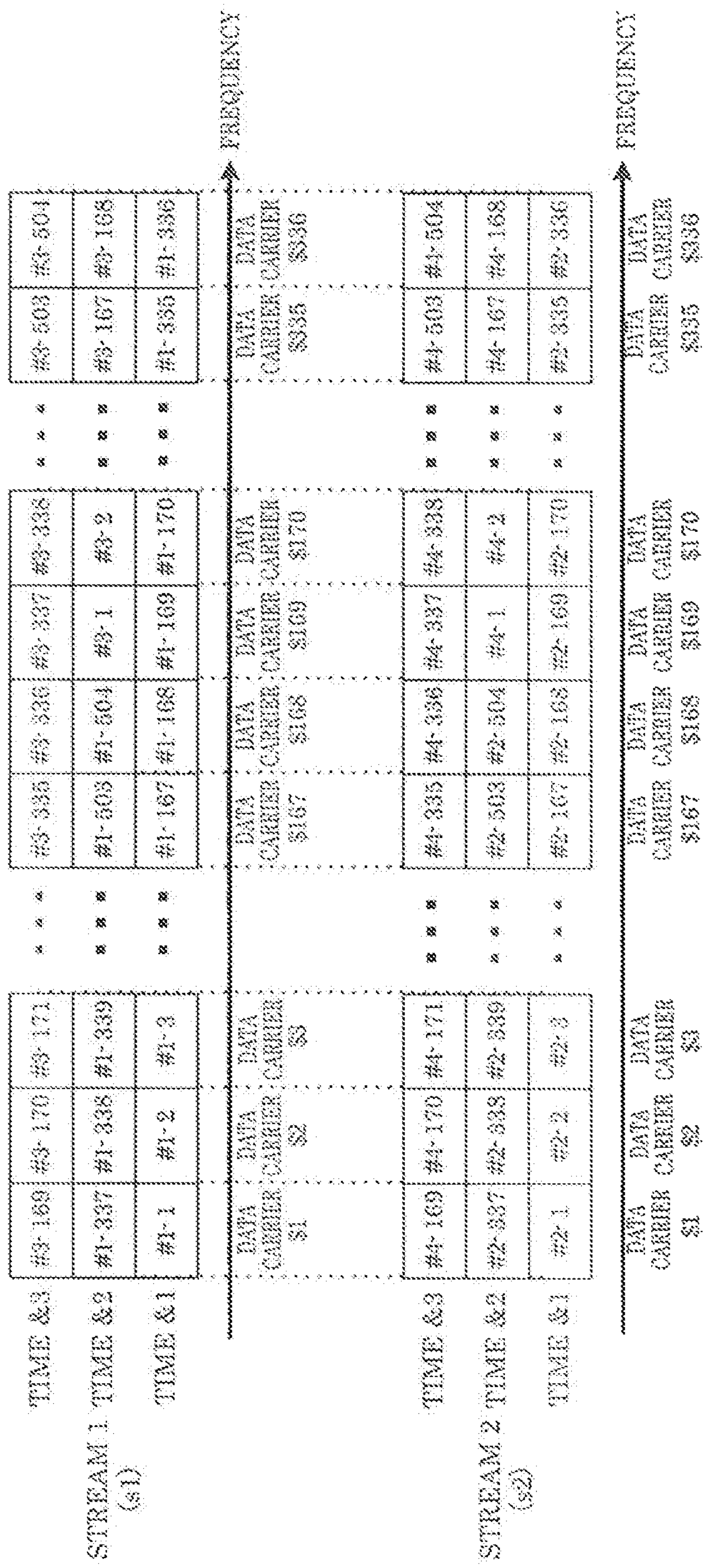
FIG. 91 illustrates an example of a frame configuration.

As another example for overcoming the phenomenon described with reference to FIG. 8, consider a frame configuration such as illustrated in FIG. 91.

As illustrated in FIG. 91,

At time &1, each data carrier in each stream is assigned with a symbol.

Data carrier $1 in stream 1 is assigned with the symbol "#1-1", data carrier $1 in stream 2(*s*2(*i*)) is assigned with the symbol "#2-1", data carrier $2 in stream 1 is assigned with the symbol "#1-2", data carrier $2 in stream 2(*s*2(*i*)) is assigned with the symbol "#2-2", data carrier $3 in stream 1 is assigned with the symbol "#1-3", data carrier $3 in stream 2(*s*2(*i*)) is assigned with the symbol "#2-3", data carrier $4 in stream 1 is assigned with the symbol "#1-4", data carrier $4 in stream 2(*s*2(*i*)) is assigned with the symbol "#2-4", (recitation for data carrier $5 through data carrier $332 is omitted), data carrier $333 in stream 1 is assigned with the symbol "#1-333", data carrier $333 in stream 2(*s*2(*i*)) is assigned with the symbol "#2-333", data carrier $334 in stream 1 is assigned with the symbol "#1-334", data carrier $334 in stream 2(*s*2(*i*)) is assigned with the symbol "#2-334", data carrier $335 in stream 1 is assigned with the symbol "#1-335", data carrier $335 in stream 2(*s*2(*i*)) is assigned with the symbol "#2-335", data carrier $336 in stream 1 is assigned with the symbol "#1-336", and data carrier $336 in stream 2(*s*2(*i*)) is assigned with the symbol "#2-336".

At time &2, each data carrier in each stream is assigned with a symbol.

Data carrier $1 in stream 1 is assigned with the symbol "#1-337", data carrier $1 in stream 2(*s*2(*i*)) is assigned with the symbol "#2-337", data carrier $2 in stream 1 is assigned with the symbol "#1-338", data carrier $2 in stream 2(*s*2(*i*)) is assigned with the symbol "#2-338", data carrier $3 in stream 1 is assigned with the symbol "#1-339", data carrier $3 in stream 2(*s*2(*i*)) is assigned with the symbol "#2-339", data carrier $4 in stream 1 is assigned with the symbol "#1-340", data carrier $4 in stream 2(*s*2(*i*)) is assigned with the symbol "#2-340", (recitation for data carrier $5 through data carrier $166 is omitted), data carrier $167 in stream 1 is assigned with the symbol "#1-503", data carrier $167 in stream 2(*s*2(*i*)) is assigned with the symbol "#2-503", data carrier $168 in stream 1 is assigned with the symbol "#1-504", data carrier $168 in stream 2(*s*2(*i*)) is assigned with the symbol "#2-504", data carrier $169 in stream 1 is assigned with the symbol "#3-1", data carrier $169 in stream 2(*s*2(*i*)) is assigned with the symbol "#4-1", data carrier $170 in stream 1 is assigned with the symbol "#3-2", and data carrier $170 in stream 2(*s*2(*i*)) is assigned with the symbol "#4-2".

(recitation for data carrier $171 through data carrier $332 is omitted), data carrier $333 in stream 1 is assigned with the symbol "#1-165", data carrier $333 in stream 2(*s*2(*i*)) is assigned with the symbol "#4-165", data carrier $334 in stream 1 is assigned with the symbol "#3-166", data carrier $334 in stream 2(*s*2(*i*)) is assigned with the symbol "#4-166", data carrier $335 in stream 1 is assigned with the symbol "#3-167", data carrier $335 in stream 2(*s*2(*i*)) is assigned with the symbol "#4-167", data carrier $336 in stream 1 is assigned with the symbol "#3-168", and data carrier $336 in stream 2(*s*2(*i*)) is assigned with the symbol "#4-168".

At time &3, each data carrier in each stream is assigned with a symbol.

Data carrier $1 in stream 1 is assigned with the symbol "#3-169", data carrier $1 in stream 2(*s*2(*i*)) is assigned with the symbol "#4-169", data carrier $2 in stream 1 is assigned with the symbol "#3-170", data carrier $2 in stream 2(*s*2(*i*)) is assigned with the symbol "#4-170", data carrier $3 in stream 1 is assigned with the symbol "#3-171", data carrier $3 in stream 2(*s*2(*i*)) is assigned with the symbol "#4-171", data carrier $4 in stream 1 is assigned with the symbol "#3-172", data carrier $4 in stream 2(*s*2(*i*)) is assigned with the symbol "#4-172", (recitation for data carrier $5 through data carrier $332 is omitted), data carrier $333 in stream 1 is assigned with the symbol "#3-501", data carrier $333 in stream 2(*s*2(*i*)) is assigned with the symbol "#4-501", data carrier $334 in stream 1 is assigned with the symbol "#3-502", data carrier $334 in stream 2($s$2($i$)) is assigned with the symbol "#4-502", data carrier $335 in stream 1 is assigned with the symbol "#3-503", data carrier $335 in stream 2($s$2($i$)) is assigned with the symbol "#4-503", data carrier $336 in stream 1 is assigned with the symbol "#3-504", and data carrier $336 in stream 2($s$2($i$)) is assigned with the symbol "#4-504".

Accordingly, at time &(3M-2), time &(3M-1), and time &(3M), the symbols are arranged as follows. M is an integer that is greater than or equal to 1.

The data in block #(4M-3) is transmitted from the transmission device using data carrier $1 through $336 in stream 1($s$1($i$)) at time &(3M-2), and data carrier $1 through $168 in stream 1($s$1($i$)) at time &(3M-1).

The data in block #(4M-2) is transmitted from the transmission device using data carrier $1 through $336 in stream 2($s$2($i$)) at time &(3M-2), and data carrier $1 through $168 in stream 2($s$2($i$)) at time &(3M-1).

The data in block #(4M-1) is transmitted from the transmission device using data carrier $169 through $336 in stream 1($s$1($i$)) at time &(3M-1), and data carrier $1 through $336 in stream 1($s$1($i$)) at time &(3M).

The data in block #(4M) is transmitted from the transmission device using data carrier $169 through $336 in stream 2($s$2($i$)) at time &(3M-1), and data carrier $1 through $336 in stream 2($s$2($i$)) at time &(3M).

In the case of a frame configuration such as illustrated in FIG. 85, there is a low chance of the phenomenon described in regard to FIG. 8 occurring.

Figure 92:
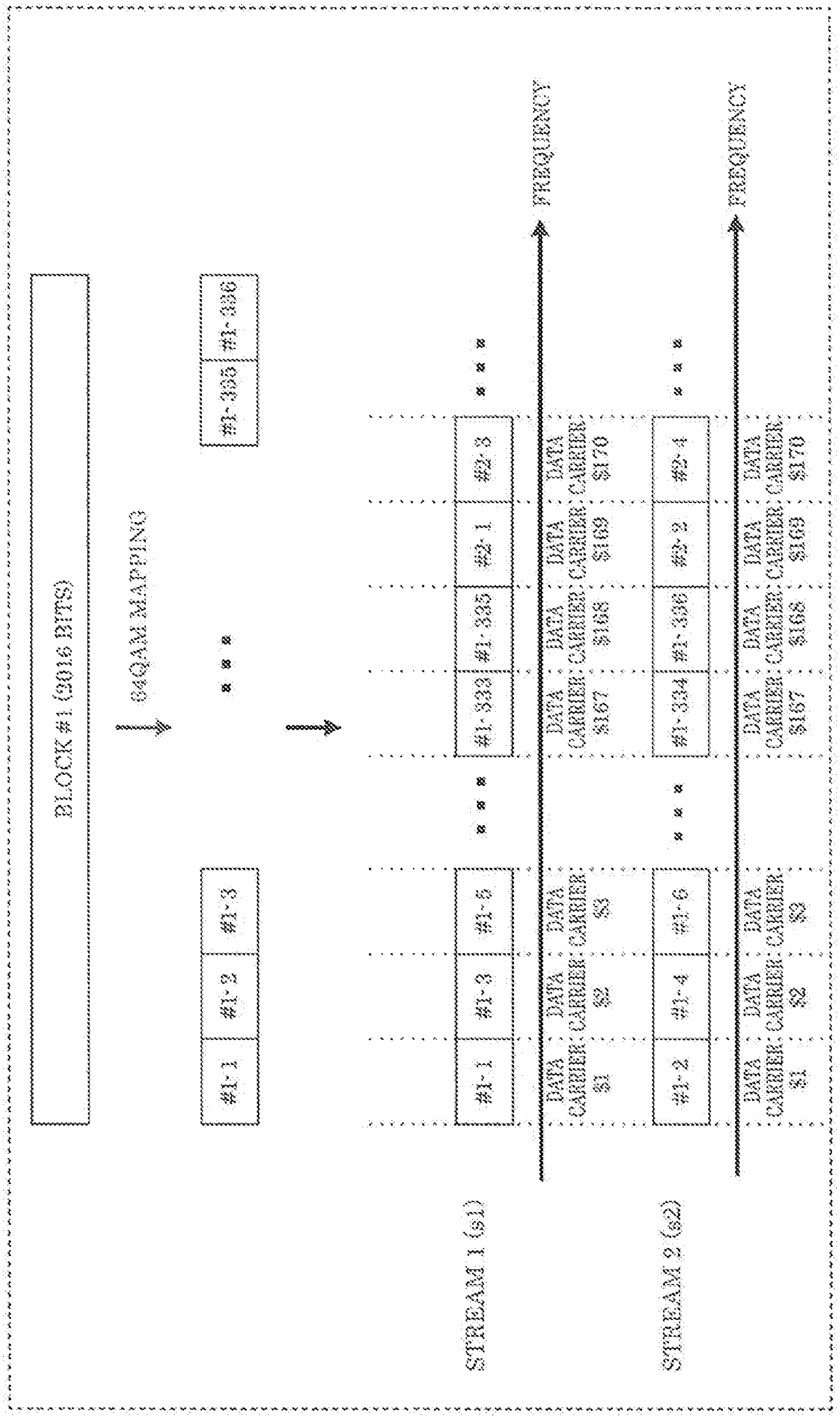
FIG. 92 illustrates an example of an arrangement of symbols in data carriers.

FIG. 92 illustrates an arrangement example of data carriers when the modulation method for stream 1($s$1($i$)) is 64QAM, which is an example of a modulation method in which there are 64 signal points in an in-phase I-orthogonal Q plane, and the modulation method for stream 2($s$2($i$)) is 64QAM, which is an example of a modulation method in which there are 64 signal points in an in-phase I-orthogonal Q plane. Here, as one example, the block length (code length) in the error correction code is 2016 bits. A first block configured of 2016 bits that are error correction encoded is referred to as block #1 and denoted as "#1". Accordingly, an N-th (N is an integer greater than or equal to 1) block configured of 2016 bits that are error correction encoded is referred to as block #N and denoted as "#N".

When 64QAM is applied, 336 symbols are generated from block #N. In FIG. 92, the 336 symbols generated from block #1 are indicated as "#1-1", "#1-2", "#1-3", "#1-4" . . . "#1-334", "#1-335", and "#1-336". Accordingly, the 336 symbols generated from block #N are expressed as "#N-1", "#N-2", "#N-3", "#N-4" . . . "#N-334", "#N-335", and "#N-336".

Moreover, in FIG. 92, the data carriers are illustrated arranged along the horizontal frequency axis. In stream 1, data carriers from data carrier $1 to data carrier $336 are present, and similarly, in stream 2($s$2($i$)), data carriers from data carrier $1 to data carrier $336 are present.

Data carrier $1 in stream 1 and data carrier $1 in stream 2($s$2($i$)) are transmitted (from different antennas) at the same frequency and at the same time, and data carrier $2 in stream 1 and data carrier $2 in stream 2($s$2($i$)) are transmitted (from different antennas) at the same frequency and at the same time. In other words, data carrier $L in stream 1 and data carrier $L in stream 2($s$2($i$)) are transmitted at the same frequency and at the same time, or from different antennas at the same frequency and at the same time. L is an integer that is greater than or equal to 1 and less than or equal to 336.

As illustrated in FIG. 92, data carrier $1 in stream 1 is assigned with the symbol "#1-1", data carrier $1 in stream 2($s$2($i$)) is assigned with the symbol "#1-2", data carrier $2 in stream 1 is assigned with the symbol "#1-3", data carrier $2 in stream 2($s$2($i$)) is assigned with the symbol "#1-4", data carrier $3 in stream 1 is assigned with the symbol "#1-5", and data carrier $3 in stream 2($s$2($i$)) is assigned with the symbol "#1-6". The symbols are assigned in accordance with such a rule. Accordingly, the data in block #1 is transmitted from the transmission device using data carrier $1 through $167 in stream 1 and data carrier $1 through $167 in stream 2($s$2($i$)).

In accordance with the same rule, the data in block #2 is transmitted from the transmission device using data carrier $169 through $336 in stream 1 and data carrier $169 through $336 in stream 2($s$2($i$)).

This is how the symbols are arranged for time &1. Similarly, when the symbols are arranged, at time &2, the symbols are arranged as follows.

The data in block #3 is transmitted from the transmission device using data carrier $1 through $167 in stream 1 and data carrier $1 through $167 in stream 2($s$2($i$)).

The data in block #4 is transmitted from the transmission device using data carrier $169 through $336 in stream 1 and data carrier $169 through $336 in stream 2($s$2($i$)).

Accordingly, at time &M (M is an integer that is greater than or equal to 1), the symbols are arranged as follows.

The data in block #(2M-1) is transmitted from the transmission device using data carrier $1 through $167 in stream 1 and data carrier $1 through $167 in stream 2 ($s$2($i$)).

The data in block #(2M) is transmitted from the transmission device using data carrier $169 through $336 in stream 1 and data carrier $169 through $336 in stream 2($s$2($i$)).

Next, consider a case in which the transmission device transmits modulated signals using a frame configuration such as illustrated in FIG. 92. A conceptual illustration of the reception field intensity in a reception device, which is the partner (communication partner) of the transmission device illustrated in FIG. 1, is provided in FIG. 8.

In FIG. 8, as a side effect of multi-path, low portion 801 of the reception field intensity is present. When the transmission device transmits a modulated signal using a frame configuration such as illustrated in FIG. 7, as a side effect of multi-path (low portion 801 of the reception field intensity illustrated in FIG. 8), it is likely that this will cause a phenomenon in which low reception quality symbols are prevalent among the symbols in the same block in the error correction code. This makes it likely that data reception quality will decrease since high error correction performance cannot be achieved.

As another example, consider a frame configuration such as illustrated in FIG. 9. As illustrated in FIG. 9, each data carrier in each stream is assigned with a symbol.

Data carrier $1 in stream 1 is assigned with the symbol "#1-1", data carrier $1 in stream 2($s$2($i$)) is assigned with the symbol "#2-1", data carrier $2 in stream 1 is assigned with the symbol "#1-2", data carrier $2 in stream 2($s$2($i$)) is assigned with the symbol "#2-2", data carrier $3 in stream 1 is assigned with the symbol "#1-3", data carrier $3 in stream 2(*s*2(*i*)) is assigned with the symbol "#2-3", (recitation for data carrier $4 through data carrier $332 is omitted), data carrier $333 in stream 1 is assigned with the symbol "#1-333", data carrier $333 in stream 2(*s*2(*i*)) is assigned with the symbol "#2-333", data carrier $334 in stream 1 is assigned with the symbol "#1-334", data carrier $334 in stream 2(*s*2(*i*)) is assigned with the symbol "#2-334", data carrier $335 in stream 1 is assigned with the symbol "#1-335", data carrier $335 in stream 2(*s*2(*i*)) is assigned with the symbol "#2-335", data carrier $336 in stream 1 is assigned with the symbol "#1-336", and data carrier $336 in stream 2(*s*2(*i*)) is assigned with the symbol "#2-336".

This is how the symbols are arranged for time &1. Accordingly, symbols for odd number data carriers transmit block #1 data, and symbols for even number data carriers transmit block #2 data.

At time &2, the symbols are arranged as follows.

Stream 1 transmits block #3 data and stream 2(*s*2(*i*)) transmits block #4 data.

Accordingly, at time &M, the symbols are arranged as follows. M is an integer that is greater than or equal to 1.

Stream 1 transmits block #(2M-1) data and stream 2(*s*2(*i*)) transmits block #(2M) data.

In the case of a frame configuration such as illustrated in FIG. 9, there is a low chance of the phenomenon described in regard to FIG. 8 occurring.

Consider a case in which the precoding matrix is expressed as illustrated in Equation (4), [1] "b is zero and c is zero" or [2] "a is zero and d is zero" or [3] "an absolute value of b and an absolute value of c are extremely lower than an absolute value of a and an absolute value of d", [4] "an absolute value of a and an absolute value of d are extremely lower than an absolute value of b and an absolute value of c". In such a case, when the reception field intensity of stream 1 of the partner (communication partner) decreases, or when the reception field intensity of stream 2(*s*2(*i*)) of the partner (communication partner) decreases, for example, it is likely that a phenomenon in which, at time &1, the reception quality of block #1 or the reception quality of block #2 decreases will occur.

In order to facilitate understanding of the phenomenon described with reference to FIG. 8 and the phenomenon resulting from a frame configuration such as illustrated in FIG. 9, consider, for example, a frame configuration such as illustrated in FIG. 10. As illustrated in FIG. 10, each data carrier in each stream is assigned with a symbol.

Data carrier $1 in stream 1 is assigned with the symbol "#1-1", data carrier $1 in stream 2(*s*2(*i*)) is assigned with the symbol "#1-2", data carrier $2 in stream 1 is assigned with the symbol "#2-1", data carrier $2 in stream 2(*s*2(*i*)) is assigned with the symbol "#2-2", data carrier $3 in stream 1 is assigned with the symbol "#1-3", data carrier $3 in stream 2(*s*2(*i*)) is assigned with the symbol "#1-4", data carrier $4 in stream 1 is assigned with the symbol "#2-3", data carrier $4 in stream 2(*s*2(*i*)) is assigned with the symbol "#2-4", (recitation for data carrier $5 through data carrier $332 is omitted), data carrier $333 in stream 1 is assigned with the symbol "#1-333", data carrier $333 in stream 2(*s*2(*i*)) is assigned with the symbol "#1-334", data carrier $334 in stream 1 is assigned with the symbol "#2-333", data carrier $334 in stream 2(*s*2(*i*)) is assigned with the symbol "#2-334", data carrier $335 in stream 1 is assigned with the symbol "#1-335", data carrier $335 in stream 2(*s*2(*i*)) is assigned with the symbol "#1–336", data carrier $336 in stream 1 is assigned with the symbol "#2-335", and data carrier $336 in stream 2(*s*2(*i*)) is assigned with the symbol "#2-336".

This is how the symbols are arranged for time &1. Accordingly, symbols for odd number data carriers transmit block #1 data, and symbols for even number data carriers transmit block #2 data.

At time &2, the symbols are arranged as follows.

Symbols for odd number data carriers transmit block #3 data, and symbols for even number data carriers transmit block #4 data.

Accordingly, at time &M, the symbols are arranged as follows. M is an integer that is greater than or equal to 1.

Symbols for odd number data carriers transmit block #(2M-1) data, and symbols for even number data carriers transmit block #(2M) data.

When the transmission device transmits modulated signals using a frame configuration such as illustrated in FIG. 10, the negative effects caused by low portion 801 of the reception field intensity due to multi-path using FIG. 8 are not likely to be an influence in the case of the frame configuration illustrated in FIG. 92. Moreover, inhibiting a decrease in data reception quality such as described with reference to FIG. 9 is likely. Accordingly, achieving an advantageous effect of an increase in data reception quality is likely.

In order to facilitate understanding of the phenomenon described with reference to FIG. 8 and the phenomenon resulting from a frame configuration such as illustrated in FIG. 9, consider, for example, a frame configuration such as illustrated in FIG. 11.

As illustrated in FIG. 11, each data carrier in each stream is assigned with a symbol.

Data carrier $1 in stream 1 is assigned with the symbol "#1-1", data carrier $1 in stream 2(*s*2(*i*)) is assigned with the symbol "#2-1", data carrier $2 in stream 1 is assigned with the symbol "#2-2", data carrier $2 in stream 2(*s*2(*i*)) is assigned with the symbol "#1-2", data carrier $3 in stream 1 is assigned with the symbol "#1-3", data carrier $3 in stream 2(*s*2(*i*)) is assigned with the symbol "#2-3", data carrier $4 in stream 1 is assigned with the symbol "#2-4", data carrier $4 in stream 2(*s*2(*i*)) is assigned with the symbol "#1-4", (recitation for data carrier $5 through data carrier $332 is omitted), data carrier $333 in stream 1 is assigned with the symbol "#1-333", data carrier $333 in stream 2(*s*2(*i*)) is assigned with the symbol "#2-333", data carrier $334 in stream 1 is assigned with the symbol "#2-334", data carrier $334 in stream 2(*s*2(*i*)) is assigned with the symbol "#1-334", data carrier $335 in stream 1 is assigned with the symbol "#1-335", data carrier $335 in stream 2(*s*2(*i*)) is assigned with the symbol "#2-335", data carrier $336 in stream 1 is assigned with the symbol "#2-336", and data carrier $336 in stream 2(*s*2(*i*)) is assigned with the symbol "#1-336".

This is how the symbols are arranged for time &1. Accordingly, symbols for odd number data carriers and stream 1 transmit block #1 data.

Symbols for odd number data carriers and stream 2(*s*2(*i*)) transmit block #2 data.

Symbols for even number data carriers and stream 1 transmit block #2 data.

Symbols for even number data carriers and stream 2(*s*2(*i*)) transmit block #1 data.

At time &2, the symbols are arranged as follows.

Symbols for odd number data carriers and stream 1 transmit block #3 data.

Symbols for odd number data carriers and stream 2(*s*2(*i*)) transmit block #4 data.

Symbols for even number data carriers and stream 1 transmit block #4 data.

Symbols for even number data carriers and stream 2(*s*2(*i*)) transmit block #3 data.

Accordingly, at time &M, the symbols are arranged as follows. M is an integer that is greater than or equal to 1.

Symbols for odd number data carriers and stream 1 transmit block #(2M-1) data.

Symbols for odd number data carriers and stream 2(*s*2(*i*)) transmit block #(2M) data.

Symbols for even number data carriers and stream 1 transmit block #(2M) data.

Symbols for even number data carriers and stream 2(*s*2(*i*)) transmit block #(2M-1) data.

When the transmission device transmits modulated signals using a frame configuration such as illustrated in FIG. 11, the negative effects caused by low portion 801 of the reception field intensity due to multi-path using FIG. 8 are not likely to be an influence in the case of the frame configuration illustrated in FIG. 92. Moreover, inhibiting a decrease in data reception quality such as described with reference to FIG. 9 is likely. Accordingly, achieving an advantageous effect of an increase in data reception quality is likely.

Figure 93:
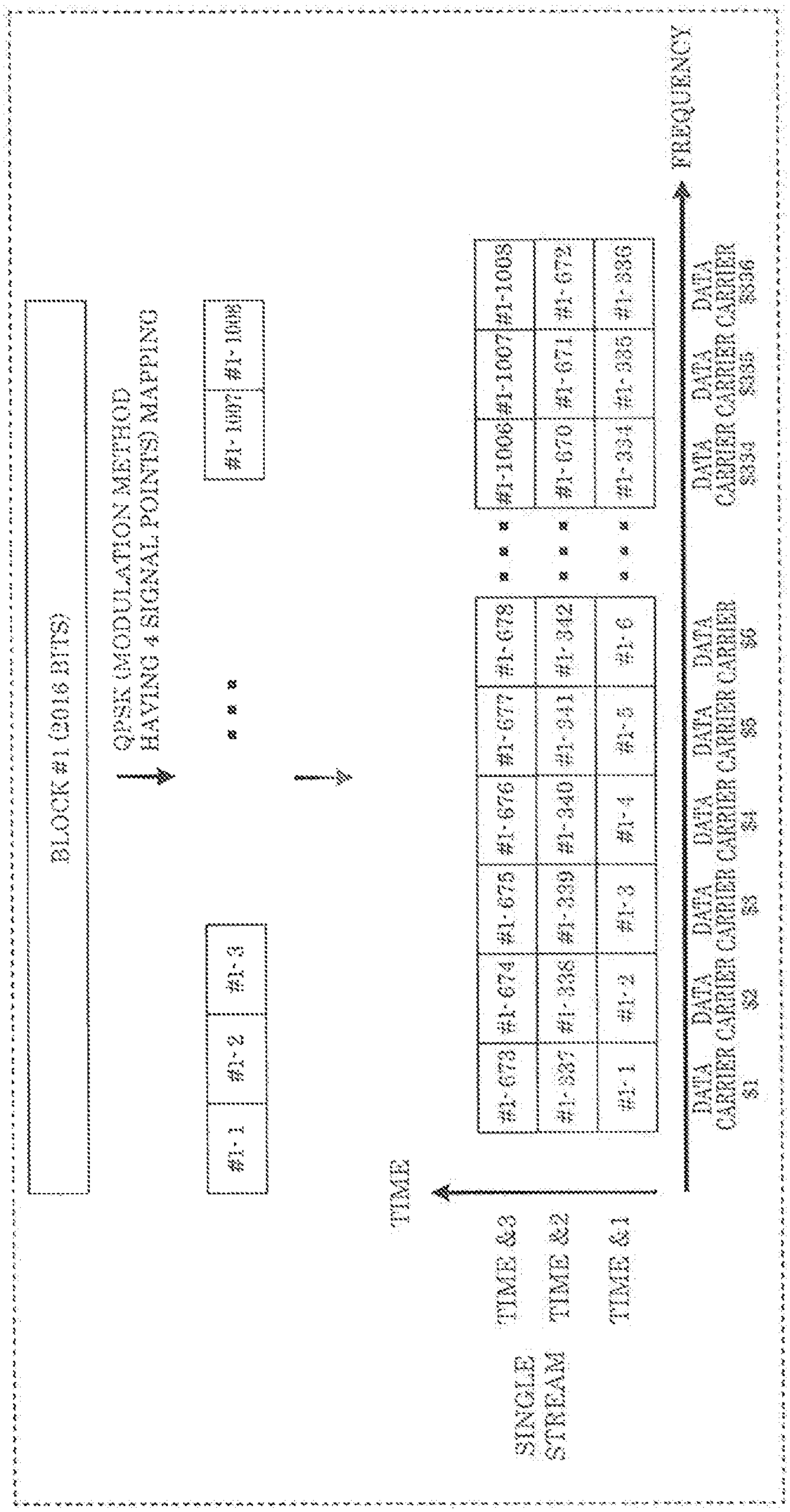
FIG. 93 illustrates an example of an arrangement of symbols in data carriers.

FIG. 93 illustrates an arrangement example of data carriers when the modulation method for a single stream is QPSK, which is an example of a modulation method in which there are 4 signal points in an in-phase I-orthogonal Q plane. Here, as one example, the block length (code length) in the error correction code is 2016 bits. A first block configured of 2016 bits that are error correction encoded is referred to as block #1 and denoted as "#1". Accordingly, an N-th (N is an integer greater than or equal to 1) block configured of 2016 bits that are error correction encoded is referred to as block #N and denoted as "#N".

When QPSK is applied, 1008 symbols are generated from block #N. Accordingly, the 1008 symbols generated from block #1 are indicated as "#1-1", "#1-2", "#1-3", "#1-4" . . . "#1-1006", "#1-1007", and "#1-1008". Accordingly, the 672 symbols generated from block #N are expressed as "#N-1", "#N-2", "#N-3", "#N-4" . . . "#N-1006", "#N-1007", and "#N-1008".

In FIG. 93, the data carriers are illustrated arranged along the horizontal frequency axis and vertical time axis. Here, just as described above, data carriers from data carrier $1 to data carrier $336 are present.

As illustrated in FIG. 93, at time &1,

Data carrier $1 is assigned with the symbol "#1-1", data carrier $2 is assigned with the symbol "#1-2", data carrier $3 is assigned with the symbol "#1-3", data carrier $4 is assigned with the symbol "#1-4", data carrier $5 is assigned with the symbol "#1-5", data carrier $6 is assigned with the symbol "#1-6", (recitation for data carrier $7 through data carrier $333 is omitted), data carrier $334 is assigned with the symbol "#1-334", data carrier $335 is assigned with the symbol "#1-335", and data carrier $336 is assigned with the symbol "#1-336".

Then, at time &2, data carrier $1 is assigned with the symbol "#1-337", data carrier $2 is assigned with the symbol "#1-338", data carrier $3 is assigned with the symbol "#1-339", data carrier $4 is assigned with the symbol "#1-340", data carrier $5 is assigned with the symbol "#1-341", data carrier $6 is assigned with the symbol "#1-342", (recitation for data carrier $7 through data carrier $333 is omitted), data carrier $334 is assigned with the symbol "#1-670", data carrier $335 is assigned with the symbol "#1-671", and data carrier $336 is assigned with the symbol "#1-672".

Then, at time &3, data carrier $1 is assigned with the symbol "#1-673", data carrier $2 is assigned with the symbol "#1-674", data carrier $3 is assigned with the symbol "#1-675", data carrier $4 is assigned with the symbol "#1-676", data carrier $5 is assigned with the symbol "#1-677", data carrier $6 is assigned with the symbol "#1-678", (recitation for data carrier $7 through data carrier $333 is omitted), data carrier $334 is assigned with the symbol "#1-1006", data carrier $335 is assigned with the symbol "#1-1007", and data carrier $336 is assigned with the symbol "#1-1008".

Accordingly, at time &1, time &2, and time &3, data in block #1 is transmitted.

Accordingly, at time &(3M-2), time &(3M-1), and time &3M, data in block #M is transmitted. M is an integer that is greater than or equal to 1.

Figure 94:
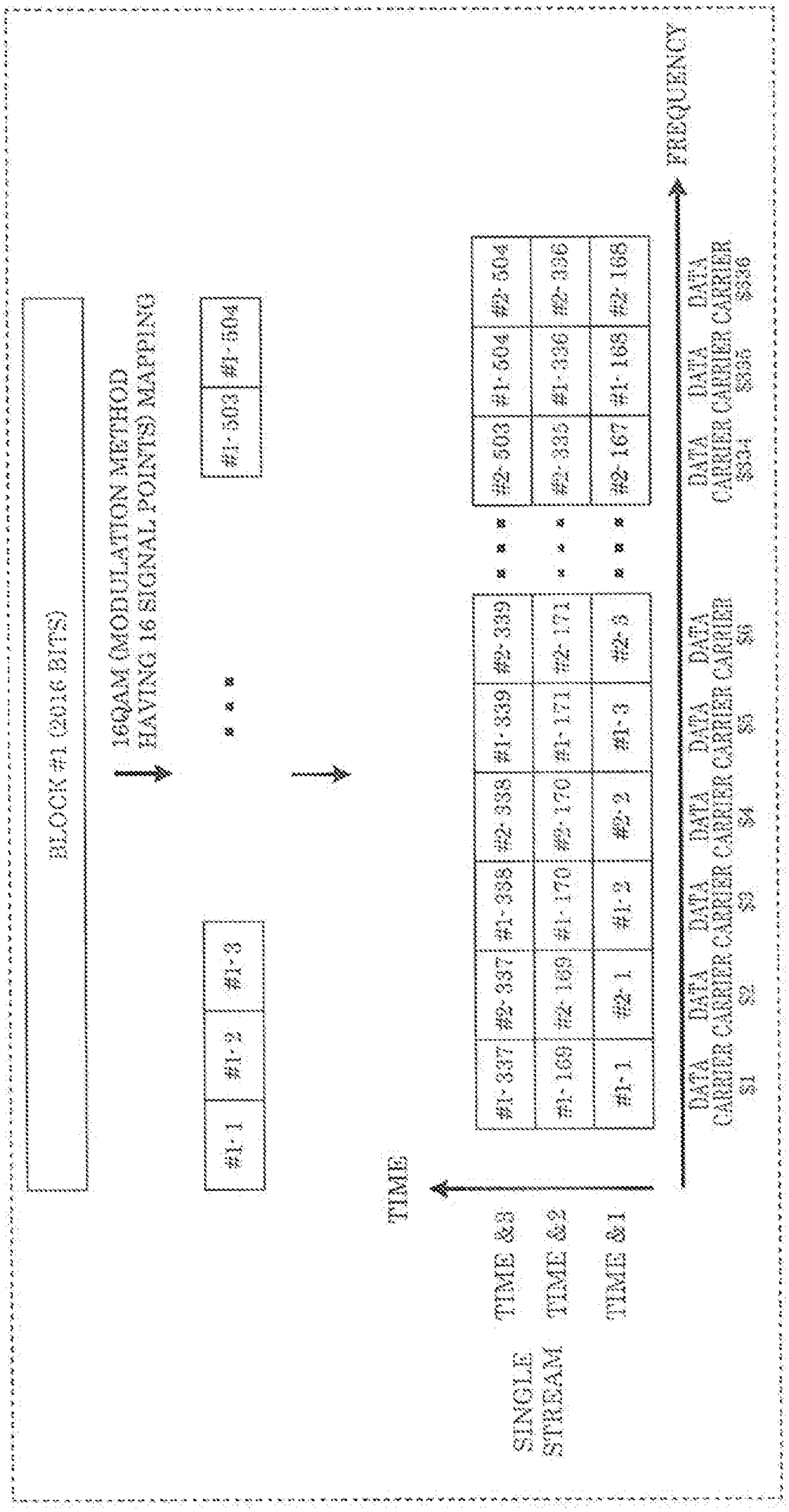
FIG. 94 illustrates an example of an arrangement of symbols in data carriers.

FIG. 94 illustrates an arrangement example of data carriers when the modulation method for a single stream is 16QAM, which is an example of a modulation method in which there are 16 signal points in an in-phase I-orthogonal Q plane. Here, as one example, the block length (code length) in the error correction code is 2016 bits. A first block configured of 2016 bits that are error correction encoded is referred to as block #1 and denoted as "#1". Accordingly, an N-th (N is an integer greater than or equal to 1) block configured of 2016 bits that are error correction encoded is referred to as block #N and denoted as "#N".

When QPSK is applied, 504 symbols are generated from block #N. Accordingly, the 504 symbols generated from block #1 are indicated as "#1-1", "#1-2", "#1-3", "#1-4" . . . "#1-502", "#1-503", and "#1-504". Accordingly, the 672 symbols generated from block #N are expressed as "#N-1", "#N-2", "#N-3", "#N-4" . . . "#N-502", "#N-503", and "#N-504".

In FIG. 94, the data carriers are illustrated arranged along the horizontal frequency axis and vertical time axis. Here, just as described above, data carriers from data carrier $1 to data carrier $336 are present.

As illustrated in FIG. 94, at time &1,

Data carrier $1 is assigned with the symbol "#1-1",
data carrier $2 is assigned with the symbol "#2-1",
data carrier $3 is assigned with the symbol "#1-2",
data carrier $4 is assigned with the symbol "#2-2",
data carrier $5 is assigned with the symbol "#1-3",
data carrier $6 is assigned with the symbol "#2-3",
(recitation for data carrier $7 through data carrier $333 is omitted),
data carrier $334 is assigned with the symbol "#2-167",
data carrier $335 is assigned with the symbol "#1-168", and
data carrier $336 is assigned with the symbol "#2-168".

Then, at time &2,

Data carrier $1 is assigned with the symbol "#1-169",
data carrier $2 is assigned with the symbol "#2-169",
data carrier $3 is assigned with the symbol "#1-170",
data carrier $4 is assigned with the symbol "#2-170",
data carrier $5 is assigned with the symbol "#1-171",
data carrier $6 is assigned with the symbol "#2-171",
(recitation for data carrier $7 through data carrier $333 is omitted),
data carrier $334 is assigned with the symbol "#2-335",
data carrier $335 is assigned with the symbol "#1-336", and
data carrier $336 is assigned with the symbol "#2-336".

Then, at time &3,

Data carrier $1 is assigned with the symbol "#1-337",
data carrier $2 is assigned with the symbol "#2-337",
data carrier $3 is assigned with the symbol "#1-338",
data carrier $4 is assigned with the symbol "#2-338",
data carrier $5 is assigned with the symbol "#1-339",
data carrier $6 is assigned with the symbol "#2-339",
(recitation for data carrier $7 through data carrier $333 is omitted),
data carrier $334 is assigned with the symbol "#2-503",
data carrier $335 is assigned with the symbol "#1-504", and
data carrier $336 is assigned with the symbol "#2-504".

Accordingly, at time &1, time &2, and time &3 data in block #1 and data in block #2 is transmitted.

Accordingly, at time &(3M-2), time &(3M-1), and time &3M, data in block #(2M-1) and block #(2M) is transmitted. M is an integer that is greater than or equal to 1.

Figure 95:
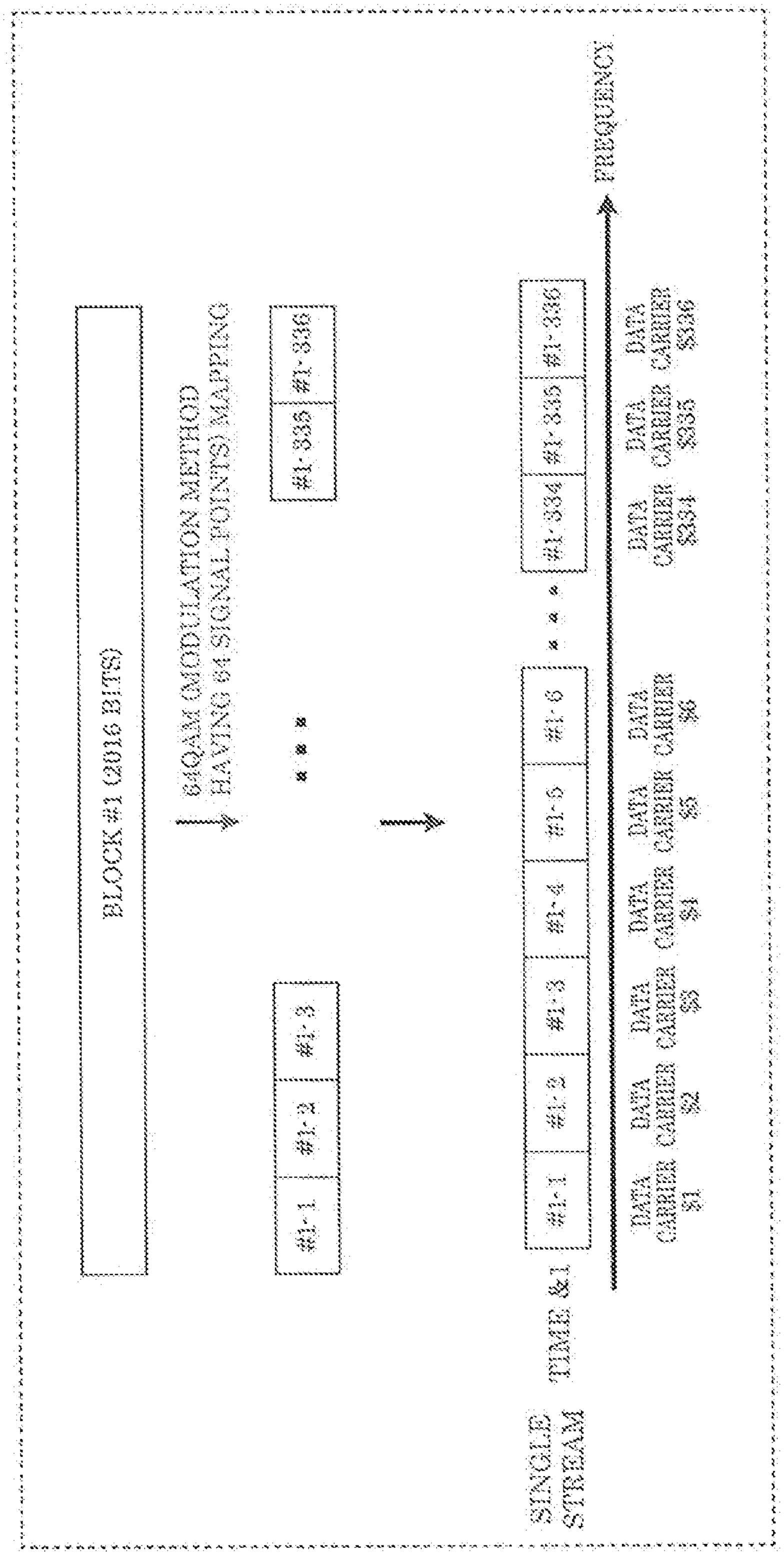
FIG. 95 illustrates an example of an arrangement of symbols in data carriers.

FIG. 95 illustrates an arrangement example of data carriers when the modulation method for a single stream is 64QAM, which is an example of a modulation method in which there are 64 signal points in an in-phase I-orthogonal Q plane. Here, as one example, the block length (code length) in the error correction code is 2016 bits. A first block configured of 2016 bits that are error correction encoded is referred to as block #1 and denoted as "#1". Accordingly, an N-th (N is an integer greater than or equal to 1) block configured of 2016 bits that are error correction encoded is referred to as block #N and denoted as "#N".

When QPSK is applied, 336 symbols are generated from block #N. Accordingly, the 336 symbols generated from block #1 are indicated as "#1-1", "#1-2", "#1-3", "#1-4" . . . "#1-334", "#1-335", and "#1-336". Accordingly, the 672 symbols generated from block #N are expressed as "#N-1", "#N-2", "#N-3", "#N-4" . . . "#N-334", "#N-335", and "#N-336".

In FIG. 95, the data carriers are illustrated arranged along the horizontal frequency axis and vertical time axis. Here, just as described above, data carriers from data carrier $1 to data carrier $336 are present.

As illustrated in FIG. 95, at time &1,

Data carrier $1 is assigned with the symbol "#1-1",
data carrier $2 is assigned with the symbol "#1-2",
data carrier $3 is assigned with the symbol "#1-3",
data carrier $4 is assigned with the symbol "#1-4",
data carrier $5 is assigned with the symbol "#1-5",
data carrier $6 is assigned with the symbol "#1-6",
(recitation for data carrier $7 through data carrier $333 is omitted),
data carrier $334 is assigned with the symbol "#1-334",
data carrier $335 is assigned with the symbol "#1-335", and
data carrier $336 is assigned with the symbol "#1-336".

Accordingly, at time &1, time &2, and time &3 data in block #1 and data in block #2 is transmitted.

Accordingly, at time &(M), data in block #(M) is transmitted. M is an integer that is greater than or equal to 1.

The transmission device illustrated in FIG. 1 selects one of the following modes, which are also described in Embodiment 1, Embodiment 4, and this embodiment, and transmits a modulated signal.

Mode ♭1:

Single stream transmission using a multi-carrier method (such as OFDM), the QPSK modulation method, and 672 code length error correction code.

Mode ♭2:

Single stream transmission using a multi-carrier method, the 16QAM modulation method, and 672 code length error correction code.

Mode ♭3:

Single stream transmission using a multi-carrier method, the 64QAM modulation method, and 672 code length error correction code.

Mode ♭4:

Single stream transmission using a multi-carrier method, the QPSK modulation method, and 2016 code length error correction code.

Mode ♭5:

Single stream transmission using a multi-carrier method, the 16QAM modulation method, and 2016 code length error correction code.

Mode ♭6:

Single stream transmission using a multi-carrier method, the 64QAM modulation method, and 2016 code length error correction code.

Mode ♭7:

MIMO transmission using a multi-carrier method, the QPSK modulation method, and 672 code length error correction code.

Mode ♭8:

MIMO transmission using a multi-carrier method, the 16QAM modulation method, and 672 code length error correction code.

Mode ♭9:

MIMO transmission using a multi-carrier method, the 64QAM modulation method, and 672 code length error correction code.

Mode ♭10:

MIMO transmission using a multi-carrier method, the QPSK modulation method, and 2016 code length error correction code.

Mode ♭11:

MIMO transmission using a multi-carrier method, the 16QAM modulation method, and 2016 code length error correction code.

Mode ♭12:

MIMO transmission using a multi-carrier method, the 64QAM modulation method, and 2016 code length error correction code.

However, when a single stream is transmitted using the transmission device illustrated in FIG. 1, for example, a modulated signal generated by mapper 106A is transmitted from antenna 112A. Mapper 106B does not operate and a modulated signal is not transmitted from antenna 112B. Note that when transmitting a single stream, for example, a modulated signal generated by mapper 106A may be transmitted from a plurality of antennas. In other words, antenna 112B may be used.

As described above, FIG. 27 illustrates one example of a frame configuration of a modulated signal transmitted by the transmission device illustrated in FIG. 1. Here, preambles 2701A, 2701B, and 2703A include a control information symbol for transmission to the reception device illustrated in FIG. 28, which is the communication partner.

The control information symbol included in preambles 2701A, 2701B, and 2703A includes, as control information, the following symbols.

Symbol Related to Modulation Method:

Symbol for transmitting information on the modulated signal used to generate the data symbol group in FIG. 27.

Symbol Related to Error Correction Code:

Symbol for transmitting information related to the error correction code used to generate the data symbol group in FIG. 27. For example, this include information on the error correction code to be used, information on the encode rate to be used, and/or information on the block length (code length) to be used.

Symbol Related to Transmission Method:

Symbol for transmitting information related to the transmission method used to generate the data symbol group in FIG. 27. For example, this includes "information on whether single stream transmission or MIMO transmission was used", "information related to the number of streams to be transmitted".

Control information signal generator 116Z illustrated in FIG. 1 receives inputs of frame configuration signal 113 and signal 115 on information related to the transmission method, generates, for example, "symbol related to modulation method", "symbol related to error correction code", "symbol related to transmission method", and outputs control information signal 117Z. Note that control information signal 117Z is a symbol corresponding to the control information symbol described above.

Control information decoder 2809 in the reception device, which is the communication partner illustrated in FIG. 28, receives inputs of reception baseband signals 2804X and 2804Y, demodulates and decodes the control information symbol included in a preamble (for example, 2701A, 2701B, 2703A) in FIG. 27, and, for example, obtains "symbol related to modulation method", "symbol related to error correction code", "symbol related to transmission method".

Then, from "symbol related to modulation method", "symbol related to error correction code", "symbol related to transmission method", control information decoder 2809 estimates whether a data symbol group illustrated in FIG. 27 (for example, 2702A, 2702B, 2704A) is a data symbol group according to any one of the above-described modes "Mode ♭1 through Mode ♭12".

As a result of control information decoder 2809 estimating the mode, control information decoder 2809 knows the arrangement along the frequency and time axes of the data symbols in the data symbol group, and outputs control information signal 2810 including information on the symbol arrangement. Note that symbol arrangement along the frequency and time axes is as described in Embodiment 1 and Embodiment 4. Moreover, control information signal 2810 includes information included in "symbol related to modulation method", information included in "symbol related to error correction code", and information included in "symbol related to transmission method".

Signal processor 2811 illustrated in FIG. 28 receives an input of control information signal 2810, and based on information included in control information signal 2810, demodulates and decodes data symbols, and outputs data 2812.

Note that the element that implements the frame configuration such as described above can be radio units 110A and 110B illustrated in FIG. 1. Examples of configurations of radio units 110A and 110B are illustrated in FIG. 64.

In FIG. 64, modulated signal 6401 corresponds to 109A or 109B illustrated in FIG. 1. Frame configuration signal 6400 corresponds to frame configuration 113 illustrated in FIG. 1, control information signal 6410 corresponds to control information signal 117Z illustrated in FIG. 1, and transmission signal 6409 corresponds to transmission signal 111A or 111B illustrated in FIG. 1.

Serial-parallel converter 6402 receives inputs of modulated signal 6401 and frame configuration signal 6400, and based on frame configuration signal 6400, applies a serial-parallel conversion to modulated signal 6401, and outputs serial-parallel converted signal 6403.

Rearranger 6404 receives inputs of serial-parallel converted signal 6403, control information signal 6410, and frame configuration signal 6400, and based on frame configuration signal 6400, rearranges serial-parallel converted signal 6403 and control information signal 6410, and outputs rearranged signal 6405. Here, in particular, based on information on the code length of the error correction code, information on the modulation method, and information on the transmission method included in frame configuration signal 6400, rearranger 6404 switches the rerarranging method for serial-parallel converted signal 6403 (data symbols) based on the method described above.

Characteristic points are "when MIMO transmission method is applied, the modulation method for s1($i$) is specified as 16QAM, and the modulation method for s2($i$) is specified as QPSK, the rearranged method is different for when the code length of the error correction code is specified as 672 bits and for when the code length is specified as 2016 bits" and "when MIMO transmission method is applied, the modulation method for s1($i$) is specified as 16QAM, and the modulation method for s2($i$) is specified as 16QAM, the rearranged method is different for when the code length of the error correction code is specified as 672 bits and for when the code length is specified as 2016 bits" and "when MIMO transmission method is applied, the modulation method for s1($i$) is specified as 64QAM, and the modulation method for s2($i$) is specified as 64QAM, the rearranged method is different for when the code length of the error correction code is specified as 672 bits and for when the code length is specified as 2016 bits".

IFFT unit 6406 receives inputs of rearranged signal 6405 and frame configuration signal 6400, applies an IFFT to rearranged signal 6405, and outputs an IFFT signal 6407.

Radio frequency (RF) unit 6408 receives inputs of IFFT signal 6407 and a frame configuration signal, applies processing such as orthogonal modulation, frequency conversion, bandlimiting, and/or signal amplification, and outputs transmission signal 6409.

One different method for realizing such a frame configuration as described above is a method realized by interleaver 153 illustrated in FIG. 1.

For example, when MIMO transmission method is applied and the code length of the error correction code is set to 672 bits, the required size of the interleaver memory varies depending on whether “the modulation method for s1(*i*) is set to QPSK and the modulation method for s2(*i*) is set to QPSK”, “the modulation method for s1(*i*) is set to 16QAM and the modulation method for s2(*i*) is set to 16QAM”, or “the modulation method for s1(*i*) is set to 64QAM and the modulation method for s2(*i*) is set to 64QAM”.

When MIMO transmission method is applied and “the modulation method for s1(*i*) is set to QPSK and the modulation method for s2(*i*) is set to QPSK”, the required memory size is two encoded blocks worth of 1344 bits. However, when “the modulation method for s1(*i*) is set to 16QAM and the modulation method for s2(*i*) is set to 16QAM” is specified, the required memory size is four encoded blocks worth of 2688 bits. Moreover, when “the modulation method for s1(*i*) is set to 64QAM and the modulation method for s2(*i*) is set to 64QAM” is specified, the required memory size is six encoded blocks worth of 4032 bits.

When MIMO transmission method is applied and the code length of the error correction code is set to 2016 bits, the required size of the interleaver memory varies depending on whether “the modulation method for s1(*i*) is set to QPSK and the modulation method for s2(*i*) is set to QPSK”, “the modulation method for s1(*i*) is set to 16QAM and the modulation method for s2(*i*) is set to 16QAM”, or “the modulation method for s1(*i*) is set to 64QAM and the modulation method for s2(*i*) is set to 64QAM”.

When MIMO transmission method is applied and “the modulation method for s1(*i*) is set to QPSK and the modulation method for s2(*i*) is set to QPSK”, the required memory size is two encoded blocks worth of 4032 bits. However, when “the modulation method for s1(*i*) is set to 16QAM and the modulation method for s2(*i*) is set to 16QAM” is specified, the required memory size is four encoded blocks worth of 8064 bits. Moreover, when “the modulation method for s1(*i*) is set to 64QAM and the modulation method for s2(*i*) is set to 64QAM” is specified, the required memory size is two encoded blocks worth of 4032 bits.

This point is a characteristic point. Note that, here, rearranger 6404 is not necessarily required.

Moreover, the transmission device illustrated in FIG. 1 not only transmits OFDM modulated signals, but is also capable of transmitting single-carrier modulated signals, and is capable of switching between “OFDM modulated signal transmission” and “single-carrier modulated signal transmission”. Radio units 110A, 110B deal with operations for OFDM transmission and operations for single-carrier transmission.

Then, in FIG. 27, for example, a control information symbol formed by the single-carrier method is arranged before or temporally before preambles 2701A, 2701B, and this control information symbol includes “control information indicating whether the data symbol groups 2701A, 2701B and data symbol groups 2702A, 2702B are single-carrier symbols or OFDM symbols”.

A control information symbol formed by the single-carrier method is arranged before or temporally before preamble 2703A, and this control information symbol includes “control information indicating whether preamble 2703A and data symbol group 2704A are single-carrier symbols or OFDM symbols”.

Note that when the data symbol group includes OFDM symbols, the symbols are in accordance with any one of Mode #1 through Mode #12, and the implementation method in such cases is as described in Embodiment 1, Embodiment 4, and this embodiment.

Here, control information decoder 2809 in the reception device illustrated in FIG. 28, which is the communication partner, obtains and outputs “control information indicating single-carrier symbols or OFDM symbols” via demodulation and decoding. Accordingly, control information signal 2810 includes “control information indicating single-carrier symbols or OFDM symbols”.

Then, signal processor 2811 demodulates and decodes the data symbols based on the “control information indicating single-carrier symbols or OFDM symbols” included in control information signal 2810. Note that when “control information indicating single-carrier symbols or OFDM symbols” indicates “OFDM”, operations are as described above.

As described above, by the transmission device illustrated in FIG. 1 transmitting a modulated signal using any one of Mode ♭1 through Mode ♭12, in each mode, both the transmission and reception devices have the advantageous effect that memory capacity can be reduced, and in each mode, there is an advantageous effect that high data reception quality can be achieved. Note that in each mode, the relationship between encoded block and carrier is not limited to the examples in Embodiment 1, Embodiment 4, and this embodiment; the assignment may be performed in some other way. However, regarding an encoded block present at a certain time (for example, time &1 in FIG. 70), the relationship is the same as described above. In other words, carrier assignment in an encoded block may differ from Embodiment 1, Embodiment 4, and this embodiment.

Moreover, the same advantageous effects are achievable even when the transmission device illustrated in FIG. 1 is capable of selecting two or more modulation methods from among modulation methods selectable from among Mode ♭1 through Mode ♭12.

Note that in Embodiment 1, Embodiment 4, and this embodiment, the information described when 16QAM is applied can be implemented similarly even when a modulation method other than 16QAM is used, such as 16APSK or a modulation method including 16 signal points in an in-phase I-orthogonal Q plane.

Similarly, in Embodiment 1, Embodiment 5, and this embodiment, the information described when 64QAM is applied can be implemented similarly even when a modulation method other than 64QAM is used, such as 64APSK or a modulation method including 64 signal points in an in-phase I-orthogonal Q plane.

In Embodiment 1, Embodiment 5, and this embodiment, the information described when QPSK is applied can be implemented similarly even when a modulation method other than QPSK including 4 signal points in an in-phase I-orthogonal Q plane is used.

(Supplemental Information 2)

In Embodiment 1, Embodiment 4, Embodiment 5, Embodiment 6, and Embodiment 7, when single-carrier transmission/OFDM transmission, single stream transmission/MIMO transmission, modulation method, error correction encoding method (for example, encode rate, code length) is determined, one frame configuration methods may be selected from a plurality of frame configurations (assignment of symbols to carriers), and the transmission device illustrated in FIG. 1 may transmit a modulated signal. Here, the transmission device illustrated in FIG. 1 transmits information on the selected frame configuration via control information symbol.

Then, the reception device, which is the communication partner, demodulates and decodes the data symbol based on the information on the selected frame configuration.

With this, it is possible to select a frame configuration appropriate for the radio wave propagation environment, and possible to achieve an advantageous effect of increased data reception quality.

(Supplemental Information 3)

In each embodiment disclosed in herein, examples of configurations of a transmission device are given in, for example, FIG. 1, FIG. 29, FIG. 51, and FIG. 75 and described. Note that the configurations illustrated in FIG. 1 and FIG. 75 may be used as the configurations of signal processor 2903 illustrated in FIG. 29 and FIG. 51. Moreover, examples of configurations of relevant portions, including precoding and phase change processing, are given in FIG. 2, FIG. 3, FIG. 4, and FIG. 5 and described. However, the configuration of the transmission device is not limited to the examples illustrated in, for example, FIG. 1, FIG. 29, FIG. 51, and FIG. 75, and the configuration of signal processor 2903 is not limited to the examples illustrated in FIG. 1 and FIG. 75. Moreover, examples of configurations of relevant portions, including precoding and phase change processing, are given in FIG. 2, FIG. 3, FIG. 4, and FIG. 5 and described. In other words, so long as the transmission device can generate any of the signals (signal 109A and signal 109B or signal 2904A and signal 2904) described in each embodiment disclosed herein and transmit the generated signal using a plurality of antenna units, the transmission device and signal processor 2903 may have any configuration.

Hereinafter, different configuration examples of a transmission device and signal processor 2903 that fulfill such a requirement will be given.

One example of a different configuration example is as follows. mapper 106A, 106B illustrated in FIG. 1 generate, as mapped signal 107A, 107B, a signal corresponding to weighting synthesized signal 109A, 116B, based on encoded data 152, frame configuration signal 113, and signal 115 on information related to the transmission method. The transmission device includes the configuration of FIG. 1 excluding weighting synthesizer 108A, 108B. mapped signal 107A is input into radio unit A, and mapped signal 107B is input into phase changer 117B.

Another different configuration example is as follows. When the weighting synthesis (precoding) processing is expressed as matrix F (precoding matrix F) indicated by Equation (33) or Equation (34), weighting synthesizer 108A, 108B in FIG. 1 does not perform signal processing for weighting synthesis on mapped signal 107A, 107B, and outputs mapped signal 107A as weighting synthesized signal 109A and outputs mapped signal 107B as weighting synthesized signal 116B. In this case, based on signal 115 on information related to the transmission method, weighting synthesizer 108A, 108B switches between processing of (i) applying signal processing corresponding to weighting synthesis to generate weighting synthesized signal 109A, 116B, and (ii) bypassing performing signal processing for weighting synthesis and outputting mapped signal 107A as weighting synthesized signal 109A, and outputting mapped signal 107B as weighting synthesized signal 116B. When only the processing expressed as matrix F (precoding matrix F) in Equation (33) or Equation (34) is implemented as weighting synthesis (precoding) processing, weighting synthesizer 108A, 108B may be omitted.

In this way, even if the specifics of the transmission device configuration are different, by generating a signal equivalent to any one of signal 109A, 109B, signal 2904A, or signal 2904 described above in any of the embodiments of the disclosure and transmitting the signal using a plurality of antenna units, when the reception device is in an environment in which direct waves are dominant, in particular when in an LOS environment, it is possible to achieve an advantageous effect in which the reception quality of the reception device that is performing MIMO data symbol transferring (transfer via a plurality of streams) can be improved.

Moreover, "transmission method including precoding (no phase change)", "transmission method not including precoding (no phase change)", "transmission method including phase change (including precoding)", and "transmission method including phase change (not including precoding)" are herein described with reference to FIG. 2, FIG. 3, FIG. 4, and FIG. 5, but note that which transmission method is to be used may be switched in accordance with control information, and the modulated signal may be transmitted using the selected transmission method. In such a case, the transmission device may transmit, to the reception device, information indicating whether or not to perform phase change, as the control information. However, note that a transmission method not including precoding is a method of transmitting a plurality of mapped signals from a plurality of antennas, and this point is explained separately.

Moreover, for example, when transmitting two streams using any one of a "transmission method including precoding (no phase change)", "transmission method not including precoding (no phase change)", "transmission method including phase change (including precoding)", and "transmission method including phase change (not including precoding)", the selectable transmission methods for the two streams may differ according to the modulation method (set) of the two streams.

Take the Following for Example.

When the modulation method of each of the two streams is Binary Phase Shift Keying (BPSK), any one of a "transmission method including precoding (no phase change)", "transmission method not including precoding (no phase change)", "transmission method including phase change (including precoding)", and "transmission method including phase change (not including precoding)" may be selected.

When the modulation method of each of the two streams is QPSK, any one of a "transmission method including precoding (no phase change)", "transmission method not including precoding (no phase change)", "transmission method including phase change (including precoding)", and "transmission method including phase change (not including precoding)" may be selected.

When the modulation method of each of the two streams is 16QAM, any one of a "transmission method including precoding (no phase change)", "transmission method not including precoding (no phase change)", "transmission method including phase change (including precoding)", and "transmission method including phase change (not including precoding)" may be selected.

When the modulation method of each of the two streams is 64QAM, any one of a "transmission method including precoding (no phase change)" and "transmission method not including precoding (no phase change)" may be selected.

In this way, by varying the transmission method selection in accordance with the modulation method (set), it is possible to achieve the advantageous effect of favorable data reception quality in the reception device, which is the communication partner. This is because depending on the modulation method (set), the degree of improvement in data reception quality in the reception device differs between "transmission method including precoding (no phase change)" and "transmission method not including precoding (no phase change)".

INDUSTRIAL APPLICABILITY

The present disclosure can be widely applied to radio systems that transmit different modulated signals from different antennas. For example, the present disclosure is favorably applicable to a single-carrier MIMO communications system and an OFDM-MIMO communications system. Moreover, the present disclosure can also be applied when MIMO transmission is used in a wired communications system including a plurality of transmission points (for example, a power line communication (PLC) system, an optical transmission system, a digital subscriber line (DSL) system). In this case, a plurality of modulated signals such as the signals described in herein are transferred using a plurality of transmission points. Moreover, the modulated signals may be transmitted from the plurality of transmission points.

REFERENCE MARKS IN THE DRAWINGS

117B phase changer
200 weighting synthesizer

The invention claimed is:

1. A transmission method, comprising:

transmitting first training signals from a Directional multi-gigabit (DMG) antenna, the first training signals being transmitted by changing weighting parameters used for the DMG antenna, each of the first training signals including N symbols transmitted consecutively in time, where N is an integer equal to or greater than two; and transmitting second training signals from the DMG antenna, each of the second training signals including N symbols transmitted consecutively in time; wherein an antenna identification (ID) is transmitted before the first training signals, an antenna ID is transmitted before each of the second training signals, a polarization of the first training signals is different from a polarization of the second training signals, the first training signals and the second training signals are transmitted alternately, the first training signals and the second training signals are transmitted consecutively, the first training signals and the second training signals are transmitted in a single carrier mode, each of the N symbols within a first one of the first training signals is transmitted by applying a first set of weighting parameters, the first set of weighting parameters being identical for each of the N symbols within the first one of the first training signals, each of the N symbols within a second one of the first training signals is transmitted by applying a second set of weighting parameters, the second set of weighting parameters being identical for each of the N symbols within the second one of the first training signals, each of the N symbols within a second one of the first training signals is transmitted at a different time than each of the N symbols within a first one of the first training signals, and the first set of weighting parameters is different than the second set of weighting parameters.

2. A transmission apparatus, comprising:

a Directional multi-gigabit (DMG) antenna; and a processor coupled to the DMG antenna, the processor being configured to:

transmit first training signals from the DMG antenna, the first training signals being transmitted by changing weighting parameters used for the DMG antenna, each of the first training signals including N symbols transmitted consecutively in time, where N is an integer equal to or greater than two; and transmit second training signals from the DMG antenna, each of the second training signals including N symbols transmitted consecutively in time; wherein an antenna identification (ID) is transmitted before the first training signals, an antenna ID is transmitted before each of the second training signals, a polarization of the first training signals is different from a polarization of the second training signals, the first training signals and the second training signals are transmitted alternately, the first training signals and the second training signals are transmitted consecutively, the first training signals and the second training signals are transmitted in a single carrier mode, each of the N symbols within a first one of the first training signals is transmitted by applying a first set of weighting parameters, the first set of weighting parameters being identical for each of the N symbols within the first one of the first training signals, each of the N symbols within a second one of the first training signals is transmitted by applying a second set of weighting parameters, the second set of weighting parameters being identical for each of the N symbols within the second one of the first training signals, each of the N symbols within a second one of the first training signals is transmitted at a different time than each of the N symbols within a first one of the first training signals, and the first set of weighting parameters is different than the second set of weighting parameters.

* * * * *